US012782866B2

(12) United States Patent
Luo et al.

(10) Patent No.: US 12,782,866 B2
(45) Date of Patent: Nov. 3, 2026

(54) PROCESS CARTRIDGE FOR ENGAGING FORCE RECEIVING UNIT THEREOF WITH DRIVING UNIT OF ELECTRONIC IMAGE-FORMING APPARATUS

(71) Applicant: Pantum Technology Co., Ltd., Zhuhai (CN)

(72) Inventors: Qin Luo, Zhuhai (CN); Likun Zeng, Zhuhai (CN); Geming Ding, Zhuhai (CN); Jianxin Cao, Zhuhai (CN); Shuchun Dai, Zhuhai (CN); Zhizheng Jia, Zhuhai (CN); Lianjun Wu, Zhuhai (CN); Wenjun Yu, Zhuhai (CN); Weichen Liu, Zhuhai (CN); Qijie Liang, Zhuhai (CN); Hailong Ma, Zhuhai (CN); Weizhi Zhang, Zhuhai (CN); Qingfei Peng, Zhuhai (CN)

(73) Assignee: Pantum Technology Co., Ltd., Zhuhai (CN)

( * ) Notice: Subject to any disclaimer, the term of this patent is extended or adjusted under 35 U.S.C. 154(b) by 0 days.

(21) Appl. No.: 18/316,903

(22) Filed: May 12, 2023

(65) Prior Publication Data

US 2023/0350341 A1 Nov. 2, 2023

Related U.S. Application Data

(63) Continuation of application No. PCT/CN2021/130424, filed on Nov. 12, 2021.

(30) Foreign Application Priority Data

Nov. 12, 2020 (CN) ........................ 202022615130.X
Nov. 20, 2020 (CN) ........................ 202022697235.4
(Continued)

(51) Int. Cl.
*G03G 21/18* (2006.01)

(52) U.S. Cl.
CPC ....... *G03G 21/186* (2013.01); *G03G 21/1842* (2013.01); *G03G 21/1853* (2013.01); *G03G 21/1864* (2013.01); *G03G 2221/1654* (2013.01)

(58) Field of Classification Search
CPC ............. G03G 21/186; G03G 21/1842; G03G 2221/1654; G03G 2221/1657; G03G 21/1864; G03G 21/1853
See application file for complete search history.

(56) References Cited

U.S. PATENT DOCUMENTS 5,930,562 A * 7/1999 Noda .................. G03G 21/186
399/167
10,379,491 B1 * 8/2019 Wu .................... G03G 21/1853
(Continued)

FOREIGN PATENT DOCUMENTS

CN 101178555 A 5/2008
CN 102141749 A 8/2011
(Continued)

OTHER PUBLICATIONS

The World Intellectual Property Organization (WIPO) International Search Report With Translation for PCT/CN2021/130424 Jun. 18, 2021 6 Pages (including translation).

*Primary Examiner* — Stephanie E Bloss
*Assistant Examiner* — Laura Roth
(74) *Attorney, Agent, or Firm* — Anova Law Group, PLLC

(57) ABSTRACT

The present disclosure provides a process cartridge. The process cartridge includes a cartridge body; a photosensitive drum, rotatably disposed at the cartridge body; a developing roller, rotatably disposed at the cartridge body; a force receiving unit, where the force receiving unit is disposed at an end of the cartridge body and configured to be engaged with a driving unit of an electronic image-forming apparatus
(Continued)

to receive a driving force outputted by the driving unit; and a pressing part, where the pressing part is fixedly disposed at the cartridge body and at a same end of the cartridge body as the force receiving unit, and configured to press the driving unit to make the driving unit to be coaxially-aligned; and a distance between the pressing part and an axis of the photosensitive drum is unchanged in displacement during an engagement process of the force receiving unit and the driving unit.

11 Claims, 156 Drawing Sheets

(30) Foreign Application Priority Data

| | | |
|---|---|---|
| Nov. 27, 2020 | (CN) | 202022795896.0 |
| Nov. 30, 2020 | (CN) | 202022831053.1 |
| Dec. 9, 2020 | (CN) | 202022959348.7 |
| Dec. 11, 2020 | (CN) | 202022969906.8 |
| Jan. 6, 2021 | (CN) | 202120018284.2 |
| Jan. 26, 2021 | (CN) | 202120212356.7 |
| Feb. 8, 2021 | (CN) | 202120353465.0 |
| Mar. 5, 2021 | (CN) | 202120476955.X |
| Mar. 12, 2021 | (CN) | 202120520087.0 |
| Mar. 18, 2021 | (CN) | 202120560441.2 |
| Mar. 22, 2021 | (CN) | 202120583894.7 |
| Mar. 23, 2021 | (CN) | 202120585526.6 |
| Mar. 23, 2021 | (CN) | 202120588393.8 |
| Mar. 25, 2021 | (CN) | 202120606883.6 |
| Apr. 1, 2021 | (CN) | 202120671583.6 |
| Apr. 2, 2021 | (CN) | 202110362897.2 |
| Apr. 2, 2021 | (CN) | 202120686054.3 |
| Apr. 7, 2021 | (CN) | 202120706549.8 |
| Apr. 13, 2021 | (CN) | 202120745366.7 |
| Apr. 21, 2021 | (CN) | 202120827432.5 |
| Apr. 21, 2021 | (CN) | 202120829983.5 |
| May 6, 2021 | (CN) | 202120948889.1 |
| May 12, 2021 | (CN) | 202110519128.9 |
| May 12, 2021 | (CN) | 202121011413.1 |
| May 12, 2021 | (CN) | 202121011766.1 |
| May 12, 2021 | (CN) | 202121011777.X |
| May 12, 2021 | (CN) | 202121015944.8 |
| May 12, 2021 | (CN) | 202121018084.3 |
| May 17, 2021 | (CN) | 202121049589.6 |
| May 20, 2021 | (CN) | 202121097217.0 |
| Jun. 3, 2021 | (CN) | 202110620356.5 |
| Jun. 17, 2021 | (CN) | 202110670464.3 |
| Jul. 30, 2021 | (CN) | 202121759325.X |
| Aug. 4, 2021 | (CN) | 202110891479.2 |
| Aug. 4, 2021 | (CN) | 202121806586.2 |
| Aug. 4, 2021 | (CN) | 202121806788.7 |
| Aug. 4, 2021 | (CN) | 202121807141.6 |
| Aug. 4, 2021 | (CN) | 202121807440.X |

(56) References Cited

U.S. PATENT DOCUMENTS

| | | | | |
|---|---|---|---|---|
| 2001/0021320 | A1* | 9/2001 | Murayama | G03G 21/185 399/116 |
| 2004/0136751 | A1* | 7/2004 | Sunada | G03G 21/1882 399/167 |
| 2005/0220481 | A1* | 10/2005 | Yamaguchi | G03G 21/185 399/111 |
| 2006/0216061 | A1 | 9/2006 | Yamaguchi | |
| 2008/0138105 | A1* | 6/2008 | Kanno | G03G 21/185 399/111 |
| 2011/0268473 | A1* | 11/2011 | Hashimoto | G03G 21/186 399/119 |
| 2011/0280621 | A1 | 11/2011 | Suzuki et al. | |
| 2014/0270845 | A1* | 9/2014 | Kawakami | G03G 21/1647 399/110 |
| 2017/0146951 | A1* | 5/2017 | Yan | G03G 21/1857 |
| 2017/0261927 | A1* | 9/2017 | Sato | G03G 21/1842 |
| 2018/0253055 | A1 | 9/2018 | Chino | |
| 2020/0301352 | A1* | 9/2020 | Matsumaru | G03G 21/1647 |

FOREIGN PATENT DOCUMENTS

| | | | |
|---|---|---|---|
| CN | 103383534 | A | 11/2013 |
| CN | 105093889 | A | 11/2015 |
| CN | 105204309 | A | 12/2015 |
| CN | 206710795 | U | 12/2017 |
| CN | 107918267 | A | 4/2018 |
| CN | 108227448 | A | 6/2018 |
| CN | 108241269 | A | 7/2018 |
| CN | 108490755 | A | 9/2018 |
| CN | 108614404 | A | 10/2018 |
| CN | 208239811 | U | 12/2018 |
| CN | 208999764 | U | 6/2019 |
| CN | 209570807 | U | 11/2019 |
| CN | 111435225 | A | 7/2020 |
| CN | 211015028 | U | 7/2020 |
| CN | 211236566 | U | 8/2020 |
| CN | 111766768 | A | 10/2020 |
| CN | 216595906 | U | 5/2022 |
| CN | 216595907 | U | 5/2022 |
| DE | 102014114266 | A1 | 11/2015 |
| JP | 2012177854 | A | 9/2012 |
| WO | 2016019693 | A1 | 2/2016 |
| WO | 2018064872 | A1 | 4/2018 |

* cited by examiner

| S1 minimum value | S3 minimum value |
|---|---|
| 27mm | 18～21mm |
| 27mm | 27mm |
| 27mm | 29mm |
| 27mm | 32mm |
| 25mm | 28mm |
| 25mm | 30mm |

| S2 minimum value | S4 minimum value |
|---|---|
| 34mm | 52mm |
| 35mm | 52mm |
| 36mm | 52mm |

| S6 minimum value | S5 minimum value |
|---|---|
| 5mm | 10.5mm |
| 7mm | 10.5mm |
| 9mm | 10.5mm |
| 11mm | 10.5mm |

PROCESS CARTRIDGE FOR ENGAGING FORCE RECEIVING UNIT THEREOF WITH DRIVING UNIT OF ELECTRONIC IMAGE-FORMING APPARATUS

CROSS-REFERENCE TO RELATED APPLICATION

This application is a continuation application of PCT Patent Application No. PCT/CN2021/130424, filed on Nov. 12, 2021, which claims the priority to Chinese patent application No. 202022615130.X, filed on Nov. 12, 2020, No. 202022697235.4, filed on Nov. 20, 2020, No. 202022795896.0, filed on Nov. 27, 2020, No. 202022831053.1, filed on Nov. 30, 2020, No. 202022959348.7, filed on Dec. 9, 2020, No. 202022969906.8, filed on Dec. 11, 2020, No. 202120018284.2, filed on Jan. 6, 2021, No. 202120212356.7, filed on Jan. 26, 2021, No. 202120353465.0, filed on Feb. 8, 2021, No. 202120476955.X, filed on Mar. 5, 2021, No. 202120520087.0, filed on Mar. 12, 2021, No. 202120560441.2, filed on Mar. 18, 2021, No. 202120671583.6, filed on Apr. 1, 2021, No. 202120583894.7, filed on Mar. 22, 2021, No. 202120686054.3, filed on Apr. 2, 2021, No. 202120706549.8, filed on Apr. 7, 2021, No. 202120827432.5, filed on Apr. 21, 2021, No. 202120829983.5, filed on Apr. 21, 2021, No. 202120588393.8, filed on Mar. 23, 2021, No. 202120606883.6, filed on Mar. 25, 2021, No. 202120585526.6, filed on Mar. 23, 2021, No. 202110362897.2, filed on Apr. 2, 2021, No. 202120745366.7, filed on Apr. 13, 2021, No. 202110519128.9, filed on May 12, 2021, No. 202121011777.X, filed on May 12, 2021, No. 202121011766.1, filed on May 12, 2021, No. 202121015944.8, filed on May 12, 2021, No. 202121018084.3, filed on May 12, 2021, No. 202121011413.1, filed on May 12, 2021, No. 202120948889.1, filed on May 6, 2021, No. 202121049589.6, filed on May 17, 2021, No. 202121097217.0, filed on May 20, 2021, No. 202110670464.3, filed on Jun. 17, 2021, No. 202121759325.X, filed on Jul. 30, 2021, No. 202110891479.2, filed on Aug. 4, 2021, No. 202121806586.2, filed on Aug. 4, 2021, No. 202121806788.7, filed on Aug. 4, 2021, No. 202121807141.6, filed on Aug. 4, 2021, No. 202121807440.X, filed on Aug. 4, 2021, and No. 202110620356.5, filed on Jun. 3, 2021. The above enumerated patent applications are incorporated herein by reference in their entirety.

TECHNICAL FIELD

The present disclosure generally relates to the field of image-forming technology and, more particularly, relates to a process cartridge.

BACKGROUND

In the existing technology, an electronic image-forming apparatus may include a driving unit for outputting a rotational driving force. A process cartridge may be detachably installed in the electronic image-forming apparatus and cooperated with the driving unit to receive the rotational driving force outputted by the driving unit. The process cartridge may include a force receiving unit, a developing unit, a developer, a toner control unit, and a housing for accommodating above units. The force receiving unit may be disposed at one end of the process cartridge in the axial direction of the developing unit; and according to different types of process cartridge structures, some process cartridges may further include photosensitive units, charging units, cleaning units, stirring units and the like. When the process cartridge is installed in the electronic image-forming apparatus, the force receiving unit and the driving unit of the electronic image-forming apparatus are engaged with each other, such that the rotational driving force outputted by the driving unit is transferred to the process cartridge to drive rotary units (such as the developing unit, the photosensitive unit, the stirring unit, etc.) inside the process cartridge to rotate, and then engage the developing work of the electronic image-forming apparatus.

However, in the existing technology, the initial state of the driving unit is in an inclined state, that is, the driving unit and the force receiving unit are not coaxial, and structural interference is generated between the force receiving unit and the driving unit during the contact and engagement process. As a result, it is difficult or impossible for the force receiving unit and the driving unit to be engaged with each other accurately to transfer the driving force, such that certain time is needed for the force receiving unit and the driving unit to be engaged with each other, which may affect working efficiency of the process cartridge.

SUMMARY

One aspect of the present disclosure provides a process cartridge, detachably installed in an electronic image-forming apparatus. The process cartridge includes a cartridge body; a photosensitive drum, rotatably disposed at the cartridge body; a developing roller, rotatably disposed at the cartridge body; a force receiving unit, where the force receiving unit is disposed at an end of the cartridge body and configured to be engaged with a driving unit of the electronic image-forming apparatus to receive a driving force outputted by the driving unit; and a pressing part, where the pressing part is fixedly disposed at the cartridge body and at a same end of the cartridge body as the force receiving unit and is configured to press the driving unit to make the driving unit to be coaxially-aligned; and a distance between the pressing part and an axis of the photosensitive drum is unchanged in displacement during an engagement process of the force receiving unit and the driving unit.

Other aspects of the present disclosure may be understood by those skilled in the art in light of the description, the claims, and the drawings of the present disclosure.

BRIEF DESCRIPTION OF THE DRAWINGS

The drawings are incorporated to be a part of the present disclosure. The drawings illustrate embodiments consistent with the present disclosure, and together with the present disclosure, describe the principles of the present disclosure.

FIG. 120 illustrates an enlarged schematic of a force receiving portion viewed along a length direction of a process cartridge in FIG. 119.

FIG. 121 illustrates a schematic of a force receiving unit at a second state according to embodiment twenty two.

FIG. 122 illustrates a schematic of a force receiving unit at a third state according to embodiment twenty two.

FIG. 123 illustrates an enlarged schematic of a force receiving portion viewed along a length direction of a process cartridge in FIG. 122.

FIG. 124 illustrates a schematic of a process cartridge according to embodiment twenty three.

FIG. 125 illustrates a schematic of an electronic image-forming apparatus according to embodiment twenty four.

FIG. 126 illustrates a structural schematic of a process cartridge according to embodiment twenty four.

FIG. 127 illustrates a schematic of a bracket of a process cartridge according to embodiment twenty four.

FIG. 128 illustrates a structural schematic of a pressing part according to embodiment twenty four.

FIG. 129 illustrates a structural schematic of a pressing part installed on a bracket according to embodiment twenty four.

FIG. 130 illustrates a local view of a swing rod according to embodiment twenty four.

FIG. 131 illustrates a structural schematic of a driving unit of an electronic image-forming apparatus according to embodiment twenty four.

Figure 132A:
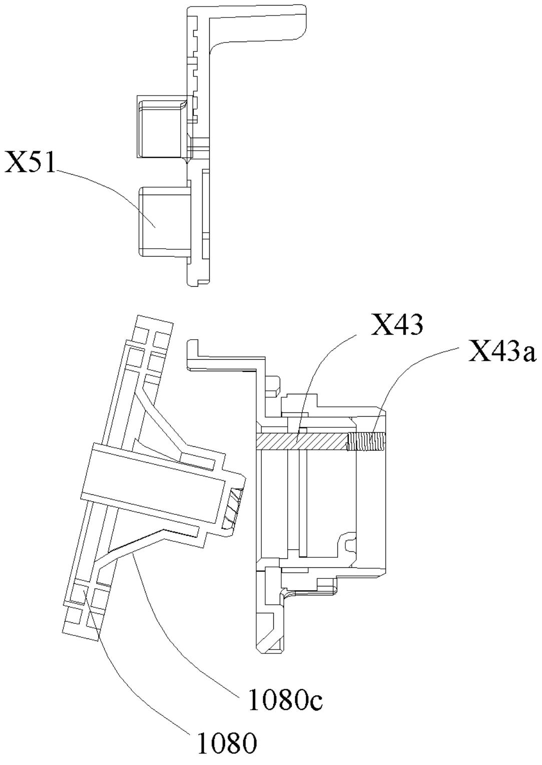

FIG. 132A illustrates a state schematic of a pressing part and a driving unit of an electronic image-forming apparatus when a process cartridge is at an initial position according to embodiment twenty four.

Figure 132B:
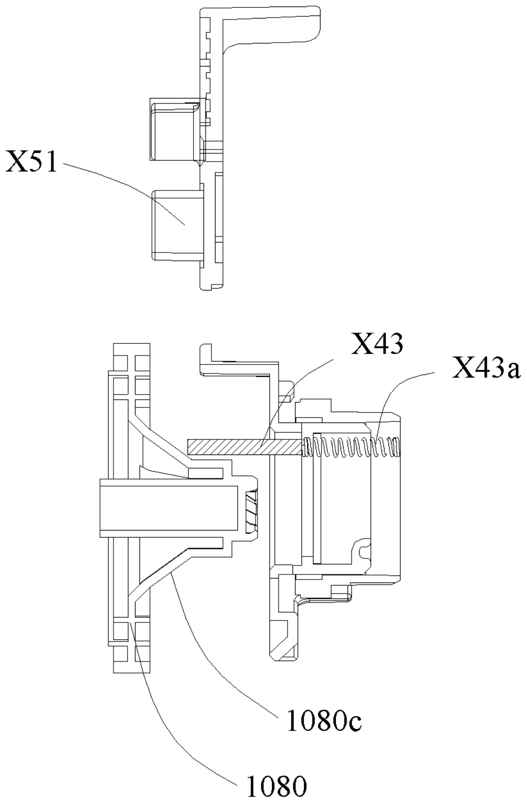

FIG. 132B illustrates a state schematic of a pressing part and a driving unit of an electronic image-forming apparatus when a process cartridge is at a coaxially-aligned position according to embodiment twenty four.

Figure 133:
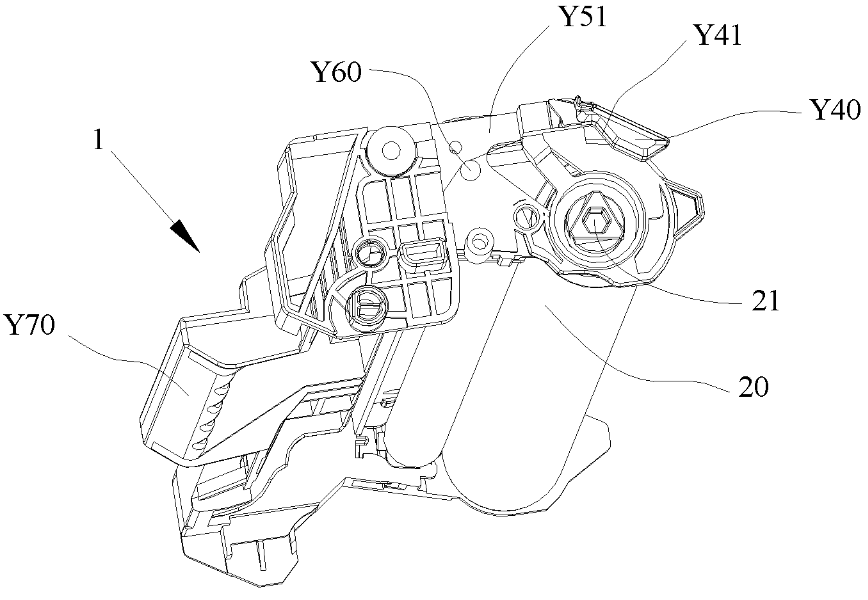

FIG. 133 illustrates a schematic of a process cartridge according to embodiment twenty five.

Figure 134:
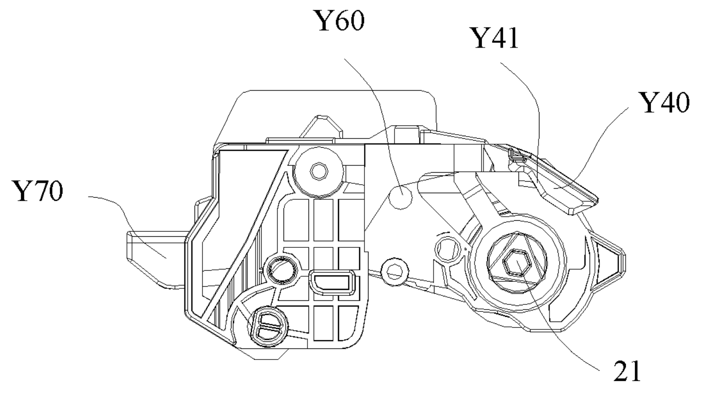

FIG. 134 illustrates a schematic of a pressing part at an initial state according to embodiment twenty five.

Figure 135:
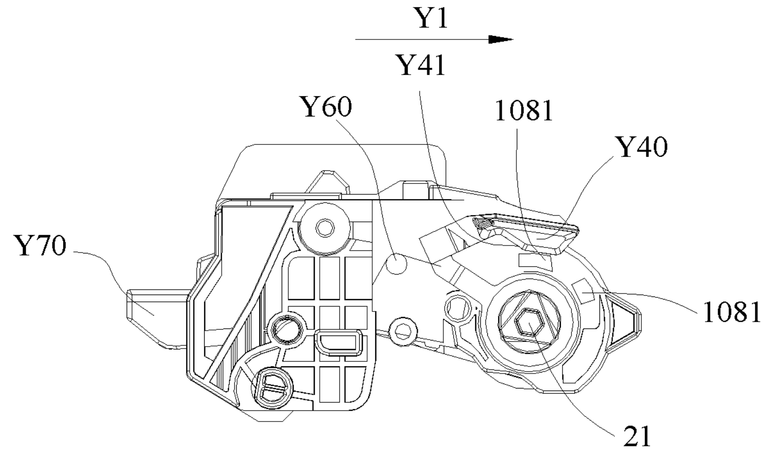

FIG. 135 illustrates a schematic of interference between a pressing part and a driving unit protective cover according to embodiment twenty five.

Figure 136:
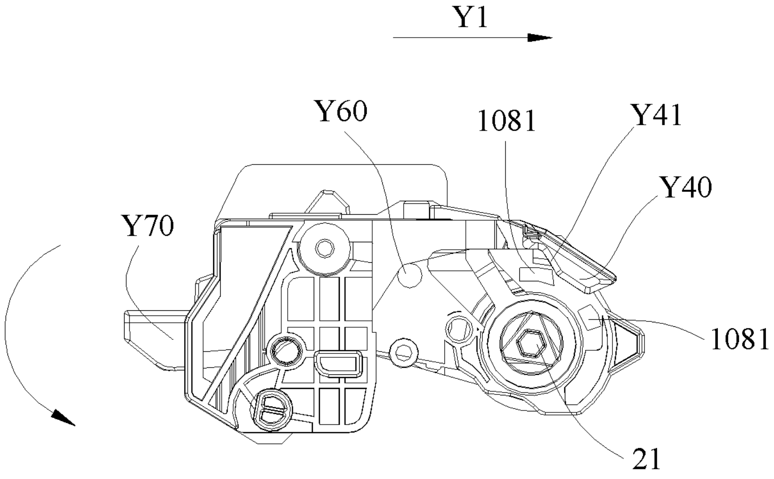

FIG. 136 illustrates a schematic when the process cartridge is installed in place according to embodiment twenty five.

Figure 137:
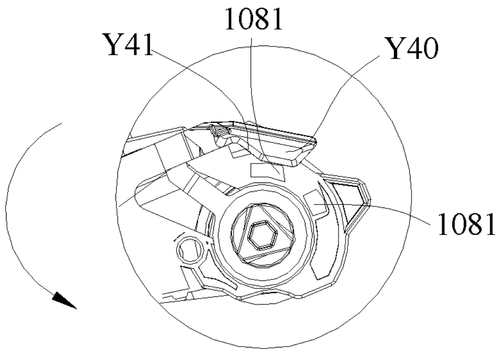

FIG. 137 illustrates an enlarged schematic of a pressing part and a protective cover when a process cartridge is removed according to embodiment twenty five.

Figure 138:
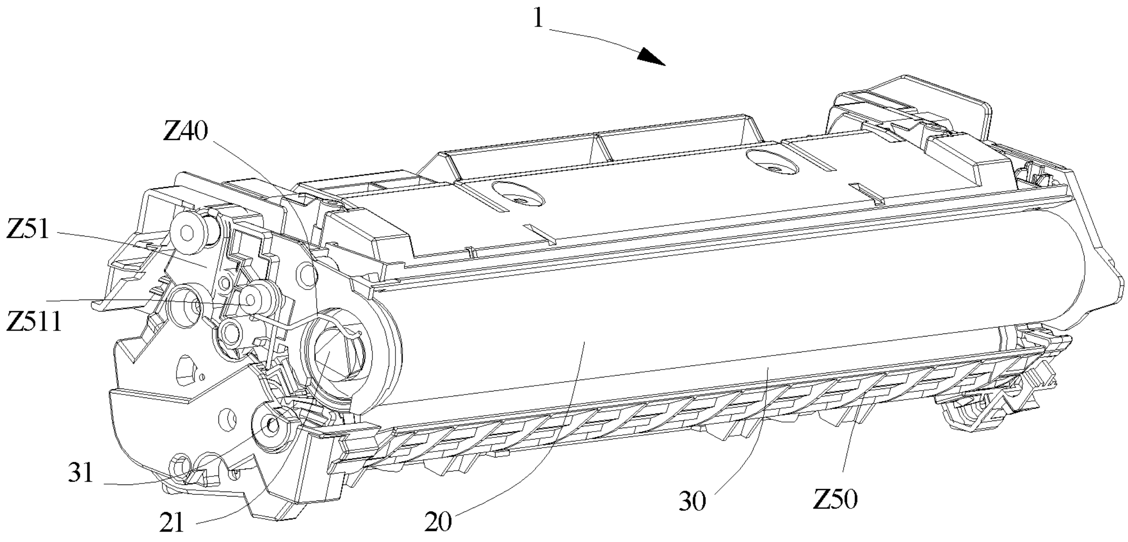

FIG. 138 illustrates a structural schematic of a process cartridge according to embodiment twenty six.

Figure 139:
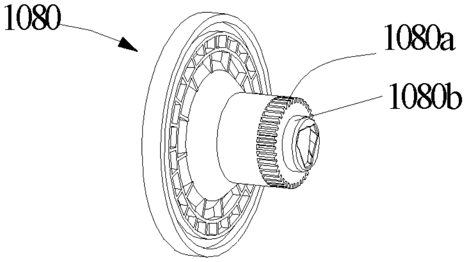

FIG. 139 illustrates a structural schematic of a driving unit in an electronic image-forming apparatus.

Figure 140:
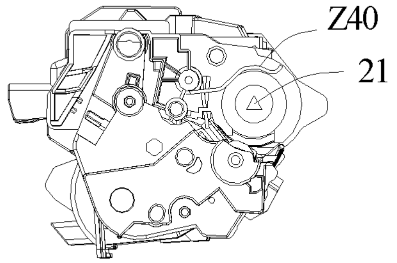
Figure 141:
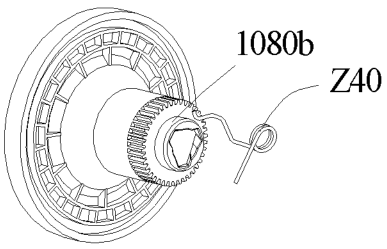
Figure 142:
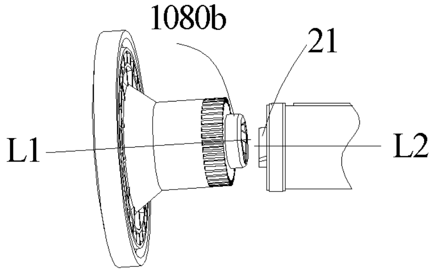

FIGS. 140-142 illustrate schematics of a process cartridge when a force receiving unit is not in contact and engaged with a driving unit of an electronic image-forming apparatus according to embodiment twenty six.

Figure 143:
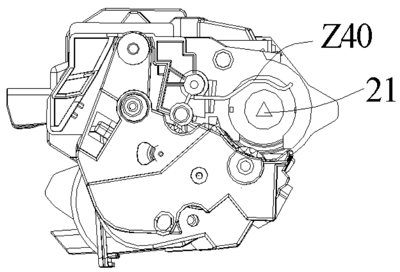
Figure 144:
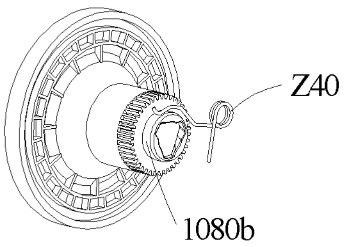
Figure 145:
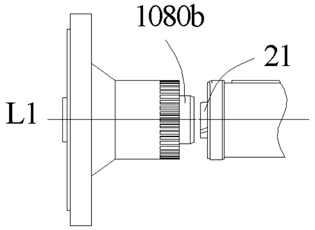

FIGS. 143-145 illustrate schematics of a process cartridge when a force receiving unit is in contact and engaged with a driving unit of an electronic image-forming apparatus according to embodiment twenty six.

Figure 146:
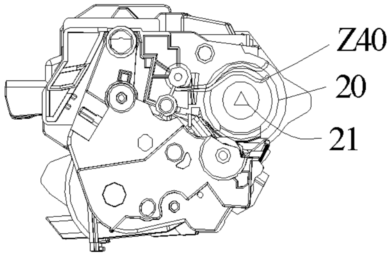

FIG. 146 illustrates a state schematic of a pressing part in an abutting position and a non-abutting position according to embodiment twenty six.

Figure 147:
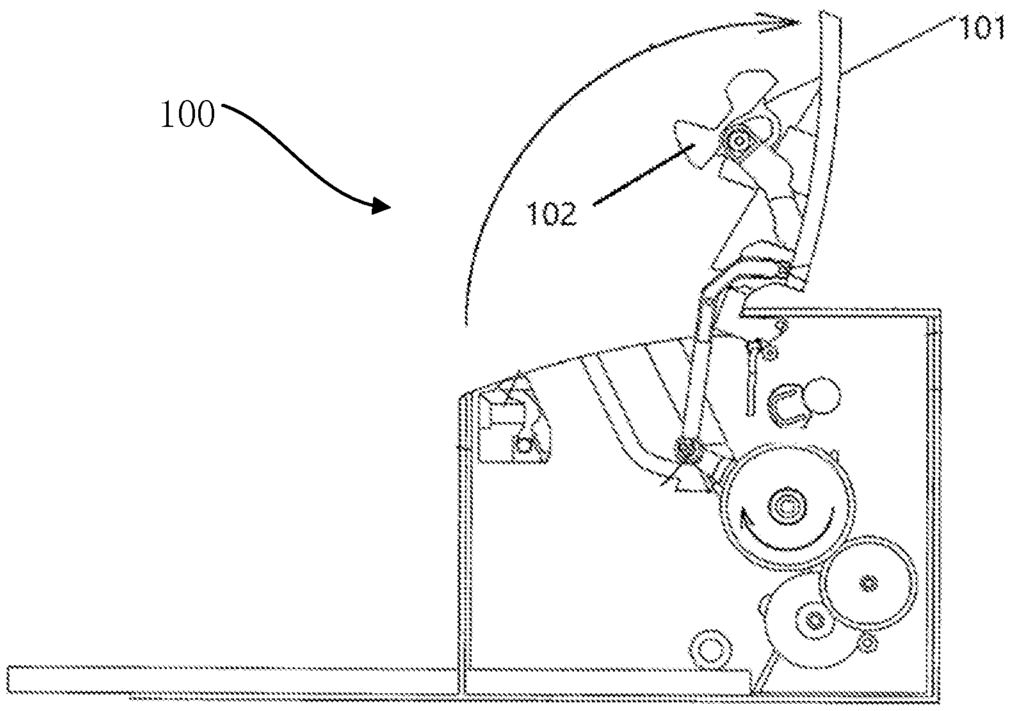

FIG. 147 illustrates a schematic of an electronic image-forming apparatus according to embodiment twenty seven.

Figure 148:
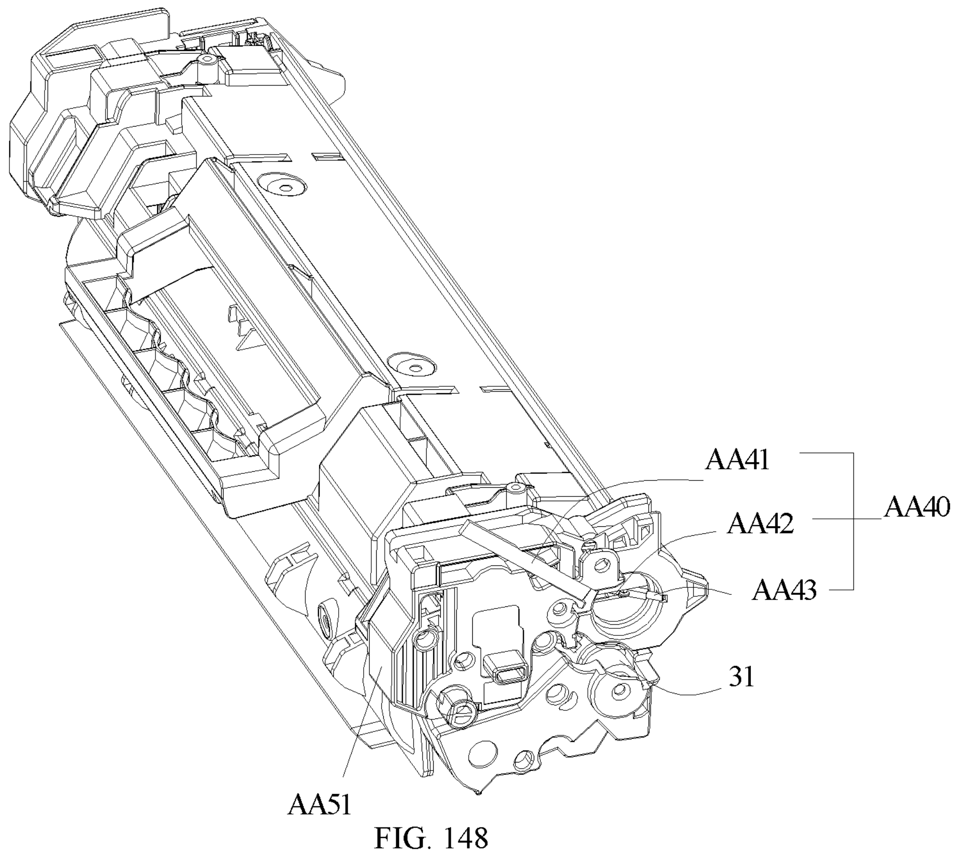

FIG. 148 illustrates a structural schematic of a process cartridge according to embodiment twenty seven.

Figure 149:
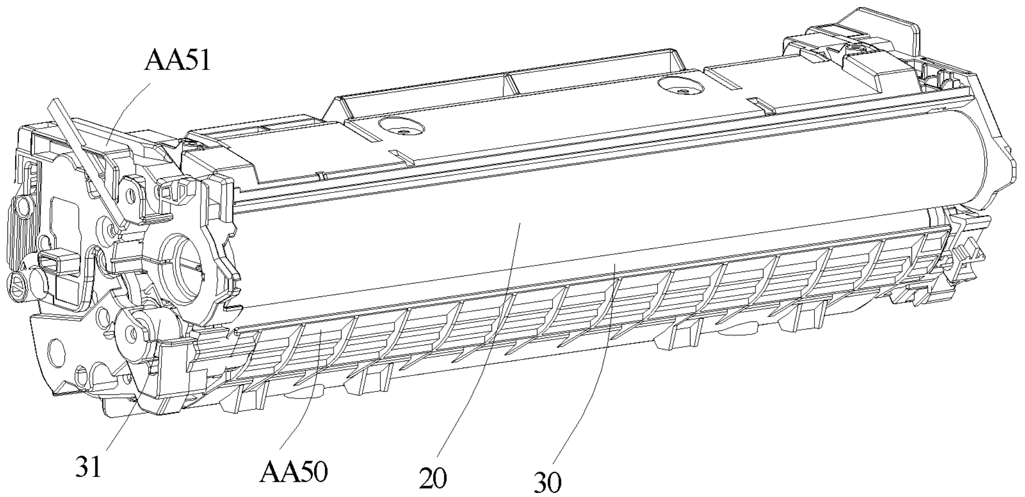

FIG. 149 illustrates another structural schematic of a process cartridge according to embodiment twenty seven.

Figure 150:
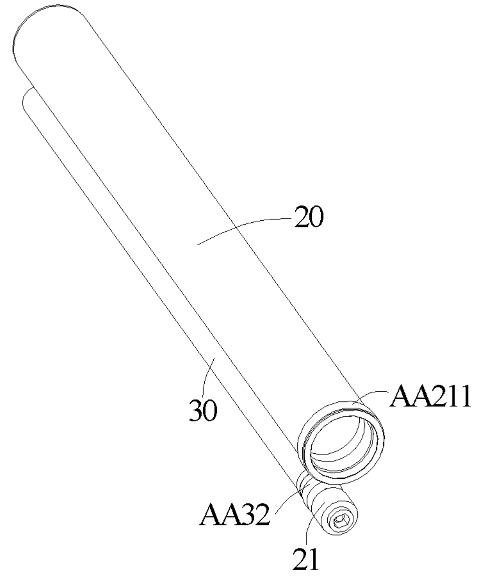

FIG. 150 illustrates a local view of a photosensitive drum and a developing roller according to embodiment twenty seven.

Figure 151:
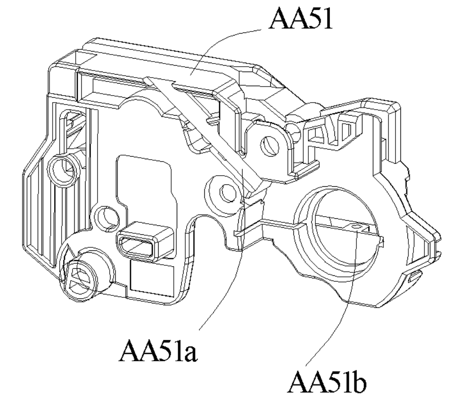

FIG. 151 illustrates a local view of a bracket according to embodiment twenty seven.

Figure 152:
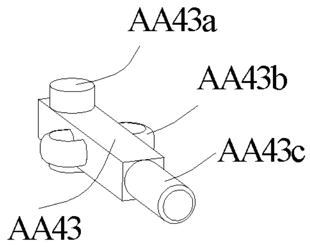

FIG. 152 illustrates a local view of a swing rod according to embodiment twenty seven.

Figure 153A:
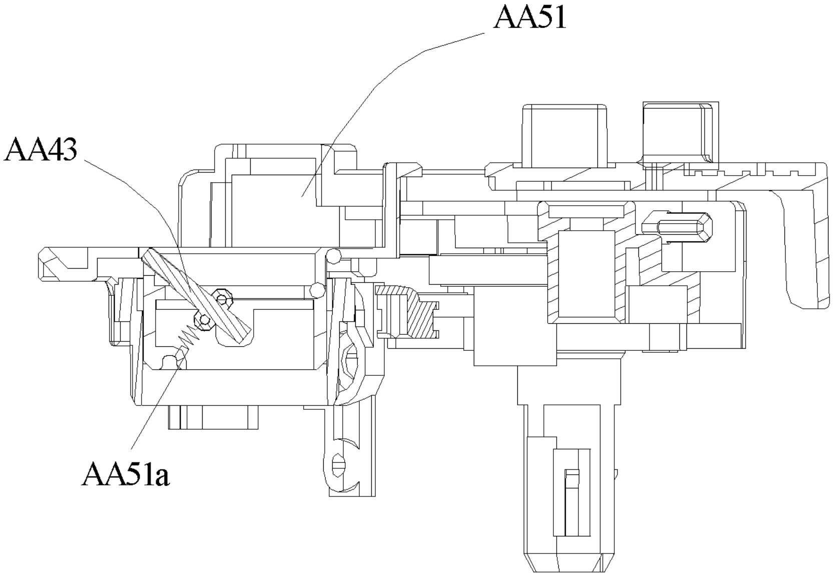

FIG. 153A illustrates a schematic of a pressing part of a process cartridge being disposed at a bracket according to embodiment twenty seven.

Figure 153B:
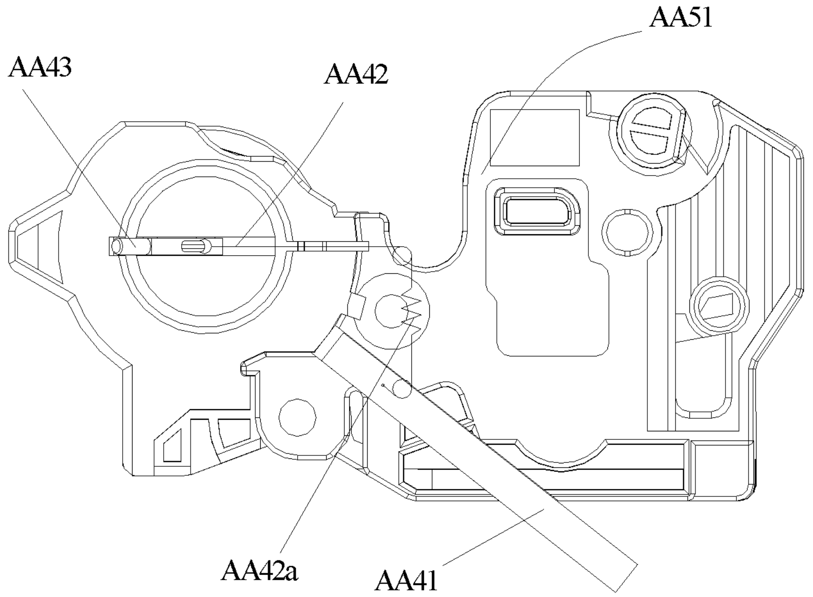

FIG. 153B illustrates another schematic of a pressing part of a process cartridge being disposed at a bracket according to embodiment twenty seven.

Figure 154A:
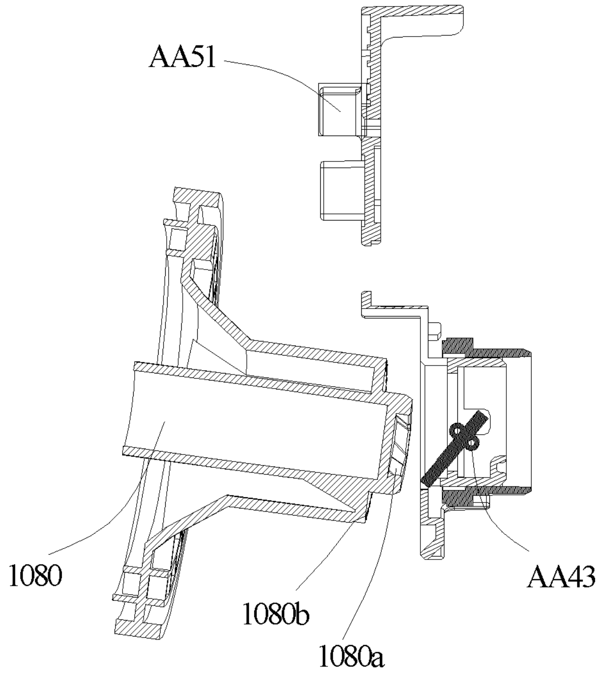

FIG. 154A illustrates a state schematic of a pressing part and a driving unit of an electronic image-forming apparatus when a process cartridge is at an initial position according to embodiment twenty seven.

Figure 154B:
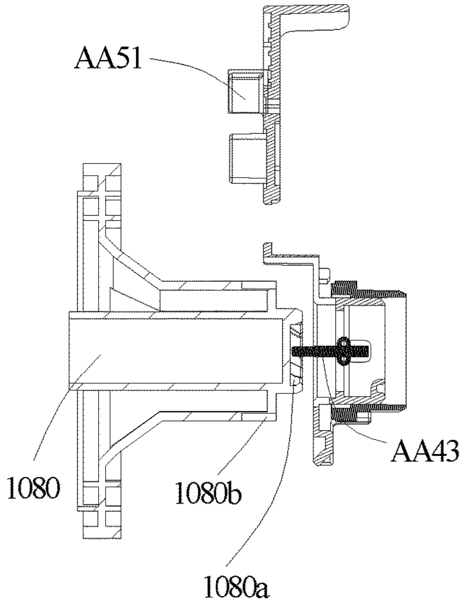

FIG. 154B illustrates a state schematic of a pressing part and a driving unit of an electronic image-forming apparatus when a process cartridge is at a center-alignment position according to embodiment twenty seven.

Figure 154C:
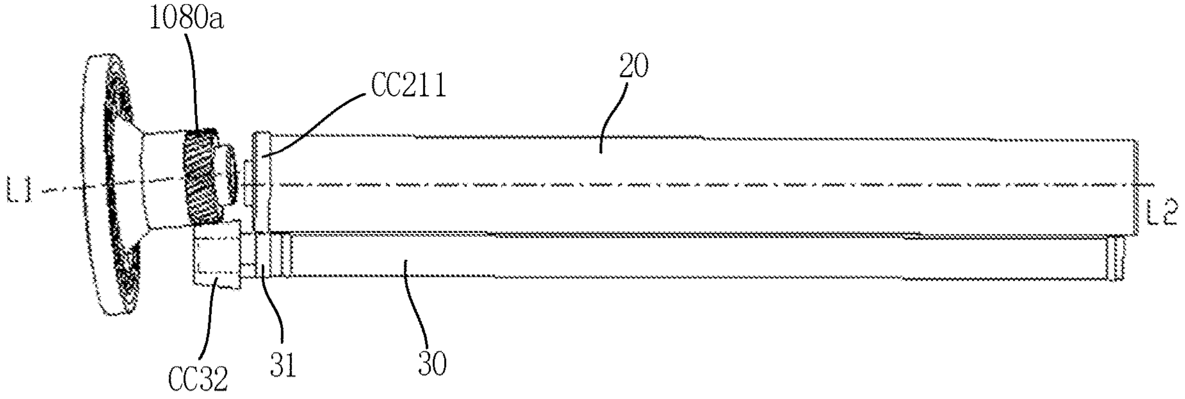

FIG. 154C illustrates a structural schematic of cooperation between a first gear and a driving unit according to embodiment twenty eight.

Figure 155:
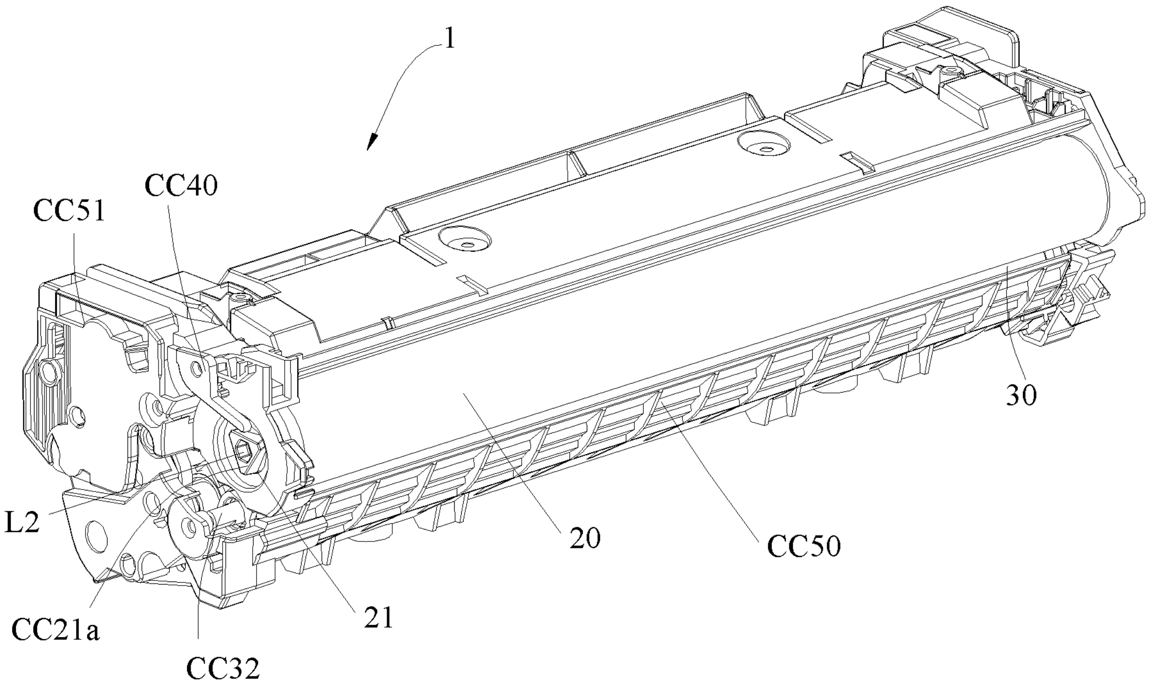

FIG. 155 illustrates a structural schematic of a process cartridge according to embodiment twenty nine.

Figure 156:
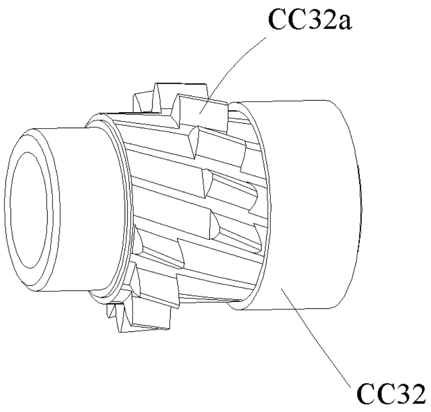

FIG. 156 illustrates a local schematic of a first gear according to embodiment twenty nine.

Figure 157:
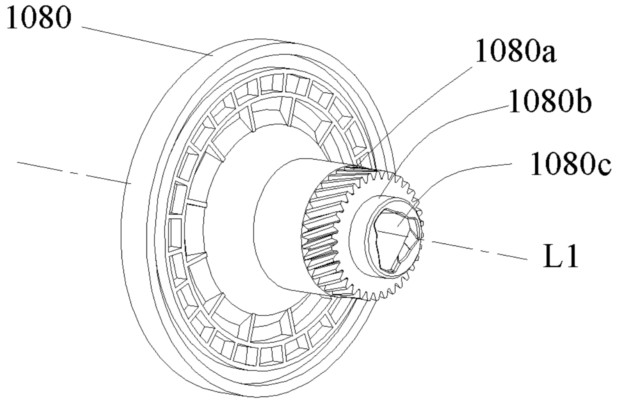

FIG. 157 illustrates a structural schematic of a driving unit in an electronic image-forming apparatus.

Figure 158A:
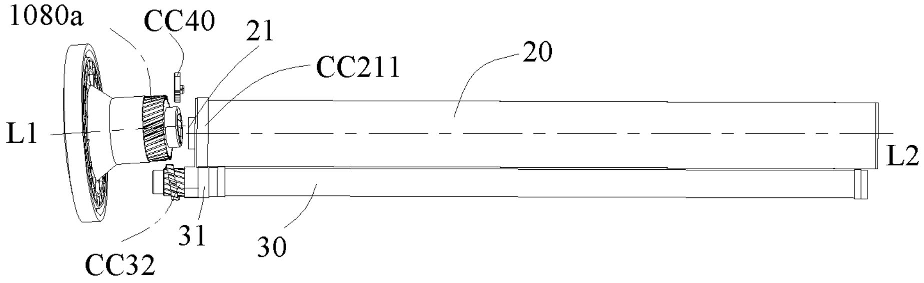

FIG. 158A illustrates a schematic of a process cartridge when a force receiving unit is not in contact and engaged with a driving unit of an electronic image-forming apparatus according to embodiment twenty nine.

Figure 158B:
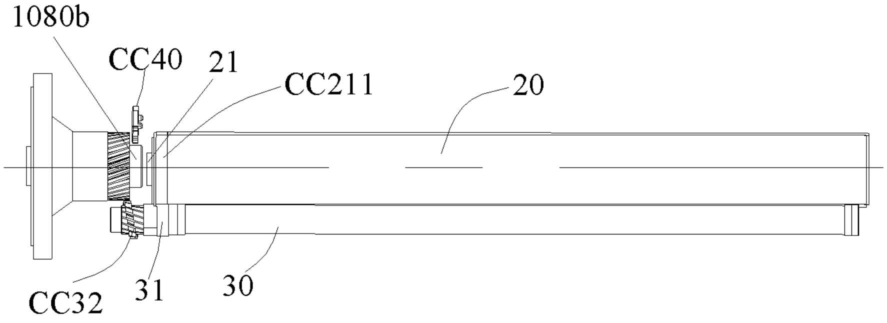

FIG. 158B illustrates a schematic of a process cartridge when a force receiving unit is in contact and engaged with a driving unit of an electronic image-forming apparatus according to embodiment twenty nine.

Figure 159:
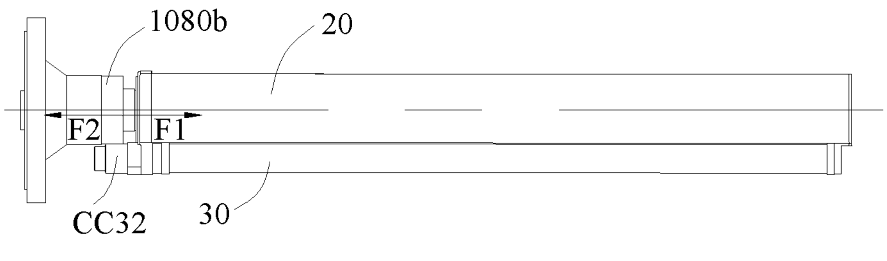

FIG. 159 illustrates a contact schematic between a driving unit and a first gear in an electronic image-forming apparatus according to embodiment twenty nine.

Figure 160:
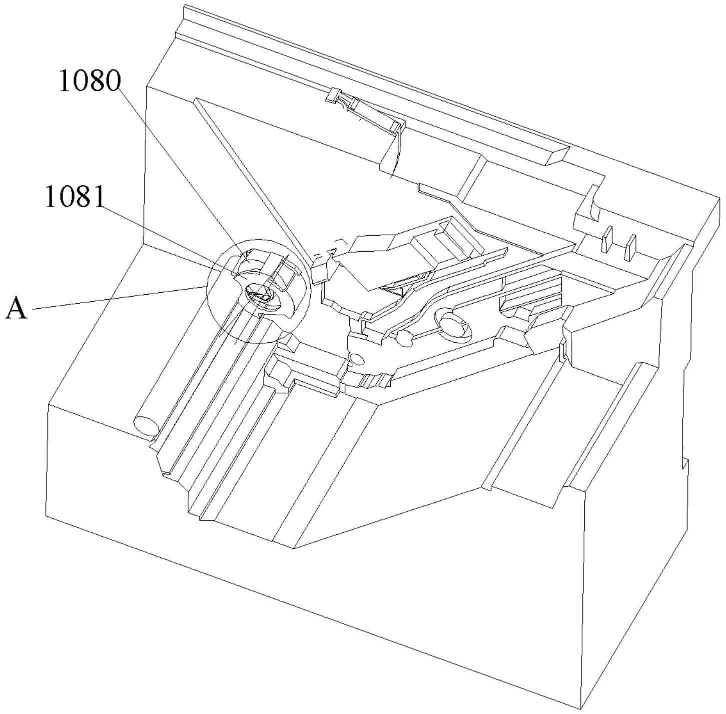

FIG. 160 illustrates a structural schematic of an electronic image-forming apparatus before a pressing part is installed according to embodiment thirty of the present disclosure.

Figure 161A:
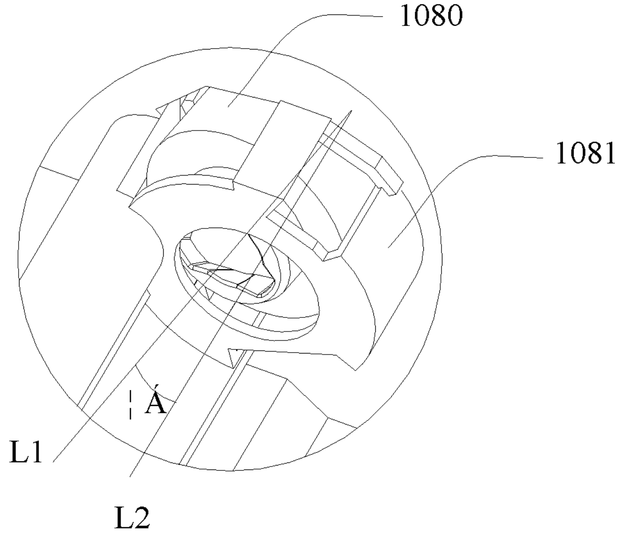

FIG. 161A illustrates a local enlarged view of a region A in FIG. 160.

Figure 161B:
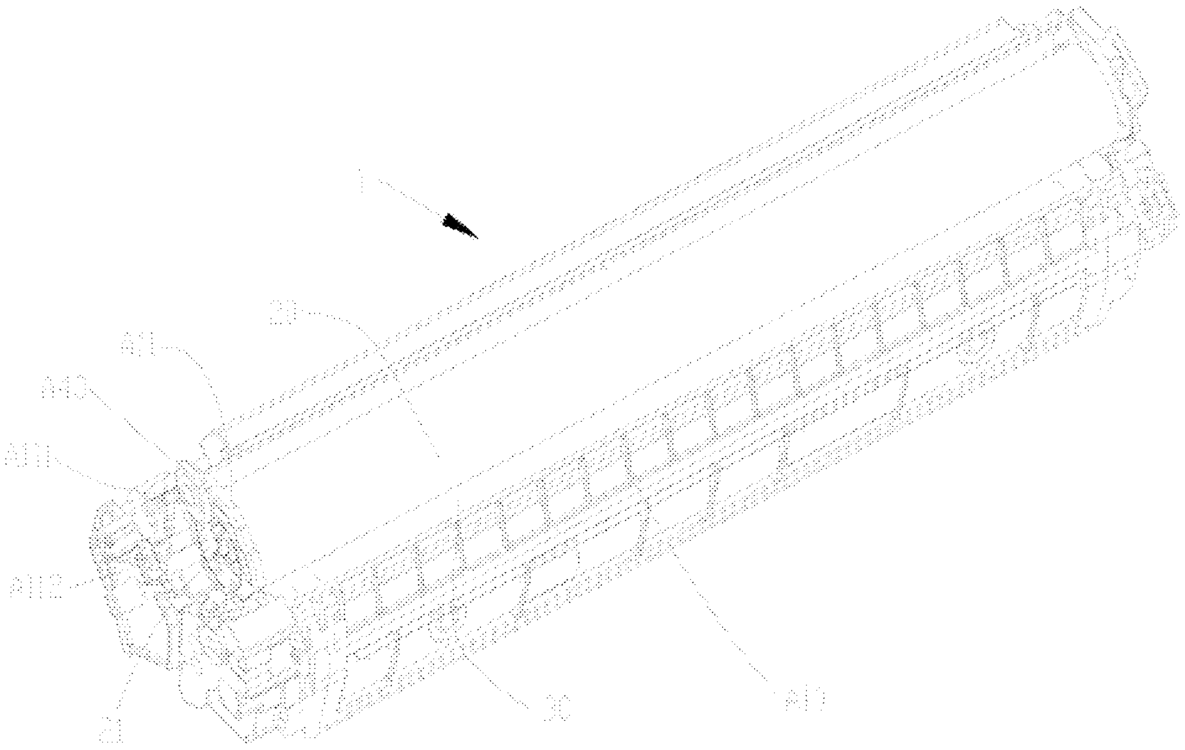

FIG. 161B illustrates a structural schematic of a process cartridge according to embodiments of the present disclosure.

Figure 162:
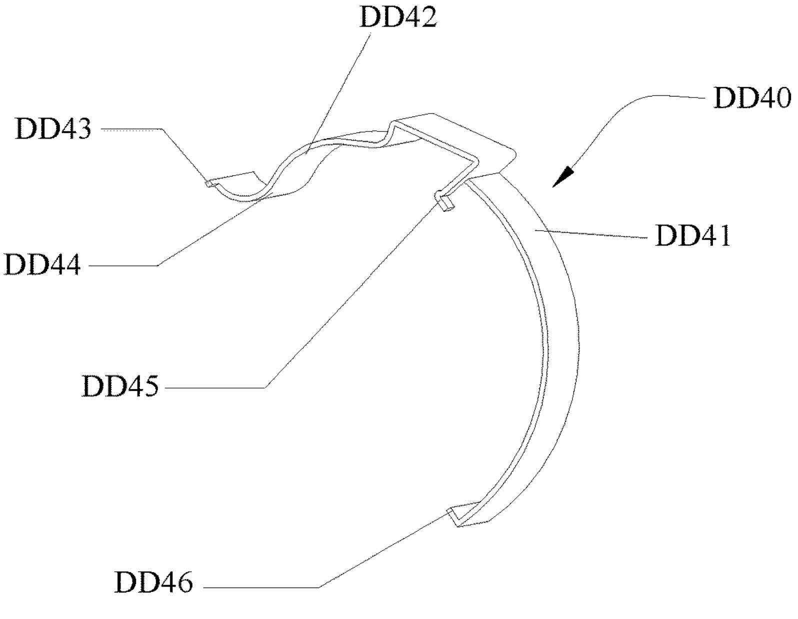

FIG. 162 illustrates a structural schematic of a pressing part according to embodiment thirty of the present disclosure.

Figure 163:
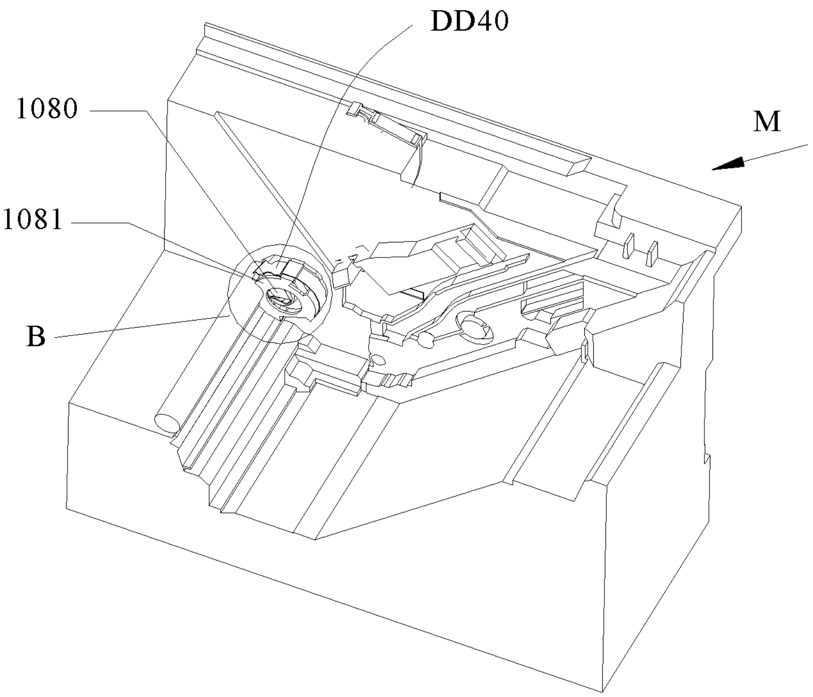

FIG. 163 illustrates a structural schematic of an electronic image-forming apparatus after a pressing part is installed according to embodiments of the present disclosure.

Figure 164:
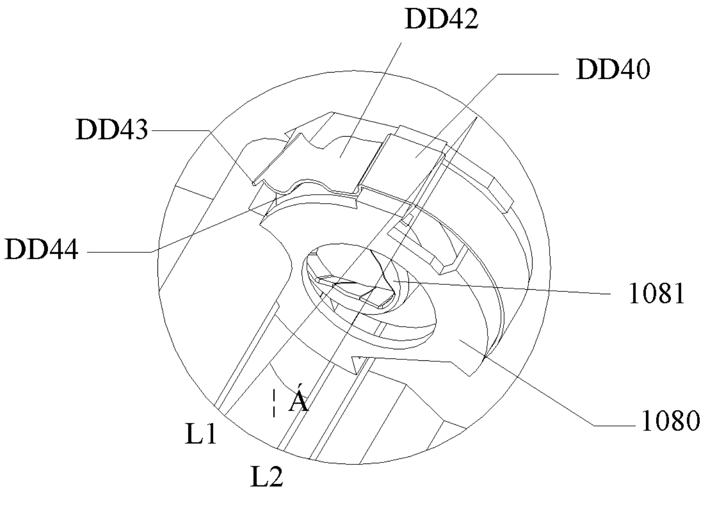

FIG. 164 illustrates a local enlarged view of a region B in FIG. 163.

Figure 165:
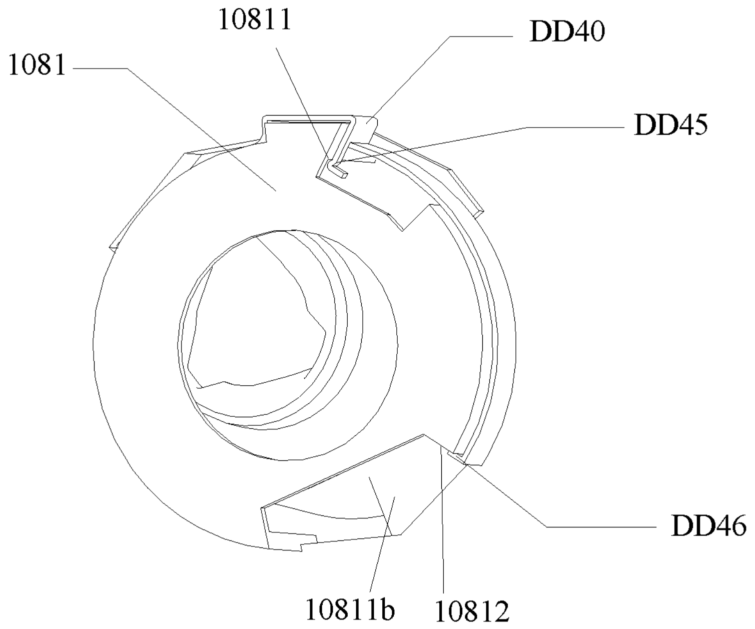

FIG. 165 illustrates an assembly structural schematic of a pressing part and a driving unit protective cover according to embodiments of the present disclosure.

Figure 166:
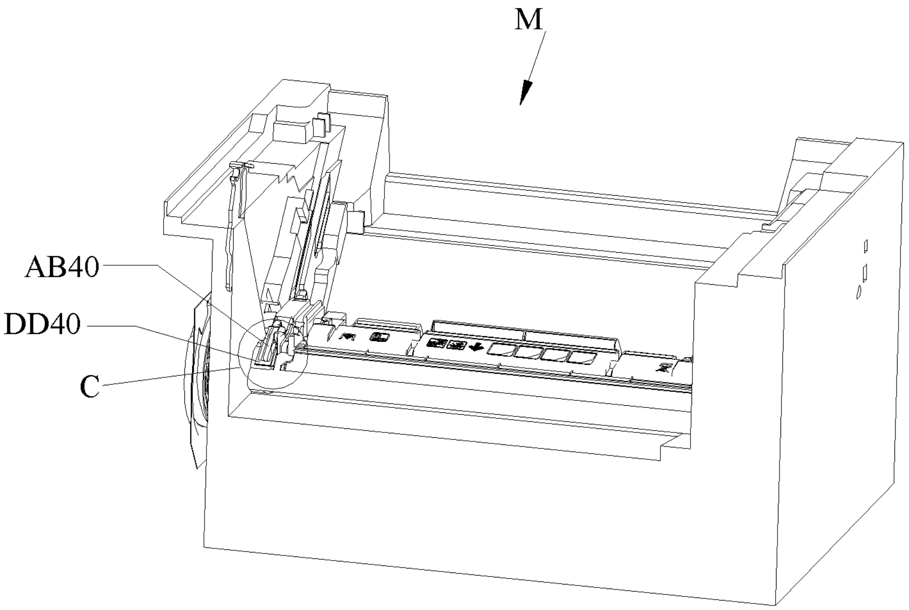

FIG. 166 illustrates a local structural schematic of an electronic image-forming apparatus according to embodiments of the present disclosure.

Figure 167:
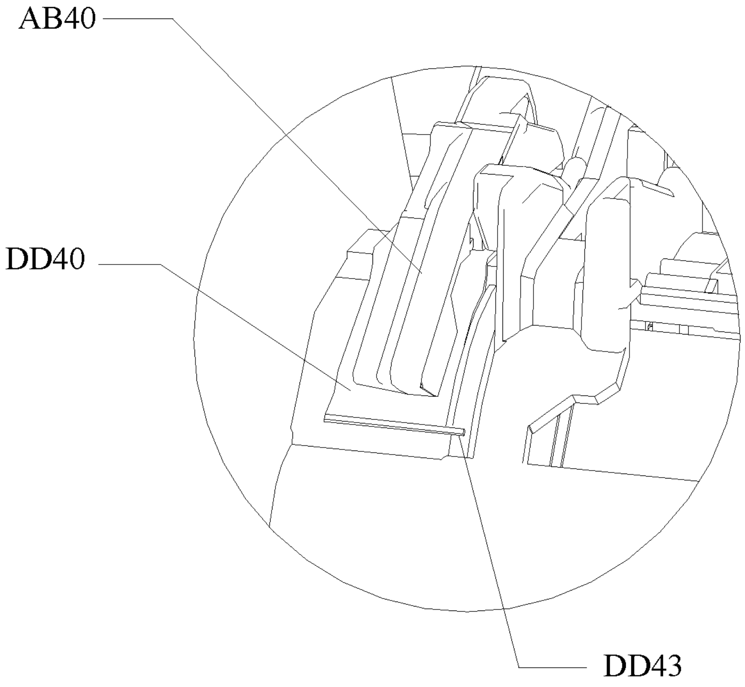

FIG. 167 illustrates a local enlarged view of a region C in FIG. 166.

Figure 168:
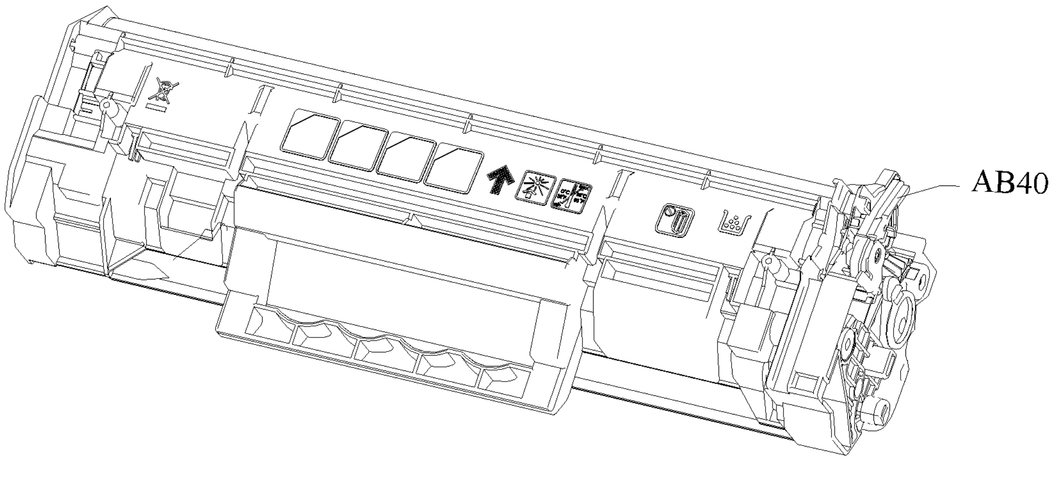

FIG. 168 illustrates another structural schematic of a process cartridge according to embodiments of the present disclosure.

Figure 169:
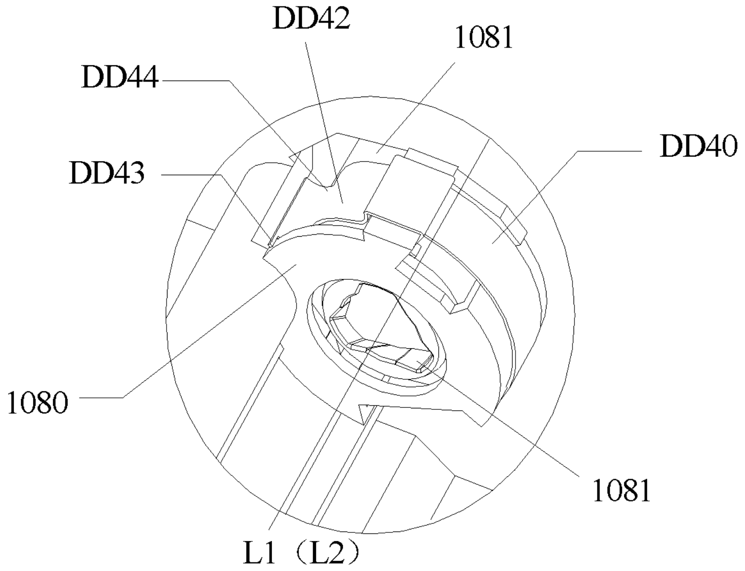

FIG. 169 illustrates a local enlarged schematic of a pressing part at a second state according to embodiment thirty of the present disclosure.

Figure 170:
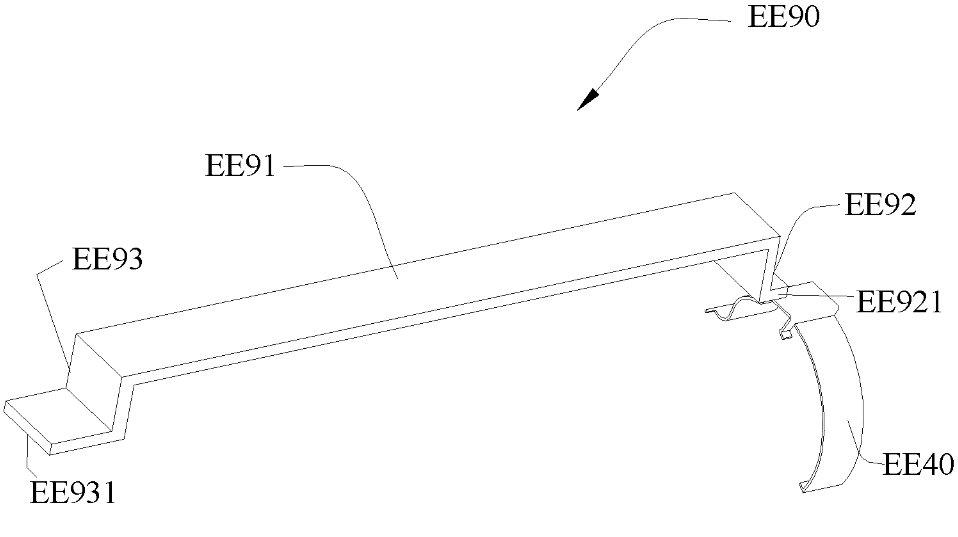

FIG. 170 illustrates a structural schematic of a pressing assembly according to embodiment thirty one of the present disclosure.

Figure 171:
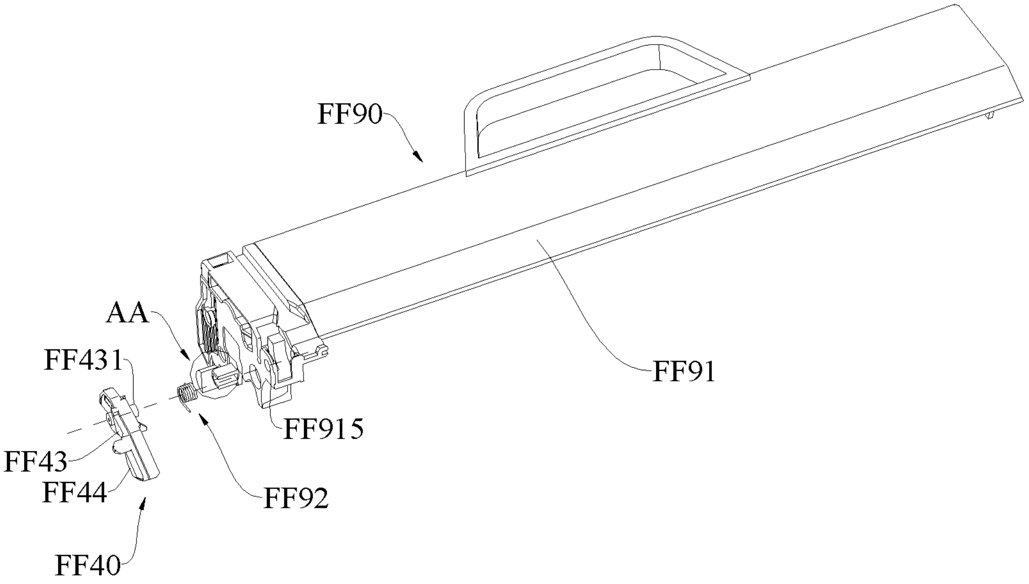

FIG. 171 illustrates a structural schematic of a pressing assembly according to embodiment thirty two of the present disclosure.

Figure 172:
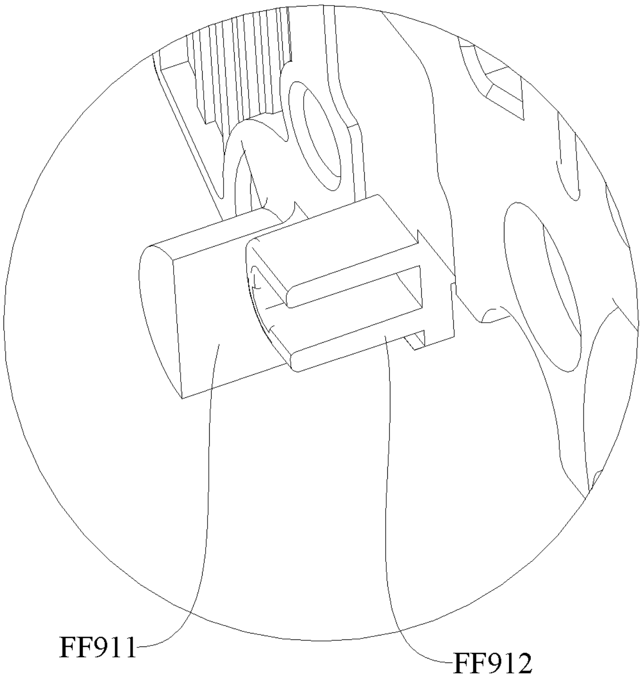

FIG. 172 illustrates a local enlarged view of a region AA in FIG. 171.

Figure 173:
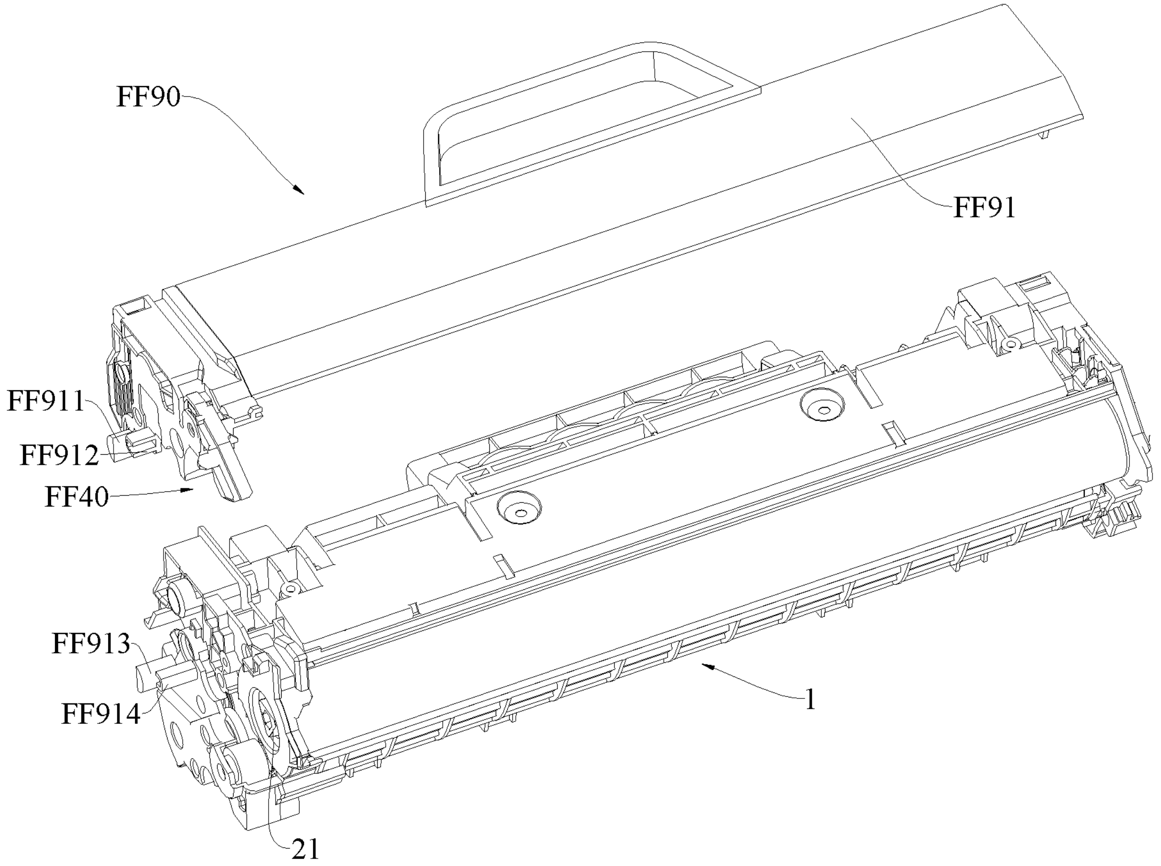

FIG. 173 illustrates an assembly schematic of a pressing assembly and a process cartridge according to embodiment thirty two of the present disclosure.

Figure 174:
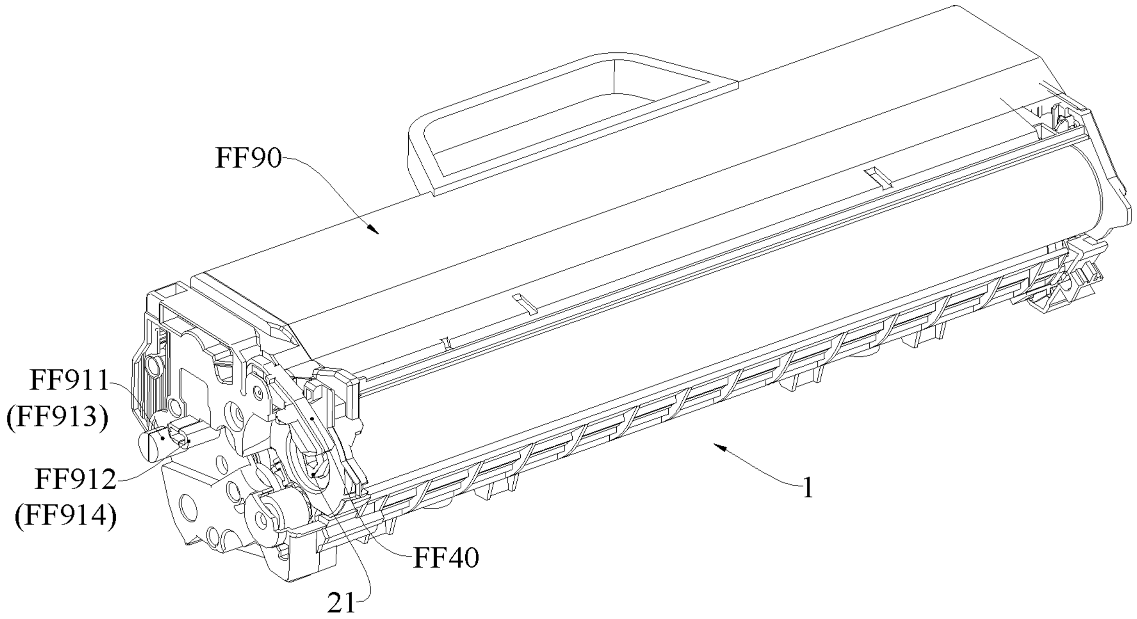

FIG. 174 illustrates a structural schematic of a pressing assembly and a process cartridge after cooperation according to embodiment thirty two of the present disclosure.

Figure 175:
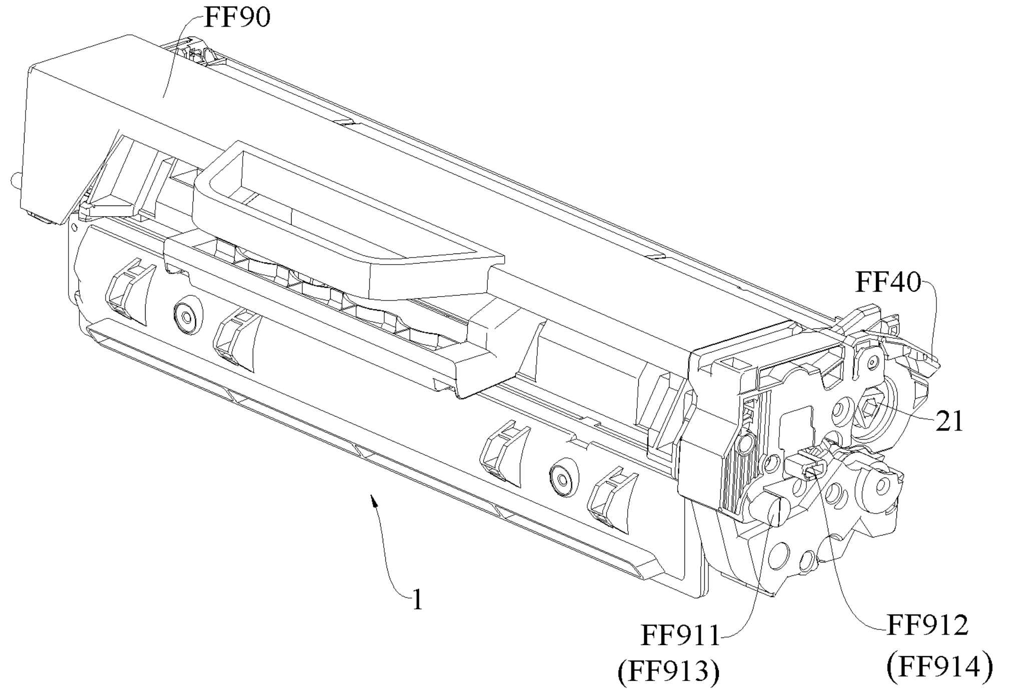

FIG. 175 illustrates a structural schematic of a pressing assembly and a process cartridge after cooperation viewed from another angle according to embodiment thirty two of the present disclosure.

Figure 176:
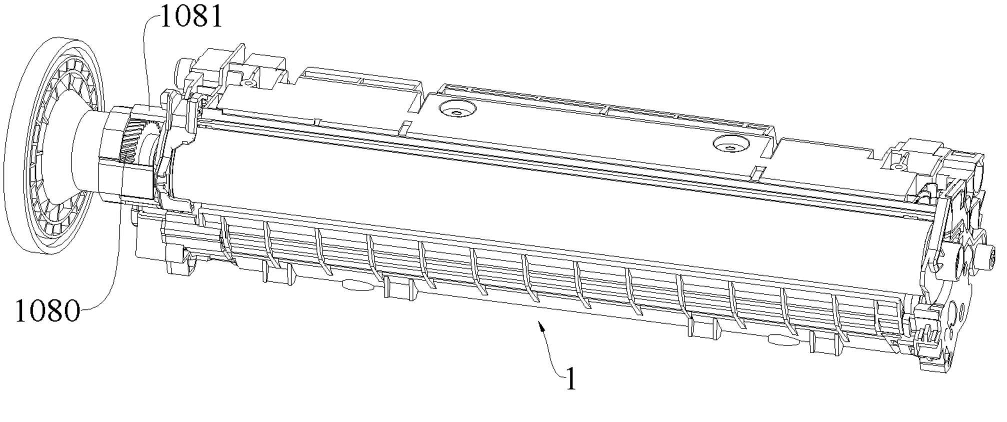

FIG. 176 illustrates a structural schematic before a process cartridge and a driving unit are assembled according to embodiment thirty two of the present disclosure.

Figure 177:
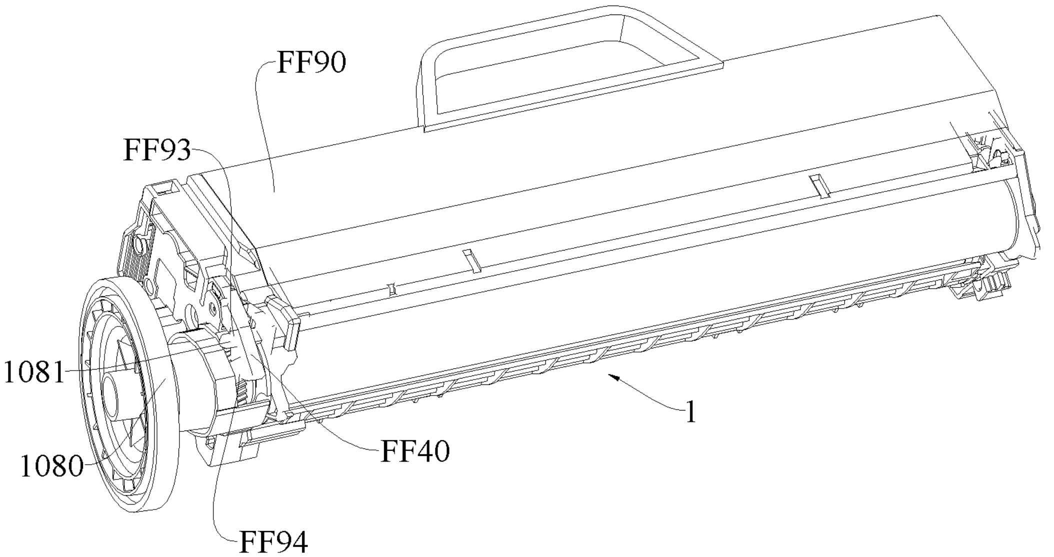

FIG. 177 illustrates a structural schematic after a process cartridge and a driving unit are assembled according to embodiment thirty two of the present disclosure.

Figure 178A:
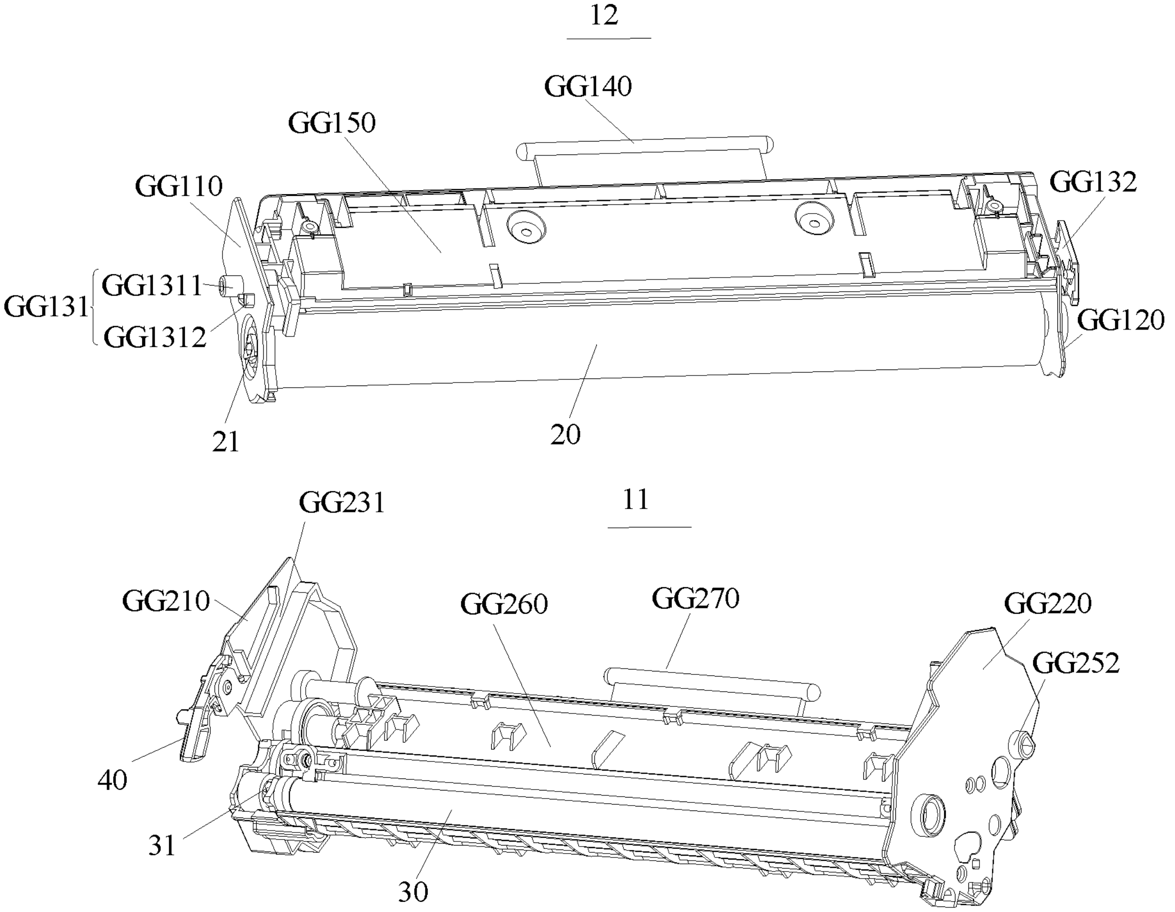

FIG. 178A illustrates a structural schematic of a process cartridge according to embodiment thirty three.

Figure 178B:
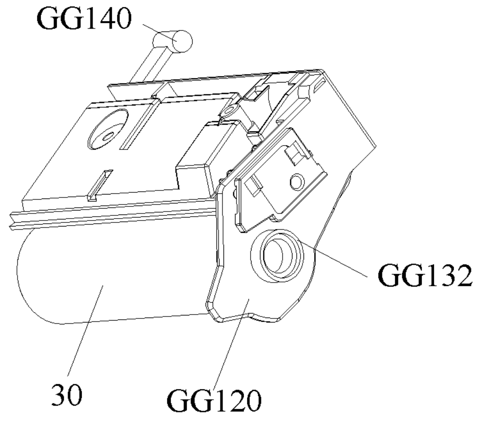

FIG. 178B illustrates a local structural schematic of a second side wall and a second installation portion of a waste toner cartridge in FIG. 178A.

Figure 179:
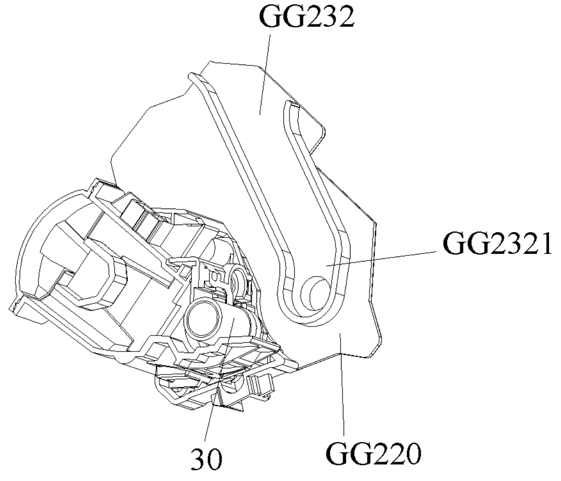

FIG. 179 illustrates a local structural schematic of a toner cartridge and a second installation slide of a guide unit in FIG. 177.

Figure 180:
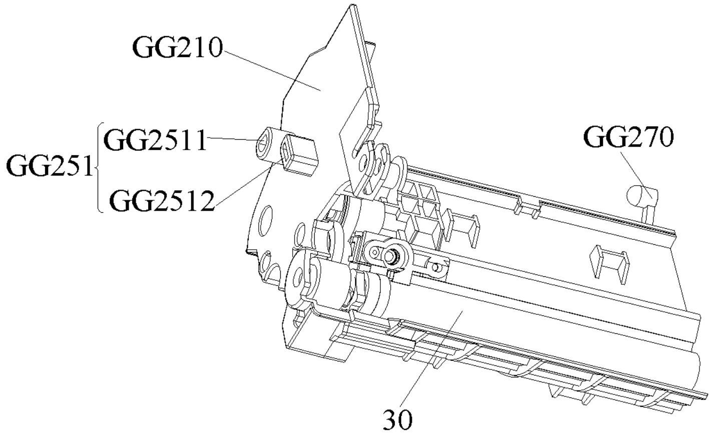

FIG. 180 illustrates a local structural schematic of a toner cartridge and a first positioning portion of a positioning unit in FIG. 177.

Figure 181:
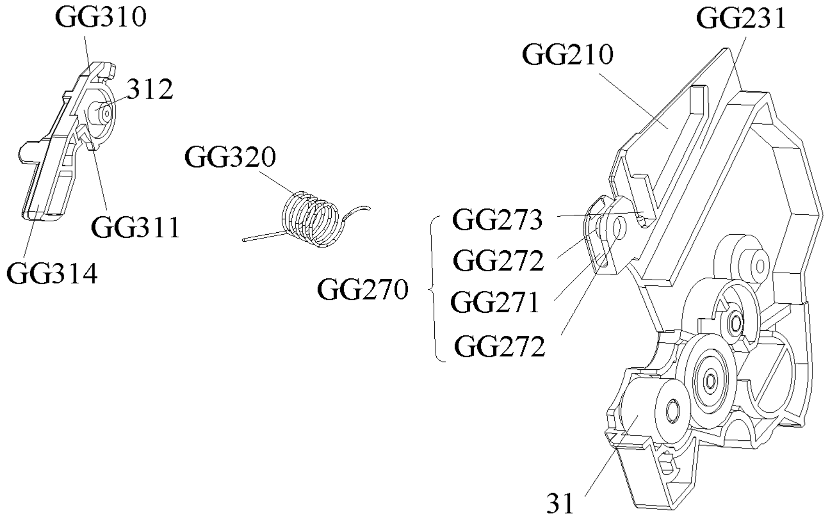

FIG. 181 illustrates a local exploded structural schematic of a pressing part and a second cartridge body wall in FIG. 177.

Figure 182:
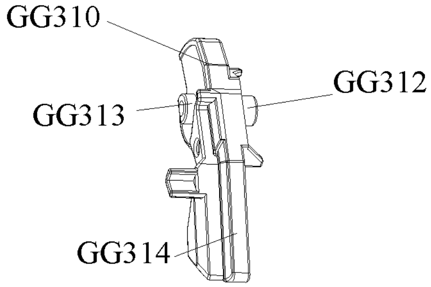

FIG. 182 illustrates a structural schematic of a movable part in FIG. 181.

Figure 183:
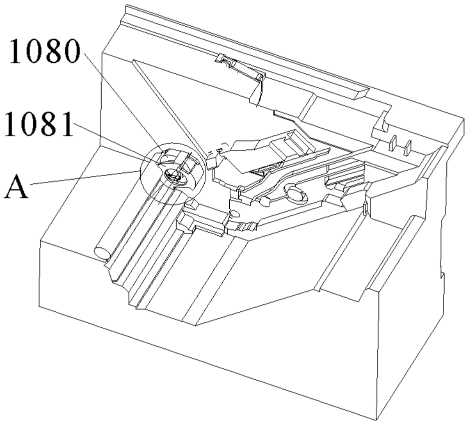

FIG. 183 illustrates a local structural schematic of a printer according to embodiment thirty three.

Figure 184:
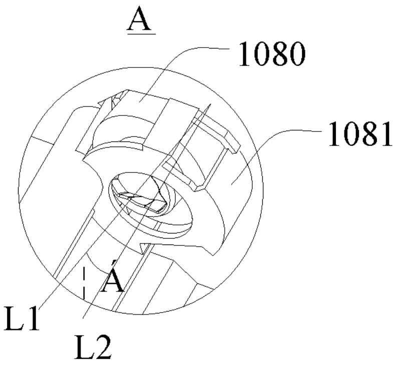

FIG. 184 illustrates a structural schematic of a printer driving head and a printer driving head protective cover (blocking wall) of a printer at an initial position in FIG. 183.

Figure 185:
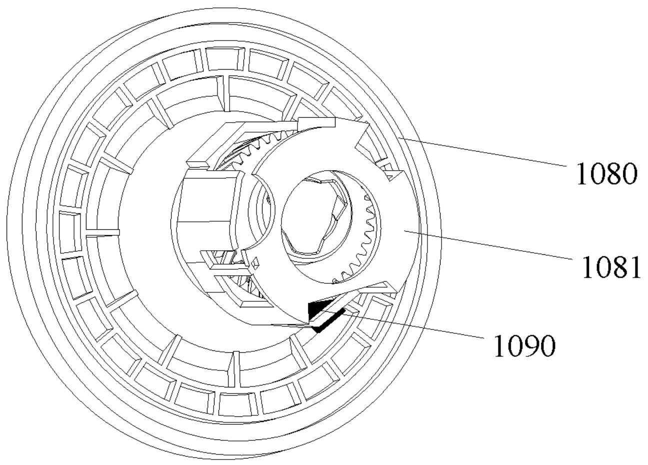

FIG. 185 illustrates an assembly structural schematic of a printer driving head, a printer driving head protective cover (blocking wall) and a printer driving head pushing part in a printer in FIG. 183.

Figure 186:
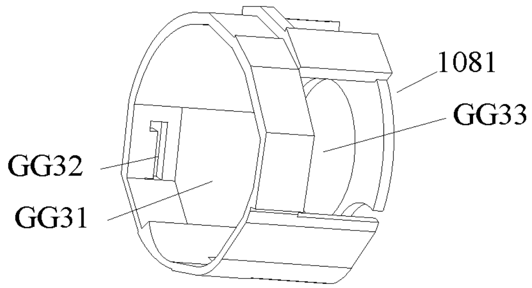

FIG. 186 illustrates a structural schematic of a printer driving head protective cover (blocking wall) in FIG. 185.

Figure 187:
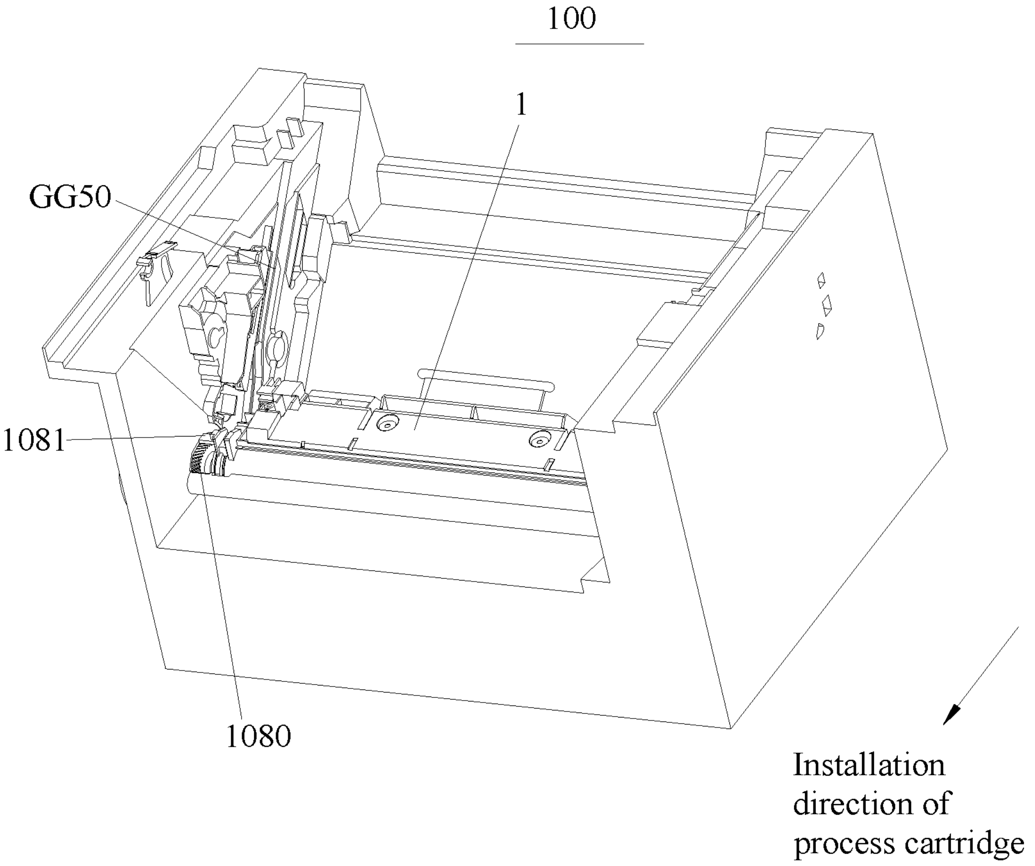

FIG. 187 illustrates a state schematic when installation of a process cartridge and a printer is completed according to embodiment thirty three.

Figure 188:
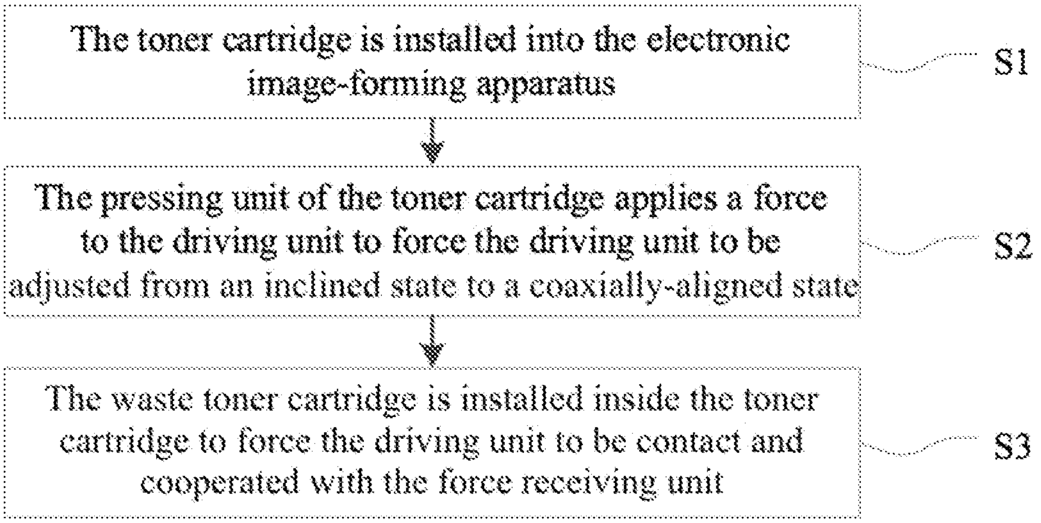

FIG. 188 illustrates a flow chart of a process cartridge installation method according to embodiment thirty three.

Figure 189:
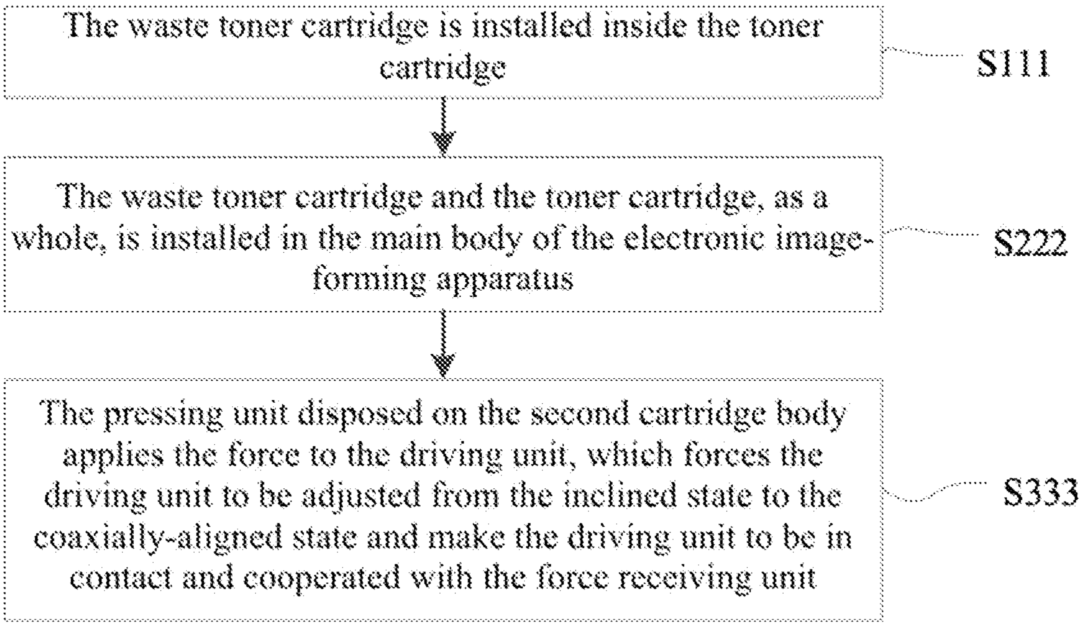

FIG. 189 illustrates a flow chart of another process cartridge installation method according to embodiment thirty four.

Figure 190:
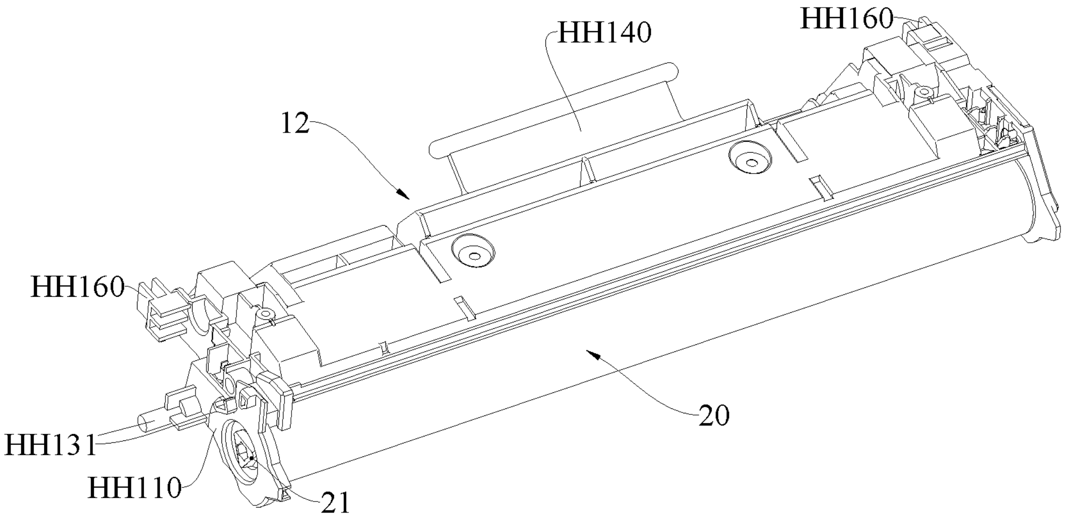

FIG. 190 illustrates a structural schematic of a waste toner cartridge of another process cartridge according to embodiment thirty five.

Figure 191:
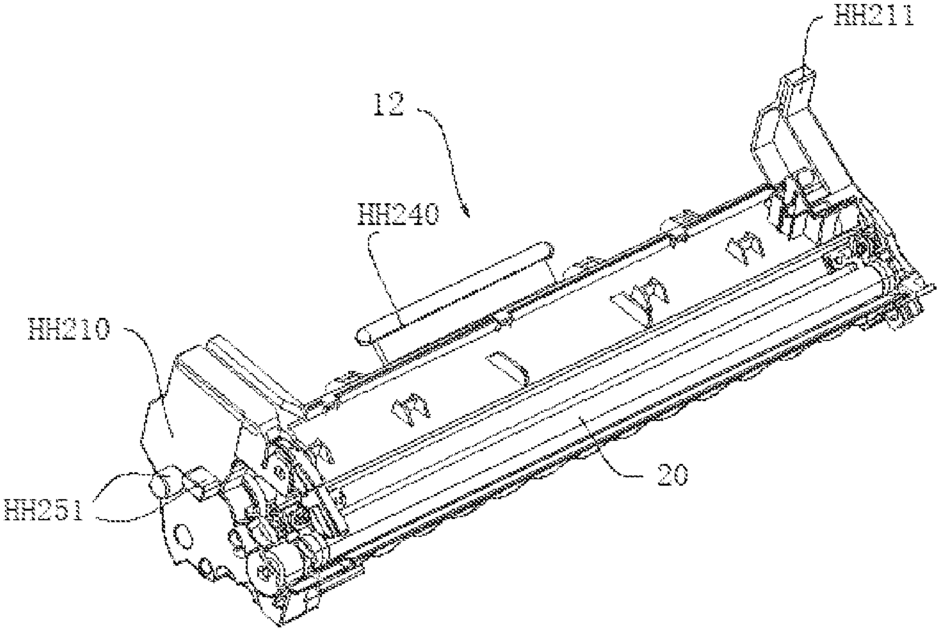

FIG. 191 illustrates a structural schematic of a toner cartridge of another process cartridge according to embodiment thirty five.

Figure 192:
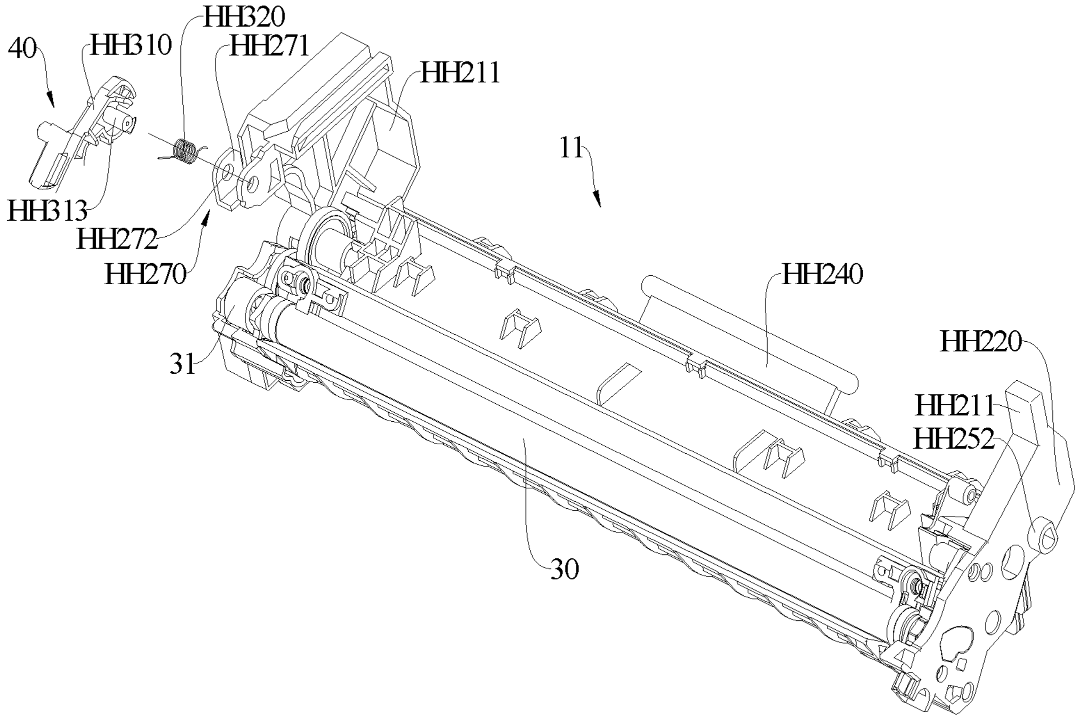

FIG. 192 illustrates a partial exploded structural schematic of a toner cartridge and a pressing part in FIG. 191.

Figure 193:
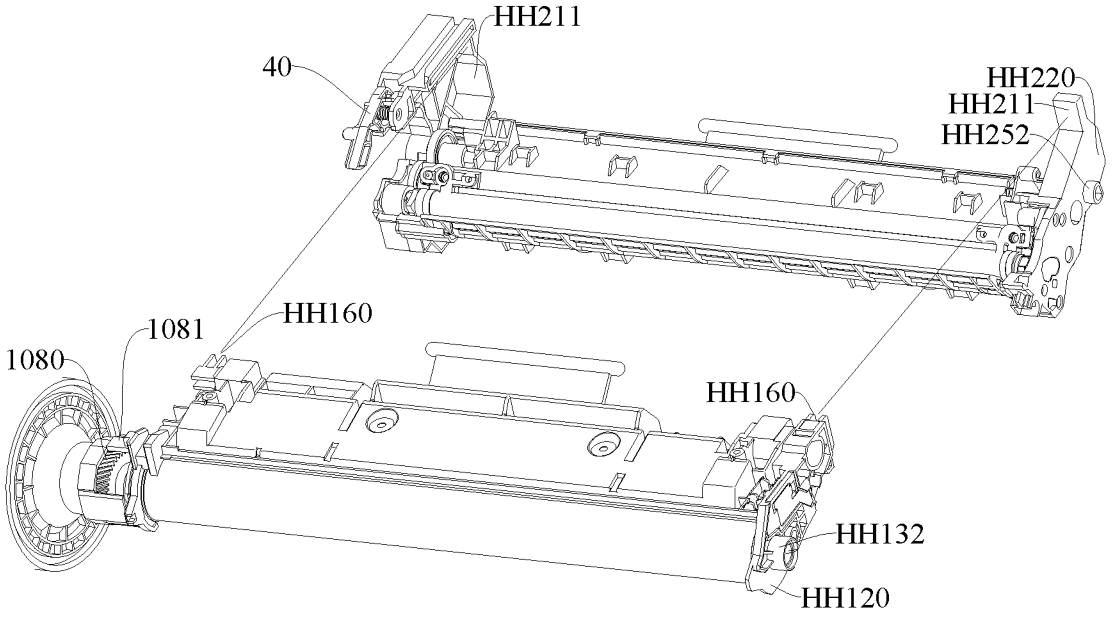

FIG. 193 illustrates a schematic of a process of assembling a waste toner cartridge with a printer driving head in a printer and then completing installation with a toner cartridge according to the thirty-fifth embodiment.

Figure 194:
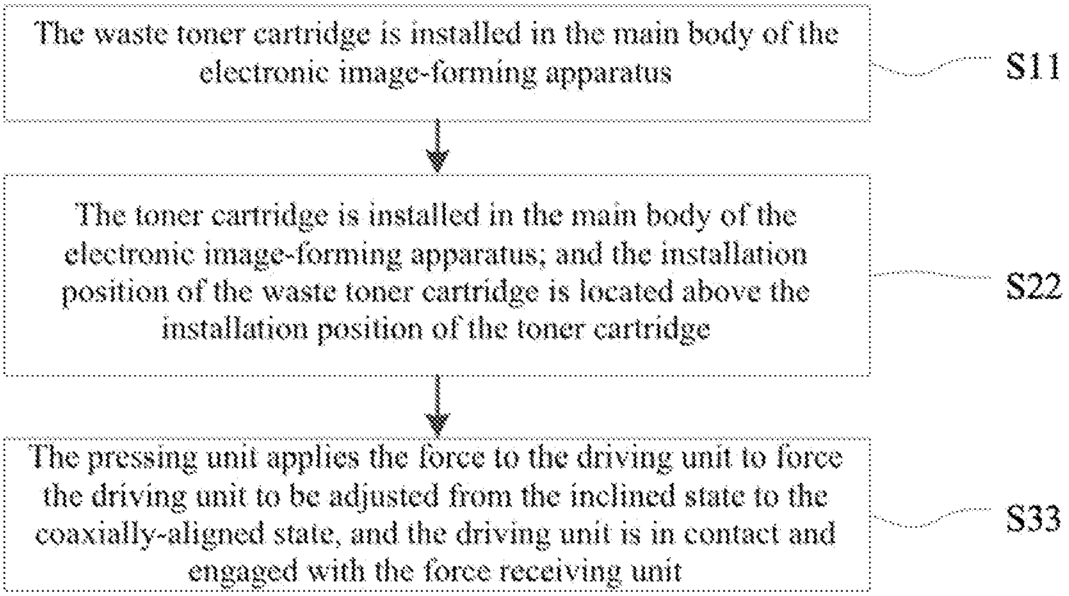

FIG. 194 illustrates another flow chart for installing a process cartridge according to embodiment thirty five.

Figure 195:
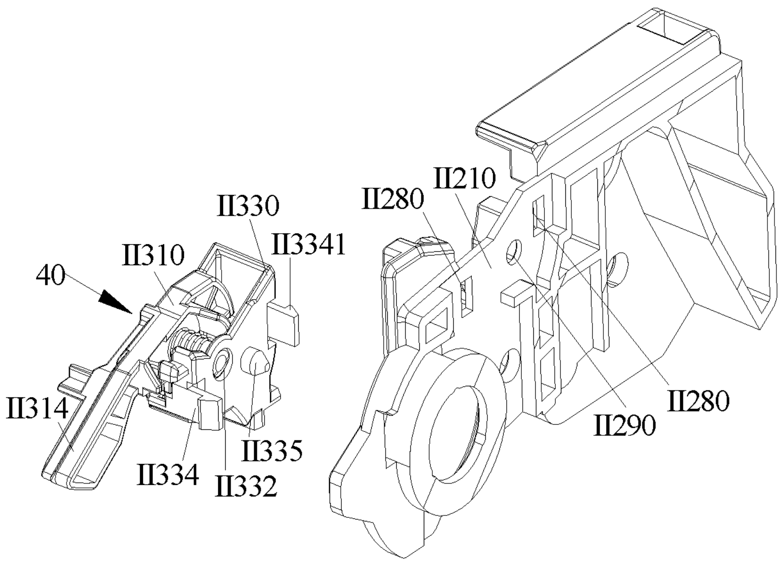

FIG. 195 illustrates a partial exploded structural schematic between a pressing part and a second cartridge body wall according to embodiment thirty six.

Figure 196:
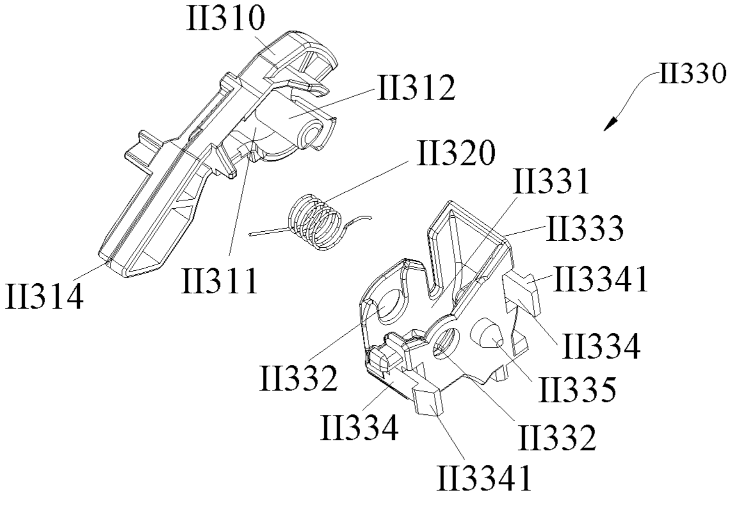

FIG. 196 illustrates an exploded structural schematic of a pressing part in FIG. 195.

Figure 197:
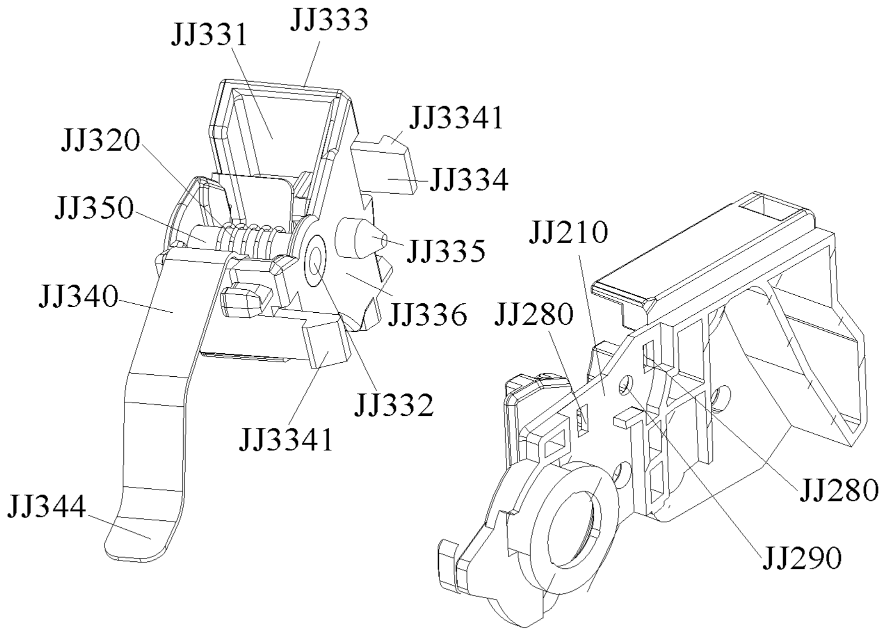

FIG. 197 illustrates a partial exploded structural schematic between a pressing part and a second cartridge body wall according to embodiment thirty seven.

Figure 198:
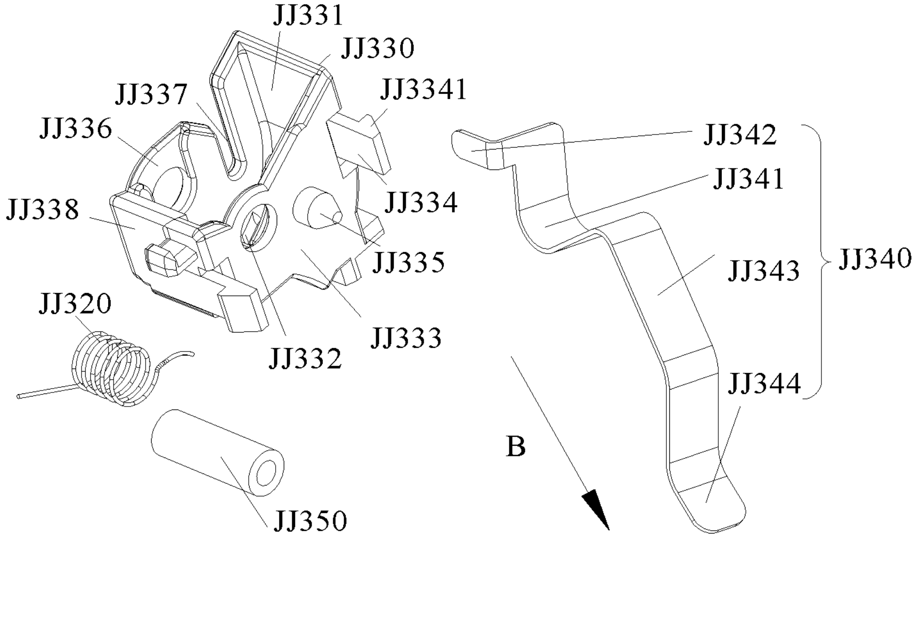

FIG. 198 illustrates an exploded structural schematic of a pressing unit in FIG. 197.

Figure 199:
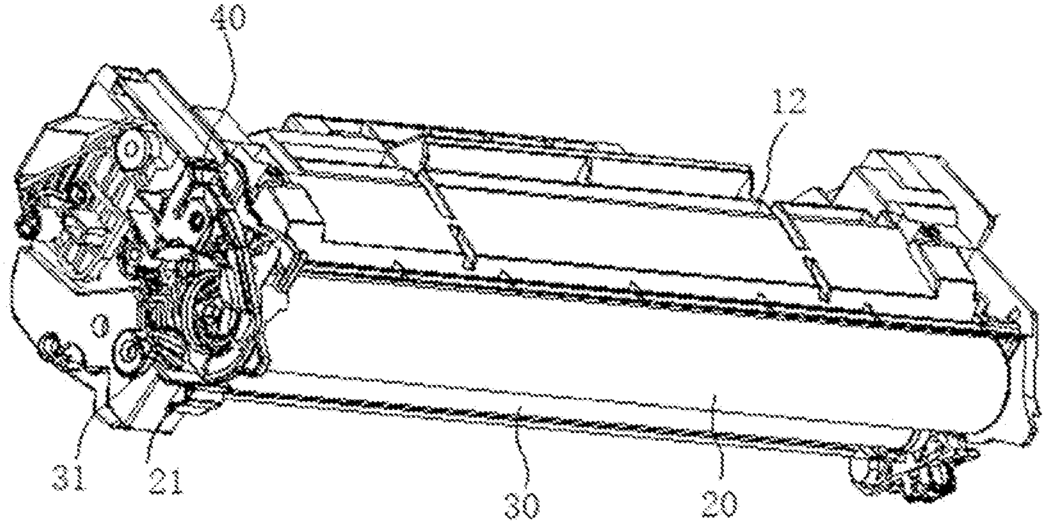

FIG. 199 illustrates a structural schematic when installation of a process cartridge and a pressing part is completed according to embodiment thirty eight.

Figure 200:
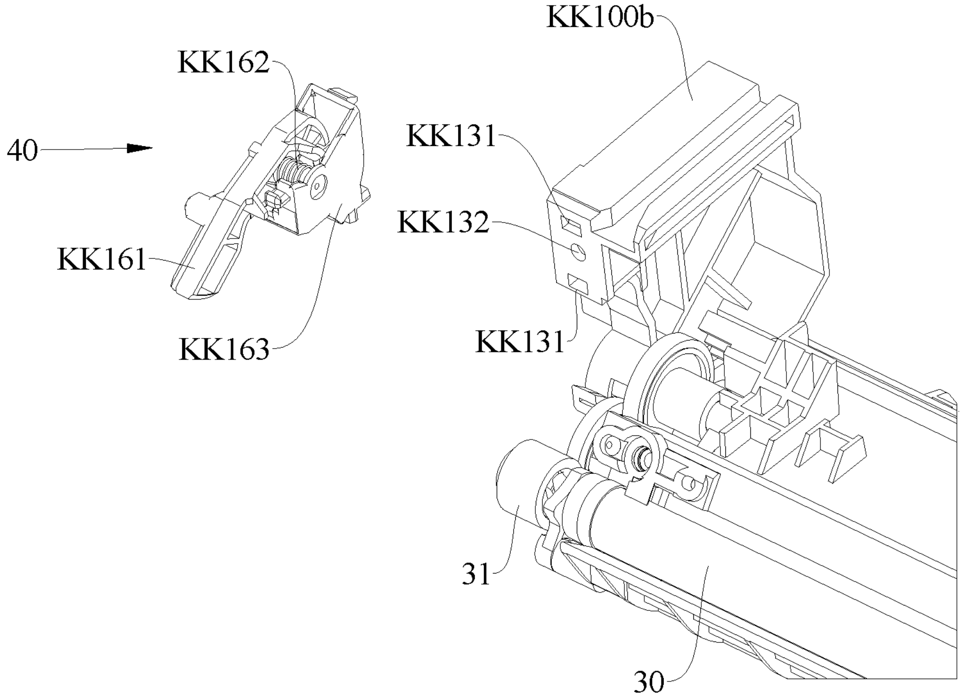

FIG. 200 illustrates a partial exploded structural schematic of a pressing part and a toner cartridge according to embodiment thirty eight.

Figure 201:
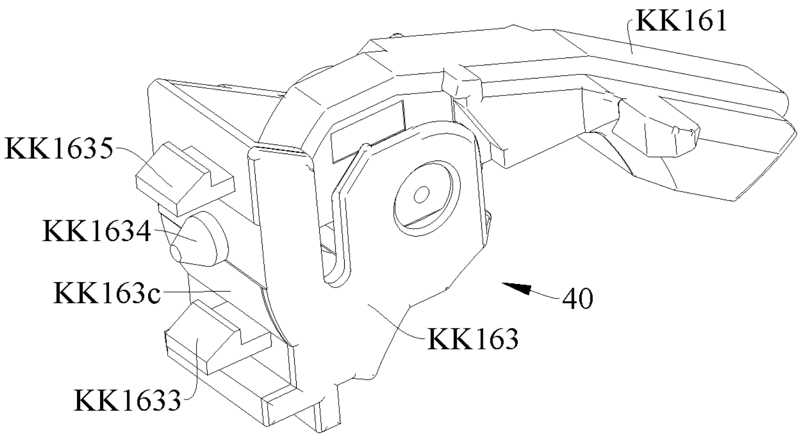

FIG. 201 illustrates a structural schematic of a pressing part in FIG. 200.

Figure 202:
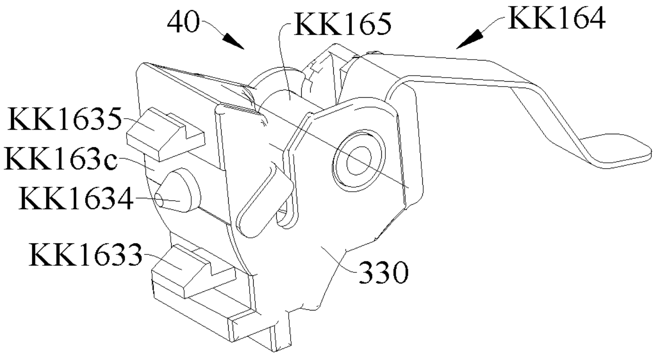

FIG. 202 illustrates a structural schematic of another pressing part according to embodiment thirty eight.

Figure 203A:
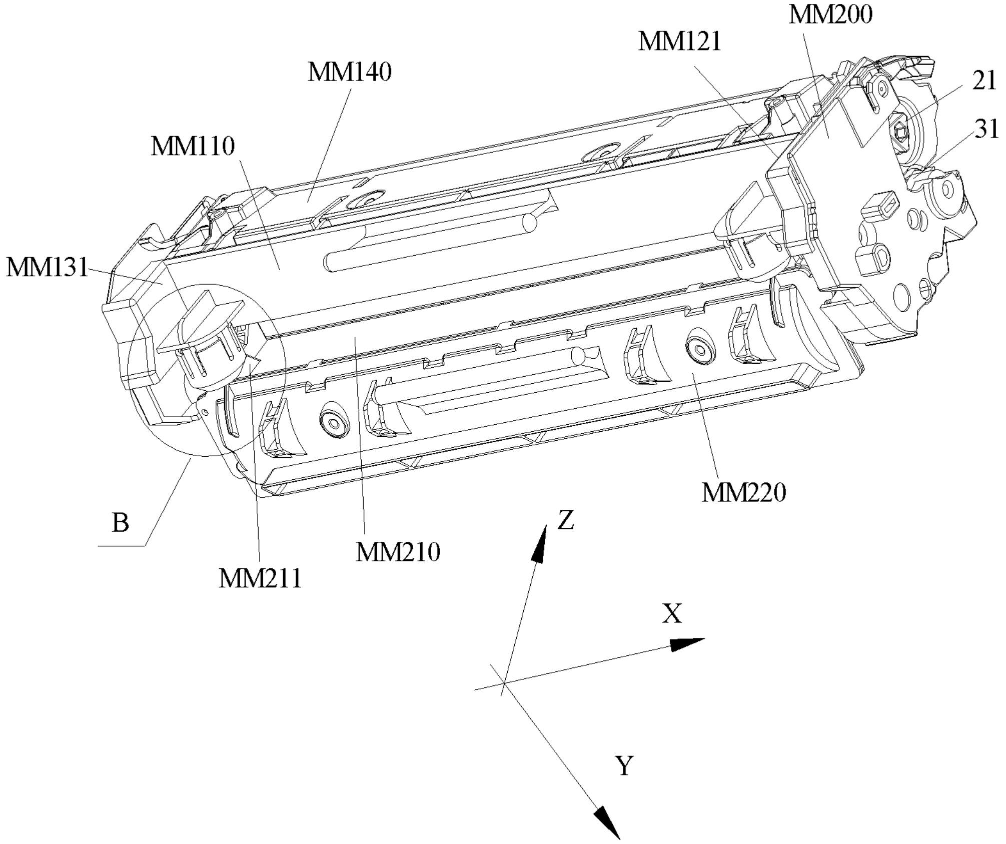
Figure 203B:
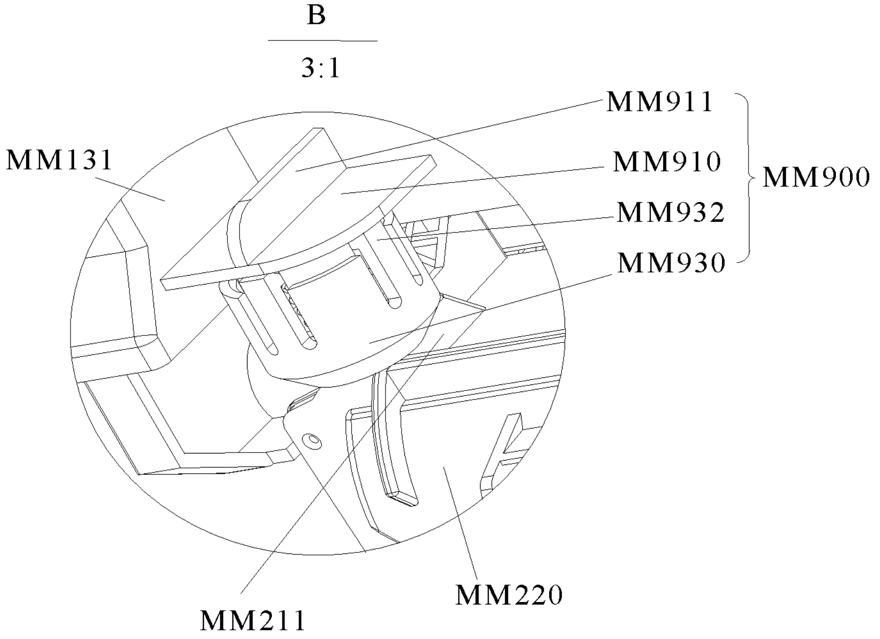

FIG. 203 illustrates a schematic of completed installation state of a waste toner cartridge and a toner cartridge body in a process cartridge structure, and a local enlarged schematic of a corresponding position on the waste toner cartridge according to embodiment forty.

Figure 204A:
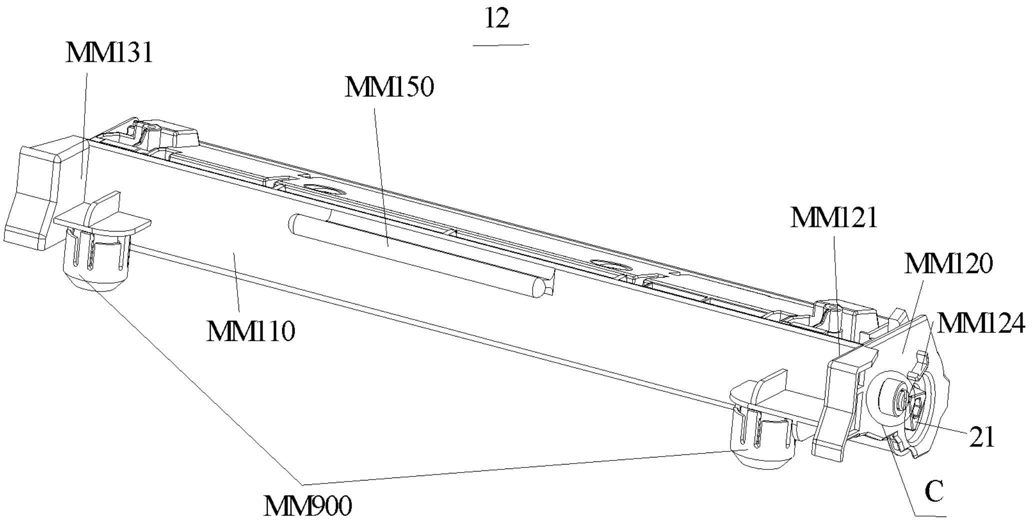
Figure 204B:
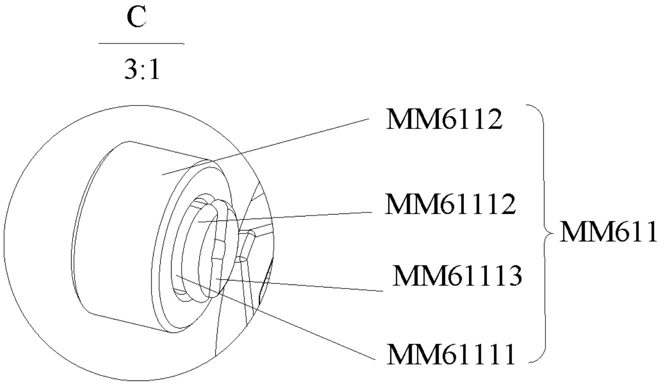

FIG. 204 illustrates a structural schematic of a partial exploded structure of a waste toner cartridge and a toner cartridge, and a local enlarged schematic of a corresponding position on the waste toner cartridge in FIG. 203.

Figure 205A:
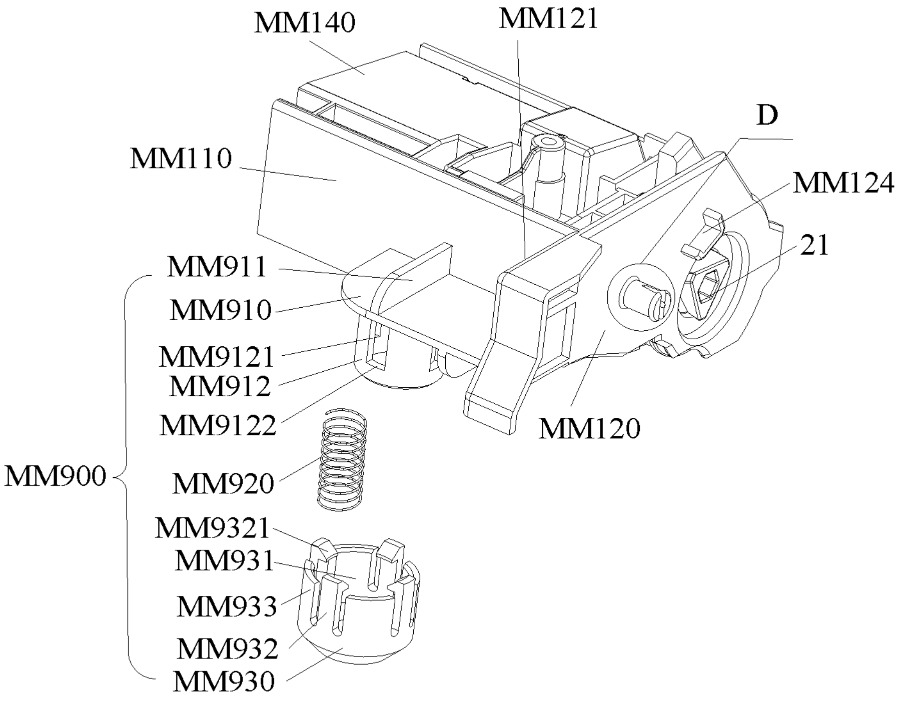
Figure 205B:
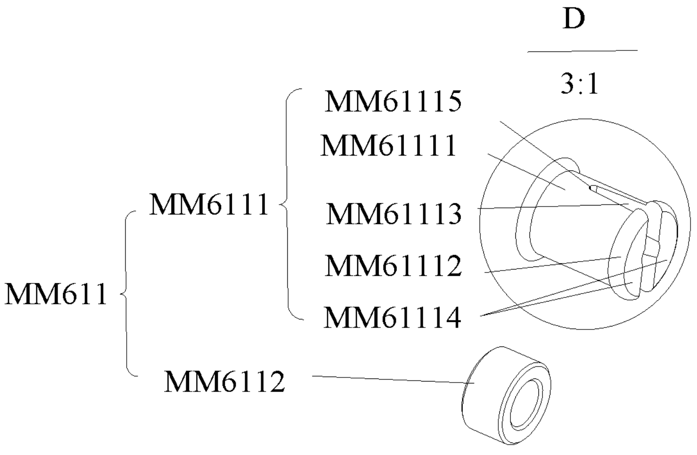

FIG. 205 illustrates a partial exploded schematic of a pushing unit and a first installation portion disposed on a waste toner cartridge, and a local enlarged schematic of a corresponding position of one first installation portion in FIG. 204.

Figure 206:
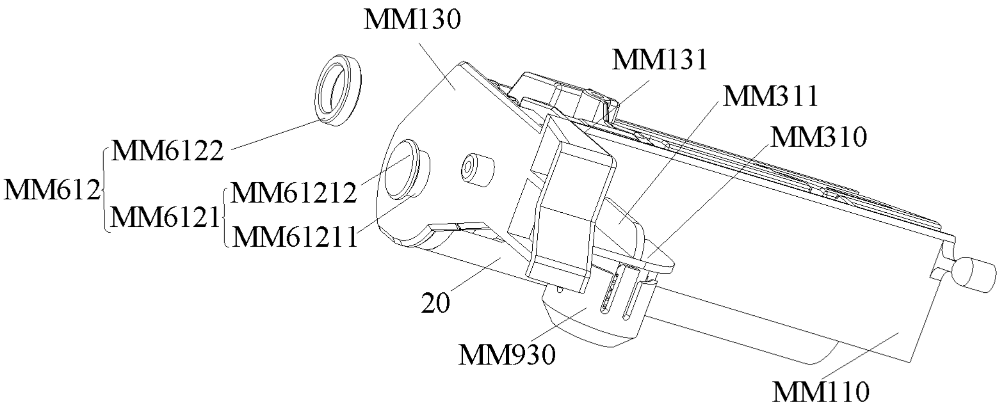

FIG. 206 illustrates a partial structural schematic of a waste toner cartridge and a partial exploded structural schematic of a second installation portion in FIG. 204.

Figure 207:
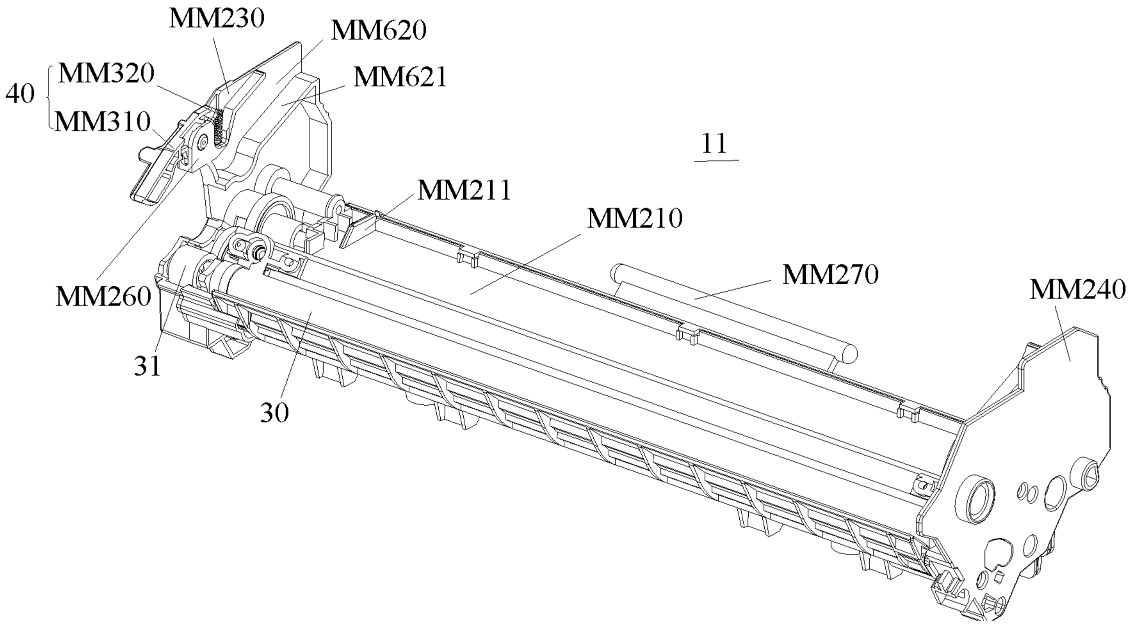

FIG. 207 illustrates a structural schematic of a toner cartridge and a pressing part in FIG. 203.

Figure 208:
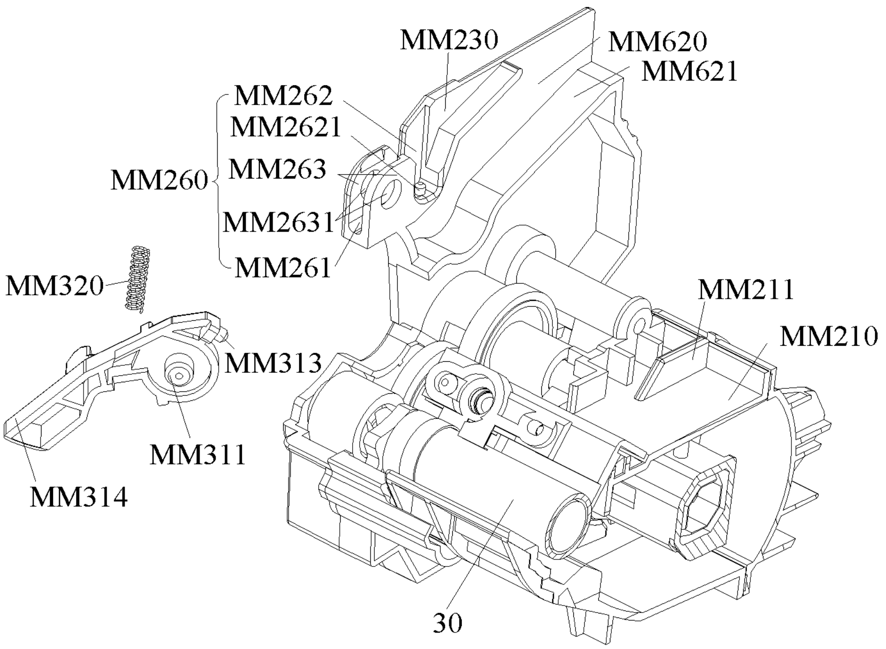

FIG. 208 illustrates an exploded structural schematic of a partial structure of a toner cartridge, a first installation slide and a pressing part in FIG. 207.

Figure 209:
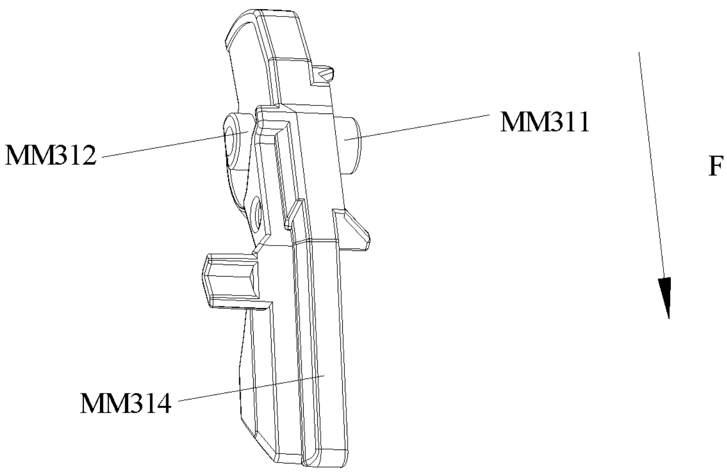

FIG. 209 illustrates a structural schematic of a movable part in FIG. 208.

Figure 210:
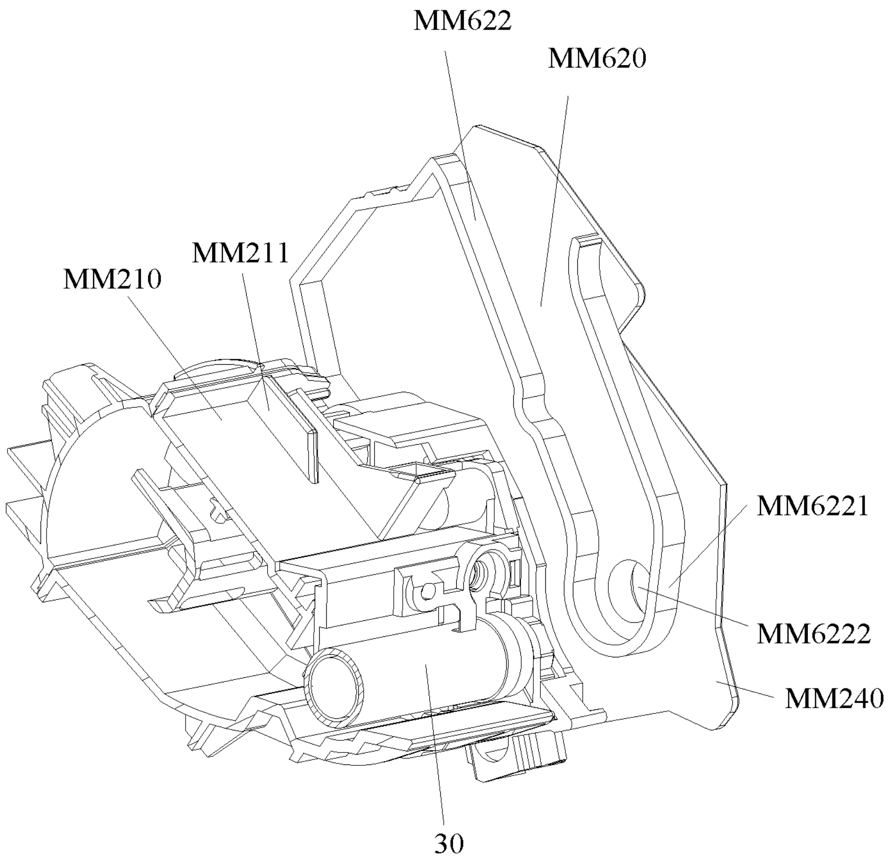

FIG. 210 illustrates a structural schematic of a partial structure of a toner cartridge and a second installation slide in FIG. 207.

Figure 211:
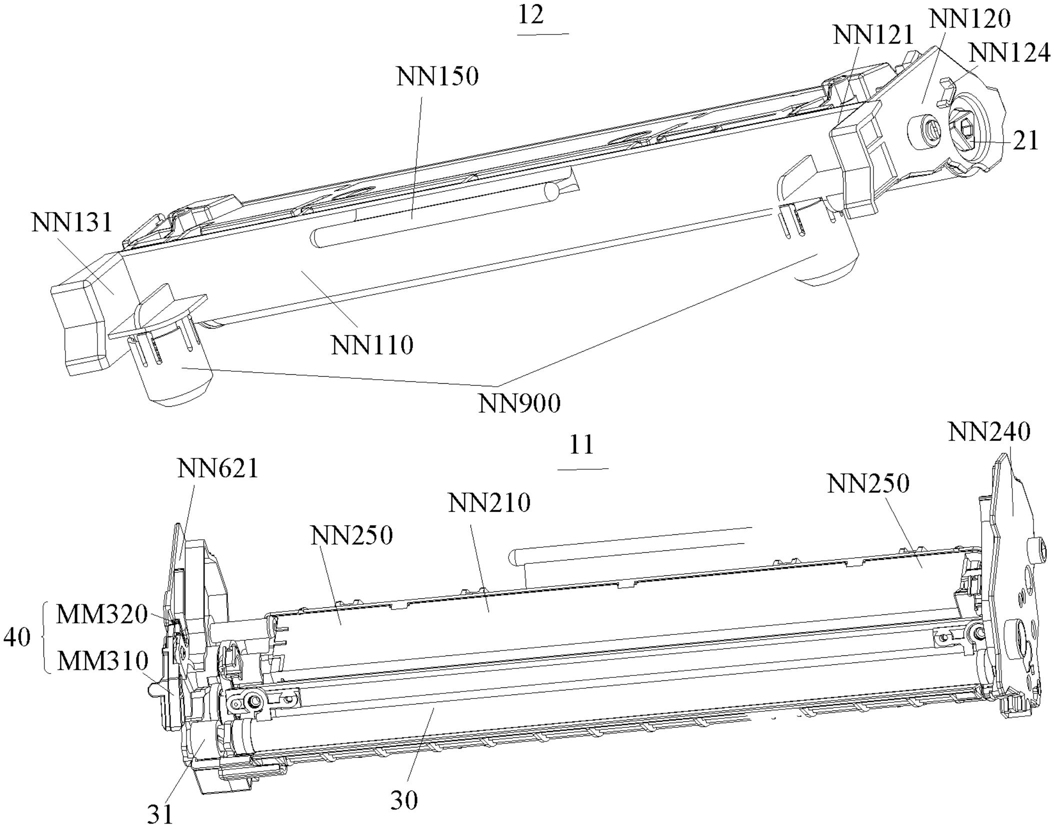

FIG. 211 illustrates a partial exploded structural schematic of a waste toner cartridge and a toner cartridge in a process cartridge according to embodiment forty one.

Figure 212A:
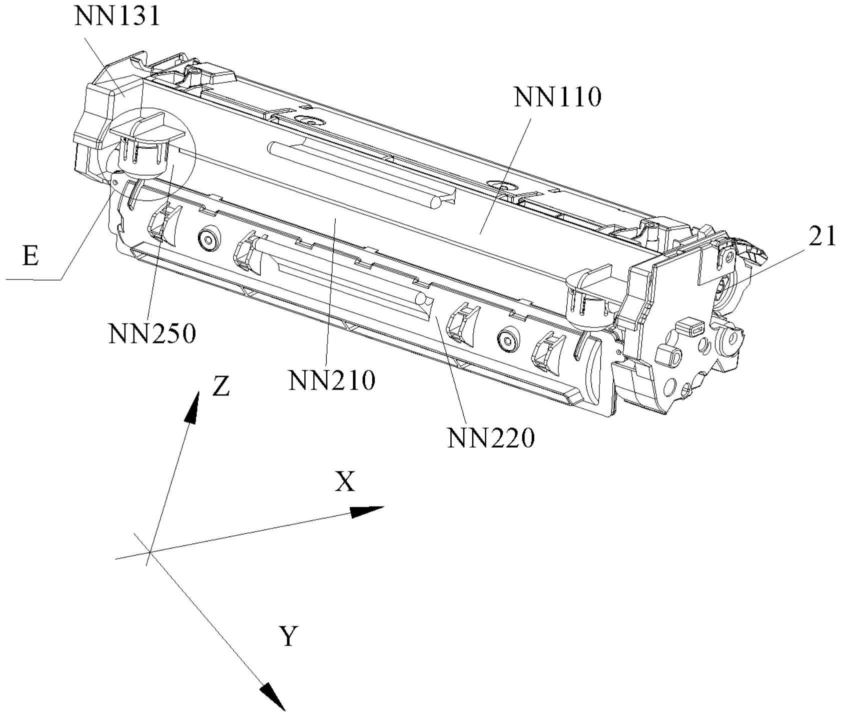
Figure 212B:
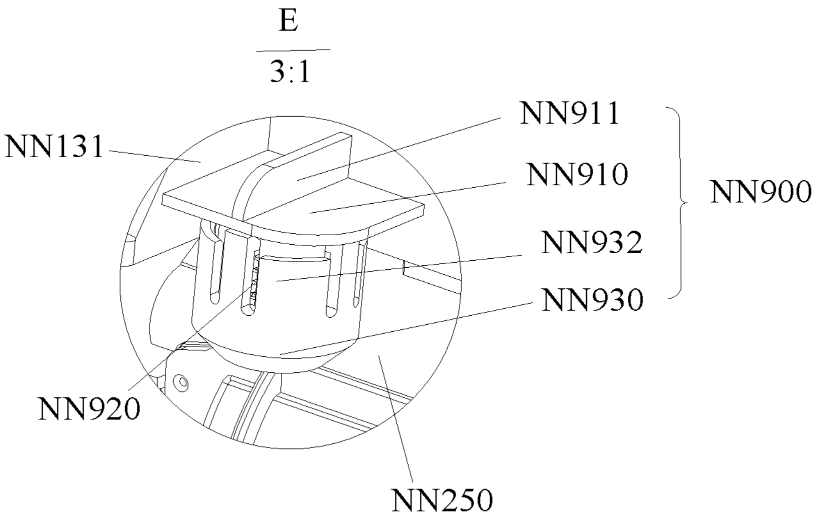

FIG. 212 illustrates a schematic of completed installation state of a waste toner cartridge and a toner cartridge body in a process cartridge structure, and a local enlarged schematic of a corresponding position on the waste toner cartridge in FIG. 201.

Figure 213A:
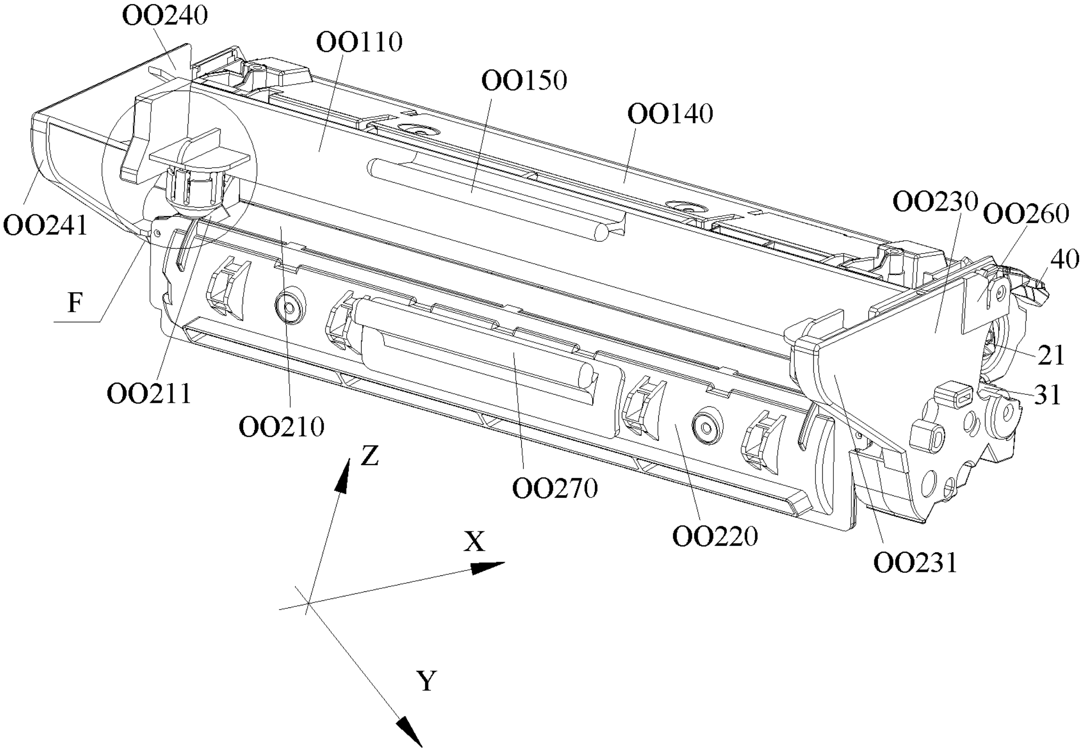
Figure 213B:
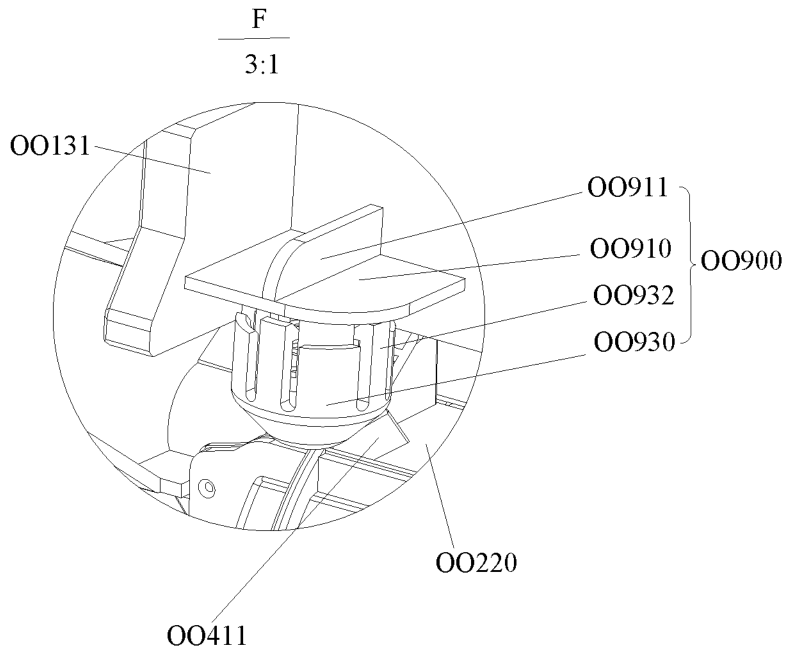

FIG. 213 illustrates a schematic of completed installation state of a waste toner cartridge and a toner cartridge body in a process cartridge structure, and a local enlarged schematic of a corresponding position on the waste toner cartridge according to embodiment forty two.

Figure 214A:
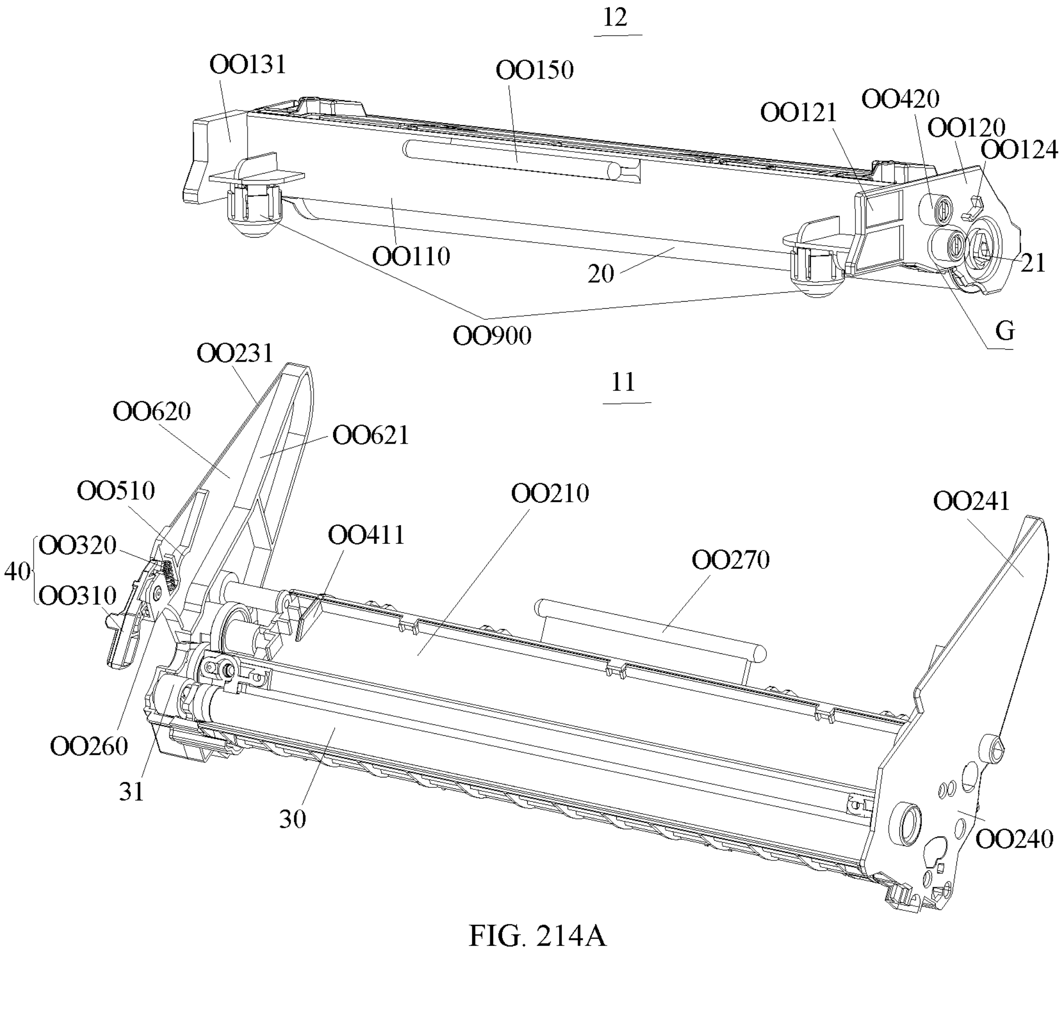
Figure 214B:
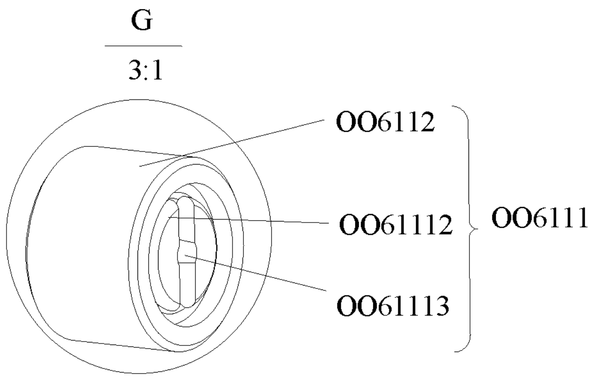

FIG. 214 illustrates an exploded structural schematic of a waste toner cartridge and a toner cartridge and a local enlarged schematic of a corresponding position in FIG. 213.

Figure 215A:
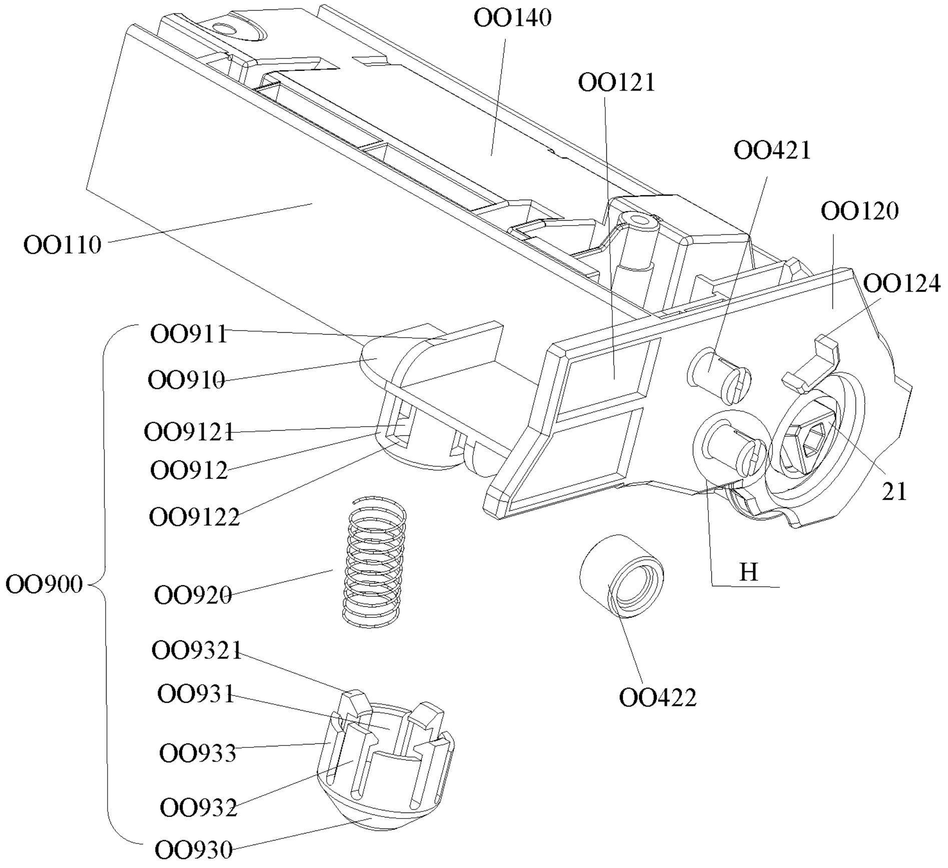
Figure 215B:
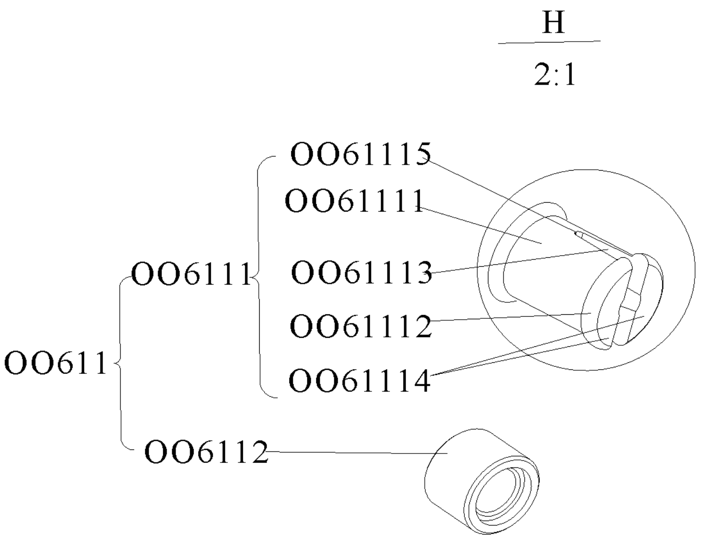

FIG. 215 illustrates an exploded structural schematic of a pushing unit, a second pushing-acting portion, and a first installation portion, and a local enlarged schematic of a corresponding position of the first installation portion in FIG. 214.

Figure 216:
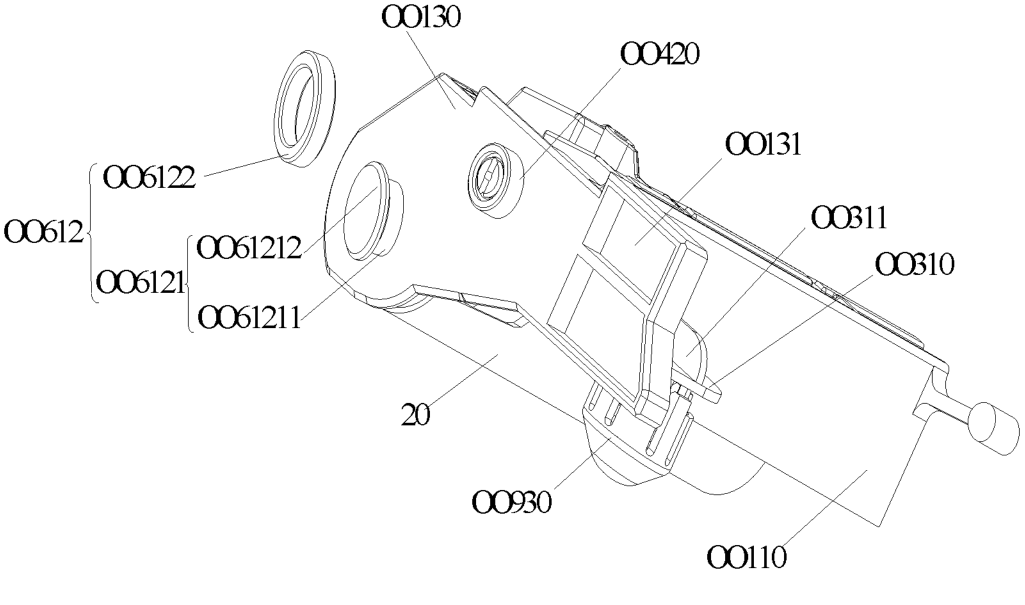

FIG. 216 illustrates a structural schematic of a second pushing-acting portion and a partial exploded structural schematic of a second installation portion in FIG. 214.

Figure 217A:
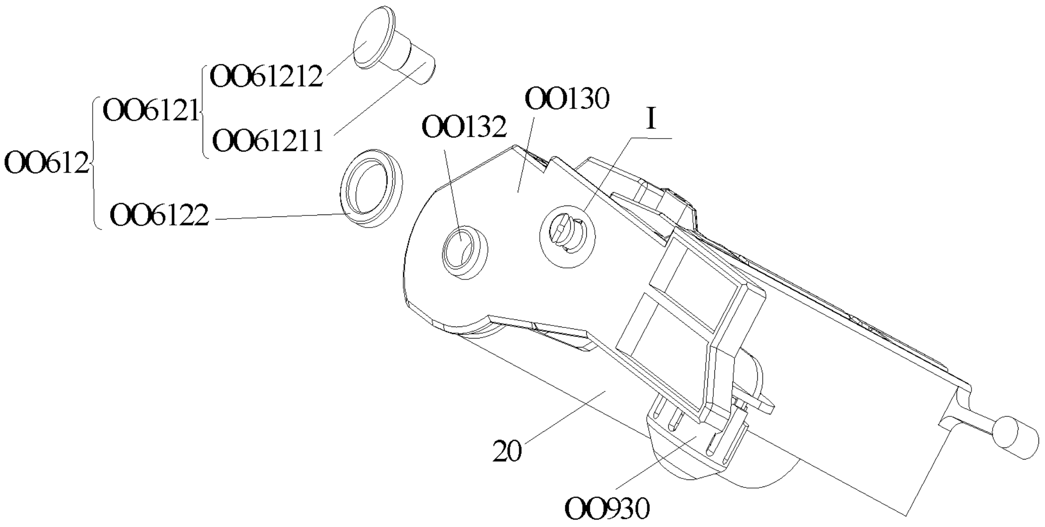
Figure 217B:
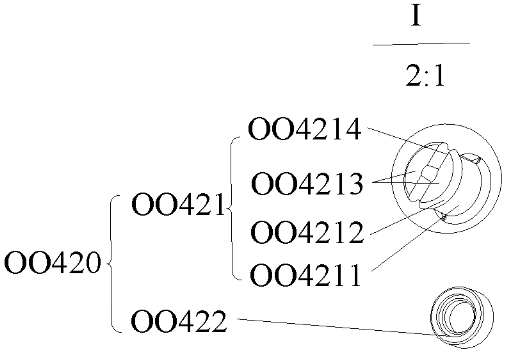

FIG. 217 illustrates an exploded structural schematic of a second pushing-acting portion and a second installation portion in FIG. 216.

Figure 218:
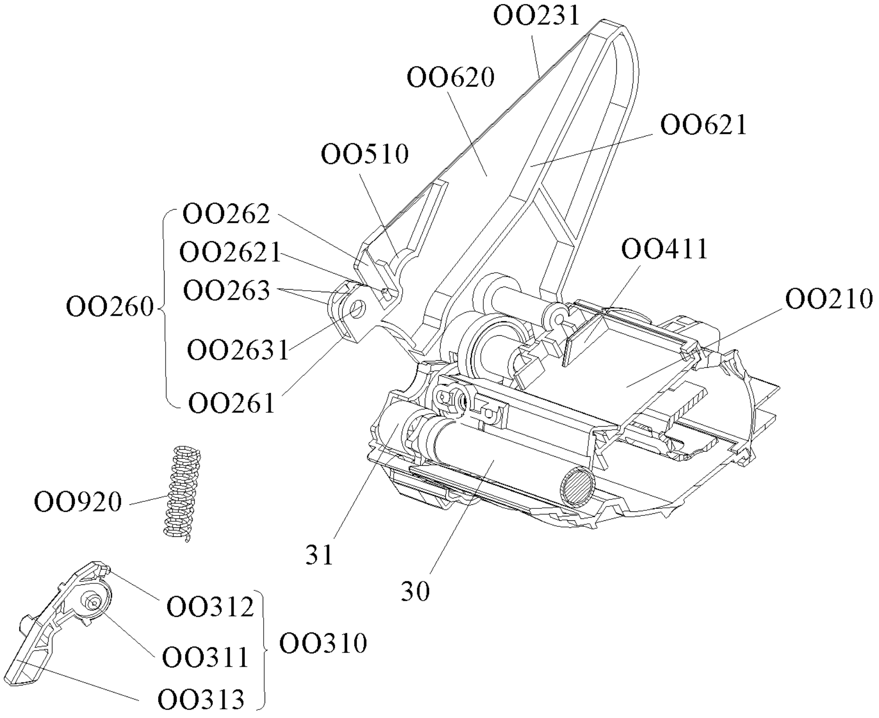

FIG. 218 illustrates an exploded structural schematic of a toner cartridge, a second installation unit structure, a cooperating portion and a pressing unit in FIG. 214.

Figure 219:
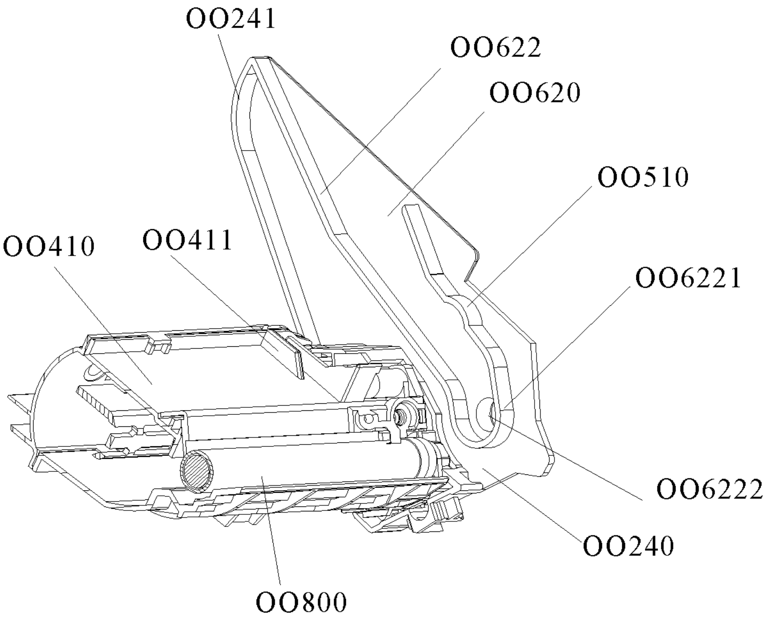

FIG. 219 illustrates a structural schematic of a toner cartridge, a second installation unit and a cooperating portion in FIG. 214.

Figure 220:
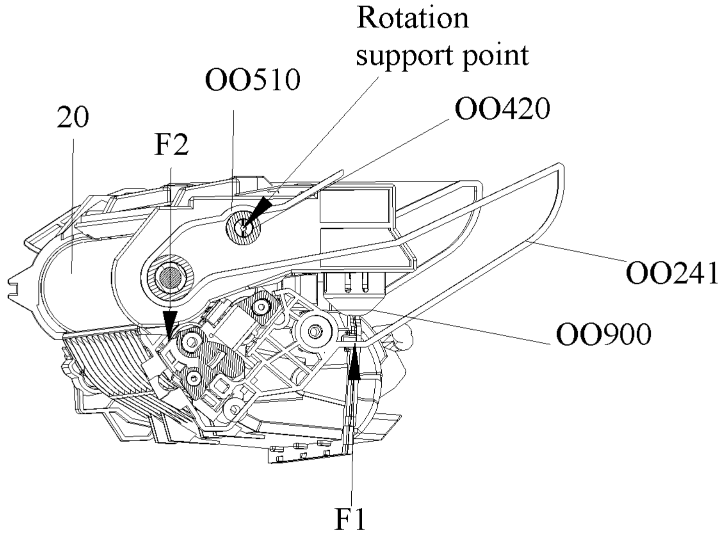

FIG. 220 illustrates a first schematic of contact state between a photosensitive drum and a developing roller under installation state of a waste toner cartridge and a toner cartridge according to embodiment forty two.

Figure 221:
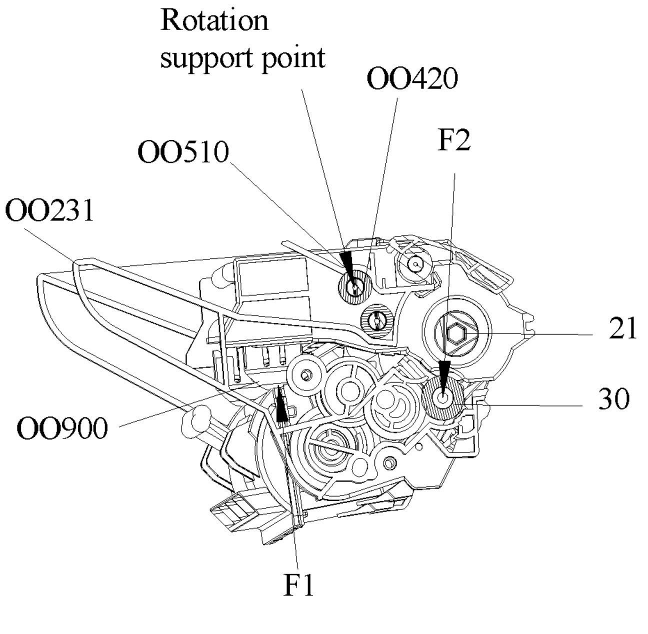

FIG. 221 illustrates a second schematic of contact state between a photosensitive drum and a developing roller under installation state of a waste toner cartridge and a toner cartridge according to embodiment forty two.

Figure 222:
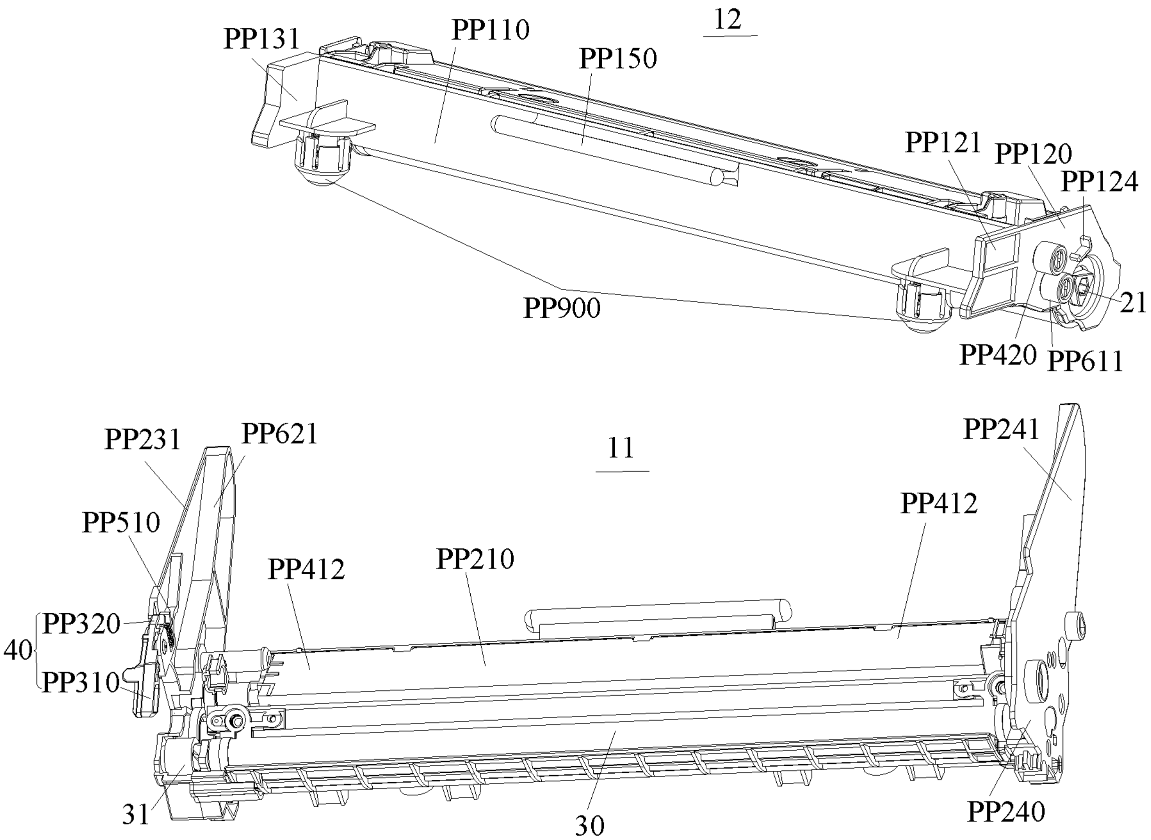

FIG. 222 illustrates a schematic of completed installation state of a waste toner cartridge and a toner cartridge body in a process cartridge structure, and a local enlarged schematic of a corresponding position according to embodiment forty three.

Figure 223A:
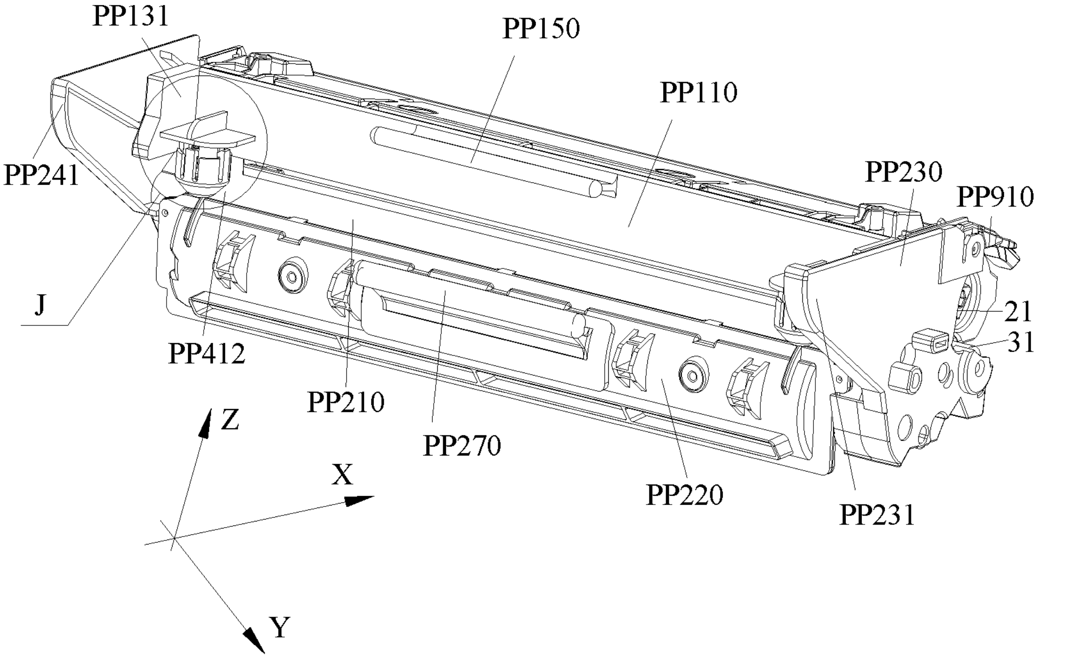
Figure 223B:
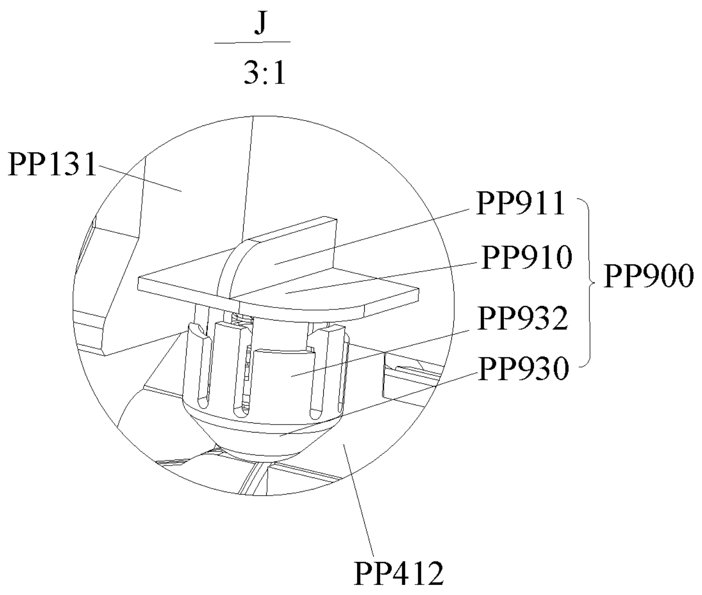

FIG. 223 illustrates a schematic of completed installation state of a waste toner cartridge and a toner cartridge body in a process cartridge structure, and a local enlarged schematic of a corresponding position on the waste toner cartridge in FIG. 222.

Figure 224:
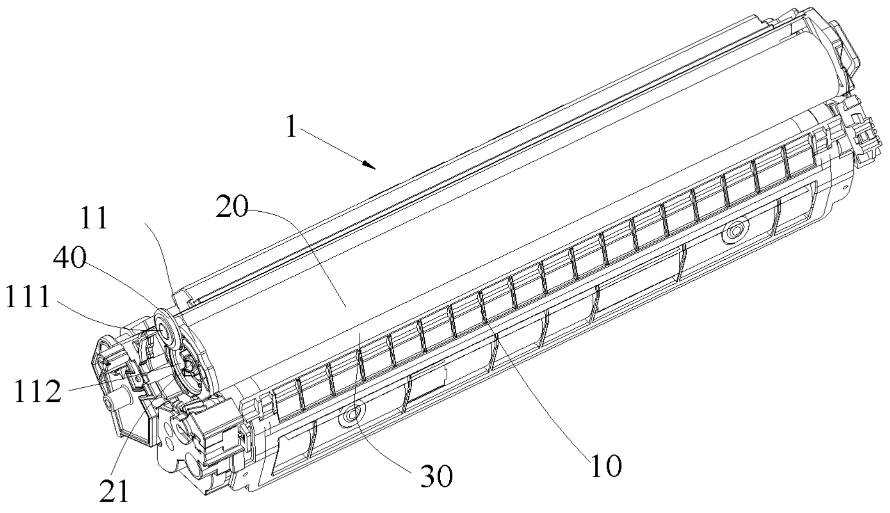

FIG. 224 illustrates a structural schematic of a process cartridge according to embodiment forty four of the present disclosure.

Figure 225:
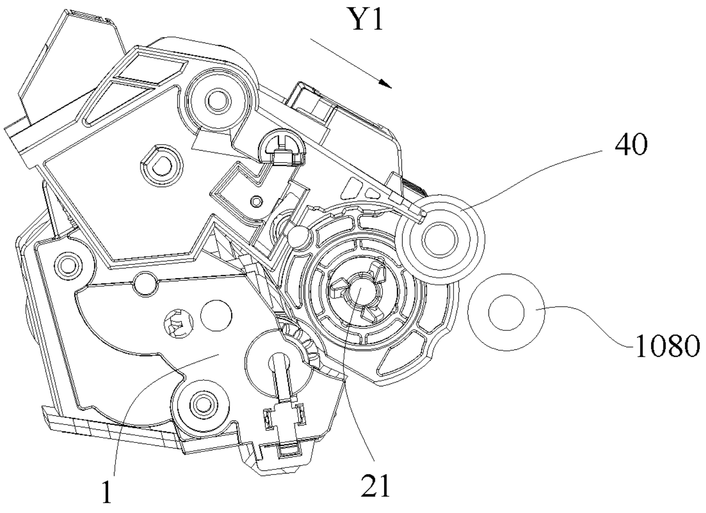
Figure 226:
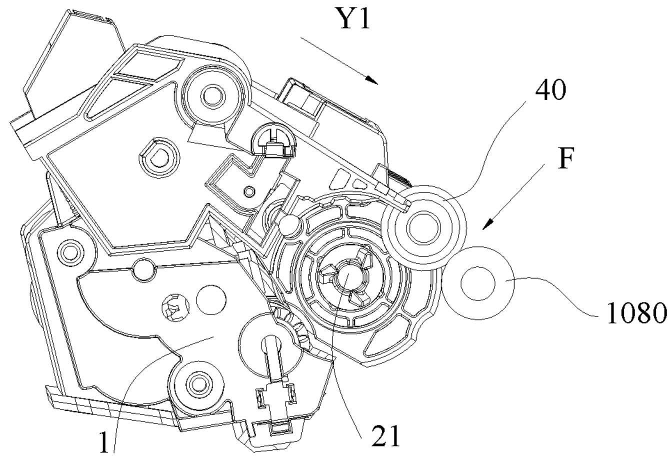
Figure 227:
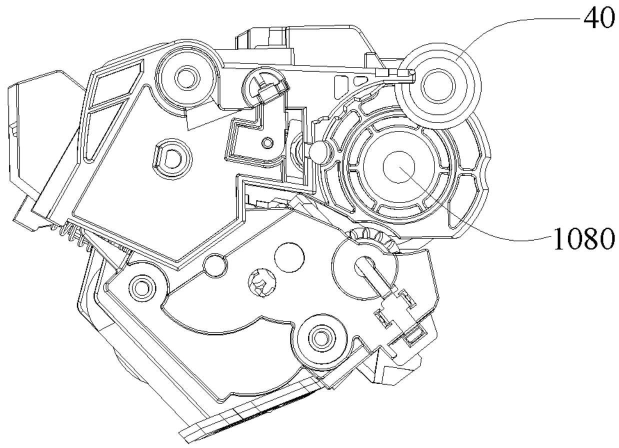
Figure 244:
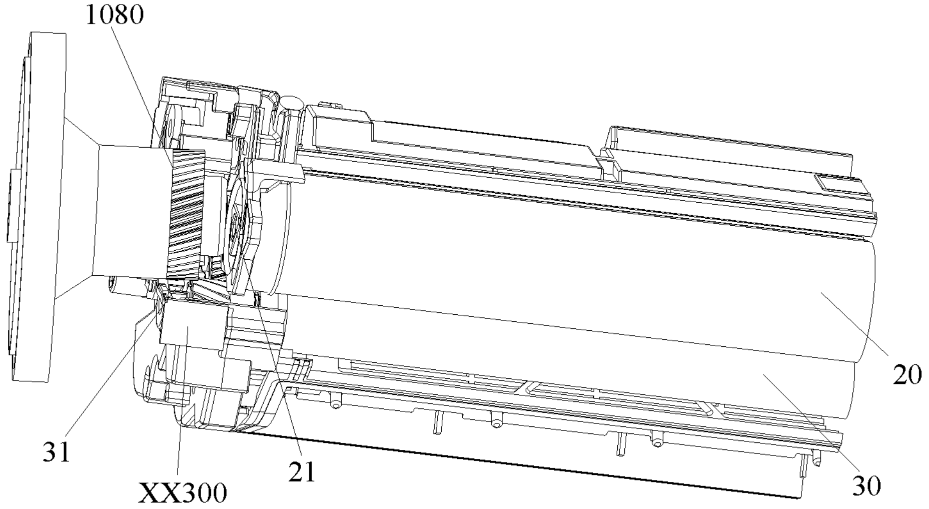

FIGS. 225-227 illustrate structural schematics of a contact and mess process of a force receiving unit and a driving unit of a process cartridge in FIG. 244.

Figure 228:
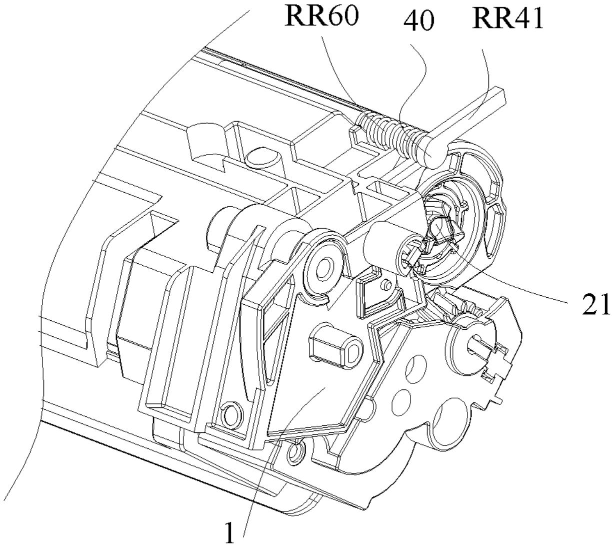
Figure 229:
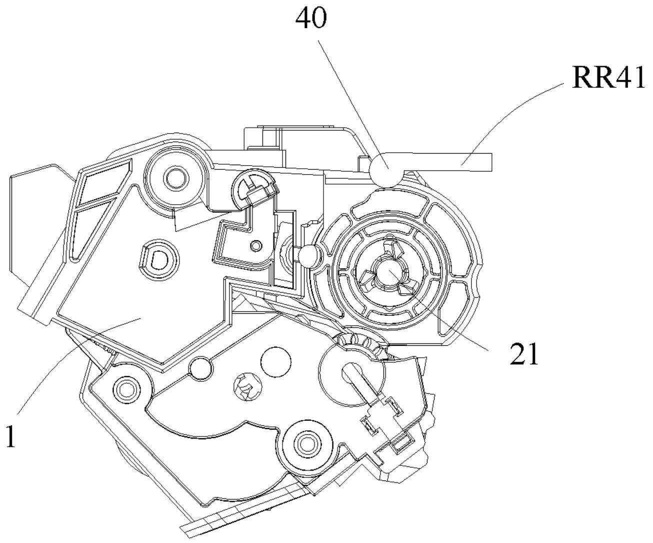

FIGS. 228-229 illustrate structural schematics of a process cartridge according to embodiment forty five of the present disclosure.

Figure 230:
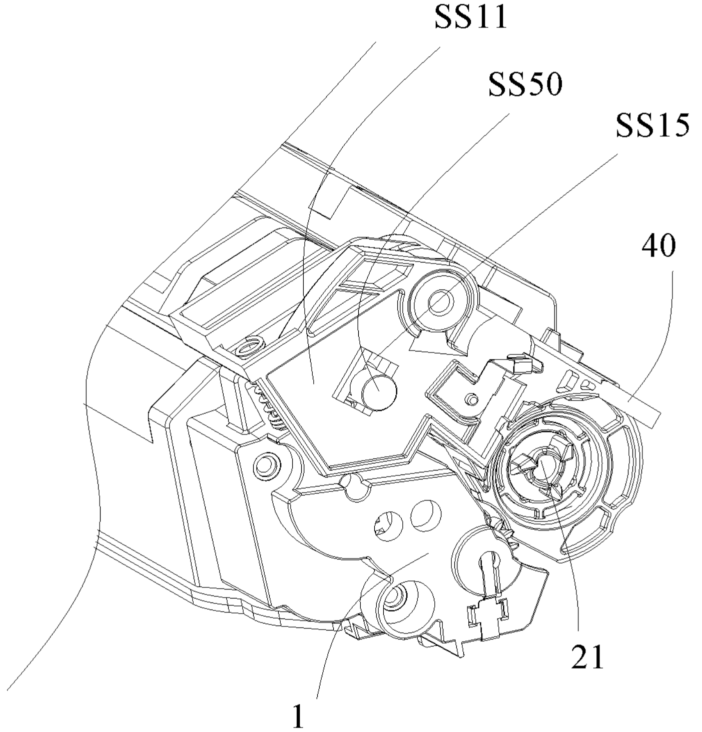

FIG. 230 illustrates a structural schematic of a process cartridge according to embodiment forty six of the present disclosure.

Figure 231:
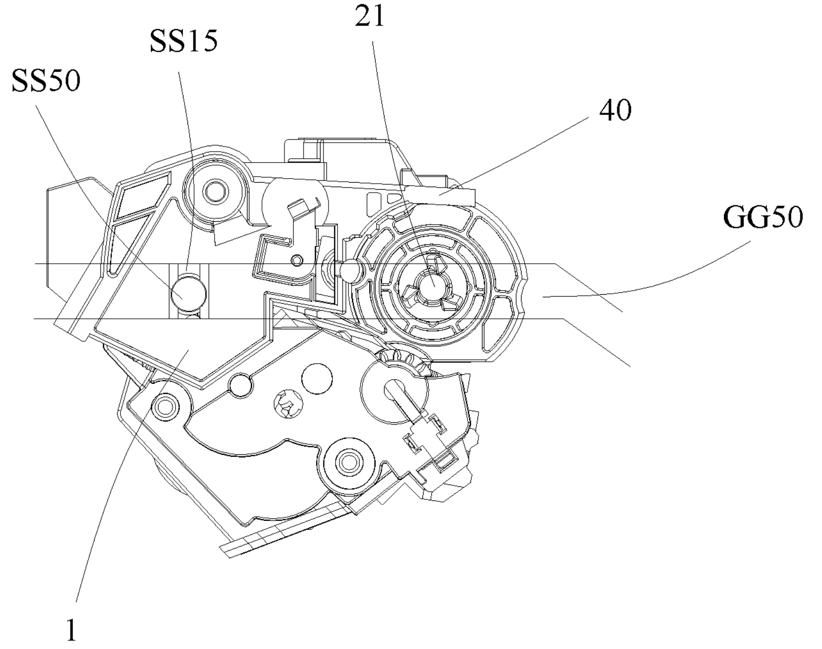

FIG. 231 illustrates a schematic of an installation process of a process cartridge into an installation guide rail of a printer in FIG. 230.

Figure 232:
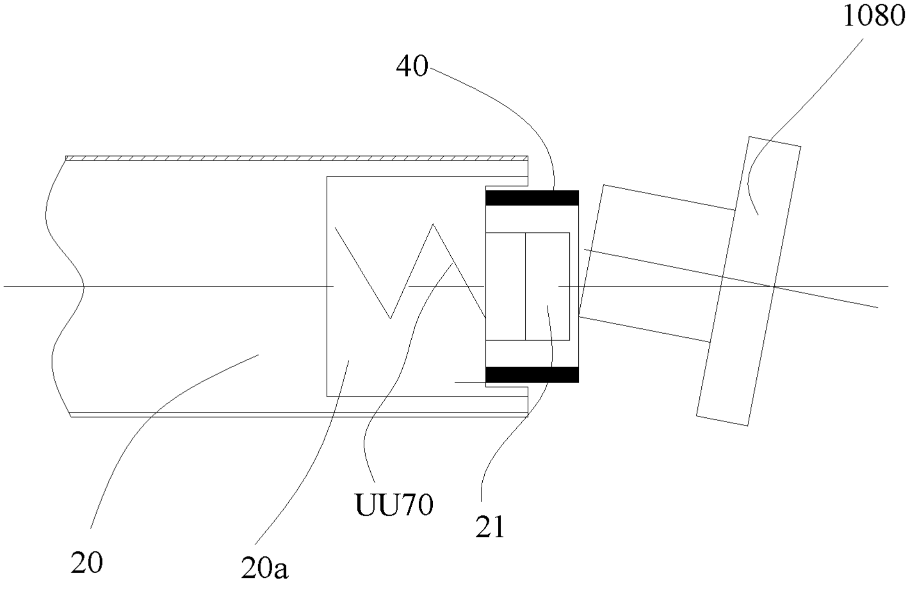

FIG. 232 illustrates a structural schematic of a pressing part in a process cartridge according to embodiment forty seven of the present disclosure.

Figure 233:
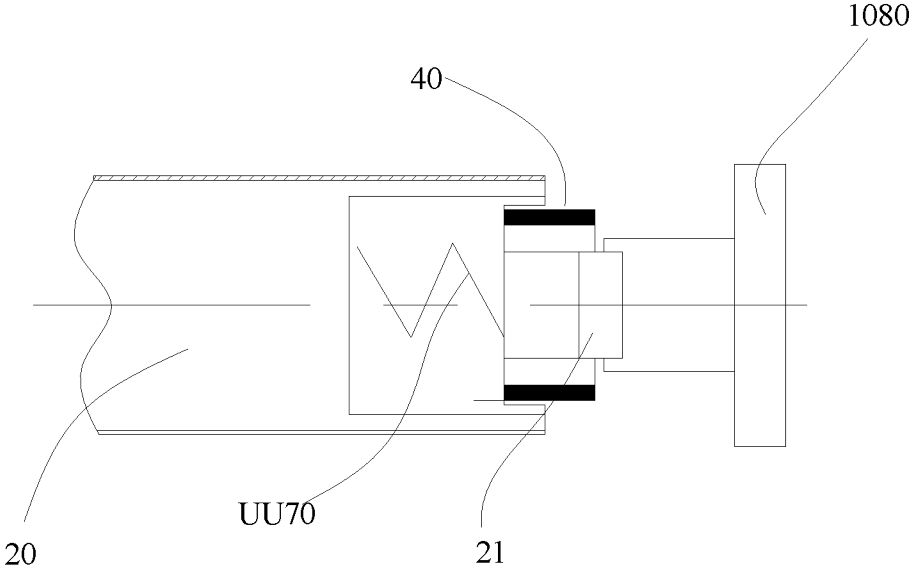

FIG. 233 illustrates a structural schematic of a contact and engagement process between a force receiving unit and a driving unit of a process cartridge in FIG. 232.

Figure 234:
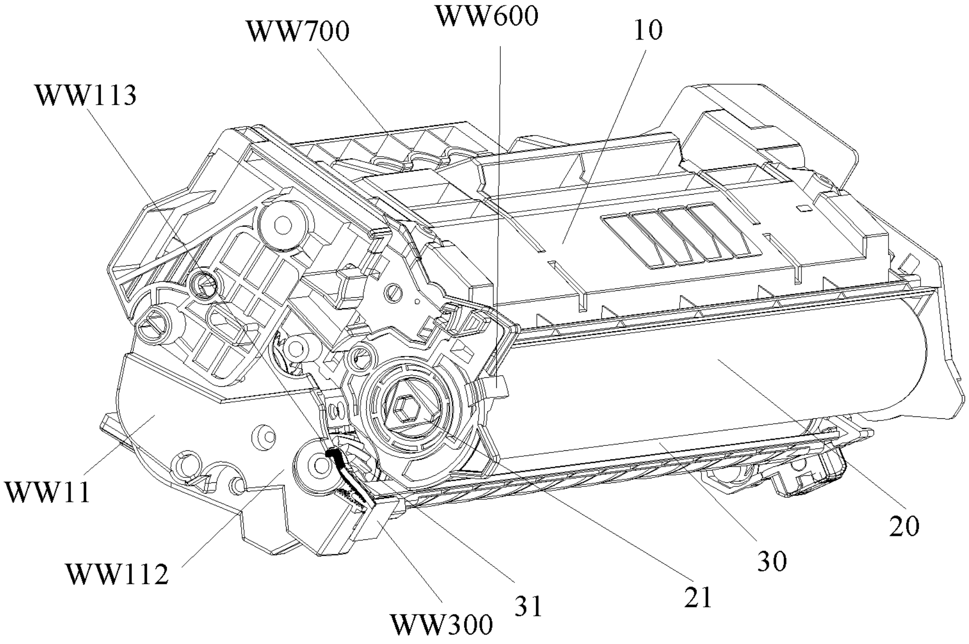

FIG. 234 illustrates a structural schematic of a process cartridge according to embodiment forty eight of the present disclosure.

Figure 235A:
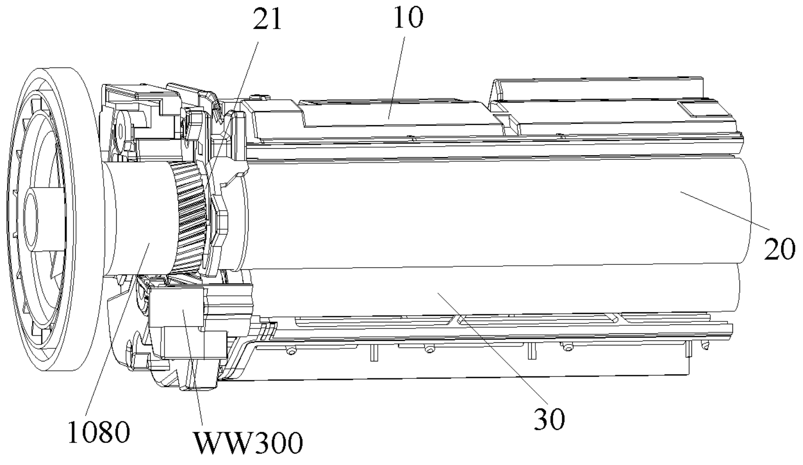

FIG. 235A illustrates a structural schematic of a contact and engagement process between a force receiving unit and a driving unit of a process cartridge according to embodiments of the present disclosure.

Figure 235B:
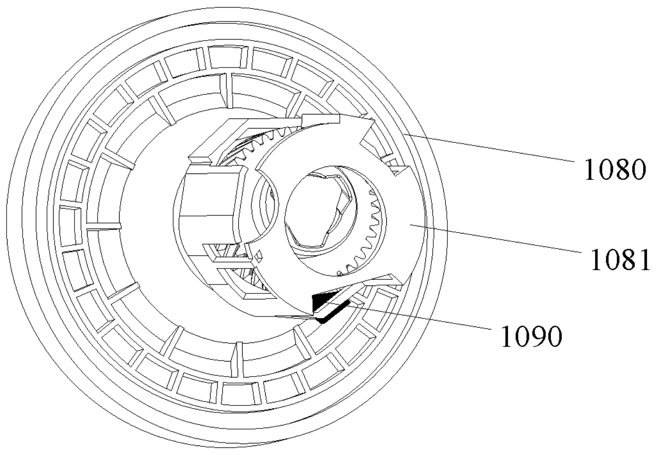
Figure 235C:
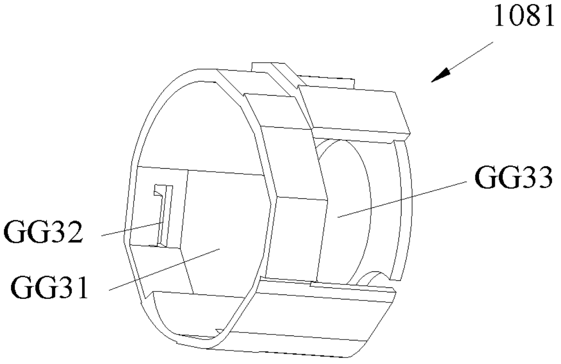

FIGS. 235B-235C respectively illustrate structural schematics of a driving unit and a driving unit protective cover in an electronic image-forming apparatus according to embodiments of the present disclosure.

Figure 236:
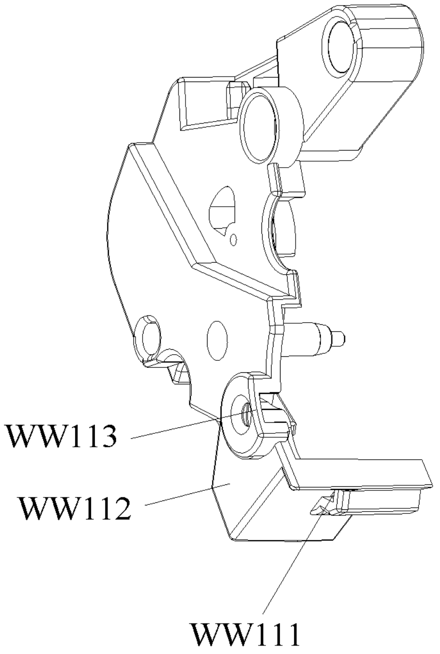

FIG. 236 illustrates a schematic of a structure of an end cover in FIG. 234.

Figure 237A:
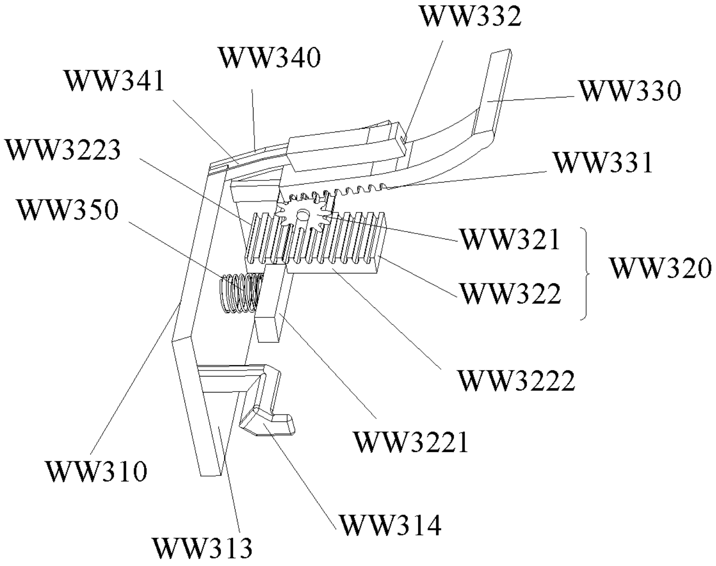

FIG. 237A illustrates a schematic front view of a structure of a force applying unit in a process cartridge in FIG. 234.

Figure 237B:
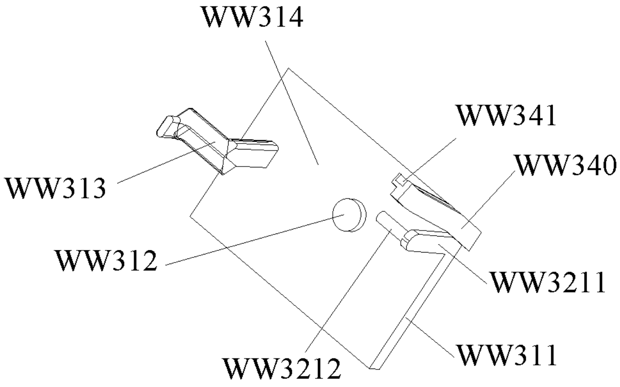

FIG. 237B is a schematic reverse view of a structure of a force applying unit in a process cartridge in FIG. 234.

Figure 238:
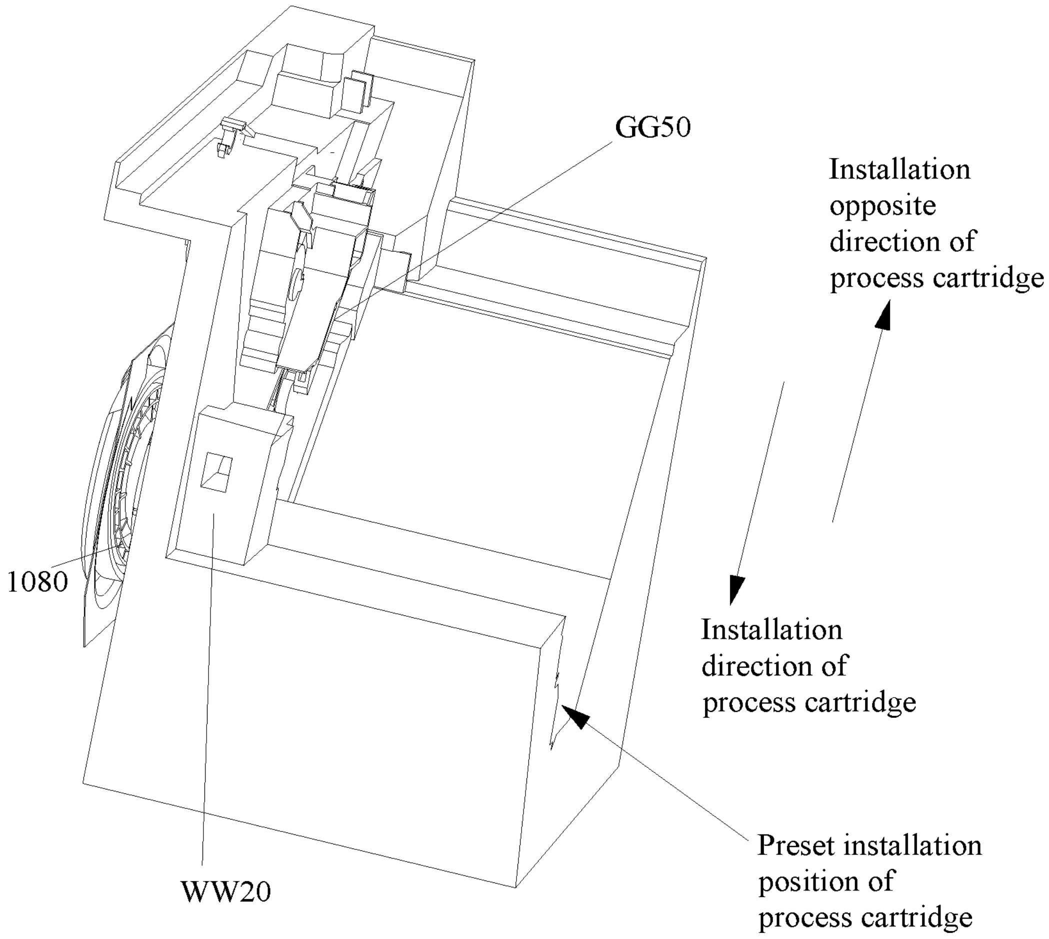

FIG. 238 illustrates a partial structural schematic of a printer according to embodiments of the present disclosure.

Figure 239:
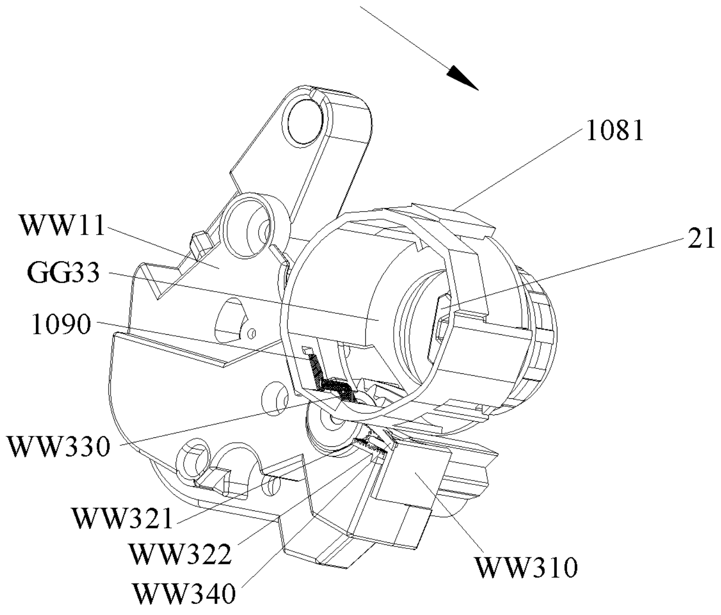

FIG. 239 illustrates a schematic of a contacting process of a force applying part in a process cartridge and a driving unit pushing part in FIG. 234.

Figure 240:
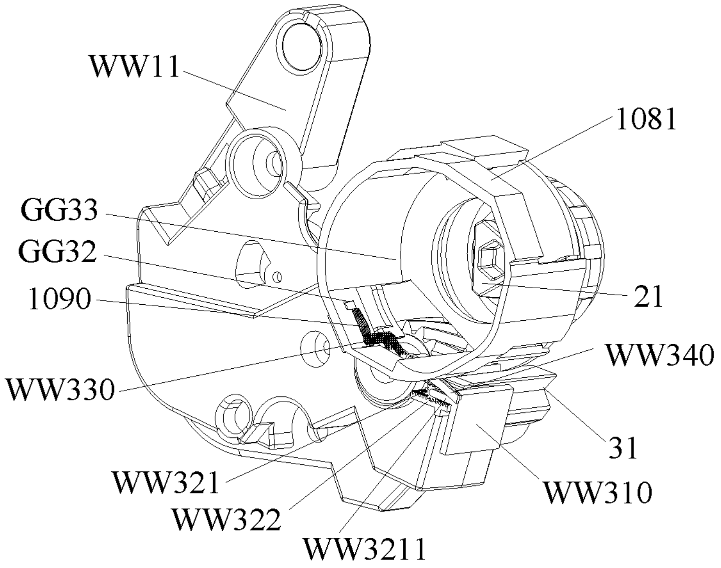

FIG. 240 illustrates a partial structural schematic when a force receiving unit of a process cartridge is engaged with a driving unit in FIG. 234.

Figure 241:
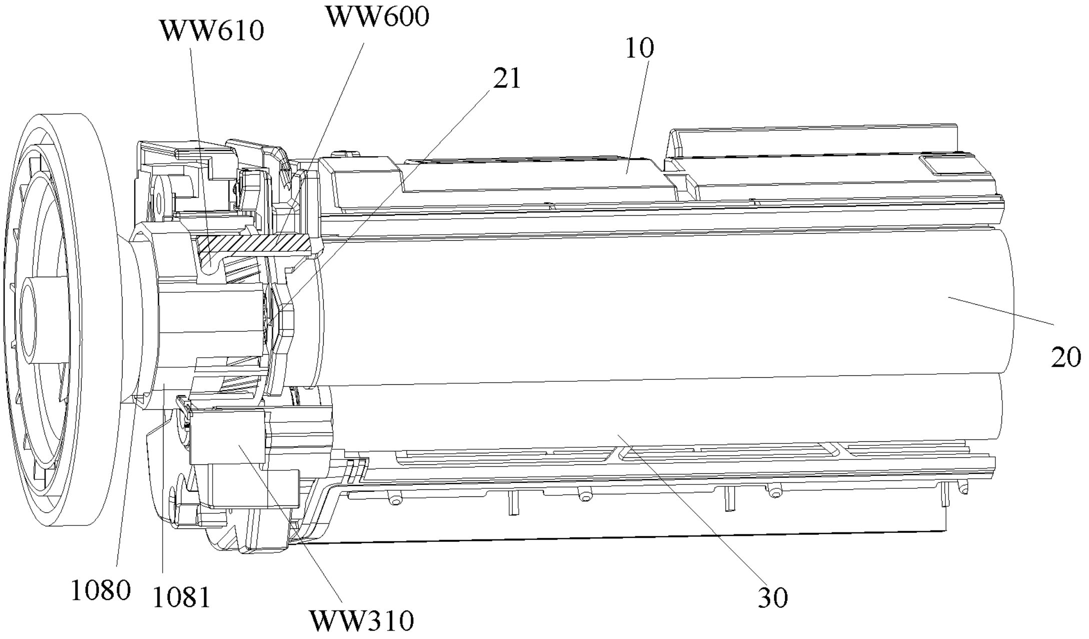

FIG. 241 illustrates a partial structural schematic when a force receiving unit of a process cartridge is engaged and locked with a driving unit in FIG. 234.

Figure 242:
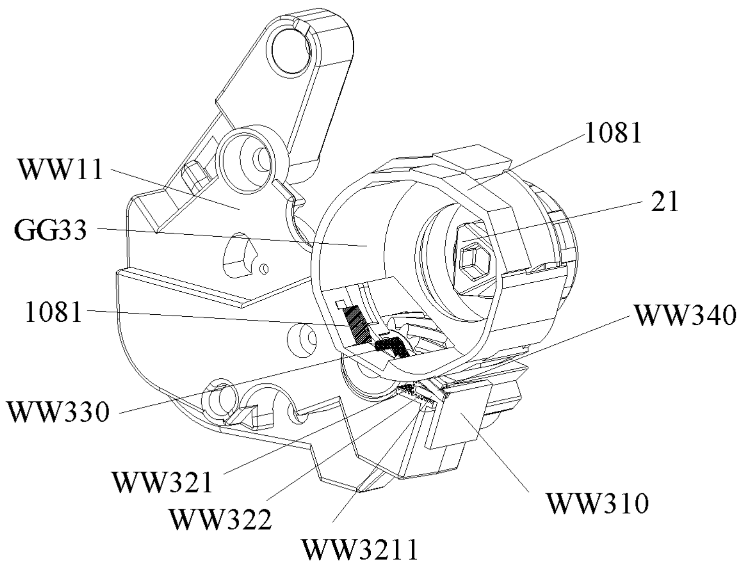

FIG. 242 illustrates a partial structural schematic when a force applying part of a process cartridge is in contact with a driving unit pushing part in FIG. 234.

Figure 243:
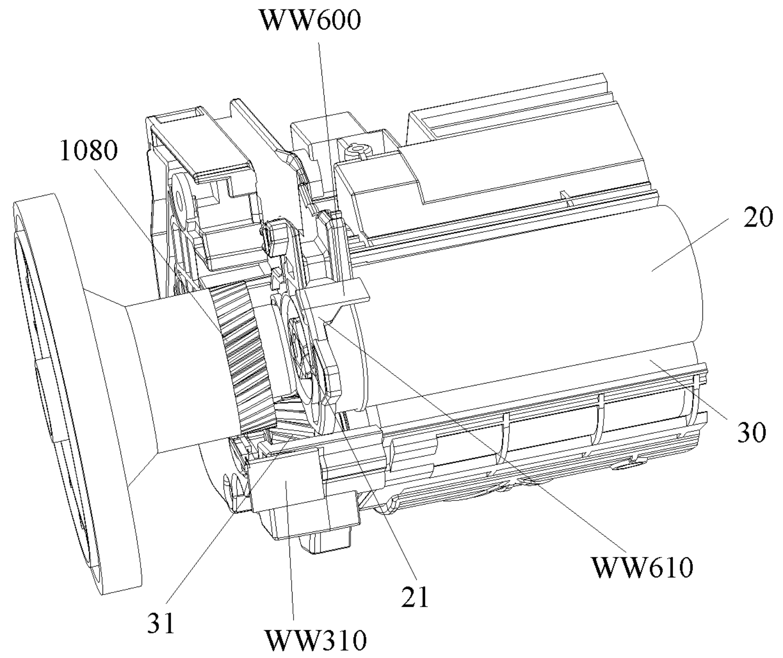

FIG. 243 illustrates a partial structural schematic when a force receiving unit of a process cartridge is not engaged with and separated from a driving unit in FIG. 234.

FIG. 244 illustrates a state schematic before installation of a force applying unit in a process cartridge according to embodiment forty nine of the present disclosure.

Figure 245A:
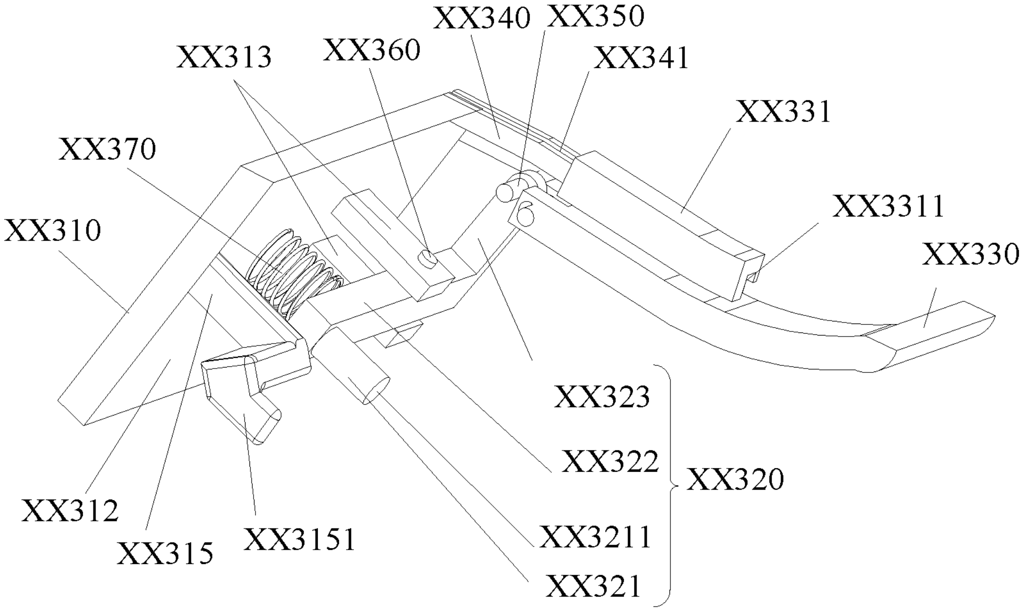
Figure 245B:
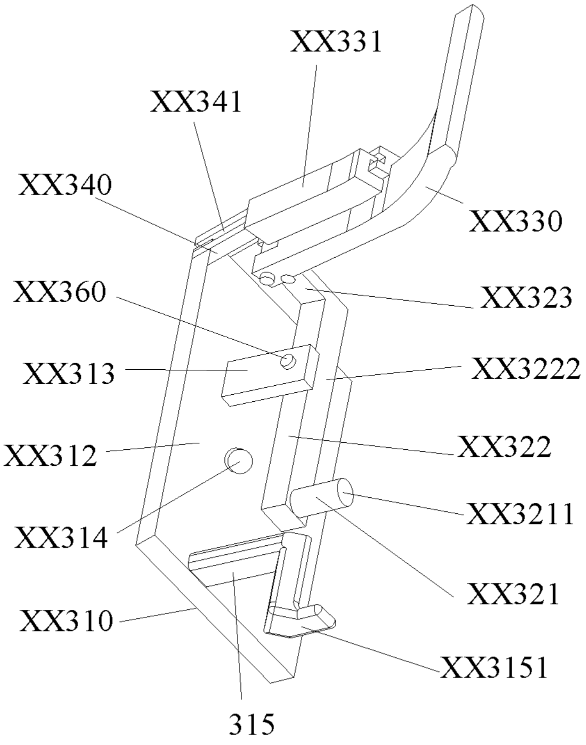
Figure 245C:
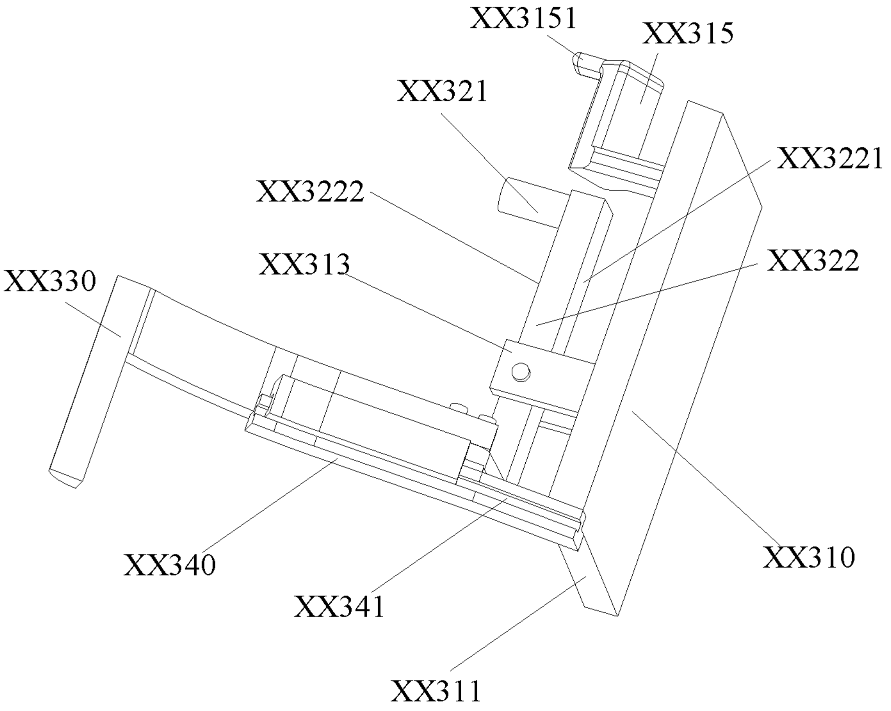

FIGS. 245A-245C illustrate structural schematics of a force applying unit from different angles in FIG. 244.

Figure 246A:
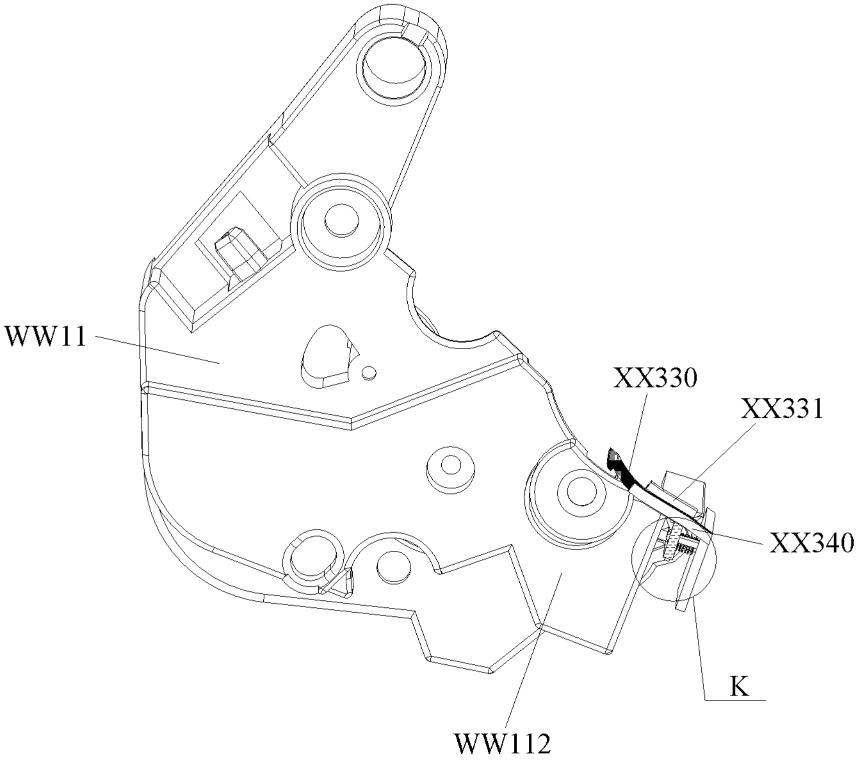
Figure 246B:
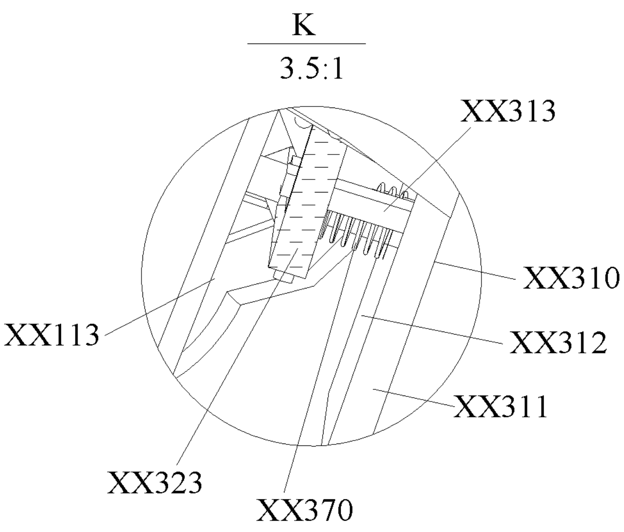

FIG. 246 illustrates a structural schematic of a force applying unit and an end cover, and a local enlarged schematic of a corresponding position in FIG. 234.

Figure 247A:
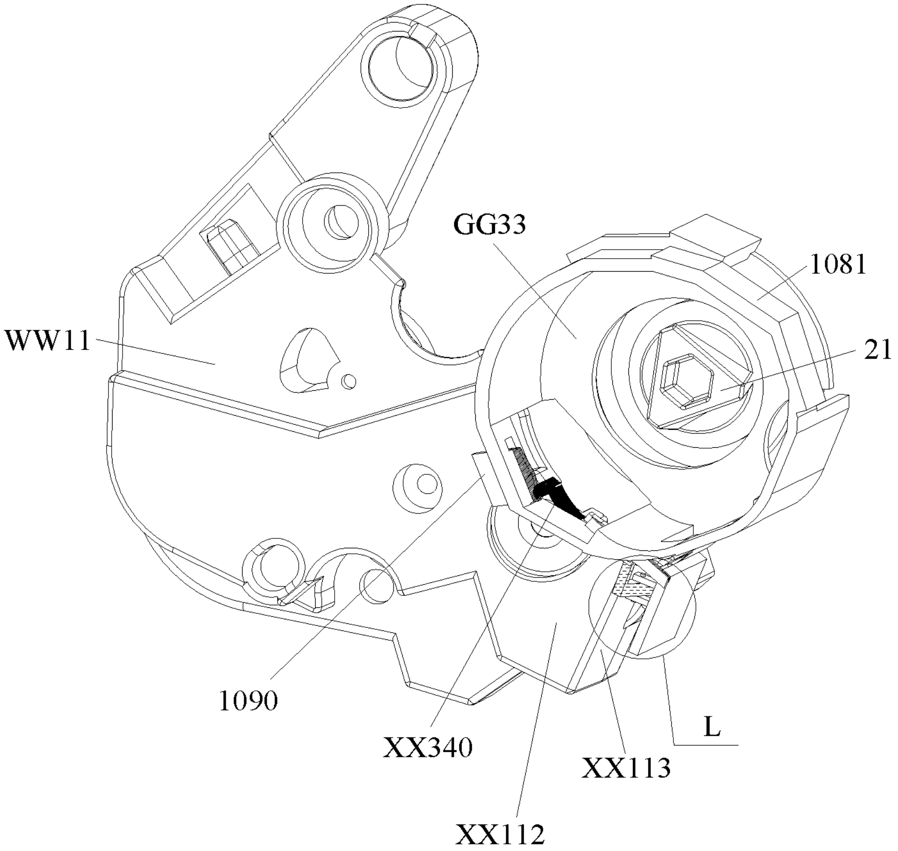
Figure 247B:
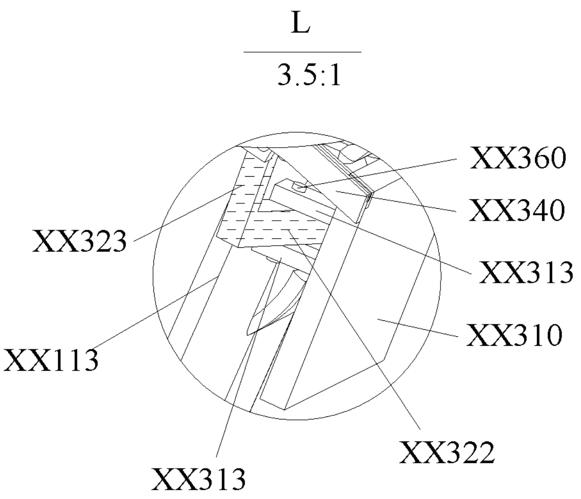

FIG. 247 illustrates a partial structural schematic when a force applying unit apply force on a driving unit pushing part, and a local enlarged schematic of a corresponding position in FIG. 234.

Figure 248:
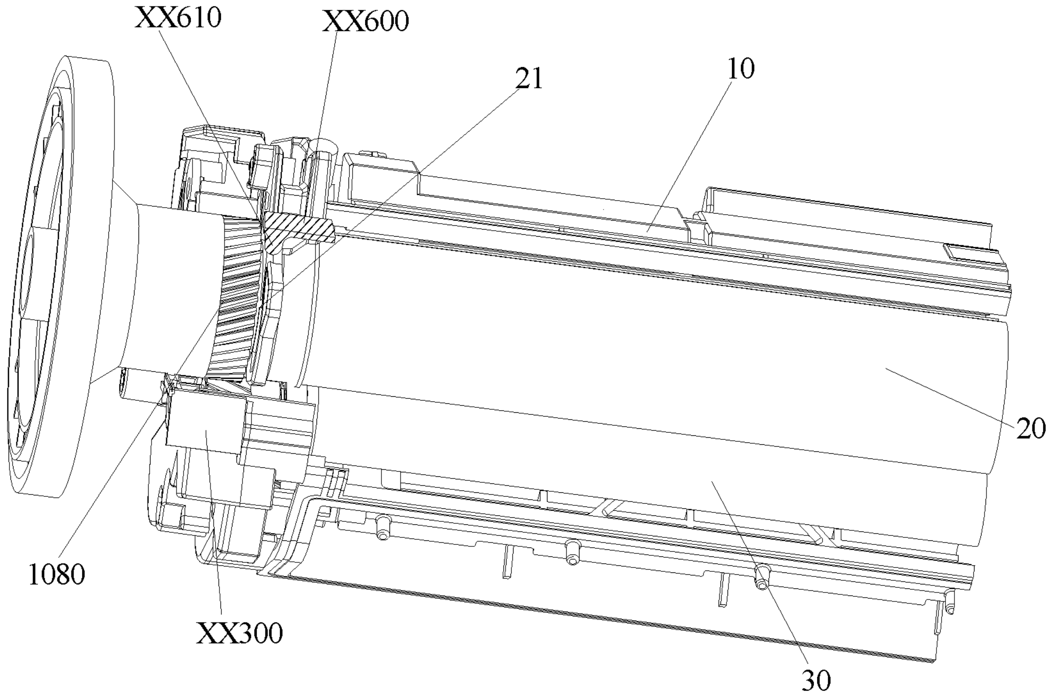

FIG. 248 illustrates a partial structural schematic when a force receiving unit of a process cartridge is engaged with a driving unit in FIG. 234.

Figure 249:
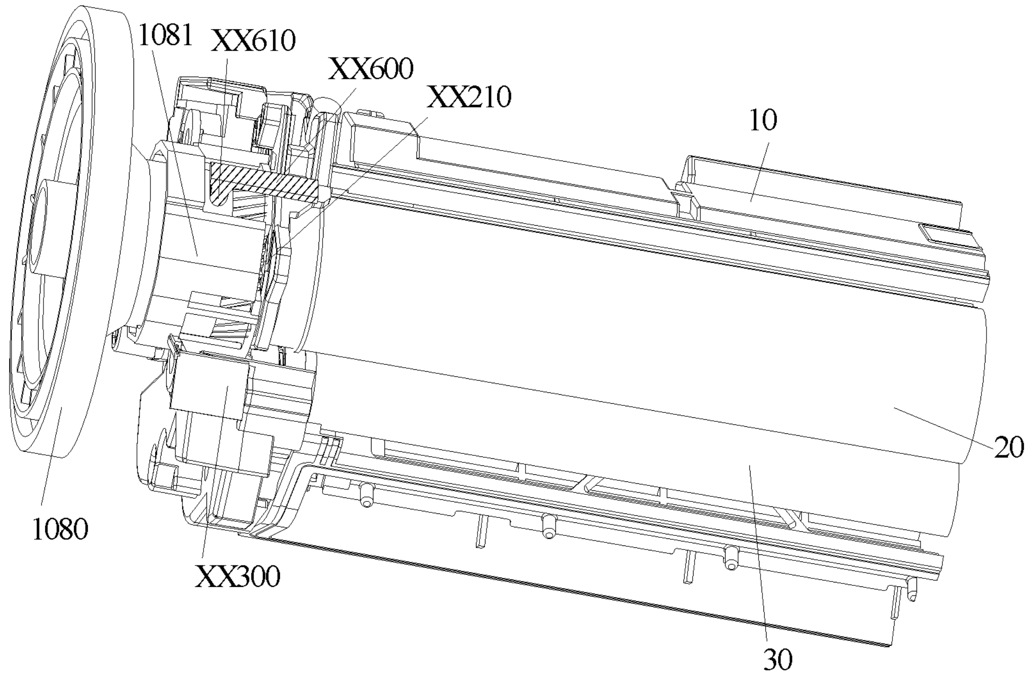

FIG. 249 illustrates a partial structural schematic when a force receiving unit of a process cartridge is engaged and locked with a driving unit in FIG. 234.

Figure 250A:
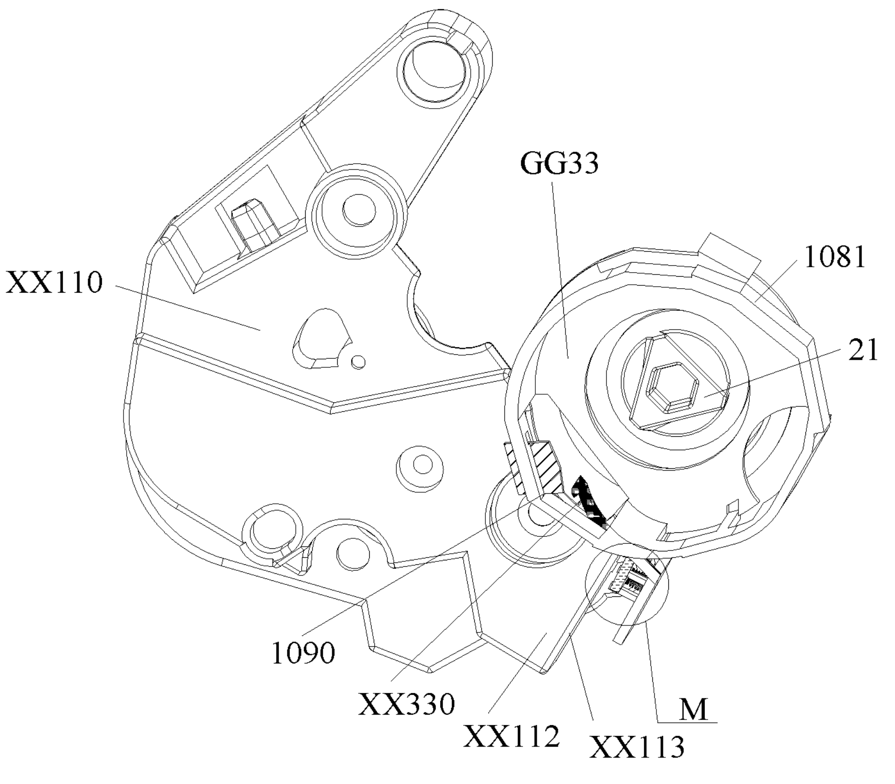
Figure 250B:
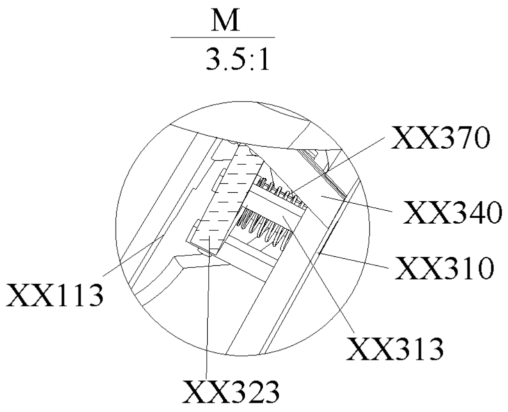

FIG. 250 illustrates a partial structural schematic when a force applying unit is separated from a driving unit pushing part, and a local enlarged schematic of a corresponding position in FIG. 234.

Figure 251:
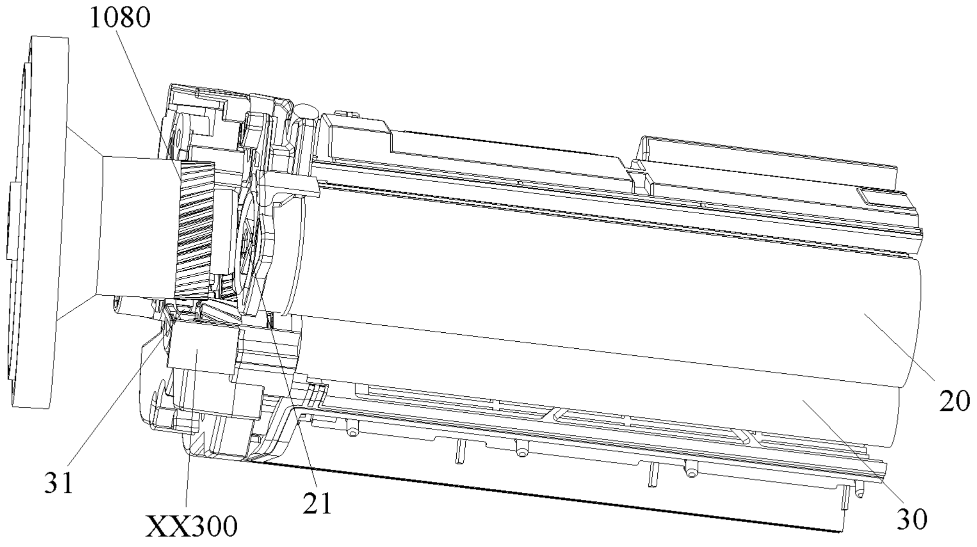

FIG. 251 illustrates a partial structural schematic when a force receiving unit of a process cartridge is not engaged with and separated from a driving unit in FIG. 234.

Figure 252:
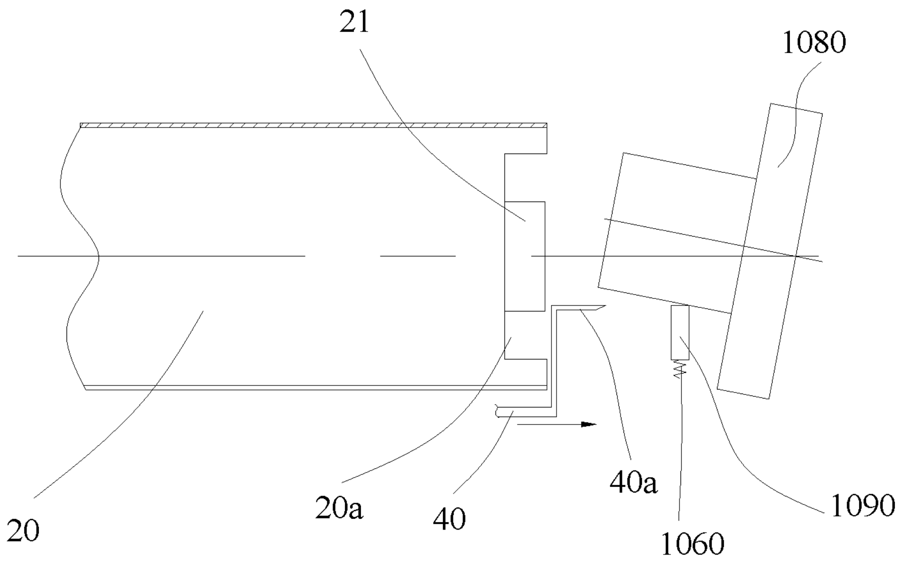
Figure 253:
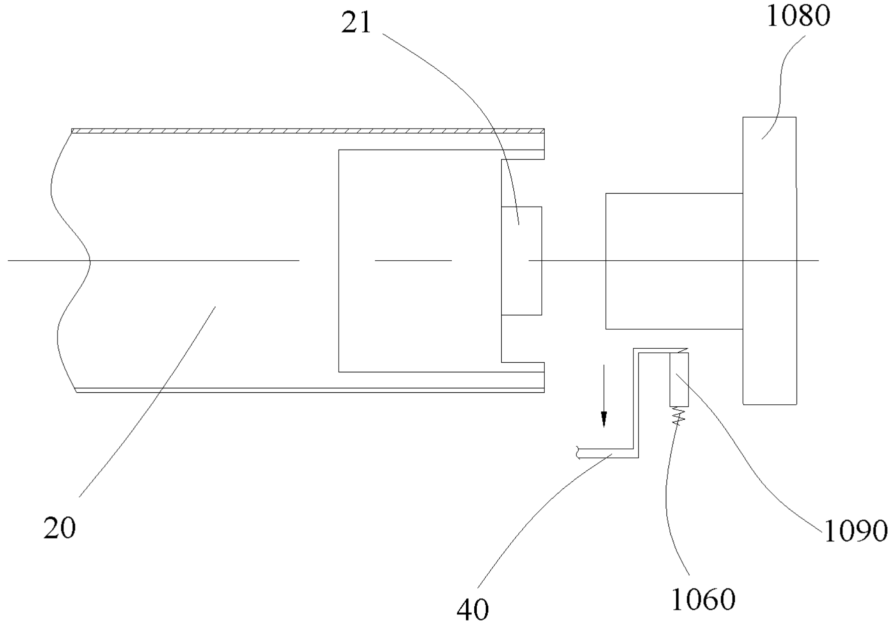

FIGS. 252-253 illustrate working principle schematics when a pressing part in a process cartridge is used as a force applying unit according to embodiment fifty of the present disclosure.

Figure 254:
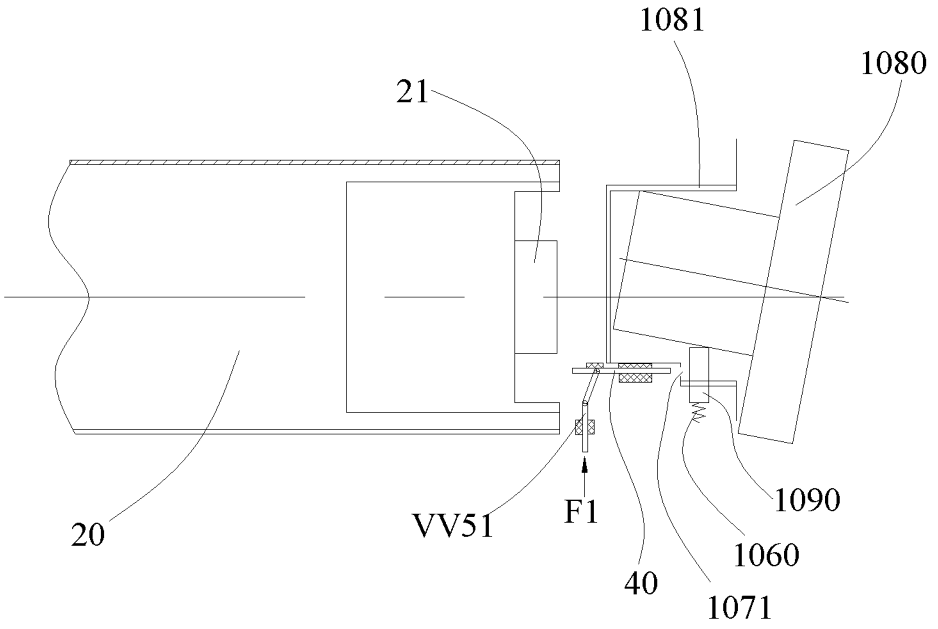
Figure 255:
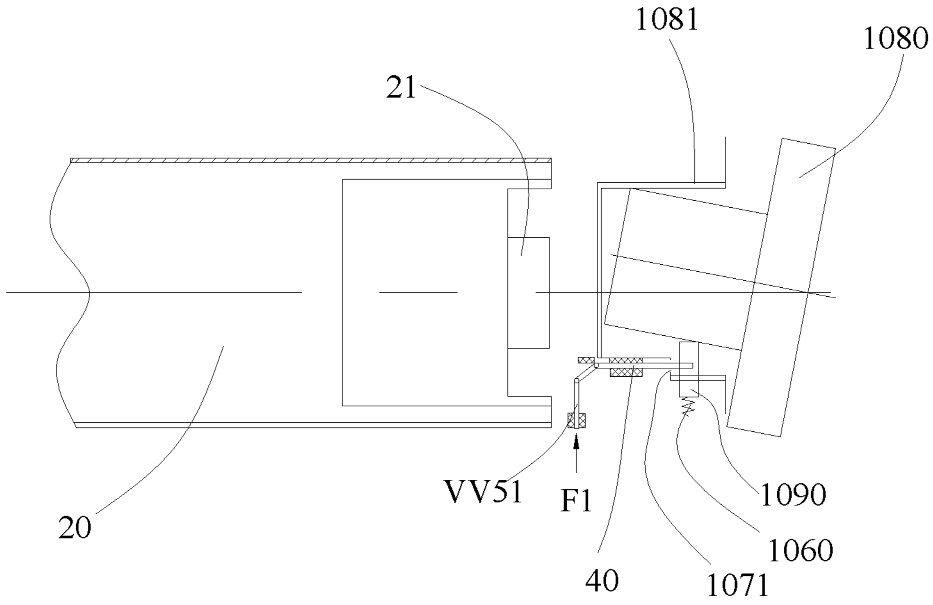

FIGS. 254-255 illustrate working principle schematics when a pressing part in a process cartridge is used as a force applying unit according to embodiment fifty one of the present disclosure.

Figure 256:
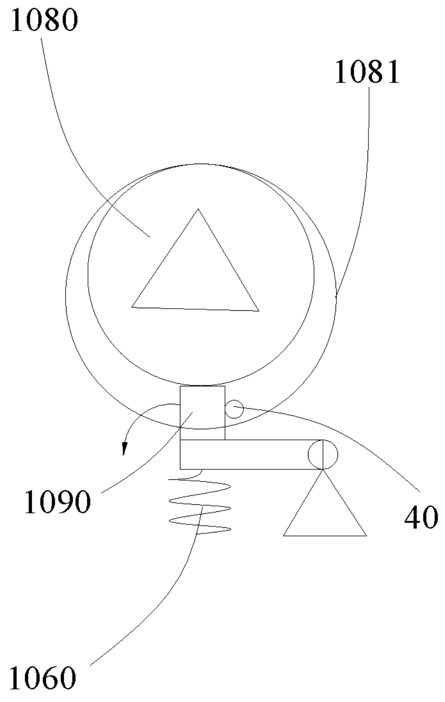

FIG. 256 illustrates a schematic of a working process of a pressing part viewed along a length direction of a process cartridge.

Figure 257:
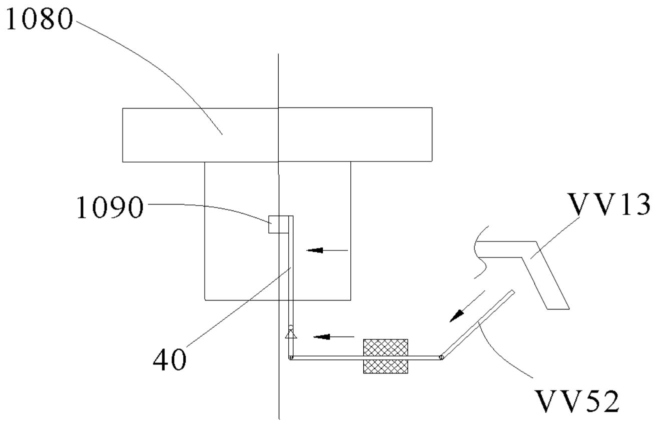

FIG. 257 illustrates another schematic of a working process of a pressing part in FIG. 254.

Figure 258:
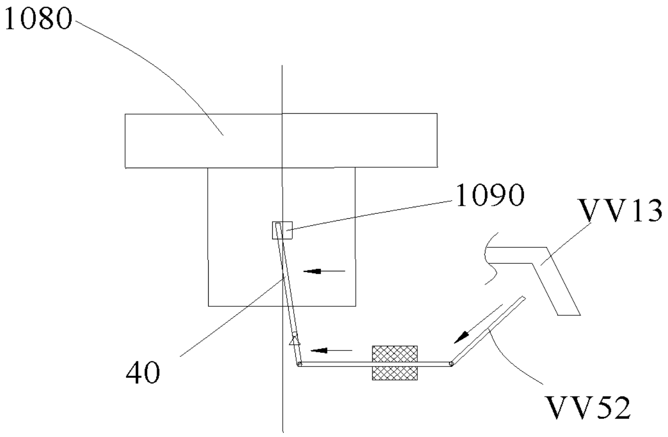

FIG. 258 illustrates another schematic of a working process of a pressing part in FIG. 254.

Figure 259:
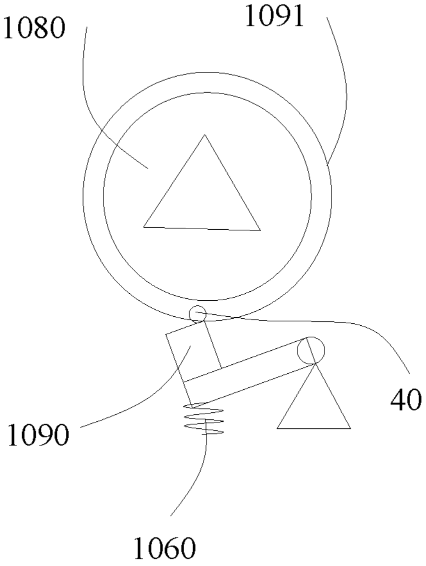

FIG. 259 illustrates another schematic of a working process of a pressing part viewed along a length direction of a process cartridge.

Figure 260:
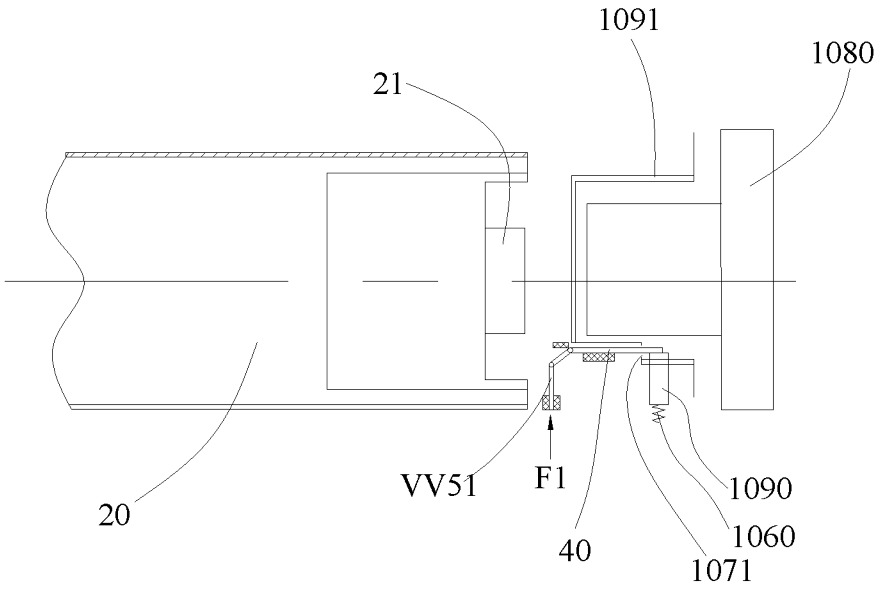

FIG. 260 illustrates a schematic of a working state before a force receiving unit in a process cartridge is engaged with a driving unit in FIG. 254.

Figure 261:
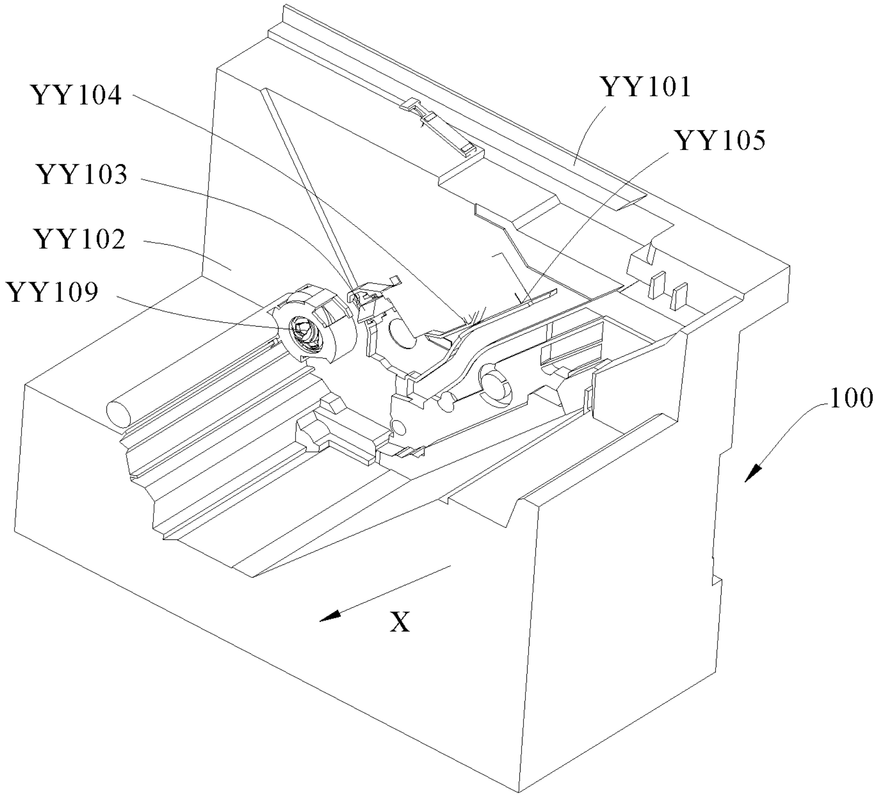

FIG. 261 illustrates a local structural schematic of a main assembly of an electronic image-forming apparatus in the existing technology.

Figure 262:
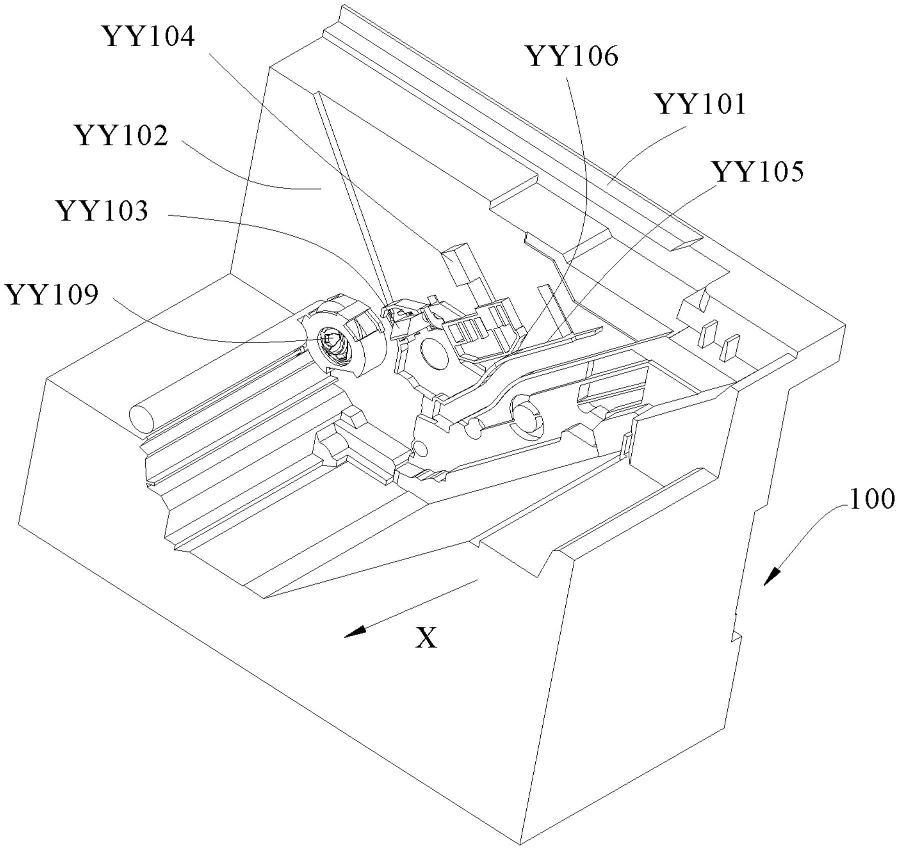

FIG. 262 illustrates another local structural schematic of a main assembly of an electronic image-forming apparatus in the existing technology.

Figure 263:
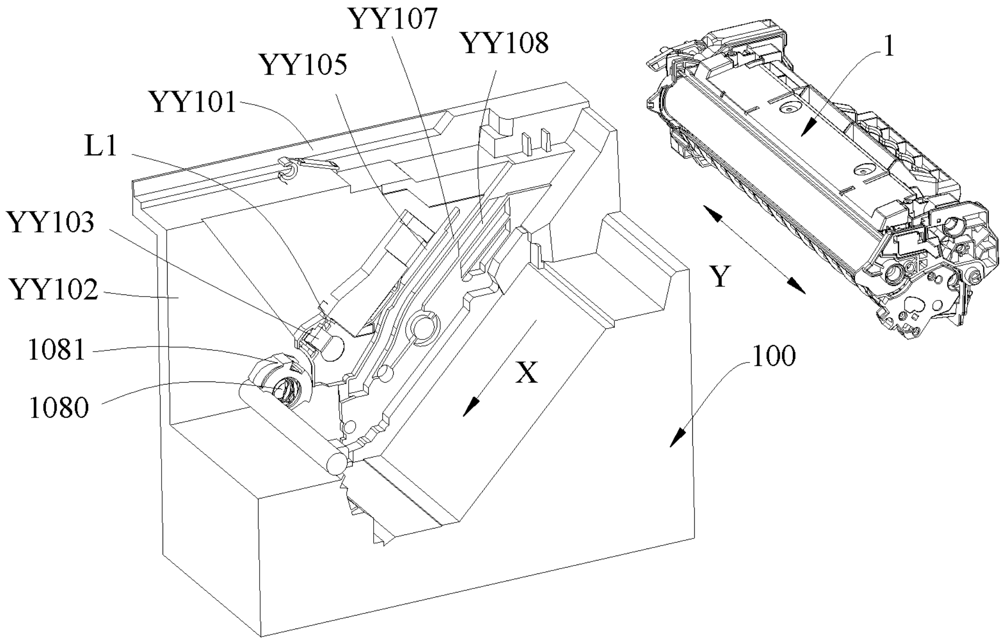

FIG. 263 illustrates a schematic of installing a process cartridge in an electronic image-forming apparatus according to embodiment fifty two of the present disclosure.

Figure 264:
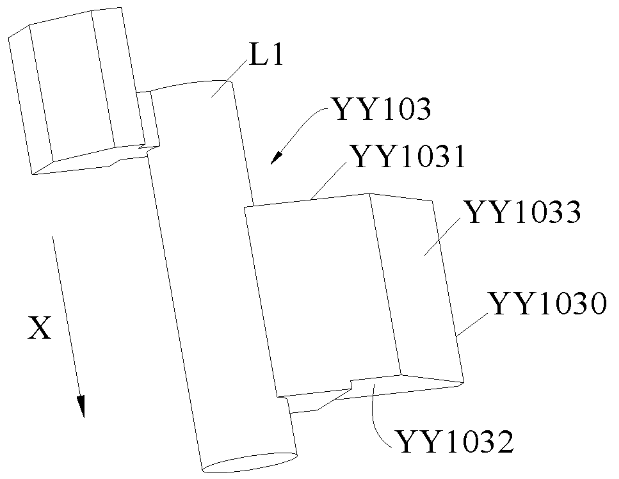

FIG. 264 illustrates a structural schematic of a first movable part according to embodiment fifty two of the present disclosure.

Figure 265:
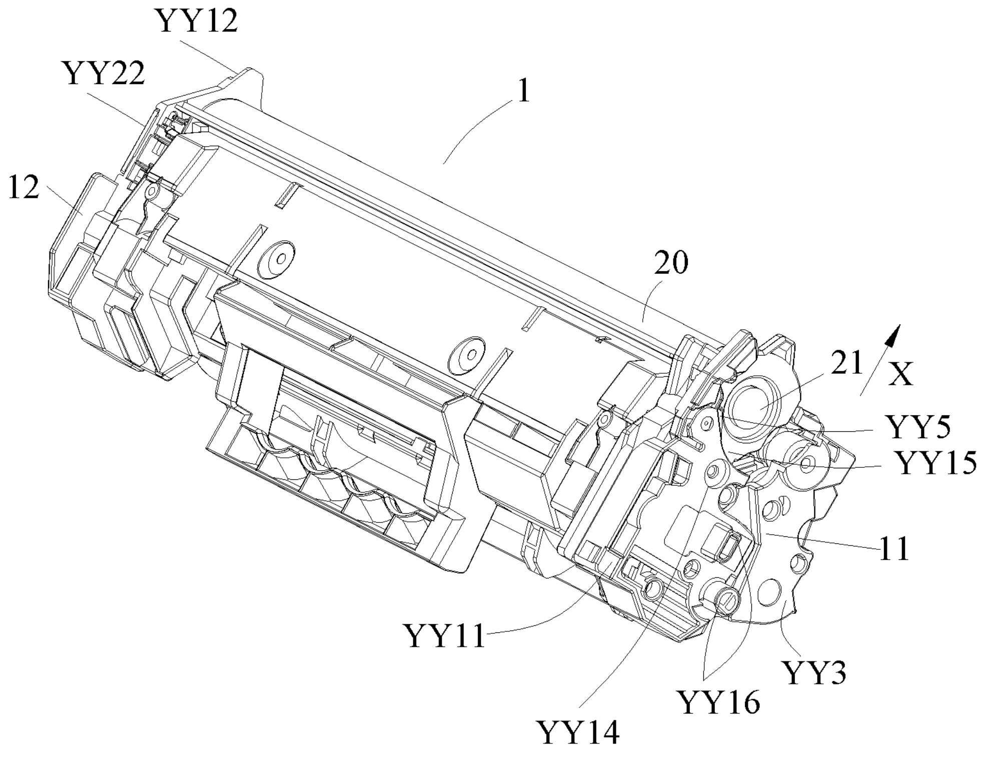

FIG. 265 illustrates a schematic of overall structure of a process cartridge according to embodiment fifty two of the present disclosure.

Figure 266:
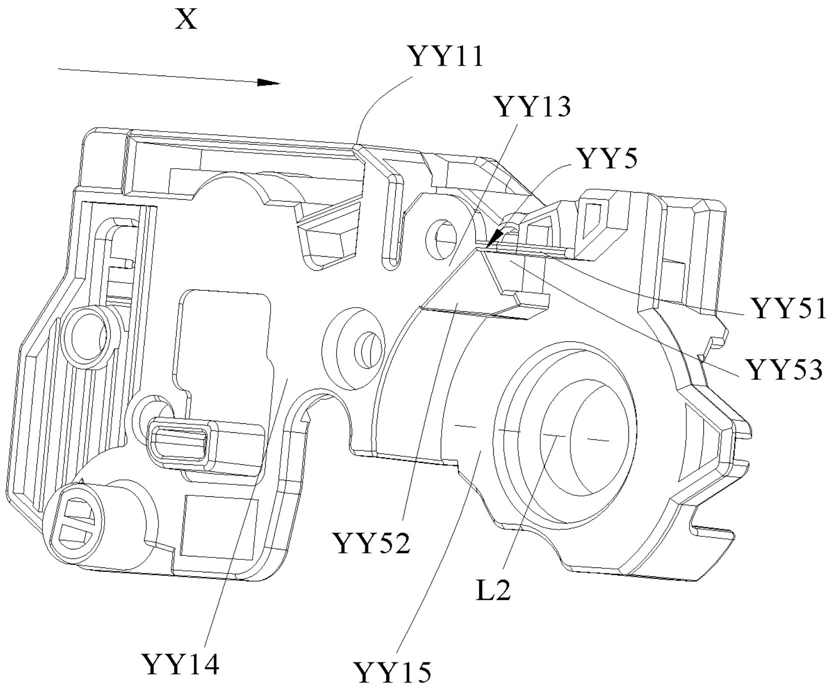

FIG. 266 illustrates a structural schematic of a first end cover and a force applying part according to embodiment fifty two of the present disclosure.

Figure 267:
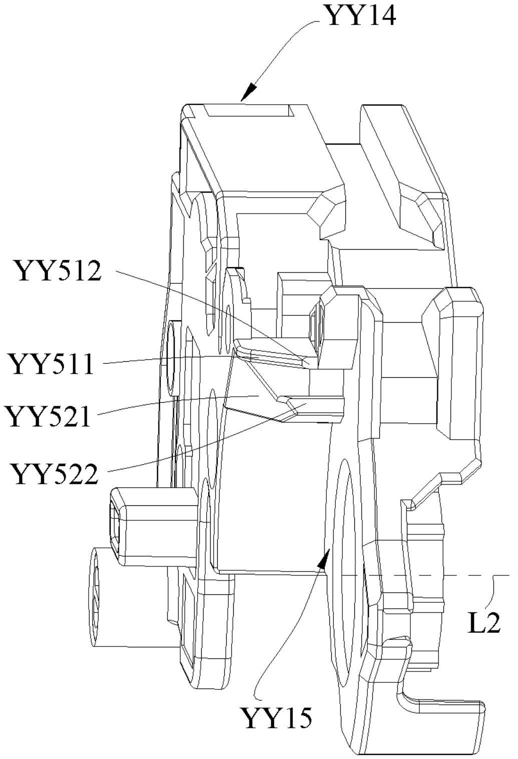

FIG. 267 illustrates another structural schematic of a first end cover and a force applying part according to embodiment fifty two of the present disclosure.

Figure 268:
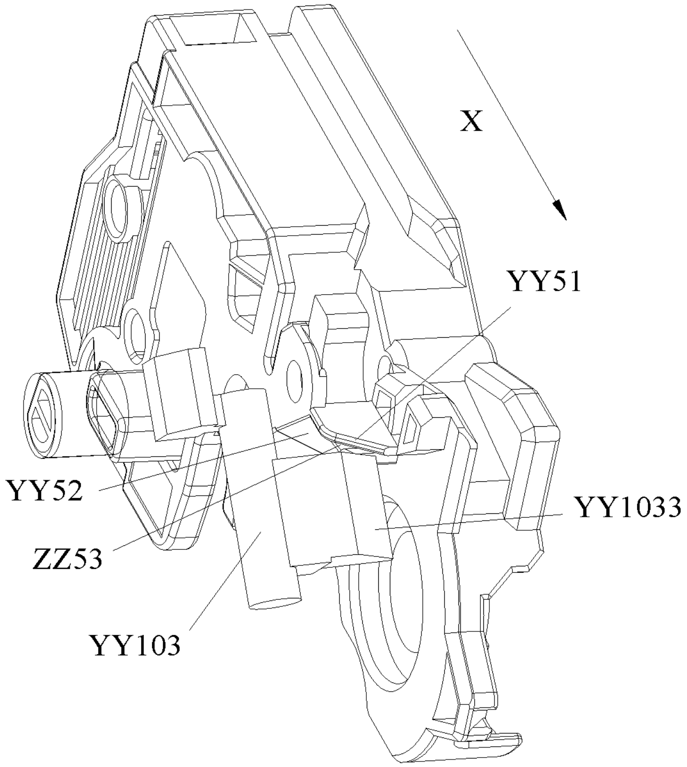

FIG. 268 illustrates a cooperation relationship schematic between a force applying part and a first movable part during an installation process of a process cartridge into an electronic image-forming apparatus according to embodiment fifty two of the present disclosure.

Figure 269:
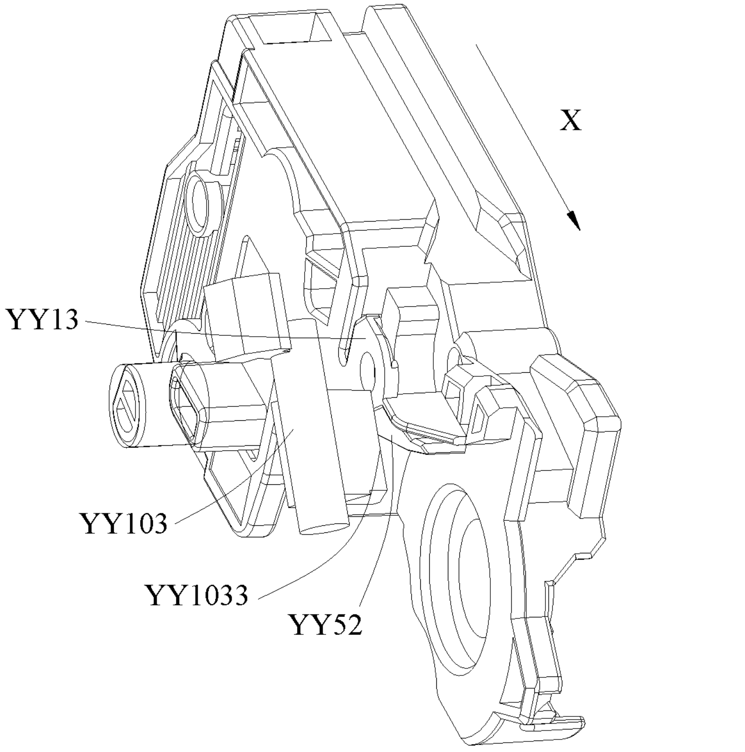

FIG. 269 illustrates another cooperation relationship schematic between a force applying part and a first movable part during an installation process of a process cartridge into an electronic image-forming apparatus according to embodiment fifty two of the present disclosure.

Figure 270:
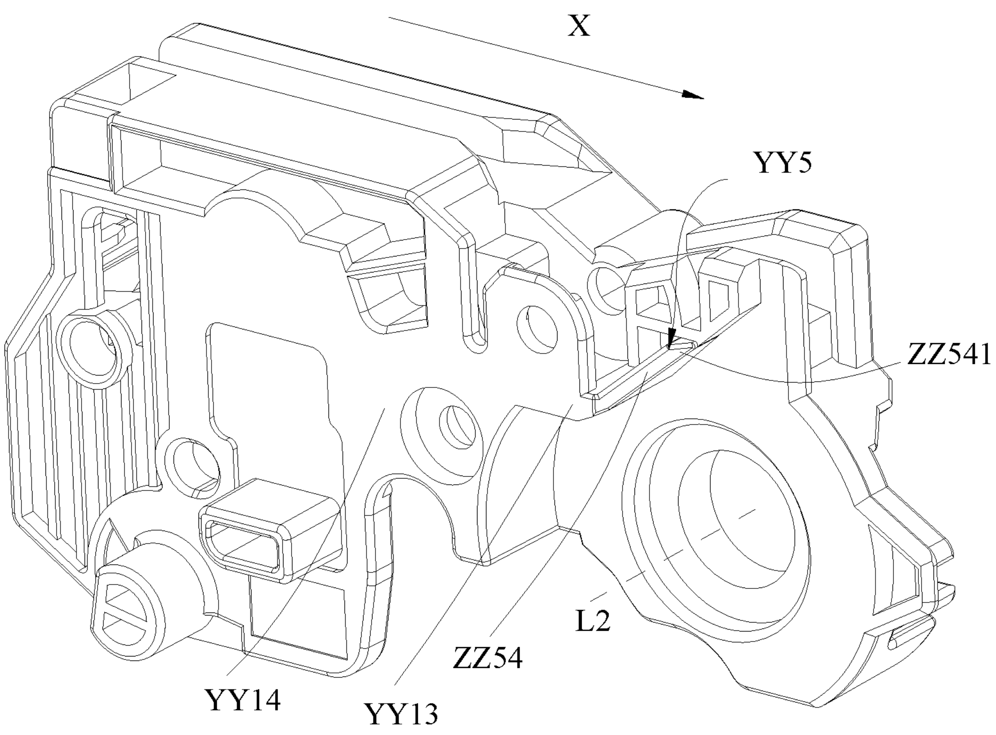

FIG. 270 illustrates a structural schematic of a first end cover and a force applying part according to embodiment fifty three of the present disclosure.

Figure 271:
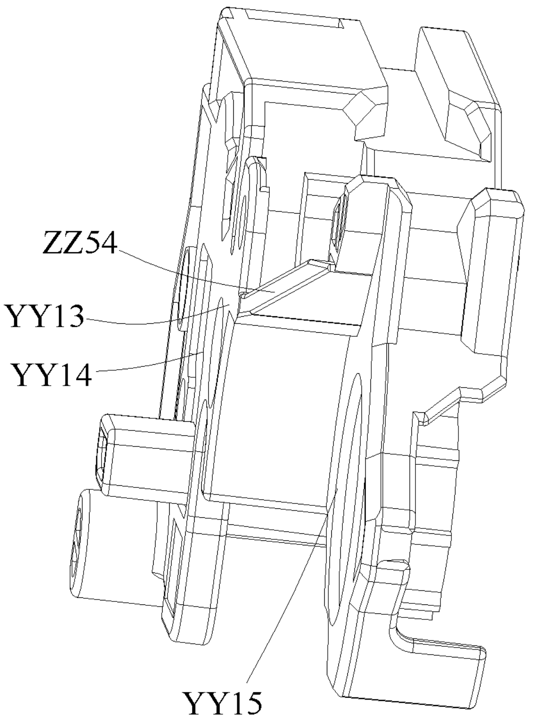

FIG. 271 illustrates another structural schematic of a first end cover and a force applying part according to embodiment fifty three of the present disclosure.

Figure 272:
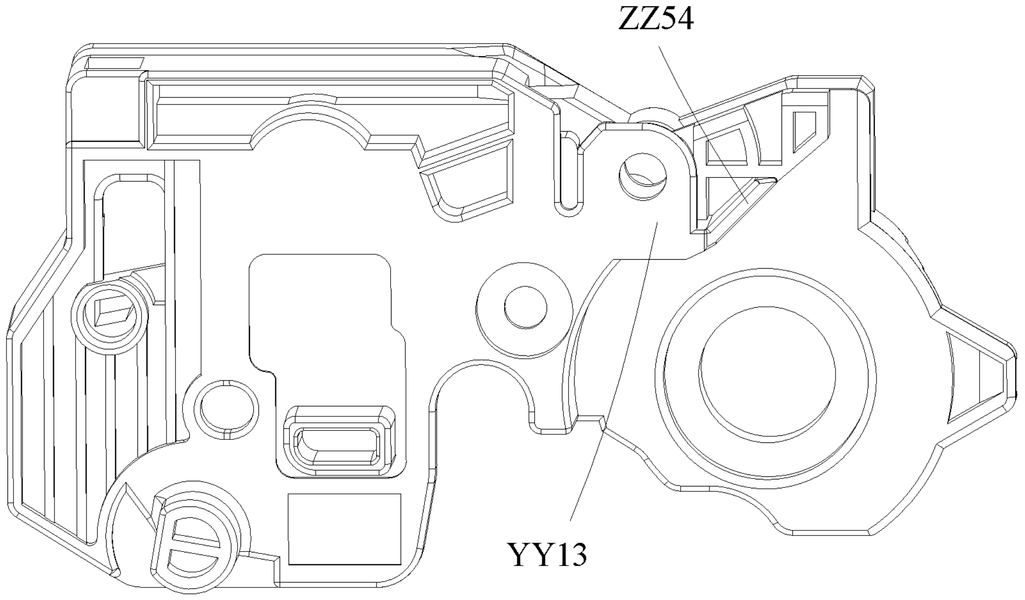

FIG. 272 illustrates another structural schematic of a first end cover and a force applying part according to embodiment fifty three of the present disclosure.

Figure 273:
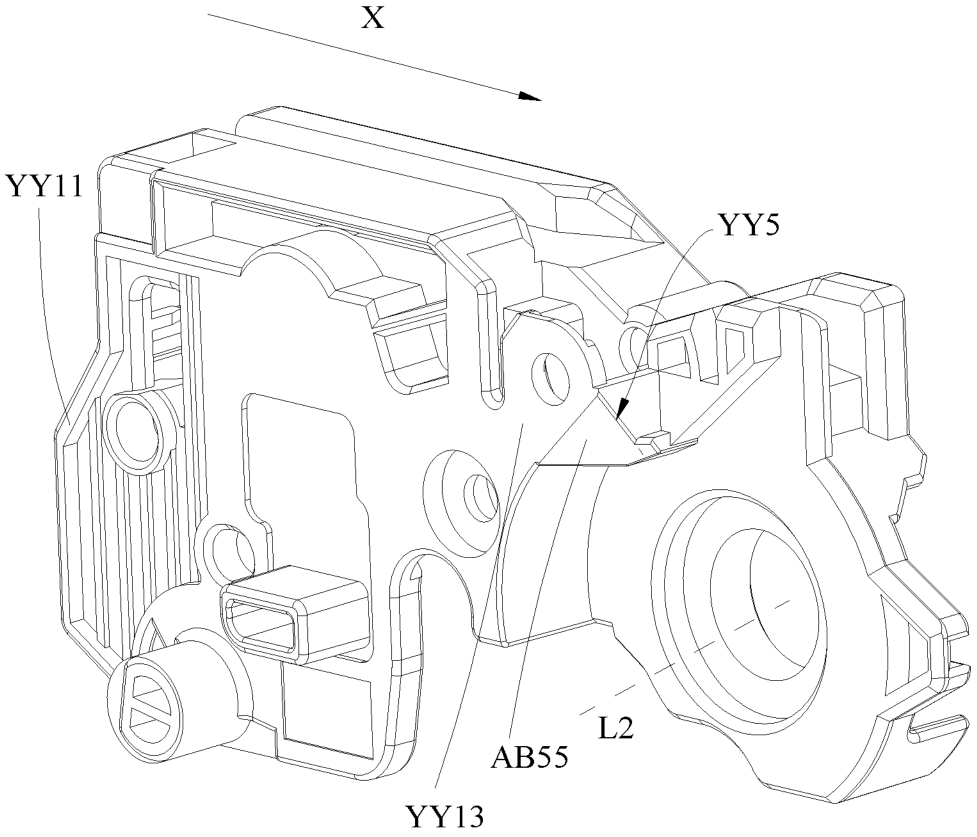

FIG. 273 illustrates a structural schematic of a first end cover and a force applying part according to embodiment fifty four of the present disclosure.

Figure 274:
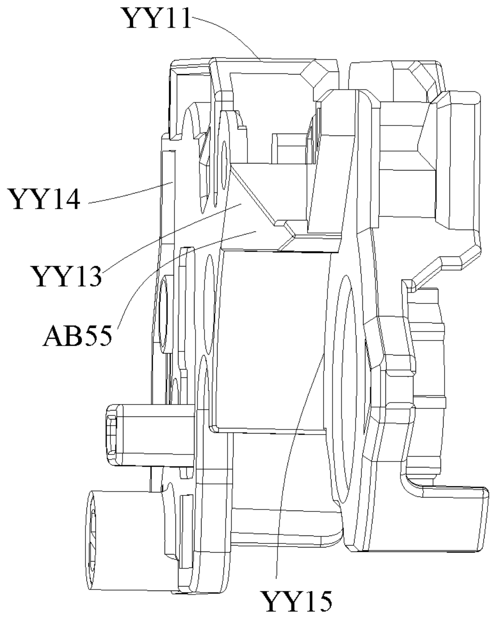

FIG. 274 illustrates another structural schematic of a first end cover and a force applying part according to embodiment fifty four of the present disclosure.

Figure 275:
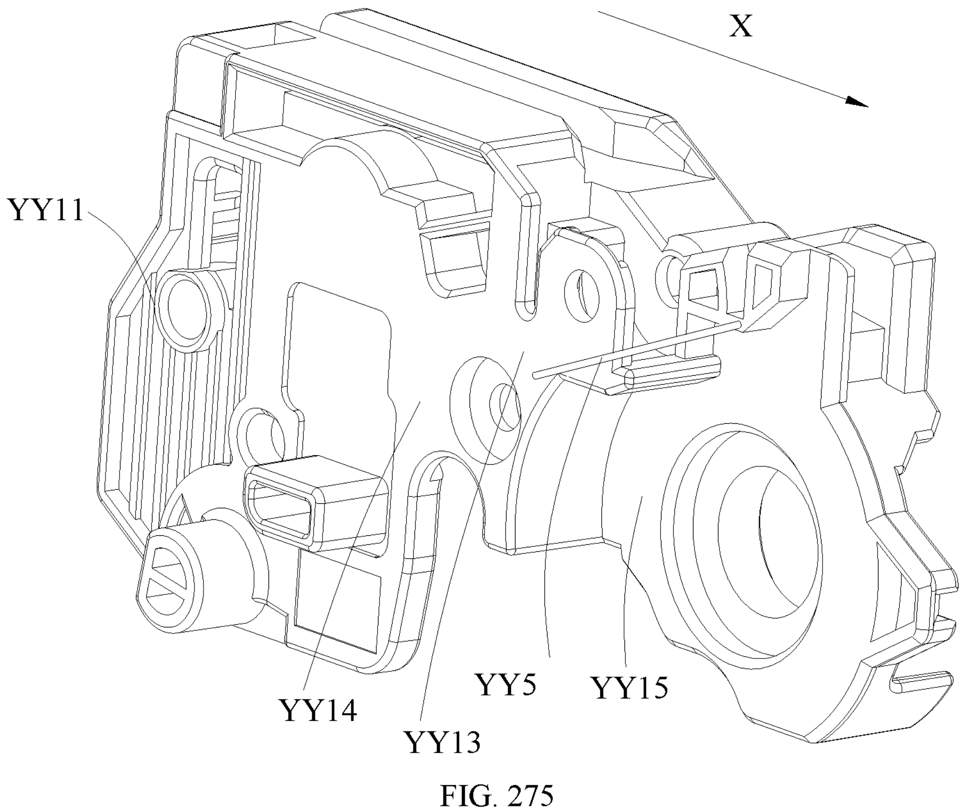

FIG. 275 illustrates a structural schematic of a first end cover and a force applying part before installation according to embodiment fifty five of the present disclosure.

Figure 276:
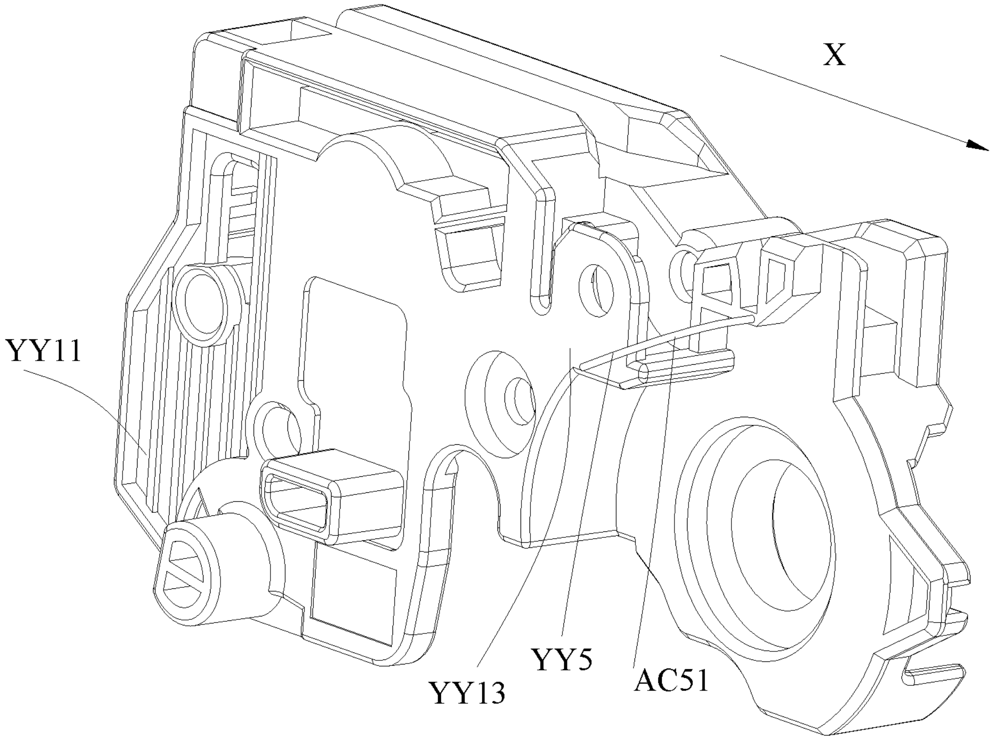

FIG. 276 illustrates a structural schematic of a first end cover and a force applying part during installation according to embodiment fifty five of the present disclosure.

Figure 277:
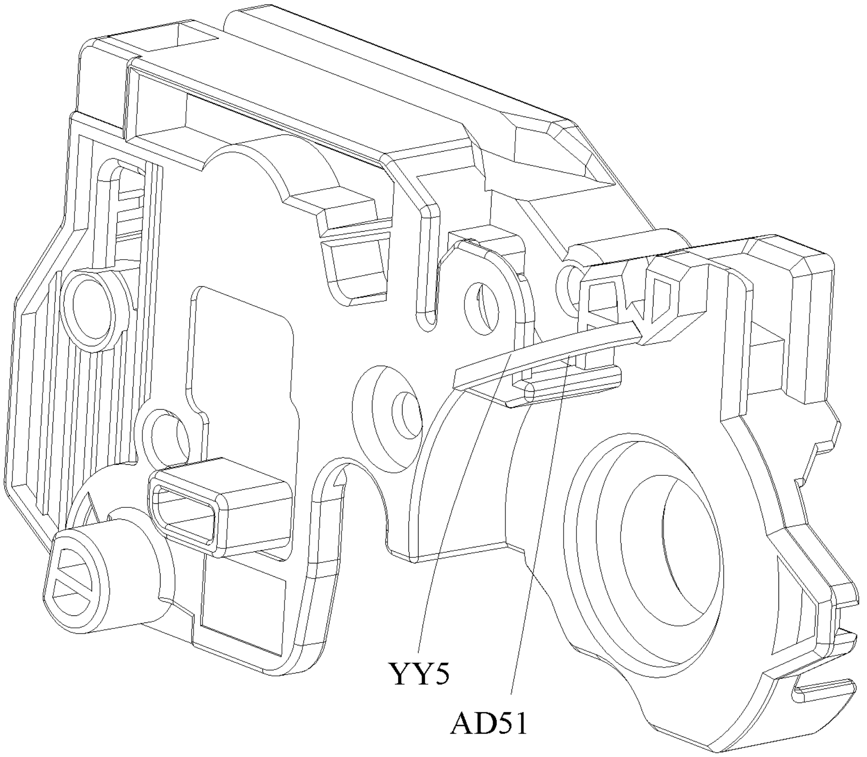

FIG. 277 illustrates a structural schematic of a first end cover and a force applying part during installation according to embodiment fifty six of the present disclosure.

Figure 278:
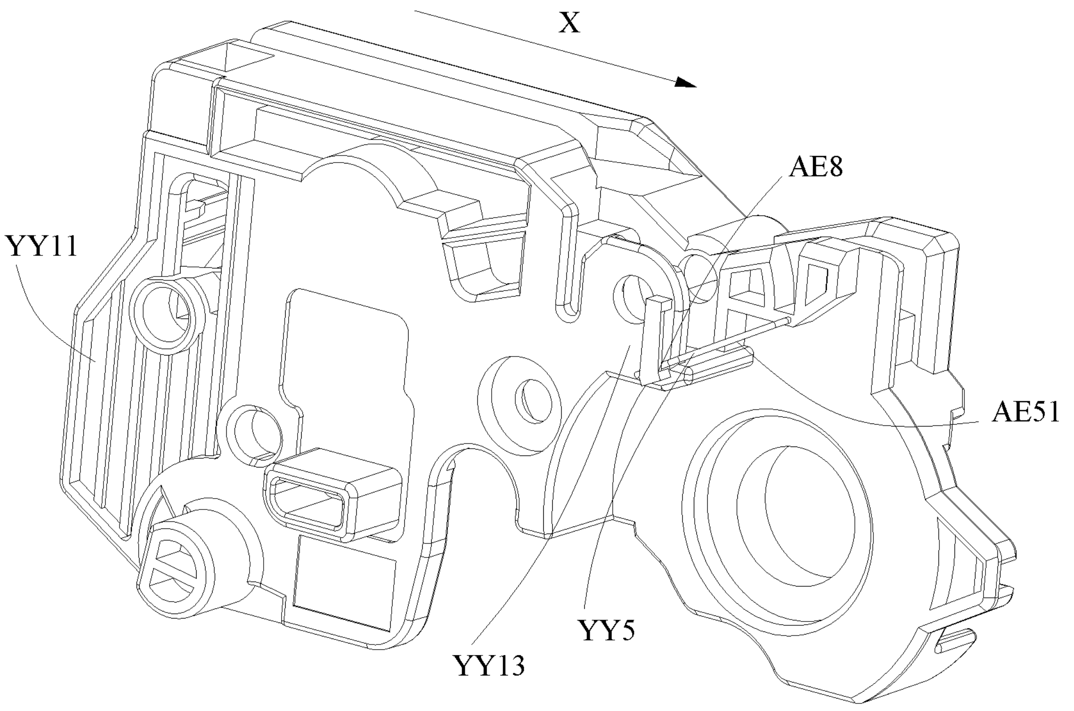

FIG. 278 illustrates a structural schematic of a first end cover and a force applying part before installation according to embodiment fifty seven of the present disclosure.

Figure 279:
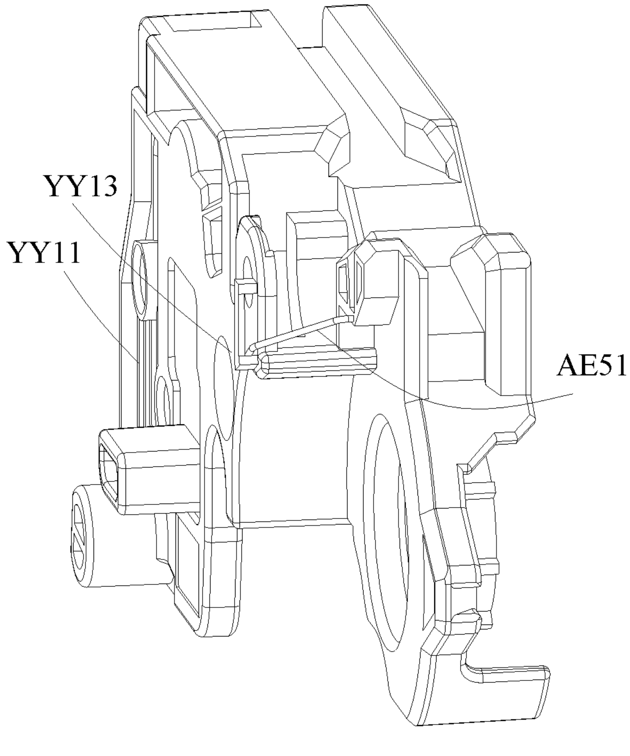

FIG. 279 illustrates a structural schematic of a first end cover and a force applying part before installation according to embodiment fifty seven of the present disclosure.

Figure 280:
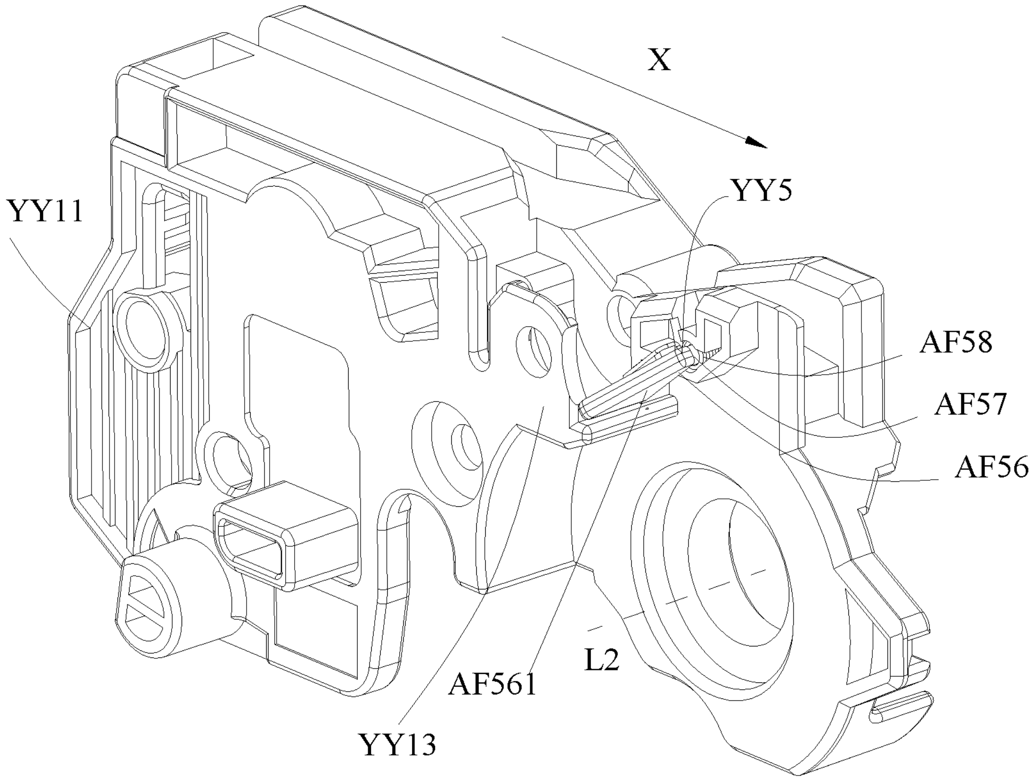

FIG. 280 illustrates a structural schematic of a first end cover and a force applying part before installation according to embodiment fifty eight of the present disclosure.

Figure 281:
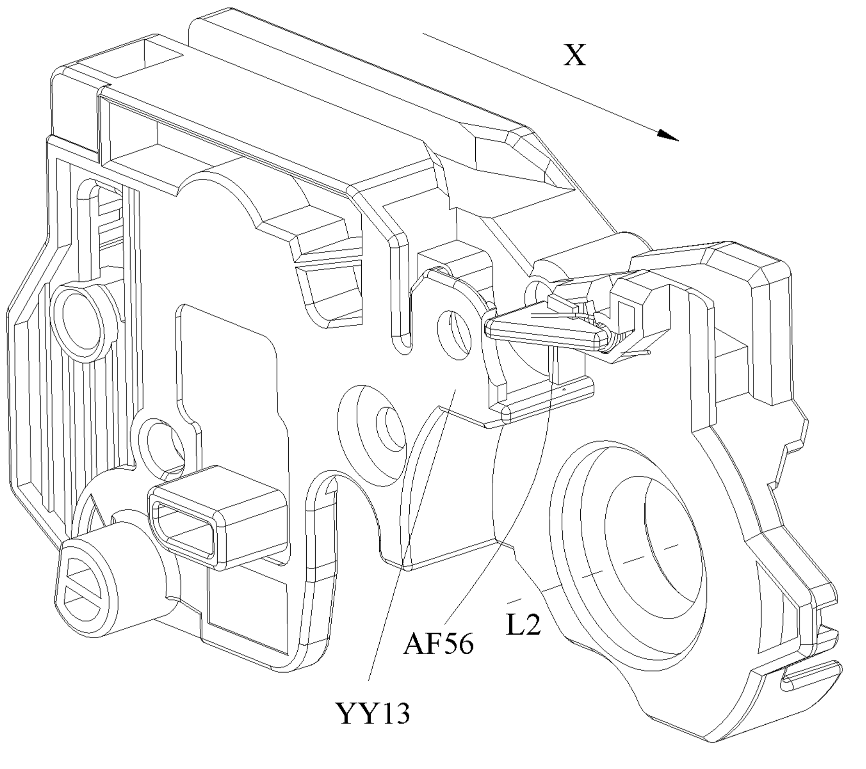

FIG. 281 illustrates a structural schematic of a first end cover and a force applying part during installation according to embodiment fifty eight of the present disclosure.

DETAILED DESCRIPTION

In order to make the objectives, technical solutions and advantages of the present disclosure clearer, the present disclosure is further described in detail below in conjunction with accompanying drawings and embodiments. It should be understood that specific embodiments described herein are only configured to explain the present disclosure and are not intended to limit the present disclosure.

In the description of the present disclosure, unless otherwise clearly specified and limited, the terms "first" and "second" are only configured for the purpose of description and may not be understood as indicating or implying relative importance. Unless otherwise specified or stated, the term "plurality" refers to two or more; the terms "connection", "fixation" and the like should be understood in a broad sense. For example, "connection" may be a fixed connection, a detachable connection, an integral connection, or an electrical connection; and may be a direct connection or an indirect connection through an intermediate. Those of ordinary skill in the art may understand specific meanings of above terms in the present disclosure according to specific situations.

In the description of the present disclosure, it should be understood that the orientation terms such as "up" and "down" described in embodiments of the present disclosure are described from the perspective shown in the drawings and should not be interpreted as the limitation of embodiments of the present disclosure. Furthermore, in the context, it also needs to be understood that when an element is connected "on" or "under" another element, it may not only be directly connected "on" or "under" another element but may also to be indirectly connected "on" or "under" another element through an intermediate element.

Figure 1:
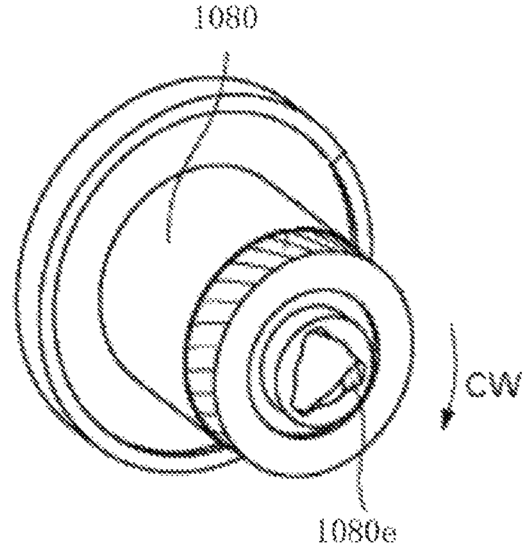
FIGS. 1-2 illustrate structural schematics of a driving unit when a process cartridge is not installed in an electronic image-forming apparatus in the existing technology.
Figure 2:
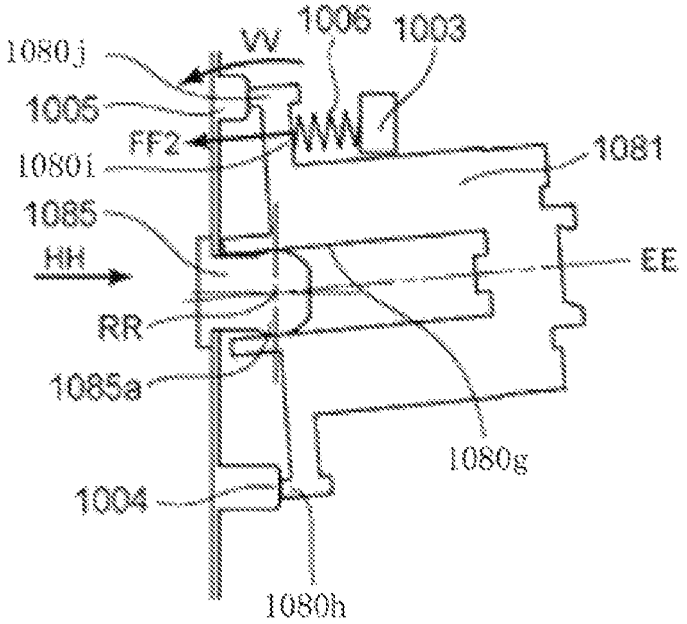

FIGS. 1-2 illustrate structural schematics of a driving unit where a process cartridge is not installed in an electronic image-forming apparatus in the existing technology. As shown in FIG. 1 and FIG. 2, a driving unit 1080 may be disposed at the electronic image-forming apparatus (not shown in drawings), where the driving unit 1080 may include a drive transmission portion 1080*e* for transferring a rotational driving force to the process cartridge, and a CW direction shown in FIG. 1 may be a clockwise direction. For example, the driving unit 1080 may be supported by the support portion 1085*a* of the supporting part 1085. Furthermore, the first contacted portion 1080*h* may abut against the first contact protrusion 1004 disposed in the electronic image-forming apparatus, and a pressing part 1003 may simultaneously apply a pushing force FF2 to the pressed portion 1080*i* of the driving unit 1080 through a spring 1006, such that a second contacted portion 1080*j* may be in contact with a second contact protrusion 1005. At this point, the driving unit 1080 may be at an initial position; and viewed in the direction of the arrow HH parallel to the axis of the supporting part 1085, the axial direction EE of the driving unit 1080 may be inclined relative to a center RR of the support portion 1085*a*.

After the process cartridge is installed in the electronic image-forming apparatus, the force receiving unit of the process cartridge may be in contact with the driving unit 1080, such that the driving unit 1080 may be changed from the inclined state at the initial position to be the direction in parallel with the axial direction of the supporting part 1085, thereby successfully being cooperated and engaged with the force receiving unit to transfer the driving force.

However, the force receiving unit and the driving unit 1080 may generate structural interference during the contact and engagement process. As a result, it is difficult or impossible for the force receiving unit and the driving unit 1080 to be engaged with each other accurately to transfer the driving force, such that certain time is needed for the force receiving unit and the driving unit 1080 to be engaged with each other, which may affect working efficiency of the process cartridge.

Embodiment One

Embodiments of the present disclosure provides an electronic image-forming apparatus, which may include a process cartridge 1, the driving unit 1080 and a driving unit protective cover 108. The driving unit protective cover 1081 may be disposed outside the driving unit 1080.

The electronic image-forming apparatus may be a printer, a copier, an all-in-one scanning and copying machine, etc., which may not be limited herein. The printer may be used as an example to describe the solutions hereinafter. The process cartridge may be a toner cartridge, an ink cartridge or the like.

The process cartridge may include a toner hopper unit and a waste toner hopper unit. The toner hopper unit may include a developing roller, a developing blade, a toner supplying roller and a stirring frame, etc., and the waste toner hopper unit may include a photosensitive drum, a charging roller, and a cleaning blade, etc. The process cartridge may further include a developer, and a force receiving unit for receiving external driving force. The force receiving unit may include a driving head and a driving gear disposed at one end of the photosensitive drum. Furthermore, the process cartridge may also be configured with a positioning portion that may be cooperated with the image-forming apparatus. The developing roller may be driven to rotate to transfer the developer to the photosensitive drum. The developing blade may modify the uniformity of the developer on the developing roller. The stirring frame may loosen the developer inside the toner hopper unit. The charging roller may charge the photosensitive drum, and the cleaning blade may clean excess developer after development on the photosensitive drum.

Figure 3:
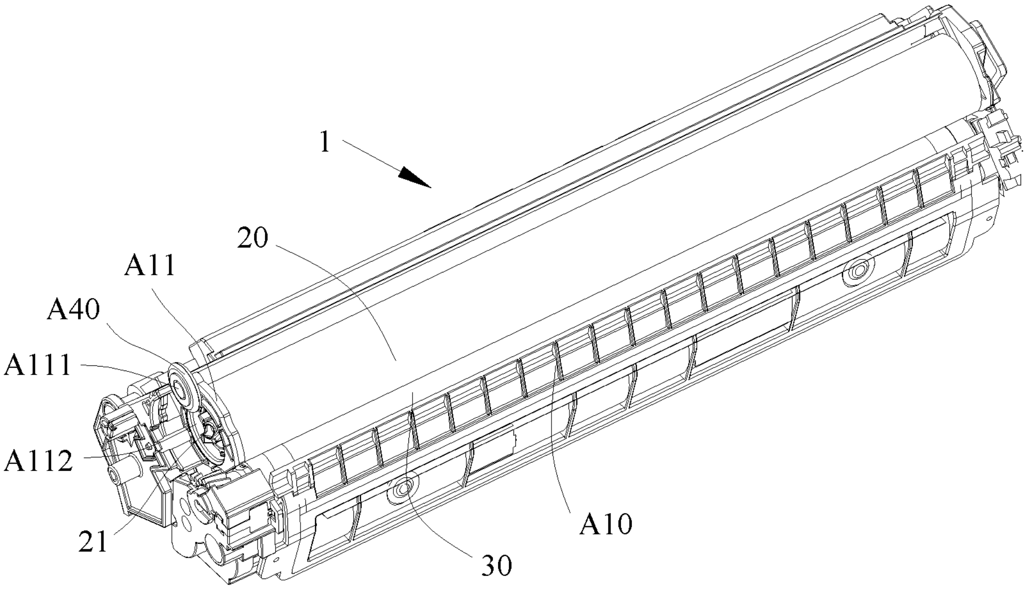
FIG. 3 illustrates a structural schematic of a process cartridge according to embodiment one of the present disclosure.

FIG. 3 illustrates a structural schematic of the process cartridge of the present disclosure. As shown in FIG. 3, the process cartridge 1 may include a cartridge body A10, a photosensitive drum 20, a developing roller 30 and a force receiving unit 21. The cartridge body A10 may contain a developer; and the photosensitive drum 20 and the developing roller 30 may be rotatably disposed at the cartridge body A10. The force receiving unit 21 may be disposed at one end of the cartridge body A10 and connected to the photosensitive drum 20 for being engaged with the driving unit of the electronic image-forming apparatus to receive the driving force outputted by the driving unit of the electronic image-forming apparatus.

For example, the cartridge body A10 may include a bracket A11. The bracket A11 may be a photosensitive drum frame and may include a first fixing column A111 and a through hole A112. The force receiving unit 21 may be fixed on the bracket A11 through the through hole A112 and exposed outside the through hole A112 to receive the driving force outputted by the driving unit 1080. The first fixing column A111 may be disposed above and/or in front of the force receiving unit 21 relative to the axial direction of the photosensitive drum 20.

In order to make the driving unit 1080 change from the inclined state of the initial position into the horizontal state which is capable of being engaged with the force receiving unit 21, the process cartridge 1 may further include a pressing part A40. The pressing part A40 may be fixed on the cartridge body A10 and located at the same end of the cartridge body as the force receiving unit 21 and may be configured for pressing the driving unit 1080 during the installation process of the process cartridge 1 to make the driving unit 1080 to be coaxially-aligned.

Furthermore, the pressing part A40 may be detachably installed on the first fixing column A111 to be fixed on the bracket A11, and at least a part of the pressing part A40 may be located outside the force receiving portion 21 in the axial direction of the photosensitive drum 20. Optionally, the pressing part A40 may be configured as a roller, and the outer surface of the roller may be a guiding-pressing surface, and the guiding-pressing surface may guide and press the driving unit, such that the driving unit may be coaxially-aligned. Furthermore, the outer surface of the roller may be coated with a layer of rubber coating, which may avoid structural interference to cause wear of the driving unit when the pressing part A40 is in contact with the driving unit 1080.

Figure 4:
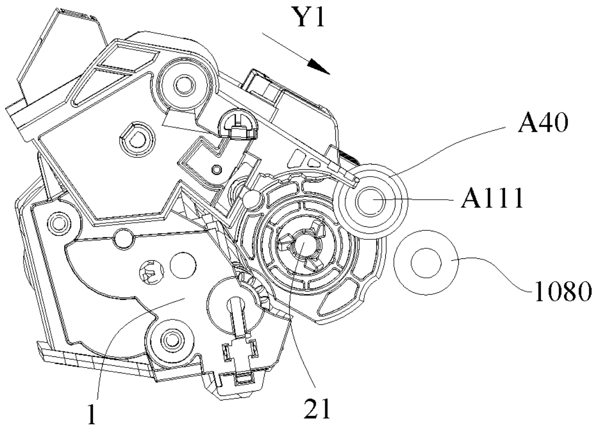
FIGS. 4-6 illustrate schematics of contact and engagement between a force receiving unit of a process cartridge and a driving unit of an electronic image-forming apparatus according to embodiment one of the present disclosure.
Figure 5:
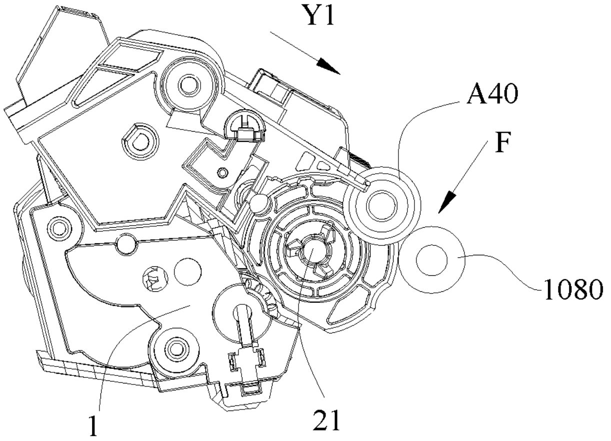
Figure 6:
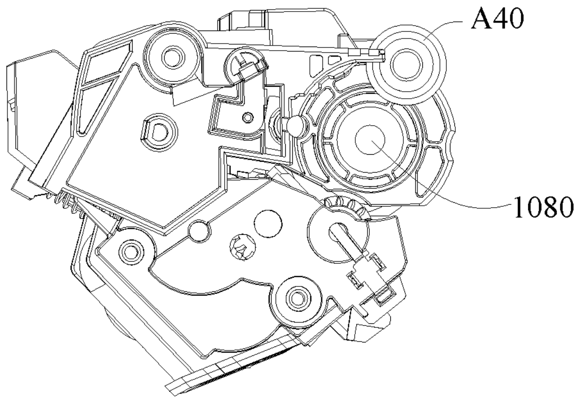

FIGS. 4-6 illustrate schematics of contact and engagement between the force receiving unit of the process cartridge and the driving unit of the electronic image-forming apparatus in the present disclosure. As shown in FIG. 4, when the process cartridge 1 is installed in the electronic image-forming apparatus along the Y1 direction, the pressing part A40 fixed on the bracket may also gradually approach the driving unit 1080 along with the movement of the process cartridge. When the pressing part A40 is in contact with the driving unit 1080 to form structural interference, the pressing part A40 may apply a pressing force F on the driving unit 1080. The driving unit 1080 may move in a direction close to the force receiving unit 21 after receiving the pressing force, such that the driving unit 1080 may be in contact with the pressing part A40 and drive the pressing part A40 to rotate. Meanwhile, since the pressing part A40 may be fixedly installed on the bracket, the pressing part A40 may be always maintained to be in parallel with the axial direction of the photosensitive drum 20 during the engagement process of the force receiving unit 21 and the driving unit 1080. That is, the distance between the pressing part A40 and the axis of the photosensitive drum 20 may not change in displacement. With the installation of the process cartridge 1 in place, the driving unit 1080 may move from the initial position to the position in parallel with the axial direction of the supporting part A1085. At this point, the pressing part A40 may be disposed above and/or in front of the force receiving unit 21 relative to the axial direction of the photosensitive drum 20. Finally, the driving unit 1080 may be successfully engaged with the force receiving unit 21, thereby realizing that the driving unit 1080 transfers the driving force to the force receiving unit 21 and drive the photosensitive drum 20 to rotate.

In one embodiment, the pressing part may be disposed on the process cartridge, the pressing part A40 may force the driving unit 1080 to move from the initial inclined position to the position approximately in parallel with the axial direction of the photosensitive drum, and on the plane perpendicular to the axial direction of the photosensitive drum, the projection of the pressing part may not be coincident with the projection of the photosensitive drum at all. Therefore, the contact and engagement process between the force receiving unit and the driving unit may be made smoother, which may greatly save the time for contact and engagement between the force receiving unit and the driving unit and improve working efficiency of the process cartridge.

Embodiment Two

Another process cartridge is provided in one embodiment; and the structures which are same as the structures of the process cartridge in embodiment one may not be described.

Figure 7:
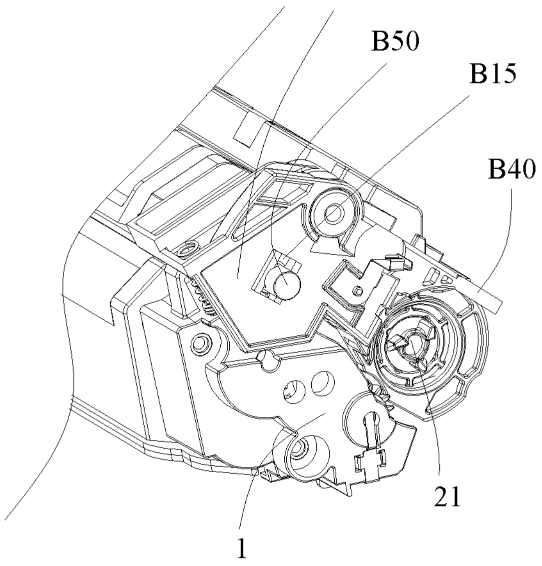
FIG. 7 illustrates a structural schematic of a process cartridge according to embodiment two of the present disclosure.
Figure 8:
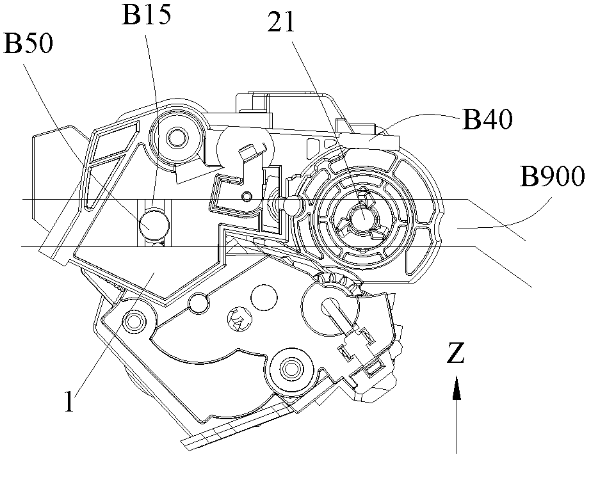
FIG. 8 illustrates a schematic of a process cartridge installed in an installation guide rail of an electronic image-forming apparatus according to embodiment two of the present disclosure.

As shown in FIG. 7 and FIG. 8, the process cartridge 1 may further include a movable positioning portion B50. The positioning portion B50 may be movably disposed at the bracket B11 and at the same end as the force receiving unit 21, and the positioning portion B50 may move in the first direction relative to the bracket B11, where the first direction may be the height extending direction of the process cartridge (the direction Z in FIG. 8). Furthermore, a chute B15 may be formed at the bracket B11. The chute B15 may be a rectangular chute or a circular chute, or a chute with other regular or irregular structures, which may not be limited herein. The positioning portion B50 may be slidably disposed at the chute B15, such that the positioning portion B50 may move along the chute B15 relative to the cartridge body.

When the process cartridge 1 is installed in the electronic image-forming apparatus along the forward direction (the installation direction of the process cartridge) through the installation guide rail B900 on the inner side of the electronic image-forming apparatus, the positioning portion B50 may be supported by the installation guide rail B900 on the inner side of the electronic image-forming apparatus and move forward along the installation guide rail B900. The positioning portion B50 may move relative to the cartridge body, and during the installation process, the positioning portion B50 may be supported on the installation guide rail B900. Therefore, during the installation process of the process cartridge 1, the cartridge body of the process cartridge 1 may have a certain displacement relative to the installation guide rail B900 of the electronic image-forming apparatus, and the pressing part B40 located at the end of the cartridge body may also have a certain movement amount (at least may move up and down) relative to the driving unit 1080 inside the electronic image-forming apparatus or the installation guide rail B900 of the electronic image-forming apparatus with overall movement of the process cartridge 1. Through such movement amount, the pressing part B40 may achieve a certain upward movement relative to the driving unit 1080, and after the process cartridge is installed in place, it may move downward to press the driving unit 1080, such that the driving unit 1080 may be substantially coaxially engaged with the force receiving unit 900 to transfer the driving force. In addition, the pressing part B40 may force the driving unit 1080 to move from the initial inclined position to the position approximately in parallel with the axial direction of the photosensitive drum; and on a plane perpendicular to the axial direction of the photosensitive drum, the projection of the pressing part may not be coincident with the projection of the photosensitive drum at all.

In one embodiment, due to the setting of the positioning portion B50, the pressing part B40 may be installed in the electronic image-forming apparatus in the process cartridge 1, and the positioning portion B50 may move along the chute B15 relative to the cartridge body and drive the pressing part B40 disposed at the cartridge body to move relative to the cartridge body. That is, the pressing part B40 may obtain a certain movement amount, such that the pressing part B40 installed on the process cartridge 1 may easily press down the driving unit 1080 to avoid mutual interference.

In addition, the technical solutions of above-mentioned embodiment one and embodiment two may also be combined with each other. For example, the movable positioning portion of embodiment two may be applied to the process cartridge of embodiment one to increase function. In such way, the process cartridge of embodiment one may facilitate the engagement between the force receiving unit and the driving unit; and embodiments may be not mutually exclusive.

Embodiment Three

A pressing part is provided in one embodiment, which may be a further improvement on the basis of embodiment two. Undescribed parts may be same as those in above-mentioned embodiments, which may not be described in detail for brevity.

Figure 9:
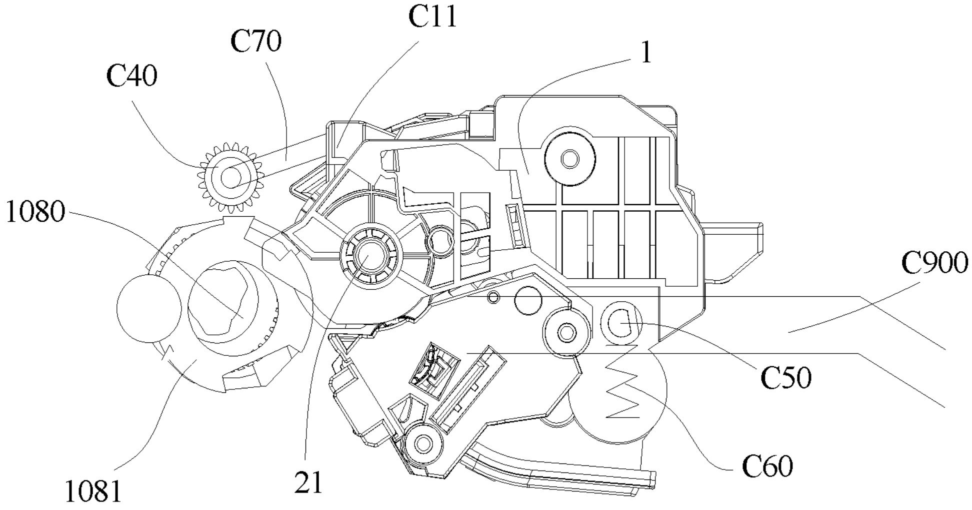
FIGS. 9-10 illustrate working principle schematics of a pressing part of a process cartridge according to embodiment three of the present disclosure.
Figure 10:
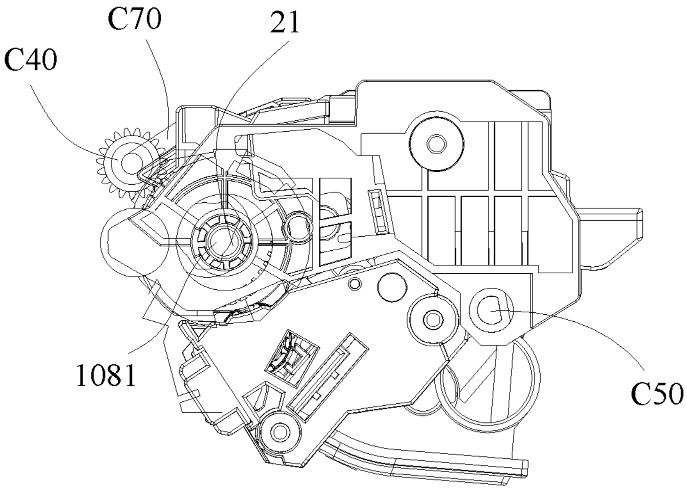

As shown in FIGS. 9 and 10, the process cartridge 1 may further include a movable positioning portion C50 and an elastic stretching/compressing part C60. The positioning portion C50 may be disposed at a bracket C11 and located at the same end of the cartridge body as the force receiving unit 21; and the positioning portion C50 may be connected to the bracket C11 through the elastic stretching/compressing part F60, such that the positioning portion C50 may move relative to the process cartridge main body. The process cartridge 1 may further include a pressing part C40, which may be connected to the bracket C11 through a connecting rod part C70. For example, the pressing part C40 may be a gear, and the outer surface of the gear may be a guiding-pressing surface.

When the process cartridge 1 is installed in the electronic image-forming apparatus along the forward direction (the installation direction of the process cartridge) through the installation guide rail C900 on the inner side of the electronic image-forming apparatus, the positioning portion C50 may be supported by the installation guide rail C900 on the inner side of the electronic image-forming apparatus and move forward along the installation guide rail C900. The positioning portion C50 may move relative to the process cartridge 1, and during the installation process, the positioning portion C50 may be supported on the installation guide rail C900. Therefore, during the installation process of the process cartridge 1, the process cartridge 1 may have a certain displacement relative to the installation guide rail B900 of the electronic image-forming apparatus.

For example, during the installation process of the process cartridge 1 on the electronic image-forming apparatus, the pressing part C40 may first touch a blocking wall 1081 disposed at the outer periphery of the driving unit 1080, such that entire process cartridge may move upward relative to the installation guide rail C900 to avoid high point in the installation process. In addition, when the process cartridge is completely installed in place, the process cartridge may also move down to a designated position. During the downward movement of the process cartridge, the pressing part C40 disposed at the front of the process cartridge may also realize a certain movement amount relative to the driving unit 1080 inside the electronic image-forming apparatus or the installation guide rail C900 of the electronic image-forming apparatus along overall movement of the process cartridge (at least up and down movement may be achieved).

Figure 11:
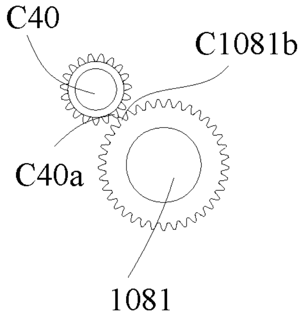
FIGS. 11-12 illustrate schematics of an engagement process of a pressing part and a driving unit according to embodiment three of the present disclosure.
Figure 12:
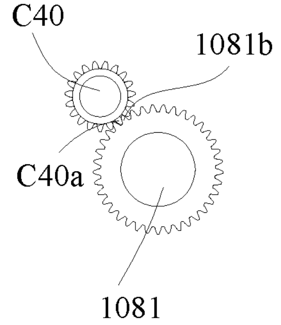

As shown in FIGS. 11 and 12, when the pressing part C40 fixed on the bracket C11 gradually approaches the driving unit 1080 and contacts the driving unit 1080 as the process cartridge moves, a gear portion C40*a* of the pressing part C40 may form structural interference with a gear portion C1081*b* of the driving unit 1080 and may be engaged with each other. Furthermore, the gear modulus of the pressing part C40 is slightly different from the gear modulus of the driving unit 1080, such that after the pressing part C40 and the driving unit 1080 are engaged with multiple tooth shapes, the pressing part C40 and the driving unit 1080 may generate teeth butt. In addition, the pressing part C40 may also be fixed relative to the process cartridge, such that when the tooth butt occurs, the driving unit 1080 may move from the initial inclined position to the position roughly in parallel or coaxial with the axial direction of the force receiving unit 21 by being engaged with the pressing part C40; and on a plane perpendicular to the axial direction of the photosensitive drum, the projection of the pressing part may not be coincident with the projection of the photosensitive drum at all. Finally, the driving unit 1080 may be successfully engaged with the force receiving unit 21. During whole process, the distance of the pressing part C40 relative to the axis of the photosensitive drum may not change in displacement.

In some embodiments, after the driving unit 1080 rotates, the driving unit 1080 may be smoothly engaged with the force receiving unit 21.

Embodiment Four

Figure 13:
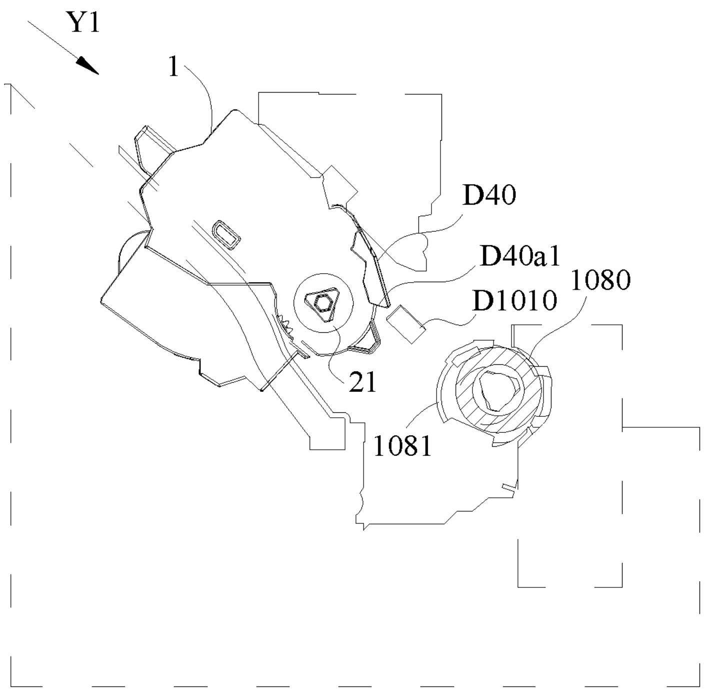
FIGS. 13-14B illustrate schematics of an installation process of a process cartridge according to embodiment four of the present disclosure.
Figure 31:
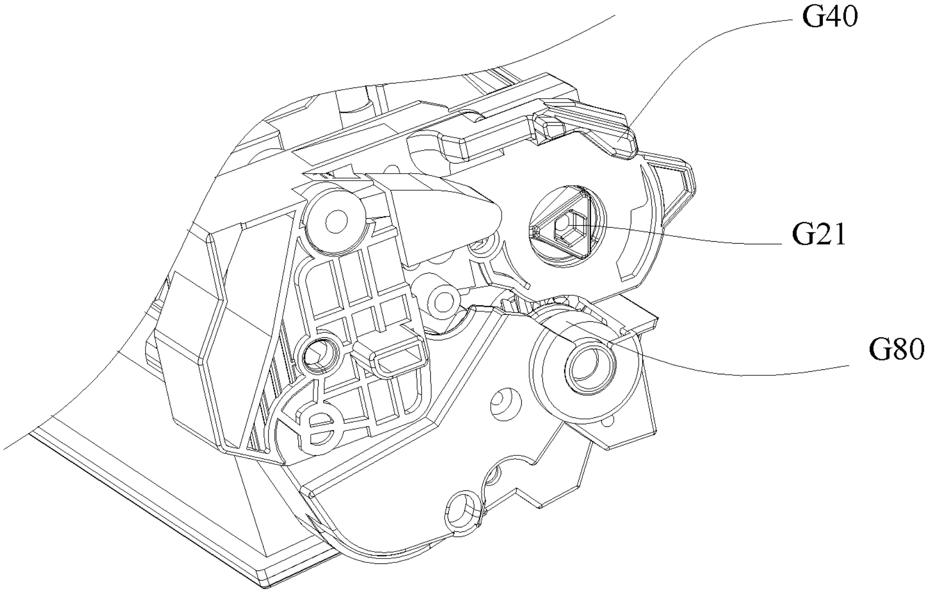
FIG. 31 illustrates a structural schematic of one side of a pressing part of a process cartridge according to embodiment seven of the present disclosure.
Figure 32:
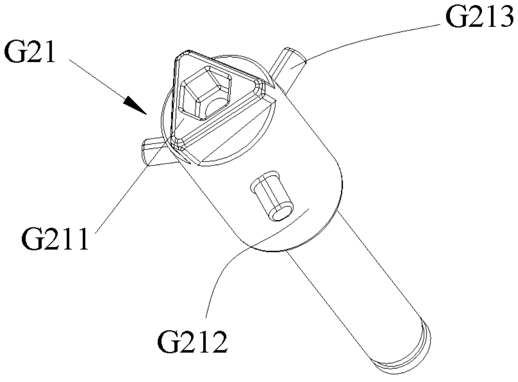
FIG. 32 illustrates a structural schematic of a force receiving unit of a process cartridge according to embodiment seven of the present disclosure.
Figure 33:
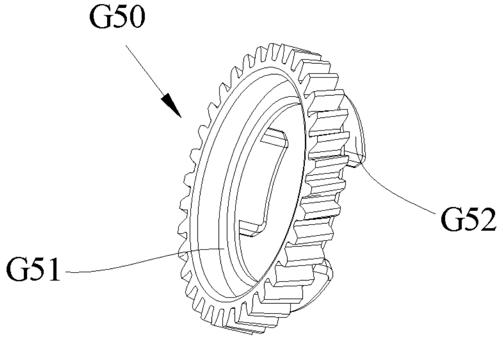
FIG. 33 illustrates a structural schematic of a movable part of a process cartridge according to embodiment seven of the present disclosure.
Figure 34:
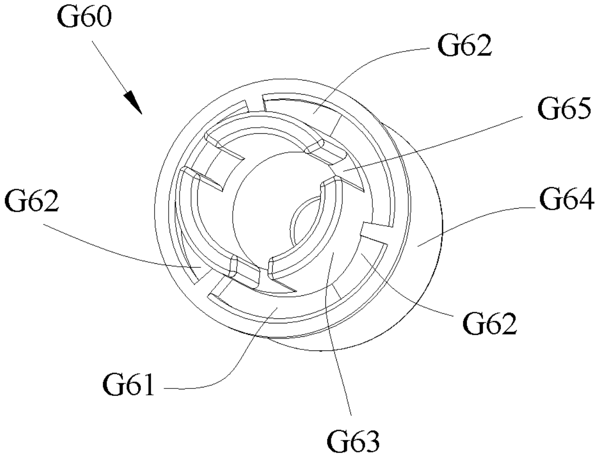
FIG. 34 illustrates a structural schematic of a supporting part of a process cartridge according to embodiment seven of the present disclosure.

As shown in FIG. 13, a block-shaped protrusion D1010 may be disposed on the side wall of the electronic image-forming apparatus. The block-shaped protrusion D1010 may be disposed above the driving unit 1080 or the installation guide rail 900 (a portion of the installation guide rail) and located in the installation space of the process cartridge 1 in the electronic image-forming apparatus (refer to the installation space of the process cartridge 1 in FIG. 31). For the rest of undescribed parts, reference may be made to the content in above-mentioned embodiments, which may not be described in detail for brevity.

As shown in FIGS. 13-16B, another pressing part in the process cartridge is provided in one embodiment. In one embodiment, the pressing part D40 may be fixedly disposed at the process cartridge 1, or the pressing part D40 may be integrally formed with the process cartridge and located on the same side as the force receiving unit 21; and on a plane perpendicular to the axial direction of the photosensitive drum, the projection of the pressing part D40 may not be coincident with the projection of the photosensitive drum at all. In addition, the pressing part D40 may include a guiding-pressing surface D40*a*1 (an inclined surface or an arc). The guiding-pressing surface D40*a*1 may be disposed on the side facing the force receiving unit 21 at the front end of the pressing part D40 (along the installation direction of the process cartridge 1). The guiding-pressing surface D40*a*1 may be disposed corresponding to the block-shaped protrusion D1010. The installation process in one embodiment is described hereinafter.

Figure 14A:
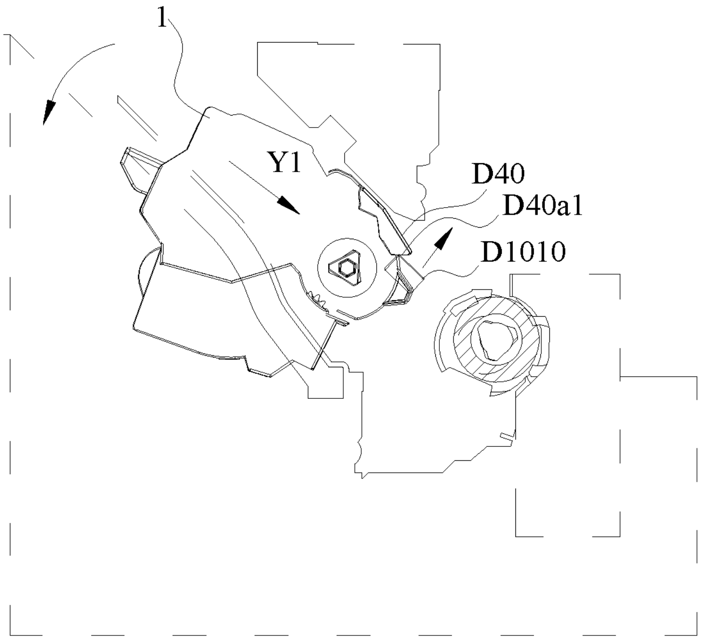

As shown in FIGS. 13 and 14A, when the process cartridge 1 is installed in the electronic image-forming apparatus along the Y1 direction, the front end of the pressing part D40 may correspond to the block-shaped protrusion D1010 on the side wall of the electronic image-forming apparatus. As the process cartridge 1 continues to be installed and moved, the guiding-pressing surface D40*a*1 of the pressing part D40 may be abutted against the block-shaped protrusion D1010, and the pressing part D40 may move upward and forward under the action of the guiding-pressing surface D40*a*1 and the block-shaped protrusion D1010. Since the pressing part D40 may be fixedly disposed at the process cartridge 1 or the pressing part D40 is integrally formed with the process cartridge, the upward movement of the pressing part D40 may also drive the front end of the process cartridge 1 to move upward, such that whole process cartridge 1 may rotate along the counter-clockwise direction (viewed from the axial direction of the force receiving unit 21).

Figure 14B:
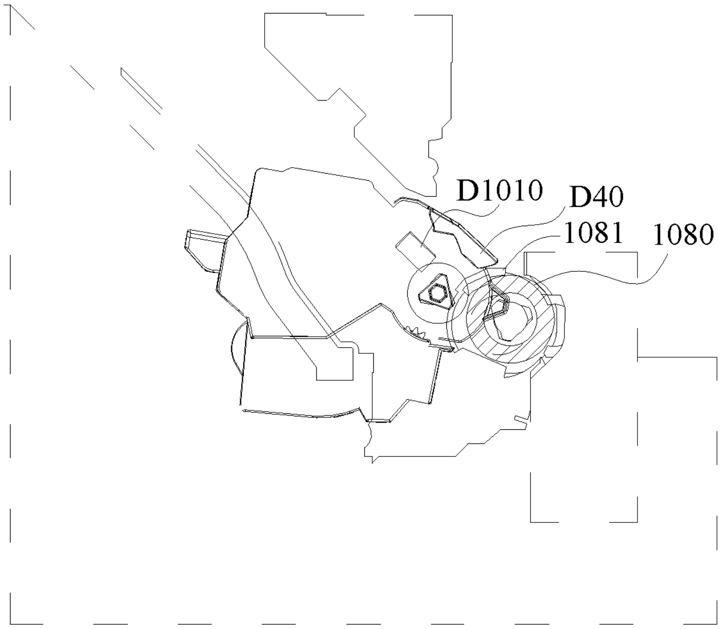
Figure 15A:
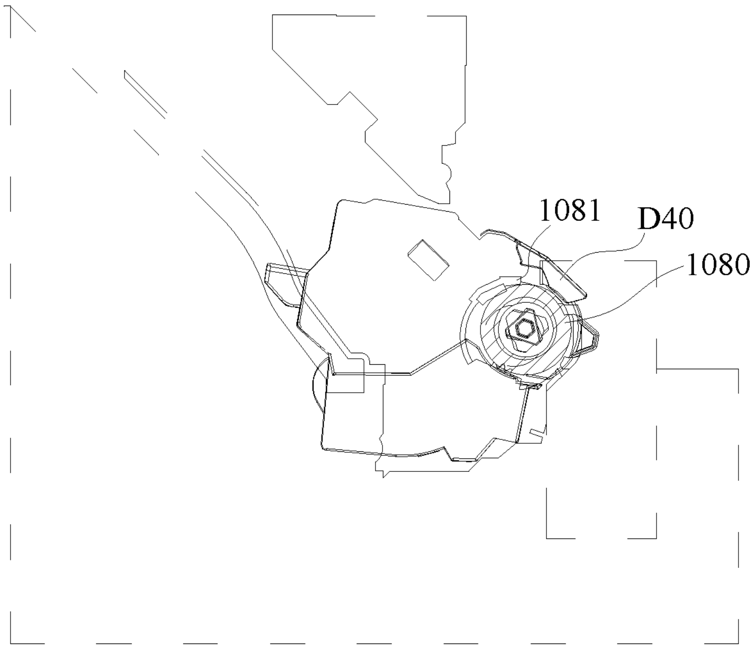
FIGS. 15A-15B illustrate schematics of an installation process of a process cartridge according to embodiment four of the present disclosure.

As shown in FIG. 14B, as the process cartridge 1 continues to be installed, the pressing part D40 may move pass over the block-shaped protrusion D1010 and then move to the top of the blocking wall 1081. At this point, the front end of the pressing part D40 may be about to pass over the blocking wall 1081 and enter an opening position of the blocking wall 1081 to contact the driving unit 1080 as shown in FIG. 15A.

Figure 15B:
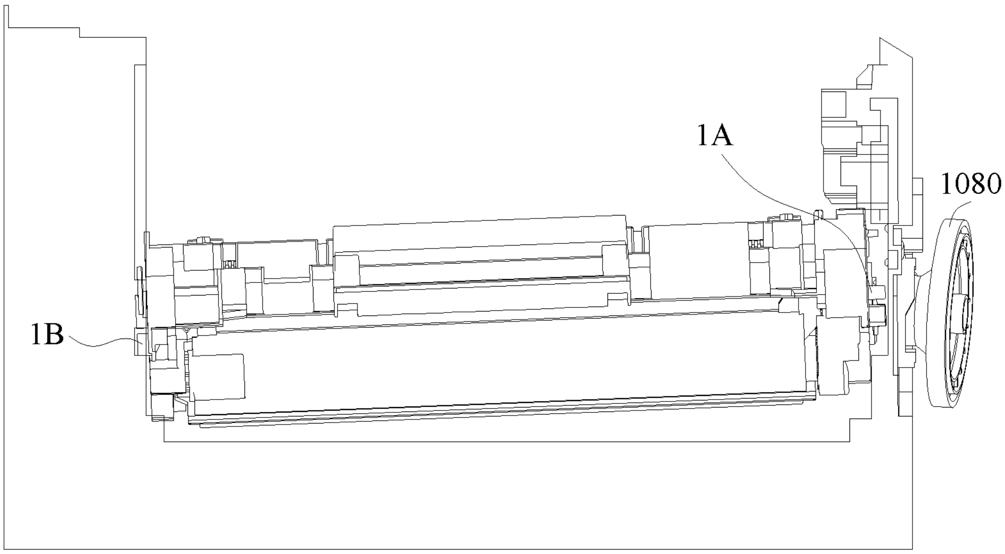

As shown in FIG. 15B, after the process cartridge 1 is installed in the electronic image-forming apparatus in place, the pressing part D40 may be located above the driving unit 1080. Viewed from the back of the process cartridge 1, one end 1A of the process cartridge 1, that is, the end where the force receiving unit 21 is located, may be more upward in the electronic image-forming apparatus relative to the other end 1B of the process cartridge 1 (the process cartridge 1 is partially upturned).

Figure 16A:
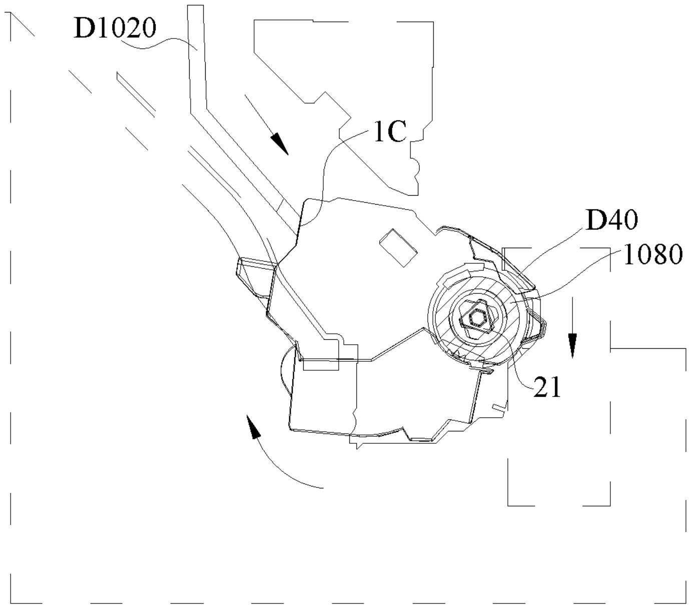
FIGS. 16A-16B illustrate schematics after a process cartridge is installed in place according to embodiment four of the present disclosure.
Figure 16B:
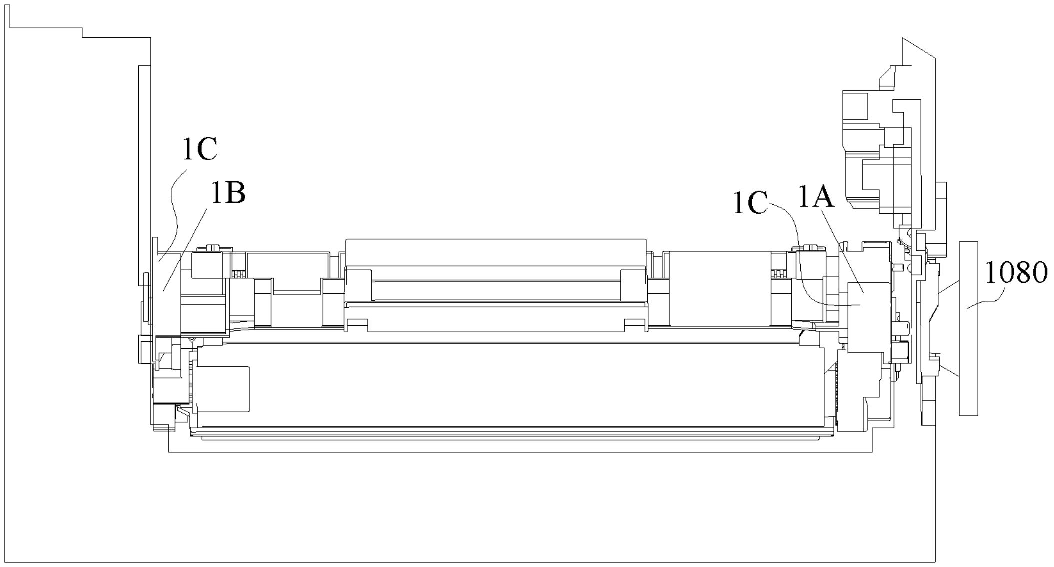

As shown in FIGS. 16A and 16B, with closing of the door cover of the electronic image-forming apparatus, the pressing rod D1020 inside the door cover may press down the upper surfaces 1C on the left and right sides of the back of the housing of the process cartridge 1, such that the force may be applied to the process cartridge 1 as a whole, and the front end of the process cartridge 1 may move downward to drive the pressing part D40 to move downward. At this point, the front end of the pressing part D40 may press down the driving unit 1080 to move downward to be substantially coaxial with the force receiving unit 21 to receive the driving force. Since the force receiving unit 21 is coaxial with the driving unit 1080, the lower rear portion of the process cartridge 1 may rotate along the clockwise direction. When the pressing rod D1020 applies the pressing force to the left and right sides of the process cartridge 1, two ends (1A and 1B) of the process cartridge 1 may be kept substantially horizontal.

In some embodiments, the process cartridge may also make the front end of the pressing part D40 press down the driving unit 1080 under the action of its own gravity, such that the driving unit 1080 may move downward to be substantially coaxially with the force receiving unit 21 to receive the driving force.

Embodiment Five

Figure 17A:
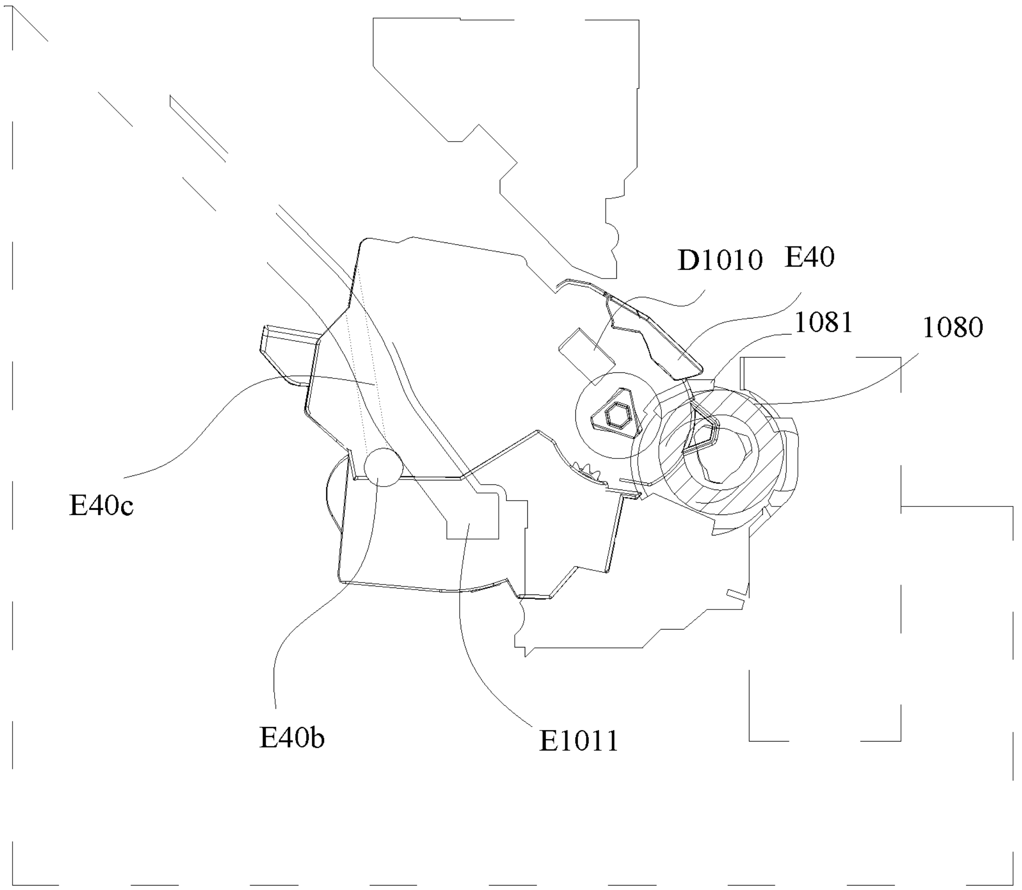
FIG. 17A illustrates a schematic of movement of a process cartridge during installation according to embodiment five of the present disclosure.
Figure 17B:
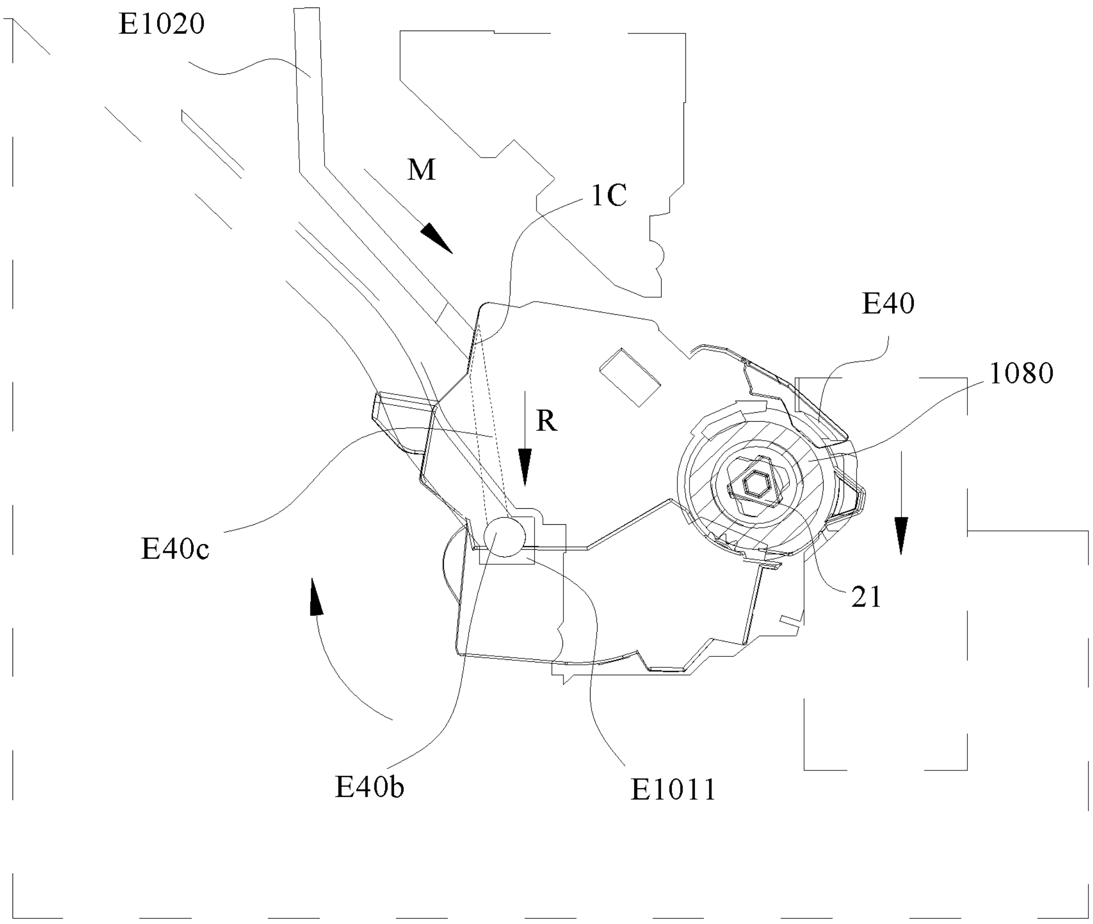
FIG. 17B illustrates a schematic of a process cartridge installed in place under the pressing effect of a pressing rod according to embodiment five of the present disclosure.
Figure 18:
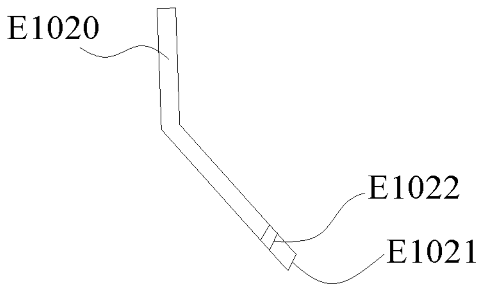
FIG. 18 illustrates a structural schematic of a pressing rod according to embodiment five of the present disclosure.

In one embodiment, the process cartridge is further improved on the basis of embodiment four, and undescribed parts may be same as those in embodiment four. As shown in FIGS. 17A-18, the process cartridge may further include a limiting-guiding part E40*b*, an elastic part (not shown in drawings) and a guiding-control part E40*c*. The limiting-guiding part E40*b* may be movably disposed at the end cover of the process cartridge 1 and located at the same end of the cartridge body as the force receiving unit 21; and the limiting-guiding part E40*b* may move along the axial direction of the photosensitive drum. For example, the limiting-guiding guide E40*b* may be a protrusion disposed on the end cover of the process cartridge 1, such as a cylindrical structure. The elastic part may be sleeved on the limiting-guiding part E40*b*, and two ends of the elastic part may be respectively abutted against the limiting-guiding part E40*b* and the inner wall of the end cover. A force directed toward the inside of the end cover may be applied on the limiting-guiding guide E40*b* through the elastic part. When no other external force is applied, the limiting-guiding guide E40*b* may remain retracted on the end cover, such that the end cover of the process cartridge 1 may not interfere with the inner wall of the electronic image-forming apparatus during the installation process of the process cartridge.

The guiding-control part E40*c* may be a swing rod, which may be disposed inside the end cover of the process cartridge 1. The receiving portion for the swing rod may be located at the rear of the process cartridge. The receiving portion of the swing rod may receive the driving force from the pressing rod E1020 (shown in FIG. 18 and described subsequently) and transfer received external force to the limiting-guiding part E40*b*. For example, the limiting guide E40*b* may be pushed out of the end cover to be at a protruding state by means of inclined plane fitting or the like. The similarity between one embodiment and embodiment four may be that the pressing part E40 may be fixedly disposed at the cartridge body or the pressing part E40 may be integrally formed with the process cartridge; and when the process cartridge 1 is installed in the electronic image-forming apparatus, the pressing part E40 may be above the driving unit 1080.

Furthermore, as the door cover of the electronic image-forming apparatus is closed, the pressing rod E1020 inside the door cover may press down the upper surfaces 1C on the left and right sides of the back of the housing of the process cartridge 1, such that the force may be applied on the process cartridge 1 as a whole. The front end of the process cartridge 1 may move downward accordingly to drive the pressing part E40 to move downward. At this point, the front end of the pressing part E40 may press down on the driving unit 1080, such that the driving unit 1080 may move downward to be substantially coaxial with the force receiving unit 21 to receive the driving force. The pressing part E40 may force the driving unit 1080 to move from the initial inclined position to the position substantially in parallel with the axial direction of the photosensitive drum. In addition, on a plane perpendicular to the axial direction of the photosensitive drum, the projection of the pressing part E40 may not be coincident with the projection of the photosensitive drum at all. Since the force receiving unit 21 is coaxial with the driving unit 1080, the lower rear portion of the process cartridge 1 may rotate along the clockwise direction. When the pressing rod E1020 applies the pressing force on the left and right sides of the process cartridge 1, two ends (1A and 1B) of the process cartridge 1 may be kept substantially horizontal. Meanwhile, the pressing rod E1020 may also press the guiding-control part E40*c*, such that the guiding-control part E40*c* may move in the end cover along the direction of the arrow R, and then the limiting-guiding part E40*b* which is originally in the retracting state may protrude out from the end cover (the limiting-guiding part E40*b* protrudes perpendicular to the paper direction in drawings) through the means of inclined plane fitting or the like. At this point, since the process cartridge is in the coaxially-aligned, the protruding limiting-guiding part E40*b* may be locked into a limit groove E1011 in the electronic image-forming apparatus, thereby limiting the installed process cartridge which may make the process cartridge to be not shaking easily and engage printing operations stably.

When the process cartridge needs to be removed from the electronic image-forming apparatus, the door cover may be opened to lift up the pressing rod E1020. Therefore, as the force applied to the guiding-control part E40*c* is removed, the elastic reset force of the elastic part connected to the limiting-guiding part E40*b* may make the limiting-guiding part E40*b* to be retracted into the end cover, and also make the guiding-control part E40*c* to be returned to the state before installation. Optionally, the pressing rod E1020 may first press the upper surface 1C of the process cartridge 1, such that the process cartridge may be at the coaxially-aligned position, and then the pressing rod E1020 may apply the force on the guiding-control part E40*c*, such that the limiting-guiding guide E40*b* may be protruded out to be locked into the limiting groove E1011. Such process may be realized by setting different step surfaces on the pressing rod E1020 along the forward direction, for example, sequentially setting the first stepped surface E1021 and the second stepped surface E1022 along the forward direction (arrow M) of the pressing rod E1020. When the door cover is closed and the pressing rod E1020 is pressed to the inside of the device, the first step surface E1021 may first press the upper surface 1C of the process cartridge, such that the process cartridge may perform alignment operation, and then with further pressing of the pressing rod E1020, the second stepped surface E1022 may start to contact and press the force receiving surface of the guiding-control part E40*c*, such that the limiting guide E40*b* may protrude out to be into the limiting groove E1011. In addition, the guiding-control part E40*c* may not be limited to be disposed inside the end cover, and may also be disposed outside the process cartridge, which may not be limited herein.

Embodiment Six

Figure 19:
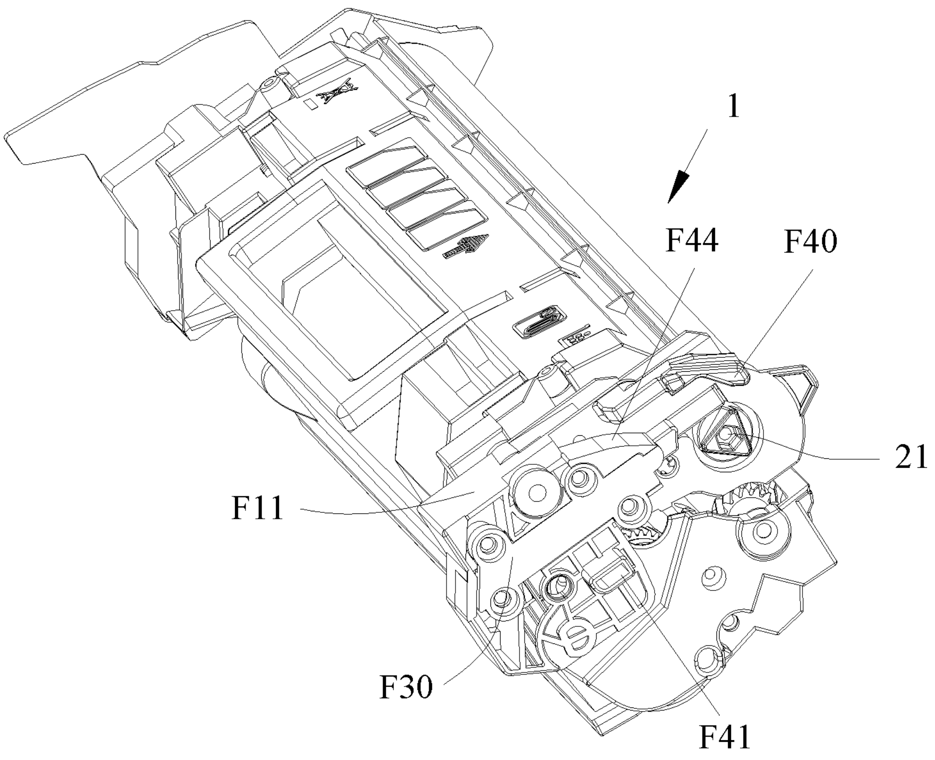
FIG. 19 illustrates a structural schematic of a process cartridge according to embodiment six of the present disclosure.
Figure 20:
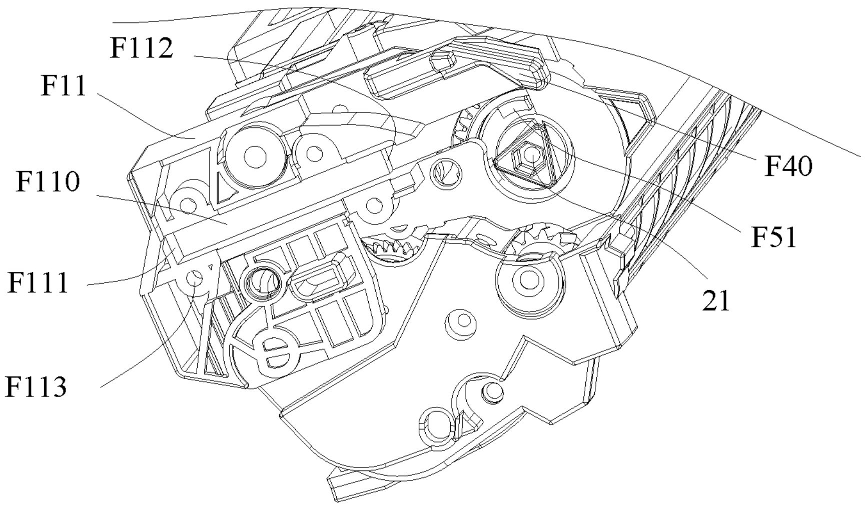
FIG. 20 illustrates a structural schematic of one side of a pressing part of a process cartridge according to embodiment six of the present disclosure.

On the basis of embodiment two or embodiment four, another process cartridge structure is provided in one embodiment. As shown in FIGS. 19 and 20, the process cartridge 1 may include a force receiving unit 21, a bracket F11, a pressing part F40 and a control mechanism F30. The force receiving unit 21 may be movably disposed at one end of the cartridge body for receiving the driving force of the electronic image-forming apparatus, and the control mechanism F30 may be configured for controlling the force receiving unit 21 to generate movement along the axial direction of the photosensitive drum. The pressing part F40 may be fixedly disposed at the cartridge body, or the pressing part F40 may be integrally formed with the process cartridge and located at the same end as the force receiving unit 21. The driving unit 1080 (as shown in FIG. 15B) may be pressed by the pressing part F40, such that the driving unit may be at the coaxially-aligned position. In addition, the pressing part F40 may force the driving unit 1080 to move from the initial inclined position to the position approximately in parallel with the axis of the photosensitive drum. On a plane perpendicular to the axial direction of the photosensitive drum, the projection of the pressing part F40 may not be coincident with the projection of the photosensitive drum at all. The bracket F11 may be disposed at one end of the cartridge body, and the bracket F11 may be configured with an elongated groove F110 and a plurality of installation holes F113. The groove F110 may include the first end F111 and the second end F112.

Figure 21:
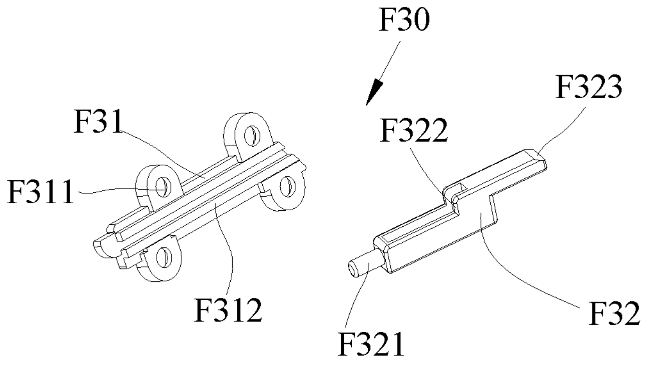
FIG. 21 illustrates a structural schematic of a control mechanism of a process cartridge according to embodiment six of the present disclosure.

As shown in FIG. 21, the control mechanism F30 may include a fixing portion F31 and a pressing part F32; and the fixing portion F31 may be configured with a plurality of fixing holes F311 and ribs F312. One end of the pressing member F32 may be configured with a connecting column F321, and the other end of the pressing member F32 be configured with a pressing portion F323. The pressing portion F323 may include an inclined surface, and the middle F322 of the pressing member F32 may be a chamfered structure, such that a height displacement difference may be between the connecting column F321 and the pressing portion F323 along the width direction of the pressing member F32.

Figure 22:
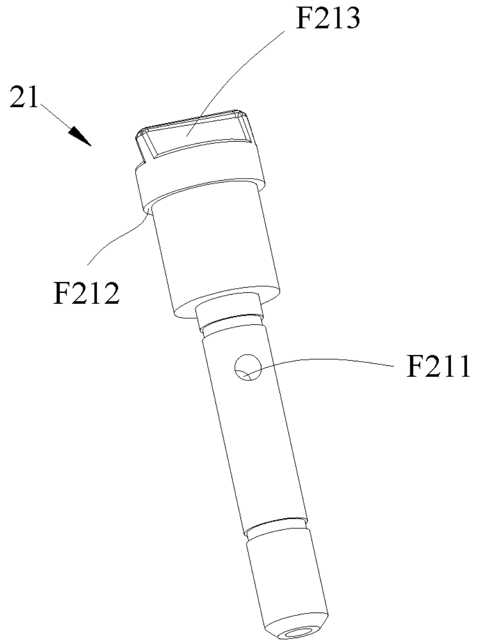
FIG. 22 illustrates a structural schematic of a force receiving unit of a process cartridge according to embodiment six of the present disclosure.
Figure 23:
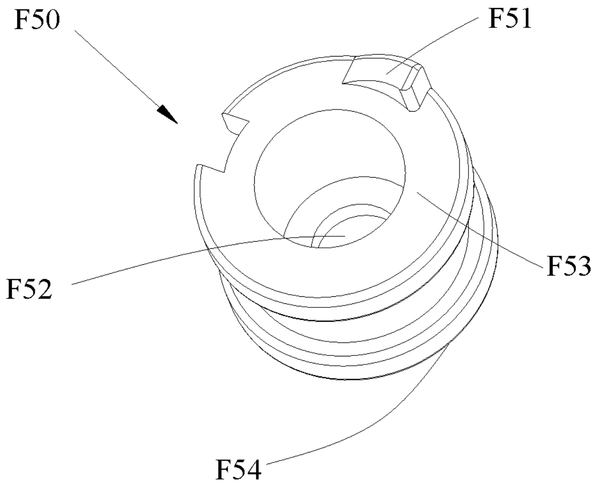
FIG. 23 illustrates a structural schematic of a movable part of a process cartridge according to embodiment six of the present disclosure.
Figure 24:
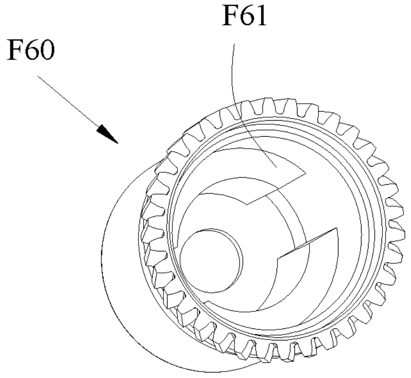
FIG. 24 illustrates a structural schematic of a hub of a process cartridge according to embodiment six of the present disclosure.

As shown in FIGS. 22-24, the process cartridge 1 may further include a hub F60, a movable member F50, a connecting part F70 and a first elastic part F90. The force receiving unit 21 be configured with an engaging portion F213 and a connecting hole F211 which may be engaged with the driving unit 1080, and an abutting surface F212 extending outward along the axis of the force receiving unit 21 may be disposed between the engaging portion F213 and the connecting hole F211. The movable member F50 may be a cylindrical structure. For example, the movable member F50 may include an upper surface F53, a lower surface F54, a through hole F52 and a protrusion F51. The protrusion F51 may be disposed at the upper surface F53. The protrusion F51 may protrude away from the upper surface F53 and include an inclined surface. The outer circumference of the wheel hub F60 may be configured with a gear portion, and the inside of the wheel hub F60 may be further configured with two supporting parts F61 disposed at intervals.

Figure 25:
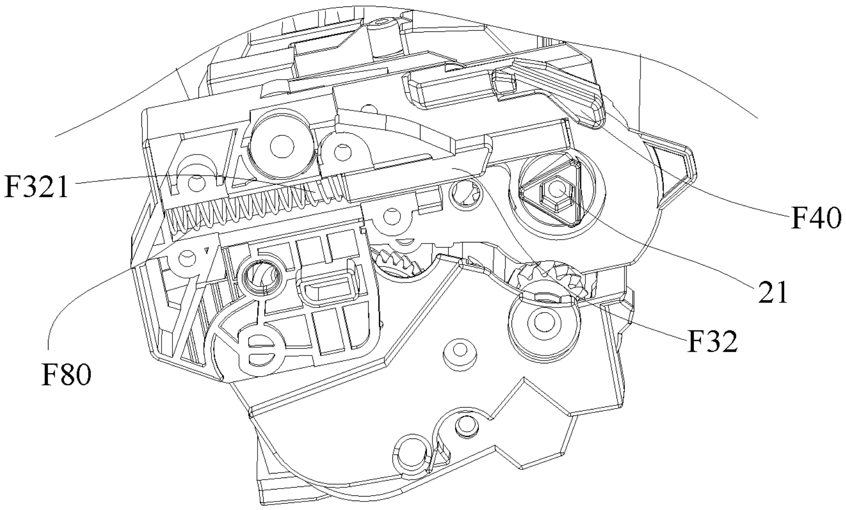
FIG. 25 illustrates a structural schematic of a force receiving unit of a process cartridge at an initial position according to embodiment six of the present disclosure.
Figure 26:
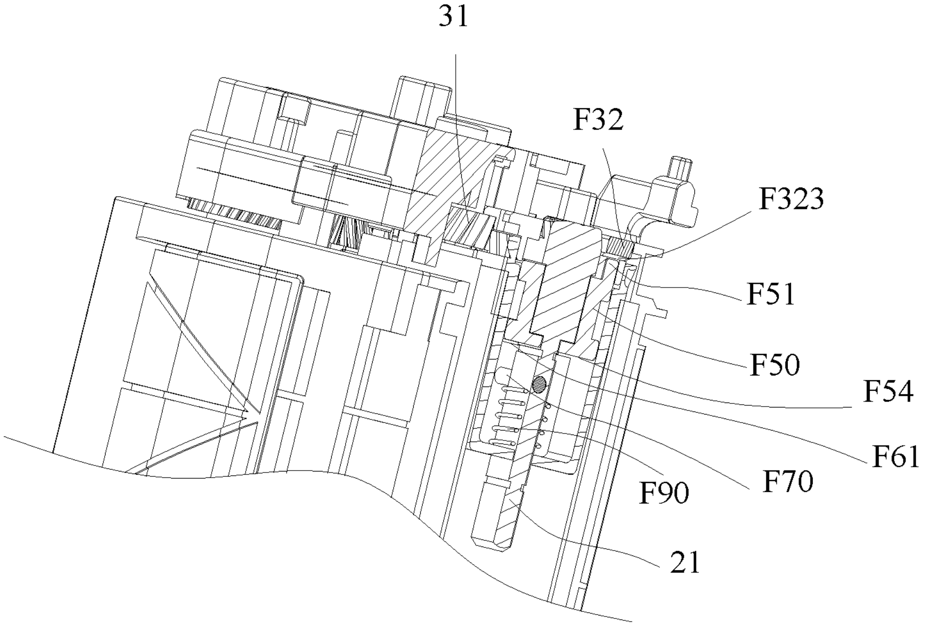
FIG. 26 illustrates a cross-sectional view of a force receiving unit of a process cartridge at an initial position according to embodiment six of the present disclosure.

As shown in FIGS. 25-26, the installation relationship of above-mentioned parts may be that the movable member F50 may be movably disposed at the hub F60, such that the lower surface F54 of the movable member F50 may be abutted against the supporting part F61 of the hub F60; the force receiving unit 21 may be installed in the movable member F50 through the through hole F52 of the movable member F50; at this point, the abutting surface F212 (shown in FIG. 22) of the force receiving unit 21 may be abutted against the upper surface F53 of the movable member F50, such that the force receiving unit 21 may be fixedly supported on the movable member F50, and may move with the movable member F50 relative to the hub F60; the connecting part F70 may pass through the connecting hole F211 of the force receiving unit 21, and two ends of the connecting part F70 may be placed into the built-in supporting part F61 of the hub F60 to drive the hub F60 to rotate after the force receiving unit 21 receives the driving force from the driving unit 1080; the first elastic part F90 may be disposed at the hub F60; and one end of the first elastic part F90 may be abutted against the bottom surface of the hub F60, and the other end of the first elastic part F90 may be abutted against two ends of the connecting part F70.

After being cooperated with each other, above-mentioned parts may be integrally assembled to one end of the photosensitive drum 20, such that the hub F60 may drive the photosensitive drum 20 to rotate after receiving the driving force and transfer the driving force to the developing roller gear 31 through the gear portion of the hub F60 to drive the developing roller 30 to rotate. The bracket F11 may cover the movable member F50 and expose the force receiving unit 21 and the protrusion F51 on the movable member F50 through the bracket F11. the pressing member F32 may be flexibly connected to the bracket F11 through the second elastic part F80. For example, the pressing member F32 and the second elastic part F80 may be respectively installed in the groove F110 of the bracket F11; and one end of the second elastic part F80 may be connected to the first end F111 of the groove F110, and the other end of the second elastic part F80 may be connected to the connecting column F321 of the pressing member F32. Optionally, the second elastic part F80 may be a spring or a compression spring. In order to fix the pressing member F32 on the bracket F11, the fixing portion F31 may be installed in the groove F110 through the rib F312 and cover a portion of the pressing member F32; and a plurality of screws (not shown in drawings) may pass through a plurality of fixing holes F311 and a plurality of installation holes F113 sequentially. Therefore, the fixing portion F31 and the bracket F11 may be fixed to the cartridge body to prevent the control mechanism F30 and the force receiving unit 21 from being detached from the process cartridge 1.

The contacting/engaging and dis-engaging process of the force receiving unit of the process cartridge and the driving unit of the electronic image-forming apparatus is described hereinafter (in order to facilitate the understanding of action process of the pressing member F32 in the bracket F11, the fixing portion F31 in the control mechanism F30 is not shown in FIG. 25).

As shown in FIGS. 25 and 26, when the process cartridge 1 is not installed in the electronic image-forming apparatus, the elastic force of the second elastic part F80 may make the pressing member F32 in a protruding state, and the pressing portion F323 of the pressing member F32 may be abutted against the protrusion F51 of the movable member F50 and apply a force toward the inside of the photosensitive drum 20 on the protrusion F51. In such way, the movable member F50 together with the force receiving unit 21 may be compressed in the bracket F11 against the elastic force of the first elastic part F90, and the engaging portion F213 of the force receiving unit 21 may not protrude from the bracket F11. The force receiving unit 21 may be at the initial position at this point.

Figure 27:
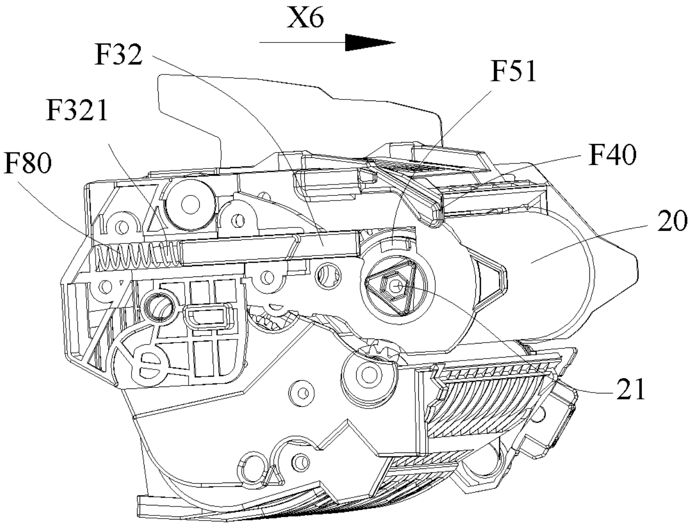
FIG. 27 illustrates a structural schematic of a force receiving unit of a process cartridge at a second position according to embodiment six of the present disclosure.
Figure 28:
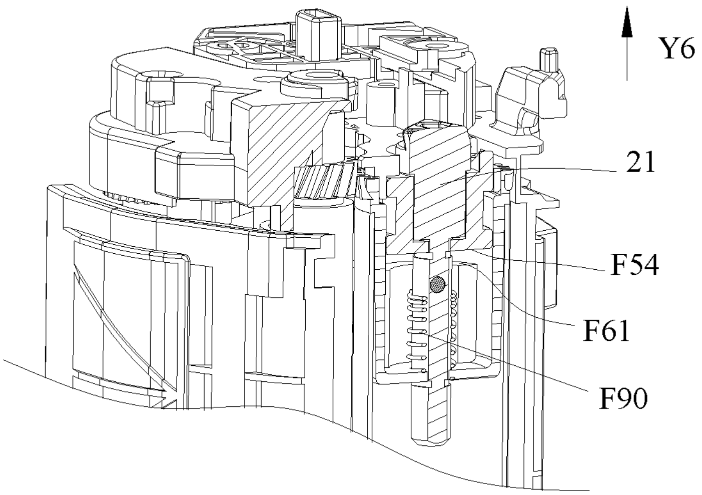
FIG. 28 illustrates a cross-sectional view of a force receiving unit of a process cartridge at a second position according to embodiment six of the present disclosure.

As shown in FIGS. 27 and 28, when the process cartridge 1 is installed in the electronic image-forming apparatus along the installation direction X6, the front end of the pressing part F40 may be abutted against the blocking wall 1081. As the process cartridge 1 continues to be installed, the pressing part F40 may be inserted into the opening of the blocking wall 1081 to contact the driving unit 1080. The front end of the process cartridge 1 may move downward to drive the pressing part F40 to move downward. At this point, the front end of the pressing part F40 may press down the driving unit 1080, such that the driving unit 1080 may move downward to be substantially coaxial with the force receiving unit 21 to receive the driving force. Meanwhile, in the process of pressing down the driving unit 1080 by the pressing part F40, the pressing member F32 being abutted against the protrusion F51 may move to the position in contact with the blocking wall 1081; and along with the installation of the process cartridge, the pressing member F32 may be subjected to the action force of the blocking wall 1081 to overcome the elastic force of the second elastic part F80 and move along the direction opposite to the installation direction X6. At this point, the pressing member F32 may be no longer in contact with the protrusion F51, and the movable member F50 may lose the action force of the pressing member F32 and drive the force receiving unit 21 to move together along the Y6 direction (that is, the direction away from the inside of the photosensitive drum); and the lower surface F54 of the movable member F50 may be no longer in contact with the support portion F61 of the hub F60, and the force receiving unit 21 may be at the second position at this point. When the process cartridge is installed in the electronic image-forming apparatus, the pressing part F40 may successfully center-align the driving unit 1080 and the force receiving unit 21 may protrude from the bracket F11 to be engaged with the driving unit 1080, thereby realizing the transfer of the driving force.

Figure 29:
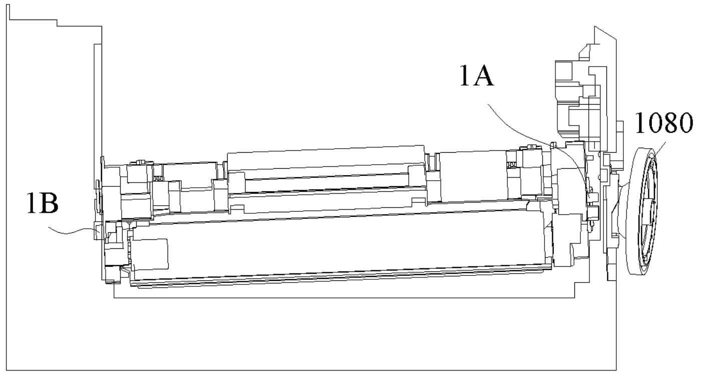
FIG. 29 illustrates a schematic of a process that a force receiving unit and a driving unit of a process cartridge are separated from engagement according to embodiment six of the present disclosure.
Figure 30:
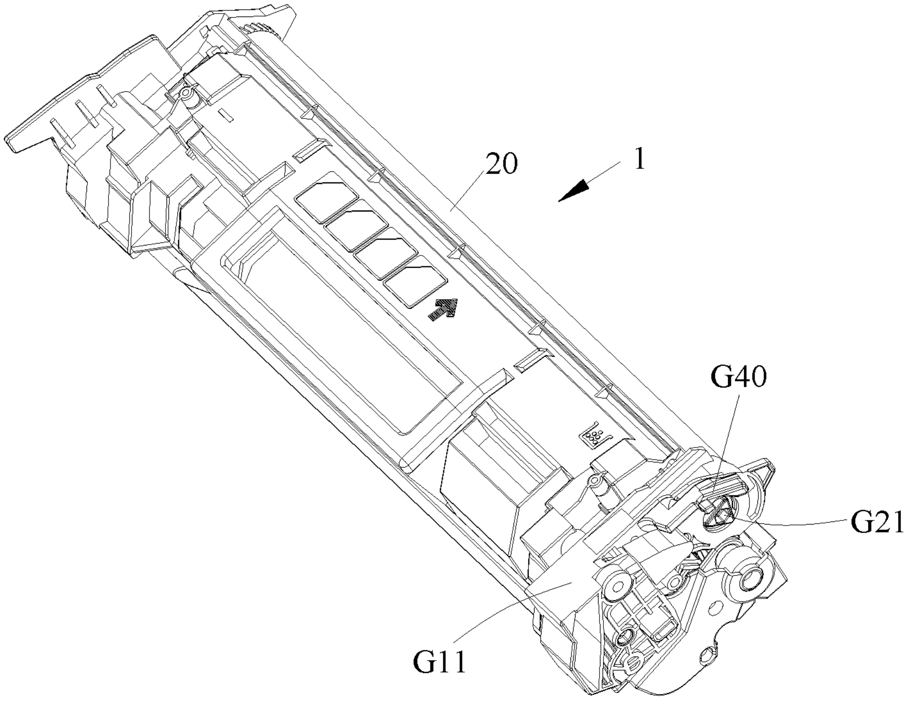
FIG. 30 illustrates a structural schematic of a process cartridge according to embodiment seven of the present disclosure.

As shown in FIG. 29, when the process cartridge needs to be removed from the electronic image-forming apparatus after use, the user may first pull out one end 1B of the process cartridge 1, such that one end 1B of the process cartridge may be inclined relative to the other end 1A of the process cartridge 1 (e.g., the end where the receiving unit 21 is located); and when the process cartridge 1 is in the relatively inclined state, the force receiving unit 21 and the driving unit 1080 may generate a certain clearance space. At this point, the pressing member F32 may gradually move along the X6 direction to the position being abutted against the protrusion F51 again, such that the movable member F50 may drive the force receiving unit 21 to move along the direction pointing to the inside of the photosensitive drum 20. Finally, the force receiving unit 21 may not be engaged with the driving unit 1080, thereby successfully removing the process cartridge from the electronic image-forming apparatus.

In some embodiments, the first end 1A of the process cartridge 1 may be further configured with a guide surface F44. The guide surface F44 may be located at the rear side of the pressing part F40, and the guide surface F44 may avoid interference with the block-shaped protrusion D1010 during the installation and removal process of the process cartridge 1. Optionally, the guide surface F44 may be set as an inclined surface or a curved surface which is inclined to the rear of the process cartridge. During the installation and removal process of the process cartridge, the block-shaped protrusion D1010 may slide against the surface of the guide surface F44, which may prevent the process cartridge from interfering with the block-shaped protrusion D1010, thereby affecting the installation of the process cartridge.

In some embodiments, the first end 1A of the process cartridge 1 may be further configured with a guided portion F41. For example, the guided portion F41 may protrude outward from the end surface of the process cartridge to be abutted against a guide rail on the electronic image-forming apparatus during the installation process of the process cartridge, thereby guiding the installation of the process cartridge. Optionally, the guided portion F41 may also be disposed at other position at the first end, as long as the guided portion F41 may be abutted against the guide rail on the electronic image-forming apparatus and be guided. Obviously, in some embodiments, the guided portion F41 may also be omitted.

Embodiment Seven

Based on embodiment six, another process cartridge is provided in one embodiment.

As shown in FIGS. 30-34, the process cartridge 1 may include a bracket G11, a photosensitive drum 20, a pressing part G40, a movable part G50, a supporting part G60, a force receiving unit G21 and an elastic part (not shown). It should be noted that the structure of the pressing part G40 in one embodiment may be same as the pressing part in embodiment six. The pressing part G40 may be fixedly disposed at the cartridge body and located at the same end of the cartridge body as the force receiving unit G21.

For example, the force receiving unit G21 may include a cylindrical main body G212, one end of the main body G212 may be configured with an engaging portion G211 engaged with the driving unit 1080, a plurality of connecting columns G213 may be evenly spaced on the circumferential surface of the main body G212, and the number of connecting columns G213 may be not limited herein. In one embodiment, the number of connecting columns G213 may be three. The outer circumference of the movable part G50 may be configured with a gear portion. For example, the movable part G50 may be further configured with a limiting portion G51, and a plurality of protrusions G52 may be disposed at one side of the limiting portion G51. The supporting part G60 may be a cylindrical structure and include an upper cylinder G63 and a lower cylinder G64. The radius of the upper cylinder G63 may be less than the radius of the lower cylinder G64, and the outer peripheral surface of the upper cylinder G63 may be configured with a plurality of grooves G65 corresponding to the number of protrusions G52. The lower cylinder G64 may also be provided with a support surface G61; and the support surface G61 may be configured with a plurality of outwardly protruding inclined surfaces G62 corresponding to the number of the protrusions G52.

Figure 36:
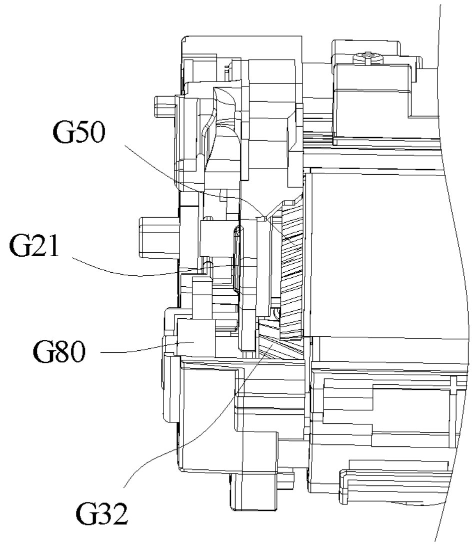
FIG. 36 illustrates a structural schematic of a force receiving unit of a process cartridge at an initial position according to embodiment seven of the present disclosure.
Figure 37:
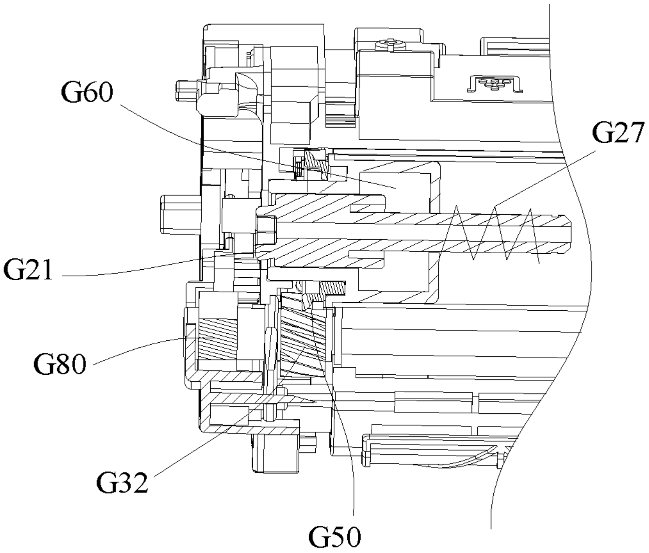
FIG. 37 illustrates a cross-sectional view of a force receiving unit of a process cartridge at an initial position according to embodiment seven of the present disclosure.

As shown in FIGS. 36-37, the connection relationship of above-mentioned parts is that the movable part G50 may be sleeved on the upper cylinder G63 of the supporting part G60 to be installed in the supporting part G60, the protrusions G52 may be located on the support surface G61, and the movable part G50 may rotate relative to the supporting part G60 and move translationally. The force receiving unit G21 may pass through the movable part G50 and the supporting part G60 and make the connecting column G213 pass through the groove G65; and the connecting column G213 may be supported by the limiting portion G51 of the movable part G50. Therefore, the force receiving unit G21 may be movably connected to the supporting part G60, and the force receiving unit G21 may move together with the movable part G50. An elastic part (not shown in drawings) may be disposed between the force receiving unit G21 and the supporting part G60; and one end of the elastic part may be abutted against the force receiving unit G21, and the other end may be abutted against the bottom surface of the supporting part G60.

Figure 35:
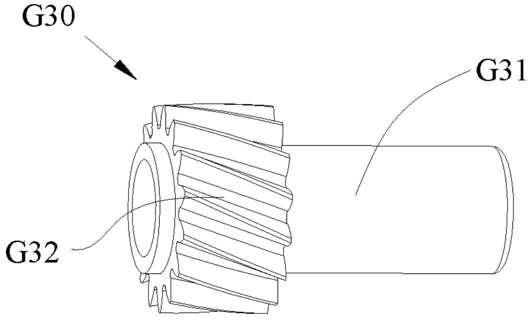
FIG. 35 illustrates a structural schematic of a control mechanism of a process cartridge according to embodiment seven of the present disclosure.

Furthermore, as shown in FIG. 35, in order to enable the force receiving unit G21 to perform translational movement along the axis of the photosensitive drum 20, the process cartridge 1 may further include a control mechanism G30. The control mechanism G30 may be cooperated with the movable part G50 to control the rotation of the movable part G50, such that the force receiving unit G21 may move along the axial direction of the photosensitive drum 20. For example, the control mechanism G30 may include a connecting part G31, an intermediate gear G32 and a driving gear G80. The intermediate gear G32 may be connected to the connecting part G31. In one embodiment, the intermediate gear G32 and the connecting part G31 may be integrally formed. The driving gear G80 may be sleeved on the other end of the connecting part G31. Optionally, the driving gear G80 may also be a rubber wheel. When the control mechanism G30 is installed on the cartridge body, one end of the connecting part G31 configured with the intermediate gear G32 may be configured to be close to the developing roller 30; and the intermediate gear G32 may be engaged with the gear portion of the movable part G50, and may drive the movable part G50 together with the force receiving unit G21 to move away from the inside of the photosensitive drum 20 through the rotation of the control mechanism G30.

As shown in FIGS. 36 and 37, when the process cartridge is not installed in the electronic image-forming apparatus, the force receiving unit G21 may be located in the bracket G11; and the force receiving unit G21 and the movable part G50 may be configured to be close to the photosensitive drum 20. The force receiving unit G21 may be at the initial position at this point.

Figure 38:
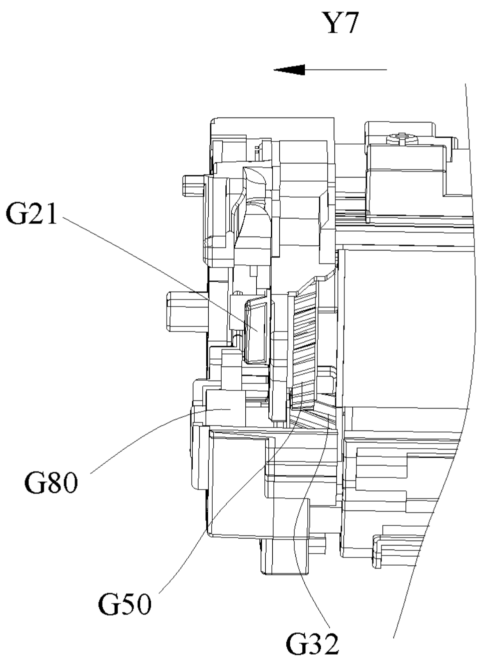
FIG. 38 illustrates a structural schematic of a force receiving unit of a process cartridge at a second position according to embodiment seven of the present disclosure.
Figure 39:
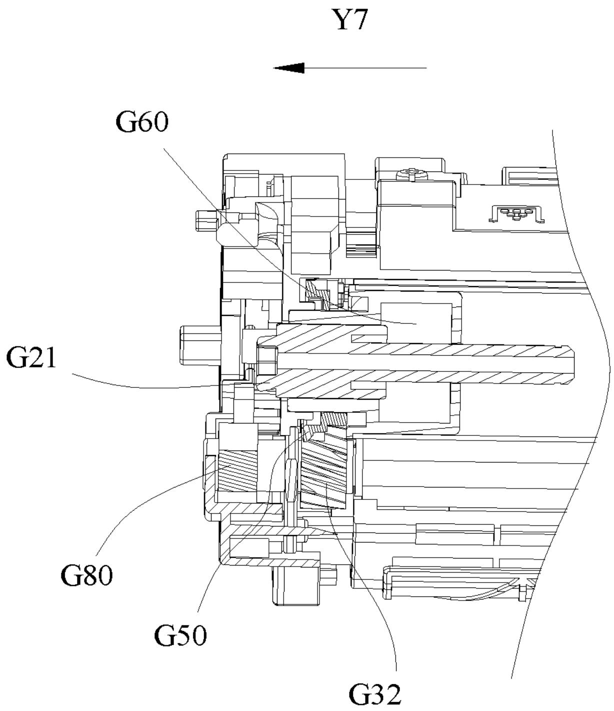
FIG. 39 illustrates a cross-sectional view of a force receiving unit of a process cartridge at a second position according to embodiment seven of the present disclosure.
Figure 40:
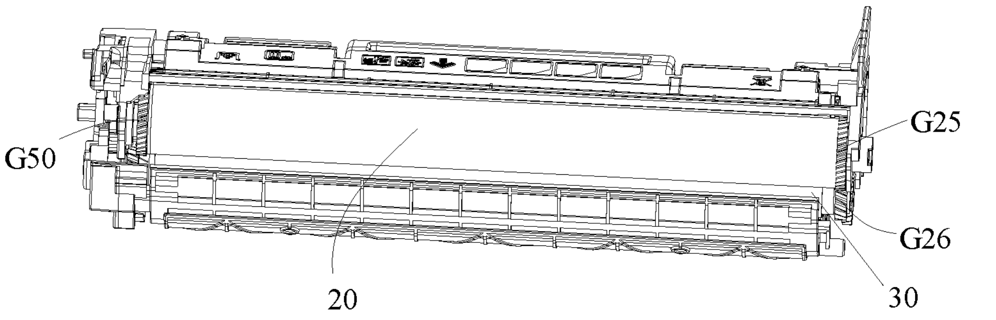
FIG. 40 illustrates a structural schematic of force transfer between a photosensitive drum and a developing roller of a process cartridge according to embodiment seven of the present disclosure.

As shown in FIGS. 38-39, when the process cartridge 1 is installed in the electronic image-forming apparatus, the front end of the pressing part G40 may be abutted against the blocking wall 1081. As the process cartridge 1 continues to be installed, the pressing part G40 may be inserted into the opening of the blocking wall 1081 to contact the driving unit 1080. When the front end of the process cartridge 1 moves downward to drive the pressing part G40 fixed relatively to the process cartridge to move downward, the front end of the pressing part G40 may press down on the driving unit 1080. In such way, the driving unit 1080 may be moved downward to be substantially coaxial with the force receiving unit G21 to receive the driving force. Moreover, on a plane perpendicular to the axial direction of the photosensitive drum, the projection of the pressing part G40 may not be coincident with the projection of the photosensitive drum at all. Meanwhile, in the process of pressing down the driving unit 1080 by the pressing part G40, the driving unit 1080 may move downward to contact the driving gear G80. The outer circumference of the driving unit 1080 may be configured with an external gear portion (refer to FIG. 1). The external gear portion may be a helical tooth structure, and the external gear portion of the driving unit 1080 may be engaged with the driving gear G80, such that the driving gear G80 may transfer received driving force to the intermediate gear G32, and the driving force may be transferred, through the intermediate gear G32, to the gear portion of the movable part G50 engaged with the intermediate gear G32, and then drive the movable part G50 to rotate. With the rotation of the movable part G50, the protrusion G52 may move to the position being abutted against the inclined surface G62 and move from the low position to the high position along the inclined surface G62. In such way, the movable part G50 and the force receiving unit G21 relatively fixedly connected to the movable part G50 may move along the direction away from the photosensitive drum 20, and then make the force receiving unit G21 protrude from the bracket G11. At this point, the force receiving unit G21 may be at the second position. Finally, the force receiving unit G21 may be successfully engaged with the driving unit 1080 to realize the transfer of driving force. The control mechanism G30 may not be connected to the developing roller 30, such that the control mechanism G30 may not transfer the driving force received from the driving unit 1080 to the developing roller 30. Therefore, a photosensitive drum gear G25 may be also disposed on one end of the photosensitive drum 20 away from the movable part G50, and a developing roller gear G26 may be also disposed on one end of the developing roller 30 away from the movable part G50. The developing roller gear G26 may be engaged with the photosensitive drum gear G25. In such way, the movable part G50 may transfer the driving force received from the force receiving unit G21 to the photosensitive drum gear G25, and then to the developing roller gear G26 being engaged with the photosensitive drum gear G25, thereby driving the developing roller 30 to rotate.

The method for removing the process cartridge from the electronic image-forming apparatus in one embodiment may be similar to that in embodiment six, and also through relative inclination of the process cartridge in the removing process, the user may remove the process cartridge from the electronic image-forming apparatus more smoothly.

Referring to FIG. 37, in some embodiments, an elastic reset part G27 may be disposed at one end of the force receiving unit G21 away from the engaging portion G211; and the elastic reset part G27 may be a compression spring. When the driving unit 1080 stops rotation, since the elastic force of the elastic reset part G27 is greater than the force between the driving unit 1080 and the force receiving unit G21, the force receiving unit G21 may be pulled back to the initial position by the elastic reset part G27. With such structure, the process cartridge may be smoothly removed without tilting.

Embodiment Eight

The shapes and structures of the process cartridge 1 and the electronic image-forming apparatus of one embodiment may be substantially same as those of embodiment four. The similarities may not be described in detail, and only main differences are described hereinafter.

Figure 41A:
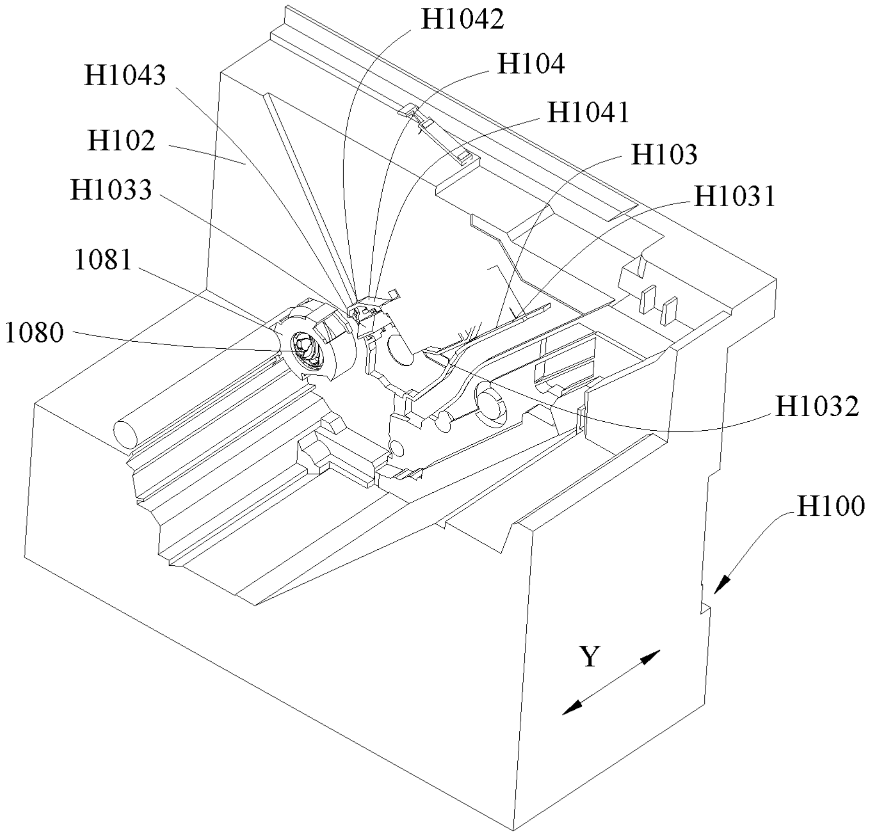
FIG. 41A illustrates a local structural schematic of a main assembly of an electronic image-forming apparatus according to embodiment eight of the present disclosure.
Figure 41B:
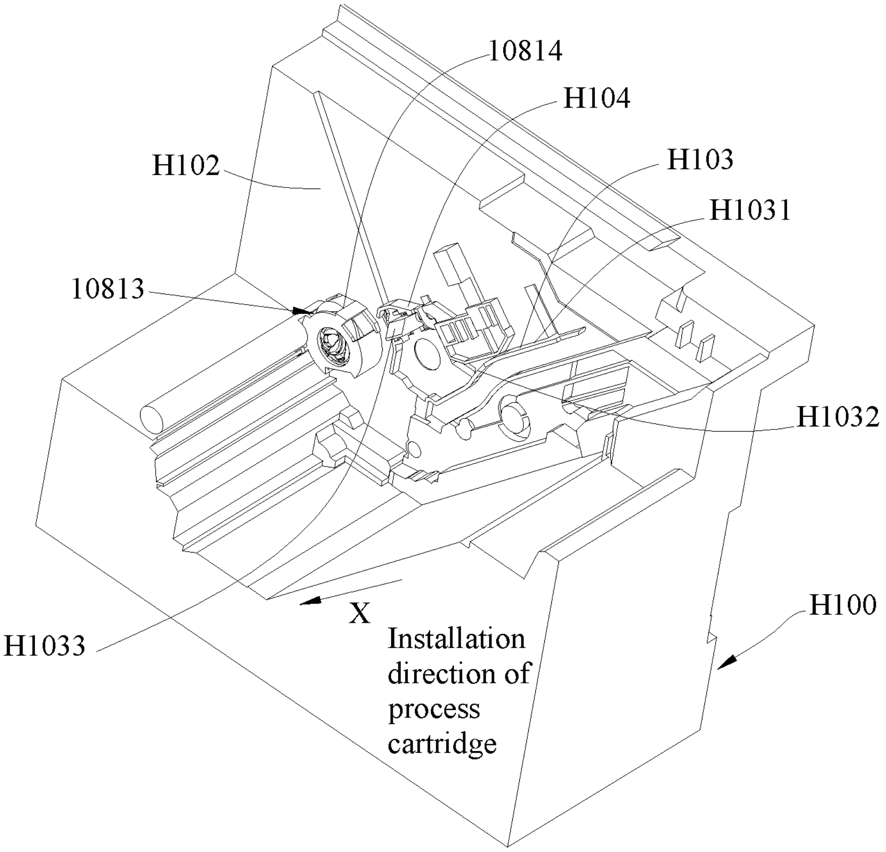
FIG. 41B illustrates another local structural schematic of a main assembly of an electronic image-forming apparatus according to embodiment eight of the present disclosure.
Figure 41C:
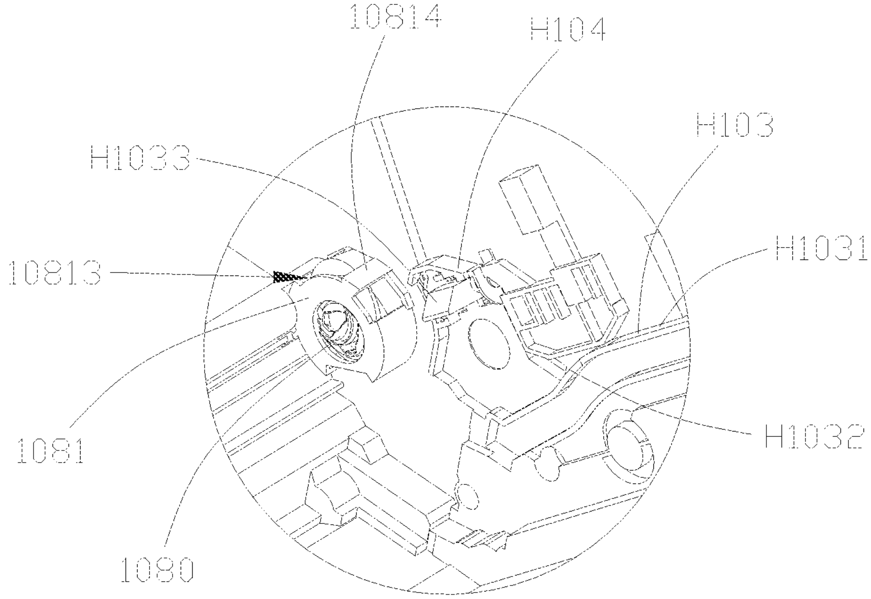
FIG. 41C illustrates another local structural schematic of a main assembly of an electronic image-forming apparatus according to embodiment eight of the present disclosure.
Figure 42:
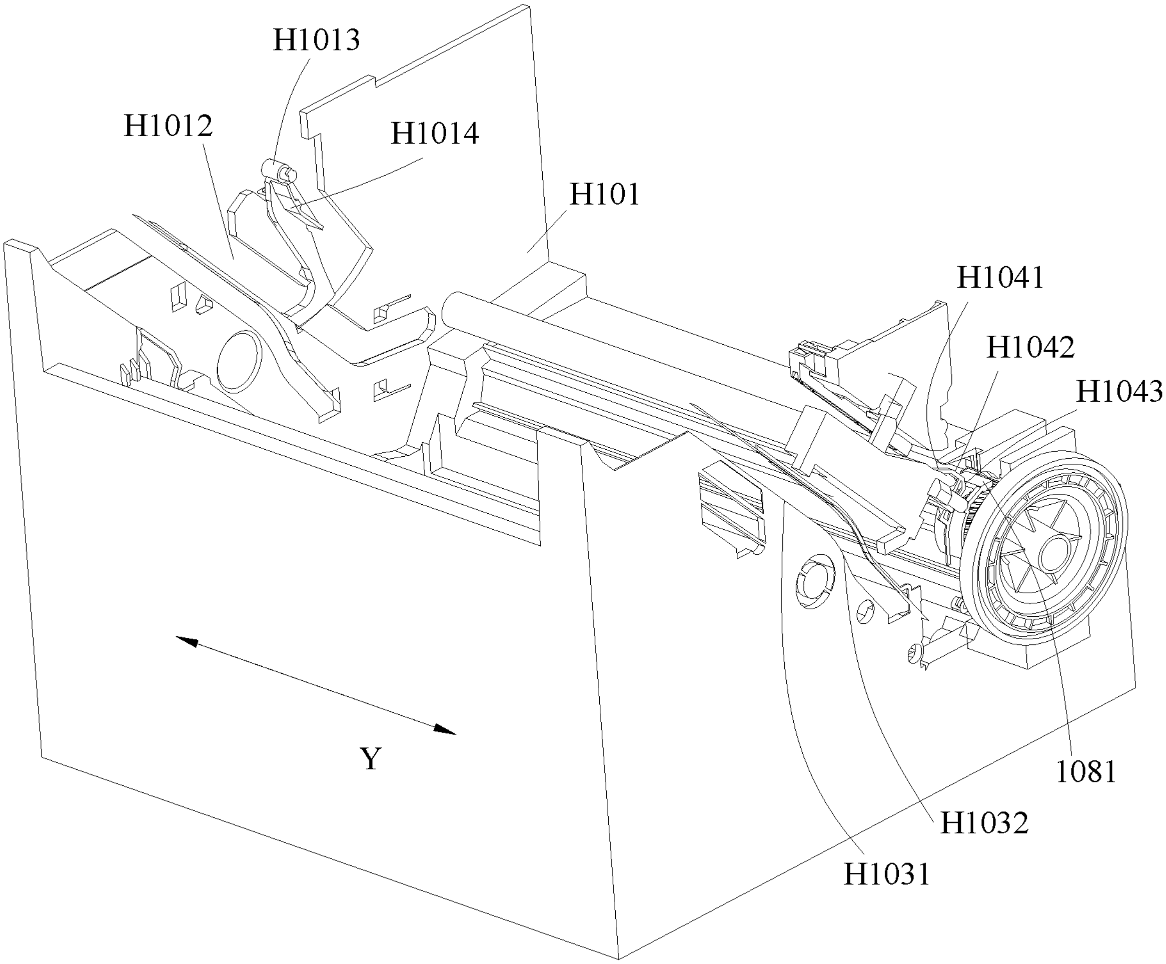
FIG. 42 illustrates another local structural schematic of a main assembly of an electronic image-forming apparatus according to embodiment eight of the present disclosure.

As shown in FIGS. 41A-42, the electronic image-forming apparatus may include a main assembly H100; the process cartridge 1 may be detachably accommodated in the main assembly H100; the main assembly H100 may be configured with the first side wall H101 and the second side wall H102 along the length direction Y of the process cartridge 1; and both the first side wall H101 and the second side wall H102 may be configured with guide rails for guiding the installation of the process cartridge 1. For example, the second side wall H102 may be configured with the first guide rail H103 and the second guide rail H104 for guiding the installation of the process cartridge 1. The first guide rail H103 may include the first guide segment H1031 and the second guide segment H1032; and the first guide segment H1031 and the second guide segment H1032 may be continuous. The second guide segment H1032 may be located on the lower side of the first guide segment H1031 along the installation direction of the process cartridge 1 to the electronic image-forming apparatus. In one embodiment, both the first guide segment H1031 and the second guide segment H1032 may be inclined surfaces; and both the first guide segment H1031 and the second guide segment H1032 may be inclined toward the rear of the installation direction of the process cartridge. In normal use state where the electronic image-forming apparatus is placed on the horizontal plane, the angle between the second guide segment H1032 and the horizontal plane may be greater than the angle between the first guide segment H1031 and the horizontal plane. Optionally, the first guide segment H1031 and the second guide segment H1032 may also be configured as curved surfaces, or one of the first guide segment H1031 and the second guide segment H1032 may be an inclined surface, and the other one may be a curved surface. Optionally, the first guide segment H1031 and the second guide segment H1032 may also be inclined guide grooves. In one embodiment, the second half of the first guide rail H103 may form a recessed portion, that is, the second guide segment H1032 may be recessed relative to the first guide segment H1031.

The second guide rail H104 may be disposed close to the blocking wall 1081, and the downstream end of the second guide rail H104 may extend to the upper side of the blocking wall 1081. Along the installation direction of the process cartridge 1, the second guide rail H104 may be disposed at the downstream side of the first guide segment H1031. For example, the second guide rail H104 may include the third guide segment H1041, the fourth guide segment H1042 and the fifth guide segment H1043. Along the installation direction of the process cartridge 1, the third guide segment H1041, the fourth guide segment H1042 and the fifth guide segment H1043 may be disposed at sequence, and all guide segments may be continuous. In one embodiment, the third guide segment H1041, the fourth guide segment H1042 and the fifth guide segment H1043 may be configured as inclined surfaces; the angle between the horizontal plane and each of the third guide segment H1041, the fourth guide segment H1042 and the fifth guide segment H1043 may increase successively; and the fourth guide segment H1042 and the fifth guide segment H1043 may be disposed close to the blocking wall 1081.

The third guide rail H1012 for guiding the installation and positioning of the process cartridge 1 may be disposed on the first side wall H101. In one embodiment, the third guide rail H1012 may be formed by inclined surfaces. Optionally, the third guide rail H1012 may also be formed by curved surfaces; or the third guide rail H1012 may also be a guide groove.

Furthermore, the electronic image-forming apparatus may further include the first identification mechanism and the second identification mechanism for preventing the process cartridge 1 from being installed incorrectly. The first identification mechanism may be disposed at the second side wall H102 of the electronic image-forming apparatus. In addition, the first identification mechanism may include the first movable part H1033 that may move between the first position for limiting the installation of the process cartridge 1 and the second position for allowing the installation of the process cartridge 1. For example, the first movable part H1033 may be supported on the second side wall H102 of the main assembly, and the first movable part H1033 may rotate around a rotation axis in parallel with the installation direction X of the process cartridge 1. In addition, the first movable part H1033 may protrude from the second side wall H102 at the first position, such that the first movable part H1033 may interfere with the process cartridge 1 installed on the main assembly H100 and limit the installation of the process cartridge 1. At the first position, the process cartridge 1 may be blocked by the first movable part H1033 to be not installed in place, such that process cartridge may not receive the driving force from the electronic image-forming apparatus. Compared to the first position, the first movable part H1033 may be retracted at the second position, that is, may be deviated closer to the second side wall H102. At the second position, the process cartridge 1 may be installed in place, such that the process cartridge may receive the driving force from the electronic image-forming apparatus and perform normal printing operations. The term "installed in place" here refers to that the process cartridge 1 may normally receive the driving force to perform the printing operations after being installed. In one embodiment, the first movable part H1033 may be a protrusion.

The second identification mechanism may be disposed at the first side wall H101 of the electronic image-forming apparatus, which may be configured as a swing rod H1013 capable of swinging around the rotation axis in parallel with the length direction Y of the process cartridge 1. On the upper side of the swing rod H1013, a pushed portion H1014 protruding long the length direction Y of the process cartridge may be disposed. Along the installation direction of the process cartridge 1, the free end of the swing rod H1013 may be located on the downstream side, and the end hinged with the rotating shaft may be located on the upstream side, that is, the swing rod may be at an inclined state as a whole. In addition, the swing rod H1013 may extend to the third guide rail H1012. During the installation process of the process cartridge 1, the swing rod H1013 may need to be pushed to rotate which may realize smooth installation of the process cartridge 1, otherwise the process cartridge may not be installed.

Figure 43:
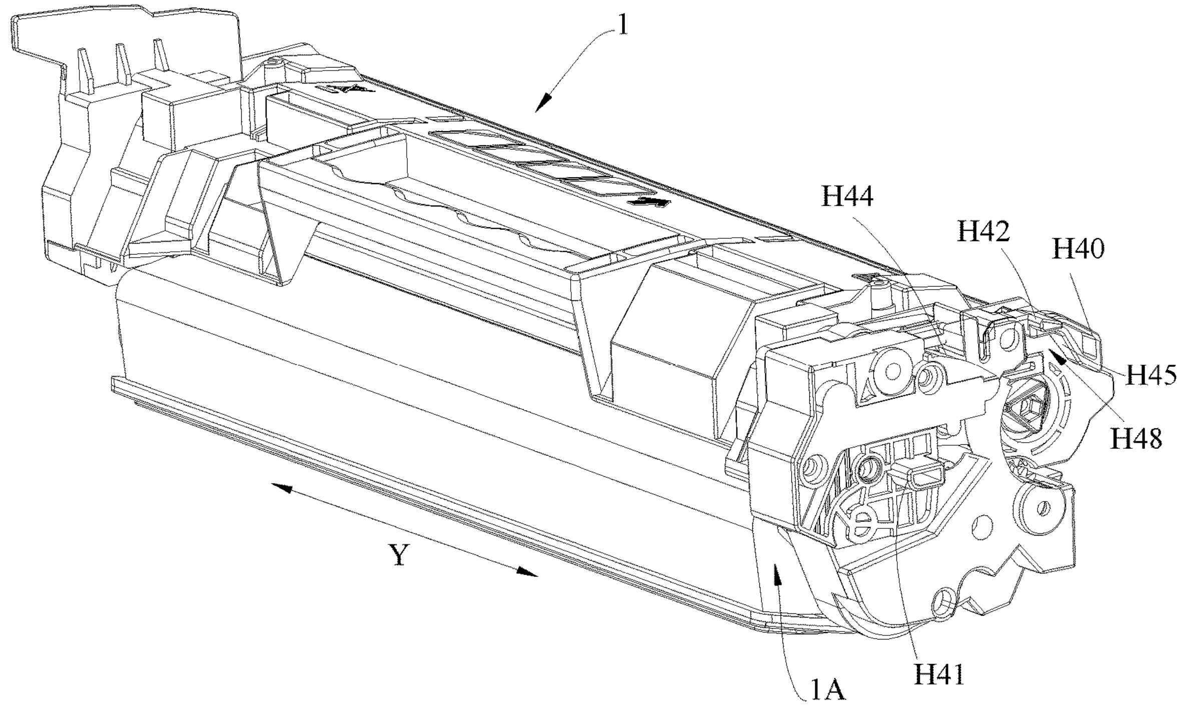
FIG. 43 illustrates a structural schematic of a process cartridge according to embodiment eight of the present disclosure.
Figure 44:
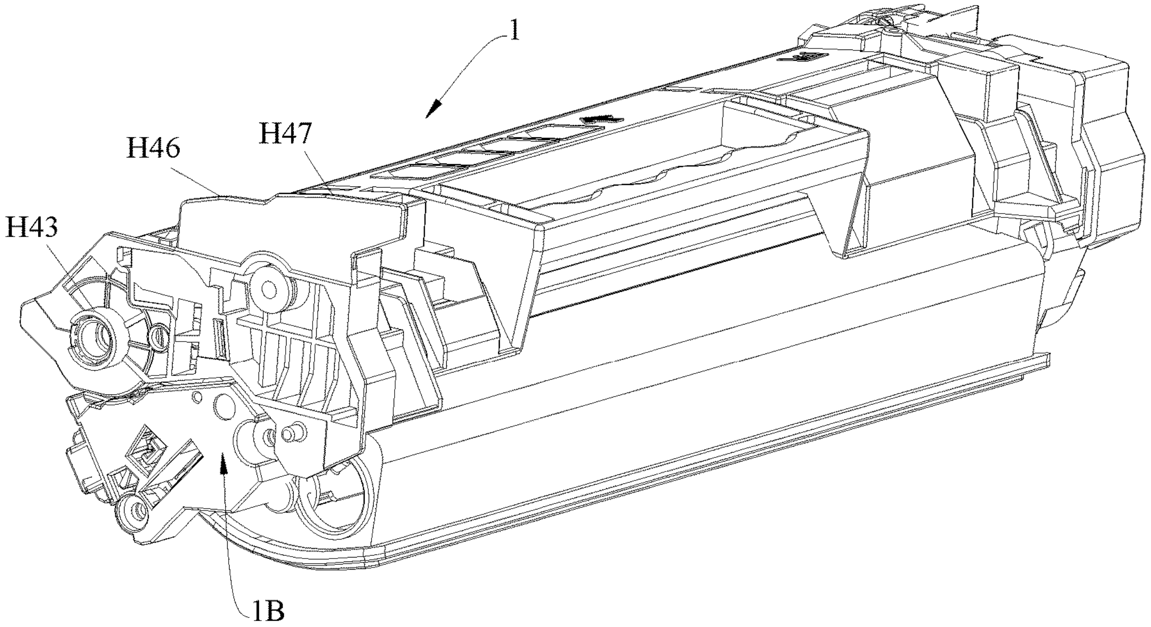
FIG. 44 illustrates a structural schematic of a process cartridge from another angle according to embodiment eight of the present disclosure.
Figure 45:
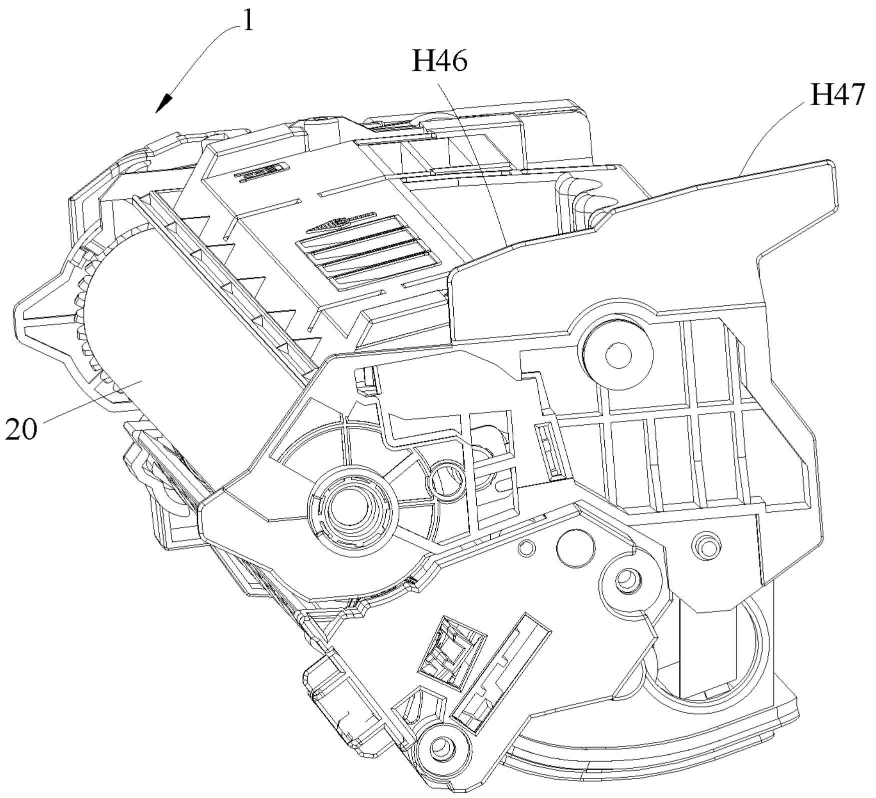
FIG. 45 illustrates a structural schematic of a process cartridge viewed from an end side of a process cartridge according to embodiment eight of the present disclosure.
Figure 46:
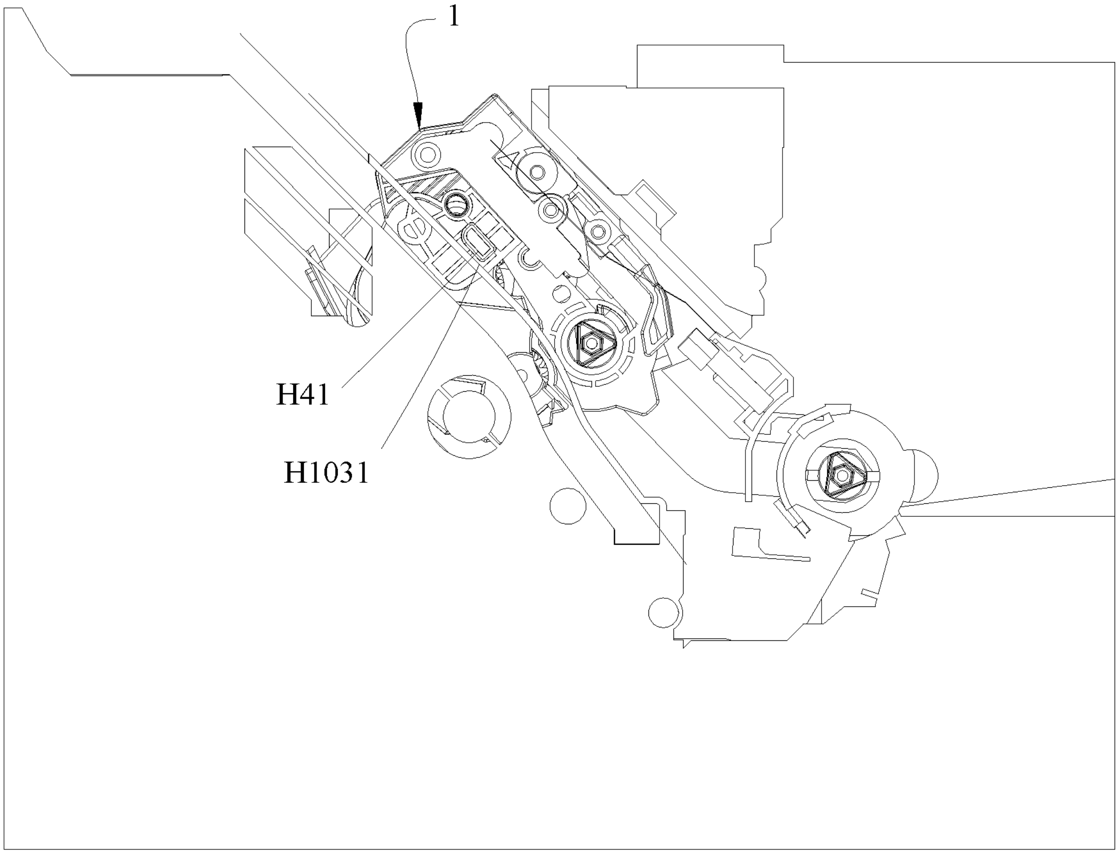
FIG. 46 illustrates a cooperation relationship schematic between a process cartridge and a first guide rail of an electronic image-forming apparatus in an early stage of an installation process according to embodiment eight of the present disclosure.
Figure 47:
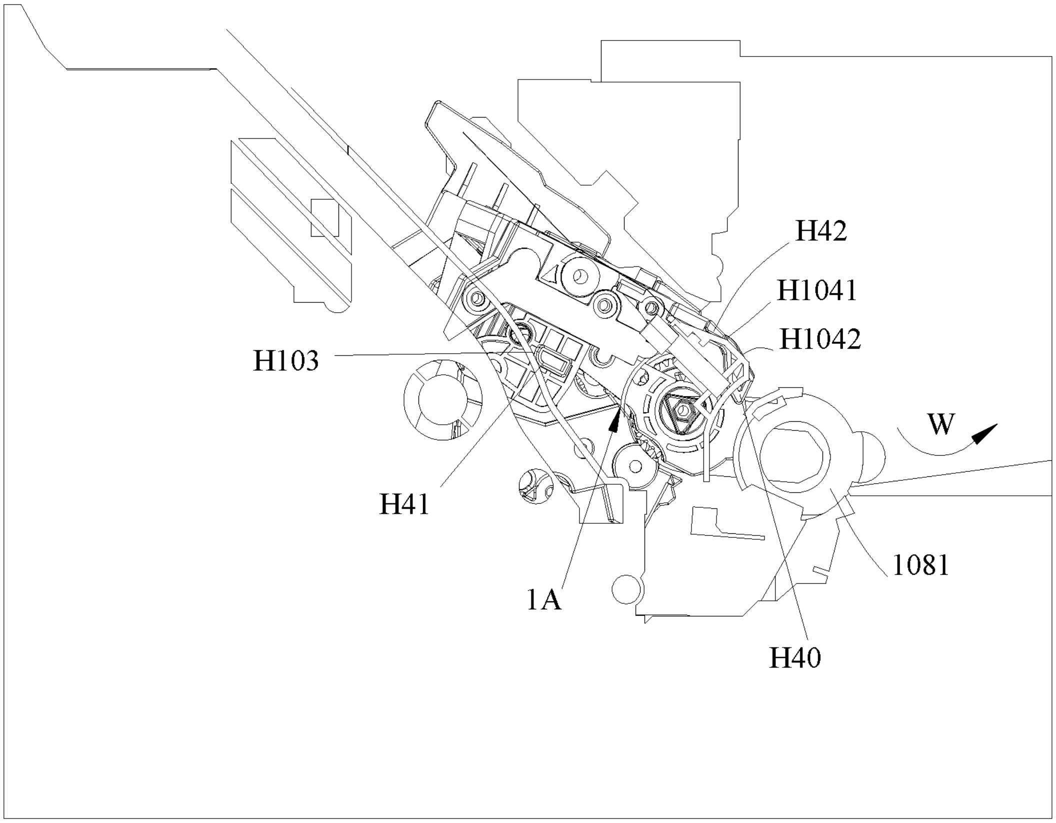
FIG. 47 illustrates a cooperation relationship schematic between a process cartridge and a second guide rail of an electronic image-forming apparatus in a later stage of an installation process according to embodiment eight of the present disclosure.
Figure 48:
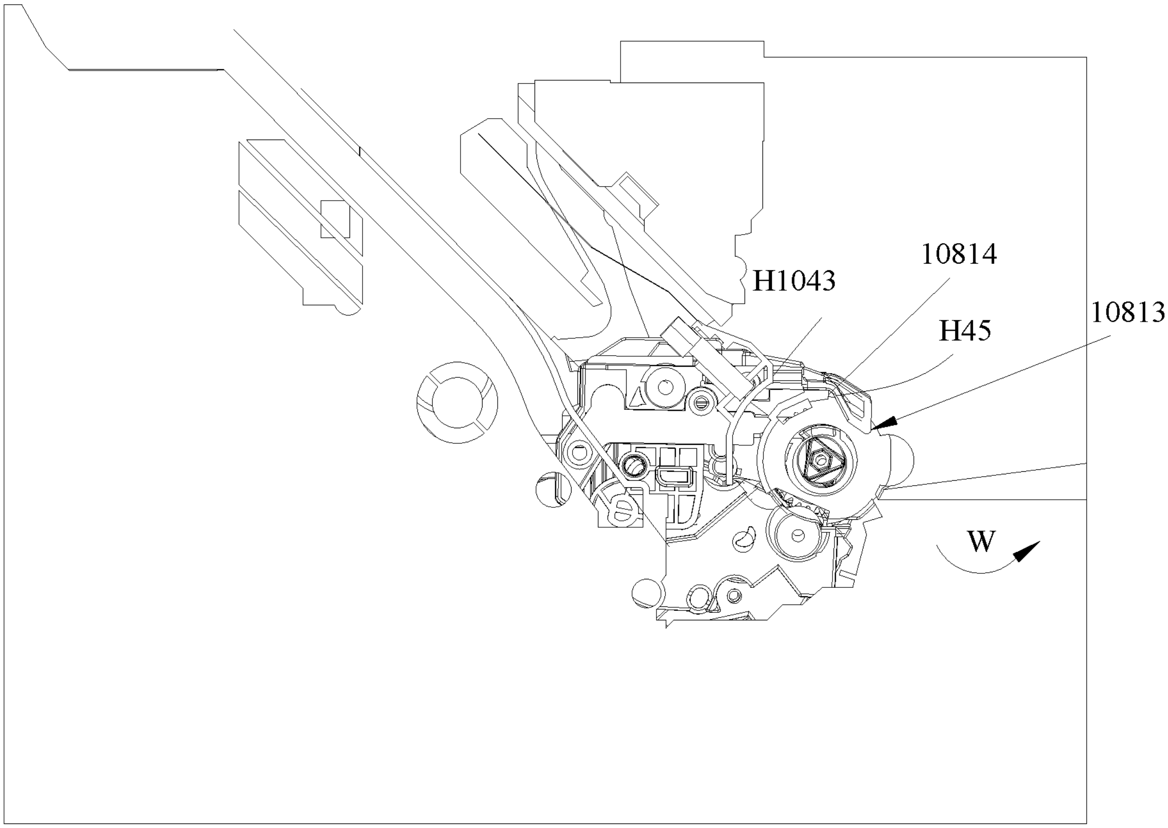
FIGS. 48-49 illustrate cooperation relationship schematics between a process cartridge and an electronic image-forming apparatus when installed in place according to embodiment eight of the present disclosure.

As shown in FIGS. 43-45, the process cartridge 1 in one embodiment may further include the first guided portion H41 and the second guided portion H42. Both the first guided portion H41 and the second guided portion H42 may be disposed at the first end 1A of the process cartridge 1 (the end where the force receiving unit may be disposed). For example, the first guided portion H41 may be disposed on the photosensitive drum frame and at the upstream side of the photosensitive drum 20 along the installation direction of the process cartridge. In one embodiment, the first guided portion H41 may be configured as a protrusion. The protrusion may protrude outward from one end of the process cartridge 1 along the length direction Y of the process cartridge 1, thereby being abutted against the first guide rail H103 in an early stage of the installation process to guide the installation of the process cartridge. Optionally, the first guided portion may also be the lower outer edge of the housing of the process cartridge. The second guided portion H42 may be abutted and fitted with the second guide rail H104 at a later stage in the installation process of the process cartridge 1. The second guided portion H42 in one embodiment may be located above the first guided portion H41 in the installed state of the process cartridge 1 and may be located on the downstream side of the first guided portion H41 along the installation direction of the process cartridge and fixedly connected to the pressing part H40. Optionally, the second guided portion H42 may be integrally formed with the pressing part H40, and the second guided portion H42 may be located above the pressing part H40 along the installation direction of the process cartridge 1. Optionally, the second guided portion H42 may be located on the upper side of the outer periphery of the photosensitive drum 20. Optionally, the second guided portion H42 may be configured as a protrusion; and the protrusion may protrude outward from one end of the process cartridge 1 along the length direction of the process cartridge 1.

As shown in FIG. 44, the process cartridge 1 may further include the third guided portion H43. The third guided portion H43 may be disposed at the second end 1B of the process cartridge 1 (the end opposite to the force receiving unit). The third guided portion H43 may be abutted and fitted with the third guide rail H1012 during the installation process of the process cartridge 1. Optionally, in one embodiment, the third guided portion H43 may be configured as a protrusion which may protrude outward from one end of the process cartridge 1 along the length direction of the process cartridge 1. Optionally, the third guided portion H43, disposed at one end of the photosensitive drum 20 along the axial direction, may be configured as a circular guide column. The third guided portion H43 may also be disposed on an end cover (not shown in drawings).

Furthermore, the process cartridge 1 may further include the first guide surface H44 which may be disposed at the first end 1A of the process cartridge 1. The first guide surface H44 may be configured to guide the first movable part H1033 to prevent the process cartridge 1 from interfering with the first movable part H1033 when being removed. That is, the first movable part H1033 may be smoothly detached from the first guide surface H44. The first guide surface H44 as a whole may be located on the upper side of the process cartridge 1. Along the installation direction of the process cartridge 1, the first guide surface H44 may be located at the upstream of the photosensitive drum 20 and at the upstream of the abutting portion where the pressing part H40 and the driving unit 1080 are abutted against each other. In one embodiment, the first guide surface H44 may be configured to face forward and upward and may also be configured as a curved surface. When the process cartridge 1 is installed in the electronic image-forming apparatus, the first guide surface H44 may be pressed by the first movable part H1033 to limit the rotation of the process cartridge 1 and play a positioning role for the process cartridge 1. In such case, the first guide surface H44 may also be configured as a non-inclined surface structure. Compared with the non-inclined surface structure, the first guide surface H44 with the inclined structure may prevent the process cartridge 1 from interfering with the first movable part H1033 during the installation and removal process and may avoid affecting the installation and removal operations of the process cartridge 1.

In order to prevent the pressing part H40 from interfering with the blocking wall 1081 when the process cartridge 1 is removed, the pressing part H40 may further include a guiding-pressing surface H45 which may be disposed at the lower side of the pressing part H40. By setting the guiding-pressing surface H45, it may prevent the pressing part H40 from interfering with the blocking wall 1081 when the process cartridge 1 is removed, thereby affecting the removal of the process cartridge 1. In the state that the process cartridge 1 is installed in the electronic image-forming apparatus, the pressing part H40 may protrude into the blocking wall 1081 and press the driving unit 1080, such that the driving unit 1080 may move from the initial inclined position to the position coincident with the axial direction of the supporting part 1085 (as shown in FIG. 2). In addition, on the plane perpendicular to the axial direction of the photosensitive drum, the projection of the pressing part may be outside the projection range of the photosensitive drum. The guiding-pressing surface H45 on the pressing part H40 may be abutted against the outer wall of the blocking wall 1081. For example, since the pressing part H40 protrudes into the opening 10813 disposed on the upper side of the blocking wall 1081, the guiding-pressing surface H45 may press against the outer edge 10814 of the opening 10813.

Figure 51:
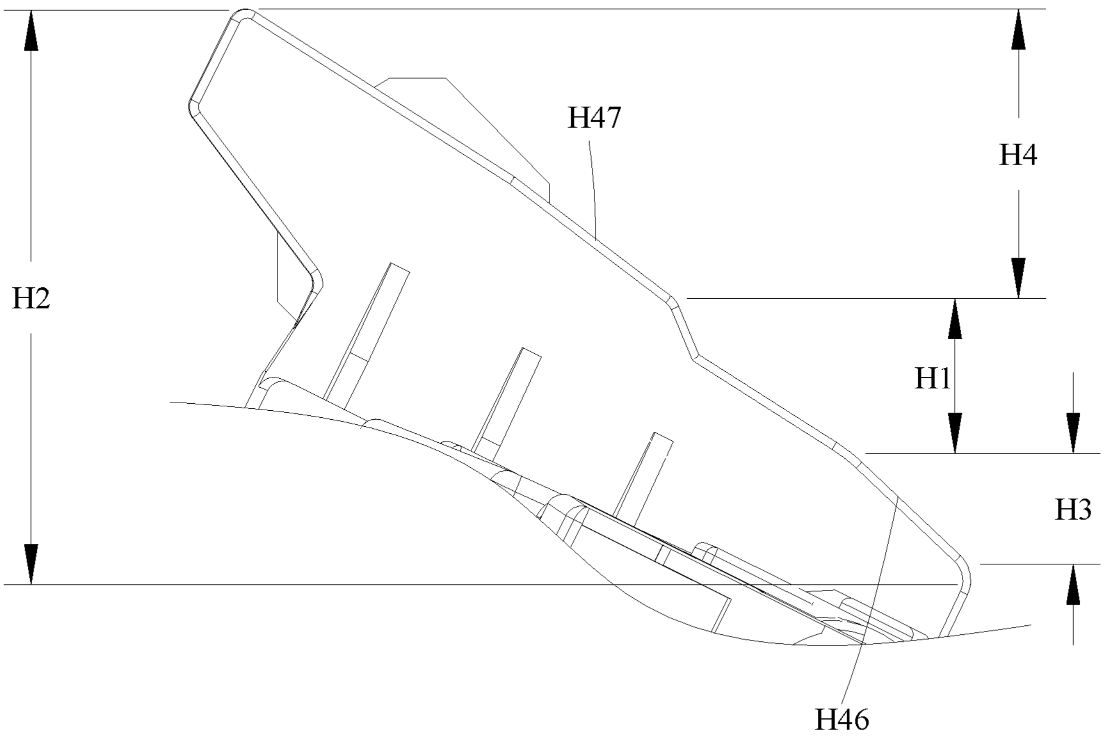
FIG. 51 illustrates a schematic of a first pressing surface and a second pressing surface during an installation process of a process cartridge according to embodiment eight of the present disclosure.

Furthermore, the process cartridge 1 may further include the first pressing surface H46 and the second pressing surface H47. The first pressing surface H46 and the second pressing surface H47 may be at the second end 1B of the process cartridge 1, and the first pressing surface H46 and the second pressing surface H47 may be higher than the upper surface of the process cartridge. The first pressing surface H46 may be configured to unlock the swing rod H1013 during the installation process of the process cartridge, and the second pressing surface H47 may be configured to unlock the swing rod H1013 during the removal process of the process cartridge 1 from the electronic image-forming apparatus. Along the installation and removal direction of the process cartridge 1, both the second pressing surface H47 and the first pressing surface H46 may be distributed in steps, that is, such two surfaces may have a height difference. The pressing surface H47 may be located above the first pressing surface H46. In one embodiment, the first pressing surface H46 and the second pressing surface H47 may be configured as curved surfaces or inclined surfaces. For example, both the first pressing surface H46 and the second pressing surface H47 may be inclined toward the rear of the installation direction of the process cartridge 1. Referring to FIG. 51, Optionally, the height difference range between the first pressing surface H46 and the second pressing surface H47 may be $H1 \leq H \leq H2$, the value of H1 may be 3.37 mm, and the value of H2 may be 10.05 mm. Optionally, the height difference range H3 between the first pressing surface H46 and the surface cooperated with the swing rod H1013 may be optionally less than 2.72 mm, and the height difference range H4 between the second pressing surface H47 and the surface cooperated with the swing rod H1013 may be optionally less than 4.06 mm. Within above range, the cooperation effect with the swing rod may be desirable.

Next, specific operation installation process of the process cartridge 1 to the electronic image-forming apparatus and cooperating process of all parts are described in detail with reference to FIGS. 42-49.

In the installation process of the process cartridge, the stage before the second guided portion H42 is not supported by the second guide rail H104 is referred to as early stage (or early installation section) in the installation process of the process cartridge 1; and the stage after the second guided portion H42 is supported by the second guide rail H104 is referred to as later stage (or later installation section) in the installation process of the process cartridge 1.

In the early stage of the process cartridge installation, the user may hold the handle (not shown) of the process cartridge 1 to place the process cartridge into the electronic image-forming apparatus and make the first guided portion H41 and the third guided portion H43 to be respectively inserted in the first guide rail H103 and the third guide rail H1012 and may push the process cartridge 1 along the installation direction of the process cartridge 1. At this point, the first guided portion H41 of the process cartridge 1 may be abutted against the first guide segment H1031 of the first guide rail H103, the third guided portion H43 may be abutted against the third guide rail H1012. That is, the process cartridge may be supported by the first guide segment H1031 of the first guide rail H103 and the third guide rail H1012. As the process cartridge 1 moves forward along the guide rail to the installation direction X of the process cartridge (as shown in FIG. 41B), when the first guided portion H41 moves to the end of the first guide segment H1031 of the first guide rail H103 or moves to the second guide segment H1032 (that is, when the first guided portion reaches the recessed position), the second guided portion H42 may be abutted against the third guide segment H1041 of the second guide rail H104, the first guided portion H41 may also be separated from being abutted against the first guide rail H103, and the first end 1A of the process cartridge may be lifted.

In the later stage of the process cartridge installation, the second guided portion H42 may be abutted against the third guide segment H1041, the third guided portion H43 may be abutted against the third guide rail H1012, and the process cartridge may be supported by the second guide rail H104 and the third guide rail H1012. As the process cartridge 1 continues to move forward along the installation direction X of the process cartridge, the second guided portion H42 may be abutted against the third guide segment H1041 and enter the fourth guide segment H1042. During movement of the second guided portion H42 being abutted against the fourth guide segment H1042, the process cartridge 1 may rotate along the W direction with the abutting point of the second guided portion H42 and the fourth guide segment H1042 and the abutting point of the third guided portion H43 and the third guide rail H1012 as the support points. That is, the process cartridge 1 may move in the manner of moving along the guide rail while rotating, and the pressing part H40 may be lifted along the W direction. Such movement manner may prevent the pressing part H40 from interfering with the first blocking wall 1081. During such process, the process cartridge may move under the action of external force, or under the action of its own gravity.

As the process cartridge 1 continues to move forward along the installation direction (X direction) of the process cartridge, the second guided portion H42 may be finally separated from the second guide rail H104 from the fifth guide segment H1043, the pressing part H40 may protrude into the opening 10813 above the blocking wall 1081 to press the driving unit 1080, and the guiding-pressing surface H45 may press against the outer edge 10814 of the opening 10813. At this point, the installation of the process cartridge 1 may be completed. The first movable part H1033 may press against the first guide surface H44 to limit the rotation of the process cartridge 1, such that the state of the process cartridge 1 may be more stable. During such process, the process cartridge may move under the action of external force, or under the action of its own gravity.

Referring to FIGS. 43-45, during the installation process of the process cartridge 1, since the first end 1A of the process cartridge 1 may be configured with a hollow-out escape portion H48, the process cartridge 1 may avoid interference with the first movable part H1033 during the installation process. During the installation process of the process cartridge 1, the first pressing surface H46 disposed on the second end 1B of the process cartridge 1 may first touch the pushed portion H1014 on the upper side of the swing rod H1013 and push the swing rod H1013 to rotate. In such way, the third guided portion H43 may be prevented from being blocked by the free end of the swing rod H1013.

When the process cartridge 1 is removed, the user may hold the handle of the process cartridge 1 and remove the process cartridge 1 from the electronic image-forming apparatus along the direction opposite to the installation direction (direction X) of the process cartridge. It should be noted that, in the early stage of removing the process cartridge 1, the second guided portion H42 may be abutted against the second guide rail H104 and move along the second guide rail H104; and in the later stage of removing the process cartridge 1, the second guided portion H42 may be supported by the first guided portion H41 of the process cartridge 1, that is, the second guided portion H42 may be abutted against the first guide rail H103 and move along the first guide rail H103, and the third guided portion H43 may be always supported by the third guide rail H1012.

Figure 49:
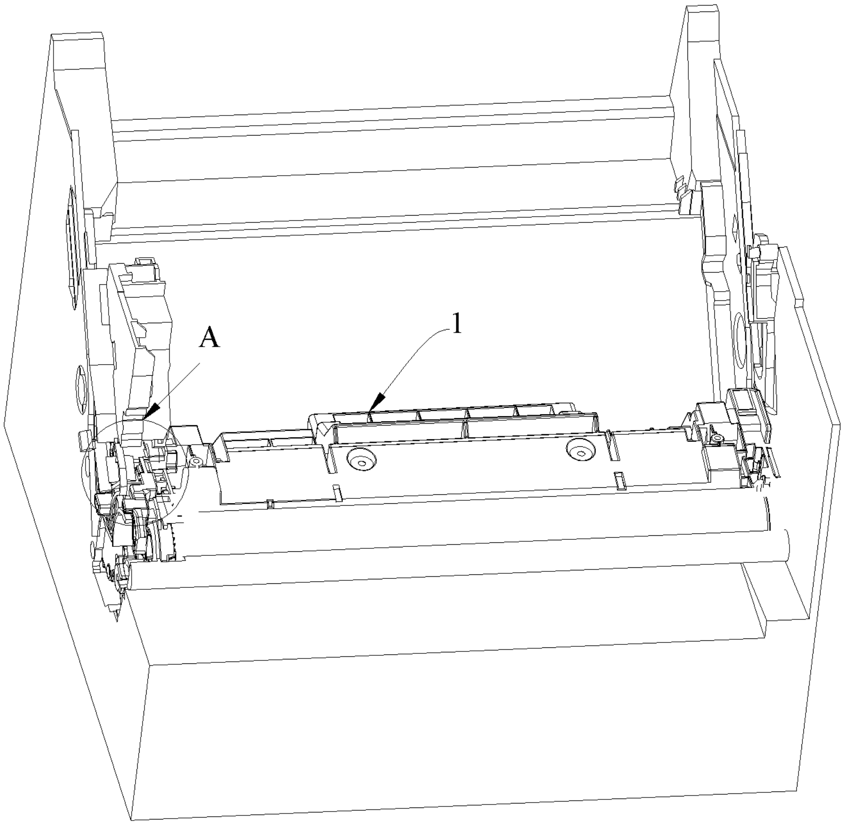
Figure 50:
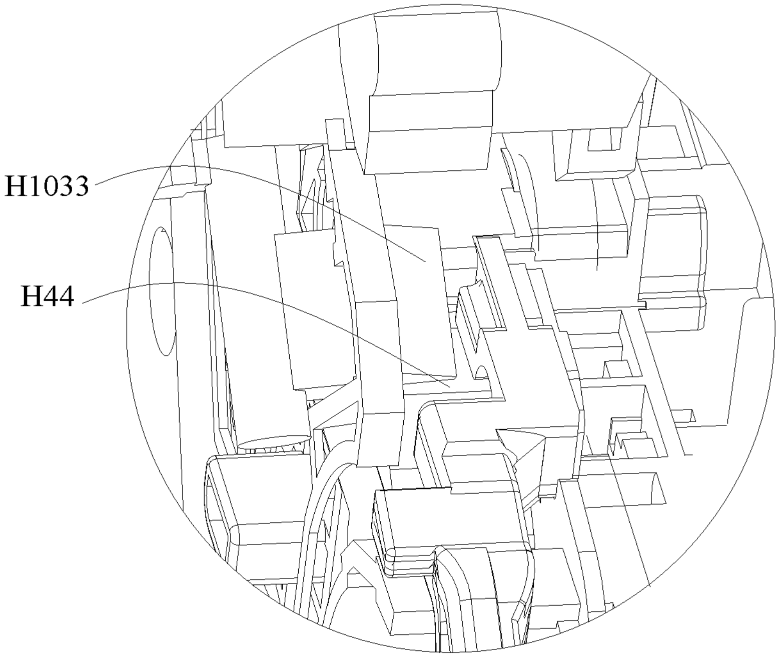
FIG. 50 illustrates an enlarged view of a region A according to embodiment eight of the present disclosure.

Referring to FIGS. 49-50, during the process of removing the process cartridge, especially when the user starts to pull the process cartridge, since the first guide surface H44 is pressed by the first movable part H1033, the rotation process of the process cartridge 1 along the opposite direction of the W direction may be limited. In such way, the insertion depth of the pressing part H40 into the opening 10813 may be reduced, thereby reducing or avoiding the interference between the pressing part H40 and the blocking wall 1081 when being removed. Furthermore, since the pressing part H40 be configured with the guiding-pressing surface H45, the removal of the process cartridge 1 may be smoother.

When the second guided portion H42 is abutted against the fourth guide segment H1042, the pressing part H40 may have retracted from the opening 10813, the process cartridge may rotate to a preset angle along the reverse direction of W direction under the action of external force, and the second pressing surface H47 of the process cartridge 1 may first touch the pushed portion H1014 of the swing rod H1013 and push the swing rod H1013 to rotate. In such way, it may prevent the third guided portion H43 from being blocked by the free end of the swing rod H1013 during the removal process of the process cartridge 1 from the electronic image-forming apparatus.

Embodiment Nine

The shapes and structures of the process cartridge and the electronic image-forming apparatus in one embodiment may be substantially same as those of embodiment eight. The part that has been described in embodiment eight may not be described in detail in one embodiment, and only the differences in embodiment eight are described hereinafter.

Figure 52A:
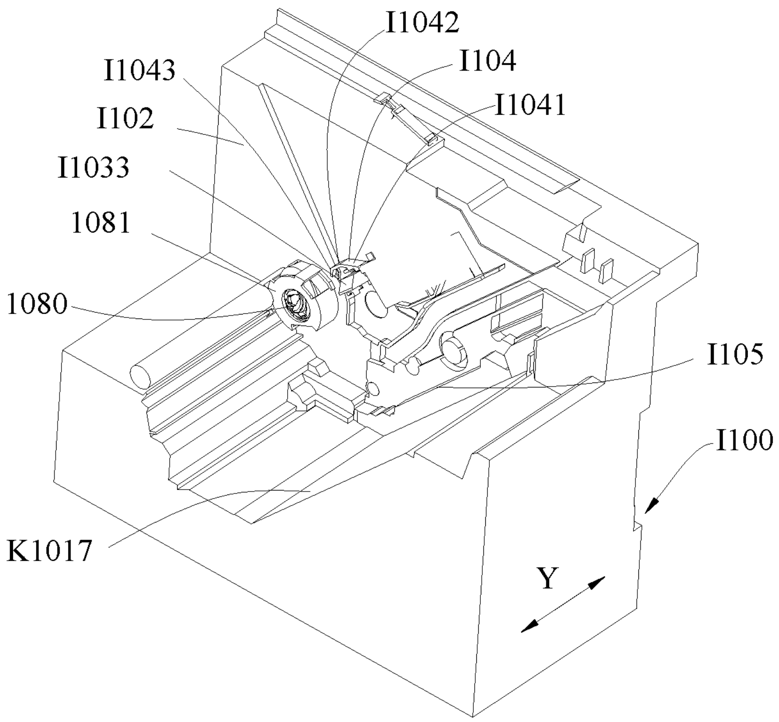
FIG. 52A illustrates a local schematic of a main assembly of an electronic image-forming apparatus according to embodiment nine of the present disclosure.

As shown in FIG. 52A, in the example of the electronic image-forming apparatus of one embodiment, the second side wall I102 of the main assembly I100 of the electronic image-forming apparatus may be configured with a fourth guide rail I105. Optionally, the fourth guide rail I105 may be at least partially located on the lower side of the second guide rail I104 and may be closer to the first side wall I101 of the main assembly I100 relative to the second guide rail I104 along the Y direction. The fourth guide rail I105 may be at least partially located on the upstream side of the second guide rail I104 along the installation direction of the process cartridge. In one embodiment, the fourth guide rail I105 may be inclined toward the rear side of the main assembly I100, and the fourth guide rail I105 may be configured as an inclined surface, a curved surface or a guide groove.

Figure 52B:
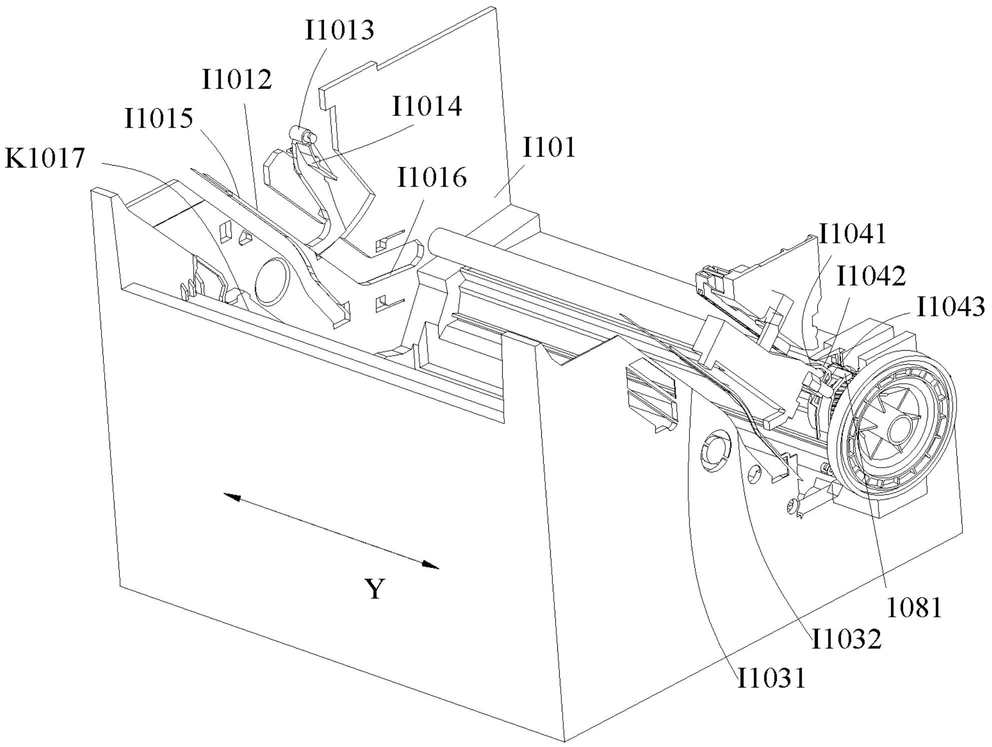
FIG. 52B illustrates another local schematic of a main assembly of an electronic image-forming apparatus according to embodiment nine of the present disclosure.

As shown in FIG. 52B, the first side wall I101 may be configured with the third guide rail I1012 for guiding the installation and positioning of the process cartridge 1. In one embodiment, the third guide rail I1012 may be made of inclined surfaces. Optionally, the third guide rail I1012 may also be made of curved surfaces or guide grooves. Optionally, the third guide rail I1012 may include the sixth guide segment I1015 and the seventh guide segment I1016; and along the installation direction of the process cartridge 1 (the direction X as shown in FIG. 41B), the seventh guide segment I1016 may be located on the downstream side of the sixth guide segment I1015. Optionally, the seventh guide segment I1016 may be in parallel with the bottom surface of the main assembly I100; and the sixth guide segment I1015 may be connected to the seventh guide segment I1016 and inclined toward the rear side of the main assembly I100.

Figure 53:
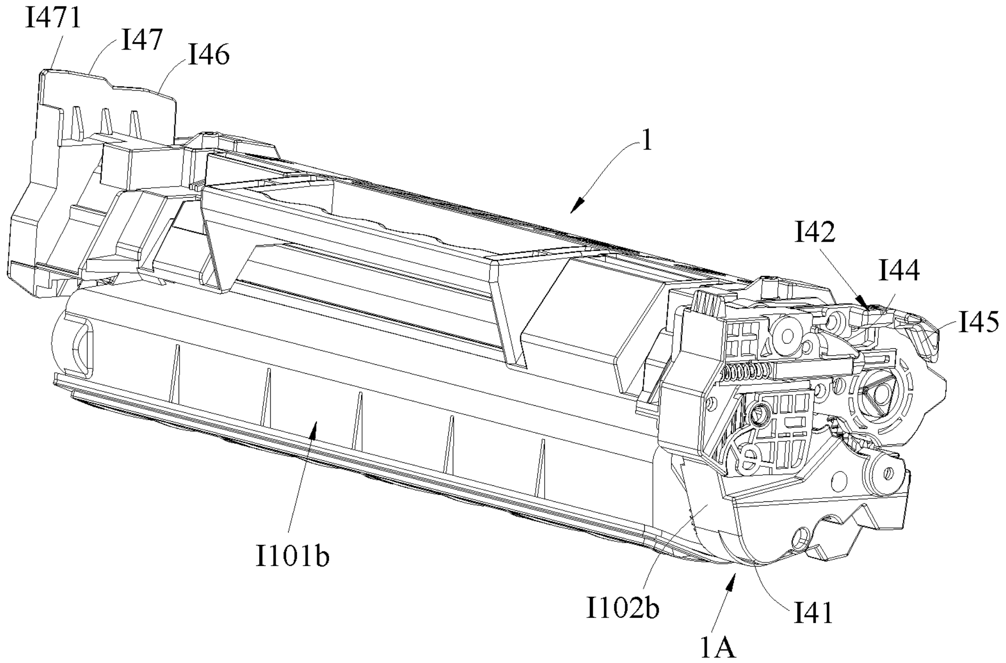
FIG. 53 illustrates a schematic of an overall structure of a process cartridge according to embodiment nine of the present disclosure.
Figure 54:
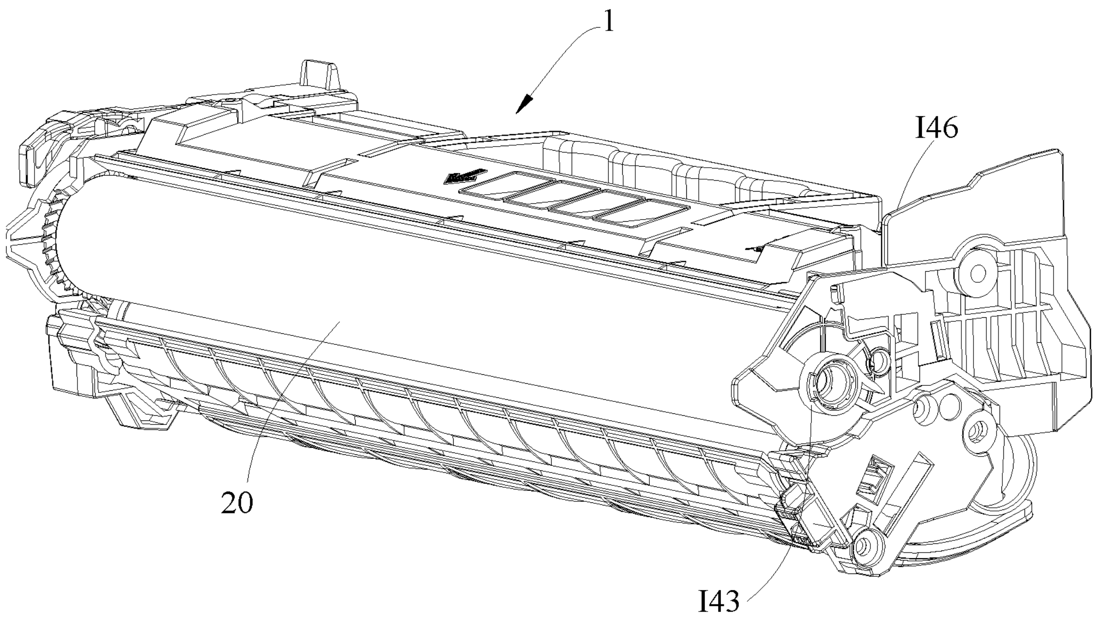
FIG. 54 illustrates a schematic of an overall structure of a process cartridge from another angle according to embodiment nine of the present disclosure.

As shown in FIG. 53, compared with embodiment eight, the first guided portion may not be disposed in one embodiment. The process cartridge in one embodiment may further include the fourth guided portion I41. The fourth guided portion I41 may be disposed on the lower side of the process cartridge 1 (the downstream of the process cartridge 1 in the state that the process cartridge 1 is installed in the electronic image-forming apparatus) and may be at the first end 1A of the process cartridge. Optionally, the fourth guided portion I41 may be disposed at the end cover I102*b* of the developing frame I101*b*. Optionally, the fourth guided portion I41 may be configured as an arc surface, and the fourth guided portion I41 may be located below the second guided portion I42 when the process cartridge 1 is installed in the electronic image-forming apparatus. The fourth guided portion I41 may be located on the upstream side of the second guided portion I42 along the installation direction of the process cartridge 1. Optionally, the fourth guided portion I41 may also be disposed at other position at the end of the developing frame I101*b* or configured as a part extending from other position of the process cartridge, as long as the fourth guided portion may be cooperated with the fourth guide rail I105 during the installation process.

Similar to embodiment eight, the second end 1B of the process cartridge 1 in one embodiment may be also configured with the first pressing surface I46 for unlocking the swing rod I1013 (the second identification mechanism) during the installation process and the second pressing surface I47 for unlocking the swing rod I1013 during the removal process of the process cartridge 1 from the electronic image-forming apparatus. The first pressing surface I46 and the second pressing surface I47 may be higher than the upper surface of the process cartridge. During the installation and removal process of the process cartridge, both the second pressing surface I47 and the first pressing surface H46 may be distributed in steps, that is, a height difference may be between such two surfaces, and the second pressing surface H47 may be located on the upper side of the first pressing surface H46. In one embodiment, the first pressing surface I46 and the second pressing surface I47 may be configured as curved surfaces or inclined surfaces. For example, the first pressing surface I46 and the second pressing surface I47 may be inclined toward the direction opposite to the installation direction (X direction) of the process cartridge.

In some optional embodiments, the process cartridge 1 may further include a limiting portion I471 in one embodiment. The limiting portion I471 may limit the position of the process cartridge 1 when the process cartridge is removed, which may prevent the process cartridge 1 from over-rotating to cause unsmooth removal of the process cartridge. For example, in some embodiments, overall rotation of the process cartridge may occur during the removal process, and the rotation of the process cartridge 1 beyond a certain range may affect the effect of removing the process cartridge. Therefore, it may need to limit the movement of the process cartridge 1 during the removal process to prevent the process cartridge from excessive rotation. Optionally, since the limiting portion I471 may be disposed at the second pressing surface I47, the limiting portion I471 may be limited by the swing rod I1013 when the process cartridge rotates, thereby limiting the rotation of the process cartridge.

Next, specific operation process of removing or installing the process cartridge 1 from the electronic image-forming apparatus and the cooperation process of all parts with the electronic image-forming apparatus are described in detail with reference to FIGS. 52A-59B.

During the installation process of the process cartridge 1, the stage before the second guided portion I42 is not supported by the second guide rail I104 is referred to as early stage (or early installation section) in the installation process of the process cartridge 1; and the stage after the second guided portion I42 is supported by the second guide rail I104 is referred to as later stage (or later installation section) in the installation process of the process cartridge 1.

Figure 55:
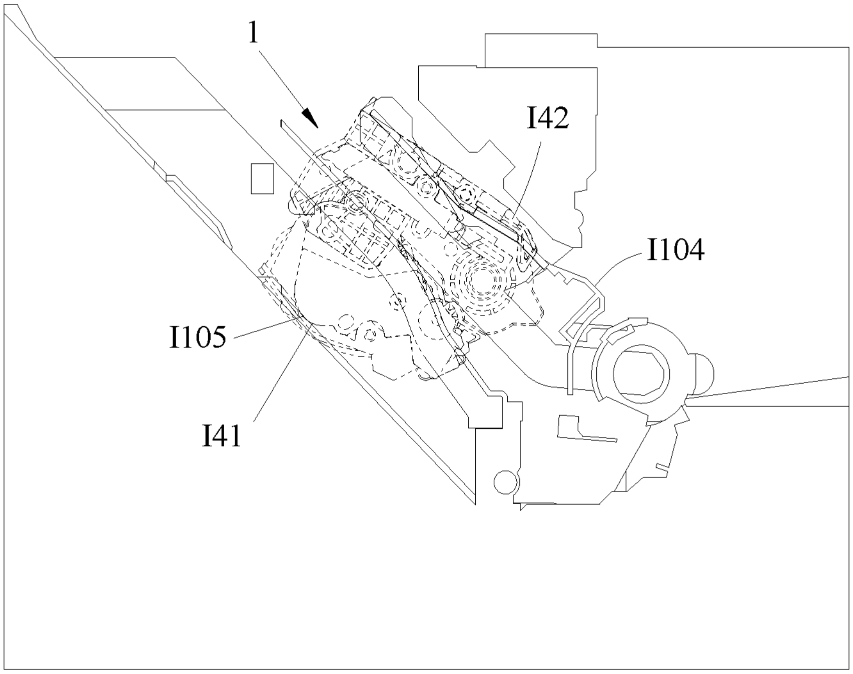
FIG. 55 illustrates a cooperation relationship schematic between a process cartridge and an electronic image-forming apparatus in an early stage of an installation process according to embodiment nine of the present disclosure.

In the early installation stage of the process cartridge 1, as shown in FIG. 55, the user may hold the handle (not shown) of the process cartridge 1 to place the process cartridge into the electronic image-forming apparatus, make the fourth guided portion I41 and the third guided portion I43 to be inserted into the positions of the fourth guide rail I105 and the third guide rail I1012 respectively, and push the process cartridge 1 along the installation direction (X direction) of the process cartridge 1. At this point, the fourth guided portion I41 of the process cartridge 1 may be abutted against the surface of the fourth guide rail I105, the second guided portion I42 may be not abutted against the second guide rail I104, and the third guided portion I43 may be abutted against the surface of the sixth guide segment I1015 of the third guide rail I1012. That is, the process cartridge 1 may be supported by the fourth guide rail I105 and the third guide rail I1012 without being supported by the second guide rail I104. During such period, in some optional embodiments, it may further include unlocking the swing rod I1013, such that the process cartridge may be installed accurately. That is, the first pressing surface I46 may first touch the swing rod I1013 and push the swing rod I1013 to swing from the locked position to the unlocked position, thereby avoiding installation interference caused by the third guided portion I43 touching the swing rod I1013.

Figure 56:
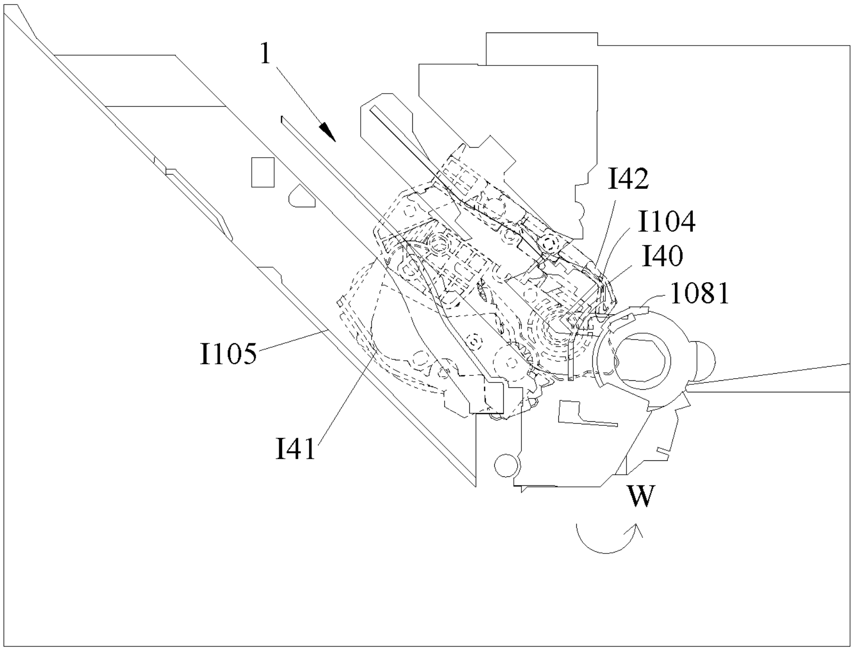
FIG. 56 illustrates a cooperation relationship schematic between a process cartridge and an electronic image-forming apparatus in a later stage of an installation process according to embodiment nine of the present disclosure.

As the process cartridge 1 continues to move forward along the guide rail toward the installation direction (X direction) of the process cartridge, referring to FIG. 56, the second guided portion I42 may be abutted against the second guide rail I104, and the fourth guided portion I41 may be not abutted against the fourth guide rail I105. The process cartridge 1 may enter the later installation stage, the second guided portion I42 may be abutted against the third guide segment I1041, and the third guided portion I43 may be abutted against the surface of the third guide rail I1012 (for example, may be abutted against the sixth guide segment I1015 surface), and the process cartridge 1 may be supported by the second guide rail I104 and the third guide rail I1012. As the process cartridge 1 moves forward, the second guided portion I42 may be abutted against the third guide segment I1041 and enter the fourth guide segment I1042. Optionally, during movement of the second guided portion I42 being abutted against the fourth guiding segment I1042, the process cartridge 1 may rotate along the W direction with the abutting point of the second guided portion I42 and the fourth guide segment I1042 and the abutting point of the third guided portion I43 and the third guide rail I1012 as support points. That is, the process cartridge 1 may move in the manner of moving along the guide rail while rotating, and the pressing part I40 may be lifted along the W direction. Such movement manner may avoid the pressing part I40 from interfering with the first blocking wall 1081 in the forward direction. During such process, the process cartridge 1 may move under the action of external force or move and rotate under the action of its own gravity.

Referring to FIG. 41B, in some optional embodiments, as the process cartridge 1 continues to move forward toward the installation direction X of the process cartridge, the second guided portion I42 may finally be separated from the second guide rail I104 from the fifth guide segment I1043, the pressing part I40 may protrude into the opening 10813 above the blocking wall 1081 (as shown in FIG. 41B) to press the driving unit 1080, and the second guide surface I45 may press against the outer edge 10814 of the opening 10813 (as shown in FIG. 41B). At this point, the installation of the process cartridge 1 may be completed. The first movable part I1033 may press against the first guide surface I44 to limit the process cartridge 1 from rotating, such that the state of the process cartridge 1 may be more stable. During such process, the process cartridge 1 may move under the action of external force, or under the action of its own gravity.

In some optional embodiments, when the second guided portion I42 of the process cartridge is abutted against the third guide segment I1041 or abutted against the fifth guide segment I1043, the second guided portion I42 may rotate along the W direction, which may avoid interference and ensure the smooth installation of the process cartridge.

Figure 57:
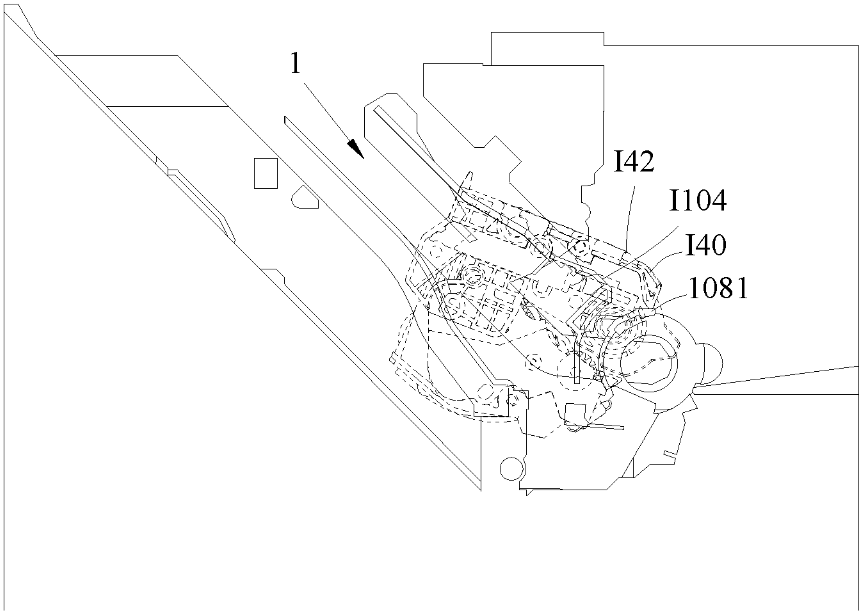
FIG. 57 illustrates a cooperation relationship schematic between a process cartridge and an electronic image-forming apparatus in a final stage of an installation process according to embodiment nine of the present disclosure.
Figure 58:
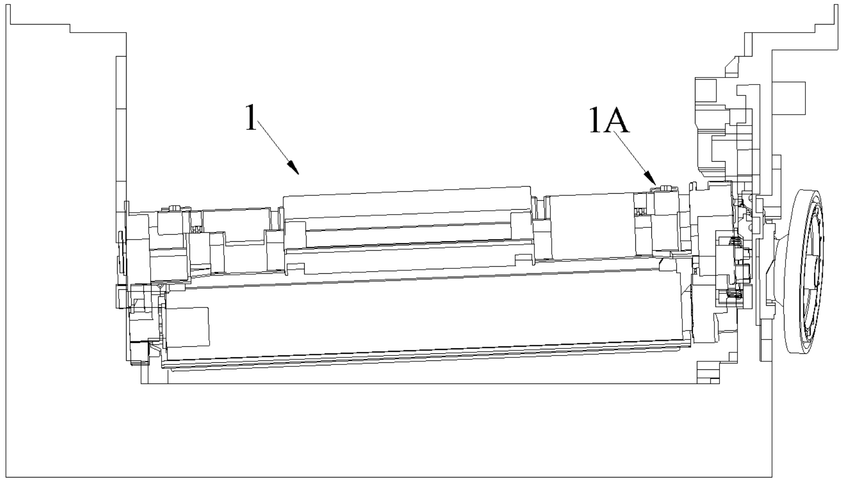
FIG. 58 illustrates another cooperation relationship schematic between a process cartridge and an electronic image-forming apparatus in a final stage of an installation process according to embodiment nine of the present disclosure.

In some optional embodiments, the installation process of the process cartridge 1 may further include final installation stage. In one embodiment, the installation process after the second guided portion I42 of the process cartridge 1 is separated from the second guide rail I104 is referred to as the final installation stage (or the final installation section). At the final installation stage, as shown in FIG. 57, the second guided portion I42 may be separated from the second guide rail I104, the free end of the pressing part I40 may be abutted against the upper side of the first blocking wall 1081, and the first end 1A of the process cartridge 1 may be lifted by a preset distance (as shown in FIG. 58). As the process cartridge 1 moves forward, the pressing part I40 may protrude into the opening 10813 above the blocking wall 1081 to press the driving unit 1080, and the first end 1A of the process cartridge may be lower as a whole; and when the door cover of the image-forming apparatus is closed, the driving unit 1080 may be forced to rotate to the position coincident with the axis of the blocking wall 1081. At this point, the force receiving unit disposed on the process cartridge 1 may be engaged with the driving unit 1080. In addition, on the plane perpendicular to the axial direction of the photosensitive drum, the projection of the pressing part may be outside the projection range of the photosensitive drum.

The cooperating process of all parts in the removal process of the process cartridge refers to the cooperating process of all parts in the installation process of the process cartridge. The design of such structure may make the removal and installation of the process cartridge smoother.

For example, when the process cartridge 1 is removed, the user may hold the handle of the process cartridge 1, and remove the process cartridge 1 out of the electronic image-forming apparatus along the opposite direction of the installation direction (X direction) of the process cartridge; at the early stage of removing the process cartridge 1, when the process cartridge is initially pulled, the rear portion of the process cartridge may be lifted to make the process cartridge rotate at a preset angle to reduce interference; and as the process cartridge moves, the second guided portion I42 may be abutted against the second guide rail I104 and move along the second guide rail I104. In some optional embodiments, the second pressing surface I47 may first touch the pushed portion I1014 of the swing rod I1013 and push the swing rod I1013 to swing from the locked position to the unlocked position, which may prevent the third guided portion I43 from touching the swing rod I1013 to avoid process cartridge removal interference.

In the later stage of removal, the fourth guided portion I41 of the process cartridge 1 may be configured for support. That is, the fourth guided portion I41 may be abutted against the fourth guide rail I105 and move along the fourth guide rail I105, while the third guided portion I43 may be always supported by the third guide rail I1012.

Figure 59A:
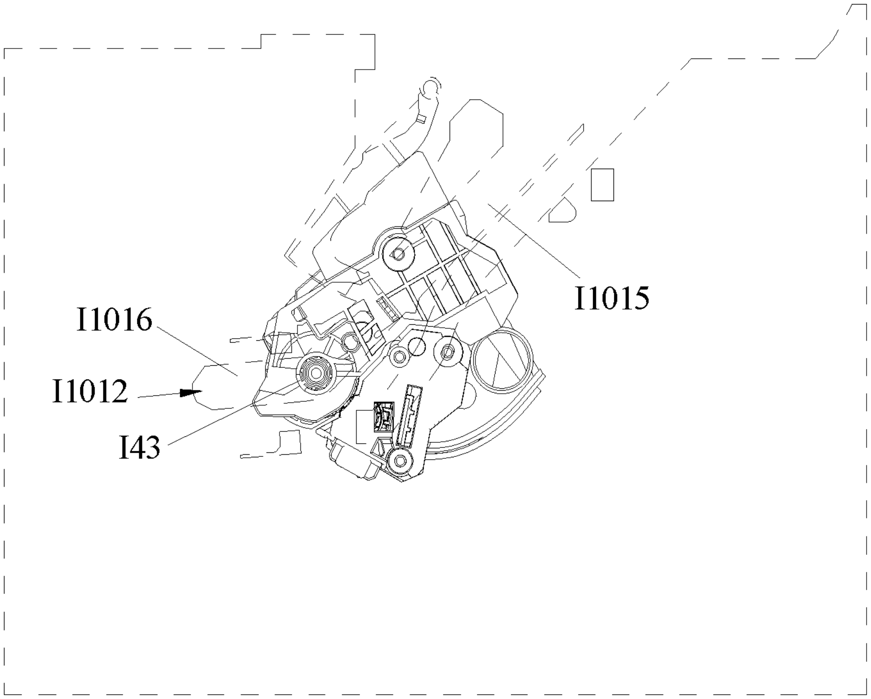
FIG. 59A illustrates a cooperation relationship schematic between a limiting portion and a swing rod during a process of removing a process cartridge according to embodiment nine of the present disclosure.
Figure 59B:
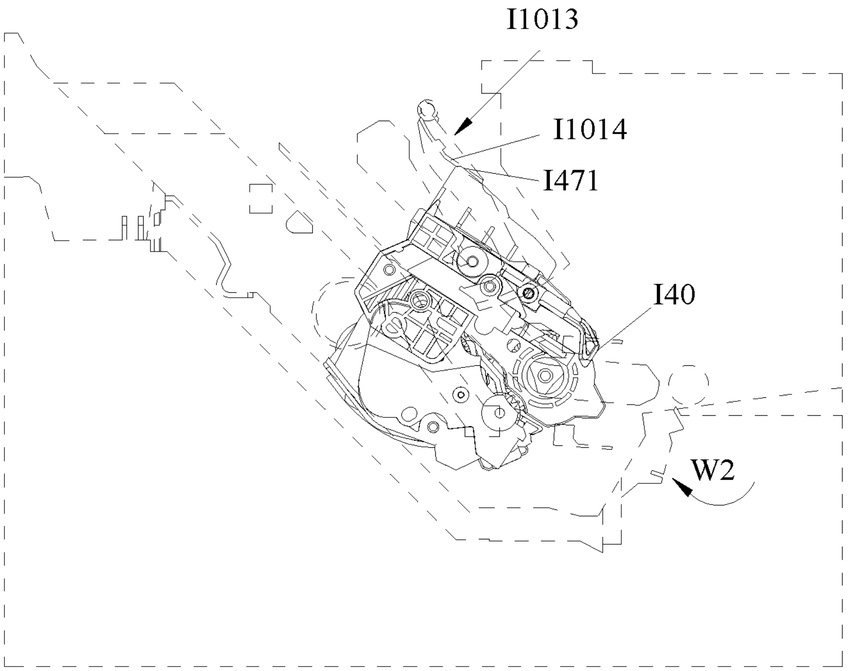
FIG. 59B illustrates a cooperation relationship schematic between a limiting portion and a swing rod during a process of removing a process cartridge from another angle according to embodiment nine of the present disclosure.

In some optional embodiments, during the process of removing the process cartridge, the process cartridge may rotate. The reason for the process cartridge rotation may be due to the direction of the user's pulling force or special structural design of the process cartridge. As shown in FIGS. 59A-59B, during movement of the third guided portion I43 from the seventh guide segment I1016 of the third guide rail I1012 to the junction with the sixth guide segment I1015, the second pressing surface I47 may touch the swing rod I1013 and push the swing rod I1013 to swing upward to unlock the swing rod I1013.

As the process cartridge moves along the opposite direction of the installation direction (X direction) of the process cartridge, the process cartridge may rotate a preset angle along the W2 direction, and the limiting portion I471 may be abutted against the pushed portion I1014 of the swing rod I1013, the swing rod I1013 may swing up to the upper limit position (for example, in some embodiments, the swing rod I1013 may touch the side wall of the electronic image-forming apparatus or other limiting portions when at the upper limit position, so the swing rod may not continue to swing). Since the limiting portion I471 is abutted against the pushed portion I1014 of the swing rod I1013 to make the process cartridge to not continuing to rotate, the removal of the process cartridge may be smoother. In some embodiments, the setting of the limiting portion I471 may prevent the process cartridge from over-rotating at a preset position, thereby preventing the pressing part I40 from interfering with the blocking wall or the side wall of the electronic image-forming apparatus.

In some optional embodiments, the limiting portion I471 may be abutted against the pushed portion I1014 of the swing rod I1013 and make the swing rod I1013 at the upper limit position, that is, when the third guided portion I43 is located in the sixth guide segment I1015, or when the third guided portion I43 is located at the junction of the sixth guide segment I1015 and the seventh guide segment I1016, or obviously, when the third guided portion I43 is located in the seventh guiding segment I1016.

In some optional embodiments, during the installation or removal process of the process cartridge 1, the fourth guided portion I41 may be supported by the fourth guide rail I105, and the second guided portion I42 may be supported by the second guide rail I104, for example during the transition between early installation stage and later installation stage.

In some optional embodiments, during the installation or removal process of the process cartridge 1, the second guided portion I42 may be supported by the second guide rail I104, and the pressing part I40 may be supported by the blocking wall 1081, for example, during the transition between later installation stage and final installation stage.

In some optional embodiments, in the early installation stage of the process cartridge, the fourth guided portion I41 of the process cartridge may be abutted against the surface of the fourth guide rail I105, the third guided portion I43 may be abutted against the surface of the sixth guide segment I1015, that is, the process cartridge may be supported by two support points. Therefore, during the installation process, the process cartridge may rotate around these two support points to avoid interference with some structures in the electronic image-forming apparatus, thereby making the installation of the process cartridge smoother.

Embodiment Ten

One embodiment is an improvement on the basis of embodiment eight and embodiment nine, the similarities may not be described in detail, and the main differences are described hereinafter.

Referring to FIGS. 52A and 52B, the main assembly of the electronic image-forming apparatus may further include the fifth guide rail K1017. In one embodiment, the fifth guide rail K1017 may be located between the first side wall I101 and the second side wall I102 of the main assembly I100 of the electronic image-forming apparatus and may be configured as an inclined surface. Optionally, the fifth guide rail may also be a curved surface or a guide groove.

Figure 60:
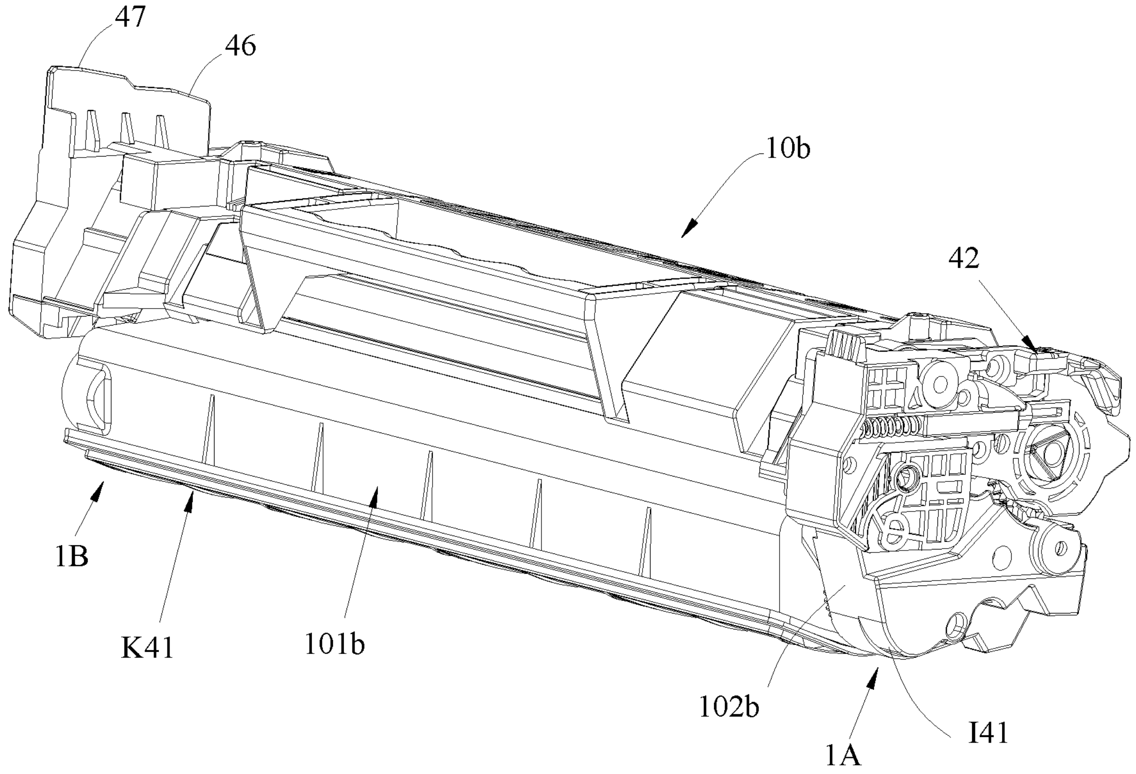
FIG. 60 illustrates a schematic of an overall structure of a process cartridge according to embodiment ten of the present disclosure.

On the basis of the process cartridges provided in embodiment eight and embodiment nine, the process cartridge in one embodiment may further include the fifth guided portion K41 cooperated with the fifth guide rail K1017, while canceling the first guided portion. As shown in FIG. 60, the fifth guided portion K41 may be disposed on the lower side of the process cartridge, for example, the lower side of the developing frame 101*b*, to be supported by the fifth guide rail K1017 during the installation or removal process of the process cartridge. Optionally, the fifth guided portion K41 may be disposed at the position which is in the middle of the process cartridge and biased toward the second end 1B. Optionally, the fifth guided portion K41 may also be disposed at the middle or the first end portion 1A, as long as the fifth guided portion K41 may be cooperated with the fifth guide rail K1017. The process cartridge in one embodiment may be substantially same as the process of embodiment eight and embodiment nine in the installation or removal process. The main difference is that the process cartridge 1 in one embodiment may be supported by the fifth guide rail K1017 at the early installation stage, that is, the fifth guided portion K41 may be cooperated with the fifth guide rail K1017.

In some optional embodiments, as shown in FIG. 60, the process cartridge may retain both the fourth guided portion I41 and the fifth guided portion K41. At the early installation stage or the later or final removal stage of the process cartridge, the process cartridge may be simultaneously supported by the fourth guide rail I105 and the fifth guide rail K1017. That is, the fourth guided portion I41 may be in contact with the fourth guide rail 105 and the fifth guided portion K41 may be in contact with the fifth guide rail K1017 at the early installation stage or the later removal stage of the process cartridge.

Embodiment Eleven

One embodiment is an improvement on the basis of above-mentioned embodiments, the similarities may not be described in detail, and the main differences are described hereinafter.

In one embodiment, the unlocking part L47 may be configured to be movable relative to the cartridge body. In such way, the flexibility of the process cartridge of being installed and/or removed from the electronic image-forming apparatus may be increased, and the interference possibility during the installation and removal process of the process cartridge may be reduced.

Figure 61:
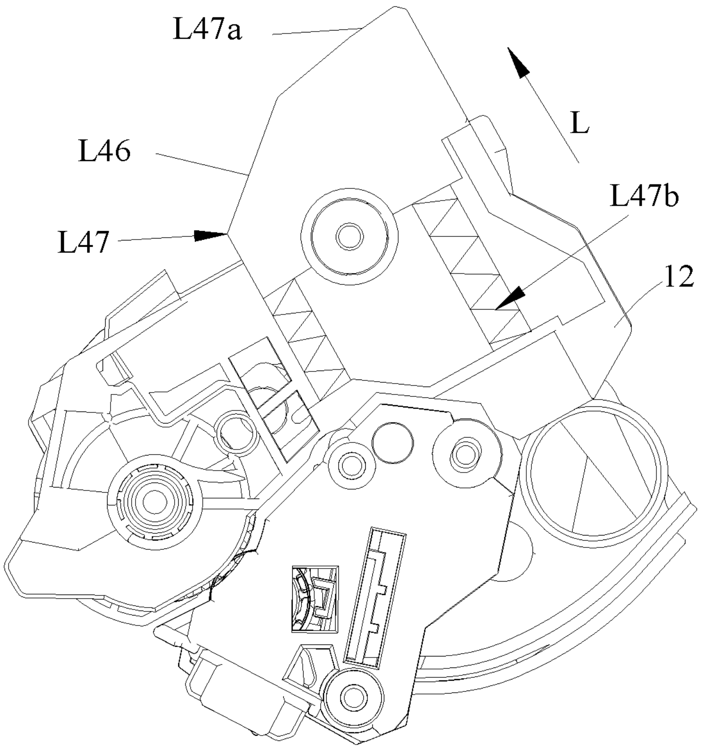
FIG. 61 illustrates a structural schematic of one end of a process cartridge according to embodiment eleven of the present disclosure.

For example, as shown in FIG. 61, in one embodiment, the process cartridge may further include an elastic part L47*b*. The elastic part L47*b* may be disposed between the photosensitive drum frame 12 and the unlocking part L47, a preset movable space may be between the unlocking part L47 and the photosensitive drum frame 12, and the unlocking part L47 may be movable along the L direction and the opposite direction of the L direction. Optionally, the elastic part L47*b* may be a compression spring, a tension spring or an elastic arm integrally formed with the unlocking part. When the first pressing surface L46 or the second pressing surface L47*a* of the unlocking part L47 touches to unlock the swing rod I1013, the unlocking part L47 may move against the elastic force of the elastic part L47*b*.

Figure 59C:
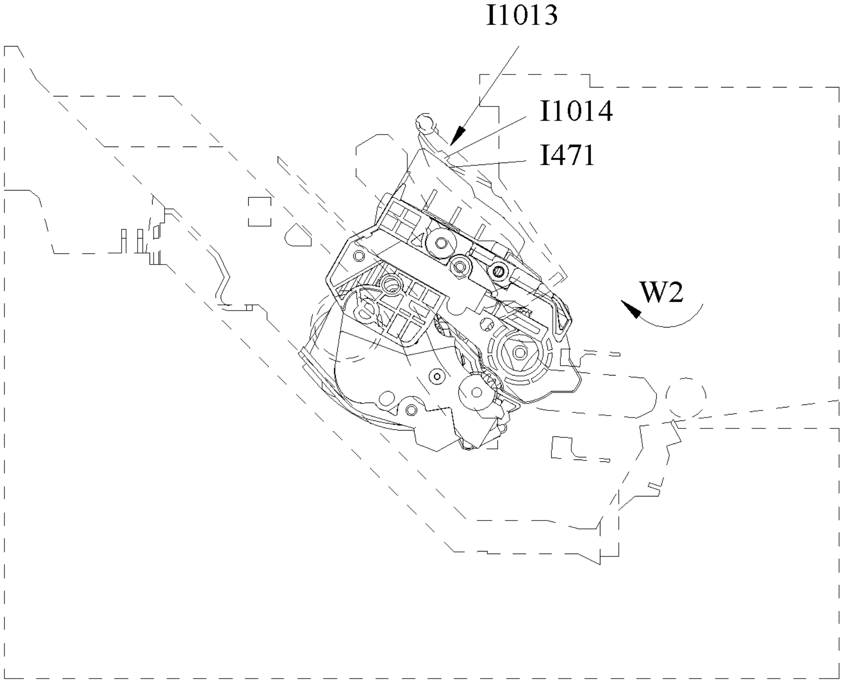
FIG. 59C illustrates another cooperation relationship schematic between a limiting portion and a swing rod during a process of removing a process cartridge according to embodiment nine of the present disclosure.

In some optional embodiments, during the installation or removal process of the process cartridge to/from the electronic image-forming apparatus, the unlocking part L47 may always keep in contact with the swing rod I1013 after touching to unlock the swing rod I1013 (as shown in FIG. 59C), that is, the unlocking part L47 still may be abutted against the swing rod I1013 in the state where the process cartridge is installed in place.

In some optional embodiments, the unlocking part L47 may still be abutted against the swing rod I1013 when the process cartridge is installed in place and make the swing rod I1013 in the unlocked position.

Embodiment Twelve

One embodiment is a further improvement on the basis of above-mentioned embodiments, the similarities may not be described in detail, and the improvements are described in detail hereinafter.

Figures 62, 63, 64:
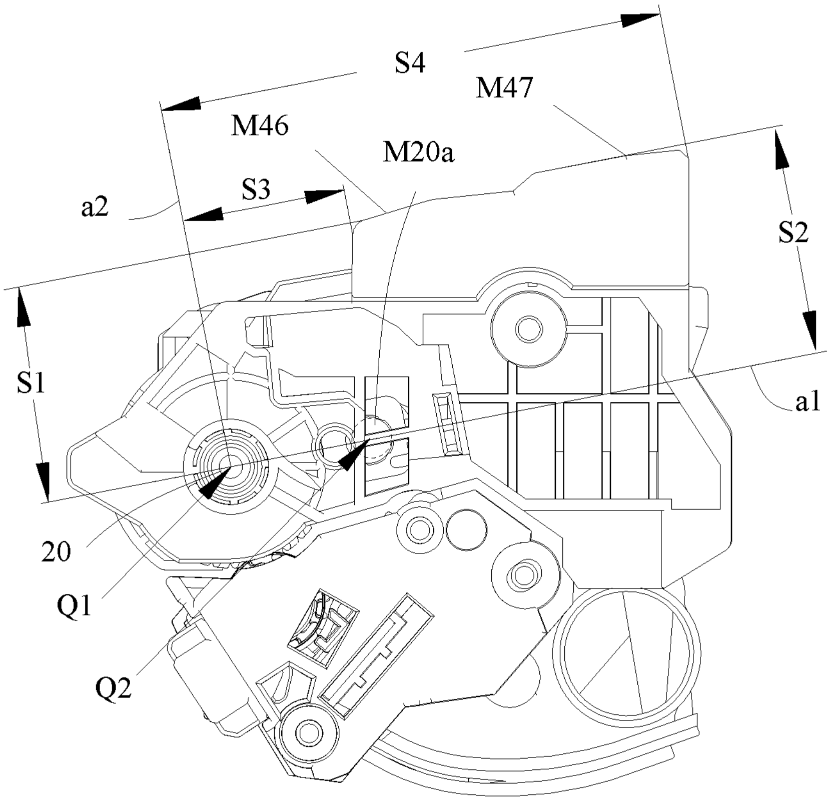
FIG. 62 illustrates another structural schematic of one end of the process cartridge according to embodiment twelve of the present disclosure.
FIG. 63 illustrates minimum values of S1 and minimum values of S3 according to embodiment twelve of the present disclosure.
FIG. 64 illustrates minimum values of S2 and minimum values of S4 according to embodiment twelve of the present disclosure.

As shown in FIG. 62, the process cartridge may include a photosensitive drum 20 and a charging roller M20*a*, which may be rotatably supported on a photosensitive drum frame. FIG. 62 illustrates the projection of the process cartridge on the plane perpendicular to the axis of rotation of the photosensitive drum. On the projection plane, the rotation center of the photosensitive drum is Q1, and the rotation center of the charging roller M20*a* is Q2; a1 is the straight line passing between Q1 and Q2, and a2 is the straight line passing through Q1 and perpendicular to the straight line a1; and the vertical distance from the point on the first pressing surface M46 to the straight line a1 is S1, the vertical distance from the point on the second pressing surface M47 to the straight line a1 is S2, the horizontal distance from the point on the first pressing surface M46 to the straight line a2 is S3, and the horizontal distance from the point on the second pressing surface M47 to the straight line a2 is S4. Excessively large or small S1, S2, S3 and S4 may affect the installation and removal of the process cartridge and the cooperation with the swing rod I1013.

In order to make the installation of the process cartridge smoother and make the first pressing surface M46 and the second pressing surface M47 to be cooperated better with the swing rod I1013, optionally, 20 mm≤S1≤35 mm, 20 mm≤S2≤40 mm, 5 mm≤S3≤35 mm, 40 mm≤S4≤80 mm.

Furthermore, above technical solution may be further optimized. If the values of S1 and S3 may be respectively: 25 mm≤S1≤27 mm, 18 mm≤S3≤32 mm, S1 and S3 which satisfy above value requirements, may ensure smoother installation of the process cartridge and desirable cooperation effect between the first pressing surface M46 and the swing rod I1013.

Exemplarily, FIG. 63 shows the combination of the minimum value of S1 and the minimum value of S3. Such structural design may make the installation of the process cartridge smoother and make the cooperation effect between the first pressing surface M46 and the swing rod I1013 to be desirable.

When 29 mm≤S2 minimum value≤37.5 mm and 52 mm≤S4 minimum value≤80 mm, the process cartridge may be removed from the electronic image-forming apparatus smoothly, and the cooperation effect between the second pressing surface M47 and the swing rod I1013 may be desirable.

Exemplarily, FIG. 64 shows the combination of the minimum value of S2 and the minimum value of S4. Such structural design may make the installation of the process cartridge smoother and make the cooperation effect of the first pressing surface 47 and the swing bar I1013 to be desirable.

One embodiment is a further improvement on the basis of above-mentioned embodiments, the similarities may not be described in detail, and the improvements are described in detail hereinafter.

Figures 65, 66:
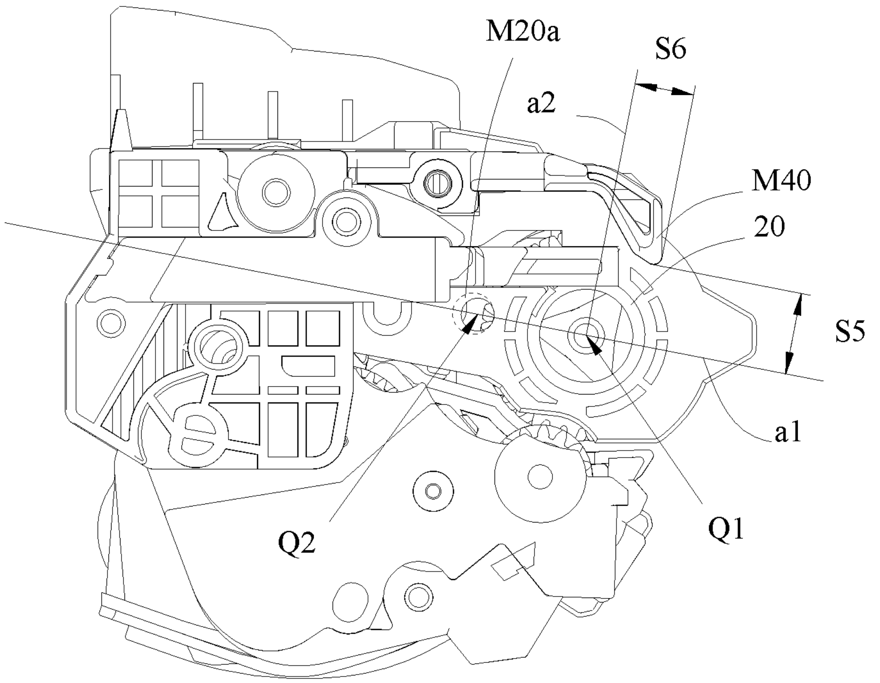
FIG. 65 illustrates a structural position schematic of S5 and S6 according to embodiment twelve of the present disclosure.
FIG. 66 illustrates minimum values of S5 and S6 according to embodiment twelve of the present disclosure.

The process cartridge may include the photosensitive drum 20 and the charging roller M20*a* as shown in FIG. 65, which shows the projection of the process cartridge on the plane perpendicular to the rotational axis of the photosensitive drum. On the projection plane, Q1 is the rotation center of the photosensitive drum 20, Q2 is the rotation center of the charging roller M20*a*, a1 is the line passing between Q1 and Q2, and a2 is the line passing through Q1 and perpendicular to the line a1. The vertical distance from the free end of the pressing part M40 to the straight line a1 is S5, and the vertical distance from the free end of the pressing part M40 to the straight line a2 is S6.

In order to make the installation and removal of the cartridge smoother and avoid interference between the pressing part and the blocking wall 1081, S5 and/or S6 may not be excessively large or small which may make the installation and removal of the cartridge not smooth and make the cooperation with the driving unit 1080 to be not desirable. For example, in some embodiments, if S5 is excessively large and/or S6 is excessively small, it may not effectively press the driving unit 1080, that is, the driving unit 1080 may not be properly forced to be coaxially-aligned. In some embodiments, if S5 is excessively small and/or S6 is excessively large, it may cause interference with the printer when installing or removing the cartridge.

After installation and removal testing, it had been found that, optionally, when 8 mm≤S5≤15 mm, 4 mm≤S6≤12 mm, the process cartridge may be installed to or removed from the electronic image-forming apparatus smoothly and may effectively press the driving unit 1080.

Exemplarily, when selected values of S5 and S6 are combined as shown in FIG. 66, the installation of the process cartridge may be smoother, and the cooperation effect between the pressing part M40 and the driving unit 1080 may be desirable.

Embodiment Thirteen

Based on above-mentioned embodiments, a method for installing and removing the process cartridge from the electronic image-forming apparatus is provided in one embodiment.

The method for installing and removing the process cartridge to and from the electronic image-forming apparatus is described below. The method for installing the process cartridge, for example, may include following exemplary steps.

At step A1, the electronic image-forming unit door may be opened.

At step A2, the process cartridge may be inserted into the main assembly of the electronic image-forming apparatus along the installation direction.

At step A3, when the process cartridge moves to the later installation stage, the process cartridge may rotate along the W direction under the action of external force.

The method for removing the process cartridge from the electronic image-forming apparatus, for example, may include following exemplary steps.

At step B1, the electronic image-forming unit door may be opened.

At step B2, the process cartridge may be pulled along the opposite direction of installation, and the process cartridge may rotate at a preset angle along the opposite direction of W under the action of external force.

At step B3, the process cartridge may continue to be pulled until the process cartridge is completely detached from the electronic image-forming apparatus.

Through above steps, the installation and removal of the process cartridge may be smoother, and unnecessary interference may be avoided.

Embodiment Fourteen

Figure 67:
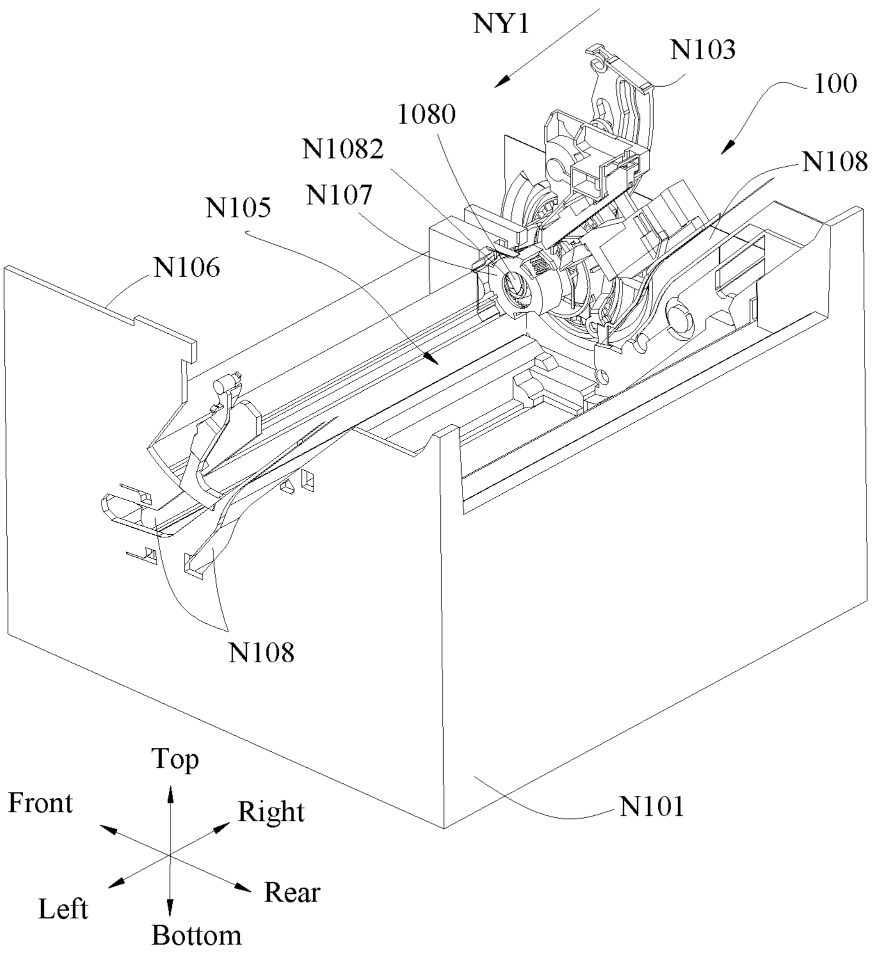
FIG. 67 illustrates a local structural schematic of an electronic image-forming apparatus according to embodiment fourteen of the present disclosure.
Figure 68:
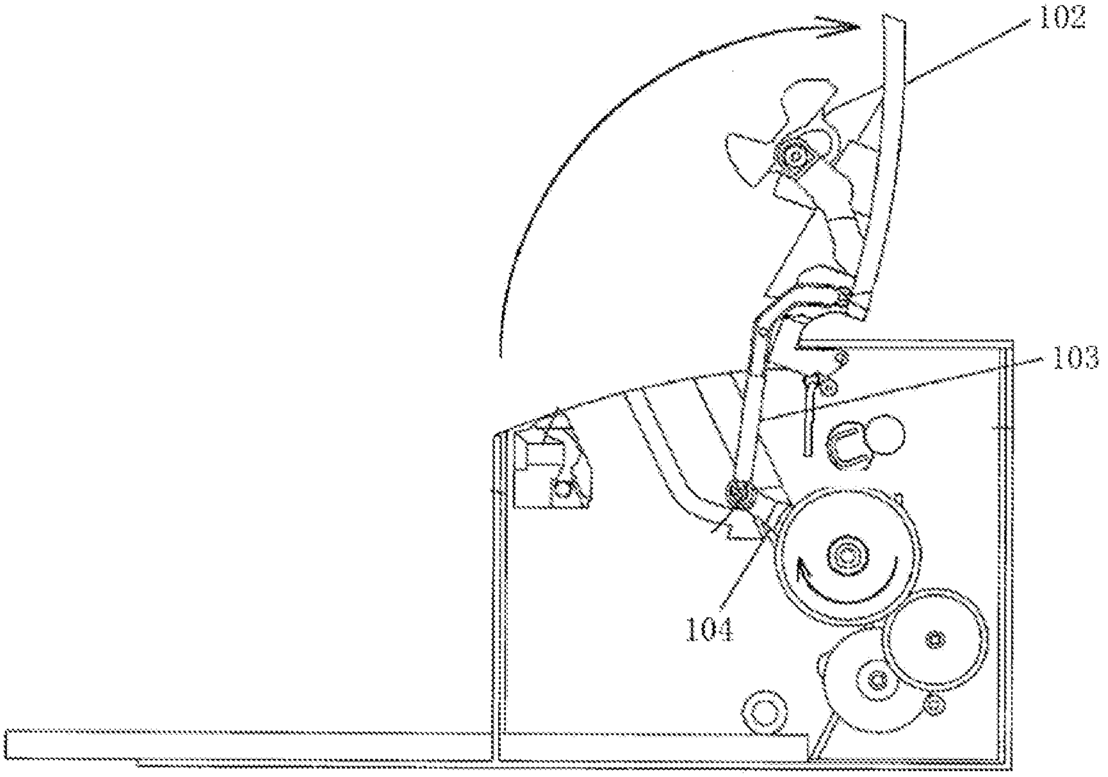
FIG. 68 illustrates a cooperation relationship schematic between a door cover, a connecting rod part, a cam and a driving unit in an electronic image-forming apparatus according to embodiment fourteen of the present disclosure.
Figure 69:
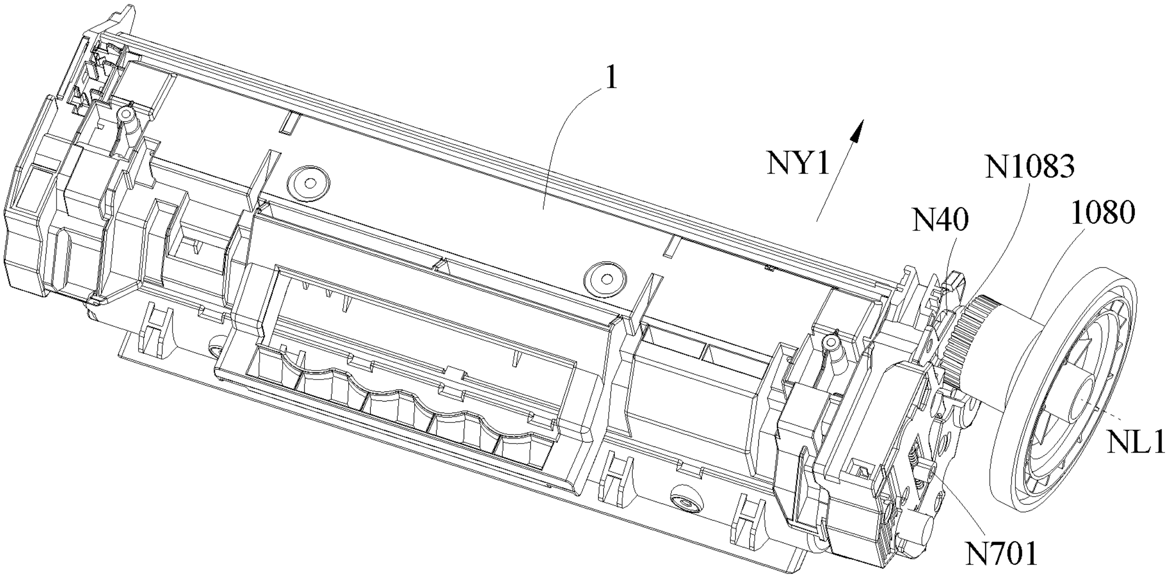
FIG. 69 illustrates a cooperation relationship schematic between a process cartridge and a driving unit when the process cartridge is installed in an electronic image-forming apparatus and a door cover is not closed according to embodiment fourteen of the present disclosure.

As shown in FIGS. 67-69, an electronic image-forming apparatus 100 is provided, where the process cartridge 1 may be detachably accommodated in the electronic image-forming apparatus 100. The electronic image-forming apparatus 100 may include a main assembly N101 capable of accommodating the process cartridge 1, a driving unit 1080, an openable and closable door cover 102, a connecting rod part 103 cooperated with the door cover 102, and a cylindrical cam N104 connected to the connecting rod part 103.

The main assembly N101 may be configured with an accommodation portion N105 for accommodating the process cartridge 1; the accommodation portion N105 may be configured with the first side wall N106 and the second side wall N107 along the length direction of the process cartridge 1; and the first side wall N106 and the second side wall N107 may be respectively configured with guide rails N108 for guiding the installation or removal of the process cartridge 1. The driving unit 1080 may be disposed at the second side wall N107 of the accommodation portion N105 for transferring the driving force to the process cartridge 1.

In one embodiment, the driving unit 1080 may include three cylindrical bodies with different diameters and sizes. The drive transfer portion N1082 of the driving unit 1080 may be disposed on the small-diameter cylindrical body N1083 closest to the accommodation part N105, and the drive transfer portion N1082 may protrude out of the second side wall N107 or retract relative to the second side wall N107 of the accommodation portion N105. The door cover 102 may be rotatably disposed on the main assembly N101 to open or close the accommodation portion N105.

The connecting rod part 103, the cam N104 and the driving unit 1080 may be located on the same side of the accommodation portion N105; and the connecting rod part 103, the cam N104 and the door cover 102 may form a linkage relationship, thereby locking or unlocking the driving unit 1080 when the door cover 102 is closed or opened. When the driving unit 1080 is at the locked state, the driving unit 1080 may not move and may be at an inclined state, and the drive transfer portion N1082 may be in a retracted position relative to the second side wall N107 of the accommodation portion N105. Such position may prevent the drive transfer portion N1082 from interfering with the force receiving portion N211 of the process cartridge 1. When the driving unit 1080 is in the unlocked state, the driving unit 1080 may move under the action of external force. That is, the driving unit 1080 may change from the inclined position to the aligned position (that is, a non-inclined state) under the action of an external force and may protrude from the second side wall N107 to transfer the driving force to the process cartridge 1 stably.

Figure 70:
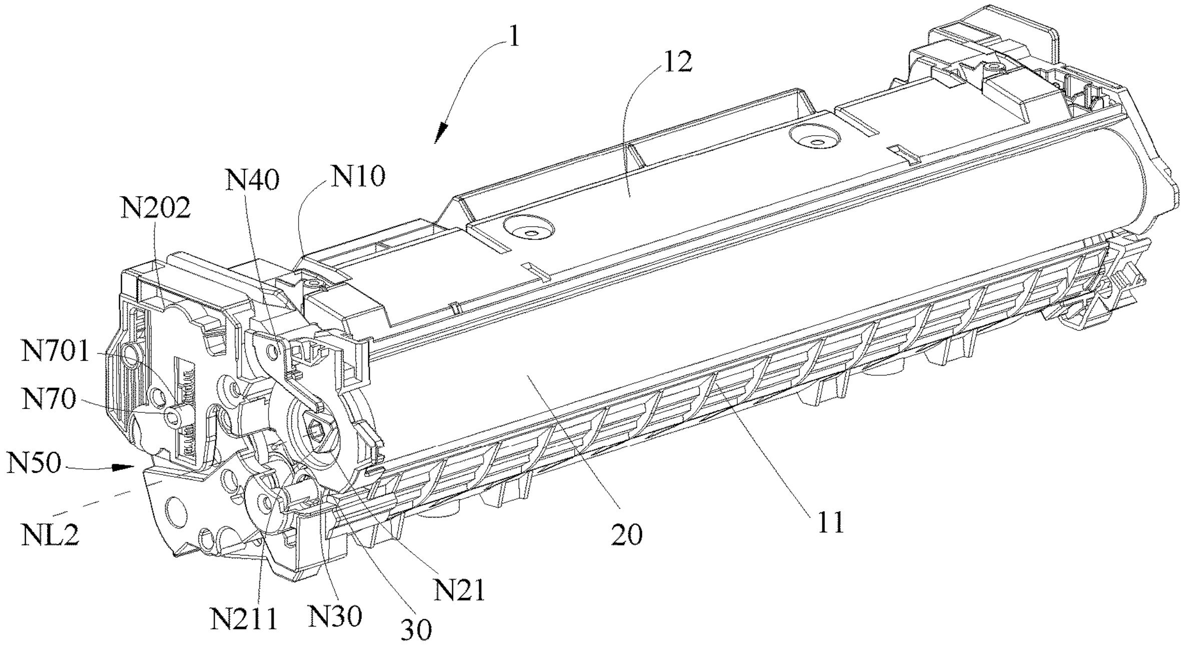
FIG. 70 illustrates a structural schematic of a process cartridge according to embodiment fourteen of the present disclosure.
Figure 71:
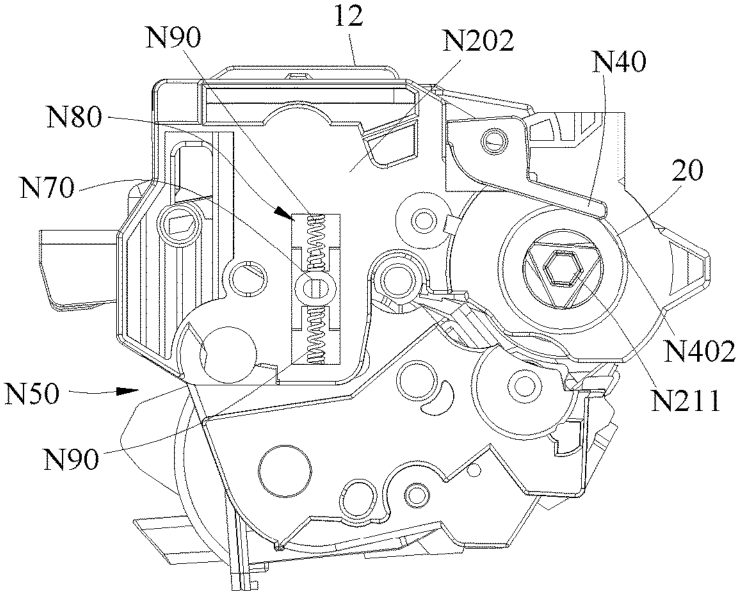
FIG. 71 illustrates a structural schematic of a process cartridge viewed from a first end according to embodiment fourteen of the present disclosure.
Figure 72:
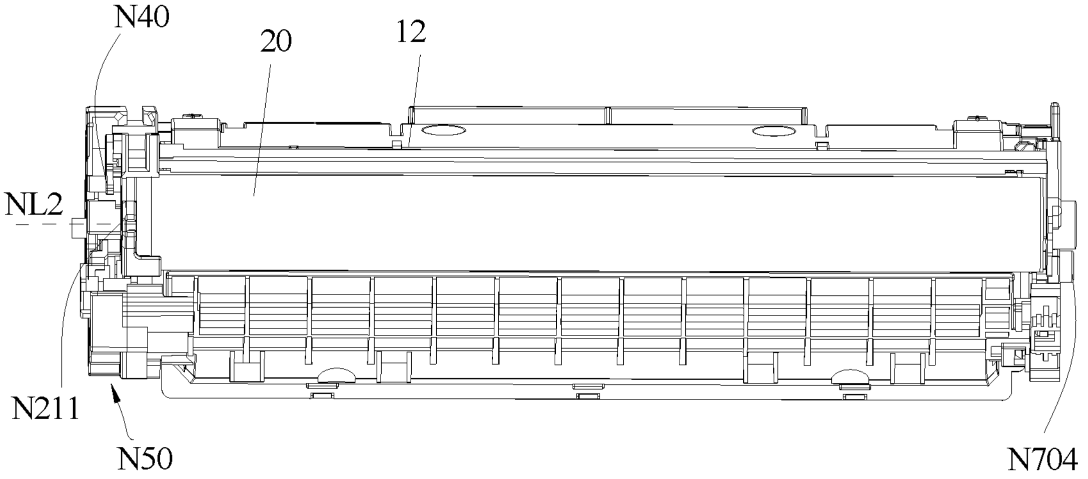
FIG. 72 illustrates a structural schematic of a process cartridge viewed from another angle according to embodiment fourteen of the present disclosure.

As shown in FIGS. 70-72, the process cartridge 1 may include a cartridge body N10, the photosensitive drum 20, the developing roller 30, and a force receiving unit N21. In one embodiment, the cartridge N10 may include a drum frame 12 for support the photosensitive drum 20 and a developing frame 11 for support the developing roller 30. The drum frame 12 and the developing frame 11 may be relatively rotatably connected during the working process and may move synchronously during the installation process of the process cartridge 1. The photosensitive drum 20 may be installed on the drum frame 12; the developing roller 30 may be installed on the developing frame 11; and the photosensitive drum 20 and the developing roller 30 may be located at the front side of the process cartridge 1 along the installation direction, and both may face each other to perform actions such as developing. In one embodiment, the cartridge body N10 may further include an end cover N202 which may be located at one end of the drum frame 12. The force receiving unit N21 may be disposed at the first end N50 of the cartridge body N10, and the force receiving unit N21 may include a force receiving portion N211. The force receiving portion N211 may be engaged with the drive transfer portion N1082 of the driving unit 1080 to receive the driving force, such that the developing roller 30 and the photosensitive drum 20 may be driven to rotate.

Furthermore, in order to change the driving unit 1080 from the inclined state of the initial position (the state that the rotation axis NL1 of the driving unit 1080 is inclined relative to the rotation axis NL2 of the photosensitive drum 20) into the coaxially-aligned state capable of being engaged with the force receiving unit 21 (the state that the axis of rotation of the driving unit 1080 is coincident with the axis of rotation of the photosensitive drum 20), as shown in FIGS. 70-73, the process cartridge 1 may further include a pressing part N40. The pressing part N40 may be disposed at the first end N50 and configured to apply the force to the driving unit 1080, such that the driving unit 1080 may be at the coaxially-aligned position. In addition, during the installation process of the process cartridge 1 to the electronic image-forming apparatus, the distance between the pressing part N40 and the axis of the photosensitive drum may not change in displacement. For example, the pressing part N40 may be fixedly installed on the end cover N202 to form the fixed connection with the drum frame 12.

As shown in FIGS. 70-74, the pressing part N40 may include an installation protrusion N401. In one embodiment, two installation protrusions N401 may be disposed, and one installation protrusion N401 may be located on the upper side of the other installation protrusion N401. An installation hole may be formed on the end cover N202; and the installation hole and the installation protrusion N401 may be configured correspondingly. During installation, the installation protrusion N401 may be locked into the installation hole, such that the pressing part N40 may be fixed to the end cover N202 or the drum frame 12, and furthermore, the pressing part N40 may move with the movement of the drum frame 12.

The pressing part N40 may be located at the outer side of the end of the force receiving portion N211 along the rotation axial direction NL2 of the photosensitive drum 20, thereby being cooperated with the driving unit 1080 when the process cartridge is installed. Furthermore, the pressing part N40 may include a cantilever N402 for pressing the driving unit 1080. The cantilever N402 may be located on the front side of the pressing part N40, and on the plane perpendicular to the rotation axis of the photosensitive drum 20, the projection of the cantilever N402 may be at least partially coincident with the projection of the photosensitive drum 20. That is, at least a part of the pressing part N40 may be located within the range of the projected section of the photosensitive drum 20. Optionally, in other embodiments, the end cover may also be canceled, and the pressing part N40 may be directly disposed at the drum frame 12 as long as the distance between the pressing part N40 and the rotation axis of the photosensitive drum 20 is constant along the radial direction of the photosensitive drum 20. Optionally, along the radial direction of the photosensitive drum 20, the position of the pressing part N40 may be configured at the outer side of the outer surface of the photosensitive drum 20 or the inner side of the photosensitive drum 20, as long as the pressing part N40 may be cooperated with the driving unit 1080.

Furthermore, the process cartridge 1 may further include a guide protrusion N704 and a guided portion N70 which may move relative to the drum frame 12, the guided portion N70 may be disposed at the end cover N202 of the first end N50, and the guided portion N70 may be cooperated with the guide rail N108 located on the second side wall N107. In one embodiment, the guided portion N70 may include a first protrusion N701 protruding from the end surface of the end cover N202; and the first protrusion N701 may be inserted into the guide rail N108 on the second side wall N107 of the accommodation portion N105 when the process cartridge 1 is installed to the accommodation portion N105, thereby guiding the installation of the process cartridge 1. The guide protrusion N704 may be disposed at the end of the cartridge body N10 away from the guided portion N70, and the guide protrusion N704 may be cooperated with the guide rail N108 of the first side wall N106 to guide the installation of the process cartridge 1. In one embodiment, the guide protrusion N704 may be fixedly connected to the drum frame 12 and may move synchronously with the drum frame 12.

Figure 73:
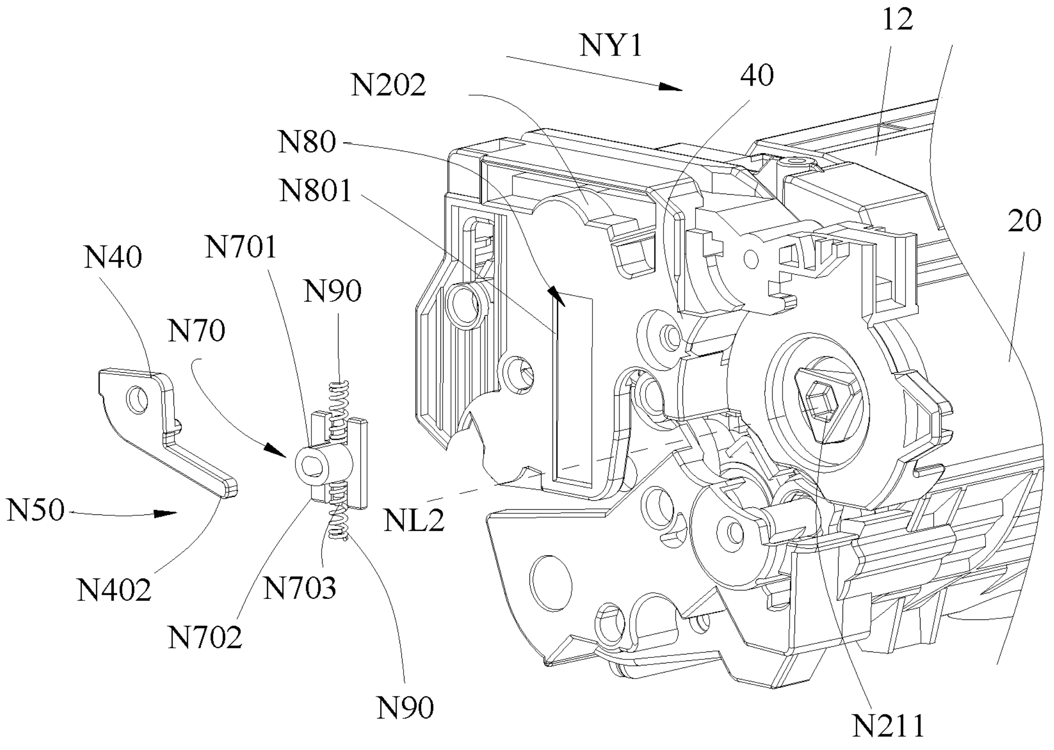
FIG. 73 illustrates an exploded local structural schematic of a first end of a process cartridge according to embodiment fourteen of the present disclosure.
Figure 74:
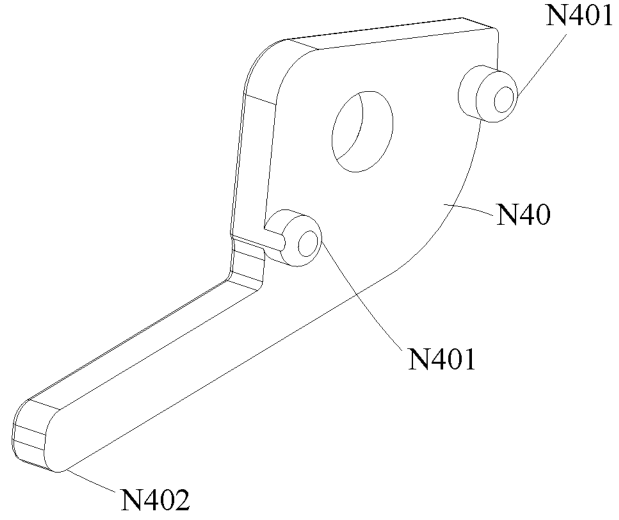
FIG. 74 illustrates a structural schematic of a pressing part according to embodiment fourteen of the present disclosure.

As shown in FIG. 73, a groove N80 may be formed on the end surface of the end cover N202, the groove N80 may be respectively disposed with guide grooves N801 on the front side wall and the rear side wall oppositely disposed along the installation direction NY1 of the process cartridge 1, and the guide grooves N801 may extend along the first direction. Correspondingly, the guided portion N70 may include a second protrusion N702 cooperated with the guide groove N801. The second protrusion N702 may be inserted into the guide groove N801, such that the guided portion N70 may move along the first direction relative to the drum frame 12. That is, the drum frame 12 of the process cartridge 1 or entire cartridge body N10 may move along the first direction relative to the guided portion N70. In other embodiments, the guide groove N801 may also be disposed on the guided portion N70, and the second protrusion N702 cooperated with the guide groove N801 may be disposed on the drum frame 12. Optionally, the guided portion N70 may also be configured to be fixedly connected to the developing frame 11. The first direction may be a direction which intersects the rotation axis NL2 of the photosensitive drum 20 and the installation direction NY1 of the process cartridge 1.

In order to facilitate the cooperative action between the guided portion N70 and the guide rail N108 or to facilitate the installation of the process cartridge 1, the guided portion N70 may further include an elastic part. In one embodiment, the elastic part may be a compression spring N90, and the number of compression springs N90 may be two. The first protrusion N701 may be respectively disposed with spring installation portions N703 on two sides of the direction that the first protrusion moves relative to the drum frame 12. Two compression springs N90 may be respectively disposed at the upper and lower sides of the first protrusion N701. One end of the compression spring N90 may be installed on the spring installation portion N703 of the guided portion N70, and the other end may be abutted against the upper and lower side walls of the groove N80, such that the first protrusion N701 may be supported by the compression spring N90 and maintained at a preset position. In such state, the first protrusion N701 may have a preset distance from the upper and lower side walls of the groove N80 along the movement direction relative to the drum frame 12 or the developing frame 11. In such way, when the process cartridge 1 is installed in the accommodation portion N105, the first protrusion N701 may be located on the guide rail N108 of the second side wall 107, and the drum frame 12 or the developing frame 11 may have sufficient movement space relative to the first protrusion N701. Optionally, the elastic part may also be omitted, or only one elastic part may be used, which also make the first protrusion N701 move relative to the drum frame 12 or the developing frame 11 or move relative to entire process cartridge 1. Optionally, multiple guided portions N70 may be disposed, and same number of the guided portion N70 may be disposed at the other end of the process cartridge 1, such that two ends of the process cartridge may move relative to the guide rail N108.

The installation process of the process cartridge 1 is described with reference to FIGS. 67-69 and 75-76 hereinafter.

Figure 75:
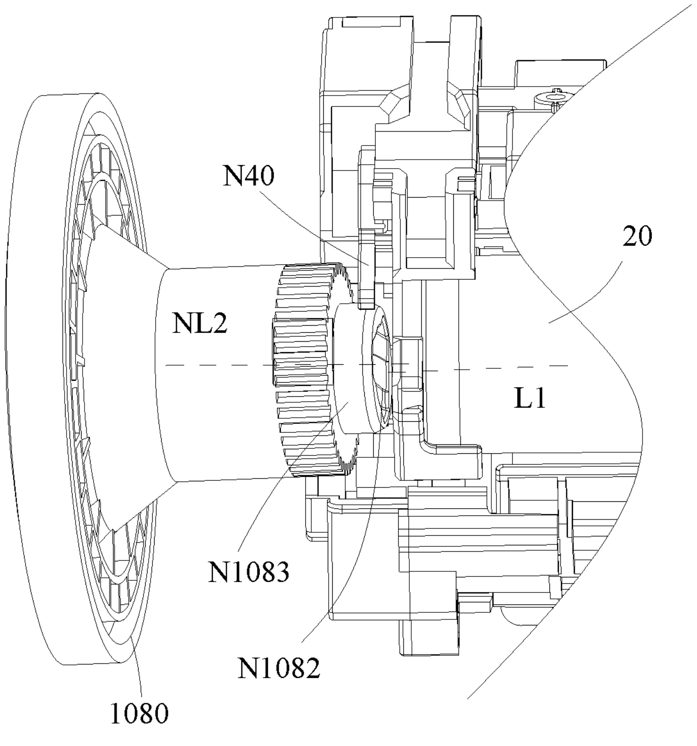
FIG. 75 illustrates a cooperation relationship schematic between a pressing part, a driving unit and a photosensitive drum when a process cartridge is installed in an electronic image-forming apparatus and a door cover is not closed according to embodiment fourteen of the present disclosure.
Figure 76:
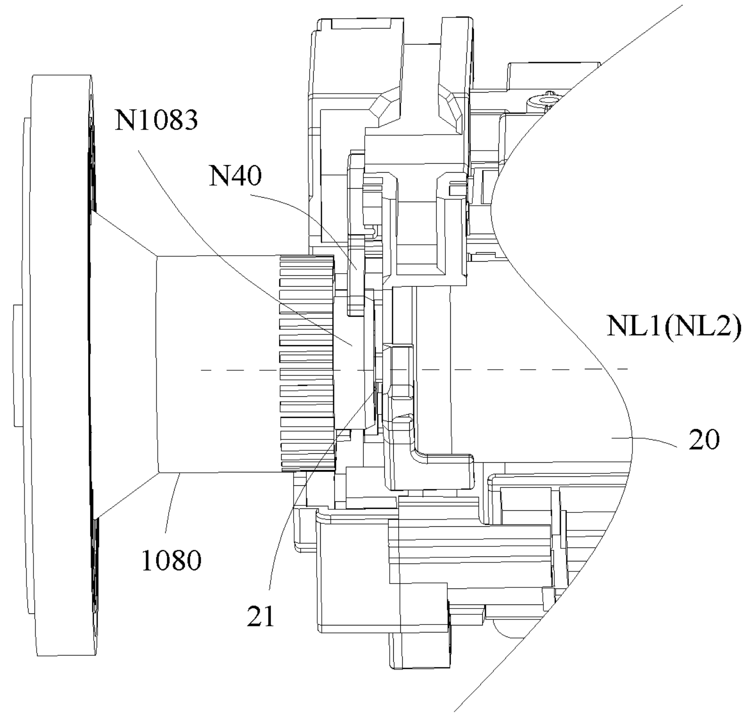
FIG. 76 illustrates cooperation relationship schematic between a pressing part, a driving unit and a photosensitive drum when a process cartridge is installed in an electronic image-forming apparatus and a door cover is closed according to embodiment fourteen of the present disclosure.

When the process cartridge 1 is installed in the electronic image-forming apparatus 100 along the direction NY1, the first protrusion N701 may be inserted in the guide rail N108 of the second side wall N107 of the accommodation portion N105, and the guide protrusion N704 on the other side of the process cartridge 1 may be inserted into the guide rail N108 of the first side wall 106, such that the process cartridge 1 may be guided and installed along the NY1 direction. In such state, the first end N50 of the process cartridge 1 may move relative to the guided portion N70 along the direction intersecting the installation direction NY1 and the photosensitive drum axis NL2. Along with the movement of process cartridge 1, the pressing part N40 that is fixed on the drum frame 12 may approach the driving unit 1080 gradually along with the movement of process cartridge 1. When the pressing part N40 contacts the peripheral outer surface of the small-diameter cylindrical body N1083 of the driving unit 1080, since the door cover 102 is not closed, the driving unit 1080 may be at the locked state. The pressing part N40 may press against the outer peripheral surface of the small-diameter cylinder N1083, the first end N50 of the developing cartridge 1 may be lifted by a preset distance, and the cartridge body N10 (including the drum frame 12 and the developing frame 11) may move relative to the first protrusion N701. In such way, the process cartridge may be installed smoothly, and the installation failure caused by the interference between the pressing part N40 and the driving unit 1080 or the interference of other parts may be avoided. As shown in FIG. 75, the pressing part N40 may finally press on the outer circumferential surface of the small-diameter cylindrical body N1083 of the driving unit 1080. At this point, the driving unit 1080 may be at the inclined state, and the drive transfer portion N1082 may be at the retracted state relative to the second side wall N107 of the accommodation portion N105; and the rotation axis NL1 of the driving unit 1080 may cross the rotation axis NL2 of the photosensitive drum 20.

When the door cover 102 is closed, the cam N104 may unlock the driving unit 1080. Since the cantilever N402 of the pressing part N40 presses on the driving unit 1080, the pressing part N40 may apply a pressing force on the driving unit 1080, and the driving unit 1080 may receive the pressing force and move along the direction close to the force receiving unit 21 until the rotation axis NL1 of the driving unit 1080 is coincident with the rotation axis NL2 of the photosensitive drum 20. In such state, when the electronic image-forming apparatus 100 is turned on, the force receiving unit 21 of the process cartridge 1 and the driving unit 1080 may be engaged with each other to stably receive the driving force to rotate.

In one embodiment, since the pressing part N40 is fixedly disposed at the drum frame 12, its position relative to the axis NL2 of the photosensitive drum 20 may always remain unchanged, that is, the distance between the pressing part N40 and the axis NL2 of the photosensitive drum 20 may not change in displacement. The force applied by the pressing part N40 on the driving unit 1080, which makes the driving unit 1080 to be coaxially-aligned, may be the gravity of the process cartridge 1 itself, or the force applied on the process cartridge 1 by the door 102 when the door 102 is closed. Optionally, the pressing part N40 may also be other parts for pressing the driving unit 1080, as long as the driving unit may be forced to be coaxially-aligned. Optionally, the guided portion N70 may also be disposed at other positions on the cartridge body N10, as long as the guided portion N70 may move relative to the cartridge body N10 and may prevent the process cartridge 1 from interfering with the electronic image-forming apparatus when the process cartridge is installed. Optionally, for the electronic image-forming apparatus in which the driving unit 1080 is not locked, since the process cartridge may not be lifted when the pressing part N40 is contacted with the driving unit 1080, the guided portion N70 may be omitted in such case. Optionally, the pressing part N40 may also press other positions of the driving unit 1080, as long as the driving unit may be coaxially-aligned.

In one embodiment, the pressing part may be disposed on the process cartridge, such that the contact and mess process of the force receiving unit and the driving unit may be smoother, which may greatly save the contact and engagement time of the force receiving portion and the driving unit and improve the working efficiency of the process cartridge.

In some embodiments, the electronic image-forming apparatus may be further disposed with an inclination imparting portion. The inclination imparting portion may be disposed at the lower side of the driving unit 1080 and press the driving unit 1080, such that the driving unit 1080 may keep the inclined state. In the developing cartridge of one embodiment, after the door cover 102 is closed, the pressing part N40 may resist the bias force of the inclination imparting portion, such that the driving unit 1080 may be coaxially-aligned. The modification of the electronic image-forming apparatus may not be limited thereto, and the inclination imparting portion may also be disposed on the upper side of the driving unit 1080. In some electronic image-forming apparatuses, the cam N104 may also be omitted. In the electronic image-forming apparatus with such structure, the driving unit 1080 may be coaxially-aligned without closing the door cover 102 when the process cartridge 1 is installed in the electronic image-forming apparatus.

Embodiment Fifteen

Figure 77:
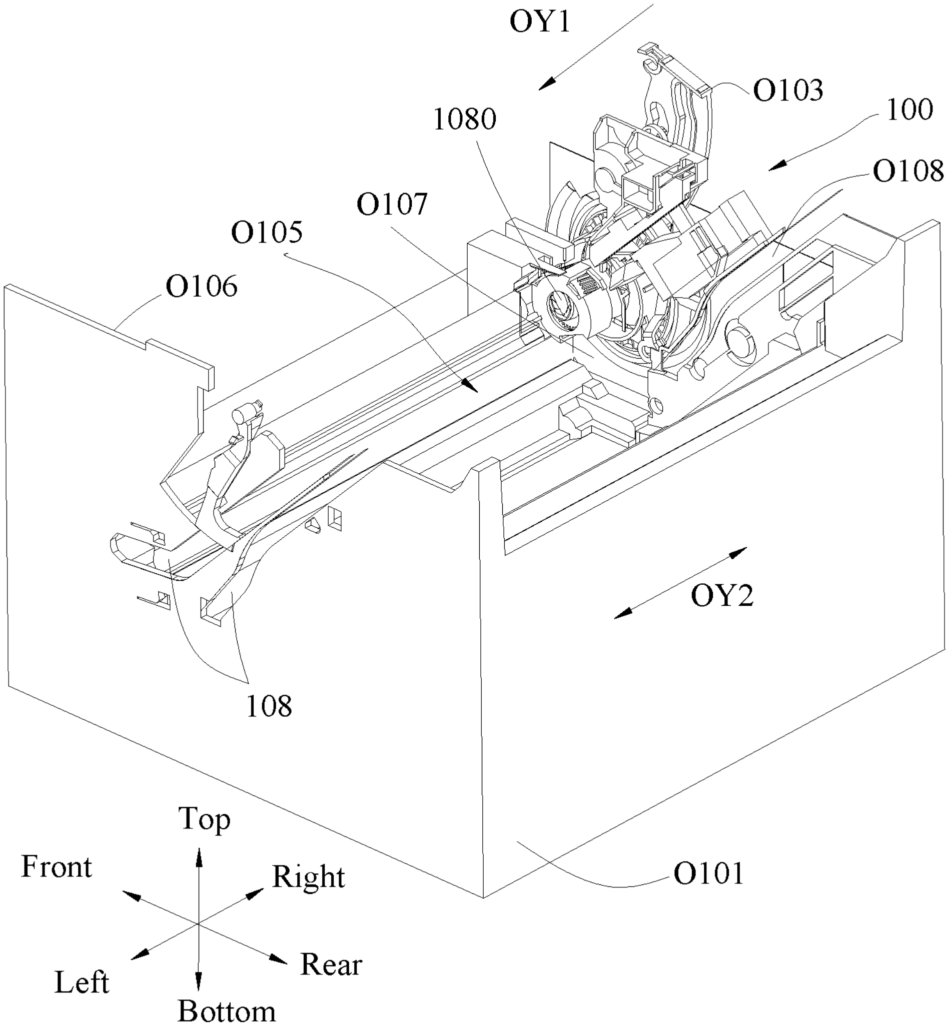
FIG. 77 illustrates a local structural schematic of an electronic image-forming apparatus according to embodiment fifteen of the present disclosure.
Figure 78:
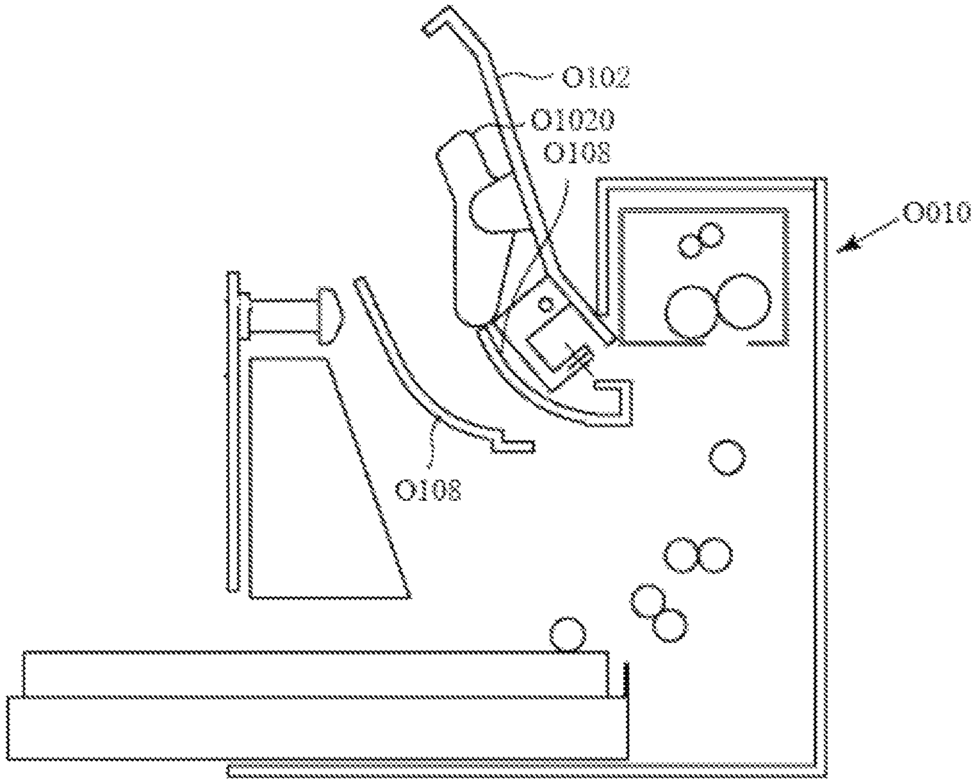
FIG. 78 illustrates another local structural schematic of an electronic image-forming apparatus according to embodiment fifteen of the present disclosure.
Figure 79:
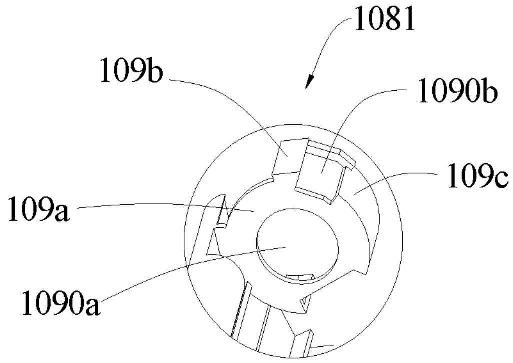
FIG. 79 illustrates a structural schematic of a cover according to embodiment fifteen of the present disclosure.

FIGS. 77-80 illustrate schematics of local structures of the electronic image-forming apparatus according to embodiment fifteen of the present disclosure. As shown in FIG. 77, the electronic image-forming apparatus 100 may be provided. The process cartridge 1 may be detachably installed in the electronic image-forming apparatus 100. The electronic image-forming apparatus 100 may include a main assembly O101 capable of accommodating the process cartridge 1, a driving unit 1080, an openable and closable door cover O102, a connecting rod part O103 that may be linked and cooperated with the door cover O102, and a cylindrical cam O104 that may form linkage and cooperation with the door cover O102 through the connecting rod part O103.

For ease of description, along the installation direction OY1 of the process cartridge, the side where the driving unit is located is the front, and the side opposite to the left side is the rear; along the length direction OY2 of the process cartridge, the side where the driving unit is located is the right side, and the side opposite to the right side is the left side.

The main assembly O101 may be configured with an accommodation portion O105 for accommodating the process cartridge 1, the accommodation portion O105 may be configured with the first side wall O106 and the second side wall O107 along the length direction of the process cartridge 1; and the first side wall O106 and the second side wall O107 may be respectively configured with guide rails O108 for guiding the installation or removal of the process cartridge 1. The driving unit 1080 may be disposed at the second side wall O107 of the accommodation portion O105 for transferring the driving force to the process cartridge 1.

Furthermore, the electronic image-forming apparatus 100 may further include a cover 1081. The cover 1081 may be disposed at the second side wall O107 and protrude from the second side wall O107 toward the first side wall O106 along the length direction of the process cartridge; and at least a part of the cover 1081 may cover the driving unit 1080. For example, the cover 1081 may include a front panel 109*a*, a first side panel 109*b* and a second side panel 109*c*; and the first side panel 109*b* and the second side panel 109*c* may be respectively connected to the front panel 109*a*. The front plate 109*a* may be configured with the first hole 1090*a* for the driving unit 1080 to protrude. The first hole 1090*a* may be a circular hole. such that one end of the driving unit 1080 may protrude from the first hole 1090*a*. The first side plate 109*b* may be located on the upper side of the front plate 109*a*, and the second side plate 109*c* may be located on the rear side of the front plate 109*a*. In addition, the second hole 1090*b* may be formed between the first side plate 109*b* and the second side plate 109*c*, such that a part of the driving unit 1080 may be exposed to the rear side of the cover 1081 through the second hole 1090*b*.

The door cover O102 may be rotatably disposed on the main assembly O101 for opening or closing the accommodation portion O105. The door cover O102 may be installed on the main assembly O101 in a manner of rotating around a rotating shaft, thereby opening or closing the accommodation portion O105 in a rotating manner. A cartridge pressing part O1020 may be respectively disposed on each of two sides of the door cover O102 along the axial direction of the rotating shaft. Two of cartridge pressing parts O1020 may each move relative to the door cover O102 within a preset range. During the closing process of the door cover O102, the cartridge pressing part O1020 may push a force receiving portion O10*a* (described in detail subsequently) disposed on the process cartridge 1, such that the process cartridge may be installed and positioned in the main assembly O101 in a stable state.

Furthermore, the connecting rod part O103, the cam O104 and the driving unit 1080 may be located on the same side of the accommodation portion O105. Moreover, the connecting rod part O103, the cam O104 and the door cover O102 may form a linkage relationship to lock or unlock the driving unit 1080 when the door cover O102 is closed and opened.

Figure 80:
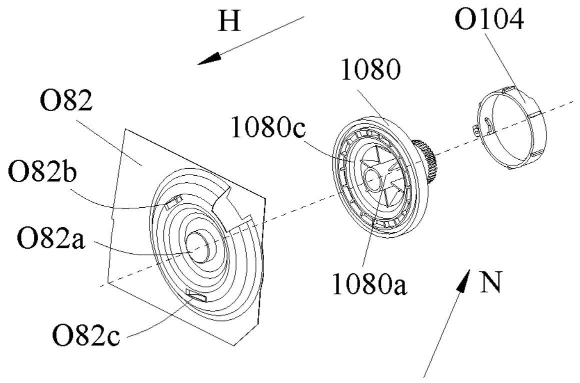
FIG. 80 illustrates a structural schematic of a support side plate, a driving unit and a cam according to embodiment fifteen of the present disclosure.
Figure 81:
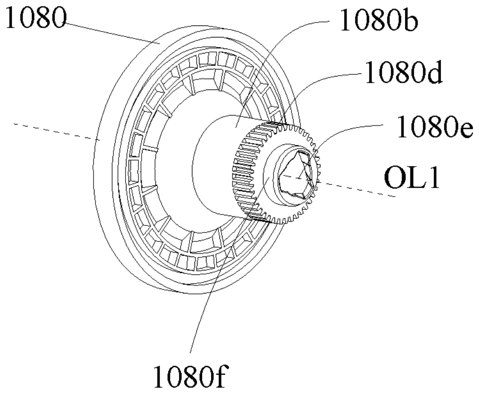
FIG. 81 illustrates a structural schematic of a driving unit according to embodiment fifteen of the present disclosure.

FIG. 80 is an exploded perspective view of the support structure of the driving unit. FIG. 81 is a structural schematic of the driving unit. As shown in FIGS. 80-81, the electronic image-forming apparatus may further include a support side plate O82. The support side plate O82 may be disposed at the main assembly O101 and include the first protrusion O82*b* and the second protrusion O82*c*. The driving unit 1080 may include a slide portion 1080*a* rotatably supported by a support hole O82*a* of the support side plate O82. Furthermore, the driving unit 1080 may include a cylindrical portion 1080*b*, a small-diameter portion 1080*f* and a drive transmission portion 1080*e*. The small-diameter portion 1080*f* may be connected to the end of the cylindrical portion 1080*b*, and the diameter of the small-diameter portion 1080*f* may be less than the diameter of the photosensitive drum. An input gear portion 1080*d* may be disposed on the outer surface of the cylindrical portion 1080*b* near the end of the small-diameter portion 1080*f*, and the drive transmission portion 1080*e* may be disposed on the small-diameter portion 1080*f* for being engaged with the force receiving unit 21 of the process cartridge 1 to transfer the driving force.

During the opening process of the door cover O102, the cylindrical cam O104 may move together with the door cover O102. As a result, the cylindrical cam O104 may be in contact with the driving unit 1080, and the driving unit 1080 may move along the direction of the arrow H together with the cylindrical cam O104. Then, the abutting surface 1080*c* of the driving unit 1080 may be in contact with at least one of the first protrusion O82*b* and the second protrusion O82*c* of the support side plate O82, such that the driving unit 1080 may be inclined along the arrow N direction. When the door cover O102 is at the open state, the driving unit 1080 may be at the inclined and locked state. In such state, the driving unit 1080 may be at the retracted position relative to the front panel 109*a*, that is, the drive transmission portion 1080*e* may be retracted into the cover 1081.

When the door cover O102 is closed, the driving unit 1080 may be at the unlocked state. The driving unit 1080 may move under the action of an external force, that is, may change from the inclined state to the coaxially-aligned state (that is, a non-inclined state) under the action of an external force, and may protrude from the cover 1081 to stably transfer the driving force to the process cartridge 1.

The structure of the electronic image-forming apparatus may not be limited thereto, and some electronic image-forming apparatuses may also be configured with the inclination imparting portion. The inclination imparting portion may be located on the lower side or the lower side of the driving unit 1080 and press the upper side or the lower side of the driving unit 1080, such that the driving unit 1080 may keep the inclined state.

Figure 82A:
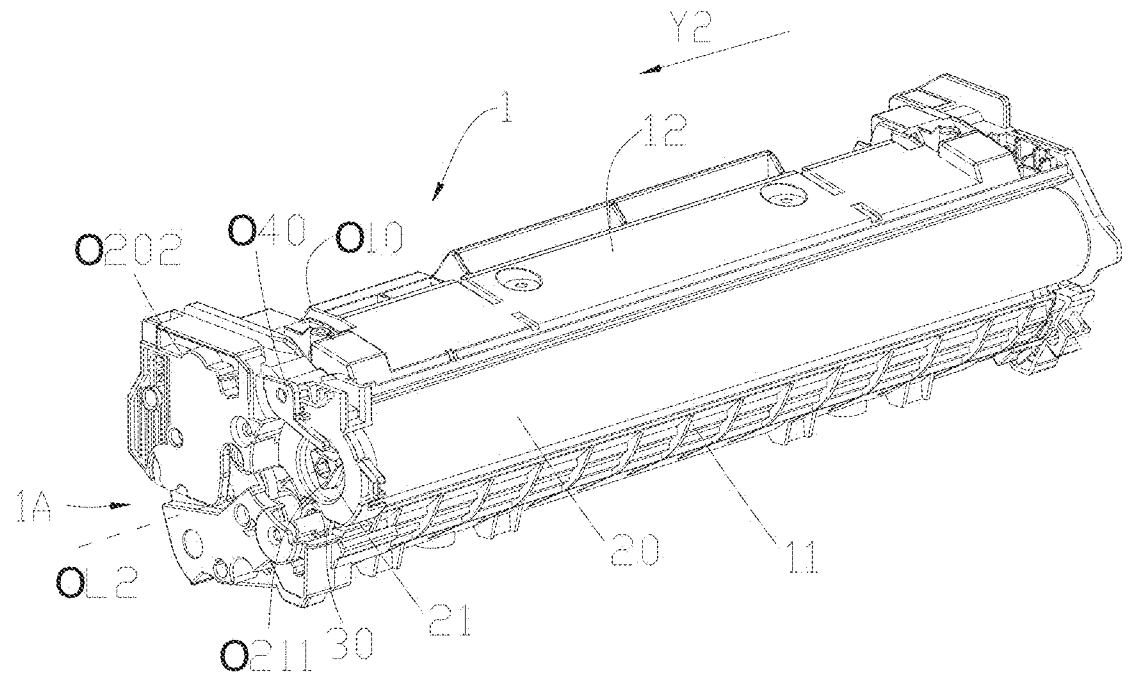
FIGS. 82A and 82B respectively illustrate a structural schematic of a process cartridge and an enlarged end portion of the process cartridge, according to embodiment fifteen of the present disclosure.
Figure 82B:
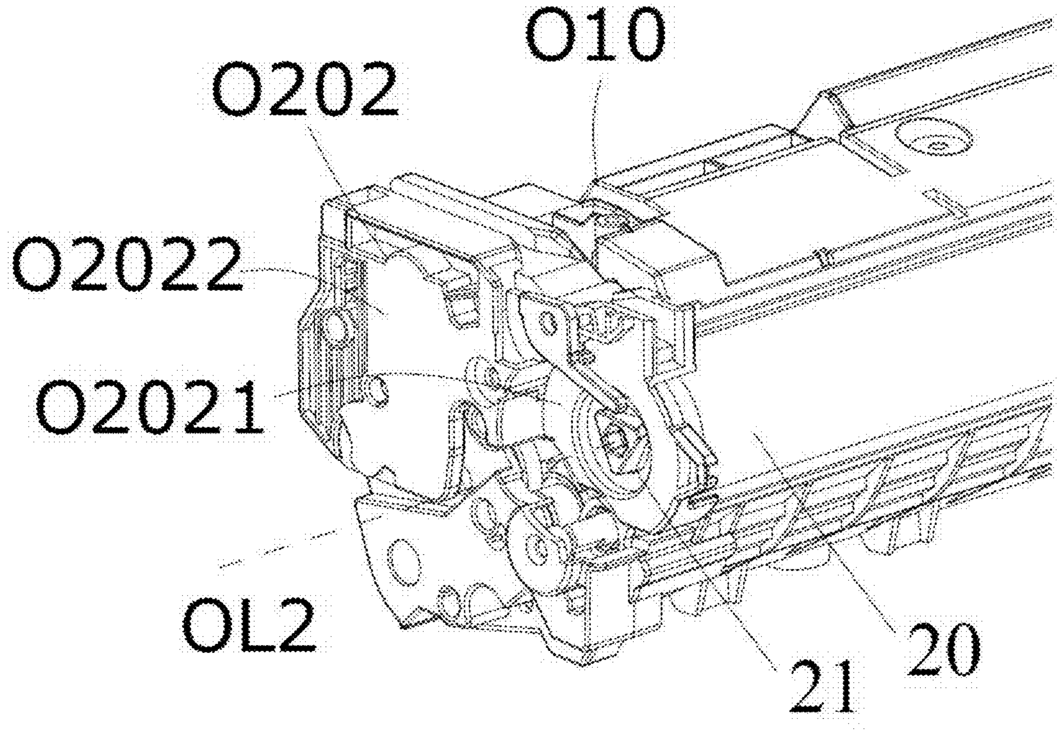

FIG. 82A is a structural schematic of the process cartridge in one embodiment. As shown in FIG. 82A, the process cartridge 1 may include a cartridge body O10, the photosensitive drum 20, the developing roller 30, and the force receiving unit 21. In one embodiment, the cartridge body O10 may include the drum frame 12 for support the photosensitive drum 20 and the developing frame 11 for support the developing roller 30. The drum frame 12 and the developing frame 11 may be relatively and rotatably connected during the working process and may move synchronously during the installation process of the process cartridge 1. The photosensitive drum 20 may be installed on the drum frame 12, and the developing roller 30 may be installed on the developing frame 11. The photosensitive drum 20 and the developing roller 30 may be located on the front side of the process cartridge 1 along the installation direction and may face each other for developing operations. In one embodiment, the cartridge body O10 may further include an end cover O202 installed on one end of the drum frame 12. As shown in FIG. 82B, the end cover O202 is disposed at one end of the cartridge body O10. The end cover O202 includes a first side wall O2021 and a second side wall O2022. The first side wall O2021 is arranged around the force receiving unit 21 and the second side wall O2022 is disposed at outermost side of one end of the cartridge body O10. The first side wall O2021 and the force receiving unit 21 are disposed away from the second side wall O2022 in the axial direction of the photosensitive drum 20. The force receiving unit 21 may be disposed at the first end 1A of the cartridge body O10, and the force receiving unit 21 may include a force receiving portion O211. The force receiving portion O211 may be engaged with the drive transmission portion 1080*e* to receive the driving force, such that the developing roller 30 and the photosensitive drum 20 may be driven to rotate.

Furthermore, in order to change the driving unit 1080 from the inclined state of the initial position (in such state, the rotation axis OL1 of the driving unit 1080 is inclined relative to the rotation axis OL2 of the photosensitive drum 20) into the coaxially-aligned state capable of being engaged with the force receiving unit 21 (in such state, the axis of rotation of the driving unit 1080 is coincident with the axis of rotation of the photosensitive drum 20), as shown in FIG. 82A, the process cartridge 1 may further include a pressing part O40. The pressing part O40 may be disposed at the first end 1A for applying the force to the driving unit 1080, such that the driving unit 1080 may be at the coaxially-aligned position. For example, the pressing part O40 may be fixedly installed on the end cover O202 to form a fixed connection with the drum frame 12.

Figure 83:
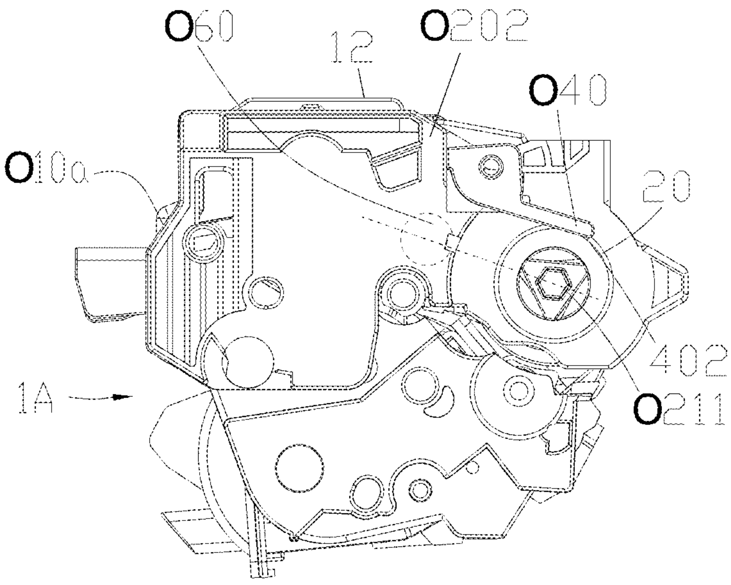
FIG. 83 illustrates a structural schematic of a process cartridge viewed from a side of the process cartridge according to embodiment fifteen of the present disclosure.

Furthermore, along the rotation axial direction OL2 of the photosensitive drum 20, the pressing part O40 may be located at the outer side of the end of the force receiving portion O211, thereby being cooperated with the driving unit 1080 during installation. As shown in FIG. 83, on the plane perpendicular to the rotation axis of the photosensitive drum 20, at least a part of the projection of the pressing portion 402 of the cantilever O42 of the pressing part O40 may be coincident with the projection of the photosensitive drum 20 or fall within the region of the photosensitive drum 20.

As shown in FIG. 83, the process cartridge 1 may further include a charging roller O60 which may be disposed on the cartridge body O10 and may rotate while being in contact with the photosensitive drum 20. In other embodiments, the charging part may not be limited to such rotatable contact roller structure. For example, a charging part fixed to the photosensitive drum with a certain interval may be used. As shown in FIG. 82A, the pressing part O40 may be partially located inside the outer peripheral surface of the photosensitive drum 20, and the pressing part O40 may be located above the line connecting the rotation center of the charging roller O60 and the rotation center of the photosensitive drum 20.

Figure 84:
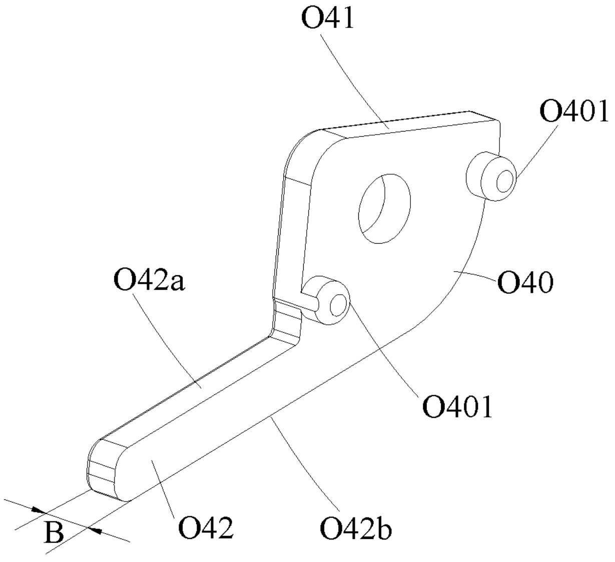
FIG. 84 illustrates a structural schematic of a pressing part according to embodiment fifteen of the present disclosure.

As shown in FIG. 84, the pressing part O40 may include a fixed part O41 and a cantilever O42. The fixed part O41 may be connected to the cartridge body O10. The cantilever O42 may be connected to the fixed part O41 and extend toward the side of the photosensitive drum. The fixing portion O41 may include an installation protrusion O401. In one embodiment, two installation protrusions O401 may be disposed; and one installation protrusion O401 may be located on the upper side of another installation protrusion O401. An installation hole may be formed on the end cover O202 and may be configured correspondingly to the installation protrusion O401. During installation, the installation protrusion O401 may be engaged with the installation hole, such that the pressing part O40 may be fixed to the end cover O202 or the drum frame 12, thereby allowing the pressing part O40 to move with the movement of the drum frame 12. In the state that the process cartridge is installed to the accommodation portion O105 of the electronic image-forming apparatus, the cantilever O42 may pass through the second hole 1090*b* on the cover 1081 to press the driving unit 1080 of the electronic image-forming apparatus. It should be noted that the shape and structure of the fixing portion may not be strictly limited, as long as the pressing part O40 may not move relative to the axis of the photosensitive drum 20.

In one embodiment, the cantilever O42 may be roughly rectangular, which may include an upper end surface O42*a* located on the upper side of the cantilever O42 and a lower end surface O42*b* located on the lower side of the cantilever in the installed state. The upper end surface O42*a* and the lower end surface O42*b* may be arranged as planes in parallel with each other. A portion of the lower end surface O42*b* of the free end of the cantilever O42 may be configured to press the driving unit 1080, such that the driving unit 1080 may be coaxially-aligned.

Furthermore, the end of the cantilever O42 away from the fixed part O41 may be also disposed with an arc-shaped guide surface. The guide surface may be connected to the upper end surface O42*a* and the lower end surface O42*b*, which may guide the cantilever O42 to move along the circumferential outer surface of the small-diameter portion 1080*f* of the driving unit 1080 during the closing process of the door cover O102 of the electronic image-forming apparatus, thereby preventing the cantilever O42 from interfering with the driving unit during the installation process of the process cartridge 1. Two opposite sides of the cantilever O42 along the axis OL2 of the photosensitive drum 20 may be configured as planes, and the maximum distance between such two sides may be less than the width of the second hole 1090*b* (that is, the width of the hole along the axis OL2 of the photosensitive drum when the process cartridge is installed in place), thereby preventing the cantilever O42 from being unable to pass through the second hole 1090*b*.

Referring to FIG. 84, due to the distance between the input gear portion 1080*d* of the driving unit 1080 and the front plate 109*a* or space limitation, optionally, the thickness B of the cantilever O42 of the pressing part O40 may be set between 0.6 mm and 3.5 mm. If the thickness of the cantilever O42 is less than 0.6 mm, the structure of the cantilever O4 may be excessively thin, and the cantilever O42 may be easily broken or fractured due to the action of the internal structure of the electronic image-forming apparatus during the installation process of the process cartridge 1. If the thickness of the cantilever O42 of the pressing part O40 is excessively large (greater than 3.5 mm), the cantilever O42 may also be easy to be limited by the distance between the input gear portion 1080*d* of the driving unit 1080 and the front plate 109*a*, thereby not realizing the center-alignment effect on the driving unit 1080.

Referring to FIG. 83, the force receiving portion O10*a* may also be disposed on the rear side of the first end 1A of the cartridge body O10. The force receiving portion O10*a* may be configured for receiving the force of the cartridge pressing part O1020 when the door cover O102 is closed, such that the process cartridge 1 may be installed in place.

The installation of the process cartridge into the printer is described in detail hereinafter.

Figure 85:
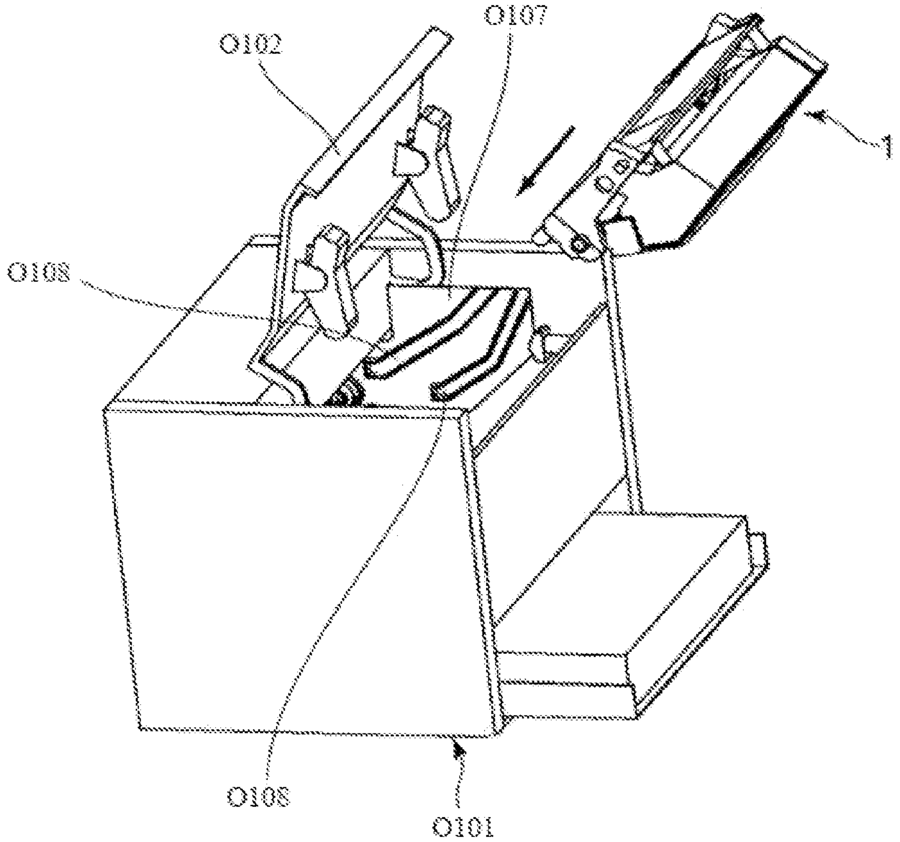
FIG. 85 illustrates an operational schematic of installation of a process cartridge to an image-forming apparatus according to embodiment fifteen of the present disclosure.

As shown in FIG. 85, firstly, the door cover O10 may be opened, the driving unit 1080 may be at the locked state because the door cover O102 is at the open state, the guide protrusions on two sides along the length direction of the process cartridge 1 may be coaxially-aligned with the guide rails O108 on the first side wall and the second side wall of the accommodation portion O105, the process cartridge 1 may be then pushed in along the OY1 direction, and the pressing part O40 fixed on the end cover O202 may also gradually approach the driving unit 1080 as the process cartridge 1 moves until the pressing part O40 is in contact with the driving unit 1080.

Figure 86:
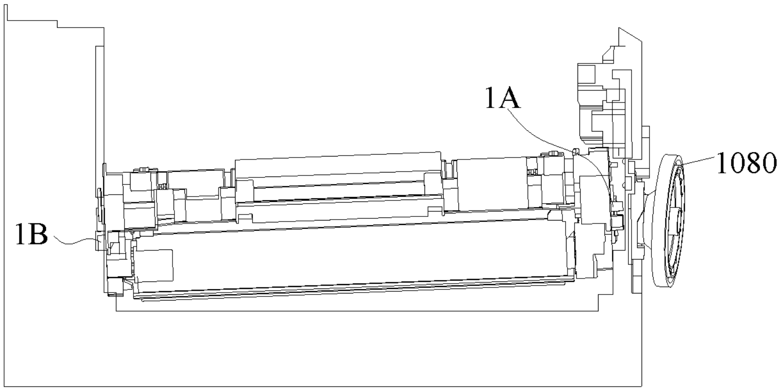
FIG. 86 illustrates a cooperation relationship schematic between a process cartridge at a first position and an image-forming apparatus according to embodiment fifteen of the present disclosure.

As shown in FIG. 86, when the process cartridge 1 is installed in the accommodation portion O105 inside the electronic image-forming apparatus and the door O10 is not closed, the cantilever O42 of the pressing part O40 may be abutted against the upper side of the small-diameter portion 1080*f* of the driving unit 1080. Viewed from the back of the process cartridge 1, the first end 1A of the process cartridge 1, that is, the end where the force receiving unit 21 is located, may be more adjacent to the upper side in the electronic image-forming apparatus relative to the other end 1B of the process cartridge 1 (a part of the process cartridge 1 may be warped). The installation position of the process cartridge at such position is referred to as the first position.

At this point, the other end 1B of the process cartridge may be in the position installed in place.

Figure 87:
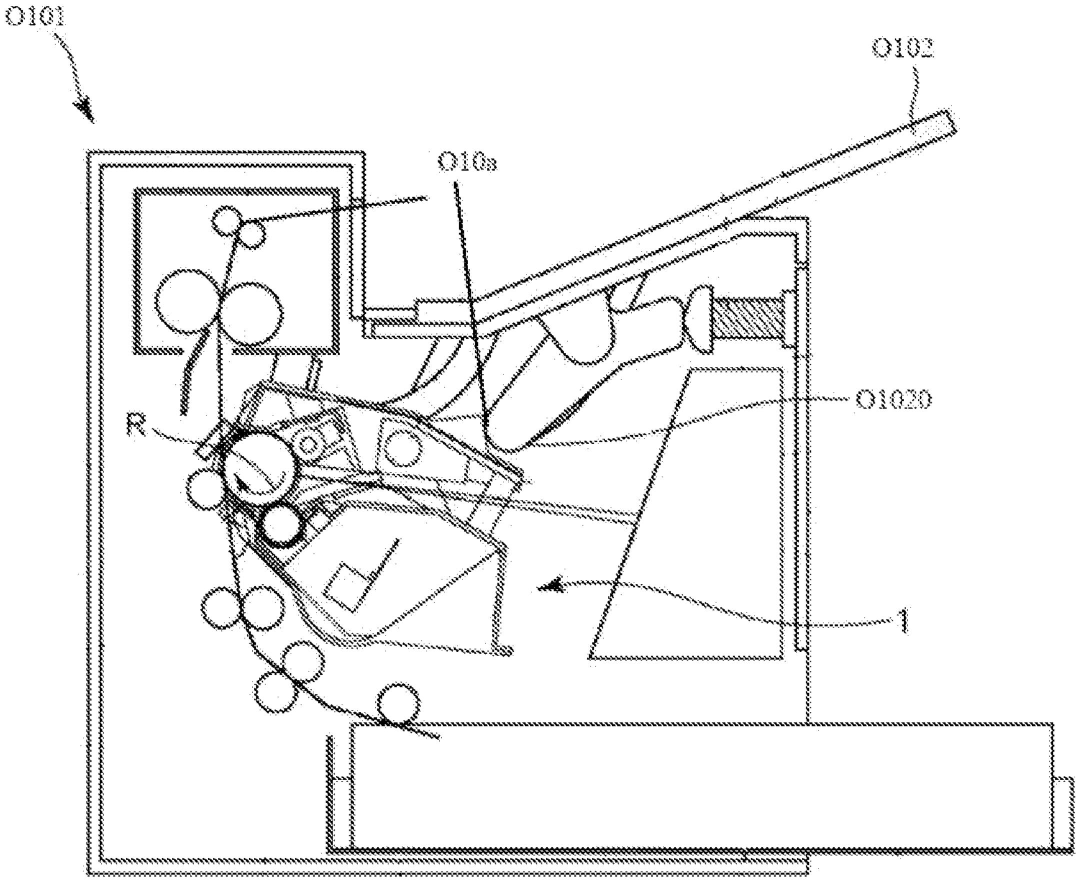
FIG. 87 illustrates a cooperation relationship schematic between a process cartridge at a second position and an image-forming apparatus according to embodiment fifteen of the present disclosure.
Figure 88:
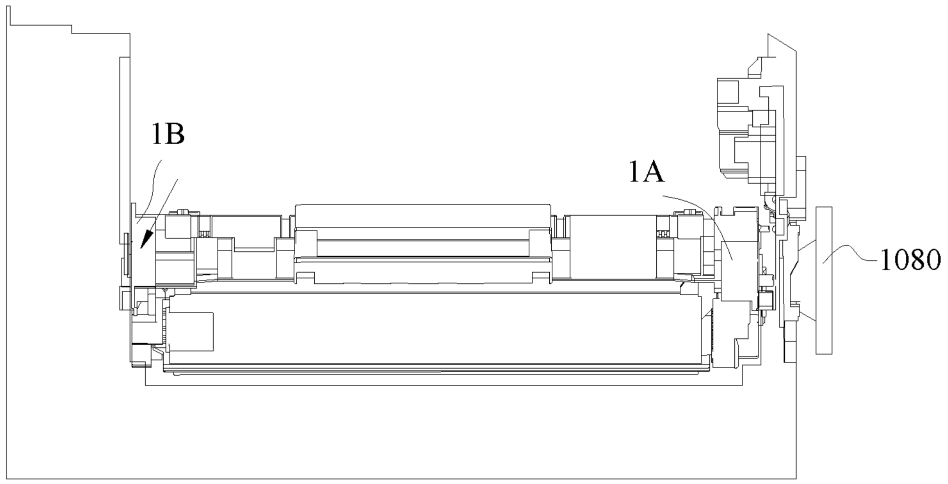
FIG. 88 illustrates another cooperation relationship schematic between a process cartridge at a second position and an image-forming apparatus according to embodiment fifteen of the present disclosure.

As shown in FIGS. 87-88, the door cover O102 of the electronic image-forming apparatus may be then closed. With the closing of the door cover O102, the cam O104 may unlock the driving unit 1080, and the pressing part O1020 inside the door cover O102 may push the force receiving portion O10*a* on the rear side of the process cartridge 1, such that the first end 1A of the process cartridge 1 may be applied to the force to move downward and drive the pressing part O40 to move downward. At this point, the front end of the pressing part O40 may press the driving unit 1080 to move downward, such that the rotation axis OL1 of the driving unit 1080 may be coincident with or substantially in parallel with the rotation axis OL2 of the force receiving unit 21, and furthermore the force receiving unit 21 may be engaged with the driving unit. At this point, the process cartridge 1 may be at the second position. That is, the driving unit 1080 may move along the direction close to the force receiving unit 21 after receiving the pressing force. Under the pressing force applied by the pressing part O1020 to the left and right sides of the process cartridge 1, two ends (1A, 1B) of the process cartridge 1 may be kept substantially horizontal.

When the process cartridge 1 is installed in place, the driving unit 1080 may move from the initial position to the position capable of being engaged with the force receiving unit 21, such that the driving unit 1080 may transfer the driving force to the force receiving unit 21 and then drive the photosensitive drum 20 to rotate. The installation position of the process cartridge at such position is the second position. It should be noted that the force which is applied by the pressing part O40 on the driving unit 1080 and used to center-align the driving unit 1080 may be the force applied on the process cartridge 1 by the pressing part O1020 of the door cover O102 when the door cover O102 is closed or may be the gravity of the process cartridge 1 itself.

Specific cooperating actions of the pressing part O40 and the driving unit 1080 during the installation process are introduced hereinafter.

Figure 89:
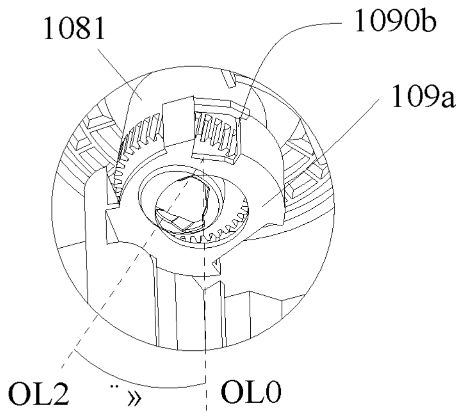
FIG. 89 illustrates a cooperation relationship schematic between a cover and a driving unit according to embodiment fifteen of the present disclosure.

As shown in FIG. 89, during the process of installing the process cartridge 1 to the main assembly O101, the pressing part O40 may center-align the driving unit 1080 through the second hole 1090*b*. When the process cartridge is not installed, the driving unit 1080 may be at the inclined state, and the rotation axis OL1 of the driving unit 1080 may form an angle α with the central axis OL2 of the first hole. When the driving unit 1080 is coaxially-aligned, the rotation axis OL1 of the driving unit 1080 may be substantially coincident with the central axis OL0 of the cover 1081.

When the process cartridge 1 is installed in the electronic image-forming apparatus along the direction OY1, the lower end surface O42*b* of the cantilever O42 of the pressing part O40 may press the small-diameter portion 1080*f* of the driving unit 1080. Since the abutting surface 1080*c* of the driving unit 1080 is in contact with at least one of the first protrusion O82*b* and the second protrusion O82*c* of the support side plate O82, the driving unit 1080 may be inclined along the direction of the arrow N, that is, the driving unit 1080 may be still locked. When the door cover O102 is closed, the cylindrical cam O104 may unlock the driving unit 1080, and the cartridge pressing part O1020 inside the door cover O102 may press the force receiving portion O10*a* of the process cartridge 1 to apply the force on the first end 1A of the process cartridge 1. Optionally, two sides of the cartridge body O10 may also receive the driving force of the cartridge pressing part O1020 simultaneously. The first end 1A of the process cartridge 1 may move downward accordingly and drive the pressing part O40 to move downward. At this point, the lower end surface O42*b* of the cantilever O42 of the pressing part O40 may press the small-diameter portion 1080*f* of the driving unit 1080. Similarly, the driving unit 1080 may be under the action of the first protrusion O82*b* or the second protrusion O82*c* of the support side plate O82, and the driving unit 1080 may move along the opposite direction of the arrow N to be coaxially-aligned.

Figure 90:
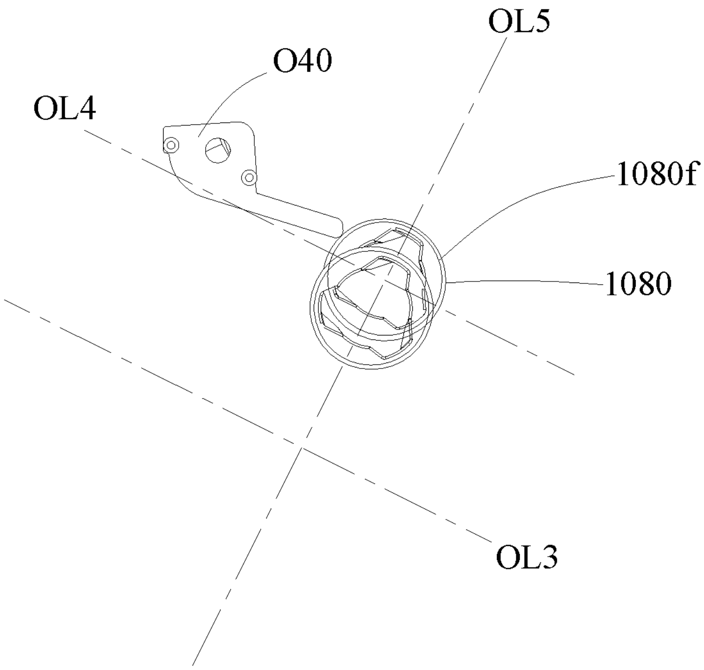
FIG. 90 illustrates a cooperation relationship schematic between a pressing part and a driving unit during an installation process of a process cartridge according to embodiment fifteen of the present disclosure.
Figure 91:
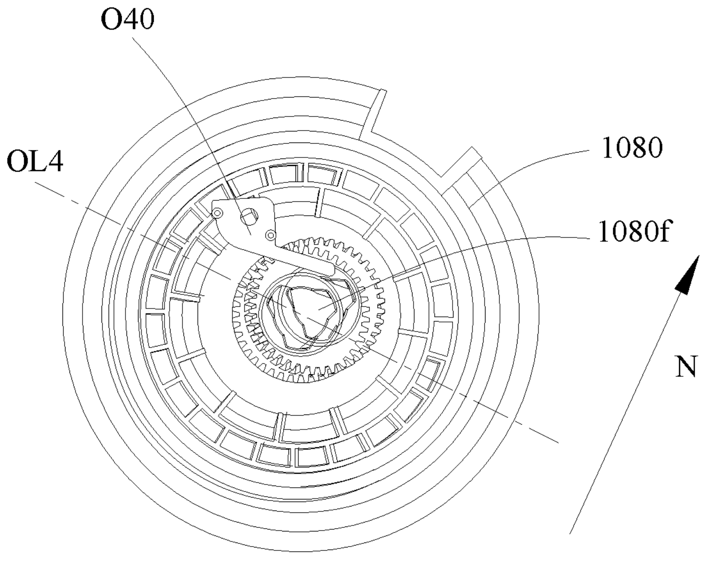
FIG. 91 illustrates another cooperation relationship schematic between a pressing part and a driving unit during an installation process of a process cartridge according to embodiment fifteen of the present disclosure.

As shown in FIGS. 90-91, the connecting line connecting the support point of the first protrusion O82*b* and the second protrusion O82*c* supporting the driving unit 1080 is defined as OL3, the axis which is in parallel with OL3 and passes through the center of the rotation axis of the driving unit 1080 is defined as the axis OL4, and the axis which is perpendicular to an axis OL4 and passes through the center of the rotation axis of the driving unit 1080 is defined as an axis OL5. When the process cartridge 1 is at the first position and the second position, and in the process of moving from the first position to the second position, the contacting/force receiving point of the pressing part O40 and the driving unit 1080 may be always located in the upper half of the axis OL4 when the pressing part O40 applies the pressing force F on the driving unit 1080.

Figure 92:
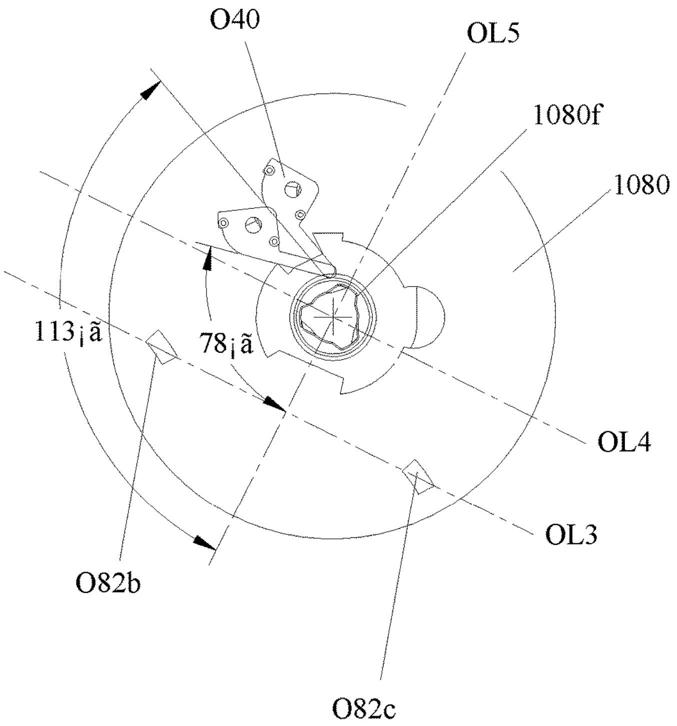
FIG. 92 illustrates a position distribution schematic of a pressing part relative to a driving unit on a process cartridge when the process cartridge is at a first position according to embodiment fifteen of the present disclosure.

The configuration positions of the pressing part O40 may be different. As shown in FIG. 92, viewed along the left-right direction of the installation portion, at the first position, the angle between the lower end surface O42*b* of the cantilever O42 of the pressing part O40 and the axis OL5 is β. Optionally, $78° \leq \beta \leq 113°$. The position of the pressing part O40 on the process cartridge may satisfy such condition, which may realize installation with the electronic image-forming apparatus. If the angle β is less than 78° or greater than 113°, when the process cartridge 1 is installed in the electronic image-forming apparatus 100, interference may occur, such that the process cartridge may not be installed or the driving unit 1080 may not be coaxially-aligned.

The process cartridge with above structure may make the contact and engagement process between the force receiving unit and the driving unit smoother, which may greatly save the contact and engagement time of the force receiving unit and the driving unit, make the transfer of the driving force more stable, and improve the working efficiency of the process cartridge.

The process cartridge in one embodiment may also be applied to the electronic image-forming apparatus of above-mentioned embodiments.

In one embodiment, the projection of the cantilever O42 may be at least partially coincident with the projection of the photosensitive drum 20. When the process cartridge is installed in the electronic image-forming apparatus, the cantilever O42 may be abutted against the small-diameter portion 1080*f* of the driving unit 1080, such that the driving unit 1080 may be coaxially-aligned. That is, the cantilever O42 may be relatively close to the rotational axis of the photosensitive drum, such that the driving unit 1080 may be desirably aligned with the force receiving unit. Meanwhile, the cantilever part of the pressing part may apply the force on the small-diameter portion of the driving unit, and the applied force may be smaller and more precise, such that the driving unit may be adjusted from the inclined position to the position having approximately same axis as the photosensitive drum. Therefore, the contact and engagement process between the photosensitive drum or developing roller of the process cartridge and the driving unit of the electronic image-forming apparatus may be smoother, which may greatly save the contact and engagement time between the photosensitive drum or developing roller and the driving unit and improve the working efficiency of the process cartridge.

Embodiment Sixteen

Unless otherwise specified, the structure of the process cartridge in one embodiment may be substantially same as the process cartridge in embodiment fifteen in terms of shape, structure, installation and removal manners, and the similarities may not be described in detail herein.

Figure 93:
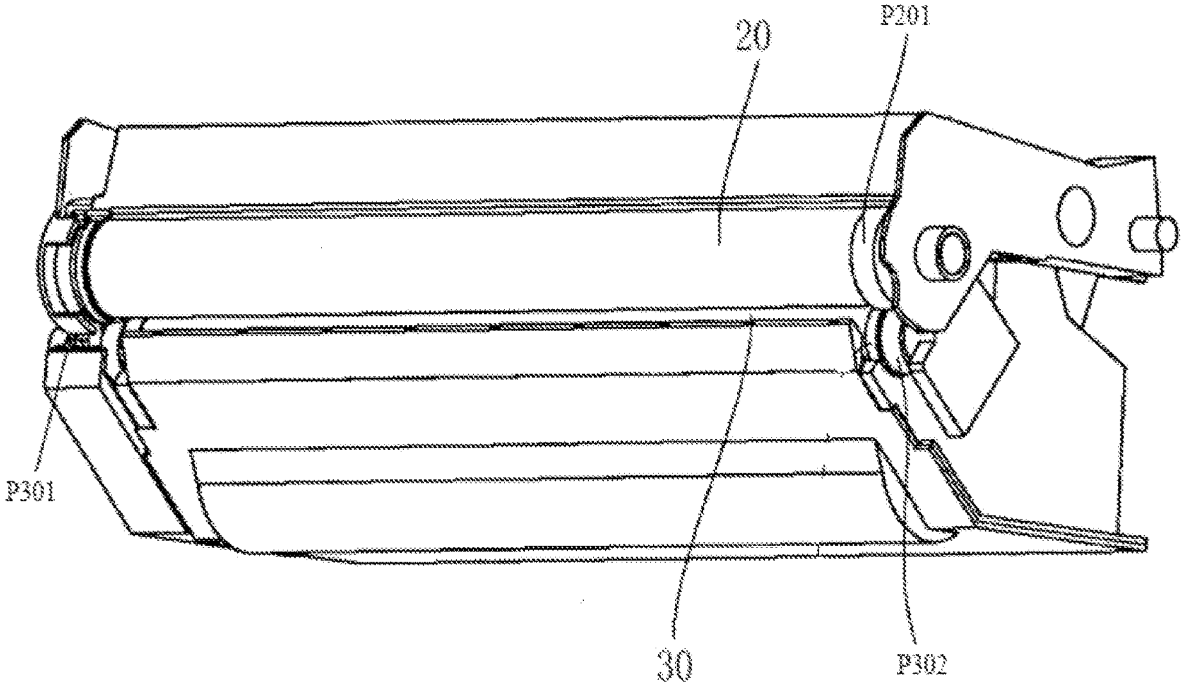
FIG. 93 illustrates a structural schematic of a process cartridge according to embodiment sixteen of the present disclosure.

FIG. 93 is a structural schematic of the process cartridge in one embodiment. In one embodiment, the process cartridge may cancel the force receiving unit disposed at the first end 1A of the photosensitive drum 20 along the length direction (that is, the end close to the driving unit 1080 in the installed state); instead, a developing roller gear P301 disposed at the first end of the developing roller 30 along the length direction (that is, the end close to the driving unit 1080 when it is installed in the electronic image-forming apparatus) may be used as the force receiving unit. The developing roller gear P301 may be engaged with the gear portion 1080*d* of the driving unit 1080 to receive the driving force. For example, the developing roller gear P301 may be disposed coaxially and rotate synchronously with the developing roller 30, and the developing roller gear P301 may be a bevel gear or a helically arranged single tooth structure. Optionally, the upper teeth may be designed as helical teeth, thereby desirably being engaged with the helical teeth of the driving unit 1080. Optionally, the force receiving unit described in above embodiments and the developing roller gear P301 described in one embodiment may be configured together to receive the driving force from the driving unit 1080.

Furthermore, the process cartridge may further include a force transfer gear P302 and a photosensitive drum gear P201; the force transfer gear P302 may be disposed at the first end of the developing roller 30 along the length direction or at the other end opposite to the first end; and the photosensitive drum gear P201 may be disposed at the first end of the photosensitive drum 20 or the other end opposite to the first end. In addition, the photosensitive drum gear P201 may be engaged with the force transfer gear P302, such that the photosensitive drum 20 may receive the driving force through the photosensitive drum gear P201 and the force transfer gear P302. With above solutions, the process cartridge may receive the driving force from the electronic image-forming apparatus and drive the rotating parts such as the developing roller 30, the photosensitive drum 20 and the like to rotate.

In other embodiments, the developing roller gear P301 may include a helical portion and a spur portion, the helical portion may be used for being engaged with the gear portion 1080*d* of the driving unit 1080 to receive the driving force, and the spur portion may be used for transferring the driving force to the photosensitive drum gear P201. Correspondingly, the photosensitive drum gear for being engaged with the spur tooth portion of the developing roller gear P301 may be disposed at one end of the photosensitive drum 20, such that the photosensitive drum 20 may receive the driving force. Optionally, the developing roller gear P301 disposed at one end of the developing roller 30 may also be omitted, while keeping the force receiving unit disposed at the first end of the photosensitive drum 20; and the force receiving unit may be engaged with the driving unit 1080 to receive the driving force. Similarly, the photosensitive drum gear may be disposed at the first end of the photosensitive drum 20 or at an end opposite to the first end. Correspondingly, the developing roller gear may be disposed at the first end of the developing roller 30 or at the other end opposite to the first end, and the developing roller gear may be engaged with the photosensitive drum gear, such that the developing roller 30 may receive the driving force. Optionally, in addition to gear transfer, a friction wheel, such as a rubber wheel and the like, may also be used for the transfer of the driving force between the developing roller 30 and the photosensitive drum 20. Optionally, the gear for being engaged with the driving unit 1080 and receiving the driving force may be disposed at the end of the developing roller or may be disposed separately from the developing roller 30, for example, disposed at the end cover. The gear may be engaged with the gear portion 1080*d* of the driving unit 1080 to receive the driving force, and then transfer the driving force to the rotating parts such as the developing roller 30, the photosensitive drum 20 and the like.

Embodiment Seventeen

Unless otherwise specified, the structure of the process cartridge in one embodiment may be substantially same as the process cartridge in embodiment fifteen in terms of shape, structure, installation and removal manners, and the similarities may not be described in detail herein.

Figure 94:
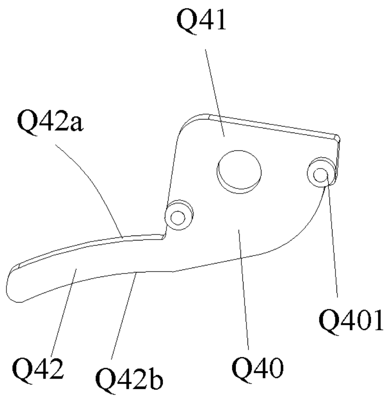
FIG. 94 illustrates a structural schematic of a pressing part according to embodiment seventeen of the present disclosure.

FIG. 94 shows a deformed structure of the pressing part Q40 in one embodiment. In one embodiment, both the upper end surface Q42*a* and the lower end surface Q42*b* of the cantilever Q42 of the pressing part Q40 may be configured as curved surfaces. In the state that the process cartridge is installed in the electronic image-forming apparatus, the lower end surface Q42*b* of one embodiment may be concave upward and the upper end surface Q42*a* may be convex upward compared with above-described embodiments. The design of such structure may make the lower end surface Q42*b* to better pass over the second side plate 109*c* of the electronic image-forming apparatus during the installation process of the process cartridge, thereby avoiding interference with the second side plate 109*c*.

Figure 95:
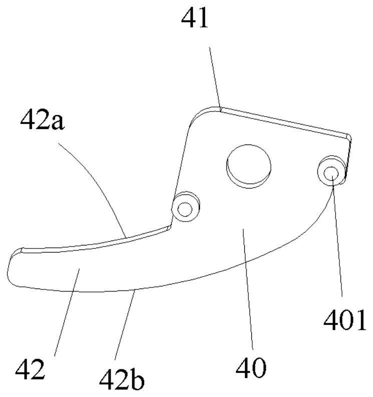
FIG. 95 illustrates a structural schematic of deformation of a pressing part according to embodiment seventeen of the present disclosure.

FIG. 95 is another deformed structure of the pressing part Q40 in one embodiment. The upper end surface Q42*a* and the lower end surface Q42*b* of the cantilever Q42 of the pressing part Q40 may be both configured as curved surfaces. In the state that the process cartridge is installed to the accommodation portion Q105, the lower end surface Q42*b* in one embodiment may be convex downward and the upper end surface Q42*a* may be concave downward compared with above-described embodiments. With such structural design, the lower end surface Q42*b* of the cantilever Q42 may be a curved surface structure which may play a certain guiding role.

It should be noted that the deformation of the shape and structure of the cantilever may not be limited thereto. Other deformations may also be optional. For example, the upper end surface may be configured to protrude upward, and the lower end surface may be configured to protrude downward; or the upper end surface may be configured to be concave downward, and the lower end surface may be configured to be concave downward; or the cantilever may be configured to be a cylindrical shape, a conical shape or a prism shape or the like, as long as the cantilever may press the driving unit.

Embodiment Eighteen

Figure 96:
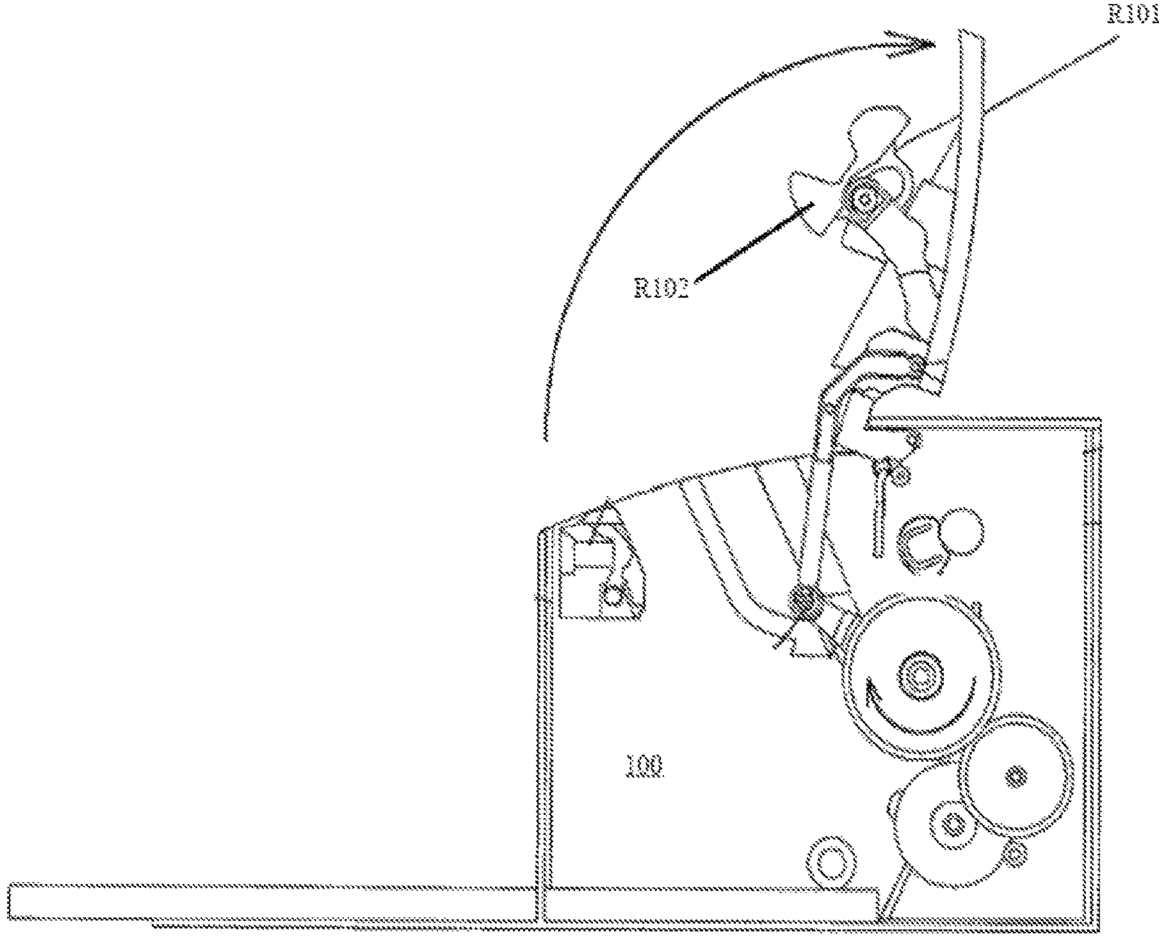
FIG. 96 illustrates a schematic of an electronic image-forming apparatus according to embodiment eighteen of the present disclosure.

FIG. 96 is a schematic of the electronic image-forming apparatus in the present disclosure. As shown in FIG. 96, the electronic image-forming apparatus 100 may be provided. The process cartridge 1 may be detachably accommodated in the electronic image-forming apparatus 100. The electronic image-forming apparatus 100 may include an openable and closable door cover R101, a pushing portion R102 which is linked and cooperated with the door cover R101, and a driving unit 1080 (FIG. 102) which is an output part of the driving force.

Figure 97:
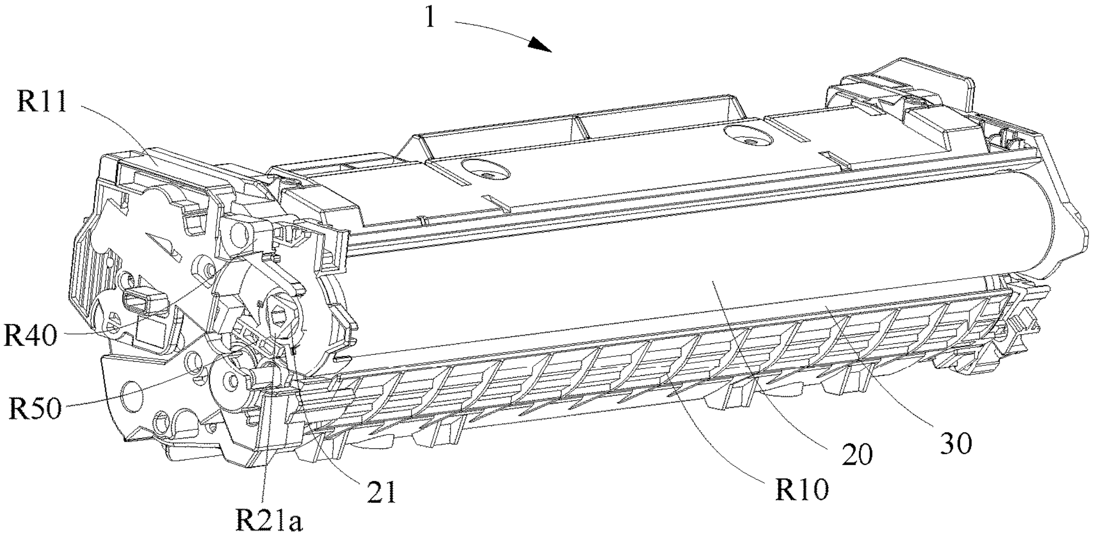
FIG. 97 illustrates a structural schematic of a process cartridge according to embodiment eighteen of the present disclosure.
Figure 98:
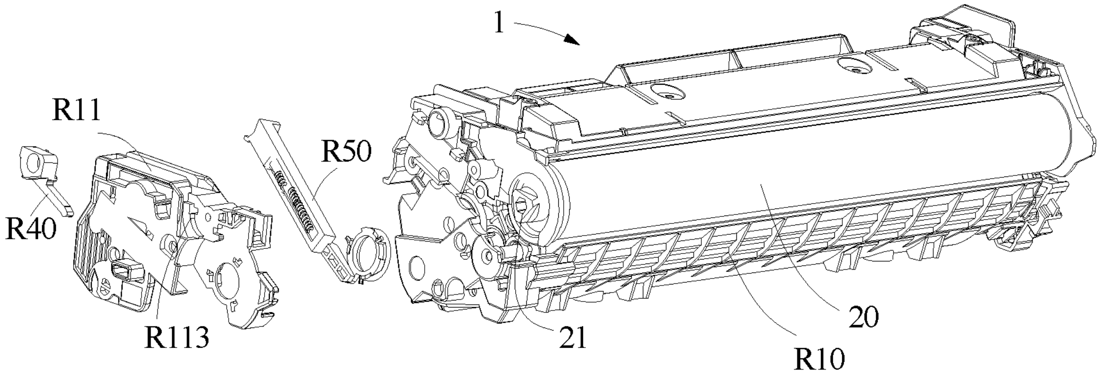
FIG. 98 illustrates an exploded structural schematic of a process cartridge according to embodiment eighteen of the present disclosure.

FIG. 97 is a structural schematic of the process cartridge in the present disclosure. FIG. 98 is an exploded structural schematic of the process cartridge in the present disclosure. As shown in FIGS. 97-98, the process cartridge 1 may include a cartridge body R10, the photosensitive drum 20, the developing roller 30 and the force receiving unit 21. The developer may be accommodated in the cartridge body R10, and the photosensitive drum 20 and the developing roller 30 may be respectively and rotatably disposed at the cartridge body R10. The force receiving unit 21 may be disposed at one end of the cartridge body R10 and connected to the photosensitive drum 20. The force receiving unit 21 may include a force receiving portion R21*a*. The force receiving portion R21*a* may be configured to receive the driving force outputted by the driving unit 1080 in the electronic image-forming apparatus, thereby rotating the photosensitive drum 20.

Furthermore, the process cartridge 1 may further include a pressing part R40 which may apply the pressing force on the driving unit during the engagement process of the force receiving unit 21 and the driving unit 1080, such that the driving unit may be coaxially-aligned. For example, the cartridge body R10 may include a bracket R11, the pressing part R40 may be fixedly installed on the bracket R11, and at least a part of the pressing part R40 may be located inside the outer peripheral surface of the photosensitive drum 20. During the contact and engagement process of the force receiving unit and the driving unit of the electronic image-forming apparatus, the pressing part R40 may be in contact with the driving unit 1080 of the electronic image-forming apparatus, thereby realizing the center-alignment of the driving unit.

Figure 99:
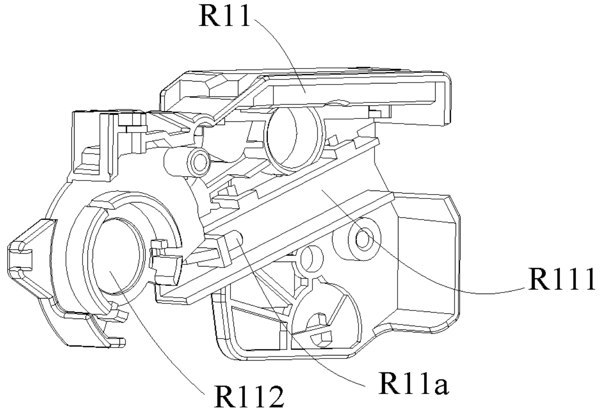
FIG. 99 illustrates a schematic of a bracket of a process cartridge according to embodiment eighteen of the present disclosure.

For example, as shown in FIGS. 98-99, the bracket R11 may include a chute R111, an installation portion R112, a recess and a protrusion R11*a*; the protrusion R11*a* may be disposed at the chute R111 for fixing one end of the elastic part R511; and the recess R113 may be configured for installation the pressing part R40.

Figure 100:
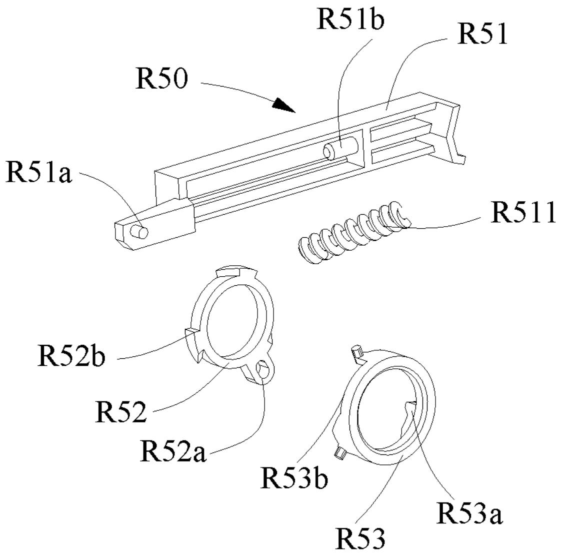
FIG. 100 illustrates a schematic of a control mechanism of a process cartridge according to embodiment eighteen of the present disclosure.

As shown in FIG. 100, the process cartridge 1 may further include a control mechanism R50. The control mechanism 50 may be cooperated with the force receiving unit 21 to control the protruding/retracting state of the force receiving unit 21 through the control mechanism 50, that is, control the force receiving unit 21 to move axially along the photosensitive drum 20. Furthermore, the force receiving unit 21 may be located at the installation portion R112; and the control mechanism R50 may include a pushing rod R51, an elastic part R511, a linkage part R52 and a limiting portion R53. The pushing rod R51 may be movably installed on the chute R111; the linkage part R52 and the limiting portion R53 may be cooperated with each other and sleeved on the force receiving unit 21; and the linkage part R52 and the pushing rod R51 may be movably connected. The elastic part R511 may be disposed at the pushing rod R51, and one end of the elastic part may be connected to the protrusion R11*a* for resetting the pushing rod R51. In one embodiment, the elastic part R511 may be a spring, and in other embodiments, the elastic part R511 may also be other elastic materials, such as rubber, silica gel, sponge and the like.

For example, the pushing rod R51 may include the first protrusion R51*a* and the second protrusion R51*b*, where the second protrusion R51*b* may be configured to be connected to the other end of the elastic part R511. The linkage part R52 may include a connecting portion R52*a* and a first protruding portion R52*b*, and the connecting portion R52*a* may be movably connected to the first protrusion R51*a* of the pushing rod R51. The limiting portion R53 may include a second protruding portion R53*a* and a flat surface portion R53*b*. As the process cartridge 1 is in different states, the linkage part R52 may move between the second protruding portion R53*a* and the flat surface portion R53*b* of the limiting portion R53, and specific actions are described in detail subsequently.

Figure 101A:
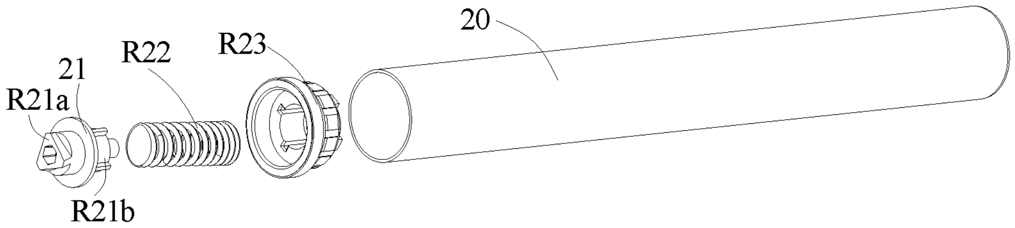
FIG. 101A illustrates an exploded installation schematic of a force receiving unit and a photosensitive drum of a process cartridge according to embodiment eighteen of the present disclosure.

FIG. 101A is an exploded view of the installation of the force receiving unit and the photosensitive drum. As shown in FIG. 101A, the force receiving unit 21 may include a force receiving portion R21*a*, a force output portion R21*b*, an intermediate part R23 and an elastic part R22. The intermediate part R23 may be disposed at one end of the photosensitive drum 20. The force receiving portion R21*a* may be movably disposed at the intermediate part R23 and pass through the linkage part R52 and the limiting portion R53, which may be configured for contact and engaged with the driving unit of the electronic image-forming apparatus to receive the driving force outputted from the electronic image-forming apparatus. The force output portion R21*b* may be connected to the force receiving portion R21*a* for inputting the driving force to the photosensitive drum 20, such that the photosensitive drum 20 may rotate with the rotation of the force receiving unit 21. The elastic part R22 may be disposed at the force receiving unit 21 and the intermediate part R23; and one end of the elastic part R22 may be connected to the intermediate part R23, and the other end of the elastic part R22 may be connected to the force receiving unit 21. In one embodiment, the elastic part R22 may be a spring. In other embodiments, the elastic part R22 may also be other elastic materials, such as rubber, silica gel, sponge and the like.

Figure 101B:
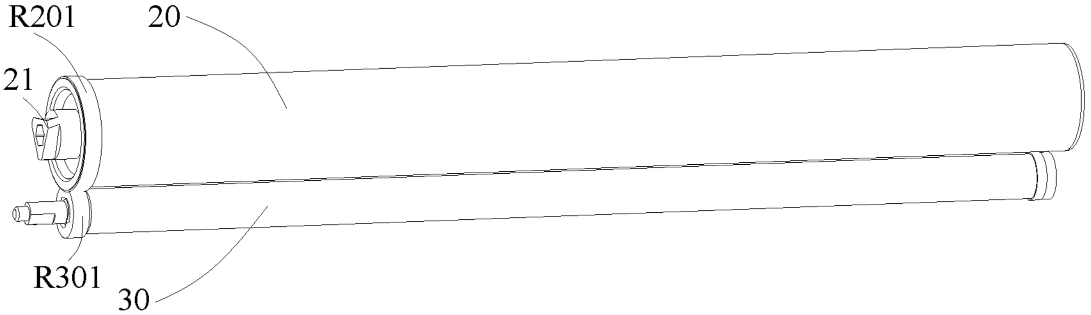
FIG. 101B illustrates a local schematic of a photosensitive drum and a developing roller of a process cartridge according to embodiment eighteen of the present disclosure.

FIG. 101B is a local view of the photosensitive drum and the developing roller of the present disclosure. As shown in FIG. 101B, the process cartridge may further include an intermediate gear R301 and a photosensitive drum gear R201; the intermediate gear R301 may be disposed at the end of the developing roller 30; and the photosensitive drum gear R201 may be disposed at the end of the photosensitive drum 20 and engaged with the intermediate gear R301, such that the developing roller 30 may receive the driving force through the intermediate gear R301 and the photosensitive drum gear R201, thereby making the developing roller 30 to rotate.

Figure 102:
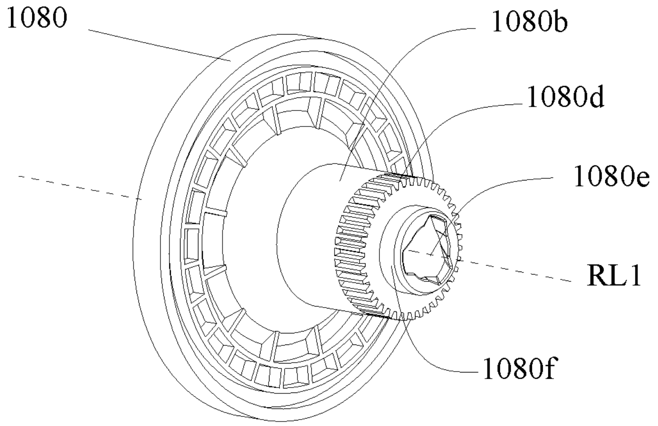
FIG. 102 illustrates a structural schematic of a driving unit in an electronic image-forming apparatus according to embodiment eighteen of the present disclosure.

FIG. 102 is a structural schematic of the driving unit of the electronic image-forming apparatus in the present disclosure. The driving unit 1080 may include a gear portion 1080*d*, a small-diameter portion 1080*f*, and a drive transmission portion 1080*e*. In the contact and mess process of the force receiving unit and the driving unit of the electronic image-forming apparatus, the pressing part R40 may press the small-diameter portion 1080*f* of the driving unit 1080, thereby achieving the function of center-aligning the driving unit 1080. The detailed center-alignment process is described in detail hereinafter.

Figure 103:
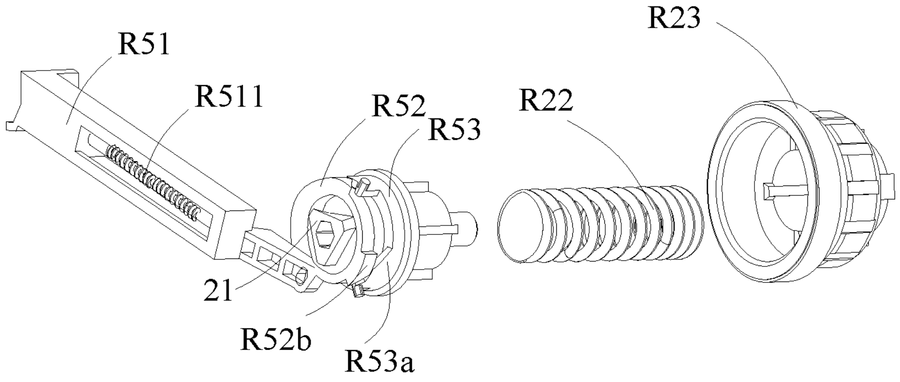
FIG. 103 illustrates a schematic of a force receiving unit at a retracted state according to embodiment eighteen of the present disclosure.

FIG. 103 is a local schematic of the force receiving unit in the retracted state in the present disclosure. As shown in FIG. 103, when the process cartridge 1 is installed in the electronic image-forming apparatus (not shown in drawings) and the door cover R101 of the electronic image-forming apparatus may not be closed, the pressing part R40 may press the small-diameter portion 1080*f* of the driving unit 1080, but at this point, the driving unit 1080 of the electronic image-forming apparatus 100 may be still at the inclined state. The elastic part R511 in the pushing rod R51 of the control mechanism R50 may be at the initial state (no deformation), and the first protruding portion R52*b* of the linkage part R52 may be in contacted with the second protruding portion R53*a* of the limiting portion R53, such that the elastic part R22 disposed between the force receiving unit 21 and the intermediate part R23 may be compressed. The compression amount herein is referred to as the first compression amount. At this point, the plane of the force receiving portion R21*a* of the force receiving unit 21 may be located inside the plane of the linkage part R52 or coplanar with the plane of the linkage part R52 and may also be at the protruding state, as long as the force receiving unit may not cause interference during the installation process. In such state, the force receiving unit 21 may not be combined with the driving unit 1080.

Figure 104:
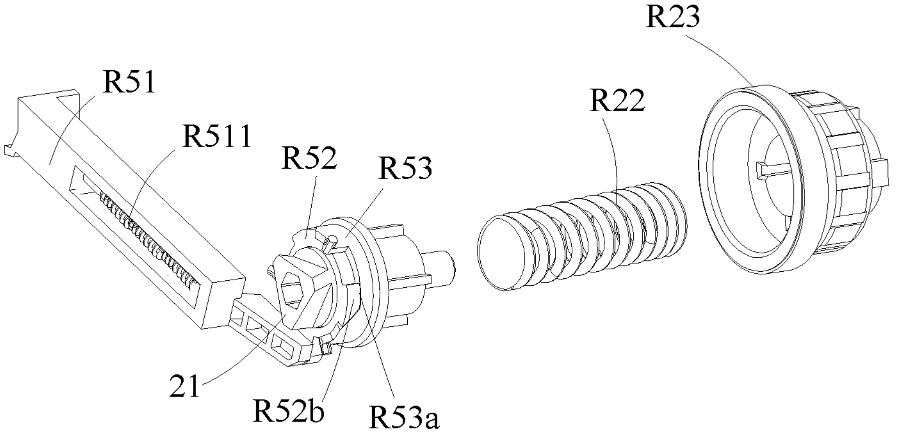
FIG. 104 illustrates a schematic of a force receiving unit at a protruding state according to embodiment eighteen of the present disclosure.

FIG. 104 is a local schematic of the force receiving unit at the protruding state in the present disclosure. When the door cover R101 of the electronic image-forming apparatus is in the fully closed state, the pressing part R40 has completed the center-alignment action on the driving unit 1080, and the driving unit 1080 may be at the center-alignment state. At this point, the door cover R101 may be completely closed, and the pushing rod R51 of the control mechanism R50 may be applied the force by the pushing part R102 to compress the elastic part R511 and then drive the linkage part R52 to rotate. The first protruding portion R52*b* of the linkage part R52 may be changed from being in contact with the second protruding portion R53*a* of the limiting portion R53 to being in contact with the flat surface portion R53*b*, and the elastic part R22 arranged between the force receiving unit 21 and the intermediate part R23 may be compressed. The compression amount herein is referred to as the second compression amount. The linkage part R52 has the function of axial movement, the first compression amount may be greater than the second compression amount, such that at such state, the force receiving unit 21 may be at the protruding state, that is, the plane of the force receiving portion R21*a* of the force receiving unit 21 may protrude from the plane of the linkage part R52. Since the driving unit 1080 has been coaxially-aligned at this point, the force receiving portion R21*a* of the force receiving unit 21 may be connected to the drive transmission portion 1080*e* of the driving unit 1080 to complete engagement.

Embodiment Nineteen

A process cartridge is provided in one embodiment. The process cartridge may include a cartridge body, a photosensitive drum, a developing roller, a force receiving unit and a pressing part. The photosensitive drum and the developing roller may be rotatably disposed at the cartridge body, and the force receiving unit may be connected to the photosensitive drum. The pressing part may be disposed at the cartridge body and located at the same end of the cartridge body as the force receiving unit, and the pressing part may move relative to the cartridge body to center-align the position of the driving unit of the electronic image-forming apparatus. In such way, the driving unit may be engaged with the force receiving unit to transfer the output driving force of the driving unit to the photosensitive drum and the developing roller.

In one embodiment, the force receiving unit may be connected to the photosensitive drum. It may be understood that in other embodiments, the force receiving unit may also be connected to the developing roller, or two force receiving units may be configured, where one unit may be connected to the photosensitive drum, and the other unit may be connected to the developing roller.

Figure 105:
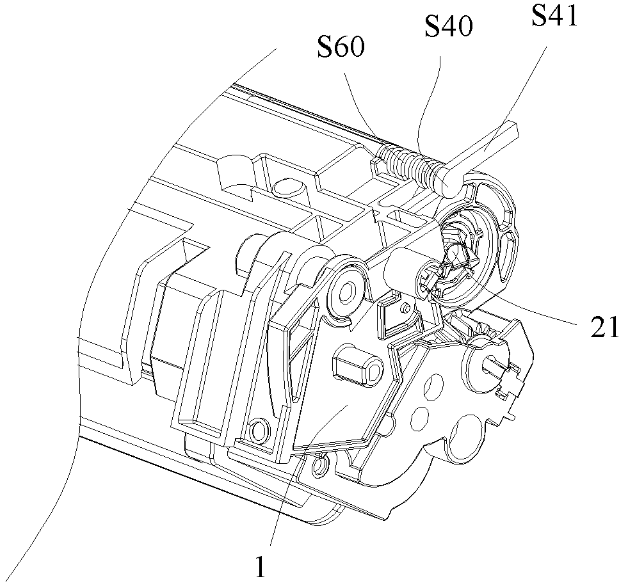
FIGS. 105-106 illustrate structural schematics of a process cartridge according to embodiment nineteen.
Figure 106:
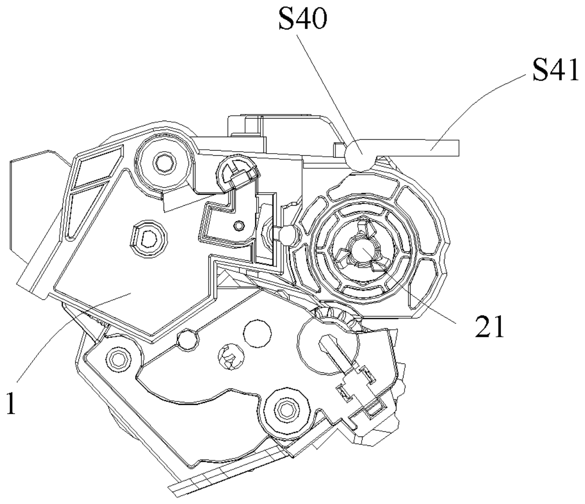

As shown in FIGS. 105-106, the pressing part S40 may be a protruding/retracting part. For example, the pressing part S40 may be detachably connected to the process cartridge 1, and the process cartridge may further include an elastic part S60 (such as a spring, a magnet, an elastic sponge or the like). The pressing part S40 may be connected to the end of the cartridge body through the elastic part S60, such that the pressing part S40 may move relative to the cartridge body along the direction in parallel or roughly parallel with the axial direction of the photosensitive drum under the action of the elastic part S60, thereby pressing the driving unit 1080. The direction substantially in parallel with the axial direction of the photosensitive drum may be the direction forming a certain angle with the axial direction of the photosensitive drum, and the angle may be within ±5°.

Furthermore, the pressing part S40 may include a rod body arranged coaxially with the photosensitive drum 20 and a protrusion S41 formed by bending and extending from one end of the rod body. The rod body may be connected to the cartridge body through the elastic part S60. The protrusion S41 may be disposed close to the force receiving unit 21 and configured for pressing down the driving unit of the electronic image-forming apparatus, such that the driving unit and the force receiving unit 21 may be substantially coaxially engaged with each other to transfer the driving force.

When the elastic part S60 is at the compressed state, the pressing part S40 may move along the length direction of the process cartridge 1 or the axial direction of the photosensitive drum 20, such that the pressing part S40 may be away from the driving unit 1080. When the elastic part S60 is stretched, the pressing part S40 may move along the length direction of the process cartridge 1 or the axial direction of the photosensitive drum 20, such that the pressing part S40 may approach the driving unit 1080 and drive the driving unit 1080 to be pressed down.

During the installation process of the process cartridge 1 on the electronic image-forming apparatus or after the process cartridge 1 is installed in place, the pressing part S40 may move along the length direction of the process cartridge 1 or the axial direction of the photosensitive drum 20 and press the driving unit. Therefore, the position of the driving unit 1080 of the electronic image-forming apparatus may be coaxially-aligned, and the driving unit 1080 may be coaxial or substantially coaxial with the force receiving unit 21. Furthermore, the driving unit 1080 may be engaged with the force receiving unit 21 to transfer the driving force, and the driving force outputted by the driving unit 1080 may be transferred to the photosensitive drum and the developing roller.

Embodiment Twenty

Another process cartridge is provided in one embodiment, and undescribed parts may be same as those in above-mentioned embodiments, which may not be described in detail for brevity.

The difference between one embodiment and above-mentioned embodiments is that the pressing part in the process cartridge of one embodiment may be sleeved on the outside of the force receiving unit and rotate coaxially with the photosensitive drum.

Figure 107:
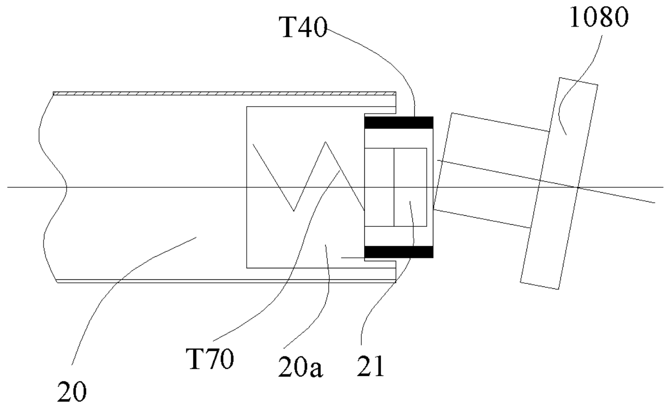
FIG. 107 illustrates a schematic when a force receiving unit of a process cartridge is in contact with and not engaged with a driving unit of an electronic image-forming apparatus according to embodiment twenty.
Figure 108:
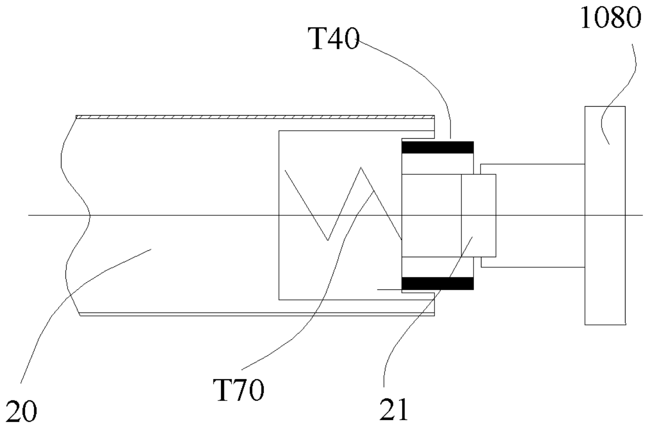
FIG. 108 illustrates a schematic when a force receiving unit of a process cartridge is in contact with and engaged with a driving unit of an electronic image-forming apparatus according to embodiment twenty.

For example, as shown in FIGS. 107 and 108, the process cartridge may further include a protruding/retracting mechanism T70 and a pressing part T40. The force receiving unit 21 may be connected to one end of the photosensitive drum 20, the protruding/retracting mechanism T70 may be disposed inside the photosensitive drum 20, and the force receiving unit 21 may be connected to the photosensitive drum 20 through the protruding/retracting mechanism T70, such that the force receiving unit 21 may move along the axial direction of the photosensitive drum 20. Optionally, the protruding/retracting mechanism T70 may be an elastic part, which may be a spring, a magnet, an elastic sponge or the like, or other parts with elastic force, which may not be limited herein.

In one embodiment, the elastic part may be a spring, a groove 20*a* may be formed at the end of the photosensitive drum 20, and the spring may be accommodated in the groove 20*a* at the end of the photosensitive drum 20.

The pressing part T40 may be sleeved on the outer side of the force receiving unit 21 away from the protruding/retracting mechanism T70, and the pressing part T40 may rotate coaxially with the photosensitive drum 20, such that the pressing part T40 may move along with the force receiving unit 21 in the axial direction of the photosensitive drum 20. In one embodiment, the pressing part T40 may be a rotatable sleeve which may be a hollow cylinder, and the force receiving unit 21 may be accommodated in the sleeve and move along the sleeve.

For example, one end of the protruding/retracting mechanism T70 (elastic part) may be abutted against the inner wall of the groove 20*a*, and the other end of the protruding/retracting mechanism T70 (elastic part) may be abutted against the force receiving unit 21.

When the process cartridge is not installed in the electronic image-forming apparatus, the force receiving unit 21 may use the frictional force between the force receiving unit 21 and the pressing part 40 to resist the elastic force of the protruding/retracting mechanism T70 and be retracted and accommodated in the pressing part T40. After the process cartridge is installed in the electronic image-forming apparatus, the driving unit 1080 may be at an inclined state, that is, the axis of the driving unit 1080 may be not in parallel with the axis of the photosensitive drum 20. In addition, the pressing part T40 is sleeved on the outside of the force receiving unit 21, and the pressing part T40 forms structural interference with the driving unit 1080, such that the driving unit 1080 may start to rotate and drive the pressing part T40 to rotate. During the rotation of the pressing part T40, the centrifugal force generated by the pressing part T40 may make the driving unit 1080 gradually move from the original inclined state to the position that the axis of the driving unit 1080 is coincident with the axis of the photosensitive drum 20. At this point, the driving unit 1080 may be coaxial with the photosensitive drum 20. After the pressing part T40 rotates centrifugally, the frictional force between the force receiving unit 21 and the pressing part T40 may decrease. The elastic force of the protruding/retracting mechanism T70 may be used to drive the force receiving unit 21 to move along the axial direction of the photosensitive drum 20 toward the driving unit 1080. Through such movement of the force receiving unit 21, the force receiving unit 21 may protrude from the pressing part T40, thereby successfully being engaged with the driving unit 1080 and realizing driving force transfer between the driving unit 1080 and the photosensitive drum 20.

Embodiment Twenty One

Figure 109:
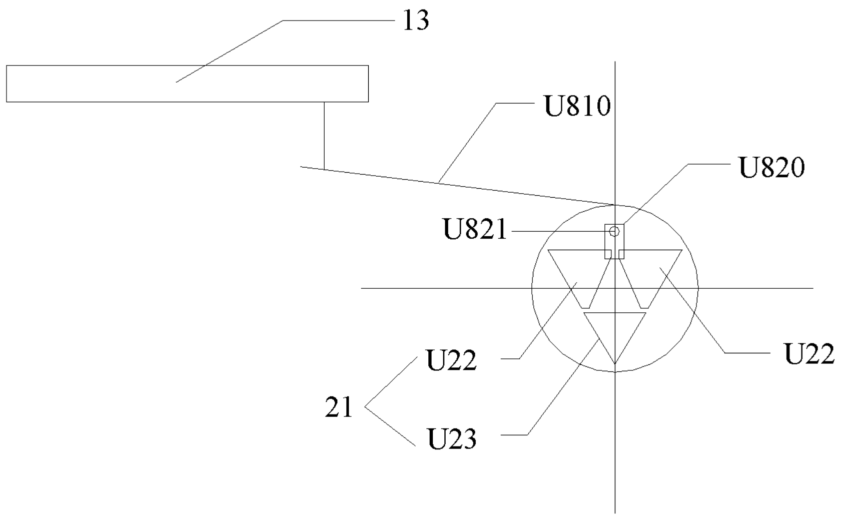
FIG. 109 illustrates a schematic of a force receiving unit of a process cartridge according to embodiment twenty one.

As shown in FIG. 109, the force receiving unit U22 and the pressing part U23 may be respectively disposed at one end of the photosensitive drum 20. In one embodiment, the number of the force receiving units U22 may be two or three, and the number of the force receiving units may not be limited herein. Both the force receiving unit U22 and the pressing part U23 may move along the axial direction of the photosensitive drum 20 relative to the cartridge body; and the pressing part U23 may also move relative to the force receiving unit U22 within the first plane region along the direction perpendicular to the axial direction of the photosensitive drum 20. The position of the driving unit 1080 may be coaxially-aligned by the pressing part U23, and the driving unit of the electronic image-forming apparatus may be engaged with the force receiving unit U22. On the plane perpendicular to the axial direction of the photosensitive drum, the projection of the first plane region and the projection of the photosensitive drum may be at least partially overlapped with each other.

Furthermore, the process cartridge may further include the first elastic part U211 and the second elastic part U231. The force receiving unit U22 and the pressing part U23 may be connected to the photosensitive drum 20 through the first elastic part U211; the first elastic part U211 may enable the force receiving unit U22 and the pressing part U23 to translate along the axial direction of the photosensitive drum 20; the pressing part U23 may be connected to the force receiving unit U22 through the second elastic part U231; and the second elastic part U231 may enable the pressing part U23 to move along the direction perpendicular to the axial direction of the photosensitive drum 20. For example, the driving gear may be disposed on the photosensitive drum 20; one end of the first elastic part U211 may be disposed at the inner wall U2100 of the driving gear; and the other end of the first elastic part U211 may be directly or indirectly disposed at the inner surface U210 of the force receiving unit U22 and the pressing part U23 facing the inner wall of the driving gear. When the first elastic part U211 is deformed (such as compressed), the force receiving unit U22 and the pressing part U23 may translate along the axial direction of the photosensitive drum toward the direction extending into the process cartridge. When the first elastic part U211 releases the elastic force (for example, stretching), the force receiving unit U22 and the pressing part U23 may translate along the photosensitive axis toward the direction extending out of the process cartridge. Obviously, conventional structures such as limiting structures may also be disposed, such that the force receiving unit U22 and the pressing part U23 may not be separated from the process cartridge outwardly. In such way, the force receiving unit U22 and the pressing part U23 may translate along the axial direction of the photosensitive drum. In one embodiment, the initial state of the first elastic part U211 may be that the force receiving unit U22 and the pressing part U23 may be at the compressed state protruding into the process cartridge. The second elastic part U231 may only act on the pressing part U23. The second elastic part U231 may enable the pressing part U23 to expand and contract along the direction perpendicular to the axial direction of the photosensitive drum, such that the pressing part U23 may move along the direction perpendicular to the axial direction of the photosensitive drum, which may not be limited to moving along the direction only perpendicular to the axis. The configuration of the second elastic part U231 may be similar to that of the first elastic part U211. One end of the second elastic part may be disposed at the inner wall of the driving gear or on the force receiving unit U22, for example, may be disposed at a wall U220 inside the force receiving unit U22 in one embodiment; and the other end of the second elastic part may be directly or indirectly disposed at the pressing part U23. The initial state of the second elastic part U231 may be the state that the pressing part U23 may be compressed along the direction perpendicular to the axial direction of the photosensitive drum. When the second elastic part U231 releases the elastic force (such as stretching), the pressing part U23 may translate along the direction perpendicular to the axial direction of the photosensitive drum away from the force receiving unit U22. When the second elastic part U231 is deformed (for example, compressed), the pressing part U23 may translate along the direction perpendicular to the axial direction of the photosensitive drum toward the force receiving unit U22. For the setting and maintaining of the initial state of the second elastic part U231, a limiting portion U2311 may be optionally disposed. The limiting portion U2311 may be a block or strip part fixedly disposed at the cartridge body and configured to limit the position of the pressing part U23. In one embodiment, the limiting manner is that the limiting portion U2311 of the strip-shaped part may "support" the pressing part U23. That is, the second elastic part U231 may be compressed and make the pressing part U23 to be abutted against the limiting portion U2311, and the pressing part U23 and/or the second elastic part U231 may move relative to the limiting portion U2311. Such movement manner may be that the pressing part U23 and/or the second elastic part U231 may slide on the limiting portion U2311.

Figure 110:
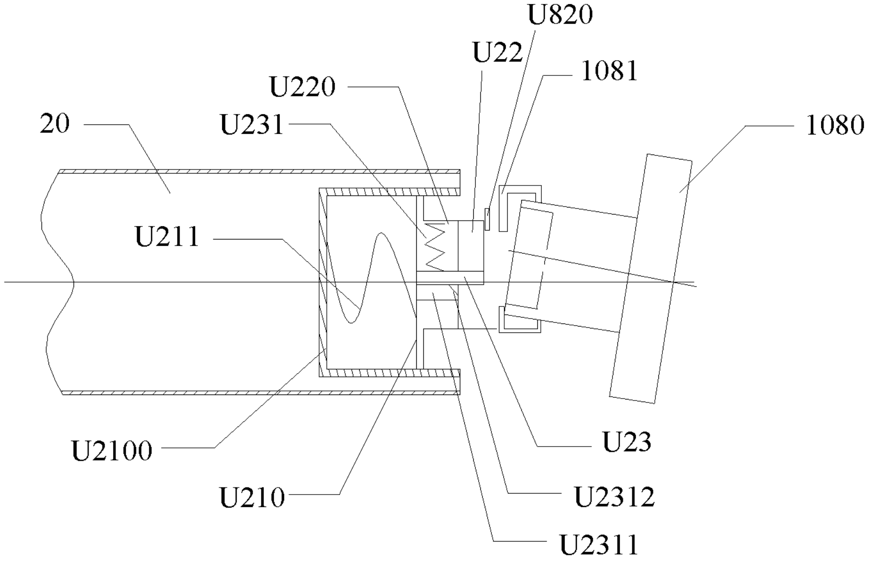
FIG. 110 illustrates a schematic when a force receiving unit of a process cartridge is in contact with and not engaged with a driving unit of an electronic image-forming apparatus according to embodiment twenty one.
Figure 111:
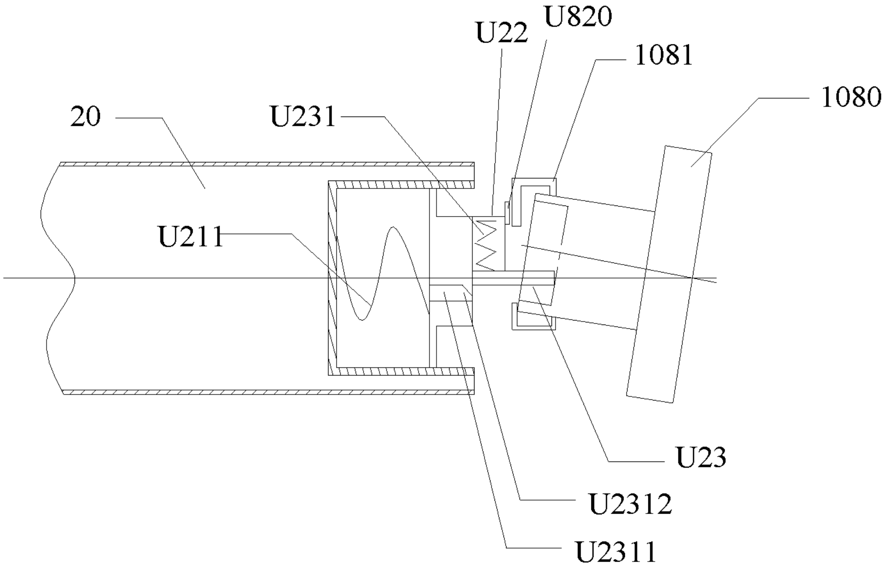
FIG. 111 illustrates a schematic when a pressing part of a force receiving unit of a process cartridge protrudes out to contact and press a driving unit of an electronic image-forming apparatus according to embodiment twenty one.
Figure 112:
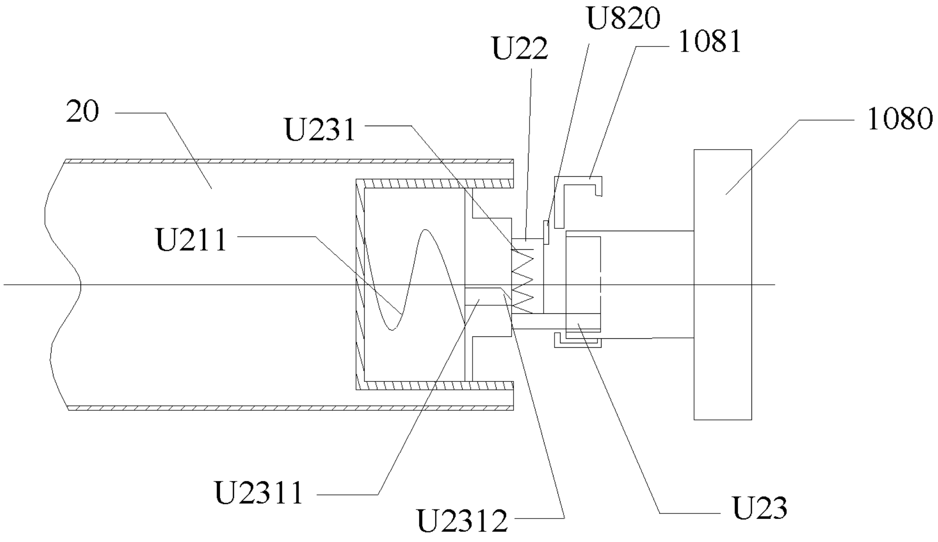
FIG. 112 illustrates a schematic of forcing a driving unit of an electronic image-forming apparatus to be coaxially-aligned by a pressing part of a force receiving unit of a process cartridge according to embodiment twenty one.
Figure 113:
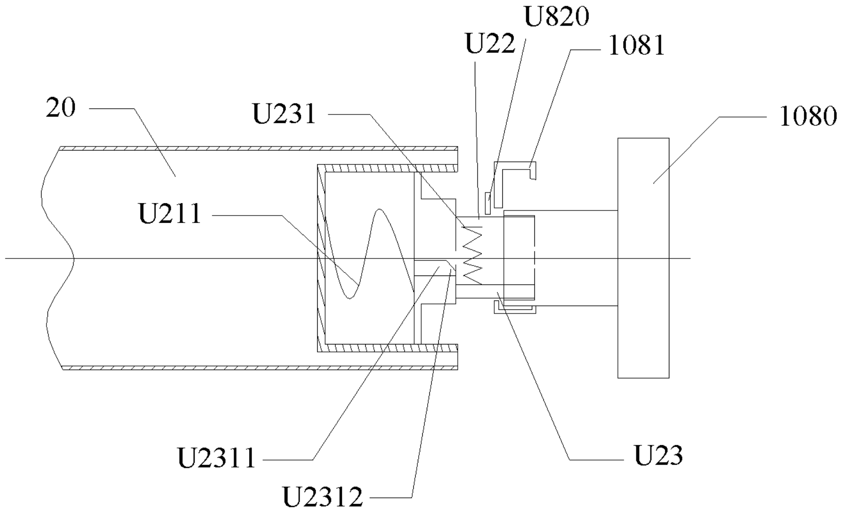
FIG. 113 illustrates a schematic when a force receiving unit of a process cartridge is in contact with and engaged with a driving unit of an electronic image-forming apparatus according to embodiment twenty one.

Furthermore, the process cartridge may further include a control rod U810 and a rotatable lock U820. The control rod U810 may be configured to receive an external force, for example, when the door cover 13 of the electronic image-forming apparatus is closed; and then control above-mentioned force receiving unit U21 to protrude out of the process cartridge along the axial direction of the photosensitive drum. The lock U820 may be disposed at the cartridge body and rotate around the rotation axis U821, and the movement of the force receiving unit U21 along the axial direction of the photosensitive drum may be blocked by the lock U820. As shown in FIG. 110, when the process cartridge is installed in the electronic image-forming apparatus, the driving unit 1080 may be at the inclined state at this point, that is, the axis of the driving unit 1080 may be not in parallel with the axis of the photosensitive drum 20. When the door cover 13 is closed to make the control rod U810 control above-mentioned force receiving unit 21 to protrude out of the process cartridge along the axial direction of the photosensitive drum, the movement change process is shown in FIGS. 110-111. Firstly, the lock U820 may prevent the force receiving unit U22 from protruding out, such that the pressing part U23 may protrude without affecting the stretching of the first elastic part U211; or the first elastic part U211 may be configured into two parts which may respectively control the force receiving unit U22 and the pressing part U23. Furthermore, when the pressing part U23 and/or the second elastic part U231 moves away from the force receiving unit U22, relative movement may occur with the fixed limiting portion U2311. When moving from the state in FIG. 111 to the state in FIG. 112, the limitation may be released by the limiting portion U2311. In one embodiment, the manner of releasing the limitation is that the pressing part U23 and/or the second elastic part U231 may slide out of the limiting portion U2311 during movement, for example, move away from the limiting portion U2311 without contact, thereby removing the limitation of the limiting portion U2311. During such process, the pressing part U23 may protrude out to be abutted against the driving unit 1080. The driving unit 1080 may be pressed to a certain extent by the pressing part U23, and the driving unit 1080 may be gradually rotated and aligned until the state shown in FIG. 112 is formed. At this point, the pressing part U23 may be fully extended out to be abutted against the driving unit 1080, such that the driving unit 1080 may move from the inclined state to the position that the axis is substantially in parallel or coaxial with the axis of the photosensitive drum 20. At this point, the force receiving unit U21 may not be fully engaged with the driving unit 1080. Furthermore, as shown in FIG. 113, when the lock U820 in one embodiment is triggered or automatically rotates, its blocking effect on the force receiving unit U22 may be released, such that the force receiving unit U22 may protrude out of the process cartridge under the stretching action of the first elastic part U211. In such way, the driving unit 1080 may be in contact with and engaged with the coaxially-aligned driving unit 1080. In such state, the complete engage of the force receiving unit 21 and the driving unit 1080 may be completed.

Furthermore, an inclined surface U2312 may also be formed on the limiting portion U2311 (e.g., a free end), which may be configured for helping the pressing part U23 to return along the axial direction of the photosensitive drum and the direction perpendicular to the axial direction of the photosensitive drum.

Furthermore, in the movement change process as shown in FIGS. 110-111, in one embodiment, it may not rely on the lock U820 to block the movement of the force receiving unit U22 along the axial direction of the photosensitive drum, instead, the driving unit 1080 or the driving unit protective cover 1081 located outside the driving unit 1080 may play a blocking role. That is, the force receiving unit U22 may be directly blocked by the end of the driving unit 1080 or the driving unit protective cover 1081 and further protrude out after being coaxially-aligned to complete the engagement, which may also achieve the objective in one embodiment.

Embodiment Twenty Two

Figure 114:
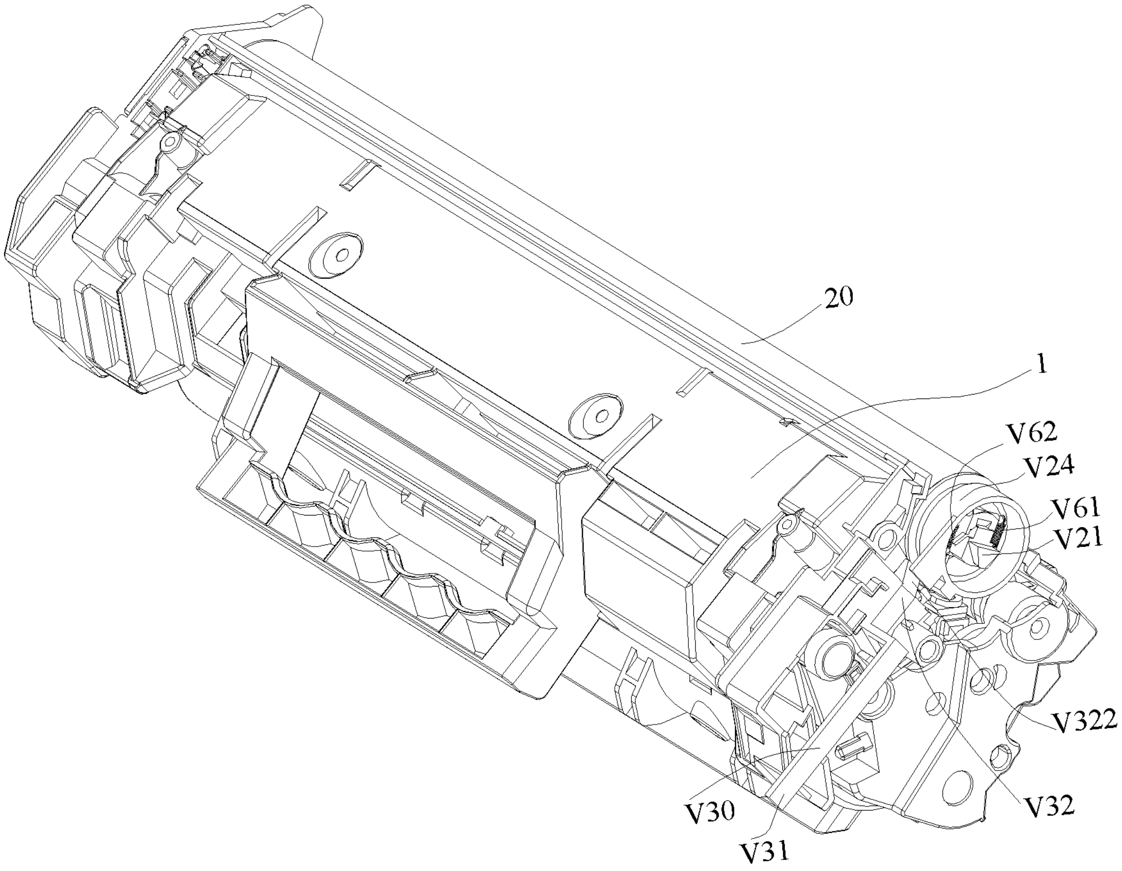
FIG. 114 illustrates a structural schematic of a process cartridge according to embodiment twenty two.

As shown in FIG. 114, the process cartridge 1 may further include a control mechanism V30; the control mechanism V30 may be fixed on the process cartridge 1 by being disposed at the guide rail (not shown in drawings) of the end cover; and the control mechanism V30 may move along the guide rail in the direction perpendicular to the length direction of the process cartridge. For example, the control mechanism V30 may be configured with the first end V31 and the second end V32, where an inclined surface V322 may be further configured at the end of the second end V32. Optionally, the control mechanism in one embodiment may be a pushing rod.

Figure 115:
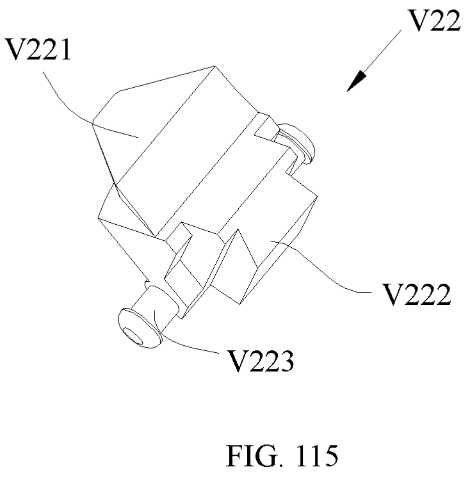
FIG. 115 illustrates a structural schematic of a force receiving portion of a force receiving unit according to embodiment twenty two.
Figure 116:
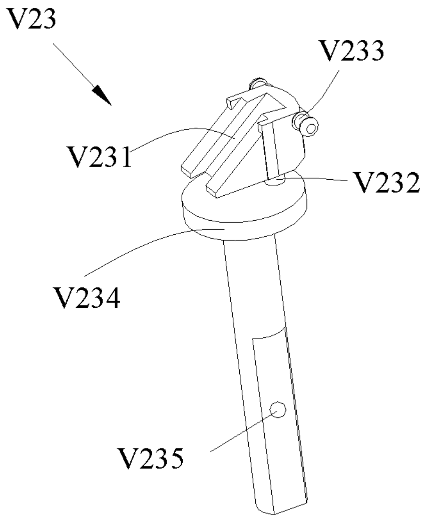
FIG. 116 illustrates another structural schematic of a force receiving portion of a force receiving unit according to embodiment twenty two.
Figure 117:
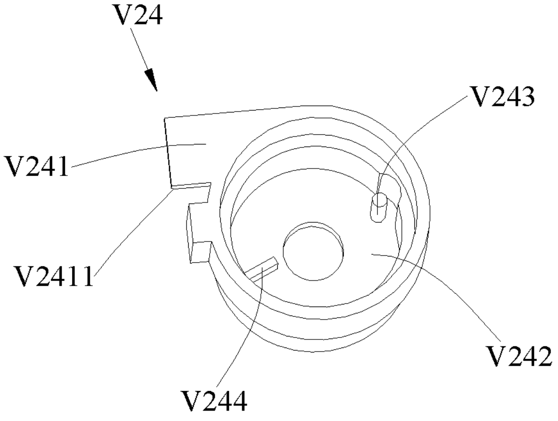
FIG. 117 illustrates a structural schematic of a protruding edge of a force receiving unit according to embodiment twenty two.

FIG. 115 is a structural schematic of a force receiving portion of the force receiving unit in embodiment twenty two. FIG. 116 is a structural schematic of a force transferring portion of the force receiving unit in embodiment twenty two. FIG. 117 is a structural schematic of a protruding edge of the force receiving unit in embodiment twenty two. As shown in FIGS. 115 and 116, the force receiving unit 21 may include a force receiving portion V22, a force transferring portion V23, and a protruding edge V24.

For example, the force receiving portion V22 may be configured with a protruding portion V221 for receiving the driving force from the electronic image-forming apparatus, a protrusion V222 and two first fixing columns V223 disposed at two sides of the protrusion V222. The force transferring portion V23 may include a connecting portion V232, a groove V231 disposed at one end of the connecting portion V232 for being engaged with the force receiving portion V22, a limiting surface V234 configured at the other end of the connecting portion V232 and a notch V235, where second fixing columns V233 may be respectively disposed at two sides of the groove V231. Furthermore, the protruding edge V24 may be a circular part and configured with an accommodation portion V242, where a positioning column V243 and an elastically deformable swing part V244 may be disposed at the accommodation portion V242. In addition, an abutting portion V241 may be disposed at the extension of the outer circumference of the protruding edge V24, and an abutting surface V2411 may be disposed at one end of the abutting portion V241. For example, the abutting surface V2411 may be an inclined surface.

Figure 118:
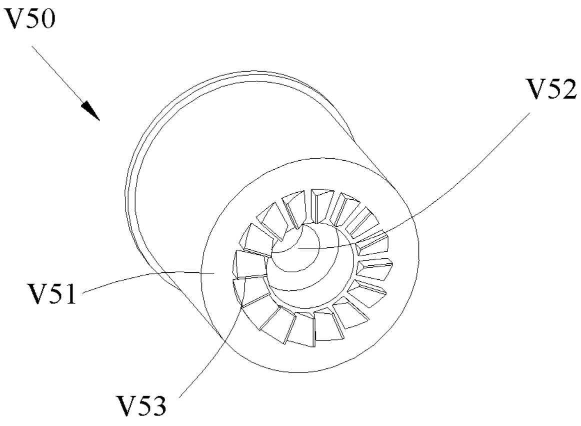
FIG. 118 illustrates a structural schematic of a supporting part according to embodiment twenty two.

FIG. 118 is a structural schematic of a supporting part in embodiment twenty two. As shown in FIG. 118, the supporting part V50 may include a support portion V51, a through hole V52 and a plurality of first protrusions V53 disposed at the outer circumference of the receiving portion V51.

Figure 119:
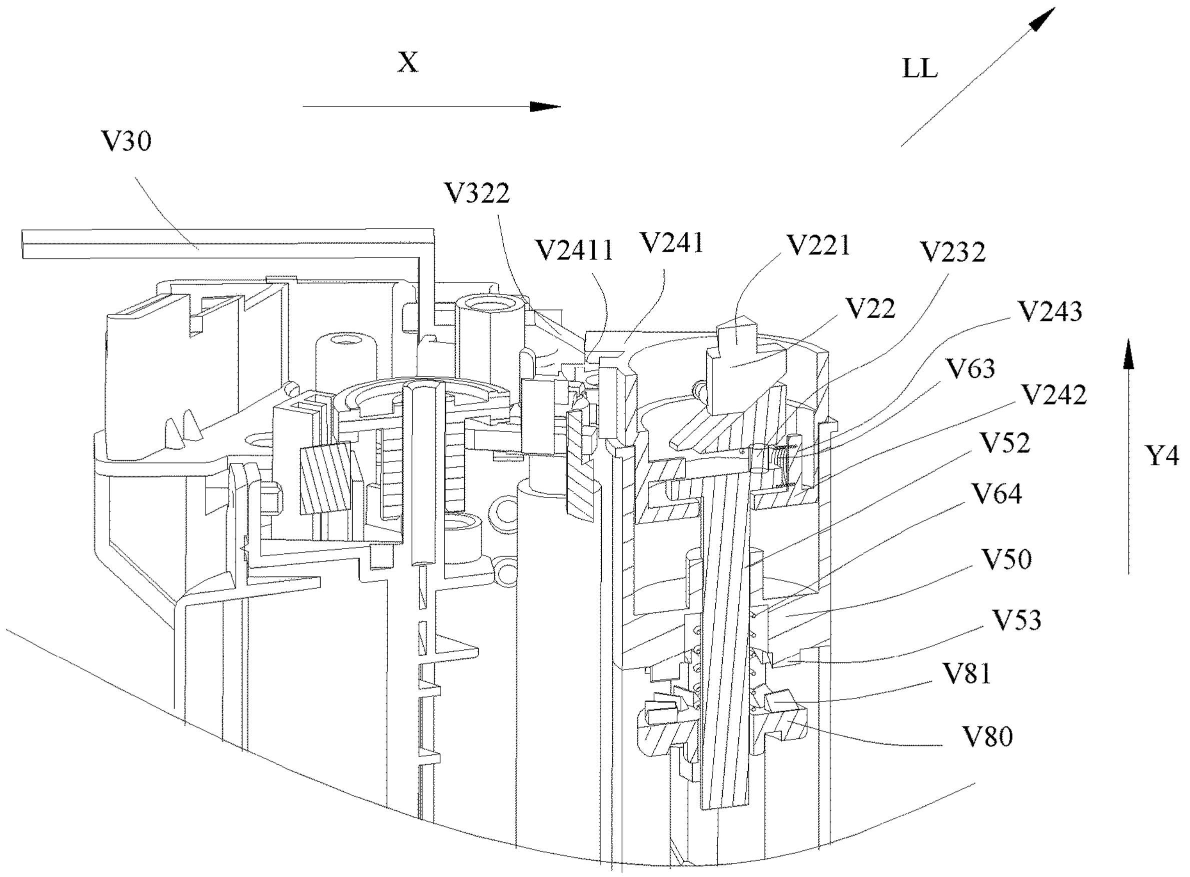
FIG. 119 illustrates a schematic of a force receiving unit at an initial state according to embodiment twenty two.

For example, as shown in FIG. 119, the installation relationship between the force receiving unit 21 and the supporting part V50 is that the force receiving portion V22 may be installed on the groove V231 of the force transferring portion V23 through the protrusion V222 to be fixed on the force transferring portion V23 and make the force receiving portion V22 slide along the LL direction (the direction in parallel with the groove V231 in FIG. 119) through the groove V231; and when receiving the driving force of the electronic image-forming apparatus, may drive the force transferring portion V23 to move together. Meanwhile, two first fixing columns V223 of the force receiving portion V22 and two second fixing columns V233 of the force transferring portion V23 may be connected through the first elastic part V61, such that the force receiving portion V22 may be reset when no longer receiving the driving force. The force receiving portion V22 may protrude toward the outside of the process cartridge 1 relative to the force transferring portion V23 when the first elastic part V61 is at natural state. The force transferring portion V23 may be disposed at the accommodation portion V242 of the protruding edge V24. At this point, the limiting surface V234 of the force transferring portion V23 may be abutted against the accommodation portion V242. The positioning column V243 in the protruding edge V24 may be connected to the connecting portion V232 of the force transferring portion V23 through the second elastic part V63, such that the force receiving portion V22 movably connected to the force transferring portion V23 may be biased at a preset phase. The swinging part V244 may be configured to be in contact with the second elastic part V63 and prevent the second elastic part V63 from being reset at the process that the force transferring portion V23 drives the second elastic part V63 to move when the force transferring portion V23 rotates after receiving force from the force receiving portion V22. At this point, each part of the force receiving unit 21 may be installed sequentially and then installed in the supporting part V50 as a whole; and the force transferring portion V23 may pass through the through hole V52 of the supporting part V50, such that the force receiving unit 21 may be fixed in the supporting part V50. Meanwhile, the third elastic part V64 may be sleeved on one end of the force transferring portion V23 passing through the through hole V52, one end of the third elastic part V64 may be abutted against the support portion V53 of the supporting part V50, and the other end may be abutted against a clutch part V80. The clutch part V80 may be connected to the force transferring portion V23 through a shaft pin (not shown in drawings) through the notch V235, and a plurality of second protrusions V81 arranged at a circumference may be disposed at the end of the clutch part V80 facing the supporting part V50. Above-mentioned parts may be integrally assembled in the photosensitive drum 20 after being cooperated with each other by referring to FIG. 119.

In one embodiment, the pressing part may be integrated in the force receiving portion, and the force receiving portion V22 may move in the first plane region and along the first direction for being engaged with the driving unit 1080, configured to center-align the position of the driving unit. On the plane perpendicular to the axial direction of the photosensitive drum, the projection of the first plane region may be at least partially coincident with the projection of the photosensitive drum; and the first direction may intersect and be not perpendicular to the axial direction of the photosensitive drum, that is, the LL direction in FIG. 119.

The contacting/engaging and dis-engaging process of the force receiving unit of the process cartridge with the driving unit of the electronic image-forming apparatus is described below.

Figure 120:
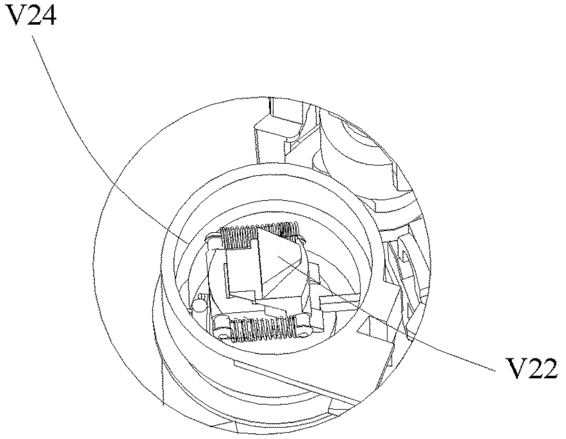

As shown in FIGS. 119 and 120, when the process cartridge 1 has not been installed in the electronic image-forming apparatus or when no external force is received after the process cartridge 1 is installed in the electronic image-forming apparatus, the force receiving unit 21 at this point may be at the initial state. That is, the force receiving portion V22 may protrude relative to the protruding edge V24 along the axial direction of the photosensitive drum 20 under the action of the first elastic part V61.

Figure 121:
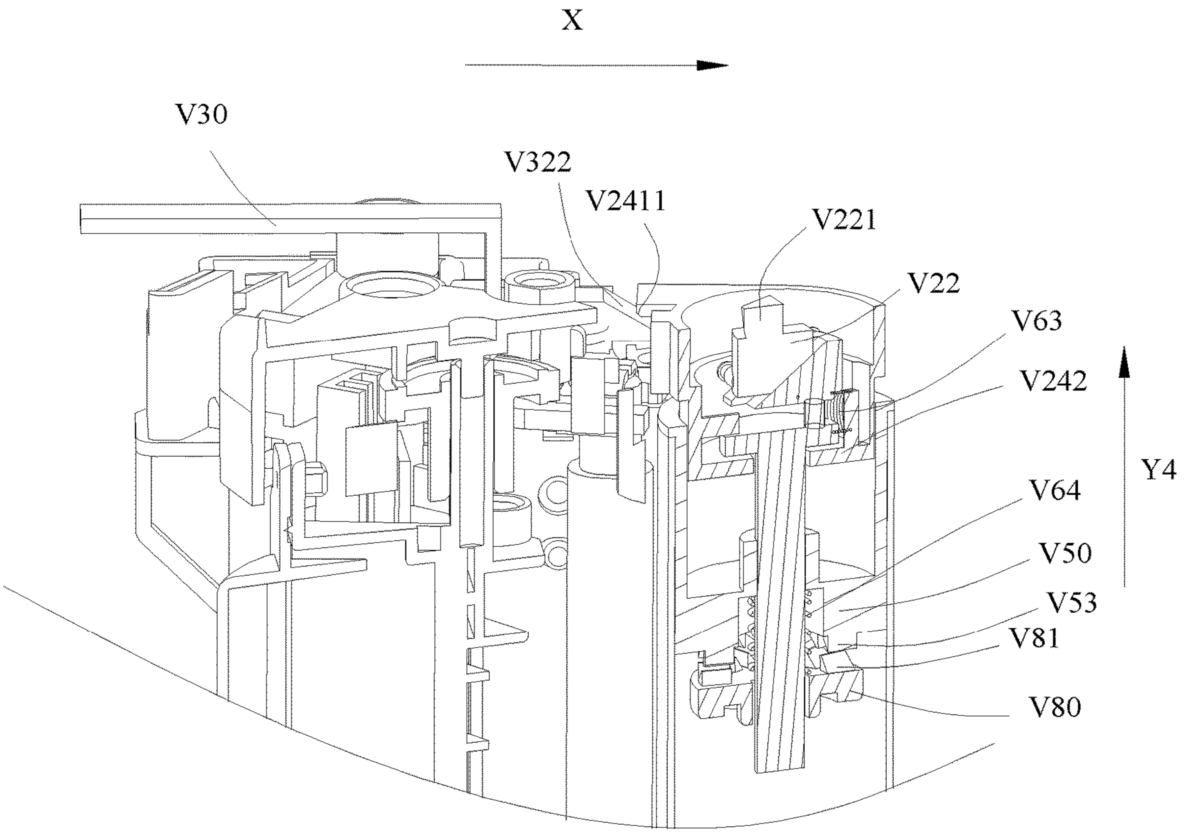

As shown in FIG. 121, when the process cartridge 1 is installed in the electronic image-forming apparatus and the door is closed, the control mechanism V30 on the process cartridge may be subjected to external force and move along the X direction. At this point, the inclined surface V322 on the second end V32 of the control mechanism V30 may move to the position of being in contact with the contact surface V2411 of the protruding edge V24. As the control mechanism V30 continues to move, the inclined surface V322 may be successfully abutted against the abutting surface V2411 and apply the force on the protruding edge V24 along the X direction. The limiting surface V234 of the force transferring portion V23 may be abutted against the accommodation portion V242 of the protruding edge V24, and the clutch part V80 may be movably connected to the force receiving portion V23. Therefore, after the protruding edge V24 receives the force, the protruding edge may drive the force transferring portion V23 together with the force receiving portion V22 and the clutch part V80 to move along the Y4 direction (that is, the direction toward the driving unit 1080). At this point, the force receiving portion V22 may move along the Y4 direction to protrude to the position being abutted against the driving unit 1080 in the electronic image-forming apparatus, that is, the protrusion V221 of the force receiving portion V22 may be locked into the driving unit 1080 in the electronic image-forming apparatus. At this point, the driving unit 1080 in the electronic image-forming apparatus may be still at the inclined state, and meanwhile, as the control mechanism V30 continues to move along the X direction, the protruding edge V24 may drive the force transferring portion V23 to move along the Y4 direction. However, since the force receiving portion V22 has been connected to the driving unit 1080 at this point, the force receiving portion V22 may not continue to move along the direction of Y4 with the force transferring portion V23, but may relatively move with the force transferring portion V23 through the groove V231 of the force transferring portion V23, that is, the force receiving portion V22 may move relative to the protruding edge V24 and translate in the driving unit 1080. The translation may be relative to the radial direction movement of the driving unit 1080, and when the protrusion V221 of the force receiving portion V22 is abutted against the side of the recessed portion of the driving unit 1080, the driving unit 1080 may be driven to move. Therefore, the driving unit 1080 may move from the initial inclined state to the position where its axis is substantially in parallel or coaxial with the axis of the photosensitive drum 20.

Figure 122:
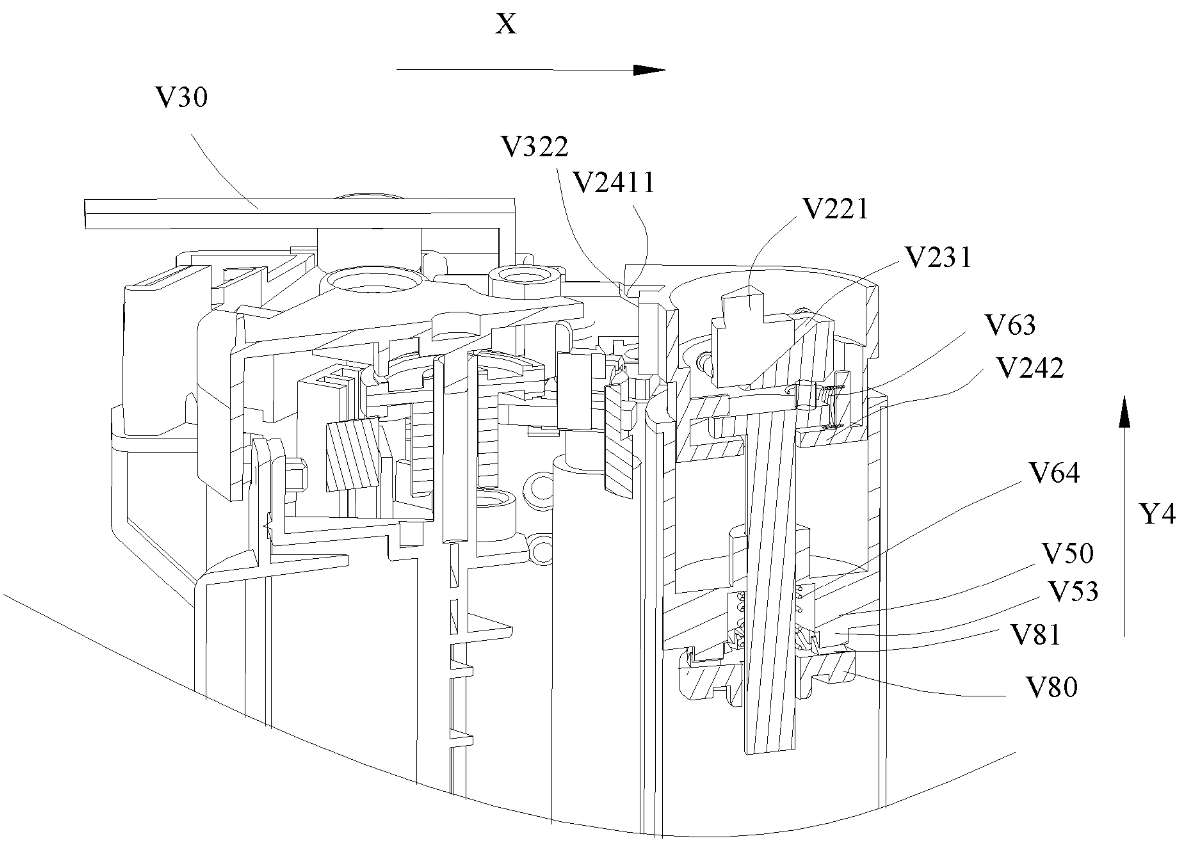
Figure 123:
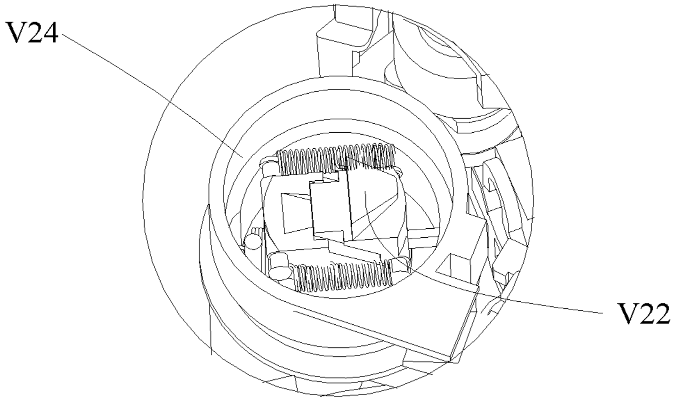

As shown in FIG. 122 and FIG. 123, after the control mechanism V30 is moved in place, the position where the protruding edge V24 may be abutted against the driving unit protective cover 1081 may not move anymore. At this point, the clutch part V80 may also overcome the elastic force of the third elastic part V64 and move to the position in contact with the supporting part V50, the second protrusion V81 of the clutch part V80 may be successfully engaged with the first protrusion V53 of the supporting part V50. At this point, the force receiving portion V22 may also drive the driving unit 1080 to move to the position coaxial with the photosensitive drum 20, thereby realizing the transfer of the driving force between the driving unit 1080 and the photosensitive drum.

After the door cover of the electronic image-forming apparatus is opened, the external force received by the control mechanism V30 may disappear, and at this time, the protruding edge V24 may retract along the direction opposite to the Y4 direction and drive the force transferring part V23 to move together. At this point, the clutch part V80 may also move along the direction opposite to the Y4 direction, the third elastic part V64 may return after losing the force of the clutch part V80, and the force receiving portion V22 may be also dis-engaged from the driving unit 1080. Finally, the force receiving unit 21 may return to the original state, such that the process cartridge may be successfully removed from the electronic image-forming apparatus.

Embodiment Twenty Three

Another control mechanism is provided in one embodiment, which is a further improvement on the basis of embodiment twenty two. Undescribed parts may be same as those in above-mentioned embodiments, which may not be described in detail for brevity.

Figure 124:
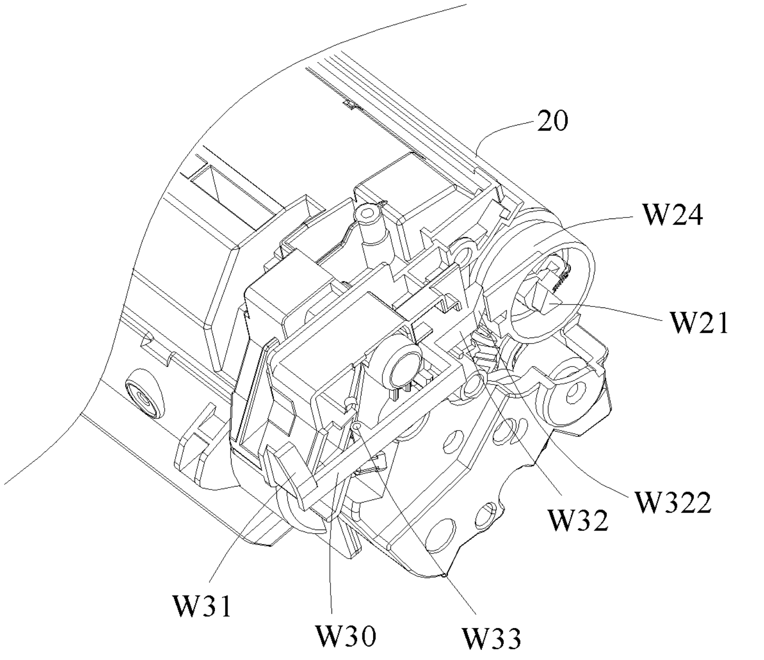

As shown in FIG. 124, the control mechanism W30 may be movably disposed at the end of the cartridge body. For example, the control mechanism W30 may include a first end W31, a second end W32 and a shaft hole W33, where an inclined surface W322 may be configured at the end of the second end W32. Optionally, the control mechanism W30 may be movably connected to the end cover (not shown in drawings) through the shaft hole W33 to be fixed on the cartridge body, such that the control mechanism W30 may swing on the plane perpendicular to the axial direction of the photosensitive drum 20.

In addition, the control mechanism on the process cartridge may also be a force source. When the control mechanism is the force source, the instruction may be obtained by closing the door cover of the electronic image-forming apparatus. Therefore, the instruction may instruct the protruding edge, the force receiving portion and the force transferring part to protrude toward the direction of the driving unit, and the force receiving unit 21 may be controlled to protrude out to a certain stroke and then stop. Optionally, the force source may be a motor, light force, and the like.

For the contact and mess process of the force receiving unit with the driving unit of the electronic image-forming apparatus, when the process cartridge is not installed in the electronic image-forming apparatus or does not receive external force after being installed in the electronic image-forming apparatus, the force receiving unit 21 may be at the initial state, that is, the force receiving portion V22 may protrude relative to the protruding edge V24 along the axial direction of the photosensitive drum 20 under the action of the first elastic part V61.

When the process cartridge 1 is installed in the electronic image-forming apparatus and the door cover is closed, the control mechanism W30 on the process cartridge may be subjected to an external force and swing on the plane perpendicular to the axial direction of the photosensitive drum 20. At this point, the inclined surface W322 on the second end W32 of the control mechanism W30 may move to the position being in contact with the contact surface V2411 of the protruding edge V24. As the control mechanism W30 continues to move, the inclined surface W322 may be successfully abutted against the abutting surface V2411 and apply a force on the protruding edge V24 along the X direction. Since the limiting surface V234 of the force transferring portion V23 is abutted against the accommodation portion V242 of the protruding edge V24, and the clutch part V80 is movably connected to the force receiving portion V23, after the protruding edge V24 receives the force, the force transferring portion V23 together with the force receiving portion V22 and the clutch V80 may move together along the Y4 direction (that is, the direction toward the driving unit 1080). At this point, the force receiving portion V22 may move along the Y4 direction to the position which is abutted against the driving unit 1080 in the electronic image-forming apparatus, that is, the protrusion V221 of the force receiving portion V22 may be locked into the driving unit 1080 in the electronic image-forming apparatus. At this point, the driving unit 1080 in the electronic image-forming apparatus may be still at the inclined state. Meanwhile, as the control mechanism W30 continues to move, the protruding edge V24 may drive the force transferring portion V23 to move along the Y4 direction. However, since the force receiving portion V22 has been connected to the driving unit 1080 at this point, the force receiving portion may not continue to move along the direction of Y4 along with the force transferring portion V23 but may relatively move with the force transferring portion V23 through the groove V231 of the force transferring portion V23, that is, move relative to the protruding edge V24. Meantime, the force receiving portion V22 may translate in the driving unit 1080. In addition, the translation may be relative to the radial direction movement of the driving unit 1080, and when the protrusion V221 of the force receiving portion V22 is abutted against the side of the recessed portion of the driving unit 1080, the driving unit 1080 may be driven to move. Therefore, the driving unit 1080 may move from the initial inclined state to the position where its axis is substantially in parallel or coaxial with the axis of the photosensitive drum 20.

After the control mechanism W30 is moved in place, the position where the protruding edge V24 is abutted against the driving unit protective cover 1081 may no longer move. At this point, the clutch part V80 may also overcome the elastic force of the third elastic part V64 and move to the position in contact with the supporting part V50, the second protrusion V81 of the clutch part V80 may be successfully engaged with the first protrusion V53 of the supporting part V50. At this point, the force receiving portion V22 may also drive the driving unit 1080 to move to the position coaxial with the photosensitive drum 20, thereby realizing the transfer of the driving force between the driving unit 1080 and the photosensitive drum.

After the door cover of the electronic image-forming apparatus is opened, the external force received by the control mechanism V30 may disappear, and at this time, the protruding edge V24 may retract along the direction opposite to the Y4 direction and drive the force transferring part V23 to move together. At this point, the clutch part V80 may also move along the direction opposite to the Y4 direction, the third elastic part V64 may return after losing the force of the clutch part V80, and the force receiving portion V22 may be also dis-engaged from the driving unit 1080. Finally, the force receiving unit 21 may return to the original state, such that the process cartridge may be successfully removed from the electronic image-forming apparatus.

Embodiment Twenty Four

Figure 125:
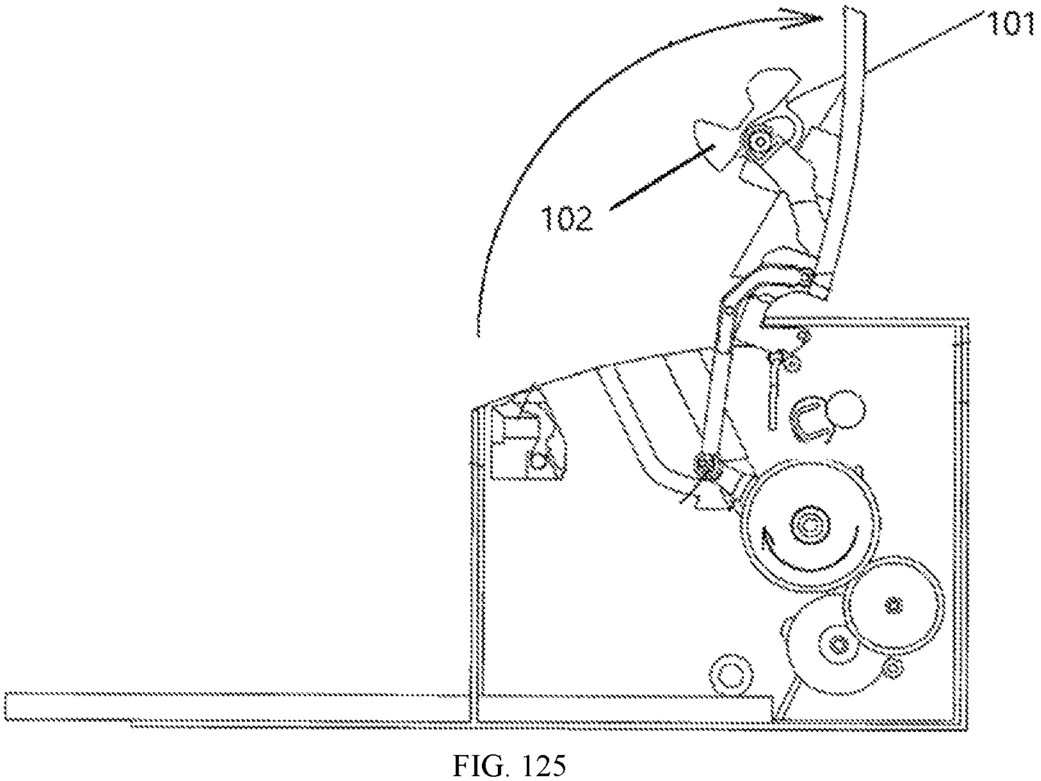

FIG. 125 is a schematic of the electronic image-forming apparatus in embodiment twenty four. As shown in FIG. 125, the electronic image-forming apparatus 100 is provided. The process cartridge 1 may be detachably accommodated in the electronic image-forming apparatus 100. The electronic image-forming apparatus 100 may include an openable and closable door cover 101, a pushing portion 102 cooperated with the door cover 101, and a driving unit 1080 (FIG. 131) which is an output part of the driving force.

Figure 126:
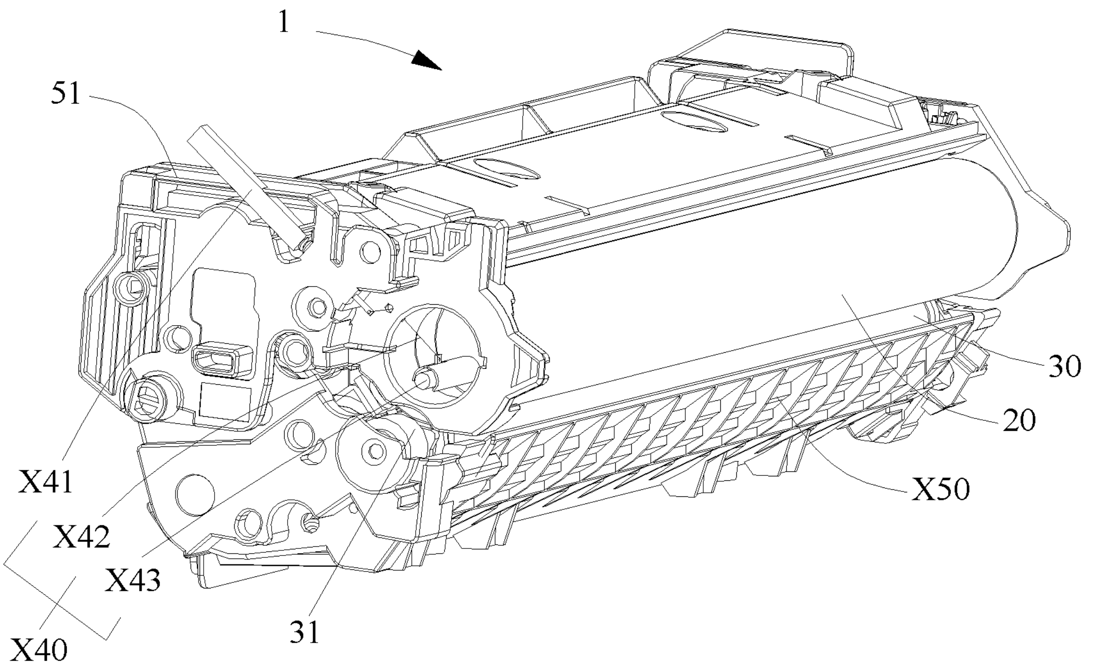

FIG. 126 is a structural schematic of the process cartridge in embodiment twenty four. As shown in FIG. 126, the process cartridge 1 may include a cartridge body X50, a photosensitive drum 20, a developing roller 30, a bracket X51, a pressing part X40 and a force receiving unit. The photosensitive drum 20 and the developing roller 30 may be rotatably disposed at the cartridge body X50, and the bracket X51 may be disposed at the end of the cartridge body X50. The pressing part X40 may be coaxially-aligned with the driving unit 1080, and the force receiving unit may be configured to be engaged with the driving unit 1080 to receive the driving force outputted by the driving unit in the electronic image-forming apparatus, where the cartridge X50 contains developer.

Figure 127:
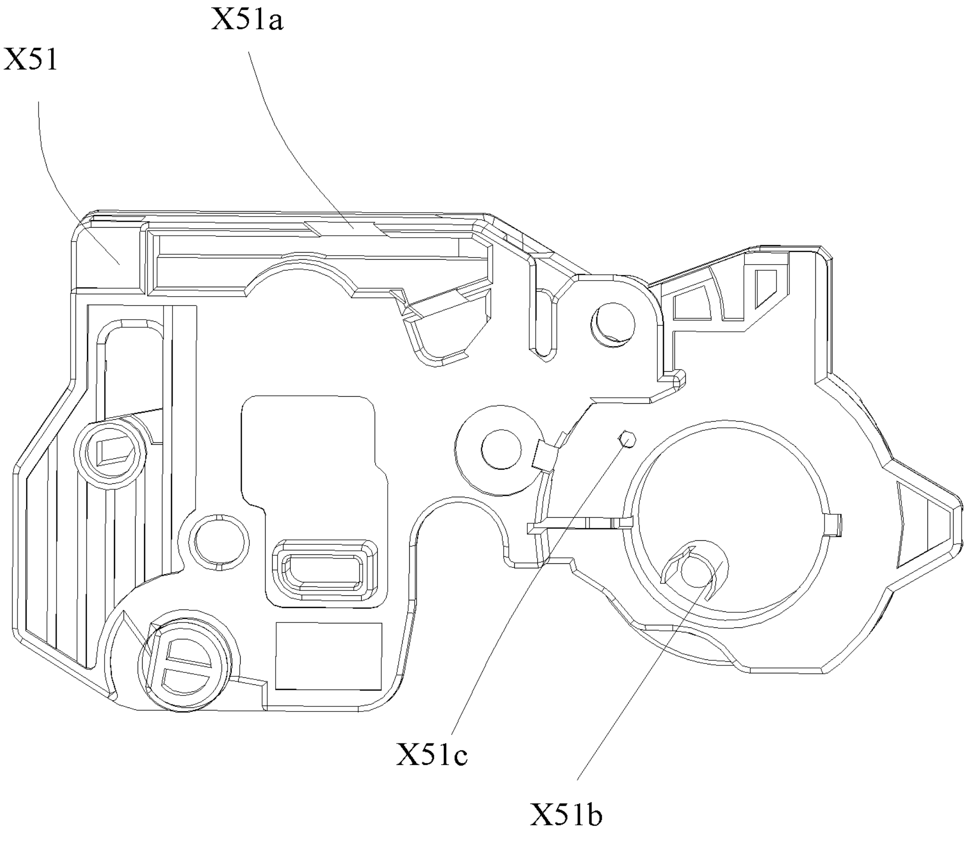

FIG. 127 is a schematic of the bracket of the process cartridge in embodiment twenty four. As shown in FIG. 127, the bracket X51 may be disposed at one side of the cartridge body X50 for installing the pressing part X40, and the bracket X51 may include a chute X51*a*, an installation portion X51*b* and a communication hole X51*c*. A pushing rod X41 may be installed in the chute X51*a*, and the protruding/retracting rod 43 may be sleeved on the installation portion X51*b*.

Figure 128:
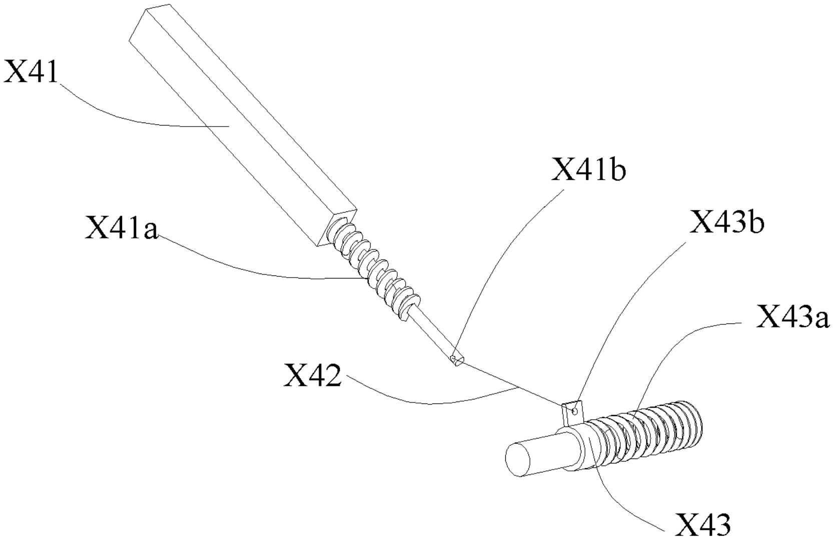

FIG. 128 is a structural schematic of the pressing part in embodiment twenty four. As shown in FIG. 128, the pressing part may include the pushing rod X41, a connecting piece X42, a protruding/retracting part X43, a first elastic part X41*a* and a second elastic part X43*a*. The protruding/retracting part X43 may be movably disposed at the bracket X51 and may move along the axial direction of the photosensitive drum. The pushing rod X41 may be movably installed on the bracket X51 and connected to the protruding/retracting part X43 through the connecting piece X42; and the protruding/retracting part X43 may be driven to move along the photosensitive drum axial direction by the pushing rod X41. The first elastic part X41*a* may be sleeved on the pushing rod X41 for resetting the pushing rod X41. One end of the second elastic part X43*a* may be connected to the protruding/retracting part X43, and the other end of the second elastic part X43*a* may be connected to the inner wall of the installation portion X51*b* for resetting the protruding/retracting part X43. The pushing rod X41 may include a first connecting part X41*b* which may be configured for connecting with one end of the connecting piece X42. The protruding/retracting part X43 may include a second connecting part X43*b* which may be configured for connecting with the other end of the connecting piece X42. It should be noted that, in the present disclosure, the first elastic part X41*a* and the second elastic part X43*a* may be springs and also be other elastically deformable parts. The connecting piece X42 may be a flexible and deformable material. In one embodiment, the double spring structure may be adopted, which may make the reset of the protruding/retracting part X43 more effective and reduce the possibility of interference when the process cartridge is removed.

Figure 129:
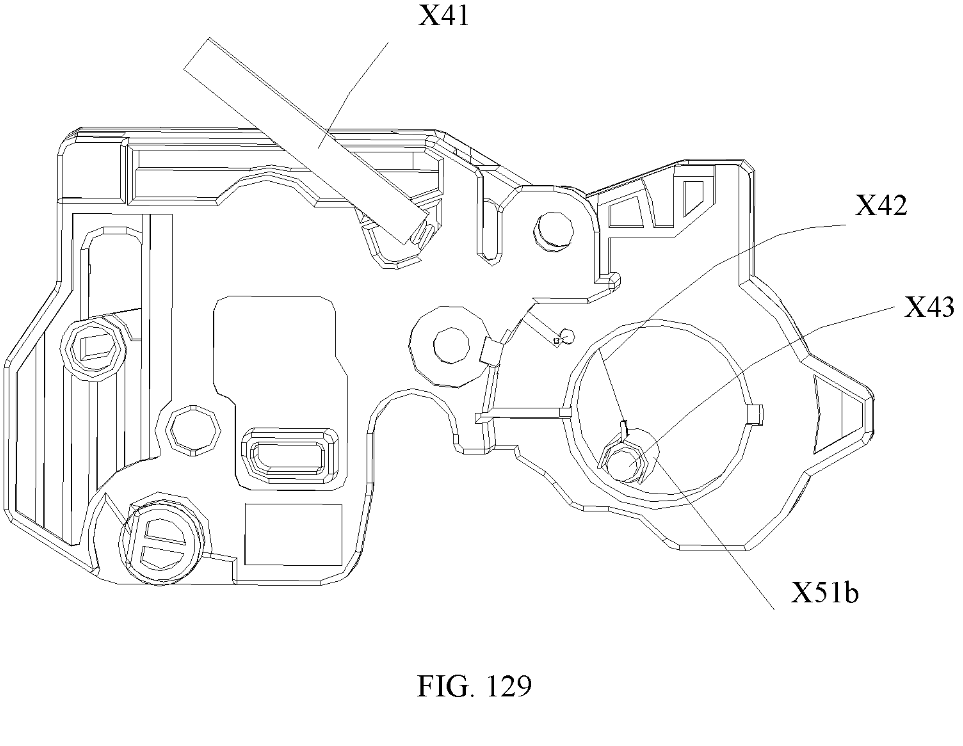

FIG. 129 is a structural schematic of the pressing part installed on the bracket in embodiment twenty four. As shown in FIG. 129, the pushing rod X41 may be installed in the chute X51*a* of the bracket X51; the protruding/retracting element X43 may be sleeved in the installation portion X51*b* of the bracket; and one end of the connecting piece X42 may be installed on the first connecting part X41*b* of the pushing rod X41, and the other end may be connected to the second connecting part X43*b* of the protruding/retracting part X43 through the communication hole X51*c* of the bracket X51. Furthermore, in the installation portion X51*b*, a fixing portion for installing one end of the second spring X43*a* and a cut opening for extending the second connecting part X43*b* may be configured, and the second connecting part X43*b* may slide in the cut opening during the center-alignment process of the driving unit by the protruding/retracting part X43.

Figure 130:
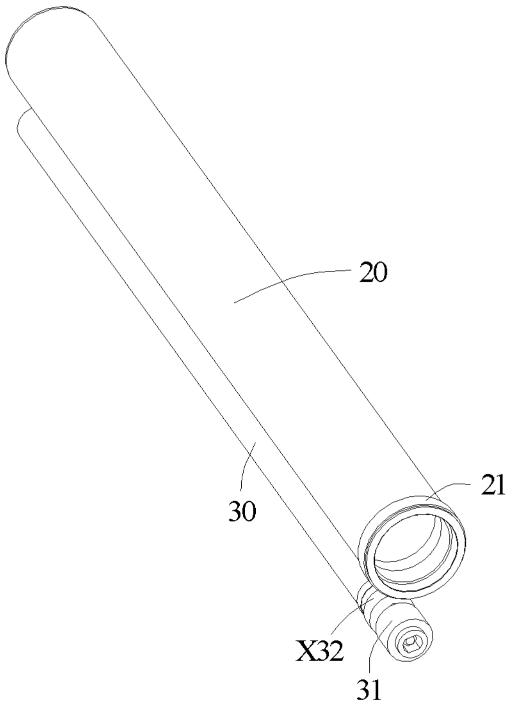

FIG. 130 is a local view of the swing rod in embodiment twenty four. For example, as shown in FIG. 130, the force receiving unit 21 may be disposed at the end of the developing roller 30, configured to be engaged with the driving unit 1080 of the electronic image-forming apparatus to receive the driving force outputted by the driving unit, thereby making the developing roller 30 to rotate. Furthermore, an intermediate gear X32 may be disposed at the developing roller 30, and a photosensitive drum gear X211 may be disposed at the end of the photosensitive drum 20. The photosensitive drum gear X211 may be engaged with the intermediate gear X32 to receive the driving force. Therefore, the photosensitive drum 20 may receive the driving force outputted by the driving unit through the developing roller 30; and the photosensitive drum and the developing roller may perform rotational movement. In one embodiment, the force receiving unit may be a gear.

Figure 131:
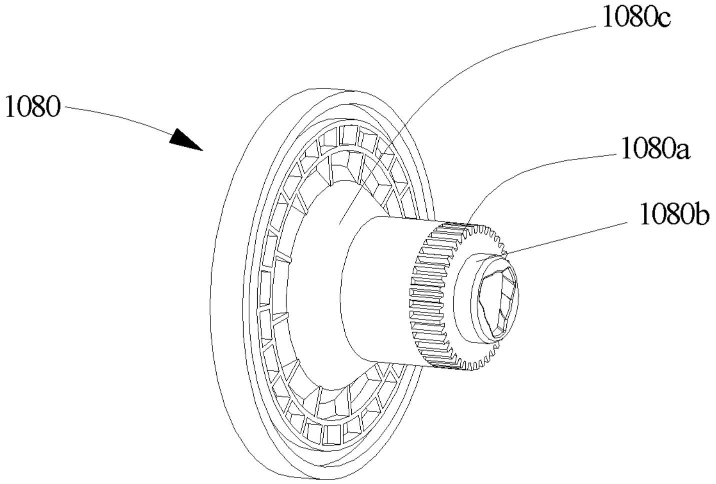

FIG. 131 is a structural schematic of the driving unit of the electronic image-forming apparatus in embodiment twenty four. The driving unit 1080 may include a gear portion 1080*a*, a small-diameter portion 1080*b* and an inclined portion 1080*c*. The gear portion 1080*a* may be engaged with the force receiving unit 21 during the contact and engagement process of the force receiving unit and the driving unit of the electronic image-forming apparatus, and the protruding/retracting rod X43 of the pressing part X40 may protrude out to press the inclined part of the driving unit 1080, thereby achieving the function for center-aligning the driving unit 1080. Detailed center-alignment process is described in detail below.

FIG. 132A is a state schematic of the pressing part and the driving unit of the electronic image-forming apparatus when the process cartridge is at the initial position in embodiment twenty four. When the process cartridge 1 is installed in the electronic image-forming apparatus (not shown), and the door cover 101 of the electronic image-forming apparatus is not closed, at this point, the pressing part X40 of the process cartridge 1 may be at the initial state, and the driving unit 1080 of the electronic image-forming apparatus 100 may be still at the inclined state. As shown in FIG. 132A, the protruding/retracting rod X43 may be also in the retracted state at this point. Such structural schematic may also be configured to describe the change schematic of the process of removing the process cartridge 1 from the electronic image-forming apparatus. When the door cover 101 is opened, the pushing part 102 may no longer push the pushing rod X41. As the first elastic part X41*a* resets its elastic deformation, the pushing rod X41 may be reset, and the connecting piece X42 may be driven to return the protruding/retracting rod X43, and the elastic deformation of the second spring part X43*a* may be reset, such that the protruding/retracting rod X43 may be more effectively reset. Since the front end of the protruding/retracting rod X43 no longer presses the inclined portion 1080*c* of the driving unit 1080, the driving unit 1080 may reset to the inclined state.

FIG. 132B is a state schematic of the pressing part and the driving unit of the electronic image-forming apparatus when the process cartridge is in the center-alignment position in embodiment twenty four. When the door cover 101 is closed, the pushing part 102 may act on the pushing rod X41 of the process cartridge 1, the pushing rod X41 may move forward to compress the first spring X41*a* and simultaneously drive the connecting piece X42 to move. The protruding/retracting rod X43 connected to the connecting piece X42 may be subjected to tension and begin to slide and protrude outward along the cut opening of the installation portion X51*b* and make the spring to stretch and deform. When the front end of the protruding/retracting rod X43 presses the inclined portion X1080*c* of the driving unit 1080, the driving unit 1080 may be coaxially-aligned with the movement of the swing rod X43. As shown in FIG. 132B, the axis of the driving unit 1080 may be perpendicular to the support X51, that is, at the coaxially-aligned state. In one embodiment, when the driving unit 1080 is at the coaxially-aligned state, the gear portion 1080*a* of the driving unit 1080 may be engaged with the force receiving unit 21, and the force receiving unit 21 may transfer the driving force to the photosensitive drum through the intermediate gear X32 and the photosensitive drum gear X211. It should be noted that, during the engagement process of the force receiving unit 21 and the driving unit 1080, the movement of the aligning part relative to the central axis of rotation of the photosensitive drum may not change.

Embodiment Twenty Five

As shown in FIGS. 133-137, another pressing part Y40 in the process cartridge 1 is provided in one embodiment. The pressing part Y40 may be connected to the cartridge body through the elastic part Y60 and located at the same end of the cartridge body as the force receiving unit 21, and a guide surface Y41 (bevel or arc) may be configured at the lower side of the front end (the installation direction of the process cartridge 1) of the pressing part Y40. For example, one end of the elastic part Y60 may be fixed on the bracket Y51, and the other end may be fixed on the pressing part Y40, such that the pressing part Y40 may return to its original state after losing the external force. Optionally, the elastic part Y60 may be a torsion spring or a tension spring. Furthermore, one end of the pressing part Y40 may be sleeved on the photosensitive drum 20, such that the pressing part Y40 may rotate around the axis of the photosensitive drum 20. During the rotation of the pressing part Y40, the distance between at least a part of the structure of the pressing part Y40 and the axis of the photosensitive drum may not change in displacement.

As shown in FIGS. 133 and 134, when the process cartridge 1 is installed in the electronic image-forming apparatus along the Y1 direction, since the pressing part Y40 is in contact with the driving unit protective cover 1081 located above the driving unit 1080 in the electronic image-forming apparatus to form interference, the pressing part Y40 may move along the direction opposite to the YI direction under the force of the driving unit protective cover 1081, and then press the elastic part Y60. Meanwhile, the side end of the process cartridge may move up, such that the process cartridge may be inclined, as shown in FIG. 135. As the process cartridge 1 continues to be installed, the pressing part Y40 may move upward and pass over the driving unit protective cover 1081 to the opening above the driving unit protective cover 1081. At this point, the guide surface Y41 of the pressing part Y40 may be abutted against the driving unit protective cover 1081, and the pressing part Y40 may be smoothly inserted into the opening of the driving unit protective cover 1081 under the guidance of the guide surface Y41 to be in contact with the driving unit 1080. Since the front end of the process cartridge 1 moves downward accordingly to drive the pressing part Y40 to move downward, the front end of the pressing part Y40 may press the driving unit 1080 to move downward to be substantially coaxially with the force receiving unit 21 to receive the driving force. The process cartridge 1 at this point may be successfully installed in place in the electronic image-forming apparatus.

When the process cartridge needs to be removed from the electronic image-forming apparatus after use, optionally, the user may first press down a handle Y70 of the process cartridge (along the counterclockwise direction indicated by the arrow in FIG. 136). At this point, the process cartridge may rotate counterclockwise around the photosensitive drum 20, and the pressing part Y40 relatively fixed to the process cartridge may also move accordingly. Therefore, the pressing part Y40 may avoid the interference of the driving unit protective cover 1081 and may be successfully disengaged from the driving unit protective cover 1081, as shown in FIG. 137. Then, the process cartridge may continue to be pulled out along the direction opposite to the installation direction, and finally the process cartridge may be removed smoothly from the electronic image-forming apparatus.

Embodiment Twenty Six

FIG. 138 is a structural schematic of the process cartridge in embodiment twenty six. As shown in FIG. 138, the process cartridge 1 may include a cartridge body Z50, the photosensitive drum 20, the developing roller 30, a pressing part Z40, and a bracket Z51 disposed on one side of the cartridge body. The developer may be contained in the cartridge body Z50, and the force receiving unit 21 may be disposed at one end of the photosensitive drum 20 for receiving the driving force of the driving unit 1080 to rotate the photosensitive drum 20. At one end of the developing roller 30, the developing roller gear 31 may be also disposed for receiving the driving force outputted by the driving unit to rotate the developing roller 30.

For example, the bracket Z51 may include a fixing column Z511. The pressing part Z40 may be installed on the bracket Z51 through the fixing column Z511, and at least a part of the pressing part Z40 may be located inside the outer peripheral surface of the photosensitive drum 20 along the axial direction of the photosensitive drum 20. When the force receiving unit 21 is in contact and engaged with the driving unit 1080 of the electronic image-forming apparatus, the pressing part Z40 may contact the driving unit 1080 of the electronic image-forming apparatus in the first plane region to center-align the position of the driving unit. In one embodiment, the pressing part may be a torsion spring. For example, the pressing part may be other materials and structures, as long as the pressing part may be movably installed on the bracket. In addition, in the process of engagement the force receiving unit with the driving unit, the pressing part may be always at least partly located in the first plane region, which may not be limited to the material and structure of the present disclosure. The projection of the first planar area may be at least partially coincident with the projection of the photosensitive drum.

FIG. 139 is a structural schematic of the driving unit in the electronic image-forming apparatus. As shown in FIG. 139, the driving unit 1080 may include the gear portion 1080*a* and the drive output portion 1080*b*. The gear portion 1080*a* may be engaged with the developing roller gear 31 of the process cartridge 1, and the driving unit 1080 of the electrophotographic device may be engaged with the force receiving unit 21 during the contact and engagement process of the force receiving unit and the electrophotographic device driving unit.

FIGS. 140-142 are schematics of the process cartridge that the force receiving unit is not in contact and engaged with the driving unit of the electronic image-forming apparatus in embodiment twenty six. As shown in FIGS. 140-142, when the process cartridge 1 is installed in the electronic image-forming apparatus, the pressing part Z40 installed on the bracket may gradually approach the driving unit 1080 as the process cartridge moves. At this point, the pressing part Z40 may be limited by the structure of the electronic image-forming apparatus (structure not shown), and the pressing part Z40 may have an upward state, as shown in FIG. 140. At this point, the pressing part Z40 may be at the position away from the axis of the force receiving unit 21. As shown in FIG. 141, the pressing part Z40 may be in a state of being far away from the driving unit 1080, and the driving unit 1080 may be still at the inclined state. As shown in FIG. 142, when the driving unit is not coaxially-aligned, the axis L1 of the driving unit 1080 may be not in parallel with the axis 2 of the photosensitive drum 20. For example, the drive output portion 1080*b* of the driving unit 1080 may be not aligned with the force receiving unit, that is, the force receiving unit of the process cartridge may be not in contact and engaged with the driving unit of the electronic image-forming apparatus.

FIGS. 143-145 are schematics of the process cartridge that the force receiving unit is in contact and engaged with the driving unit of the electronic image-forming apparatus in embodiment twenty six. When the pressing part Z40 is in contact with the driving unit 1080 to form structural interference, the pressing part Z40 may apply an center-alignment force to the drive output part 1080*b*, and the driving unit 1080 may move along the direction close to the force receiving unit 21 after receiving the center-alignment force; and the pressing part Z40 may have a downward state, and press the driving unit 1080 to be coaxially-aligned, as shown in FIG. 143. At this point, the pressing part Z40 may be at the position close to the axis of the force receiving unit 21. As shown in FIG. 144, the pressing part Z40 may be in a close state to the driving unit 1080, and the driving unit 1080 may be at the coaxially-aligned state. As shown in FIG. 145, when the driving unit is coaxially-aligned, the axis L1 of the driving unit 1080 may be in parallel with the axis L2 of the photosensitive drum 20, that is, coaxial. For example, the drive output portion 1080*b* of the driving unit 1080 may be coaxially-aligned with the force receiving unit 21. That is, the force receiving unit may be in contact and engaged with the driving unit of the electronic image-forming apparatus, such that the driving unit 1080 may transfer the driving force to the force receiving unit 21, and then drive the photosensitive drum 20 to rotate. Meanwhile, the gear portion 1080*a* of the driving unit 1080 may be coaxially-aligned and engaged with the developing roller gear 31, such that the driving force may be transferred to the developing roller gear to drive the developing roller 30 to rotate.

FIG. 146 is a state view of the pressing part in the abutting position and the non-abutting position in embodiment twenty six. As shown in FIG. 146, the dotted line of the pressing part Z40 indicates that the process cartridge 1 may be inserted into the electronic image-forming apparatus. The pressing part Z40 may be limited by the structure of the electronic image-forming apparatus (structure not shown), the pressing part Z40 may have the upward state, that is, the force receiving unit of the process cartridge may be not engaged with the driving unit of the electronic image-forming apparatus. The solid line of the pressing part Z40 indicates that the pressing part Z40 is in contact with the driving unit 1080 to form structural interference, and the pressing part Z40 may press the driving unit 1080 for center-alignment, that is, the force receiving unit 21 may be in contact with the driving unit 1080 of the electronic image-forming apparatus. When the force receiving unit 21 and the driving unit 1080 of the electronic image-forming apparatus move from the non-contact state to the contact and engagement state, the pressing part Z40 may be partially located inside the projected section of the outer peripheral surface of the photosensitive drum 20, that is, the portion of the pressing part Z40 may be located closer to the axis of the photosensitive drum 20.

Embodiment Twenty Seven

FIG. 147 is a schematic of the electronic image-forming apparatus in embodiment twenty seven. As shown in FIG. 147, the electronic image-forming apparatus 100 is provided. The process cartridge 1 may be detachably accommodated in the electronic image-forming apparatus 100. The electronic image-forming apparatus 100 may include the openable and closable door cover 101, the pushing portion 102 cooperated with the door cover 101, and the driving unit (not shown in drawings), which is an output part of the driving force.

FIG. 148 is a structural schematic of the process cartridge in embodiment twenty seven; FIG. 149 is another structural schematic of the process cartridge in embodiment twenty seven. As shown in FIGS. 148 and 149, the process cartridge 1 may include a cartridge body AA50, the photosensitive drum 20, the developing roller 30, a bracket AA51, the force receiving unit 21 and a pressing part AA40. The photosensitive drum 20 and the developing roller 30 may be rotatably disposed at the cartridge body AA50, and the bracket AA51 may be disposed at the end of the cartridge body AA50. The pressing part AA40 may be configured to be engaged with the driving unit 1080 to center-align the driving unit, and the force receiving unit 21 may be configured to receive the driving force outputted by the driving unit in the electronic image-forming apparatus. The developer may be contained in the cartridge body AA50.

FIG. 150 is a local view of the photosensitive drum and the developing roller in embodiment twenty seven. For example, as shown in FIG. 150, the force receiving unit 21 may be disposed at the end of the developing roller and configured to be engaged with the driving unit of the electronic image-forming apparatus to receive the driving force outputted by the force receiving unit, and then make the developing roller 30 to rotate. Furthermore, an intermediate gear AA32 may be disposed at the developing roller 30, and a photosensitive drum gear AA211 may be disposed at the end of the photosensitive drum 20. The photosensitive drum gear AA211 may be engaged with the intermediate gear AA32 to receive the driving force, thereby making the photosensitive drum 20 to rotate. In one embodiment, the force receiving unit may be a developing roller gear.

FIG. 151 is a local view of the bracket in embodiment twenty seven. As shown in FIGS. 151-153, the bracket AA51 may be disposed at one end of the cartridge body AA50 and configured for installing the pressing part AA40. Furthermore, the bracket AA51 may include a chute AA51*a* and an installation portion AA51*b*, and the pressing part AA40 may include a pushing rod AA41, a connecting piece AA42 and a swing rod AA43. The pushing rod AA41 may be movably installed in the chute AA51*a*, the swing rod AA43 may be rotatably installed in the installation portion AA51*b*. In addition, the pushing rod AA41 may be connected to the swing rod AA43 through the connecting piece AA42, and the pushing rod AA41 may drive the swing rod AA43 to swing. The position of the driving unit may be coaxially-aligned in the first plane region by the swing rod AA43; and on the plane perpendicular to the axial direction of the photosensitive drum, the projection of the first plane region and the projection of the photosensitive drum may be at least partly overlapped with each other.

FIG. 152 is a local view of the swing rod in embodiment twenty seven. As shown in FIG. 152, the swing rod AA43 may include a first connecting portion AA43*a*, a second connecting portion AA43*b* and an abutting portion AA43*c*. The first connecting portion AA43*a* may be connected to the installation portion AA51*b* of the bracket AA51, the second connecting portion AA43*b* may be connected to one end of the connecting piece AA42, and the abutting portion AA43*c* may realize the center-alignment of the driving unit 1080 during movement.

FIG. 153A is a schematic of the pressing part of the process cartridge being disposed at the bracket in embodiment twenty seven; FIG. 153B is another schematic of the pressing part of the process cartridge being disposed at the bracket in embodiment twenty seven. As shown in FIG. 153A, the process cartridge may further include the first connecting portion AA43*a*, and the first connecting portion AA43*a* of the swing rod AA43 may be installed on the bracket AA51. The second connecting portion AA43*b* may be connected to the inner wall of the installation portion AA51*b* through the first elastic part AA51*a*, and the swing rod AA43 may be reset through the first elastic part AA51*a*, that is, the swing rod AA43 may return from the center-alignment position to the initial position. As shown in FIG. 153B, the process cartridge may further include a second elastic piece AA42*a*. Another second connecting portion AA43*b* may be connected to one end of the connecting piece AA42, and the connecting piece AA42 may be connected to the pushing rod AA41 through the second elastic piece AA42*a*. The second elastic piece AA42*a* may be configured for buffering, which may prevent excessively strong force of the pushing rod AA41 from affecting the center-alignment. In one embodiment, the pushing rod AA41, the connecting portion AA42 and the swing rod AA43 may be connected together to form the pressing part AA40, and the movement change process of the pressing part AA40 is described in detail subsequently.

FIG. 154A is a state schematic of the pressing part and the driving unit of the electronic image-forming apparatus when the process cartridge is at the initial position in embodiment twenty seven. When the process cartridge 1 is installed in the electronic image-forming apparatus (not shown), the door cover 101 of the electronic image-forming apparatus may not be closed yet. At this point, the pressing part AA40 of the process cartridge 1 may be at the initial state, and the driving unit 1080 of the electronic image-forming apparatus 100 may be still at the inclined state. As shown in FIG. 154A, the swing bar AA43 may be also at the inclined state at this point.

FIG. 154B is a state schematic of the pressing part and the driving unit of the electronic image-forming apparatus when the process cartridge is in the center-alignment position in embodiment twenty seven. When the door cover 101 is closed, the pushing part 102 may act on the pushing rod AA41 of the process cartridge 1, and the pushing rod AA41 may move forward to drive the connecting piece AA42 to move. At this point, the swing rod AA43 connected to the connecting piece AA42 may be subjected to a pulling force and start to protrude outward. When the abutting portion AA43*c* is abutted against the recessed portion of the driving unit 1080, the driving unit 1080 may be coaxially-aligned with the movement of the swing rod AA43. As shown in FIG. 154B, the driving unit 1080 may be vertical relative to the bracket AA51, that is, at the coaxially-aligned state. In one embodiment, when the driving unit 1080 is at the coaxially-aligned state, the gear portion 1080*b* of the driving unit may be engaged with the force receiving unit 21, and the force receiving unit 21 may transfer the driving force to the photosensitive drum through the intermediate gear AA32 and the photosensitive drum gear AA211. It should be noted that, during the engagement process of the force receiving unit 21 and the driving unit 1080, the pressing part AA40 may be partially located inside the projected section of the outer peripheral surface of the photosensitive drum 20.

Embodiment Twenty Eight

A structure of a process cartridge is provided in one embodiment. Compared with embodiment twenty two and embodiment twenty three, a control mechanism may not be disposed on the process cartridge in one embodiment. Referring to FIG. 154C, for example, the process cartridge of one embodiment may include the cartridge body, the developing roller 30, the photosensitive drum 20 and the first gear CC32. The developing roller 30 and the photosensitive drum 20 may be rotatably disposed at the cartridge body. The first gear CC32 may be disposed at one end of the developing roller 30, and the gear disposed at one end of the developing roller 30 may be engaged with the gear disposed at one end of the photosensitive drum 20. When the process cartridge is installed in the electronic image-forming apparatus, the first gear CC32 may be abutted against the gear portion 1080*a* of the driving unit of the electronic image-forming apparatus, such that the developing roller 30 may be engaged with the gear portion 1080*a* of the driving unit through the first gear CC32. Therefore, the driving unit of the electronic image-forming apparatus may transfer the driving force to the developing roller 30 obliquely through the engagement, such that the developing roller 30 may rotate. The photosensitive drum 20 may be then driven to rotate by the developing roller 30 without moving the driving unit of the electronic image-forming apparatus from the initial inclined state to the position where its axis is substantially in parallel or coaxial with the axis of the photosensitive drum. Along the axial direction of the developing roller 30, at least a part of the first gear CC32 may protrude from the end of the photosensitive drum 20.

Furthermore, the first gear CC32 may be disposed at the end of the developing roller 30 and rotate coaxially with the developing roller 30, the first gear CC32 may be a bevel tooth structure, (as shown in FIG. 154C). Optionally, the upper teeth may be designed as helical teeth to better adapt to being engaged with the helical teeth of the driving unit of the electronic image-forming apparatus.

In one embodiment, the force receiving unit at the end of the photosensitive drum may not need to be engaged with the driving unit of the electronic image-forming apparatus for transfer, so that the structure of the force receiving unit may also be omitted. At this point, at the driving end or the non-driving end, the photosensitive drum and the developing roller may be engaged by setting mutually cooperated transfer gears at the ends of the photosensitive drum and the developing roller. In such way, the photosensitive drum may receive the driving force outputted by the driving unit of the electronic image-forming apparatus received by the first gear through the developing roller. Furthermore, the process cartridge may further include a second gear 31 and a third gear CC211. The second gear 31 may be disposed at one end of the developing roller 30, the third gear CC211 may be disposed at one end of the photosensitive drum 20, and the third gear CC211 may be engaged with the second gear 31, such that the driving force received by the first gear CC32 may be transferred to the photosensitive drum 20 through the second gear 31 and the third gear CC211.

In another embodiment, the first gear CC32 may be disposed at one end of the photosensitive drum 20, such that the photosensitive drum may receive the driving force outputted by the inclined driving unit through the first gear, and further transfer the driving force to the developing roller through the form of above-mentioned transfer gear. For example, when the process cartridge is installed in the electronic image-forming apparatus, the photosensitive drum may be engaged with the driving unit in the electronic image-forming apparatus through the first gear, such that the photosensitive drum and the developing roller may receive the driving force outputted by the electronic image-forming apparatus.

Embodiment Twenty Nine

FIG. 155 is a structural schematic of the process cartridge in embodiment twenty nine, and FIG. 156 is a local schematic of the first gear in embodiment twenty nine. As shown in FIGS. 155 and 156, the process cartridge 1 may include a cartridge body CC50, the photosensitive drum 20, the developing roller 30, a pressing part CC40, the force receiving unit 21, a first gear CC32 and a cartridge body CC50. The developer may be accommodated in the cartridge CC50, and the cartridge CC50 may include a bracket CC51. The photosensitive drum 20 and the developing roller 30 may be rotatably disposed in the cartridge CC50. The force receiving unit 21 may be disposed at one end of the photosensitive drum 20 and include a force receiving portion CC21*a* for receiving the driving force outputted by the driving unit 1080 of the electronic image-forming apparatus to rotate the photosensitive drum 20. The first gear CC32 may be disposed at the end of the developing roller 30 and located at the same end of the cartridge body CC50 as the force receiving unit 21 and may be configured for being engaged with the gear portion of the driving unit 1080 of the electronic image-forming apparatus, thereby driving the driving unit 1080 to move toward the force receiving unit 21, such that the driving unit 1080 may be in contact and engaged with the force receiving unit 21. Along the axial direction of the developing roller 30, at least a part of the first gear CC32 may protrude from the end of the photosensitive drum 20.

Furthermore, the pressing part CC40 may be fixedly installed on the bracket CC51 and located at the same end of the cartridge body CC50 as the force receiving unit 21. In the projection plane of the axial direction of the photosensitive drum, at least a part of the pressing part CC40 may be located inside the projected section of the photosensitive drum 20 along the axial direction. For example, on the projection plane perpendicular to the axis of the photosensitive drum 20, at least a part of the pressing part CC40 may be located inside the photosensitive drum 20. The pressing part CC40 may include the pressing part which refers to a part where the pressing part CC40 is in contact with the driving unit. During the process of the force receiving unit 21 contacting and being engaged with the driving unit of the electronic image-forming apparatus, the pressing part CC40 may be in contact with the driving unit 1080 to realize the center-alignment of the driving unit, that is, the driving unit of the electronic image-forming apparatus may be coaxially-aligned by the pressing part CC40. The center-alignment position of the driving unit refers to the position that the axis of the driving unit is substantially in parallel or coaxial with the axis of the photosensitive drum.

In one embodiment, the pressing part CC40 may be integrally formed with the bracket. It may be understood that, in other embodiments, the pressing part may also be fixed on the bracket by being movably connected to the bracket; and the driving unit 1080 may be moved between the inclined position and the aligned position through the pressing part CC40. That is, when the process cartridge is just installed in the electronic image-forming apparatus, the driving unit 1080 may be inclined relative to the axis of the photosensitive drum, and the pressing part of the pressing part CC40 may be abutted against the driving unit 1080. When continuing to install the process cartridge, the pressing portion of the pressing part CC40 may apply force on the driving unit 1080, such that the driving unit 1080 may reach the coaxially-aligned position, and the pressing part CC40 may have a certain displacement relative to the photosensitive drum.

Referring to FIG. 156, the first gear CC32 may include protrusions CC32*a* which may be helically distributed. When the driving unit 1080 of the electronic image-forming apparatus is engaged with the first gear CC32, the first gear CC32 may drive the driving unit 1080 to move toward the side of the force receiving unit 21, such that the driving unit 1080 of the electronic image-forming apparatus may be in contact and engaged with the force receiving unit 21.

FIG. 157 is a structural schematic of the driving unit in the electronic image-forming apparatus. As shown in FIG. 157, the driving unit 1080 of the electronic image-forming apparatus may include the gear portion 1080*a*, the small-diameter portion 1080*b*, and the drive output portion 1080*c*. The force receiving unit 21 may be in contact and engaged with the driving output portion 1080*c* of the driving unit 1080 during the rotational engagement process of the gear portion 1080*a* and the first gear CC32 of the process cartridge 1.

FIG. 158A is a schematic of the process cartridge that the force receiving unit of the photosensitive drum is not in contact and engaged with the driving unit in the electronic image-forming apparatus in embodiment twenty nine. As shown in FIG. 158A, the process cartridge 1 may further include the third gear CC211 and the second gear 31. The third gear CC211 may be disposed at one end of the photosensitive drum 20, the second gear 31 may be disposed at one end of the developing roller 30; and the second gear 31 may be engaged with the third gear CC211. In such way, the force receiving unit 21 may transfer the driving force of the driving unit 1080 of the electronic image-forming apparatus to the third gear CC211, and then the third gear CC211 may transfer the driving force to the second gear 31, thereby driving the developing roller 30 to rotate. In one embodiment, the third gear CC211 may be integrally formed with the force receiving unit 21.

In the process of installing the process cartridge 1 to the electronic image-forming apparatus, initially, the pressing part CC40 installed on the bracket may gradually approach the driving unit 1080 of the electronic image-forming apparatus as the process cartridge moves but may not in contact with the small-diameter portion of the driving unit 1080, as shown in FIG. 158A. At this point, the pressing part CC40 may be far away from the driving unit 1080, the driving unit 1080 may be still at the inclined state, and the gear portion 1080*a* of the driving unit 1080 may be not in contact with the protrusion CC32*a* of the first gear CC32. Furthermore, when the driving unit of the electronic image-forming apparatus is not at the coaxially-aligned position, the axis L1 of the driving unit 1080 may be not in parallel with the axis L2 of the photosensitive drum 20. For example, the drive output portion 1080*b* of the driving unit 1080 of the electronic image-forming apparatus may be not coaxially-aligned with the force receiving unit, that is, the force receiving unit 21 of the process cartridge may be not engaged with the driving unit 1080 of the electronic image-forming apparatus.

When installation is continued and the pressing part CC40 is in contact with the driving unit 1080 of the electronic image-forming apparatus to form structural interference, the pressing part CC40 may apply the alignment force on the driving unit 1080 of the electronic image-forming apparatus, and the pressing part CC40 may have a downward state and press the driving unit 1080 to be coaxially-aligned, as shown in FIG. 158B. At this point, the pressing part CC40 may be in a close state to the driving unit 1080 of the electronic image-forming apparatus, and the driving unit 1080 of the electronic image-forming apparatus may be at the coaxially-aligned state. When the driving unit 1080 is at the coaxially-aligned state, the axis L1 of the driving unit 1080 may be in parallel with the axis L2 of the photosensitive drum 20, that is, in coaxial. In such state, the gear portion 1080*a* of the driving unit 1080 may be engaged with the first gear CC32.

The gear portion 1080*a* of the driving unit 1080 may be a helical tooth, and the protrusions CC32*a* of the first gear CC32 may be also helically distributed. Therefore, when the driving unit 1080 is engaged with the first gear CC32*a* to rotate, the driving unit 1080 may move toward the force receiving unit 21.

For example, the drive output portion 1080*c* of the driving unit 1080 of the electronic image-forming apparatus may be coaxially-aligned with the force receiving portion CC21*a* of the force receiving unit 21. That is, the force receiving unit may be in contact and engaged with the driving unit, such that the driving unit 1080 may transfer the driving force to the force receiving unit 21. Therefore, the photosensitive drum 20 may be driven to rotate, and then the driving force may be transferred to the developing roller 30 through the third gear CC211 and the second gear 31 to realize the rotation of the developing roller 30.

FIG. 159 is a schematic of the contact force between the driving unit and the first gear in the electronic image-forming apparatus in embodiment twenty nine. As shown in FIG. 159, when the driving unit 1080 of the electronic image-forming apparatus is in the engagement/rotation state with the first gear CC32, the engagement of the helical teeth of the gear portion 1080*a* of the driving unit 1080 with the projection CC32*a* of the first gear CC32 may generate the axial force F1, and the driving unit 1080 may tend to move to the side close to the force receiving unit 21 under the action of the axial force F1. That is, the driving unit 1080 may approach and be in contact with the force receiving portion CC21*a* of the force receiving unit 21. Meanwhile, the first gear CC32 may be subjected to the action of the axial force F2 due to the engagement, such that the first gear CC32 may tend to move to the side away from the force receiving unit 21. Since the first gear CC32 is limited by the structure of the process cartridge 1, the first gear CC32 may not move axially.

Embodiment Thirty

An electronic image-forming apparatus is provided in embodiments of the present disclosure. The electronic image-forming apparatus may include a process cartridge, a driving unit, and a driving unit protective cover; and the driving unit protective cover may be disposed outside the driving unit.

The electronic image-forming apparatus may be a printer, a copier, an all-in-one scanning and copying machine and the like, which may not be limited herein. The printer is used as an example to describe the solutions hereinafter. The process cartridge may be a toner cartridge, an ink cartridge, or the like.

FIG. 160 is a structural schematic of the electronic image-forming apparatus before the pressing part is installed according to embodiments of the present disclosure, and FIG. 161*a* is a local enlarged view of area A shown in FIG. 160.

As shown in FIG. 160 and FIG. 161A, the driving unit protective cover 1081 may be disposed outside the driving unit 1080. Before the pressing part is installed, the driving unit 1080 may be supported by a driving head pushing part (not shown) in the electronic image-forming apparatus and at an inclined state, and the rotation axis L1 of the driving unit 1080 may form an angle α with the central axis L2 of the driving unit protective cover 1081.

FIG. 161B is a structural schematic of the process cartridge according to embodiments of the present disclosure. As shown in FIG. 3, the process cartridge 1 may include the cartridge body A10 containing a developer, the photosensitive drum 20, the developing roller 30, the bracket A11 and the force receiving unit 21. The force receiving unit 21 may be disposed at one end of the photosensitive drum 20. The force receiving unit 21 may be movably connected to the driving unit 1080. In one embodiment, the force receiving unit 21 may be engaged with the driving unit 1080 to receive the driving force of the driving unit.

In the present disclosure, the end of the process cartridge with the force receiving unit is defined as the drive end, and the end of the process cartridge 1 with the conductive unit (not shown) is defined as the force end.

For example, the bracket A11 may include the first fixing column A111 and the through hole A112. The force receiving unit 21 may be fixed on the bracket A11 through the through hole A112 and exposed outside the through hole A112, thereby receiving the driving force of the driving unit 1080 of the electronic image-forming apparatus (not shown in drawings); and the first fixing column A111 may be disposed above and/or in front of the force receiving unit 21 relative to the axial direction of the photosensitive drum 20.

In order to change the driving unit 1080 of the electronic image-forming apparatus from the inclined state at the initial position to the horizontal state capable of being engaged with the force receiving unit 21, embodiments of the present disclosure provide a pressing part of the electronic image-forming apparatus, which may be configured in conjunction with the process cartridge. The pressing part may be detachably installed in the electronic image-forming apparatus; and may be used alone in the electronic image-forming apparatus and may also work in the electronic image-forming apparatus in cooperation with process cartridges of different structures.

FIG. 162 is a structural schematic of the pressing part according to embodiments of the present disclosure. As shown in FIG. 162, the pressing part DD40 may be independently and detachably installed on the driving unit protective cover 1081. The pressing part DD40 may include a first main body portion DD41, a deformable portion DD42 connected to the first main body portion DD41, and a pressing portion DD44.

In some embodiments, overall shape of the pressing part DD40 may be a ring plate. In other embodiments, the pressing part DD40 may also be in other shapes, as long as the pressing part does not limit the installation and operation of the process cartridge. Moreover, all structures included in the pressing part DD40 may be integrally formed or may be connected as a whole through a snap-fit structure, welding or other connection manners, which may not be limited herein.

The driving unit protective cover 1081 may include an arc-shaped side wall, the first main body portion DD41 of the pressing part DD40 may be in the shape of a ring plate, and the first main body portion DD41 may be cooperated with the side wall of the driving unit protective cover 1081. The first main body portion DD41 may be made of thin sheet metal or plastic part. The present disclosure does not limit its material, as long as the material does not affect the installation, deformation and restoration of the deformable portion DD42.

The deformable portion DD42 may be connected to the first main body portion DD41. When the pressing part DD40 is abutted against the driving unit 1080, the deformable portion DD42 may deform and drive the driving unit 1080 to be adjusted from the inclined state to the coaxially-aligned state. It should be noted that, when the driving unit 1080 in the present disclosure is at the coaxially-aligned state, the rotation axis L1 of the driving unit 1080 may be substantially coincident with the central axis L2 of the driving unit protective cover 1081, that is, the angle α may be zero or close to zero.

In one embodiment, the deformable portion DD42 may be an arc-shaped elastic part. The deformation of the deformable portion DD42 may be generated by its own flexible force or achieved by disposing an elastic part on the pressing part DD40. The elastic part may be a spring or a magnet with a certain elastic force (which may drive the driving unit 1080 to be coaxially-aligned). Exemplarily, the elastic part may be an elastic part, one end of the elastic part may be connected to the main body DD42, and the other end may be connected to the deformable portion DD42, such that the deformable portion DD42 may be deformed.

The deformable portion DD42 may be connected to the pressing part DD44, and the pressing part DD40 may be in contact with the driving unit 1080 through the pressing part DD44. For example, the pressing part DD44 may be a surface structure, or a line structure disposed on the deformable portion DD42. Exemplarily, the pressing portion DD44 may be an arc-shaped surface protruding toward the direction approaching the driving unit 1080.

During practical application, the pressing part DD40 may be abutted against the driving unit 1080 through the pressing portion DD44 and make the driving unit 1080 to be adjusted from the inclined state to the coaxially-aligned state. When the pressing part DD44 of the pressing part DD40 is abutted against the driving unit 1080, the deformable portion DD42 may be deformed. Under the deformation force of the deformable portion DD42, the pressing part DD40 may drive the driving unit 1080 to be adjusted from the inclined state to the coaxially-aligned state, and the deformation of the deformable portion DD42 may be restored.

In some embodiments, the pressing part DD40 may further include an abutting portion DD43 which may be located at an end of the deformable portion DD42 away from the first main body portion DD41. For example, the contact portion DD43 may be formed by bending from one end of the deformable portion DD42. The abutting portion DD43 may be abutted against the driving unit protective cover 1081.

When the driving unit 1080 is at the coaxially-aligned state, the contact portion DD43 may be in contact with the driving unit protective cover 1081, such that the pressing portion DD44 may be no longer in contact with the driving unit 1080. Therefore, the driving unit 1080 may not generate friction or even interfere with the pressing part DD40 when the driving unit rotates. Hence, the pressing part DD40 provided in the present disclosure may not affect the rotation of the driving unit 1080, avoid frictional damage between the pressing part DD40 and the driving unit 1080 and improve the service life of the pressing part DD40.

In order to improve installation stability of the pressing part DD40 and the driving unit protective cover 1081, as shown in FIG. 162, the pressing part DD40 may further include a fixing portion. The pressing part DD40 may be detachably installed on the driving unit protective cover through the fixing portion.

For example, the fixing portion may include a first fixing end DD45 and a second fixing end DD46 formed by bending along two ends of the first main body portion DD41. The pressing part DD40 may be clamped on the side wall of the driving unit protective cover 1081 through the first fixed end DD45 and the second fixed end DD46. The first fixed end DD45 and the second fixed end DD46 may be hook structures.

FIG. 163 is a structural schematic of the electronic image-forming apparatus after the pressing part is installed provided by the present disclosure; FIG. 164 is a local enlarged view of area B shown in FIG. 163; and FIG. 165 is a schematic of the installation structure between the pressing part and the driving unit protective cover provided by the present disclosure. As shown in FIGS. 163-165, the driving unit protective cover 1081 may be recessed along the axial direction to form a groove. In one embodiment, the groove may include the first groove 1081*a* and the second groove 1081*b* disposed at intervals. The first groove 1081*a* may include the first end wall 10811; and the second groove 1081*b* may include the second end wall 10812. The first fixed end DD45 may be abutted against the first end wall 10811, and the second fixed end DD46 may be abutted against the first end wall 10812, such that the pressing part may be installed on the driving unit protective cover 1081.

In one embodiment, the first fixed end DD45 and the second fixed end DD46 may be hook structures, and detachably connected to the driving unit protective cover 1081 through the hook structures, which may be convenient for installation and replacement.

In order to further improve the stability of overall structure, the first end wall 10811 and the second end wall 10812 may also be disposed with ribs. Correspondingly, the first fixed end DD45 and the second fixed end DD46 may be disposed with protrusions or grooves, such that the lock connection may be more stable.

In other embodiments, the first end wall 10811 and the second end wall 10812 may also be walls extending along the axial direction of the driving unit protective cover 1081, or other optional side walls, which may not be limited herein. The fixing of the pressing part DD40 on the driving unit protective cover 1081 along the direction of the axis L2 may not be limited. For example, the width dimension of the first main body portion DD41 of the pressing part DD40 may be adjusted to be closely cooperated with the axial dimension of the driving unit protective cover 1081, thereby avoiding the axial shaking of the pressing part DD40 on the driving unit protective cover 1081.

As shown in FIGS. 163 and 164, before the pressing part DD40 is separately installed in the printer, at this point, the door cover of the printer may be at the open state, and the driving unit 1080 may not be coaxially-aligned by external force but still keep the inclined state. At this point, the pressing part DD40 may be manually installed on the driving unit protective cover 1081.

As shown in FIGS. 163 and 165, when the pressing part DD40 is sent in the printer along the direction of the arrow M in FIG. 163 and touches the top of the driving unit protective cover 1081, by applying a certain pressing force to the pressing part DD40, the first fixed end DD45 may be locked with the first end wall 10811 of the driving unit protective cover 1081, and the second fixed end DD46 may be locked with the second end wall 10812 of the driving unit protective cover 1081. As shown in FIG. 164, the pressing part DD40 may be in contact with the driving unit 1080 through the pressing part DD44. Since the door cover is not closed, the pressing part DD40 may be abutted against the driving unit 1080 at the inclined state. Since the portion of the driving unit 1080 obliquely deviated from the periphery of the driving unit protective cover 1081 may be abutted against the pressing portion DD44, the deformable portion DD42 may be adaptively deformed and keep the deformed state. At this point, the deformation restoration force generated by the deformation of the deformable portion DD42 may be always applied to the driving unit 1080, overall state of the pressing part DD40 may be the first state, and the driving unit 1080 may be adjusted from the inclined state to the coaxially-aligned state.

Furthermore, in order to facilitate installation and cooperation with the process cartridge, the process cartridge provided by the present disclosure may further include a cartridge pressing part AB40, which may be disposed at one end of the process cartridge.

FIG. 166 is a local structural schematic of the printer according to embodiments of the present disclosure, FIG. 167 is a local enlarged schematic of area C shown in FIG. 166, and FIG. 168 is a structural schematic of the process cartridge according to embodiments of the present disclosure. As shown in FIGS. 166-168, the process cartridge provided by the present disclosure may be any process cartridge capable of being cooperated with the pressing part, and the present disclosure does not limit specific structure of the process cartridge. As shown in FIG. 168, in some embodiments, the process cartridge may include a swingable cartridge pressing part AB40. In addition, the process cartridge according to one embodiment may not have any pressing structure such as the cartridge pressing part AB40, so the pressing part in one embodiment may have universal applicability in cooperated with the process cartridge.

For example, when the process cartridge in FIG. 168 is installed in the printer, the installation direction may be same as the installation direction of above-mentioned pressing part DD40, that is, the process cartridge may be sent into the electronic image-forming apparatus along the direction of arrow M. As shown in FIGS. 166 and 167, the installed process cartridge may be at the position of the pressing part DD40. The cartridge pressing part AB40 may be directly above the pressing part DD40, for example, adjoined on the pressing part DD40. At this point, since the thickness of the pressing part DD40 of one embodiment along the direction of the vertical axis L2 is sufficiently small, the pressing part DD40 may not affect the cartridge pressing part AB40 and the function on the process cartridge, that is, the process cartridge may be applied to various structures.

Furthermore, the working state of the process cartridge is described herein. As shown in FIG. 169, when the door cover of the printer is closed, the driving unit 1080 may be at the state that the driving unit may be swung by an external force. Then, the deformation restoration force of the deformable portion DD42 applied to the driving unit 1080 may drive the driving unit 1080 to be adjusted from the inclined state to the coaxially-aligned state; and as the driving unit 1080 is inclined, the photosensitive drum force receiving head (not shown) on the process cartridge may be gradually engaged with the driving unit 1080. At this point, the restoration of the deformable portion DD42 may move the abutting portion DD43 to be abutted against the driving unit protective cover 1081. Therefore, the pressing part DD44 may be no longer in contact with the driving unit 1080, such that the driving unit 1080 may not generate friction or even interfere with the pressing part DD40 when rotating. At this point, the state may be the second state of the pressing part DD40, and subsequent normal printing work may be performed.

Embodiment Thirty One

A pressing assembly is provided in one embodiment, which is a further improvement on the basis of embodiment thirty. Undescribed parts may be same as those in the previous embodiments, which may not be described in detail for brevity.

FIG. 170 is a structural schematic of the pressing assembly according to embodiments of the present disclosure. As shown in FIG. 170, the pressing assembly EE90 is provided in one embodiment. The pressing assembly EE90 may be independently and detachably installed on the driving unit protective cover 1081. The pressing assembly EE90 may include a frame EE91 and a pressing part EE40 connected to the frame EE91.

In some embodiments, along the length direction of the frame EE91, the frame EE91 may include a first end EE92 and a second end EE93. The first end EE92 of the frame EE91 may be connected to the pressing part EE40, and the second end EE93 of the frame EE91 may be detachably connected to the end wall (not shown) of the process cartridge accommodating chamber in the electronic image-forming apparatus.

In order to facilitate the installation of the pressing assembly E90, the pressing assembly EE90 may be adapted to the width of the process cartridge accommodating chamber in the printer main body. When the pressing assembly EE90 is installed in the printer main body, the first end EE92 and the second end EE93 of the frame EE91 may be respectively connected to two end walls of the process cartridge accommodating chamber of the electronic image-forming apparatus (e.g., printer). In some embodiments, the frame may be set up on corresponding structures on two end walls of the process cartridge accommodating chamber of the printer.

For example, the structure of the pressing part EE40 may be same as that of the pressing part DD40 described in embodiment one, and same installation manner may be configured to install the pressing part on the driving unit protective cover 1081 located on the inner side of the printer body, which may not be described in detail herein.

The first end EE92 of the frame EE91 may be bent to form the first fixing portion EE921, and the second end EE93 of the frame EE91 may be bent to form the second fixing portion EE931. The first fixing portion EE921 (first end) and the second fixing portion EE931 (second end) may form a stepped shape. In some embodiments, the frame EE91 may be a plastic part, a sheet metal part, or an elastically deformable part, and its thickness, optionally, may not affect the installation of the process cartridge and coexistence with the process cartridge. When the deformable part is selected for the frame, it may avoid the installation of the process cartridge and may not affect the operation of the process cartridge.

The first end EE92 of the frame EE91 may be connected to the pressing part EE40 through the first fixing portion EE921. The second end EE93 of the frame EE91 may be detachably connected to the connection structure on the end wall of the electronic image-forming apparatus through the second fixing portion EE931, and the connection structure may be a structure such as a guide rail, a sidewall step, or the like. Exemplarily, the connection manner between the second fixing portion EE931 and the connection structure may be clamping, abutting, plugging and the like, which may not be limited herein.

It may be understood that by setting the frame EE91, fast and accurate positioning may be obtained when the pressing part EE90 is installed, and the installation of the pressing part EE40 may be completed without careful positioning in advance. Especially for the user's operation, it may greatly increase convenience of installing the pressing part EE40. In addition, for example, when the process cartridge needs to be replaced or reinstalled after the process cartridge is removed, since the pressing assembly EE90 occupies a certain length space, whether the pressing assembly EE90/pressing part EE40 has been installed in the printer in advance may be clearly identified, which may provide clear reminder to the user.

According to the pressing assembly provided in the present disclosure, the pressing part may be detachably installed in the printer alone or may be detachably installed in the printer together with the frame. When the pressing part is separately and detachably installed in the printer, the pressing part may be first installed in the printer, the process cartridge may be installed in the printer, and then the pressing part may be removed of the printer. Such manner is applicable but not limited to removing the pressing part during the operation of closing the door cover and is not limited to using other structures on the process cartridge to center-align the driving unit 1080 from the inclined state to the coaxially-aligned state.

Embodiment Thirty Two

Embodiments of the present disclosure also provide a pressing assembly, which may be detachably installed in the printer, and may be used alone in the printer and also work in the printer in cooperation with process cartridges of different structures.

As described in embodiment thirty, before the pressing part is installed, the driving unit 1080 may be supported by the driving head pushing part in the printer and at the inclined state; and the rotation axis L1 of the driving unit 1080 may form an angle $\alpha$ with the central axis L2 of the driving unit protective cover 1081.

FIG. 171 is another structural schematic of the pressing assembly according to embodiments of the present disclosure. As shown in FIG. 171, the pressing assembly FF90 may be independently and detachably installed on the driving unit protective cover 1081. The pressing assembly FF90 may include a second main body portion FF91, a pressing part FF40 installed on the second main body portion FF91 and a deformable portion FF92. The pressing part FF40 may be connected to the second main body portion FF91 through the deformable portion FF92, and the pressing part FF40 may move back and forth under the deformation of the deformable portion FF92.

The second main body portion FF91 may be made of thin plastic parts, sheet metal parts and the like. The present disclosure does not limit its material, as long as the material does not affect the installation, deformation and restoration of the pressing part FF40 and the deformable portion FF92. For example, two sides of the second main body portion FF91 may be disposed with positioning structures, the positioning structures may be cooperated with the connection structures on two sides inside the printer, and the connection structures on two sides of the printer may be structures such as guide rails and sidewall steps. When the second main body portion FF91 is installed on the printer using the positioning structures, the positioning structures may be engaged with the connection structures of the printer.

FIG. 172 is a structural schematic of the pressing assembly according to embodiments of the present disclosure. As shown in FIG. 172, the second main body portion FF91 may also be disposed with a handle which may be configured to facilitate the installation and holding of the pressing assembly.

Furthermore, at least one end of the second main body portion FF91 may be configured with the positioning structure, and the pressing assembly may be detachably installed in the process cartridge assembling chamber of the electronic image-forming apparatus through the positioning structure. For example, the first protrusion FF911 and the second protrusion FF912 may be disposed at one end of the second main body portion FF91 close to the pressing part. The first protrusion FF911 and the second protrusion FF912 may be used as above-mentioned positioning structures to cooperate with the printer, and the connection manner may be clamping, abutting, plugging or the like, which may not be limited herein.

After the pressing assembly is installed along the guide rails on two sides of the printer, when the pressing part FF40 is abutted against the driving unit 1080, the deformable portion FF92 may be deformed and drive the driving unit 1080 to be adjusted from the inclined state to the coaxially-aligned state. Under the deformation force of the deformable portion FF92, the pressing part FF40 may drive the driving unit 1080 to be adjusted from the inclined state to the coaxially-aligned state, and the deformation of the deformable portion FF92 may be restored.

In some embodiments, the pressing part FF40 may include an abutting portion FF43 and a pressing portion FF44. The abutting portion FF43 may be configured to be abutted against the driving unit protective cover 1081, and the pressing portion FF44 may be configured to drive the driving unit 1080 to be adjusted from the inclined state to the coaxially-aligned state. It should be noted that, when the driving unit 1080 is at the coaxially-aligned state, the rotation axis L1 of the driving unit 1080 may be substantially coincident with the central axis L2 of the driving unit protective cover 1081, that is, the angle $\alpha$ may be zero or close to zero.

The deformable portion FF92 may be a spring, torsion spring, shrapnel, and the like, which may not be limited herein.

In one embodiment, the pressing part FF40 may be configured with a connecting shaft FF431, and the pressing part FF40 may be detachably connected to the second main body portion FF91 through the connecting shaft FF431. Correspondingly, the second main body portion FF91 may be configured with a limiting hole FF915 which is cooperated with the connecting shaft FF431. The deformable portion FF92 may be sleeved on the connecting shaft FF431, and the deformable portion FF92 may be a torsion spring, which may improve the stability of the pressing part during moving process. The pressing part FF40 may be connected to the second main body portion FF91 through a torsion spring. In other embodiments, the deformation of the deformable portion FF92 may be not only generated by its own elastic force, but also may be achieved by setting elastic parts on the pressing part FF40. The elastic part may be a steel sheet with a certain elastic or flexible force (which may drive the driving unit 1080 to be coaxially-aligned).

When the driving unit 1080 is at the coaxially-aligned state, the abutting portion FF43 may be abutted against the driving unit protective cover 1081, such that the pressing portion FF44 may be no longer in contact with the driving unit 1080. Therefore, the driving unit 1080 may not generate friction against or even interfere with the pressing portion FF44 of the pressing part FF40 in rotating operation. The pressing part FF40 provided in the present disclosure may not affect the rotation of the driving unit 1080 and may avoid frictional damage between the pressing part FF40 and the driving unit 1080 and improve the service life of the pressing part FF40.

FIG. 173 is a schematic of the installation of the pressing assembly and the process cartridge according to embodiments of the present disclosure; FIG. 174 is another schematic of the installation of the pressing assembly and the process cartridge according to embodiments of the present disclosure; and FIG. 175 is another schematic of the installation of the pressing assembly and the process cartridge according to embodiments of the present disclosure. As shown in FIGS. 173-175, in the present disclosure the pressing assembly may be cooperated with the process cartridge for working operations. The process cartridge 1 may be a process cartridge which may match the structures of the pressing assembly FF90 in disclosed embodiments. Overall shape of the pressing assembly FF90 may, optionally, not interfere with the installation, removal and working of the process cartridge.

As shown in FIG. 173, the driving end of the process cartridge 1 may be configured with the first protrusion block FF913 and the second protrusion block FF914; and the first protrusion FF911 and the second protrusion FF912 may be disposed at one end of the second main body portion FF91 close to the pressing part FF40. The protrusions and the protrusion blocks may be cooperated and connected to each other, such that the pressing assembly FF90 may be cooperated and connected to the process cartridge 1.

For example, as shown in FIGS. 174-175, the first protrusion FF911 on the second main body portion FF91 may be cooperated with the first protrusion block FF913 on the process cartridge 1 to form a positioning structure; and the second protrusion FF912 on the second main body portion FF91 may be cooperated with the second protrusion block FF914 on the process cartridge 1 to form a positioning structure. The process cartridge 1 may be cooperated and connected to the pressing assembly FF90.

As shown in FIG. 173, the process cartridge according to embodiments of the present disclosure may not have any pressing structure such as a cartridge pressing part, and the pressing part FF40 of the pressing assembly FF90 may have universal applicability in cooperated with the process cartridge 1. For example, when the process cartridge 1 in FIG. 174 is installed in the printer, the installation direction may be the same as that of above-mentioned pressing assembly FF90, that is, the process cartridge 1 may be sent into the printer along the direction of arrow M (shown in FIG. 69).

In some embodiments, all structures included in above-mentioned pressing part may be optionally integrally formed, which may improve overall stability.

The installation operation of the pressing part FF40 and the process cartridge 1 is described below.

As shown in FIG. 176, the process cartridge 1 may be first installed in the printer (not shown), and then the pressing part FF40 may be installed in the printer alone; before the pressing part is not connected to the process cartridge, the driving unit 1080 may be supported by the driving head pushing part in the printer and at the inclined state, that is, the driving unit 1080 may not be coaxially-aligned by external force at this point.

The pressing assembly FF90 may continue to be installed along the guide rails on two sides of the printer until the installation is complete. In the structure shown in FIG. 177, the abutting portion FF43 of the pressing part FF40 may be placed on the driving unit protective cover 1081, and the pressing portion FF44 may center-align the driving unit 1080 from the inclined state to the coaxially-aligned state.

As shown in FIGS. 176 and 177, the installed process cartridge 1 may be located below the position of the pressing assembly FF90. At this point, since the thickness of the pressing assembly FF90 along the vertical direction above the waste toner hopper of the process cartridge 1 is sufficiently small in one embodiment, the pressing assembly FF90 may not affect the removal of the process cartridge 1 and function, that is, the process cartridge 1 may be independently and freely installed or removed from the printer.

Before installing the process cartridge 1 to the printer, the pressing assembly FF90 may also be installed in the printer first, such that the abutting portion FF43 of the pressing part FF40 may first pass through the driver unit protective cover 1081 of the printer; and the pressing part FF44 may first force the driving unit 1080 to be adjusted from the inclined state to the coaxially-aligned state, and then install the process cartridge 1 into the printer. At this point, the process cartridge 1 and the accessory FF90 may be cooperated inside the printer.

Furthermore, the pressing assembly FF90 may also be installed in the developing chamber, and the developing chamber may not include the photosensitive unit, the charging unit, and the cleaning unit. Or the pressing part FF90 may be integrally formed with the process cartridge that does not include the photosensitive unit, the charging unit, and the cleaning unit.

Furthermore, during the installation, the printer may be installed first, such that the abutting portion FF43 of the pressing part FF40 of the pressing assembly FF90 may first pass through the driving unit protective cover 1081 of the printer; and then the pressing part FF44 may force the driving unit 1080 to be coaxially-aligned. Next, another part including photosensitive unit, charging unit and cleaning unit may be installed in the printer.

When the process cartridge 1 is in operation, the door cover of the printer may be closed, and the driving unit 1080 may enter the state of being forced to be coaxially-aligned by the external force of the pressing part FF40. Therefore, as the driving unit 1080 is coaxially-aligned, the force receiving unit 21 on the process cartridge may be gradually engaged with the driving unit 1080, the force receiving unit 21 of the process cartridge 1 may finally receive the driving force of the driving unit 1080 in a substantially coaxial state.

At this point, under the action of the deformation restoration force of the deformable portion FF92, the abutting portion FF43 may move to be abutted against the driving unit protective cover 1081. Therefore, the pressing part FF44 may be no longer in contact with the driving unit 1080, such that the driving unit 1080 may not generate friction or even interfere with the pressing part DD40 when it rotates. At this point, the state may be the second state of the pressing part DD40, and subsequent normal printing work may be performed.

Embodiment Thirty Three

FIG. 178A is a structural schematic of the process cartridge provided in embodiments of the present disclosure. As shown in FIG. 178A, the process cartridge 1 may include the cartridge body 10, the photosensitive drum 20, the developing roller 30 and the force receiving unit 21. The cartridge body 10 may include a waste toner cartridge 12 and a toner cartridge 11; and the waste toner cartridge 12 and the toner cartridge 11 may be independently removed and assembled. The toner cartridge 11 may contain a developer, and the toner cartridge 10 may be configured with the developing roller 30. The waste toner cartridge 12 may be configured with the photosensitive drum 20 and the force receiving unit 21 connected to the photosensitive drum 20. For example, the force receiving unit 21 may be disposed at one end of the photosensitive drum 20. In one embodiment, the force receiving unit 21 may be configured to be engaged with the driving unit 1080 provided in the electronic image-forming apparatus, thereby receiving the driving force of the driving unit 1080. The force receiving unit 21 may be optionally configured as a twisted protrusion structure.

As shown in FIG. 178A and FIG. 178B, the waste toner cartridge 12 may include the first side wall GG110 and the second side wall GG120. The first side wall GG110 and the second side wall GG120 may be oppositely disposed at two ends of the waste toner cartridge 12 along its length direction. The photosensitive drum 20 may be rotatably supported between the first side wall GG110 and the second side wall GG120, that is, the direction of the rotation axis of the photosensitive drum 20 may also extend along the length direction of the waste toner cartridge 12. A waste toner hopper GG150 may be disposed on the waste toner cartridge 12 adjacent to the photosensitive drum 20; and the first side wall GG110 and the second side wall GG120 may cover two side surfaces of the waste toner hopper GG150. After the process cartridge 1 completes one printing operation, the cleaning device (not shown) provided in the waste toner cartridge 12 may scrape off the residual developer adhering to the surface of the photosensitive drum 20 and transport the developer to the waste toner hopper GG150.

As shown in FIGS. 178A and 178B, the waste toner cartridge 12 may further include installation units, which may be respectively fixed on the outer surfaces of the first side wall GG110 and the second side wall GG120.

As shown in FIG. 178A, the installation unit may include the first installation portion GG131 and the second installation portion GG132. The first installation portion GG1311 may be optionally configured to include two parts, that is, the first installation protrusion GG1311 and the second installation protrusion GG1312. The first installation protrusion GG1311 and the second installation protrusion GG1312 may be adjacently disposed at the first side wall GG110. The first installation protrusion GG1311 and the second installation protrusion GG1312 may be disposed at the first side wall GG110 adjacent to the force receiving unit 21. The position of the second installation protrusion GG1312 on the first side wall GG110 may be closer to the force receiving unit 21 than the position of the first installation protrusion GG1311. Both the first installation protrusion GG1311 and the second installation protrusion GG1312 may protrude from the outer surfaces of the first side wall GG110 along the direction away from the first side wall GG110.

As shown in FIG. 178B, the second installation portion GG132 may be optionally configured as a cylindrical protrusion structure. The second installation portion GG132 may be disposed at the second side wall GG120 adjacent to the photosensitive drum 20, and the second installation portion GG132 may be configured to protrude from the outer surface of the second side wall GG120 toward the direction away from the second side wall GG120.

It should be noted that, in one embodiment, the first installation portion GG131 and the second installation portion GG132 may also be configured as movable parts. That is, the first installation protrusion GG1311, the second installation protrusion GG1312 and the second installation portion GG132 may be configured as movable parts. Furthermore, the first installation protrusion GG1311, the second installation protrusion GG1312 and the second installation portion GG132 may be detachably disposed at the outer surfaces of the first side wall GG110 and the second side wall GG120 respectively. Furthermore, the first installation protrusion GG1311, the second installation protrusion GG1312 and the second installation portion GG132 may be detachably disposed at the outer surfaces of the first side wall GG110 and the second side wall GG120 respectively.

As shown in FIG. 178A, the toner cartridge 11 in one embodiment may include the developing roller gear 31 and the developing roller 30; and the developing roller gear 31 may be connected to the developing roller 30. It should be noted that the developing roller gear 31 may be optionally a helical gear structure.

As shown in FIG. 178A, the toner cartridge 11 may include the first cartridge body wall GG210 and the second cartridge body wall GG220. The first cartridge body wall GG210 and the second cartridge body wall GG220 may be relatively disposed at two ends of the toner cartridge 11 along its length direction. The developing roller 30 may be rotatably supported between the first cartridge body wall GG210 and the second cartridge body wall GG220, that is, the direction of the rotation axis of the developing roller 30 may also extend along the length direction of the toner cartridge 11. A toner hopper GG260 may be disposed on the toner cartridge 11 adjacent to the developing roller 30. The first cartridge body wall GG210 and the second cartridge body wall GG220 may cover two side surfaces of the toner hopper GG260. The toner hopper GG260 may be configured to store developer; and during the printing process of the process cartridge 1, the developer may be transferred to the photosensitive drum 20 through a toner feeding roller (not shown in drawings) and the developing roller 30, such that the electrostatic latent image formed on the surface of the photosensitive drum 20 may be developed and converted into a developed image.

As shown in FIG. 178B and FIG. 179, the toner cartridge 11 may further include guide units. The guide units may be respectively disposed at the inner surfaces of the first cartridge body wall GG210 and the second cartridge body wall GG220 of the toner cartridge 11 in a fixed manner. The installation unit of the waste toner cartridge 12 may be independently detachably connected to the toner cartridge 11 along the guide unit.

As shown in FIGS. 178A and 179, the guide unit may include the first installation slide GG231 and the second installation slide GG232. The first installation slide GG231 may be optionally configured to, along the direction perpendicular to the axial direction of the developing roller 30 on the first cartridge body wall GG210, extend from an end of the first cartridge body wall GG210 away from the developing roller 30 toward an end close to the developing roller 30. The width of the first installation slide GG231 may be adapted to the size between the first installation protrusion GG1311 and the second installation protrusion GG1312 disposed on the first side wall GG110 of the waste toner cartridge 12. When the waste toner cartridge 12 is assembled with the toner cartridge 11, the first installation protrusion GG1311 and the second installation protrusion GG1312 may be abutted against the upper and lower rails of the first installation slide GG231 respectively; and along the extending direction of the first installation slide GG231, slide from one end corresponding to the first cartridge body wall GG210 away from the pressing unit 40 disposed at the first cartridge body wall GG210 to the other end of the first cartridge body wall GG210 close to the pressing unit 40.

As shown in FIG. 179, the second installation slide GG232 may be optionally configured to, along the direction perpendicular to the axial direction of the developing roller 30 on the second cartridge body wall GG220, extend from an end of the second cartridge body wall GG220 away from the developing roller 30 toward an end close to the developing roller 30. The second installation slide GG232 may be further disposed with a blocking portion GG2321 at one end close to the developing roller 30; the blocking portion GG2321 may be configured to limit the movement range of the second installation portion GG132 on the second installation slide GG232. The width of the second installation slide GG232 may be adapted to the outer circumference size of the second installation portion GG132 disposed on the second side wall GG120 of the waste toner cartridge 12, and the size of the blocking portion GG2321 may be adapted to the outer circumference of the second installation portion GG132. When the waste toner cartridge 12 is cooperated with the toner cartridge 11, the second installation portion GG132 may be inserted into the second installation slide GG232 by guiding the second installation portion GG132, and slide until the second installation portion GG132 falls and is locked into the blocking portion GG2321.

It should be noted that, in one embodiment, the first installation slide GG231 and the second installation slide GG232 may also be configured as movable parts; furthermore, the first installation slide GG231 and the second installation slide GG232 may be respectively disposed at the inner surfaces of the first cartridge body wall GG210 and the second cartridge body wall GG220 in a detachable manner. In addition, the first installation slide GG231 and the second installation slide GG232 may also be configured in other structures for adapting to different toner cartridges 11, process cartridges 1 and electronic image-forming apparatuses 100.

Furthermore, as shown in FIGS. 178A and 180, the toner cartridge 11 may further include positioning units. The positioning units may be respectively disposed at the outer surfaces of the first cartridge body wall GG210 and the second cartridge body wall GG220 of the toner cartridge 11; and the positioning units may be configured to be cooperated with the installation guide rails in the electronic image-forming apparatus 100.

For example, the positioning unit may include the first positioning portion GG251 and the second positioning portion GG252; and the first positioning portion GG251 and the second positioning portion GG252 may be respectively fixed on the outer surfaces of the first cartridge body wall GG210 and the second cartridge body wall GG220.

The first positioning portion GG251 may include the first positioning protrusion GG2511 and the second positioning protrusion GG2512. The first positioning protrusion GG2511 and the second positioning protrusion GG2512 may be adjacently disposed at the outer surface of the first cartridge body wall GG210; and the installation positions of the first positioning protrusion GG2511 and the second positioning protrusion GG2512 on the first cartridge body wall GG210 may be away from the developing roller gear 31. Both the first positioning protrusion GG2511 and the second positioning protrusion GG2512 may protrude from the outer surface of the first cartridge body wall GG210 along the direction away from the first cartridge body wall GG210.

Furthermore, as shown in FIG. 178A, the second positioning portion GG252 may be disposed at the outer surface of the second cartridge body wall GG220; and the second positioning portion GG252 may protrude from the outer surface of the second cartridge body wall 210 along the direction away from the second cartridge body wall GG220. The first positioning portion GG251 and the second positioning portion GG252 may be respectively cooperated with the installation guide rail GG50 (as shown in FIG. 187) provided inside the main body of the electronic image-forming apparatus 100 to realize the installation of the toner cartridge 11 into the electronic image-forming apparatus 100.

It should be noted that, the first positioning portion GG251 and the second positioning portion GG252 may also be configured as other structures for adapting to different toner cartridges 11, process cartridges 1 and electronic image-forming apparatuses 100.

As shown in FIGS. 178A and 181-182, the process cartridge 1 may also include the pressing unit 40. The pressing unit 40 may be disposed at the toner cartridge 11 at the end position of the first cartridge body wall GG210 close to the upper side of the developing roller 30. One end of the pressing unit 40 may be detachably assembled with the toner cartridge 11, and the other end may extend toward the direction of the developing roller 30. After the toner cartridge 11 is installed in the printer, it may ensure that the other end of the pressing unit 40 may be in contact with the driving unit 1080 provided in the printer to apply the force, and the driving unit 1080 provided in the electronic image-forming apparatus 100 may be forced to be in contact and engaged with the force receiving unit 21.

For example, the pressing unit 40 may include a pressing part GG310 and a deformable part GG320; and the pressing part GG310 and the deformable part GG320 may be assembled with each other in a detachable manner. An installation portion GG270 may be disposed at the end position of the first cartridge body wall GG210 close to the upper side of the developing roller 30 on the toner cartridge 11. The main body of the installation portion GG270 may be configured with an assembling chamber GG271 for accommodating the pressing part GG310 and the deformable part GG320. Installation holes GG272 may be symmetrically formed on two opposite side walls of the assembling chamber GG271.

Furthermore, as shown in FIG. 182, the pressing part GG310 may include a pressing portion GG314 and a connecting portion GG311 connected to the pressing portion GG314. The connecting portion GG311 may be detachably connected to the end portion of the first cartridge body wall GG210 of the toner cartridge 11 close to the upper side of the developing roller gear 31, and the deformable part GG320 may be sleeved on the connecting portion GG311. The pressing portion GG314 may be configured to press the driving unit 1080. The pressing part GG310 may move back and forth under the deformation of the deformable part GG320 and drive the driving unit 1080 to be adjusted from the inclined state to the coaxially-aligned state.

For example, the first protruding portion GG312 and the second protruding portion GG313 may be arranged symmetrically on two sides of the connecting portion GG311. The first protruding portion GG312 and the second protruding portion GG313 may protrude from the surface of the connecting portion GG311 in opposite directions; and the first protruding portion GG312 and the second protruding portion GG313 may respectively extend toward a direction away from the connecting portion GG311. The first protruding portion GG312 and the second protruding portion GG313 may be disposed at the connecting portion at one end of the pressing part GG310. The deformable part GG320 may be sleeved on the first protruding portion GG312. The other end of the pressing part GG310 may be configured with the pressing portion GG314. The pressing portion GG314 may be closer to the developing roller 30 than the first protruding portion GG312 and the second protruding portion GG313.

In one embodiment, the first protruding portion GG312 and the second protruding portion GG313 may be adapted to correspond to one installation hole GG272 respectively. The first protrusion GG312 and the second protrusion GG313 may be optionally configured as cylindrical structures. That is, the outer surfaces of the first protrusion GG312 and the second protrusion GG313 may be circular. The diameters of the outer peripheral surfaces of the first protruding portion GG312 and the second protruding portion GG313 may be adapted to the diameters of the installation holes GG272 formed symmetrically on two opposite side walls of the assembling chamber GG271.

As shown in FIGS. 178A and 181-187, during the installation operations, the user may first sleeve the deformable part GG320 on the second protruding portion GG313 to complete the installation between the deformable part GG320 and the pressing part GG310. The deformable part GG320 and the pressing part GG310 may be used as an integral structure. The first protruding portion GG312 and the second protruding portion GG313 disposed on the pressing part GG310 may be inserted into the installation holes GG272, arranged in a symmetrical manner, on two opposite side walls of the assembling chamber GG271. At this point, a part of the deformable part GG320 and the pressing part GG310 may be installed in the assembling chamber GG271, and then the installation of the deformable part GG320, the pressing part GG310 and the installation portion GG270 may be completed. That is, the installation of the pressing unit 40 and the toner cartridge 11 may be completed. The assembling chamber GG271 may limit the deformable part GG320 and the pressing part GG310 between its two opposite side walls, which may prevent the deformable part GG320 and the pressing part GG310 from falling, position shifting and the like during repeated movement which may affect the working effect of the pressing part GG310.

As shown in FIGS. 183-187, the driving unit 1080 may be disposed in the printer, and the driving unit protective cover (blocking wall) 1081 for limiting the movement range of the driving unit 1080 may be disposed along the outer circumference of the driving unit 1080. The driving unit protective cover (blocking wall) 1081 may be configured with a connecting chamber GG33, and the driving unit 1080 may be disposed at the connecting chamber GG33. The driving unit protective cover (blocking wall) 1081 may be also disposed with a driving unit pushing part 1090. One end of the driving unit pushing part 1090 may be connected to the main body of the printer through a spring (not shown in drawings); and the other end may be inserted on the driving unit protective cover (blocking wall) 1081 through the groove hole GG32 disposed on the driving unit protective cover (blocking wall) 1081. The driving unit pushing part 1090 may move back and forth along the radial direction of the driving unit 1080 and provide a support force to the driving unit 1080 to force the driving unit 1080 to keep the inclined state relative to the axial direction of the driving unit protective cover (blocking wall) 1081. As shown in FIGS. 183-184, the process cartridge 1 may be not installed in the electronic image-forming apparatus 100 at this point. The driving unit 1080 may be supported by the driving unit pushing part 1090 and at the inclined state relative to the axial direction of the driving unit protective cover (blocking wall) 1081, that is, the rotation axis L1 of the driving unit 1080 may form an angle $\alpha$ with the central axis L2 of the driving unit protective cover (blocking wall) 1081.

It should be noted that the driving unit 1080 may be optionally a force output head, which may be configured to provide the driving force to the process cartridge 1 to drive the process cartridge 1 to operate. In addition, an engaging chamber (not shown in drawings) may be disposed on the outer peripheral side of the driving unit protective cover (blocking wall) 1081 for providing a space for the engaging connection between the force receiving unit 21 and the driving unit 1080.

An installation method of the process cartridge 1 is provided in one embodiment. As shown in FIGS. 188 and 178A-187, the installation method of the process cartridge 1 may include following exemplary steps.

At step S1, the toner cartridge 11 may be installed in the electronic image-forming apparatus 100.

At step S2, the pressing unit 40 of the toner cartridge 11 may apply the force to the driving unit 1080, which may force the driving unit 1080 to be adjusted from the inclined state to the coaxially-aligned state.

At step S3, the waste toner cartridge 12 may be installed inside the toner cartridge 11, which may force the driving unit 1080 to be contact and cooperated with the force receiving unit 21; and the installation position of the toner cartridge 11 may be located below the installation position of the waste toner cartridge 12.

For example, as shown in FIGS. 188 and 178A-187, when the user uses the second handle GG270 disposed on the toner cartridge 11 to install the toner cartridge 11 inside the electronic image-forming apparatus through the installation rails GG50 disposed on the inner wall of the electronic image-forming apparatus along the installation direction of the process cartridge 1, the first positioning portion GG251 and the second positioning portion GG252 disposed on the first cartridge body wall GG210 and the second cartridge body wall 220 of the toner cartridge 11 may be respectively in contact with the installation guide rails GG50 on two sides of the inner wall of the electronic image-forming apparatus. In addition, due to the force applied by the user toward the installation direction of the process cartridge 1, the toner cartridge 11 may, through the first positioning portion GG251 and the second positioning portion GG252, be forced to slide along the installation rails GG50 toward designated installation position in the electronic image-forming apparatus. The user continues to apply the force to the toner cartridge 11 along the installation direction of the process cartridge 1. In such way, while the toner cartridge 11 continues to move to designated installation position of the printer, the pressing unit 40 may start to be abutted against the driving unit 1080 through the pressing portion GG314 disposed on the pressing part GG310; and the deformable part GG320 may deform around the second protruding portion GG313, such that the pressing portion GG314 may continuously apply the force toward the installation direction of the process cartridge 1 to the driving unit 1080. Since the force is greater than the elastic force provided by the spring connected to one end of the driving unit pushing part 1090, the driving unit pushing part 1090 may not be kept at the original position and may be gradually pressed down. At this point, the driving unit 1080 may also gradually fall toward the axial direction close to the driving unit protective cover (blocking wall) 1081 along the direction of gravity. When the toner cartridge 11 is pushed to the designated installation position, the pressing portion GG314 of the pressing part GG310 may be in full contact with the driving unit 1080, the force applied may be the largest, and the deformable part GG320 may gradually restore its deformation. At this point, the driving unit pushing part 1090 may be completely pressed until the axis of the driving unit 1080 is completely coincident with the axis of the driving unit protective cover (blocking wall) 1081, and the driving unit 1080 is coaxially-aligned from the inclined state to the coaxially-aligned state.

The user may, through the first handle GG140 disposed on the waste toner cartridge 12, install the waste toner cartridge 12 inside the toner cartridge 11 along the installation direction of the process cartridge 1 through the first installation slide GG231 and the second installation slide GG232 disposed on the inner wall of the toner cartridge 11. Since the pressing unit 40 on the toner cartridge 11 has completely coaxially-aligned the driving unit 1080, the force receiving unit 21 may be directly in contact and engaged with the driving unit 1080.

After the driving unit 1080 is fully engaged with the force receiving unit 21, that is, when the rotation axis L1 of the driving unit 1080 is substantially coincident with the central axis L2 of the driving unit protective cover (blocking wall) 1081, one end of the pressing portion GG314 of the pressing part GG310 may be abutted against the driving unit protective cover (blocking wall) 1081. Therefore, the pressing portion GG314 may be no longer in contact with the driving unit 1080, such that the driving unit 1080 may not generate friction or even interfere with the pressing part GG310 at rotating operations, which may not affect the rotation of the driving unit 1080 and not damage the pressing unit 40.

Furthermore, when the door cover of the electronic image-forming apparatus 100 is closed and the process cartridge 1 is in working state, the driving unit 1080 may be in the coaxially-aligned state due to the external force received from the pressing unit 40. Furthermore, it may realize that the driving unit 1080 may be in contact and engaged with the force receiving unit 21. The force receiving unit 21 disposed on the waste toner cartridge 12 may finally receive the driving force of the driving unit 1080 in a substantially coaxial state, and another gear portion disposed on the driving unit 1080 may be engaged with the developing roller gear 31. At this point, the deformable part GG320 may restore its elastic deformation, forcing one side of the pressing portion GG314 of the pressing part GG310 to move to be abutted against the driving unit protective cover (blocking wall) 1081. Furthermore, the pressing portion GG314 may be no longer in contact with the driving unit 1080. Therefore, the driving unit 1080 may not generate friction or even interfere with the pressing part GG310 during rotating, and subsequent normal printing work may be performed.

Embodiment Thirty Four

As an explanation of one embodiment, only the difference from above-mentioned installation method of the process cartridge in embodiment thirty five is described below.

Another installation method of the process cartridge 1 is provided in one embodiment. As shown in FIGS. 189 and 178A-187, the installation method of the process cartridge 1 may include following exemplary steps.

At step S111, the waste toner cartridge 12 may be installed inside the toner cartridge 11.

At step S222, the waste toner cartridge 12 and the toner cartridge 11 as a whole may be installed in the main body of the electronic image-forming apparatus 100.

At step S333, the pressing unit 40 disposed on the second cartridge body 100 may apply the force to the driving unit 1080, which may force the driving unit 1080 to be adjusted from the inclined state to the coaxially-aligned state and make the driving unit 1080 to be in contact and cooperated with the force receiving unit 21.

For example, as shown in FIGS. 178A-187 and 189, the user, through the first handle GG140 disposed on the waste toner cartridge 12, may install the waste toner cartridge 12 inside the toner cartridge 11 along the process cartridge installation direction (as shown in FIG. 187) through the first installation slide GG231 and the second installation slide GG232 disposed on the inner wall of the toner cartridge 11. At this point, the waste toner cartridge 12 may be located on the upper side of the toner cartridge 11. Then, the waste toner cartridge 12 and the toner cartridge 11 as a whole may be installed in the apparatus main body. When the user, through the second handle GG240 disposed on the toner cartridge 11, installs the toner cartridge 11 inside the electronic image-forming apparatus 100 along the installation direction of the process cartridge through the installation rail GG50 disposed on the inner wall of the electronic image-forming apparatus 100, the first cartridge body wall GG210 of the toner cartridge 11 and the first positioning portion GG251 and the second positioning portion GG252 disposed on the toner cartridge 11 may be respectively in contact with the installation guide rails GG50 on two sides of the inner wall of the electronic image-forming apparatus 100. In addition, due to the force from the user toward the installation direction of the process cartridge, the toner cartridge 11 may be forced to slide along the installation rail GG50 toward the designated installation position in the electronic image-forming apparatus 100 through the first positioning portion GG251 and the second positioning portion GG252. The user continues to apply the force to the toner cartridge 11 along the installation direction of the process cartridge 1. In such way, while the toner cartridge 11 continues to move to designated installation position of the electronic image-forming apparatus 100, the pressing unit 40 may start to be abutted against the driving unit 1080 through the pressing portion GG314 disposed on the pressing part GG310; and the deformable part GG320 may deform around the second protruding portion GG313, such that the pressing portion GG314 may continuously apply the force toward the installation direction of the process cartridge 1 to the driving unit 1080. Since the force is greater than the elastic force provided by the spring connected to one end of the driving unit pushing part 1090, the driving unit pushing part 1090 may not be kept at the original position and may be gradually pressed down. At this point, the driving unit 1080 may also gradually fall toward the axial direction close to the driving unit protective cover (blocking wall) 1081 along the direction of gravity. When the toner cartridge 11 is pushed to the designated installation position, the pressing portion GG314 of the pressing part GG310 may be in full contact with the driving unit 1080, the force applied may be the largest, and the deformable part GG320 may gradually restore its deformation. At this point, the driving unit pushing part 1090 may be completely pressed until the axis of the driving unit 1080 is completely coincident with the axis of the driving unit protective cover (blocking wall) 1081, and the driving unit 1080 may be adjusted from the inclined state to the coaxially-aligned state. The driving unit 1080 may be in contact and engaged with the force receiving unit 21 disposed on the waste toner cartridge 12 which is also installed in the apparatus main body.

When the driving unit 1080 is fully engaged with the force receiving unit 21, that is, when the rotation axis L1 of the driving unit 1080 substantially is coincident with the central axis L2 of the driving unit protective cover (blocking wall) 1081, one end of the pressing portion GG314 of the pressing part GG310 may be abutted against the driving unit protective cover (blocking wall) 10811, such that the pressing portion GG314 may be no longer in contact with the driving unit 1080. The driving unit 1080 may not generate friction or even interfere with the pressing part GG310 at rotating operations, such that the rotating operations of the driving unit 1080 may not be affected, and the pressing unit 40 may not be damaged.

Embodiment Thirty Five

Another process cartridge is provided in one embodiment, and undescribed parts may be same as those in above-mentioned embodiment thirty five, which may not be described in detail for brevity. The difference between one embodiment and above-mentioned embodiment thirty five is the following.

As shown in FIGS. 190-193, for the waste toner cartridge 12, the first installation portion HH131 disposed on the outer surface of the first side wall HH110 and the second installation portion HH132 disposed on the outer surface of the second side wall HH120 may be directly installed inside the apparatus main body. The first installation portion HH131 and the second installation portion HH132 may allow the waste toner cartridge 12 to be installed inside the main body of the electronic image-forming apparatus 100 along the installation slide disposed on the inner wall of the electronic image-forming apparatus 100 and then fixed on the main body of the electronic image-forming apparatus 100.

The first installation slide HH231 disposed on the inner surface of the first cartridge body wall HH210 of the toner cartridge 11 and the second installation slide HH232 disposed on the inner surface of the second cartridge body wall HH220 may be omitted.

The waste toner cartridge 12 may be directly installed inside the apparatus main body through the first installation portion HH131 and the second installation portion HH132; and the installation position of the waste toner cartridge 12 may be located above the installation position of the toner cartridge 11.

As shown in FIGS. 190-193, the end of the first side wall HH110 and the second side wall HH120 of the waste toner cartridge 12 away from the photosensitive drum 20 may be configured with the first contact portion HH160; the end of the first cartridge body wall HH210 and the second cartridge body wall HH220 of the toner cartridge 11 away from the developing roller 30 may be configured with the second contact portion HH211; and when both the waste toner cartridge 12 and the toner cartridge 11 are installed inside the apparatus main body, the first abutting portion HH160 and the second abutting portion HH211 may be in contact with each other. The photosensitive drum 20 and the developing roller 30 may be close to each other in operations, such that the developer may be transferred from the developing roller 30 to the photosensitive drum 20 to realize developing and printing.

As the description of embodiment two provided in the present disclosure, only the difference from embodiment one corresponding to above process cartridge installation method is described below.

The installation method of the process cartridge 1 is provided in one embodiment. As shown in FIGS. 190-193 and 194, the installation method of the process cartridge 1 may include following exemplary steps.

At step S11, the waste toner cartridge 12 may be installed in the main body of the electronic image-forming apparatus 100.

At step S22, the toner cartridge 11 may be installed in the main body of the electronic image-forming apparatus 100;

and the installation position of the waste toner cartridge 12 may be located above the installation position of the toner cartridge 11.

At step S33, the pressing unit 40 may apply the force to the driving unit 1080 to force the driving unit 1080 to be adjusted from the inclined state to the coaxially-aligned state, and the driving unit 1080 may be in contact and engaged with the force receiving unit 21.

For example, as shown in FIGS. 190-193 and 194, during the process that the user, through the first handle HH140 disposed on the waste toner cartridge 12, installs the waste toner cartridge 12 inside the electronic image-forming apparatus 100 along the installation direction of the process cartridge (as shown in FIG. 187) through the installation guide rail GG50 (as shown in FIG. 187) disposed on the inner wall of the electronic image-forming apparatus 100, since the toner cartridge 11 has not been installed into the electronic image-forming apparatus 100 at this point, the driving unit 1080 of the electronic image-forming apparatus 100 may be still supported by the driving unit pushing part 1090 because there is no external force and still keep the inclined state relative to the axial direction of the driving unit protective cover (blocking wall) 1081, and the user may install the waste toner cartridge 12 to the designated installation position in the electronic image-forming apparatus 100. At this point, the force receiving unit 21 may have been coaxial with the driving unit protective cover (blocking wall) 1081.

Through the second handle HH240 disposed on the toner cartridge 11, during the installation process of the toner cartridge 11 inside the electronic image-forming apparatus 100 along the process cartridge installation direction through the installation rail GG50 disposed on the inner wall of the electronic image-forming apparatus 100, the first cartridge body wall HH210 of the toner cartridge 11 and the first positioning portion HH251 and the second positioning portion HH252 disposed on the toner cartridge 11 may be respectively in contact with the installation guide rails GG50 on two sides of the inner wall of the electronic image-forming apparatus 100. In addition, due to the force from the user toward the installation direction of the process cartridge, the toner cartridge 11 may be forced to, through the first positioning portion HH251 and the second positioning portion HH252, to slide along the installation rail GG50 toward the designated installation position in the electronic image-forming apparatus 100. The user continues to apply force to the toner cartridge 11 along the installation direction of the process cartridge, such that during the process of making the toner cartridge 11 continue to move to the designated installation position of the electronic image-forming apparatus 100, the pressing unit 40 may start to be abutted against the driving unit 1080 through the pressing part HH314 disposed on the pressing part HH310. The deformable portion HH320 may deform around the second protruding portion HH313, such that the pressing part HH314 may continuously apply the force toward the process cartridge installation direction to the driving unit 1080. Since the force is greater than the elastic force provided by the spring connected to one end of the driving unit pushing part 1090, the driving unit pushing part 1090 may not be kept at the original position and may be gradually pressed down. At this point, the driving unit 1080 may also gradually fall toward the axial direction close to the driving unit protective cover (blocking wall) 1081 along the direction of gravity. When the toner cartridge 11 is pushed to the designated installation position, the pressing part HH314 of the movable part HH310 may be completely in contact with the driving unit 1080, the force applied may be the largest, and the deformable part HH320 may gradually restore its deformation. At this point, the driving unit pushing part 1090 may be completely pressed until the axis of the driving unit 1080 is completely coincident with the axis of the driving unit protective cover (blocking wall) 1081, and the driving unit 1080 may be adjusted from the inclined state to the coaxially-aligned state. The driving unit 1080 may be in contact and engaged with the force receiving unit 21 disposed on the waste toner cartridge 12 which is also installed in the apparatus main body.

When the driving unit 1080 is fully engaged with the force receiving unit 21, that is, when the rotation axis L1 of the driving unit 1080 substantially is coincident with the central axis L2 of the driving unit protective cover (blocking wall) 1081, one end of the pressing portion HH314 of the pressing part HH310 may be abutted against the driving unit protective cover (blocking wall) 10811, such that the pressing portion HH314 may be no longer in contact with the driving unit 1080. The driving unit 1080 may not generate friction or even interfere with the pressing part GG310 at rotating operations, such that the rotating operations of the driving unit 1080 may not be affected, and the pressing unit 40 may not be damaged.

Embodiment Thirty Six

As the description of one embodiment, only the difference from above-mentioned process cartridge embodiment thirty three is described below.

As shown in FIG. 195, the process cartridge may further include the pressing unit 40, which may be disposed at the end position of the first cartridge body wall II210 close to the upper side of the developing roller gear 31 at the toner cartridge 11. One end of the pressing unit 40 may be detachably assembled with the toner cartridge 11, and the other end may extend toward the direction of the developing roller 30. After the toner cartridge 11 is installed in the printer, it ensures that the other end of the pressing unit 40 may be in contact with the driving unit 1080 provided in the printer and apply the force, such that the driving unit 1080 disposed in the electronic image-forming apparatus 100 may be forced to be in contact and engaged with the force receiving unit 21.

The force receiving unit 21 is shown in FIG. 196; the pressing unit 40 may include a pressing part II310 and a deformable portion II320; and the pressing part II310 and the deformable portion II320 may be assembled in a detachable manner.

In one embodiment, the process cartridge may further include a fixing part II330, which may be independently detachably connected to the end of the first cartridge body wall II210 on the toner cartridge 11 close to the upper side of the developing roller gear 31. The pressing unit 40 may be detachably connected to the fixing part II330.

The main body of the fixing part II330 may be configured with an accommodating chamber II331 for accommodating the pressing part II310 and the deformable portion II320 of the pressing unit. Installation holes II332 may be symmetrically formed on two opposite side walls of the accommodating chamber II331.

Furthermore, as shown in FIG. 196, the pressing part II310 may include a pressing portion II314 and a connecting portion II311 connected to the pressing portion II314; the first protruding portion II312 and the second protruding portion (not shown in drawings) may be arranged symmetrically on two sides of the connecting portion II311; the first protruding portion II312 and the second protruding portion may protrude from the surface of the connecting portion II311 in opposite directions; and the first protruding portion II312 and the second protruding portion may respectively extend toward directions away from the connecting portion 11311.

In one embodiment, the first protruding portion II312 and the second protruding portion may be optionally configured as cylindrical structures, that is, the outer surfaces of the first protruding portion II312 and the second protruding portion may be circular; and the diameters of the outer peripheral surfaces of the first protruding portion II312 and the second protruding portion may be cooperated with the diameters of the installation holes II332 symmetrically opened on two opposite side walls of the accommodating chamber II331.

During installation, the user may first sleeve the deformable portion II320 on the first protruding portion II312 to complete the installation between the deformable portion II320 and the pressing part II310; and such two parts may be used as a whole pressing unit 40, and the first protruding portion II312 and the second protruding portion disposed on the pressing part II310 may be inserted into the installation holes II332 provided symmetrically on two opposite side walls of the accommodating chamber II331. At this point, a part of the deformable portion II320 and the pressing part II310 may be installed in the accommodating chamber II331, and then the installation between the deformable portion II320, the pressing part II310 and the fixing part II330 may be completed. The accommodating chamber II331 may limit the deformable portion II320 and the pressing part II310 between two opposite side walls of the accommodating chamber, which may prevent the deformable portion II320 and the pressing part II310 from falling, position shifting and the like during the repeated movement which may affect the working effect of the pressing unit 40.

It should be noted that the deformable part II320 may be optionally a torsion spring, and the deformable part II320 may also be configured as other deformable structures or parts for adapting to different pressing units 40 and process cartridges 1.

As shown in FIGS. 195-196, at least one protruding installation part II334 may be disposed at the end wall I1333 of the fixing part II330 along the axial direction of the developing roller 30. In one embodiment, there may be, optionally, two installation parts II334. Two installation parts II334 may protrude respectively on two end walls II333 of the fixing part II330 in a symmetrical manner, and the ends of two installation parts II334 may be further disposed with hook portions II3341 bent toward the end walls II333.

At least one protruding installation protrusion II335 may be disposed at the side wall I1336 of the fixing part II330 along the direction in parallel with the axis of the developing roller 30. In one embodiment, there may be, optionally, one installation protrusion II335; and one protruding installation protrusion II335 may be disposed at the side wall I1336 and located between two corresponding installation parts II334. The installation protrusion II335 may protrude from the outer surface of the side wall I1336 toward the direction away from the side wall I1336. In one embodiment, the installation protrusion II335 may be optionally configured as a cylinder; and the diameter of the outer circumferential surface of the main body of the installation protrusion II335 may gradually decrease toward the direction away from the side wall I1336, that is, the diameter of the outer cylindrical surface of one end of the installation protrusion II335 fixed on the side wall I1336 may be greater than the diameter of the outer cylindrical surface of the other end of the installation protrusion II335 away from the side wall II336.

It should be noted that, in one embodiment, the hook portion II3341 may have elasticity, and/or two installation parts II334 may have elasticity, and/or the installation protrusion II335 may have elasticity.

Furthermore, as shown in FIGS. 195-196, at least one installation groove II280 and at least one installation hole II290 may be opened on the first cartridge body wall I1210 on the toner cartridge 11 close to the upper side of the developing roller gear 31. In one embodiment of the present disclosure, the number of installation grooves II280 may be optionally two. The user may use two installation parts II334 and the installation protrusions II335 disposed on the fixing part II330 to complete the installation with two installation grooves II280 and the installation holes 11290 disposed on the first cartridge body wall I1210, thereby realizing that the pressing unit 40 may be installed on the main body of the first cartridge body wall I1210 through the fixing part II330. That is, two installation parts II334 may be inserted into two installation grooves II280 respectively, and the installation grooves II280 may be locked with the elastic hook portions II3341 to realize locking. The installation protrusion II335 may be inserted into the installation hole II290. The diameter of the cylindrical outer circumferential surface of the other end of the installation protrusion II335 away from the side wall I1336 may be configured to be smaller than the diameter of the cylindrical outer circumferential surface of one end of the installation protrusion II335 fixed on the side wall I1336, such that the installation protrusion II335 may be easier to insert into the installation hole II290. In addition, the diameter of the cylindrical outer peripheral surface of one end of the installation protrusion II335 fixed on the side wall I1336 may be adapted to the diameter of the installation hole II290, thereby ensuring that the installation protrusion II335 may be more securely assembled with the installation hole 120.

The user may simultaneously apply the force to two hook portions II3341 toward the direction that two hook portions II3341 approach each other, such that the ends of two hook portions II3341 may pass through two installation grooves II280 and apply the force to two hook portions II3341 toward the direction away from two installation grooves II280, push two hook portions II3341 out of two installation grooves II280. Furthermore, the unlocking of the hook portion II3341 and the installation groove 11280 may be realized, and the removal of the pressing unit 40 and the first cartridge body wall I1210 may be also completed.

In one embodiment, the pressing part II310 may be optionally configured as a structure that does not limit the installation, removal and operation of the process cartridge. The pressing part II310 and the fixing part II330 may be selected from plastic parts or metal parts, and the like. In one embodiment, there is no limitation on the materials of the pressing part II310 and the fixing part II330, as long as the material does not affect the installation, deformation and restoration of the pressing part II310 and the deformable part II320. In addition, each part included in above-mentioned pressing unit may be optionally configured as an integrated part.

The deformable portion II320 may not be limited in the present disclosure. The deformation of the deformable portion II320 may be achieved by setting the pressing part II310 as a deformable portion instead of the deformable portion II320 in addition to its own elastic force. The pressing part II310 may be a steel sheet with a certain flexibility (which may push the driving unit 1080 to be coaxially-aligned).

Using the pressing unit 40 provided in one embodiment, the operation principle of forcing the driving unit 1080 provided in the electronic image-forming apparatus 100 to be in contact with or disengaged from the force receiving unit 21 may be same as that of embodiment one, which may not be described in detail herein.

Embodiment Thirty Seven

As the description of one embodiment, only the difference from embodiment thirty three and embodiment thirty six of above-mentioned process cartridge is described below.

As shown in FIG. 197, the pressing unit 40 may include a pressing part JJ310 and a deformable part JJ320. In order to realize independent detachable installation of the pressing unit 40, the process cartridge may further include a fixing part JJ330. The function and structure of the fixing part JJ330 in one embodiment may be similar to the fixing part II330 in embodiment three. An accommodating chamber JJ331 may be disposed on the main body of the fixing part JJ330 for receiving the pressing unit 40. Installation holes JJ332 may be opened symmetrically on two opposite side walls of the accommodating chamber JJ331.

The pressing part JJ310 may include a pressing portion JJ340 and a connecting portion JJ350, and the pressing portion JJ340 and the connecting portion JJ350 may be independently detached and connected.

As shown in FIG. 198, the pressing portion JJ340 may include a locking portion JJ342, a recessed portion JJ341, a support portion JJ343 and an extending portion JJ344 which are connected to each other. The locking portion JJ342 may be disposed at the side of the end of the pressing portion JJ340. For example, the sequential relationship of the locking portion JJ342 extending along the B direction as shown in FIG. 198 may be as follows: the locking portion JJ342 may be connected to the recessed portion JJ341 along the B direction; the recessed portion JJ341 may be connected to the support portion JJ343 along the B direction; and the extending portion JJ344 may extend from an end of the support portion JJ343 away from the locking portion JJ342. The extending portion JJ344 may be farthest from the locking portion JJ342 along the direction B.

In one embodiment, the connecting portion JJ350 may be optionally configured as a cylindrical structure, and the width of the recessed portion JJ341 may be adapted to the width of the accommodating chamber JJ331. During installation, the user may first assemble the pressing portion JJ340 and the fixing part JJ330, that is, the recessed portion JJ341 of the pressing portion JJ340 may be accommodated in the accommodating chamber JJ331, and the locking portion JJ342 may be locked in the locking groove JJ337 disposed on the side wall JJ336 of the accommodating chamber JJ331, which may be configured to fix the pressing portion JJ340; and the support portion JJ343 may be supported on the upper end of the first side JJ338 of the fixing part JJ330. The connecting portion JJ350 may be accommodated in the recessed portion JJ341, such that the pressing portion JJ340 may move back and forth around the connecting portion JJ350. The deformable part JJ320 may be sleeved on the main body of the connecting portion JJ350, thereby completing the installation between the deformable part JJ320 and the connecting portion JJ350; and such two parts may be taken as a whole, and two cylindrical ends corresponding to the connecting portion JJ350 may be inserted into symmetrically opened installation holes JJ332 on two opposite side walls of the accommodating chamber JJ331. At this point, a part of the pressing portion JJ340 may be installed in the accommodating chamber JJ331, and the deformable part JJ320 and the connecting portion JJ350 may be accommodated in the accommodating chamber JJ331 as a whole and located on the upper side of the recessed portion JJ341 of the pressing portion JJ340. Furthermore, the installation between the deformable part JJ320, the fixed part JJ330, the pressing portion JJ340 and the connecting portion JJ350 may be completed. The accommodating chamber JJ331 may limit the deformable part JJ320, a part of the pressing portion JJ340 and the connecting portion JJ350 between its two opposite side walls, which may prevent the deformable portion JJ320 and the pressing part JJ310 from falling, position shifting and the like during the repeated movement which may affect the working effect of the pressing unit 40.

It should be noted that the deformable part JJ320 may be optionally a torsion spring, and the deformable part JJ320 may also be configured as other deformable structures or parts for adapting to different pressing units 40 and process cartridges 1.

As shown in FIGS. 197-198, at least one protruding installation part JJ334 may be disposed at the end wall JJ333 of the fixing part JJ330 along the axial direction of the developing roller 30. In one embodiment, there may be, optionally, two installation parts JJ334. Two installation parts JJ334 may protrude respectively on two end walls JJ333 of the fixing part JJ330 in a symmetrical manner, and the ends of two installation parts JJ334 may be further disposed with hook portions JJ3341 bent toward the end walls JJ333.

At least one protruding installation protrusion JJ335 may be disposed at the side wall JJ336 of the fixing part JJ330 along the direction in parallel with the axis of the developing roller 30. In one embodiment, there may be, optionally, one installation protrusion JJ335; and one protruding installation protrusion JJ335 may be disposed at the side wall JJ336 and located between two corresponding installation parts JJ334. The installation protrusion JJ335 may protrude from the outer surface of the side wall JJ336 toward the direction away from the side wall JJ336. In one embodiment, the installation protrusion JJ335 may be optionally configured as a cylinder; and the diameter of the outer circumferential surface of the main body of the installation protrusion JJ335 may gradually decrease toward the direction away from the side wall JJ336, that is, the diameter of the outer cylindrical surface of one end of the installation protrusion JJ335 fixed on the side wall JJ336 may be greater than the diameter of the outer cylindrical surface of the other end of the installation protrusion JJ335 away from the side wall JJ336.

It should be noted that, in one embodiment, the hook portion JJ3341 may have elasticity, and/or two installation parts JJ334 may have elasticity, and/or the installation protrusion JJ335 may have elasticity.

Using the pressing unit 40 provided in one embodiment, the operation principle of forcing the driving unit 1080 disposed in the electronic image-forming apparatus 100 to be contact with or disengaged from the force receiving unit 21 may be same as that in embodiment one, which may not be described in detail herein.

When the door cover of the electronic image-forming apparatus 100 is closed and the process cartridge 1 is in the working state, the driving unit 1080 may be at the coaxially-aligned state due to the external force received from the pressing unit 40, thereby realizing that the driving unit 1080 may be in contact and cooperated with the force receiving unit 21. The force receiving unit 21 of the process cartridge 1 may finally receive the driving force of the driving unit 1080 in the substantially coaxial state, and another gear portion on the driving unit 1080 may be engaged with the developing roller gear 31. At this point, the elastic deformation of the deformable part JJ320 may force a part of the pressing portion JJ340 to move to be abutted against the driving unit protective cover (blocking wall) 1081, such that the extending portion JJ344 may be no longer in contact with the driving unit 1080. Therefore, the driving unit 1080 may not generate friction or even interfere with the pressing portion JJ340 when rotating, and subsequent normal printing work may be performed.

In one embodiment, the pressing part JJ340 may be optionally configured as a structure that does not limit the installation, removal and operation of the process cartridge. The pressing part JJ340 and the fixing part JJ330 may be selected from plastic parts or metal parts, and the like. In one embodiment, there is no limitation on the materials of the pressing part JJ340 and the fixing part JJ330, as long as the material does not affect the installation, deformation and restoration of the pressing part JJ340 and the deformable part JJ320. In addition, each part included in above-mentioned pressing unit may be optionally configured as an integrated part.

The deformable portion JJ320 may not be limited in the present disclosure. The deformation of the deformable portion JJ320 may be achieved by setting the pressing part JJ340 as a deformable portion instead of the deformable portion JJ320 in addition to its own elastic force. The pressing part JJ340 may be a steel sheet with a certain flexibility (which may push the driving unit 1080 to be coaxially-aligned).

Embodiment Thirty Eight

As the description of one embodiment, only the difference from the thirty-third to thirty-seventh embodiments above is described below.

As shown in FIGS. 199-200, an installation portion for installing the pressing unit 40 may be disposed on the first end (not shown in drawings) of the waste toner cartridge 12 or on the first cartridge body wall KK100*b* of the toner cartridge 11.

As shown in FIGS. 200-202, the process cartridge 1 may further include a fixing part KK163. The fixing part KK163 may include an end wall KK163*c* close to the first cartridge body wall KK100*b* of the toner cartridge 11, and the end wall KK163*c* may be respectively disposed with at least one installation part KK1633 and an installation protrusion KK1634. At least one installation part KK1633 and the installation protrusion KK1634 may be disposed at the same side. At least one installation part KK1633 and the installation protrusion KK1634 may both protrude from the surface of the end wall KK163*c* and respectively extend away from the end wall KK163*c*. In one embodiment, there may be, optionally, two installation portions KK1633, that is, two installation portions KK1633 may be disposed at two ends of the end wall KK163*c* of the fixing part KK163. Two installation portions KK1633 may protrude from the outer surface of the end wall KK163*c* along the Y axis toward the direction away from the end wall KK163*c*. The outer ends of two installation portions KK1633 may be also disposed with hook portions KK1635 bent toward the end wall KK163*c*.

In one embodiment, the installation protrusion KK1634 may be optionally configured as a cylinder, and the installation protrusion KK1634 may extend away from the end wall KK163*c* along the Y direction. In addition, the diameter of the outer peripheral surface of the outer end of the main body of the installation protrusion KK1634 may gradually decrease toward the direction away from the end wall KK163*c*, which may be understood as that the diameter of the cylindrical outer peripheral surface at one end of the installation protrusion KK1634 fixed on the end wall KK163*c* may be larger than the diameter of the cylindrical outer peripheral surface of the other end of the installation protrusion KK1634 away from the end wall KK163*c*.

As shown in FIGS. 200-202, at least one installation groove KK131 and at least one installation hole KK132 may be opened on the end surface corresponding to the front side of the installation portion. In one embodiment, at least one installation groove KK131 and at least one installation hole KK132 may be formed on the end surface of the first cartridge body wall KK100*b* of the toner cartridge 11. When the pressing unit 40 is installed, at least one installation part KK1633 may be cooperated with at least one installation groove KK131, and at least one installation protrusion KK1634 may be cooperated with at least one installation hole KK132. In one embodiment, the number of installation grooves KK131 may be, optionally, two, and the number of installation holes KK132 may be, optionally, one; two installation grooves KK131 may be locked with two installation portions KK1633, and the installation protrusions KK1634 may be inserted into the installation holes KK132.

During the installation process of the pressing unit 40 provided in one embodiment, two installation portions KK1633 and the installation protrusions KK1634 disposed on the fixing part KK163 of the pressing unit 40, and two installation grooves KK131 and the installation holes KK132 disposed on the toner cartridge 11 may be configured to complete the installation of the pressing unit 40 and the toner cartridge. That is, two installation portions KK1633 may be respectively inserted into two installation grooves KK131, which may be locked by the elastic hook portions KK1635, and the installation protrusions KK1634 may be inserted into the installation holes KK132. Since the diameter of the cylindrical outer peripheral surface of the other end of the installation projection KK1634 away from the end wall KK163*c* is configured to be smaller than the diameter of the cylindrical outer peripheral surface of one end of the installation projection KK1634 fixed on the end wall KK163*c*, the installation protrusions KK1634 may be easily inserted into the installation holes KK132. In addition, the diameter of the outer circumference of the cylinder at one end of the installation protrusion KK1634 fixed on the end wall KK163*c* matches the diameter of the installation hole KK132, such that more secure installation of the installation protrusions KK1634 and the installation holes KK132 may be ensured. During the operation, it may only need to hold two hook portions KK1635 and apply the force to two hook portions KK1635 toward the direction that two hook portions KK1635 approach each other, and make the ends of two hook portions KK1635 to pass through two installation grooves KK131 along the Y-axial direction; then apply the force to two hook portions KK1635 toward the direction away from two installation grooves KK131, and push two hook portions KK1635 out of two installation grooves KK131. Furthermore, unlocking of the hook portions KK1635 and the installation grooves KK131 may be realized, and removal of the pressing unit 40 and the cartridge body 100 may be also completed.

Through the pressing unit 40 provided in one embodiment, the operation principle of forcing the driving unit 1080 provided in the electronic image-forming apparatus 100 to be contact/engaged or disengaged with the force receiving unit 21 disposed on the process cartridge 1 may be same as that of the thirty-third to thirty-seventh embodiments, which may not be described in detail herein.

Embodiment Thirty Nine

As the description of one embodiment, the difference from the thirty-third and thirty-eight embodiments is described below.

The pressing unit 40 may be detachably installed on the toner cartridge 11, and the force receiving unit 21 may perform protruding/retracting movement along the axial direction on the waste toner cartridge 12. After the driving unit 1080 is coaxially-aligned from the inclined state to the coaxially-aligned state using the pressing unit 40, the force receiving unit 21 may protrude out to be engaged with the driving unit 1080.

It should be noted that, in technical solutions provided by above-mentioned embodiments, the driving unit provided in the electronic image-forming apparatus 100 and the force receiving unit disposed on the process cartridge may be accurately and quickly engaged with each other to transfer force, thereby improving working efficiency of the process cartridge. In addition, since the waste toner cartridge and the toner cartridge are installed in a detachable manner, it is convenient to recycle the process cartridge and replace the waste toner cartridge and the toner cartridge separately, which may effectively avoid structural interference generated during the contact and mess process of the driving unit and the force receiving unit, which may result in printing problems caused by poor installation. Meanwhile, the user may replace the waste toner cartridge and the toner cartridge separately according to needs, which may save the user's use cost.

In addition, the pressing parts and the process cartridges provided in embodiment thirty three to embodiment thirty nine may be installed in a detachable manner, which may have the advantages of simple process technology of parts, convenient installation and maintenance, and low cost.

Embodiment Forty

In some process cartridges in the existing technology, there is a lack of a mechanism for controlling the contact or separation of the developing roller and the photosensitive drum, which may seriously affect the printing quality of the electronic image-forming apparatus; the installation units in the existing split-type process cartridge are mostly rigidly connected by fixed protrusions, which may be subject to relatively large frictional resistance when the process cartridge is installed, resulting in unsmooth installation and inconvenient operation. In addition, during frequent installation of the split-type process cartridge, the installation units rigidly connected by the fixed protrusions may apply an instantaneous impact force on the photosensitive drum, thereby causing damage to the photosensitive layer of the photosensitive drum and further affecting the printing quality of the printer.

In order to better describe each part in one embodiment, the three-dimensional concepts of X, Y, and Z axes are introduced into one embodiment, and each part of one embodiment is described in detail. The length direction of the process cartridge 1 is the X axis, the vertical direction perpendicular to the X axis is the Z axis, and the horizontal direction perpendicular to the X axis is the Y axis; the plane formed by the X axis and the Z axis is the XZ plane, the plane formed by the X axis and the Y axis is the XY plane, and the plane formed by the Y axis and the Z axis is the YZ plane. Moreover, in combination with FIG. 1, the positive direction of the X-axis is the right side direction, and the opposite direction is the left side direction; the positive direction of the Z-axis is the upper side direction, and the opposite direction is the lower side direction; and the positive direction of the Y axis is the front side direction, and the opposite direction is the rear side direction. It should be noted that when defining the positions of the outer side and the inner side, the part itself is used as the reference, the side away from the part itself is the outer side, and the side close to the part itself is the inner side.

As shown in FIGS. 203 and 204, embodiments of the present disclosure provide the process cartridge 1 for providing development for the electronic image-forming apparatus 100. The electronic image-forming apparatus 100 may be configured with the driving unit 1080 which may be connected to the process cartridge 1 to drive the process cartridge 1 to operate. The process cartridge 1 may include the waste toner cartridge 12, where the waste toner cartridge 12 may be configured with the photosensitive drum 20, and the photosensitive drum 20 may be located at the front end of the waste toner cartridge 12; and also include the toner cartridge 11, where the toner cartridge 11 may be configured with the developing roller 30, and the developing roller 30 may be located at the front end of the toner cartridge 11. The developing roller 30 and the photosensitive drum 20 may be arranged in parallel with each other.

The process cartridge 1 may further include at least one pushing unit MM900. The pushing unit MM900 may be disposed on the first rear wall MM110 of the waste toner cartridge 12 away from the photosensitive drum 20. During the installation process of the waste toner cartridge 12 and the toner cartridge 11, the pushing unit MM900 may be abutted against the first surface portion MM210 of the toner cartridge 11, and the pushing unit MM900 may apply the force to the waste toner cartridge 12 toward the developing roller 30, forcing the photosensitive drum 20 to contact the developing roller 30, thereby improving the printing quality of the electronic image-forming apparatus 100.

As shown in FIG. 203, the process cartridge 1 may further include the force receiving unit for receiving force from the driving unit 1080. The force receiving unit may be respectively connected to the photosensitive drum 20 and the developing roller 30. The force receiving component may include the force receiving unit 21 and the developing roller gear 31. In one embodiment, the force receiving unit 21 may be optionally configured as a twisted protrusion structure; the force receiving unit 21 may be disposed at the waste toner cartridge 12 and connected to the photosensitive drum 20; the developing roller gear 31 may be disposed at the toner cartridge and connected to the developing roller 30; and the developing roller gear 31 may be optionally a helical gear structure. The force receiving unit may drive the photosensitive drum 20 and the developing roller 30 through above structure.

As shown in FIGS. 203-206, the waste toner cartridge 12 may be configured with the first side wall MM120 and the second side wall MM130 which are opposite to each other in the left and right directions. The first side wall MM120 and the second side wall MM130 may be arranged symmetrically along the X direction; and the first side wall MM120 and the second side wall MM130 may cover two side surfaces of the waste toner hopper MM140 disposed on the waste toner cartridge 12. After the process cartridge 1 completes one printing operation, the cleaning device (not shown) provided in the waste toner cartridge 12 may scrape off the residual developer attached to the surface of the photosensitive drum 20 and transport the residual developer to the waste toner hopper MM140 for storage. The first side wall MM120 and the second side wall MM130 may respectively include the first extension wall MM121 and the second extension wall MM131 extending away from the photosensitive drum 20. The waste toner cartridge 12 may be configured with the first rear wall MM110 on the opposite side away from the photosensitive drum 20; and the first side wall MM120 and the second side wall MM130 may be respectively perpendicular to the first rear wall MM110.

Furthermore, as shown in FIGS. 203-206, the process cartridge 1 may further include at least one pushing unit MM900. In one embodiment, the number of pushing units MM900 may be optionally two. One end of any one of two pushing units MM900 may be configured on the first rear wall MM110, and the other end may be configured on any one of the first extension wall MM121 or the second extension wall MM131. Two pushing units MM900 may be arranged symmetrically along the centerline of the waste toner cartridge 12 perpendicular to the axis of the photosensitive drum 20.

The pushing unit MM900 may include a support portion MM910, an elastic part MM920 and a moving portion MM930. The support portion MM910, the elastic part MM920 and the moving portion MM930 may be assembled in a detachable manner. One end of the support portion MM910 may be disposed adjacent to the first rear wall MM110 of the first extension wall MM121 or the second extension wall MM131. The support portion MM910 may be configured with a reinforcing portion MM911 on the upper surface perpendicular to the axial direction of the photosensitive drum 20. The pushing-acting portion MM911 may be configured to strengthen the strength of the support portion MM910, thereby preventing the parts on the pushing unit MM900 from being damaged during frequent use.

The lower end of the support portion MM910 along the direction perpendicular to the axis of the photosensitive drum 20 may be configured with an accommodating chamber MM912 extending along the Z direction toward the lower surface of the support portion MM910. In one embodiment, the accommodating chamber MM912 may be optionally configured as a cylindrical hollow structure. At least one opening MM9121 may be provided at intervals along the cylindrical outer wall of the accommodating chamber MM912. The opening MM9121 may be perpendicular to the axis of the photosensitive drum 20 at a position adjacent to the lower surface of the support portion MM910 on the accommodating chamber MM912 and extend to the limiting portion MM9122 along the direction away from the lower surface of the support portion MM910. In the installed state of the pushing unit MM900, the elastic part MM920 may be accommodated in the accommodating chamber MM912.

As shown in FIG. 203, in one embodiment, the moving portion MM930 may be optionally configured as a cylindrical hollow structure. The main body of the moving portion MM930 may be configured with an accommodating chamber MM931, and the inner circumference of the accommodating chamber MM931 may be larger than the outer circumference of the accommodating chamber MM912. When the pushing unit MM900 is installed, the moving portion MM930 may be sleeved on the lower end of the support portion MM910, and the accommodating chamber MM912 may be partially accommodated in the accommodating chamber MM931.

In one embodiment, the outer peripheral wall of the accommodating chamber MM931 may be optionally configured as a locking portion MM932 and a support portion MM933 disposed at intervals. The locking portion MM932 and the support portion MM933 may extend along the Z direction from the bottom side of the accommodating chamber MM931 toward the direction away from the bottom of the accommodating chamber. The locking portion MM932 may be configured with a bending portion MM9321 extending toward the inner direction of the accommodating chamber MM931 at the end facing away from the bottom of the accommodating chamber MM931. The width of the bending portion MM9321 may be adapted to the width of the opening MM9121. In the installed state of the pushing unit MM900, the bending portion MM9321 may be locked into the opening MM9121, thereby realizing the installation of the moving portion MM930 and the support portion MM910. At this point, the elastic part MM920 may be accommodated in the accommodating chamber MM912 of the support portion MM910; and the accommodating chamber MM912 of the support portion MM910 and the elastic part MM920 may be both accommodated in the moving portion MM930.

When a force perpendicular to the Z direction is applied to the bottom of the moving portion MM930, the moving portion MM930 may slide up and down along the opening MM9121 disposed on the support portion MM910 through the bending portion MM9321 and apply the force to the waste toner cartridge 12 toward the developing roller 30, forcing the photosensitive drum 20 to contact the developing roller 30. The limiting portion MM9122 disposed on the accommodating chamber MM912 under the opening MM9121 may be configured to limit the movement range of the bending portion MM9321 inside the moving portion MM930 in the opening MM9121, which may prevent the moving portion MM930 from falling off from the accommodating chamber MM912.

It should be noted that, in one embodiment, the number of at least one pushing unit MM900 may be optionally multiple. A plurality of pushing units MM900 may be symmetrically disposed at the first rear wall MM110 along the centerline of the waste toner cartridge 12 perpendicular to the axial direction of the photosensitive drum 20. As disclosed in one embodiment, the support portion MM910 may also be disposed at any position on the main body of the first rear wall MM110 for adapting to different process cartridges 1 and electronic image-forming apparatuses 100. In addition, in the structure of the pushing unit MM900 provided in one embodiment, only the support portion MM910 and the pushing-acting portion MM911 may be in contact with the first rear wall MM110; the moving portion MM930 may be a movable part; and in the installed state of the pushing unit MM900, the moving portion MM930 may not be in contact with the first rear wall MM110, the first extension wall MM121, and the second extension wall MM131.

Furthermore, as shown in FIGS. 205-208, a toner hopper (not shown in drawings) may be disposed in the toner cartridge 11. The upper side of the toner cartridge 11 may be configured with the first surface portion MM210; and the first surface portion MM210 may cover the upper side of the toner hopper (not shown in drawings) disposed in the toner cartridge 11. One end of the first surface portion MM210 may be adjacent to the developing roller 30, and the other end may be connected to the second rear wall MM220 on the opposite side away from the developing roller 30. The second rear wall MM220 may cover the rear side of the toner hopper; and the first pushing-acting portion may be disposed on the first surface portion MM210 adjacent to the second rear wall MM220. In one embodiment provided in the present disclosure, the first pushing-acting portion may be optionally configured as at least one abutting portion MM211. The number of the abutting portion MM211 may be optionally two, and two abutting portions MM211 may protrude from the surface of the first surface portion MM210 toward the direction away from the first surface portion MM210. Two ends of the toner cartridge 11 along the axial direction of the developing roller 30 may be respectively disposed with the first cartridge body wall MM230 and the second cartridge body wall MM240. That is, the first cartridge body wall MM230 and the second cartridge body wall MM240 may be arranged opposite to each other along the X-axial direction. The first cartridge body wall MM230 and the second cartridge body wall MM240 may be respectively perpendicular to the second surface portion MM220 along the axial direction of the developing roller. The first cartridge body wall MM230 and the second cartridge body wall MM240 may cover two side surfaces of the toner hopper. The toner hopper (not shown in drawings) may be configured for storing the developer and transporting the developer to the photosensitive drum 20 through the toner feeding roller (not shown in drawings) and the developing roller 30 during the printing process of the process cartridge 1, such that the electrostatic latent image formed on the surface of the photosensitive drum 20 may be developed and converted into a developed image.

After the waste toner cartridge 12 and the toner cartridge 11 are assembled, two pushing units MM900 on the waste toner cartridge 12 may be abutted against two abutting portions MM211 on the toner cartridge 11. Two abutting portions MM211 may apply the force on the waste toner cartridge 12 toward the developing roller 30 through the pushing units MM900, forcing the waste toner cartridge 12 to move toward the developing roller 30, such that the photosensitive drum 20 and the developing roller 30 may be in contact with each other.

It should be noted that the number of the abutting portions MM211 provided in one embodiment may be multiple, and the structure of the abutting portion MM211 may also be configured as other structures for adapting to different pushing units MM900. In addition, the configured quantity of the abutting portions MM211 provided in one embodiment may need to be consistent with the configurated quantity of the pushing units MM900.

Furthermore, as shown in FIGS. 204-210, the toner cartridge 11 provided in one embodiment may be detachably connected to the waste toner cartridge 12. The waste toner cartridge 12 and the toner cartridge 11 may be separated to facilitate the recycling of the process cartridge 1 and the replacement of the waste toner cartridge 12 and the toner cartridge 11.

The toner cartridge 11 provided in one embodiment may include a guide unit MM620, the waste toner cartridge 12 may include an installation unit (not shown in drawings). The installation unit of the waste toner cartridge 12 may be independently detachably connected to the toner cartridge 11 along the guide unit MM620. For example, the installation unit may be cooperated with the guide unit MM620 in a rolling manner to reduce the friction generated during the installation process of the waste toner cartridge 12 and the toner cartridge 11, such that entire installation process may be smoother, and damage to the parts in the clutch unit caused by friction may be avoided.

As shown in FIGS. 207-210, the installation unit may be disposed at the outer surfaces of the first side wall MM120 and the second side wall MM130 of the waste toner cartridge 12, and the guide unit MM620 may be disposed at inner surfaces of the first cartridge body wall MM230 and the second cartridge body wall MM240 of the toner cartridge 11. In one embodiment, the installation unit may be configured as a rolling structure, and the installation unit and the guide unit MM620 may be separated and cooperated. The installation unit and the guide unit MM620 may be installed on the waste toner cartridge 12 and the toner cartridge 11 in a manner of separation and cooperation.

As shown in FIGS. 205-206, the installation unit MM610 may include the first installation portion MM611; the first installation portion MM611 may be disposed at the first side wall MM120 at the position adjacent to the force receiving unit 21; the first installation portion MM611 may include the first connecting portion MM6111 and the first rolling part MM6112; and one end of the first connecting portion MM6111 may be disposed at the first side wall MM120 adjacent to the developing roller gear 31, and the other end may be configured as a free end extending away from the first side wall MM120. In one embodiment, the first connecting portion MM6111 may be optionally configured as a cylindrical structure. The first connecting portion MM6111 may include the first main body portion MM61111 and the first outline portion MM61112. The outer circumference of the first main body portion MM61111 may be smaller than the outer circumference of the first outline portion MM61112. The first main body portion MM61111 may be configured with a groove hole MM61113. The groove hole MM61113 may extend, from the end surface of the free end of the first outline portion MM61112 away from the first side wall MM120 toward the direction close to the first side wall MM120, to a stopping portion MM61115 disposed in the middle of the first body portion MM61111. Furthermore, a part of the first connecting portion MM61111 may be configured as at least one locking portion MM61114. It should be noted that the first connecting portion MM6111 and the first rolling part MM6112 provided in one embodiment may be optionally made of elastic materials. The number of locking portions MM61114 may be optionally two. During the installation process of the first connecting portion MM6111 and the first rolling part MM6112, the user may hold two locking portions MM61114 and apply the force to two locking portions MM61114 toward the direction close to two locking portions MM61114. Firstly, the first rolling part MM6112 may be sleeved on the first outline portion MM61112 corresponding to two locking portions MM61114, and then apply the force to the first rolling part MM6112 to move the first rolling part MM6112 to the first main body portion MM61111. The outer circumference of the first rolling part MM6112 is smaller than the outer circumference of the first outline portion MM61112. Therefore, the first outline portion MM61112 may limit the movement position of the first rolling part MM6112 sleeved on the first connecting portion MM6111 to prevent the first rolling part MM6112 from falling off from the first connecting portion MM6111 during movement.

Furthermore, as shown in FIG. 203, a positioning block MM124 may be disposed on the first side wall MM120 of the waste toner cartridge 12 adjacent to the upper side of the force receiving unit 21, which may be configured for installing and positioning the waste toner cartridge 12 after the waste toner cartridge 12 is installed into the designated position in the electronic image-forming apparatus 100.

As shown in FIGS. 206 and 210, the installation unit may further include the second installation portion MM612. The second installation portion MM612 may be disposed at the second side wall MM130 at the position coincident with the axis of the photosensitive drum 20. The second installation portion MM612 may include the second connecting portion MM6121 and the second rolling part MM6122. A communication hole MM132 may be formed on the second side wall MM130, and the communication hole MM132 may be communicated with the rotation shaft of the photosensitive drum 20. In one embodiment, the second connecting portion MM6121 may be optionally configured as a cylindrical structure. The second connecting portion MM6121 may include the second main body portion MM61211 and the second outline portion MM61212. The outer circumference of the second main body portion MM61211 may be smaller than the outer circumference of the second outline portion MM61212. Along the axial direction of the photosensitive drum 20, the axis of the second connecting portion MM6121 may be coincident completely with the axis of the photosensitive drum 20.

It should be noted that the second connecting portion MM6121 provided in one embodiment may also be fixedly disposed at the toner cartridge 11. The first installation portion MM611 and the second installation portion MM612 may also be configured in other structures for adapting to different process cartridges 1. In addition, the second outline portion MM61211 provided in one embodiment may be made of conductive material.

Furthermore, as shown in FIGS. 207-210, the guide unit MM620 may include the first installation slide MM621 and the second installation slide MM622. The first installation slide MM621 may be disposed at the inner surface of the first cartridge body wall MM230, and the second installation slide MM622 may be disposed at the inner surface of the second cartridge body wall MM240. The guide unit MM620 may be configured as the first installation slide MM621 and the second installation slide MM622, which may be cooperated with the first installation portion MM611 and the second installation portion MM612, thereby realizing the installation of the waste toner cartridge 12 and the toner cartridge 11. The first installation slide MM621 and the second installation slide MM622 may be respectively disposed at the inner surface of the first cartridge body wall MM230 and the inner surface of the second cartridge body wall MM240 in a symmetrical manner relative to the centerline of the toner cartridge 11.

As shown in FIGS. 207-210, along the direction perpendicular to the axis of the developing roller 30, the first installation slide MM621 may extend from one end of the first cartridge body wall MM230 away from the developing roller 30 toward another end of the first cartridge body wall MM230 close to the developing roller 30; and the second installation slide MM622 may extend from one end of the second cartridge body wall MM240 away from the developing roller 30 to the other end of the second cartridge body wall MM240 close to the developing roller 30.

As shown in FIGS. 207-210, the first installation slide MM621 may be optionally configured as, on the first cartridge body wall MM230, extending along the Y-axial direction from one end away from the pressing unit 40 disposed in the process cartridge 1 toward the other end close to the pressing unit 40. The width of the first installation slide MM621 may be adapted to the outer circumference size of the first outline portion MM61112 disposed on the first side wall MM120 of the waste toner cartridge 12. When the waste toner cartridge 12 and the toner cartridge 11 are assembled, the first outline portion MM61112 may be abutted against the upper and lower rails of the first installation slide MM621 respectively; and along the extending direction of the first installation slide MM621, may slide from one end corresponding to the first cartridge body wall MM230 away from the pressing unit 40 disposed at the first cartridge body wall MM230 toward the other end of the first cartridge body wall MM230 close to the pressing unit 40.

As shown in FIG. 210, the second installation slide MM622 may be optionally configured as extending from one end away from the developing roller 30 to the other end close to the developing roller 30 along the Y-axial direction on the second cartridge body wall MM240. The second installation slide MM622 may be further configured with a blocking portion MM6221 at one end close to the developing roller 30. The blocking portion MM6221 may be configured to limit the movement range of the second installation portion MM620 on the second installation slide MM622. The width of the second installation slide MM622 may be adapted to the outer circumference dimension of the second outline portion MM61212 of the second installation portion MM612 disposed on the second side wall MM130. Moreover, the size of the blocking portion MM6221 may be adapted to the outer circumference of the second installation portion MM612, and a hole-shaped structure MM6222 may be disposed on the corresponding sidewall of the blocking portion MM6221 along the axis of the photosensitive drum 20.

When the waste toner cartridge 12 is cooperated with the toner cartridge 11, the waste toner cartridge 12 may slide to the designated installation position of the toner cartridge 11 along the first installation slide MM621 and the second installation slide MM622 in a rolling manner through the first installation portion MM611 and the second installation portion MM612 respectively. When the waste toner cartridge 12 and the toner cartridge 11 are assembled, the second installation portion MM612 may slide along the second installation slide MM622 until the second installation portion MM612 is locked with the blocking portion MM6221.

When the waste toner cartridge 12 and the toner cartridge 11 are assembled, the second outline portion MM61212 may be accommodated in the blocking portion MM6221, and the projections of the second outline portion MM61212 and the hole-shaped structure MM6222 along the axial direction of the photosensitive drum 20 may be completely coincident with each other. The process cartridge 1 may be configured with a conductive part (not shown) inserted in the hole-shaped structure MM6222. In such way, one end of the conductive part may be electrically connected to the second outline portion MM61212 through the hole-shaped structure MM6222, and the other end of the conductive part may be electrically connected to the conductive terminal provided in the electronic image-forming apparatus 100. The second outline portion MM61212 may be connected to the rotation shaft of the photosensitive drum 20, that is, the conductive terminal provided in the electronic image-forming apparatus 100 may supply the force to the photosensitive drum 20 through the conductive part and the second outline portion MM61212.

Furthermore, as shown in FIGS. 207-210, the process cartridge 1 provided in one embodiment may further include the pressing unit 40, which may be disposed at the process cartridge 1. One end of the pressing unit 40 may be detachably installed on the first cartridge body wall MM230 of the toner cartridge 11, and the other end may extend toward the developing roller 30. After the waste toner cartridge 12 and the toner cartridge 11 are assembled, the other end of the pressing unit 40 may extend toward the axis of the force receiving unit 21. When the process cartridge 1 is installed in the electronic image-forming apparatus 100, the other end of the pressing unit 40 may contact the driving unit 1080 of the electronic image-forming apparatus 100 and apply the force to force the driving unit 1080 to be engaged with or separated from the force receiving unit 21.

As shown in FIGS. 207-210, the pressing unit 40 may include the pressing part MM310 and the deformable portion MM320. The pressing part MM310 and the deformable portion MM320 may be assembled in a detachable manner. The pressing part MM310 and the deformable portion MM320 may be assembled on the toner cartridge 11 in a detachable manner. The installation portion MM260 may be disposed at the end of the first cartridge body wall MM230 close to the upper side of the developing roller 30 on the toner cartridge 11, and the pressing part MM310 and the deformable portion MM320 may be detachably installed on the installation portion MM260. The main body of the installation portion MM260 may be respectively configured with an assembling chamber MM261 and a receiving portion MM262; and the assembling chamber MM261 and the receiving portion MM262 may be adjacently arranged. When the pressing unit 40 is installed, a part of the pressing part MM310 may be accommodated in the assembling chamber MM261, and the deformable portion MM320 may be accommodated in the receiving portion MM262. In addition, one end of the deformable portion MM320 may be sleeved on the protruding portion MM2621 disposed on the bottom surface of the receiving portion MM262. Two opposite end walls MM263 of the assembling chamber MM261 may be symmetrically configured with installation holes MM2631, and the opening direction of two installation holes MM2631 may be the X-axial direction. The pressing part MM310 may be installed by disposing the installation hole MM2631; and the pressing part MM310 and the deformable portion MM320 may be respectively accommodated through the assembling chamber MM261 and the receiving portion MM262, which may protect the pressing part MM310 and the deformable portion MM320 and prevent the pressing part MM310 and the deformable portion MM320 from falling off.

The pressing part MM310 may include the pressing portion MM314 and a connecting portion connected to the pressing portion MM314; the first protruding portion MM311 and the second protruding portion MM312 may be arranged symmetrically on two sides of the connecting portion; the first protruding portion MM311 and the second protruding portion MM312 may also extend along the X-axis away from the main body direction of the pressing part MM310; the third protruding portion MM313 may be disposed on the rear side of the pressing part MM310; and the main body of the pressing part MM310 may extend toward the direction B to form the pressing portion MM314.

In one embodiment, the first protruding portion MM311, the second protruding portion MM312, and the third protruding portion MM313 may be optionally configured as cylindrical structures. That is, the outer surfaces of the first protruding portion MM311 and the second protruding portion MM312 may be circular; and the diameters of the outer peripheral surfaces of the first protruding portion MM311 and the second protruding portion MM312 may be adapted with the diameters of the installation holes MM2631 symmetrically formed on two opposite end walls MM263 of the assembling chamber MM261. When the pressing part MM310, the deformable portion MM320, and the installation portion MM260 are assembled, one end of the pressing part MM310 disposed with the first protruding portion MM311 and the second protruding portion MM312 may be inserted into the assembling chamber MM261; and the first protruding portion MM311 and the second protruding portion MM312 may be locked into two installation holes MM2631 respectively. One end of the deformable portion MM320 may be sleeved on the protruding portion MM2621 disposed on the bottom surface of the receiving portion MM262, and the other end may be abutted against the third protruding portion MM313 disposed on the pressing part MM310. The deformable portion MM320 may act between the outer side of the pressing part MM310 and the inside of the receiving portion MM262. The assembling chamber MM261 may limit the pressing part MM310 between its two opposite end walls MM263, and between the protruding portion MM2621 and the third protruding portion MM313 disposed on the receiving portion MM262, which may prevent the deformable portion MM320 and the pressing part MM310 from falling, position shifting and the like during repeated movement which may affect the working effect of the pressing part MM310.

As shown in FIGS. 183-187, the driving unit 1080 may be disposed at the inner side wall of the end of the installation slide rail GG50 provided in the electronic image-forming apparatus 100; the inner side wall of the end of the installation slide rail GG50 of the electronic image-forming apparatus 100 may be configured with the driving unit protective cover (blocking wall) 1081; the driving unit protective cover (blocking wall) 1081 may be disposed along the outer circumference of the driving unit 1080; and the driving unit protective cover (blocking wall) 1081 may be configured to limit the movement range of the driving unit 1080. The driving unit protective cover (blocking wall) 1081 may be configured with the connecting chamber GG31, the driving unit 1080 may be located in the connecting chamber GG31, and the driving unit protective cover (blocking wall) 1081 may be also configured with the driving unit pushing part 1090. One end of the driving unit pushing part 1090 may be connected to the main body of the electronic image-forming apparatus 100 through a spring, and the other end may be inserted into the driving unit protective cover (blocking wall) 1081 through the groove hole GG32 disposed on the driving unit protective cover (blocking wall) 1081. The driving unit pushing part 1090 may move back and forth along the radial direction of the driving unit 1080 and may provide a support force to the driving unit 1080, forcing the driving unit 1080 to keep the inclined state relative to the axial direction of the driving unit protective cover (blocking wall) 1081. At this point, the process cartridge 1 may be not installed in the electronic image-forming apparatus 100, the driving unit 1080 may be supported by the driving unit pushing part 1090 in the electronic image-forming apparatus 100 and at the inclined state relative to the axial direction of the driving unit protective cover (blocking wall) 1081; and the rotation axis L1 of the driving unit 1080 may form an angle $\alpha$ with the central axis L2 of the blocking wall.

It should be noted that the driving unit 1080 may be optionally a force output head, which may be configured to be in contact and engaged with the force receiving unit 21 disposed in the process cartridge 1 and transfer the driving force to drive the process cartridge 1 to operate. As shown in FIGS. 183-187 and 203-210, the installation process of process cartridge 1 is described hereinafter.

Through the second handle MM270 disposed on the main body of the toner cartridge 11, during the installation process of the toner cartridge 11 in the electronic image-forming apparatus 100 along the installation direction of the process cartridge 1 through the installation slide rail GG50 disposed on the inner wall of the electronic image-forming apparatus 100, the toner cartridge 11 may be not in contact with the electronic image-forming apparatus 100, such that the driving unit 1080 may continue to keep the inclined state relative to the axial direction of the driving unit protective cover (blocking wall) 1081 because there is no external force, and the driving unit continues to be supported by the driving unit pushing part 1090. The user may continue to apply the force to the toner cartridge 11 along the installation direction of the process cartridge 1. During the process of making the toner cartridge 11 continue to move to the designated installation position of the electronic image-forming apparatus 100, the pressing unit 40 may contact the driving unit 1080 through the pressing portion MM314 disposed on the pressing part MM310. Meanwhile, the driving unit 1080 may be continuously applied with an action force toward the installation direction of the process cartridge 1, that is, the driving unit pushing part 1090 may be gradually pressed down. At this point, the support force of the driving unit pushing part 1090 on the driving unit 1080 may be gradually weakened. Therefore, the driving unit 1080 may gradually fall toward the axis of the driving unit 1080 along the direction of gravity. When the pressing portion MM314 of the pressing part MM310 is abutted against the driving unit 1080, the deformable part MM320 may be deformed. When the process cartridge 1 is pushed to the designated installation position, the pressing portion MM314 of the pressing part MM310 may be completely in contact with the driving unit 1080, and the force applied may be the largest. At this point, the driving unit pushing part 1090 may be completely pressed, and the driving unit 1080 may fall along the direction of gravity due to the loss of support. The driving unit 1080 may be adjusted from the inclined state to the coaxially-aligned state.

The first handle MM150 may be disposed on the waste toner cartridge 12. During the user installing the waste toner cartridge 12 into the electronic image-forming apparatus 100 through the first handle MM150, the waste toner cartridge 12 may be installed in a designated position in the electronic image-forming apparatus 100, along the installation direction of the process cartridge 1, through the first installation portion MM611 and the second installation portion MM612 disposed on the first side wall MM120 and the second side wall MM130 along the first installation slide MM621 and the second installation slide MM622 disposed on the first cartridge body wall MM230 and the second cartridge body wall MM240 of the waste toner cartridge 12 MM240 via a rolling manner. At this point, the force receiving unit 21 may enter in the driving unit protective cover (blocking wall) 1081. Since the driving unit pushing part 1090 has been pressed down by the pressing unit 40 on the waste toner cartridge 12, that is, the driving unit 1080 is coaxially-aligned from the inclined state to the coaxially-aligned state, such that the force receiving unit 21 and the driving unit 1080 may be completely in contact and engaged with each other.

Furthermore, as shown in FIG. 203, when the waste toner cartridge 12 and the toner cartridge 11 are assembled, two pushing units MM900 on the waste toner cartridge 12 may initially contact with two abutting portions MM211 on the toner cartridge 11; and the abutting portions MM211 may gradually apply the force on the waste toner cartridge 12 toward the developing roller 30 through the pushing units MM900, forcing the waste toner cartridge 12 to move toward the developing roller 30. At this point, the elastic part MM920 disposed in the pushing unit MM900 may gradually begin to deform; and the moving portion MM930 in the pushing unit MM900 may move toward the direction away from the first surface portion MM210 of the toner cartridge 11 through the opening MM9121 formed in the accommodating chamber MM912 perpendicular to the axis of the photosensitive drum. When the waste toner cartridge 12 continues to be installed into the designated position of the electronic image-forming apparatus 100 (i.e. the designated installation position on the toner cartridge 11) along the installation direction of the process cartridge 1, the positioning block MM124 disposed on the waste toner cartridge 12 may be in contact with the positioning portion (not shown in drawings) disposed in the electronic image-forming apparatus 100; two pushing units MM900 may be in complete contact with two abutting portions MM211; and two abutting portions MM211 may apply the force to the waste toner cartridge 12 toward the developing roller 30 through two pushing units MM900 which may force the photosensitive drum 20 to be in contact with the developing roller 30.

When the driving unit 1080 is fully engaged with the force receiving unit 21, that is, when the rotation axis L1 of the driving unit 1080 is substantially coincident with the central axis L2 of the driving unit protective cover (blocking wall) 1081, one end of the pressing portion MM314 of the pressing part MM310 may be abutted against the driving unit protective cover (blocking wall) 1081, such that the pressing part MM310 may be no longer in contact with the driving unit 1080. In such way, the driving unit 1080 may not generate friction or even interfere with the pressing part MM310 when rotating. Therefore, the rotating operation of the driving unit 1080 may not be affected, and the pressing unit 40 may not be damaged.

Furthermore, when the process cartridge 1 is in the working state, the door cover of the electronic image-forming apparatus 100 may be closed; the driving unit 1080 may be in the coaxially-aligned due to the external force received from the pressing unit 40, thereby realizing the contact and engagement between the driving unit 1080 and the force receiving unit 21. The force receiving unit 21 of the process cartridge 1 may finally receive the driving force of the driving unit 1080 in a substantially coaxial state, and another gear portion disposed on the driving unit 1080 may be engaged with the developing roller gear 31. At this point, the elastic deformation of the deformable portion MM320 may force the pressing portion MM314 of the pressing part MM310 to move to be abutted against the driving unit protective cover (blocking wall) 1081. Furthermore, the pressing portion MM314 may be no longer in contact with the driving unit 1080. Therefore, the driving unit 1080 may not generate friction or even interfere with the pressing part MM310 when rotating, and subsequent normal printing work may be performed.

In one embodiment provided in the present disclosure, the pressing part MM310 may be optionally configured as the structure that does not interfere with the installation, removal and operation of the process cartridge 1. The pressing part MM310 and the installation portion MM260 may be, optionally, plastic parts, metal parts and the like. In one embodiment, there is no limitation on the materials of the pressing part MM310 and the installation portion MM260, as long as the material does not affect the installation, deformation and restoration of the pressing part MM310 and the deformable portion MM320. In addition, each structure contained in above-mentioned pressing assembly, may be optionally a molded part.

The deformable portion MM320 may not be limited in the present disclosure. The deformation of the deformable portion MM320 may be achieved by setting the pressing part MM310 as a deformable portion instead of the deformable portion MM320 in addition to its own elastic force. The pressing part MM310 may be steel sheets or other parts with a certain flexibility (which may push the driving unit 1080 to be coaxially-aligned).

It should be noted that the pushing-acting portion may be defined as the abutting portion MM211 disposed on the first surface portion MM210 of the toner cartridge 11 in one embodiment, and the number of the abutting portions MM211 may need to be adapted with the number of the pushing units MM900. In addition, there may be multiple pushing-acting portions and pushing units; and the pushing units and the pushing-acting portions may also be configured as other structures or parts to adapt to different process cartridges 1 and electronic image-forming apparatuses 100.

Embodiment Forty One

As the description of one embodiment, only the difference from above-mentioned process cartridge in embodiment forty is described below.

As shown in FIGS. 211-212, the abutting portion MM211 disposed on the first surface portion MM210 of the toner cartridge 11 may be omitted, and the abutting portion MM211 may be replaced by an abutting position NN250; and the size of the pushing unit NN900 may be increased, such that after the toner cartridge 11 and the waste toner cartridge 12 are installed, the moving portion NN930 of the pushing unit NN900 may be abutted against the abutting position NN250. In addition, when the toner cartridge 11 is installed into the electronic image-forming apparatus 100, the driving unit 1080 disposed in the electronic image-forming apparatus 100 may be coaxially-aligned by the pressing unit 40 disposed on the toner cartridge 11.

As shown in FIGS. 183-187 and 211-212, during the installation process of the waste toner cartridge 12 and the toner cartridge 11, two pushing units NN900 disposed on the waste toner cartridge 12 may firstly be in initial contact with the abutting position NN250 of the toner cartridge 11, and the abutting position NN250 may gradually apply the force on the waste toner cartridge 12 toward the developing roller 30 through the pushing unit NN900, which may force the waste toner cartridge 12 to move toward the developing roller 30. At this point, the elastic part NN920 disposed in the pushing unit NN900 may gradually begin to deform; and the moving portion NN930 of the pushing unit NN900 may move away from the first surface portion NN210 of the toner cartridge 11 through the opening MM9121 (as shown in FIG. 203) disposed in the accommodating chamber NN912 which is perpendicular to the axis of the photosensitive drum. When the waste toner cartridge 12 continues to be installed into the designated position of the electronic image-forming apparatus 100 (i.e. the designated installation position on the toner cartridge 11) along the installation direction of the process cartridge 1, the positioning block NN124 disposed on the waste toner cartridge 12 may be abutted against the positioning portion (not shown in drawings) disposed in the electronic image-forming apparatus 100, two pushing units NN900 may be in full contact with the abutting position NN250, and the abutting position NN250 may apply the force toward the developing roller 30 on the waste toner cartridge 12 through two pushing units NN900, which may force the photosensitive drum 20 to contact the developing roller 30.

The structures of the pressing unit 40 and the process cartridge 1 in embodiment forty first, and the operation principle of forcing the driving unit 1080 disposed in the electronic image-forming apparatus 100 to be in contact and engaged with or separated from the force receiving unit 21 by the pressing unit 40 may be similar to embodiment forty, which may not be described in detail.

It should be noted that the pushing-acting portion may be defined as the abutting position NN250 disposed on the first surface portion NN210 of the toner cartridge 11 in one embodiment, and the number of the abutting positions NN250 may need to match the number of pushing units NN900. In addition, there may be multiple pushing-acting portions and pushing units; and the pushing units and the pushing-acting portions may also be configured as other structures or parts to adapt to different process cartridges 1 and electronic image-forming apparatuses 100.

It should be noted that, in the technical solutions provided by embodiment forty and embodiment forty one, at least one pushing unit disposed on the waste toner cartridge may be configured to receive the driving force applied by the pushing-acting portion disposed on the toner cartridge when the waste toner cartridge and the toner cartridge are assembled, which may force the waste toner cartridge to move toward the developing roller, thereby realizing the contact between the photosensitive drum and the developing roller and improving the printing quality of the printer. The structural design of the pushing unit provided in one embodiment also has the advantages of simplifying the mechanical structure and avoiding damage to parts. In addition, in the technical solution provided in one embodiment, since the waste toner cartridge and the toner cartridge are assembled in a detachable manner, structural interference between the force receiving head of the photosensitive drum and the driving unit may result in printing problems caused by poor installation and may be effectively avoided during the contact and engagement process between such two parts. Meanwhile, the user may replace the waste toner cartridge and the toner cartridge separately according to the needs of the use, thereby saving the user's use cost.

In addition, the structural design of the clutch unit provided by embodiment forty and embodiment forty one has the advantages of small resistance, smooth installation process and convenient operation during the installation process of the waste toner cartridge and the toner cartridge. Meanwhile, since the waste toner cartridge and the toner cartridge body adopt a rolling cooperation manner, there may be no instantaneous impact on the photosensitive drum during the installation process, thereby effectively avoiding damage to the photosensitive drum and improving the printing quality of the printer.

Embodiment Forty Two

FIGS. 213 and 222 schematically show one embodiment of the process cartridge. Embodiment forty two and embodiment forty three are configured to solve the problems that some process cartridges 1 in the existing technology lack a mechanism for controlling the contact or separation of the developing roller and the photosensitive drum which may in turn seriously affect the print quality of the printer. In the existing split-type process cartridge 1, when the toner cartridge is installed in the printer, the waste toner cartridge may be positioned through the guide rails disposed at two side walls of the toner cartridge. However, due to the small size of the toner cartridge, after being installed into the printer, the side walls may be not exposed from two sides of the printer. Therefore, in the installation process of the waste toner cartridge into the toner cartridge, due to inaccurate positioning, the installation and operation of the waste toner cartridge may not be smooth, and the operation may be inconvenient; and the photosensitive drum on the waste toner cartridge and the toner cartridge may be accidentally touched during the installation process due to inaccurate positioning, which may damage the photosensitive drum and seriously affect the printing image quality.

In order to better describe each part in one embodiment, the three-dimensional concepts of X, Y, and Z axes are introduced into one embodiment, and each part of one embodiment is described in detail. The length direction of the process cartridge 1 is the X axis, the vertical direction perpendicular to the X axis is the Z axis, and the horizontal direction perpendicular to the X axis is the Y axis; the plane formed by the X axis and the Z axis is the XZ plane, the plane formed by the X axis and the Y axis is the XY plane, and the plane formed by the Y axis and the Z axis is the YZ plane. Moreover, in combination with FIG. 1, the positive direction of the X-axis is the right side direction, and the opposite direction is the left side direction; the positive direction of the Z-axis is the upper side direction, and the opposite direction is the lower side direction; and the positive direction of the Y axis is the front side direction, and the opposite direction is the rear side direction. It should be noted that when defining the positions of the outer side and the inner side, the part itself is used as the reference, the side away from the part itself is the outer side, and the side close to the part itself is the inner side.

As shown in FIGS. 213-214 and 185, the process cartridge 1 provided according to one embodiment may be configured to provide developing for the electronic image-forming apparatus 100. The electronic image-forming apparatus 100 may be configured with the driving unit 1080, which may be connected to the process cartridge 1 to drive the process cartridge 1 to operate.

The process cartridge 1 may include the waste toner cartridge 12 disposed with the photosensitive drum 20, and the photosensitive drum 20 may be located at the front end of the waste toner cartridge 12; the process cartridge 1 may further include the toner cartridge 11 that the developing roller 30 is located at the front end of the toner cartridge 11; and the developing roller 30 and the photosensitive drum 20 may be disposed in parallel with each other. The waste toner cartridge 12 may include at least one pushing unit OO900, and the pushing unit OO900 may be disposed at the first rear wall OO110 of the waste toner cartridge 12 away from the photosensitive drum 20.

During the installation process of the waste toner cartridge 12 and the toner cartridge, at least one pushing unit OO900 may be abutted against the first surface portion OO210 of the toner cartridge 11, the pushing unit OO900 may apply the force on the waste toner cartridge 12 toward the developing roller 30, forcing the photosensitive drum 20 of the waste toner cartridge to contact the developing roller 30, thereby improving the printing quality of the electronic image-forming apparatus 100.

As shown in FIGS. 213-214, 218 and 185, the toner cartridge 11 may further include the pushing-acting portion OO400 and at least one cooperating portion OO500; the pushing-acting portion OO400 may include at least the first pushing-acting portion OO410 and at least one second pushing-acting portion OO420; when the waste toner cartridge 12 and the toner cartridge 11 are installed, as shown in FIGS. 220 and 221, at least one first pushing-acting portion OO410 may apply the force to at least one pushing unit OO900; at least one second pushing-acting portion OO420 may be abutted against at least one cooperating portion OO500; and the waste toner cartridge 12 may obtain a rotational force to rotate toward the developing roller 30, forcing the photosensitive drum 20 to approach the developing roller 30 along the F2 direction.

As shown in FIGS. 213 and 214, the waste toner cartridge 12 may be oppositely disposed with the first side wall OO120 and the second side wall OO130 in the left and right direction; the first side wall OO120 and the second side wall OO130 may be arranged symmetrically along the X direction; the first side wall OO120 and the second side wall OO130 may cover two side surfaces of the waste toner hopper (not shown in drawings) disposed on the waste toner cartridge 12; and after the process cartridge 1 completes one printing operation, the cleaning device (not shown in drawings) provided in the waste toner cartridge 12 may scrape off residual developer adhering to the surface of the photosensitive drum 20 and transport the residual developer to the waste toner hopper (not shown in drawings) for storage. The first sidewall OO120 and the second sidewall OO130 may respectively include the first extension wall OO121 and the second extension wall OO131 extending away from the photosensitive drum 20. The first rear wall OO110 may be disposed at the waste toner cartridge 12 on the opposite side away from the photosensitive drum 20; and the first side wall OO120 and the second side wall OO130 may be perpendicular to the first rear wall OO110 respectively.

Furthermore, as shown in FIGS. 213-215, the waste toner cartridge 12 may further include at least one pushing unit OO900. In one embodiment, the number of pushing units OO900 may be optionally two. Any one of two pushing units OO900 may be configured on the first rear wall OO110 of the waste toner cartridge 12 away from the photosensitive drum 20, and the other end may be configured on any one of the first extension wall OO121 and the second extension wall OO131. Two pushing units OO900 may be arranged symmetrically along the centerline of the waste toner cartridge 12 perpendicular to the axis of the photosensitive drum 20.

The pushing unit OO900 may include the support portion OO910, the elastic part OO920 and the moving portion OO930. The support portion OO910, the elastic part OO920 and the moving portion OO930 may be assembled in a detachable manner. One end of the support portion OO910 may be disposed adjacent to the first rear wall I10 of the first extension wall OO121 or the second extension wall OO131. The support portion OO910 may be configured with a reinforcing portion OO911 on the upper surface perpendicular to the axial direction of the photosensitive drum 20. The reinforcing portion OO911 may be configured to strengthen the strength of the support portion OO910, thereby preventing the parts on the pushing unit OO900 from being damaged during frequent use.

The support portion OO910 may be configured with an accommodating chamber OO912 at the lower end perpendicular to the axial direction of the photosensitive drum 20, and the accommodating chamber OO912 may extend along the Z direction toward the lower surface of the support portion OO910. In one embodiment provided in the present disclosure, the accommodating chamber OO912 may be optionally configured as a cylindrical hollow structure. At least one opening OO9121 may be configured at intervals along the cylindrical outer wall of the accommodating chamber OO912. The opening OO9121 may be perpendicular to the axis of the photosensitive drum 20 at the position adjacent to the lower surface of the support portion OO910 on the accommodating chamber OO912 and extend to the limiting portion OO9122 toward the direction away from the lower surface of the support portion OO910. In the installed state of the pushing unit OO900, the elastic part OO920 may be accommodated in the accommodating chamber OO912.

As shown in FIG. 215, in one embodiment, the moving portion OO930 may be optionally configured as a cylindrical hollow structure. The main body of the moving portion OO930 may be configured with the accommodating chamber OO931, and the inner circumference of the accommodating chamber OO931 may be larger than the outer circumference of the accommodating chamber OO912. When the pushing unit OO900 is installed, the moving portion OO930 may be sleeved on the lower end of the support portion OO910, and the accommodating chamber OO912 may be partially accommodated in the accommodating chamber OO931. The moving portion OO930 may slide up and down along the support portion OO910 and apply the force on the waste toner cartridge toward the developing roller which may force the photosensitive drum 20 to contact the developing roller 30.

In one embodiment, the outer peripheral wall of the accommodating chamber OO931 may be optionally configured as the locking portion OO932 and the support portion OO933 disposed at intervals. The locking portion OO932 and the support portion OO933 may extend along the Z direction from the bottom side of the accommodating chamber OO931 toward the direction away from the bottom of the accommodating chamber. The locking portion OO932 may be configured with the bending portion OO9321 extending toward the inner direction of the accommodating chamber OO931 at the end of the bending portion facing away from the bottom of the accommodating chamber OO931. The width of the bending portion OO9321 may be adapted to the width of the opening OO9121. In the installed state of the pushing unit OO900, the bending portion OO9321 may be locked into the opening OO9121, thereby realizing the installation of the moving portion OO930 and the support portion OO910. At this point, the elastic part OO920 may be accommodated in the accommodating chamber OO912 of the support portion OO910; and the accommodating chamber OO912 of the support portion OO910 and the elastic element OO920 may be both accommodated in the moving portion OO930.

When the force perpendicular to the Z direction is applied to the bottom of the moving portion OO930, the moving portion OO930 may slide up and down in the opening OO9121 disposed on the accommodating chamber OO912 through the bending portion OO9321, and the limiting portion OO9122 disposed on the accommodating chamber OO912 at the lower side of the opening OO9121 may be configured to limit the movement range of the bending portion OO9321 in the moving portion OO930 inside the opening OO9121, which may prevent the moving portion OO930 from falling off from the accommodating chamber OO912.

It should be noted that, in one embodiment, the number of at least one pushing unit OO900 may be optionally multiple. The plurality of pushing units OO900 may be symmetrically disposed at the first rear wall OO110 along the centerline of the waste toner cartridge 12 perpendicular to the axis of the photosensitive drum 20. As provided in one embodiment, the support portion OO910 may also be disposed at any position on the main body of the first rear wall OO110 for adapting to different process cartridges 1 and electronic image-forming apparatuses 100. In addition, in the structure of the pushing unit OO900 provided in one embodiment, only the support portion OO910 and the reinforcing portion OO911 may be in contact with the first rear wall OO110, and the moving portion OO930 may be a movable part. Moreover, in the installed state of the pushing unit OO900, the moving portion OO930 may be not in contact with the first rear wall OO110, the first extension wall OO121 and the second extension wall OO131.

Furthermore, as shown in FIG. 213 and FIG. 214, the toner hopper (not shown in drawings) may be disposed in the toner cartridge 11, and the first surface portion OO210 may be configured on the upper side of the toner hopper. The first surface portion OO210 may cover the upper side of the toner hopper. One end of the first surface portion OO210 may be adjacent to the developing roller 30, and the other end may be connected to the second rear wall OO220 on the opposite side away from the developing roller 30. The second rear wall OO220 may cover the rear side of the toner hopper. At least one first pushing-acting portion OO410 may protrude from the surface of the first surface portion OO210 of the toner cartridge 11, and the pushing unit OO900 may be abutted against the first pushing-acting portion OO410.

In one embodiment, at least the first pushing-acting portion OO410 may be optionally configured as at least one abutting portion OO411. The number of the abutting portions OO411 may be optionally two; and two abutting portions OO411 may protrude from the surface of the first surface portion OO210 toward the direction away from the first surface portion OO210. Two ends of the toner cartridge 11 along the axial direction of the developing roller 30 may be respectively disposed with the first cartridge body wall OO230 and the second cartridge body wall OO240. That is, the first cartridge body wall OO230 and the second cartridge body wall OO240 may be arranged opposite to each other along the X-axial direction. The first cartridge body wall OO230 and the second cartridge body wall OO240 may extend away from the developing roller 30 to form the first outer support wall OO231 and the second outer support wall OO241. The first cartridge body wall OO230 and the second cartridge body wall OO240 may be respectively perpendicular to the second surface portion OO220 along the axial direction of the developing roller. The first cartridge body wall OO230 and the second cartridge body wall OO240 may cover two side surfaces of the toner hopper. The toner hopper (not shown in drawings) may be configured to store developer and, during the printing process of the process cartridge 1, transfer the developer to the photosensitive drum 20 through the toner feeding roller (not shown in drawings) and the developing roller 30, such that the electrostatic latent image formed on the surface of the photosensitive drum 20 may be developed and converted to the developed image.

It should be noted that, in one embodiment, the number of the abutting portions OO411 may be multiple, and the structures of the abutting portions OO411 may also be configured as other structures for adapting to different pushing units. In addition, the configured quantity of the abutting portions OO411 provided in one embodiment may need to be consistent with the configured quantity of the pushing units OO900.

Furthermore, as shown in FIGS. 213-214 and 218-219, the waste toner cartridge 12 provided in one embodiment may further include the installation unit OO610, and the toner cartridge 11 may further include the guide unit OO620. The installation unit OO610 may be cooperated with the guide unit OO620 in a rolling manner to reduce the friction generated during the installation process of the waste toner cartridge 12 and the toner cartridge 11, such that whole installation process may be smoother, and the part damage in the process cartridge caused by friction may be avoided. In addition, the waste toner cartridge 12 and the toner cartridge 11 provided in one embodiment may also be assembled and connected independently.

As shown in FIGS. 218-219, the installation unit OO610 may be disposed on the waste toner cartridge 12, and the guide unit OO620 may be disposed on the toner cartridge 11; and in one embodiment, the installation unit OO610 may be configured as a rolling structure, and the installation unit OO610 and the guide unit OO620 may be detachably cooperated. The waste toner cartridge 12 may be installed on the toner cartridge 11 through the manner that the installation unit OO610 and the guide unit OO620 are separated and cooperated.

As shown in FIGS. 215-220, the installation unit OO610 may include the first installation portion OO611; the first installation portion OO611 may be disposed at the first side wall OO120 at the position adjacent to the developing roller gear 31; the first installation portion 611 may include the first connecting portion OO6111 and the first rolling part OO6112; and one end of the first connecting portion OO6111 may be disposed at the first side wall OO120 at the position adjacent to the developing roller gear 31, and the other end may be configured as a free end extending toward the direction away from the first side wall OO120. In one embodiment, the first connecting portion OO6111 may be optionally configured as a cylindrical structure. The first connecting portion OO6111 may include the first main body portion OO61111 and the first outline portion OO61112; the outer circumference dimension of the first main body portion OO61111 may be smaller than the outer circumference dimension of the first outline portion OO61112; the first main body portion OO61111 may be configured with the groove hole OO61113; the groove hole OO61113 may extend from the end surface of the free end of the first outline portion OO61112 away from the first side wall OO120 toward the direction close to the first side wall OO120 to the stopping portion OO61115 disposed in the middle of the first body portion OO61111; furthermore, a part of the first connecting portion OO61111 may be configured as at least one locking portion OO61114. It should be noted that the first connecting portion OO6111 and the first rolling part OO6112 provided in one embodiment may be optionally made of elastic materials, and the number of locking portions OO61114 may be optionally two.

During the installation process of the first connecting portion OO6111 and the first rolling part OO6112, the user may hold two locking portions OO61114 and apply the force to two locking portions OO61114 toward the direction close to two locking portions OO61114. First, the first rolling part OO6112 may be sleeved on the first outline portion OO61112 corresponding to two locking portions OO61114; and then the force may be applied to the first rolling part OO6112, such that the first rolling part OO6112 may move to the first main body portion OO61111. The outer circumference dimension of the first rolling part OO6112 may be smaller than the outer circumference dimension of the first outline portion OO61112. Therefore, the first outline portion OO61112 may limit the movement position of the first rolling part OO6112 sleeved on the first connecting portion OO6111, thereby preventing the first rolling part OO6112 from falling off from the first connecting portion OO6111 during movement.

Furthermore, as shown in FIG. 215, the positioning block OO124 may be disposed on the first side wall OO120 of the waste toner cartridge 12 adjacent to the upper side of the force receiving unit 21, which may be configured to position the installation position of the waste toner cartridge 12 after the waste toner cartridge 12 is installed into the designated position of the electronic image-forming apparatus 100.

As shown in FIG. 216, the installation unit OO610 may further include the second installation portion OO612 which may be disposed at the second side wall OO130 at the position coincident with the axis of the photosensitive drum 20. The second installation portion OO612 may include the second connecting portion OO6121 and the second rolling part OO6122. The communication hole OO132 may be configured on the second side wall OO130; and may communicate with the rotation shaft of the photosensitive drum 20. The second connecting portion OO6121 provided in one embodiment may be optionally configured as a cylindrical protrusion structure. The second connecting portion OO6121 may include the second main body portion OO61211 and the second outline portion OO61212; and the outer circumference of the second main body portion OO61211 may be smaller than the outer circumference of the second outline portion OO61212. Along the axial direction of the photosensitive drum 20, the axis of the second connecting portion OO6121 may be completely coincident with the axis of the photosensitive drum 20.

It should be noted that the second connecting portion OO6121 provided in one embodiment may also be fixedly disposed at the toner cartridge 11. The first installation portion OO611 and the second installation portion OO612 may also be configured in other structures for adapting to different process cartridges 1. In addition, the second outline portion OO61212 provided in one embodiment may be made of a conductive material.

Furthermore, as shown in FIGS. 215-216, the pushing-acting portion OO400 may further include at least one second pushing-acting portion OO420. The second pushing-acting portion OO420 may protrude from the side wall of the waste toner cartridge 12. In one embodiment, the number of the second pushing-acting portions OO420 may be optionally two. Two second pushing-acting portions OO420 may be symmetrically arranged along the centerline of the waste toner cartridge 12 perpendicular to the axial direction of the photosensitive drum 20. Any one of two second pushing-acting portions OO420 may be configured to have the same structure as the first installation portion OO611, that is, two second pushing-acting portions OO420 may include the supporting part OO421 and the rotating part OO422. One end of the supporting part OO421 may be respectively disposed at the first side wall OO120 at the position away from the force receiving unit 21 and on the second side wall OO130 at the position away from the photosensitive drum 20; and the other end may be configured as the free end extending toward the directions away from the first sidewall OO120 and the second sidewall OO130, respectively.

The supporting part OO421 provided in one embodiment may be optionally configured as a cylindrical protrusion structure. The supporting part OO421 may include the support main body portion OO4211 and the support outline portion OO4212. The outer circumference dimension of the support main body portion OO4211 may be smaller than the outer circumference dimension of the support outline portion OO4212. A through groove OO4214 may be on the support main body portion OO4211. The through groove OO4214 may respectively extend from the end surface of the free end of the support outer profile portion OO4212 away from the first side wall OO120 to the support main body portion OO4211 in the opposite direction close to the first side wall OO120 and from the end surface of the free end of the support outer profile portion OO4212 far away from the second side wall OO130, it extends toward the opposite direction close to the second side wall OO130 to the support main body portion OO4211. Furthermore, a part of two support main body portions OO4211 disposed on the first side wall OO120 and the second side wall OO130 may be configured as two support locking portions OO4213.

The user may hold two support locking portions OO4213 and apply the force to two support locking portions OO4213 toward the direction close to two support locking portions OO4213. Firstly, the rotating part OO422 may be sleeved on the support outline portion OO4212 corresponding to two support locking portions OO4213; and the force may be applied to the rotating part OO422, such that the rotating part OO422 may move to the support main body portion OO4211. The outer circumference of the rotating part OO422 may be smaller than the outer circumference of the support profile OO4212. Therefore, the support outline portion OO4212 may limit the movement position of the rotating part OO422 sleeved on the support main body portion OO4211 and prevent the rotating part from falling off from the support main body portion OO4211 during movement.

Furthermore, as shown in FIGS. 218-220, the guide unit OO620 of the toner cartridge 11 may include the first installation slide OO621 and the second installation slide OO622. The first installation slide OO621 may be symmetrically disposed at the inner surfaces of the first cartridge body wall OO230 and the first outer support wall OO231 relative to the centerline of the toner cartridge 11. The second installation slide OO622 may be symmetrically disposed at the inner surfaces of the second cartridge body wall OO240 and the second outer support wall OO241 relative to the centerline of the toner cartridge 11. Along the direction perpendicular to the axis of the developing roller 30, the first installation slide OO621 may extend from one end away from the first outer support wall OO231 of the developing roller 30 toward the other end of the first cartridge body wall OO230 close to the developing roller 30. The second installation slide OO622 may extend from one end of the second outer support wall OO241 away from the developing roller 30 to the other end of the second cartridge body wall OO240 close to the developing roller 30. The guide unit OO620 may be configured as the first installation slide OO621 and the second installation slide OO622 provided in one embodiment, which may be cooperated with the first installation portion OO611 and the second installation portion OO612. After the toner cartridge 11 is installed into the electronic image-forming apparatus 100, it may realize that the waste toner cartridge 12 may be more conveniently installed into corresponding position of the toner cartridge 11 through the extended-size guide unit OO620 at the channel of the printer, which may effectively overcome the problems of inconvenient operations and time-consuming installation caused by the need to fully insert the waste toner cartridge 12 into the channel of the electronic image-forming apparatus 100 and then install into corresponding position of the toner cartridge 11 through the guide unit OO620 in the existing technology.

As shown in FIG. 218, the first installation slide OO621 may be optionally configured as extending, along the Y-axial direction, from one end of the first outer support wall OO231 away from the pressing unit 40 disposed in the process cartridge 1 toward the other end of the first cartridge body wall OO230 close to the direction of the pressing unit 40. The width of the first installation slide OO621 may be adapted to the outer circumference of the first outline portion OO61112 disposed on the first side wall OO120 of the waste toner cartridge 12. When the waste toner cartridge 12 is assembled with the toner cartridge 11, the first outline portion OO61112 may be abutted against the upper and lower rails of the first installation slide OO621 respectively; and, along the extension direction of the first installation slide OO621, may slide from one end of the first cartridge body wall OO230 away from the pressing unit 40 disposed at the first cartridge body wall OO230 to the other end of the first cartridge body wall OO230 close to the pressing unit 40.

As shown in FIG. 219, the second installation slide OO622 may be optionally configured as extending, along the Y-axial direction, from one end away from the second outer support wall OO241 of the developing roller 30 to the other end close to the second cartridge body wall OO240 of the developing roller 30. The second installation slide OO622 may be also disposed with the blocking portion OO6221 at one end close to the developing roller 30. The blocking portion OO6221 may be configured to limit the movement range of the second installation portion OO612 on the second installation slide OO622. The width of the second installation slide OO622 may be adapted to the outer circumference dimension of the second outline portion OO61212 of the second installation portion OO612 disposed on the second side wall OO130; and the size of the blocking portion OO6221 may be adapted to the outer circumference size of the second installation portion OO612. At the stopping portion OO6221, the hole-like structure OO6222 may be disposed along corresponding side wall in parallel with the axis of the developing roller 30. When the waste toner cartridge 12 is cooperated with the toner cartridge 11, the waste toner cartridge 12 may slide along the first installation slide OO621 and the second installation slide OO622 to the designated installation position of the toner cartridge 11 in a rolling manner through the first installation portion OO611 and the second installation portion OO612 respectively. When the waste toner cartridge 12 and the toner cartridge 11 are assembled, the second installation portion OO612 may slide along the second installation slide OO622 until the second installation portion OO612 is locked with the blocking portion OO6221.

When the waste toner cartridge 12 and the toner cartridge 11 are assembled, the second outline portion OO61212 may be accommodated in the blocking portion OO6221; and the projection of the second outline portion OO61212 may be completely overlapped with the projection the hole-like structure OO6222 along the axial direction of the photosensitive drum 20. The process cartridge 1 may be disposed with a conductive part (not shown) inserted in the hole-shaped structure OO6222, such that one end of the conductive part may be electrically connected to the second outline portion OO61212 through the hole-shaped structure OO6222. The other end of the conductive part may be electrically connected to a conductive terminal (not shown in drawings) provided in the electronic image-forming apparatus 100. Since the second outline portion OO61212 may be connected to the rotating shaft of the photosensitive drum 20, the conductive terminal provided in the electronic image-forming apparatus 100 may supply the force to the photosensitive drum 20 through the conductive part and the second outer portion OO61212.

Furthermore, as shown in FIGS. 218 and 219, the toner cartridge 11 may further include at least one cooperating portion OO500; and the cooperating portion OO500 may be disposed at the guide unit OO620. In one embodiment, the number of cooperating portions OO500 may be optionally two. Two cooperating portions OO500 may be symmetrically disposed at the upper rail of the first installation slide OO621 and the upper rail of the second installation slide OO622 along the centerline of the toner cartridge 11 perpendicular to the axial direction of the developing roller 30. The cooperating portion OO500 disposed on the upper rail of the first installation slide OO621 may be located adjacent to the pressing unit 40 provided in the process cartridge 1. In one embodiment, the cooperating portion OO500 may be optionally configured as a protruding edge structure OO510. Two protruding edge structures OO510 may be configured to respectively protrude toward the direction of the upper rail away from the first installation slide OO621 and the direction of the upper rail away from the second installation slide OO622. The inner circumference dimensions of two protruding edge structures OO510 may be adapted to the outer circumference dimensions of two rotating parts OO422 in the second pushing-acting portion OO420 respectively. During the installation process of the toner cartridge 11 and the waste toner cartridge 12, the rotating part OO422 may roll along the first installation slide OO621 or the second installation slide OO622 until the rotating part is abutted against the protruding edge structure OO510, such that the waste toner cartridge 12 may rotate along the protruding edge structure OO510 toward the developing roller 30.

Furthermore, as shown in FIGS. 214 and 218-219, the process cartridge 1 provided in one embodiment may further include the pressing unit 40, which may be disposed at the process cartridge 1. One end of the pressing unit 40 may be detachably installed on the first cartridge body wall OO230 of the toner cartridge 11, and the other end may extend toward the developing roller 30. After the waste toner cartridge 12 and the toner cartridge 11 are assembled, the other end of the pressing unit 40 may extend toward the axis of the force receiving unit 21. After the process cartridge 1 is installed in the electronic image-forming apparatus 100, the other end of the pressing unit 40 may be in contact with the driving unit 1080 of the electronic image-forming apparatus 100 and apply the force to force the driving unit 1080 to be engaged with or separated from the force receiving unit 21.

As shown in FIGS. 218-219, the pressing unit 40 may include the pressing part OO310 and the deformable part OO320; and the pressing part OO310 and the deformable part OO320 may be assembled in a detachable manner. The pressing part OO310 and the deformable part OO320 may be detachably assembled on the toner cartridge 11. The assembling portion O0260 may be disposed on the toner cartridge 11 near the end of the first cartridge body wall OO230 on the upper side of the developing roller 30. Both the pressing part OO310 and the deformable part OO320 may be detachably installed on the assembling portion OO260. The main body of the assembling portion OO260 may be respectively disposed with the assembling chamber OO261 and the receiving portion OO262 which may be arranged to be adjacent to each other. When the pressing unit 40 is installed, a part of the pressing part OO310 may be accommodated in the assembling chamber OO261, and the deformable part OO320 may be accommodated in the receiving portion OO262. In addition, one end of the deformable part OO320 may be sleeved on the protruding portion OO2621 disposed on the bottom surface of the receiving portion OO262. Two opposite end walls OO263 of the protruding portion OO2621 may be symmetrically configured with installation holes OO2631, and the opening direction of two installation holes OO2631 may be the X-axial direction. The pressing part OO310 may be installed by using the installation holes OO2631. Moreover, the pressing part OO310 and the deformable part OO320 may be respectively accommodated by the assembling chamber OO261 and the receiving portion OO262, which may protect the pressing part OO310 and the deformable part OO320 and prevent the pressing part OO310 and the deformable part OO320 from falling off.

The pressing part OO310 may include the pressing portion OO313, and the connecting portion (not shown) connected to the pressing portion OO313. Two first protruding portions OO311 may be symmetrically disposed at two sides of the connecting portion; and two first protruding portions OO311 may extend along the X-axis away from the main body direction of the pressing part OO310. The third protruding portion OO312 may be disposed on the rear side of the pressing part OO310; and the main body of the pressing part OO310 may extend toward the direction B to form the pressing portion OO313.

In one embodiment, two first protruding portions OO311 and the third protruding portion OO312 may be optionally configured as cylindrical structures, that is, the outer surfaces of the first protruding portions OO311 and the third protruding portion OO312 may be circular. In addition, the diameters of the outer peripheral surfaces of two first protruding portions OO311 may match the diameters of the installation holes OO2631 formed symmetrically on two opposite end walls OO263 of the assembling chamber OO261. When the pressing part OO310, the deformable part OO320, and the assembling portion OO260 are assembled, one end of the pressing part OO310 provided with two first protruding portions OO311 may be inserted into the assembling chamber OO261, and two first protrusions OO311 may be locked into two installation holes OO2631 respectively. One end of the deformable part OO320 may be sleeved on the protruding portion OO2621 disposed on the bottom surface of the receiving portion OO262, and the other end may be abutted against the third protruding part OO312 disposed on the pressing part OO310. The deformable part OO320 may act between the outer side of the pressing part OO310 and inside of the receiving portion OO262. The assembling chamber OO261 may limit the pressing part OO310 between its two opposite end walls OO263. The protruding portion OO2621 disposed on the receiving portion OO262 may prevent the deformable part OO320 and the pressing part OO310 from falling off or shifting in position during repeated movement, which may affect working effect of the pressing unit 40.

As shown in FIGS. 183-187, the driving unit 1080 may be disposed at the inner side wall of the end of the installation slide rail GG50 provided in the electronic image-forming apparatus 100; the inner side wall of the end of the installation slide rail GG50 of the electronic image-forming apparatus 100 may be configured with the driving unit protective cover (blocking wall) 1081; the driving unit protective cover (blocking wall) 1081 may be disposed along the outer circumference of the driving unit 1080; and the driving unit protective cover (blocking wall) 1081 may be configured to limit the movement range of the driving unit 1080. The driving unit protective cover (blocking wall) 1081 may be configured with the connecting chamber GG31, the driving unit 1080 may be located in the connecting chamber GG31, and the driving unit protective cover (blocking wall) 1081 may be also disposed with the driving unit pushing part 1090. One end of the driving unit pushing part 1090 may be connected to the main body of the electronic image-forming apparatus 100 through a spring; and the other end may be inserted into the driving unit protective cover (blocking wall) 1081 through the groove hole GG32 disposed on the driving unit protective cover (blocking wall) 1081. The driving unit pushing part 1090 may move back and forth along the radial direction of the driving unit 1080 and may provide the support force to the driving unit 1080, forcing the driving unit 1080 to keep the inclined state relative to the axial direction of the driving unit protective cover (blocking wall) 1081. At this point, the process cartridge 1 may be not installed in the electronic image-forming apparatus 100; the driving unit 1080 may be supported by the driving unit pushing part 1090 in the electronic image-forming apparatus 100 and at the inclined state relative to the axial direction of the driving unit protective cover (blocking wall) 1081; and the rotation axis L1 of the driving unit 1080 may form an angle α with the central axis L2 of the blocking wall.

It should be noted that the driving unit 1080 may be optionally a force output head, which may be configured to be closely engaged with the force receiving unit and the developing roller 30 disposed in the process cartridge 1 and transfer the driving force thereto to drive the process cartridge 1 to operate. As shown in FIGS. 213-221 and 183-187, the installation process of process cartridge 1 is described hereinafter.

Through the second handle OO270 disposed on the main body of the toner cartridge 11, during the installation process of the toner cartridge 11 inside the electronic image-forming apparatus 100 along the installation direction of the process cartridge 1 through the installation slide rail GG50 disposed on the inner wall of the electronic image-forming apparatus 100, the toner cartridge 11 may be not in contact with the electronic image-forming apparatus 100. Therefore, the driving unit 1080 of the electronic image-forming apparatus 100 may keep the inclined state relative to the axial direction of the driving unit protective cover (blocking wall) 1081 because there is no external force, and the driving unit continues to be supported by the driving unit pushing part 1090. During the process of that the user continues to apply the force to the toner cartridge 11 along the installation direction of the process cartridge 1 to make the toner cartridge 11 continue to move to designated installation position of the electronic image-forming apparatus 100, the pressing unit 40 may be in contact with the driving unit 1080 through the pressing portion OO313 disposed on the pressing part OO310, and may continuously apply the action force toward the installation direction of the process cartridge 1 to the toner cartridge 11, that is, the driving unit pushing part 1090 may be gradually pressed down. At this point, the support force of the driving unit pushing part 1090 on the driving unit 1080 may be gradually weakened. Therefore, the driving unit 1080 may gradually fall toward the axis of the driving unit 1080 along the direction of gravity. When the pressing portion OO131 of the pressing part OO310 is abutted against the driving unit 1080, the deformable part OO320 may be deformed. When the process cartridge 1 is pushed to the designated installation position, the pressing portion OO313 of the pressing part OO310 may be completely in contact with the driving unit 1080, and the force applied may be the largest. At this point, the driving unit pushing part 1090 may be completely pressed, and the driving unit 1080 may fall along the direction of gravity due to the loss of support. The driving unit 1080 may be adjusted from the inclined state to the coaxially-aligned state.

The first handle OO150 may be disposed on the waste toner cartridge 12. During the process that the user holds the first handle OO150 and installs the waste toner cartridge 12 from the channel opening of the printer to corresponding position on the toner cartridge 11 through the guide unit OO620 with an extended size, through the first installation portion OO611 and the second installation portion OO612 disposed on the first side wall OO120 and the second side wall OO130, the waste toner cartridge 12 may be installed in designated position on the electronic image-forming apparatus 100 in the installation direction of the process cartridge 1 along the first installation slide OO621 and the second installation slide OO622 disposed on the second cartridge body wall OO240 along the first cartridge body wall OO230 of the toner cartridge 11 via a rolling manner. Two second pushing-acting portions OO420 may also move along the first installation slide OO621 and the second installation slide OO622 in a rolling manner, respectively. At this point, the force receiving unit 21 may enter the driving unit protective cover (blocking wall) 1081. Since the driving unit pushing part 1090 has been pressed down by the pressing unit 40 on the toner cartridge 11, that is, the driving unit 1080 may be coaxially-aligned from the inclined state to the coaxially-aligned state, such that contact and engagement between the force receiving unit 21 and the driving unit 1080 may be completed.

Furthermore, as shown in FIGS. 213, 220 and 221, when the waste toner cartridge 12 and the toner cartridge 11 are assembled, two pushing units OO900 disposed on the waste toner cartridge 12 may be initially in contact with two abutting portions OO411 disposed on the toner cartridge 11, and the abutting portion OO411 may gradually apply the force to the waste toner cartridge 12 along the direction close to the developing roller 30 through the pushing unit OO900, which may force the waste toner cartridge 12 to move toward the developing roller 30. At this point, the elastic part OO920 provided in the pushing unit OO900 may gradually begin to deform; and the moving portion OO930 in the pushing unit OO900 may move toward the direction away from the first surface portion OO210 of the toner cartridge 11 through the opening OO9121 disposed in the accommodating chamber OO912 which is perpendicular to the axis of the photosensitive drum. When the waste toner cartridge 12 continues to be installed into the designated position of the electronic image-forming apparatus 100 (i.e., the designated installation position on the toner cartridge 11) along the installation direction of the process cartridge 1, the positioning block OO124 disposed on the waste toner cartridge 12 may be in contact with the positioning portion (not shown in drawings) disposed in the electronic image-forming apparatus 100, and two pushing units OO900 may be in complete contact with two abutting portions OO411. The abutting portion OO411 may apply a pushing force toward the direction of F1 to the waste toner cartridge 12 through two pushing units OO900 (as shown in FIG. 218 and FIG. 219). Two second pushing-acting portions OO420 may be abutted against two protruding edge structures OO510 disposed at the upper rail of the first installation slide OO621 and the upper rail of the second installation slide OO622, such that the second pushing-acting portions OO420 may surrounds the axis thereof. Meanwhile, under the support of the installation unit OO610 and the guide unit OO620, the waste toner cartridge may rotate around the position of two protruding edge structures OO510 disposed on the waste toner cartridge 12. That is, the waste toner cartridge 12 may rotate toward the developing roller 30 under the action of the pushing force using the abutting position as the support point, which may force the photosensitive drum 20 to contact the developing roller 30 along the F2 direction (as shown in FIGS. 218 and 219).

When the driving unit 1080 is fully engaged with the force receiving unit 21, that is, when the rotation axis L1 of the driving unit 1080 substantially is coincident with the central axis L2 of the blocking wall, one end of the pressing portion OO313 of the pressing part OO310 may be abutted against the driving unit protective cover (blocking wall) 1081, such that the pressing part OO310 may be no longer in contact with the driving unit 1080, the driving unit 1080 may not generate friction or even interfere with the pressing part OO310 when rotating. Therefore, the rotating operation of the driving unit 1080 may not be affected, and the pressing unit 40 may not be damaged.

Furthermore, when the process cartridge 1 is in the working state, the door cover of the electronic image-forming apparatus 100 may be closed; the driving unit 1080 may be at the coaxially-aligned state due to the external force of the pressing unit 40, thereby realizing the contact and engagement between the driving unit 1080 and the force receiving unit 21. The force receiving unit 21 of the process cartridge 100 may finally receive the driving force of the driving unit 1080 in a substantially coaxial state; and another gear portion on the driving unit 1080 may be engaged with the developing roller gear 31. At this point, the deformable part OO320 may restore elastic deformation to force the pressing portion OO313 of the pressing part OO310 to move to be abutted against the driving unit protective cover (blocking wall) 1081. Furthermore, the pressing portion OO313 may be no longer in contact with the driving unit 1080. Therefore, the driving unit 1080 may not generate friction or even interfere with the pressing part OO310 when rotating, and the subsequent normal printing work may be performed.

In one embodiment, the pressing part OO310 may be optionally configured as a structure that does not limit the installation, removal and operation of the process cartridge. The pressing part OO310 and the fixing portion 260 may be selected from plastic parts or metal parts, and the like. In one embodiment, there is no limitation on the materials of the pressing part OO310 and the fixing portion 260, as long as the material does not affect the installation, deformation and restoration of the pressing part OO310 and the deformable part OO320. In addition, each part included in above-mentioned pressing unit may be optionally configured as an integrated part.

The deformable part OO320 may not be limited in the present disclosure. The deformation of the deformable part OO320 may be achieved by setting the pressing part OO310 as a deformable portion instead of the deformable part OO320 in addition to its own elastic force. The pressing part OO310 may be a steel sheet with a certain flexibility (which may push the driving unit 1080 to be coaxially-aligned).

Embodiment Forty Three

As the description of one embodiment, only the difference from the process cartridge 1 in above-mentioned embodiment forty two is described below.

As shown in FIGS. 222-223, in one embodiment, the abutting portion OO411 disposed on the first surface portion PP210 of the toner cartridge 11 may be omitted, and the abutting portion OO411 may be replaced by the abutting position PP412. Meanwhile, the size of the pushing unit PP900 may be increased, such that after the toner cartridge 11 and the waste toner cartridge 12 are installed, the moving portion PP930 in the pushing unit PP900 may be abutted against the abutting position PP412, that is, at least one first pushing-acting portion PP410 may be optionally configured as at least one abutting position PP412. At least one abutting position PP412 may be disposed at the first surface portion PP210 of the toner cartridge 11 at the position adjacent to the second rear wall PP200, where the number of abutting positions PP412 may be optionally two.

As shown in FIGS. 183-187 and 220-223, after the toner cartridge 11 is installed into the electronic image-forming apparatus 100, the driving unit 1080 provided in the electronic image-forming apparatus 100 may be coaxially-aligned by the pressing unit 40 disposed on the toner cartridge 11. During the installation process of the waste toner cartridge 12 and the toner cartridge 11, two pushing units PP900 on the waste toner cartridge 12 may firstly in initial contact with two abutting positions PP412. Two abutting positions PP412 may gradually apply the force toward the direction of F1 to the waste toner cartridge 12 through the pushing unit PP900, which may force the waste toner cartridge 12 to move toward the developing roller 30. At this point, the elastic part PP920 disposed in the pushing unit PP900 may gradually begin to deform; and the moving portion PP930 in the pushing unit PP900 may move along the direction away from the first surface portion PP210 of the toner cartridge 11 in the opening PP9121 provided in the accommodating chamber PP912 which is perpendicular to the axis of the photosensitive drum. When the waste toner cartridge 12 continues to be installed into the designated position of the electronic image-forming apparatus 100 (i.e., the designated installation position on the toner cartridge 11) along the installation direction of the process cartridge 1, the positioning block PP124 disposed on the waste toner cartridge 12 may be abutted against the positioning portion (not shown) disposed in the electronic image-forming apparatus 100, and two pushing units PP900 may be in full contact with two abutting positions PP412. Meanwhile, two abutting positions PP412 may continue to apply a pushing force toward the direction of F1 to the waste toner cartridge 12 through the pushing unit PP900 (as shown in FIG. 220 and FIG. 221). Two protruding edge structures PP510 may be abutted against two second pushing-acting portions PP420, such that the second pushing parts PP420 may surround the axis thereof. Meanwhile, under the support of the installation unit PP610 and the guide unit PP620, the waste toner cartridge may rotate around the position of two protruding edge structures PP510 disposed on the waste toner cartridge 12. That is, the waste toner cartridge 12 may rotate toward the developing roller 30 under the action of the pushing force using the abutting position as the support point, which may force the photosensitive drum 20 to contact the developing roller 30 along the F2 direction (as shown in FIGS. 218 and 219).

The structures of the pushing unit PP900, the pressing unit 40 and the process cartridge 1, and the operation principle of forcing the driving unit 1080 provided in the electronic image-forming apparatus 100 to be in contact and engaged with or separated from the force receiving unit 21 by the pressing unit 40 in one embodiment may be same as those in embodiment forty two, which may not be described in detail herein.

It should be noted that, in the technical solutions provided by embodiment forty two and embodiment forty three, at least one pushing unit disposed at the waste toner cartridge may be configured to act on the waste toner cartridge when the waste toner cartridge is independently installed into the toner cartridge, such that the second pushing-acting portion on the waste toner cartridge may surround the axis thereof; meanwhile, under the support of the installation unit disposed on the waste toner cartridge and the guide unit disposed on the toner cartridge, the second pushing-acting portion may rotate at the position of the cooperating portion disposed on the waste toner cartridge, which may further move the photosensitive drum toward the developing roller, thereby improving the printing quality of the electronic image-forming apparatus 100. The structural design of the pushing unit may have the advantages of simplifying mechanical structure and avoiding part damage. In addition, in the technical solutions provided in embodiment forty two and embodiment forty three, since the waste toner cartridge and the toner cartridge are assembled in a detachable manner, it is possible to effectively avoid the structural interference between the force receiving unit and the driving unit during the contact and engagement process which may result in printing problems caused by poor installation.

Embodiment Forty Four

As shown in FIG. 224, the process cartridge 1 provided in one embodiment may include the cartridge body 10, the photosensitive drum 20, the developing roller 30, the end cover or bracket 11 and the force receiving unit 21. The developer may be contained in the cartridge body 10, and the force receiving unit 21 may be disposed at one end of the photosensitive drum 20. The force receiving unit 21 may be movably connected to the driving unit 1080. In one embodiment, the force receiving unit 21 may be engaged with the driving unit 1080 to receive the driving force of the driving unit 1080.

For example, the end cover or bracket may be disposed at the end portion of the cartridge body 10. The bracket may be the frame of the photosensitive drum. Taking the bracket as an example below, the bracket 11 may include the first fixing column 111 and the through hole 112. The force receiving unit 21 may be fixed on the bracket 11 through the through hole 112 and exposed outside the through hole 112, thereby receiving the driving force of the driving unit 1080 of the electronic image-forming apparatus (not shown in drawings). In addition, the first fixing column 111 may be disposed above and/or in front of the force receiving unit 21 relative to the axial direction of the photosensitive drum 20.

In order to change the driving unit 1080 of the electronic image-forming apparatus from the inclined state of the initial position into the horizontal state capable of being engaged with the force receiving unit 21, the process cartridge 1 may further include the pressing part 40, and the pressing part 40 may be used in conjunction with the process cartridge 1. The pressing part 40 may be detachably installed in the electronic image-forming apparatus, which may be used alone in the electronic image-forming apparatus and may also work in the electronic image-forming apparatus in cooperation with process cartridges of different structures. For example, the pressing part 10 may be disposed at the cartridge body 10 and located at the same end as the force receiving unit 21 and may be configured to press the driving unit 1080, such that the driving unit 1080 may be adjusted from the inclined state to the coaxially-aligned state. In addition, when the force receiving unit 21 is engaged with the driving unit 1080, the distance of the pressing part 40 relative to the axis of the photosensitive drum 20 may not change in displacement.

In some embodiments, the pressing part 40 may be detachably installed on the first fixing column 111 of the bracket 11.

Optionally, the pressing part 40 may be a roller, and the outer surface of the roller may be configured with a layer of rubber coating, thereby avoiding structural interference and wear of the driving unit when being in contact with the driving unit 1080.

As shown in FIGS. 225-227, in one embodiment, during the contact and engagement process between the force receiving unit 21 of the process cartridge 1 and the driving unit (i.e., the printer driving head) 1080 of the electronic image-forming apparatus 100, when the process cartridge 1 is installed in the electronic image-forming apparatus 100 along the Y1 direction, the pressing part 40 installed on the bracket 11 may also gradually approach the driving unit 1080 as the process cartridge 1 moves. When the pressing part 40 is in contact with the driving unit 1080 to form structural interference, the pressing part 40 may apply the pressing force F on the driving unit 1080, the driving unit 1080 may move along the direction close to the force receiving unit 21 after receiving the pressing force, and the driving unit 1080 may drive the pressing part 40 to rotate after being in contact with the pressing part 40. Since the pressing part 40 is fixedly installed on the bracket 11, the pressing part 40 may be always kept in parallel with the axial direction of the photosensitive drum 20 during the engagement process of the force receiving unit 21 and the driving unit 1080, that is, the distance of the pressing part 40 relative to the axis of the photosensitive drum 20 may not change in displacement. With the installation of the process cartridge 1 in place, the driving unit 1080 may move from the initial position to the position in parallel with the axial direction of the supporting part 1085. Finally, the driving unit 1080 may be successfully engaged with the force receiving unit 21, such that the driving unit 1080 may transfer the driving force to the force receiving unit 21, and then drive the photosensitive drum 20 to rotate.

According to above-mentioned technical solutions, the pressing part 40 may be disposed on the process cartridge 1, which may make the contact and mess process of the force receiving unit 21 with the driving unit 1080 smoother, greatly save the contact and engagement time of the force receiving unit 21 with the driving unit 1080 and improve the working efficiency of the process cartridge 1.

Embodiment Forty Five

Another process cartridge 1 is provided in one embodiment. Undescribed parts may be same as the structures of the process cartridge 1 in above embodiments. The difference between one embodiment and above-mentioned embodiments is that the pressing part of the process cartridge in one embodiment may be a protruding/retracting part.

As shown in FIGS. 228 and 229, the pressing part 40 may be disposed at the end of the process cartridge 1. The pressing part 40 may be detachably connected to the process cartridge 1.

For example, the process cartridge 1 may further include the first elastic part RR60. The pressing part 40 may be connected to the end of the cartridge body 10 through the first elastic part RR60, such that the pressing part 40 may move relative to the cartridge body 10 along the direction in parallel or substantially parallel with the axial direction of the photosensitive drum 20 and press the driving unit 1080.

In one embodiment, the pressing part 40 may include a rod body arranged coaxially with the photosensitive drum 20 and a protruding portion RR41 formed by bending and extending from one end of the rod body. The rod body may be configured with the first elastic part RR60. The first elastic part RR60 may be a spring, a torsion spring, a magnet, an elastic sponge, and the like, or other parts with elastic force, which may not be limited herein. In one embodiment, the first elastic part RR60 may be a spring, and the spring may be sleeved on the rod body.

The end of the rod close to the force receiving unit 21 may also be disposed with the protruding portion RR41. The protruding portion RR41 may be configured to press the driving unit 1080, such that the driving unit 1080 and the force receiving unit 21 may be coaxially engaged or substantially coaxially engaged to transfer force.

When the first elastic part RR60 is at the retracted state, the pressing part 40 may move along the length direction of the process cartridge 1 or the axial direction of the photosensitive drum 20, such that the pressing part 40 may move away from the driving unit 1080. When the first elastic part RR60 is in a stretched state, the pressing part 40 may move along the length direction of the process cartridge 1 or the axial direction of the photosensitive drum 20, such that the pressing part 40 may move close to the driving unit 1080 and drive the driving unit 1080 to press down.

When the process cartridge 1 is installed in the electronic image-forming apparatus 100 or after the process cartridge 1 is installed in place, the pressing part 40 may move along the length direction of the process cartridge 1 or the axial direction of the photosensitive drum 20 and press the driving unit 1080, until the pressing part is coaxially or substantially coaxially engaged with the force receiving unit 21 to transfer force.

Embodiment Forty Six

The process cartridge provided in one embodiment may have same structures as the process cartridges in embodiment forty four and Embodiment forty five. The difference between one embodiment and embodiment forty four and embodiment forty five is that in the process cartridge 1 of one embodiment, the pressing part 40 for pressing down the driving unit 1080 may be fixedly connected to the process cartridge 1.

As shown in FIGS. 230-231, the process cartridge may further include the moving positioning part SS50 disposed at the end of the cartridge body 10; and the moving positioning part SS50 may be located at same end of the cartridge body 10 as the force receiving unit 21.

For example, a chute SS15 may be configured on the end cover SS11 of the process cartridge. The chute SS15 may be a rectangular chute or a circular chute, or a chute with other regular or irregular structures, which may not be limited herein. The moving positioning part SS50 may be installed in the chute SS15; and the moving positioning part SS50 may move relative to the end cover SS11 of the process cartridge 1 along the chute SS15.

As shown in FIG. 231, when the process cartridge 1 is installed in the electronic image-forming apparatus 100 along the installation direction through the installation guide rail GG50 on the inner side of the electronic image-forming apparatus 100, the moving positioning part SS50 may be supported by the installation guide rail GG50 on the inner side of the electronic image-forming apparatus 100 and move forward along the installation guide rail GG50. Since the moving positioning part SS50 moves relative to the end cover SS11 of the process cartridge 1, the cartridge body 10 of the process cartridge 1 may move to a certain extent relative to the installation guide rail GG50 of the electronic image-forming apparatus 100 during the installation process of the process cartridge 1. Therefore, the pressing part 40 located at the end of the cartridge body 10 may also achieve a certain movement amount relative to the driving unit 1080 inside the electronic image-forming apparatus 100 or the installation guide rail GG50 of the electronic image-forming apparatus 100 along with overall movement of the cartridge body 10 (at least achieve up and down movement). Through such movement amount, the pressing part 40 may achieve a certain upward displacement relative to the driving unit 1080. After the process cartridge 1 is installed in place, the pressing part 40 may move downward and drive the driving unit 1080 to move downward until the driving unit 1080 is substantially coaxially engaged with the force receiving unit 21 to transfer force.

In one embodiment, due to the setting of the moving positioning part SS50, the moving positioning part SS50 may move relative to the end cover SS11 along the chute SS15 when the pressing part 40 is installed in the electronic image-forming apparatus and drive the pressing part 40 disposed at the end of the cartridge body 10 to move relative to the process cartridge. That is, the pressing part 40 may obtain a certain movement amount, which may make the pressing part installed on the process cartridge to easily press down on the driving unit 1080 to avoid mutual interference.

In addition, above-mentioned forty fourth, forty fifth and forty sixth embodiments may also be used in combination with each other. If the moving positioning part SS50 of the forty fifth embodiment is applied to the process cartridge 1 of the forty fourth embodiment and the forty fifth embodiment, the function may be increased, which may easily realize the engagement between the force receiving unit 21 and the driving unit 1080. The technical solutions of above embodiments may not be mutually exclusive.

Embodiment Forty Seven

Another process cartridge is provided in one embodiment. Undescribed parts may be same as those in above embodiments, which may not be described in detail herein.

The difference between one embodiment and above-mentioned embodiments is that the process cartridge 1 provided in one embodiment, as shown in FIGS. 232 and 233, may further include the protruding/retracting mechanism UU70, and the force receiving unit 21 may be connected to one end of the photosensitive drum through the protruding/retracting mechanism UU70.

For example, the protruding/retracting mechanism UU70 may be located at the end of the photosensitive drum 20 for controlling the movement of the force receiving unit 21 along the axial direction of the photosensitive drum 20. Optionally, the protruding/retracting mechanism UU70 may be an elastic part. The elastic part may be a spring, a magnet, an elastic sponge and the like, or other parts with elastic force, which may not be limited herein.

In one embodiment, the elastic part may be a spring, the end of the photosensitive drum 20 may be configured with the groove 20*a*, and the spring may be accommodated in the groove 20*a* at the end of the photosensitive drum 20.

Furthermore, the process cartridge 1 may further include the pressing part 40. The pressing part 40 may be sleeved on the outer side of the force receiving unit 21 away from the protruding/retracting mechanism UU70, and the pressing part 40 may rotate coaxially with the photosensitive drum 20, such that the force receiving unit 21 and the pressing part 40 may move along the axial direction of the photosensitive drum 20. In one embodiment, the pressing part 40 may be a rotatable sleeve which may be a hollow cylinder, and the force receiving unit 21 may be accommodated in the sleeve and move along the sleeve.

For example, one end of the protruding/retracting mechanism UU70 (elastic part) may be abutted against the bottom of the groove 20*a*, and the other end of the protruding/ retracting mechanism UU70 (elastic part) may be abutted against the force receiving unit 21.

When the process cartridge 1 is not installed in the electronic image-forming apparatus 100, as shown in FIG. 232, the force receiving unit 21 may use the frictional force between the force receiving unit 21 and the pressing part 40 to resist the elastic force of the protruding/retracting mechanism UU70 and may retreat to be accommodated in the pressing part 40.

When the process cartridge 1 is installed in the electronic image-forming apparatus 100, the driving unit 1080 may be supported by the driving head pushing part (not shown) in the electronic image-forming apparatus and at the inclined state. That is, the axis of the driving unit 1080 may be not in parallel with the axis of the photosensitive drum 20. Since the pressing part 40 is sleeved on the outside of the force receiving unit 21, the pressing part 40 may form structural interference with the driving unit 1080, and the driving unit 1080 may start to rotate and drive the pressing part 40 to rotate.

As shown in FIG. 233, during the engagement process of the force receiving unit 21 and the driving unit 1080, the centrifugal force generated by the rotation of the pressing part 40 may make the driving unit 1080 gradually move from the original inclined state to the position where the axis of the driving unit 1080 is coincident with the axis of the photosensitive drum 20. At this point, the driving unit 1080 may be coaxial with the photosensitive drum 20. After the pressing part 40 rotates to generate centrifugation, the frictional force between the force receiving unit 21 and the pressing part 40 may decrease. The force receiving unit 21 may be driven to move along the axial direction of the photosensitive drum 20 toward the driving unit 1080 by the elastic force of the protruding/retracting mechanism UU70, and the force receiving unit 21 may protrude from the pressing part 40 through such movement of the force receiving unit 21 until the force receiving unit is engaged with the driving unit 1080 to achieve force transfer between the driving unit 1080 and the photosensitive drum 20.

The driving unit 1080 may move toward the printer driving head 1080 along the axial direction of the photosensitive drum 20 through the elastic force of the protruding/retracting mechanism UU70. Through such movement of the force receiving head 21 of the photosensitive drum, the force receiving head 21 of the photosensitive drum may be toward the printer driving head 1080 and protrude from the pressing part T40, thereby being successfully engaged with the printer driving head 1080 to realize the force transfer between the printer driving head 1080 and the photosensitive drum 20.

Embodiment Forty Eight

As shown in FIG. 234, the process cartridge 1 may include the cartridge body 10. The cartridge body 10 may be configured with the force receiving device for receiving the driving force provided by the driving unit 1080 provided in the electronic image-forming apparatus 100 to drive the process cartridge 1 to operate. The force receiving device may include the force receiving unit 21 and the developing roller gear 31, the force receiving unit 21 may be connected to the photosensitive drum 20, and the developing roller gear 31 may be connected to the developing roller 30.

As shown in FIGS. 235A-235C, the electronic image-forming apparatus may include the driving unit 1080 and the driving unit protective cover 1081. The driving unit protective cover 1081 may be disposed outside the driving unit 1080 for limiting the movement range of the driving unit 1080. Before the pressing part is installed, the driving unit 1080 may be supported by the driving unit pushing part 1090 in the electronic image-forming apparatus and at the inclined state.

For example, the driving unit protective cover 1081 may be configured with the connecting chamber GG33, and the driving unit 1080 may be disposed at the connecting chamber GG33. The driving unit protective cover (blocking wall) 1081 may be also disposed with the driving unit pushing part 1090. One end of the driving unit pushing part 1090 may be connected to the main body of the electronic image-forming apparatus through a spring, and the other end may be inserted into the driving unit protective cover (blocking wall) 1081 through the groove hole GG32 disposed on the driving unit protective cover (blocking wall) 1081. The driving unit pushing part 1090 may move back and forth along the radial direction of the driving unit 1080 and provide the support force to the driving unit 1080, forcing the driving unit 1080 to keep the inclined state relative to the axial direction of the driving unit protective cover (blocking wall) 1081.

It should be noted that the driving unit 1080 may be optionally the force output head, which may be configured to provide the driving force to the process cartridge 1 to drive the process cartridge 1 to operate. In addition, the engaging chamber (not shown in drawings) may be disposed on the outer peripheral side of the driving unit protective cover (blocking wall) 1081 for providing space for engaging connection between the force receiving unit 21 and other transferring parts. In one embodiment, the number of engaging chambers may be limited to three. The number of engaging chambers may also be configured to be multiple, which may be configured to adapt to different process cartridges 1 and printers and meet needs of different users.

Referring to FIG. 234, the process cartridge 1 may further include a force applying unit WW300. The force applying unit WW300 may be disposed at the cartridge body 10 and located at same end as the force receiving unit 21; and the force applying unit WW300 may be configured to make the force receiving unit 21 to be engaged with or separated from the driving unit 1080.

As shown in FIG. 236, an installation hole WW111 may be configured on the end cover WW11 of the process cartridge 1, and the force applying unit WW300 may be detachably connected to the process cartridge 1 through the installation hole WW111.

As shown in FIGS. 237A-237B, the force applying unit WW300 may include a supporting part WW310, a transferring part WW320 and a force applying part WW330. The supporting part WW310 may apply the force to the force applying part WW330 through the transferring part WW320, such that the force applying part WW330 may apply the force to the driving unit pushing part 1090, and the driving unit pushing part 1090 may move along the radial direction of the driving unit 1080 away from its axis. The driving unit 1080 may be modified from the inclined state to the coaxially-aligned state, that is, move from the inclined state relative to the axial direction of the driving unit protective cover (blocking wall) 1081 to a substantially coaxial state, such that the driving unit 1080 may be engaged with or separated from the force receiving unit 21. In one embodiment, when the driving unit 1080 is in contact with the force receiving unit 21, the driving unit 1080 and the force receiving unit 21 may be engaged with each other.

The supporting part WW310 may include an inner wall WW313 close to the end cover WW11 and an outer wall away from the end cover; and the outer wall of the supporting part WW310 may be configured to be abutted against the limiting portion WW20 of the electronic image-forming apparatus. For example, the supporting part may be a support plate or a support block, and the like, which may not be limited herein. During the installation process of the process cartridge, the outer wall of the supporting part 310 may be abutted against the limiting portion WW20 in the electronic image-forming apparatus for receiving the support force of the limiting portion WW20.

In order to realize the detachable connection between the supporting part WW310 and the end cover WW11, the inner wall WW313 of the supporting part WW310 may be configured with a locking portion WW314, and the locking portion WW314 may be locked in the installation hole WW111 of the end cover WW11.

Along the length direction of the process cartridge 1, the supporting part WW310 may further include an inner side close to the force receiving unit 21 and an outer side WW311 away from the force receiving unit 21. A support rail WW340 may be fixed on the outer side WW311 of the supporting part WW310, a guide chute WW341 may be disposed on the support rail WW340, the upper part of the force applying part WW330 may be disposed with a second engaging part WW322 cooperated with the guide chute WW341, and the guide chute WW341 of the force applying part WW330 may be slidably connected to the second engaging part WW322 of the support rail WW340, thereby realizing sliding connection between the force applying part WW330 and the supporting part WW310.

A limiting plate (not shown in drawings) may be also disposed on the force applying part WW330, which may be configured to limit the force applying part WW330 between the support rail WW340 and the transferring part WW320. In such way, it may prevent the force applying part WW340 from falling, position shifting and the like during repeated movements which may affect working effect of the force applying part WW340.

As shown in FIGS. 237A and 237B, a connecting arm WW3211 may be also disposed on the outer side WW311 of the supporting part WW310; the end of the connecting arm WW3211 away from the supporting part WW310 may be connected to a fixed shaft WW3212; and the transferring part WW320 may be installed on the fixed shaft WW3212. For example, the transferring part WW320 may include a first engaging part WW321, and the first engaging part WW321 may be installed on the fixed shaft 3212 of the supporting part WW310, and the first engaging part WW321 may be fixedly connected to the outer side WW311 of the supporting part WW310 through the fixed shaft WW3212 and the connecting arm WW3211.

The transferring part WW320 may further include the second engaging part WW322 engaged with the first engaging part WW321; the second engaging part WW322 may be connected to the connecting arm WW3211 through the first connecting part WW3221; and the side of the first connecting part WW3221 away from the inner wall WW313 of the supporting part WW310 may be abutted against the second side wall WW112 of the end cover WW11.

The force applying unit WW300 may further include a second elastic part WW350. In order to facilitate the installation of the second elastic part WW350, the inner wall WW313 of the supporting part WW310 may be configured with a protrusion WW312. One end of the second elastic part WW350 may be sleeved on the protrusion WW312, and the other end may be fixed on the first connecting part WW3221 of the second engaging part WW332.

The side of the force applying part WW330 close to the transferring part WW320 may be configured with an engaging portion WW331; the first engaging part WW321 may be disposed between the force applying part WW330 and the second engaging part WW322; and two sides of the first engaging part WW321 may be engaged with the engaging portion WW331 of the force applying part WW330 and the second engaging part WW322 respectively.

It should be noted that the second elastic part WW350 may be optionally a spring, and the second elastic part WW350 may act as a buffer. The first engaging part WW321 may be optionally a gear, and the second engaging part WW322 may be optionally a rack. The first engaging part and the second engaging part may also be configured as other transfer mechanisms for adapting to different force applying units WW300 and process cartridges 1.

Furthermore, after the force applying unit WW300 is installed on the end cover WW110, the first side WW3222 of the second engaging part WW322 may be abutted against the end of the first side wall WW112 of the end cover WW11; and the second side WW3223 of the second engaging part WW322 may be not in contact with the inner wall WW313 of the supporting part WW310 and may be spaced at a certain distance. Meanwhile, the force applying part WW330 may be located at the position adjacent to the step portion WW113 of the end cover WW11.

As shown in FIGS. 235A and 238-241, when the user installs the process cartridge 1 in the electronic image-forming apparatus 100 through the rail GG50 disposed on the inner wall of the electronic image-forming apparatus 100 along the installation direction of the process cartridge 1, the supporting part WW310 may be first in pre-contact with the limiting portion WW20 disposed in the electronic image-forming apparatus 100, the force receiving unit 21 may be inserted into the connecting chamber GG33 disposed at the driving unit protective cover (blocking wall) 1081, and the force applying part WW330 may be inserted into the driving unit protective cover (blocking wall) 1081 through the opening GG31 (as shown in FIG. 235C) disposed under the driving unit protective cover (blocking wall) 1081. At this point, the force receiving unit 21 may be not in contact with the driving unit 1080, and the supporting part WW310 may also be not in contact with the driving unit pushing part 1090. The driving unit 1080 may still keep the inclined state relative to the axial direction of the driving unit protective cover (blocking wall) 1081 due to the support of the driving unit pushing part 1090.

The user continues to apply force to the process cartridge 1 along the installation direction of the process cartridge 1, such that the process cartridge 1 may continue to move toward the designated installation position of the electronic image-forming apparatus 100, and the blocking portion WW20 may apply the support force to the supporting part WW310 along the direction opposite to the installation of the process cartridge 1. Since the second side wall WW112 of the end cover WW11 is abutted against the first connecting part WW3221, the first connecting part WW3221 may apply the force toward the installation direction of the process cartridge 1. The second elastic part WW350 may be deformed due to being squeezed. Meantime, the first connecting part WW3221 may drive the second engaging part WW322 to move toward the installation direction of the process cartridge 1, and the second engaging part WW322 may drive the first engaging part WW321 to move toward the direction opposite to the installation of the process cartridge 1. Simultaneously, the force applying part WW330 may be driven to move along the inner wall of the driving unit protective cover (blocking wall) 1081 toward the direction opposite to the installation of the process cartridge 1 to be in pre-contact with the driving unit pushing part 1090.

When the first engaging part WW321 drives the force applying part WW330 to continue to move along the inner wall of the driving unit protective cover (blocking wall) 1081 toward the direction opposite to the installation of the process cartridge 1 until the engaging portion WW331 is abutted against the step portion WW113, the engaging portion WW331 may be pressed by the step portion WW113 toward the direction away from the end cover WW110, forcing the force applying part WW330 to move close to the driving unit pushing part 1090. The force applying part WW330 may gradually apply the downward pressing force to the driving unit pushing part 1090 to press down the driving unit pushing part 1090. At this point, the driving unit 1080 may fall along the direction of gravity due to the loss of support, and the driving unit 1080 may be adjusted from the inclined state to the coaxially-aligned state. That is, the driving unit may move from the inclined state relative to the axial direction of the driving unit protective cover (blocking wall) 1081 to a substantially coaxial state and may be in contact and engaged with the force receiving unit 21.

Furthermore, in order to ensure that the force receiving unit 21 and the driving unit 1080 are accurately engaged, as shown in FIG. 241, the process cartridge may further include a locking part WW600. The locking part WW600 may be disposed at the position close to the cartridge body 10 and the photosensitive drum 20. The locking part WW600 may be configured with a bending portion WW610. After the driving unit 1080 is connected to the force receiving unit 21, the drive device (not shown in drawings) of the locking part WW600 may drive the locking part WW600 to move horizontally toward the driving unit 1080, and the bending portion WW610 may be abutted against the driving unit 1080, thereby realizing the locking of the driving unit 1080. The driving unit 1080 may be adjusted from the inclined state to the coaxially-aligned state, that is, the driving unit 1080 may move from the inclined state relative to the axial direction of the driving unit protective cover (blocking wall) 1081 to a substantially coaxial state. After the force receiving unit 21 and the driving unit 1080 complete engagement rotation, the force receiving unit 21 and the driving unit 1080 may simultaneously apply rotational force to the photosensitive drum 20 and the gear of the developing roller 30.

As shown in FIGS. 241-243, when the user needs to remove the process cartridge 1 from the electronic image-forming apparatus 100, the drive device (not shown) of the locking part may drive the locking part WW600 to move horizontally away from the driving unit 1080. At this point, the bending portion WW610 may be not abutted against the driving unit 1080, and the user may pull out the process cartridge 1, using the handle WW700 disposed on the process cartridge 1, through the rail disposed on the inner wall of the electronic image-forming apparatus 100 along the opposite direction of the installation of the process cartridge 1. At this point, the supporting part WW310 may be gradually out of contact with the limiting portion WW20, and the pressing force applied by the limiting portion WW20 on the supporting part WW310 may gradually decrease. At this point, the second elastic part WW350 may need to restore the elastic deformation, and the first connecting part WW3221 may drive the second engaging part WW322 to move toward the opposite direction of the installation of the process cartridge 1, which may force the first engaging part WW321 to move along the opposite direction toward the installation of the process cartridge 1, drive the force applying part WW330 to move toward the installation direction of the process cartridge 1 along the inner wall of the driving unit protective cover (blocking wall) 1081 and may be separated from the driving unit pushing part 1090. Therefore, the force applied by the force applying part WW330 on the driving unit pushing part 1090 may be also gradually reduced, and the driving unit pushing part 1090 may move along the direction opposite to the radial direction of the driving unit 1080 under the elastic force of the spring until being in contact with the driving unit 1080, which may apply the support force along the radial direction to the driving unit 1080 and force the driving unit 1080 to tilt relative to the axial direction of the driving unit protective cover (blocking wall) 1081. In such way, it may realize that the driving unit 1080 may be not engaged with the force receiving unit 21 and may be not in contact with the developing roller gear by separation. The user only needs to hold the handle WW700 to remove the process cartridge 1 from the electronic image-forming apparatus 100.

Embodiment Forty Nine

A process cartridge is provided in one embodiment. Undescribed parts may be same as the description in above embodiments, which may not be described in detail for brevity. The difference between one embodiment and above-mentioned embodiment forty eight is described hereinafter.

As shown in FIG. 244, the process cartridge 1 may further include a force applying unit XX300, which may be disposed at the cartridge body 10 and located at the same end as the force receiving unit 21; and the force applying unit XX300 may replace the force applying unit WW300 in embodiment five or fifty.

As shown in FIGS. 245A and 245C, the force applying unit XX300 may include a supporting part XX310, a transferring part XX320 and a force applying part XX330. The supporting part XX310 may apply the force to the force applying part XX330 through the transferring part XX320, such that the force applied by the force applying part XX330 to the driving unit pushing part 1090 may make the driving unit 1080 to be engaged with or separated from the force receiving unit 21. In one embodiment, when the driving unit 1080 is in contact with the force receiving unit 21, the driving unit 1080 and the force receiving unit 21 may be engaged with each other.

The inner wall XX312 of the supporting part XX310 may be configured with a locking portion XX315; the end of the locking portion XX315 may be configured with a bending portion 3151; and the bending portion XX3151 may be locked in the installation hole WW111 to realize detachable connection between the supporting part XX310 and the end cover WW11.

Along the length direction of the process cartridge 1, the supporting part XX310 may further include an inner side close to the force receiving unit 21 and an outer side XX311 away from the force receiving unit 21. A support rail XX340 may be fixed on the outer side XX311 of the supporting part XX310, a guide chute XX341 may be configured on the support rail XX340, the protrusion of the force applying part XX330 may be configured with a guide part XX331, the guide part XX331 may be configured with a limiting slide XX3311, and the support rail XX340 may be slidably connected to the force applying part XX330 through the guide chute XX341 and the limiting slide XX3311.

A limiting plate (not shown in drawings) may be also disposed on the limiting slide XX3311, configured to limit the force applying part XX330 within the length range of the guide chute XX341 of the support rail XX340 (that is, within the movement range). In such way, it may prevent the force applying part XX330 from falling, position shifting and the like during repeated movements which may affect the working effect of the force applying part XX330.

As shown in FIGS. 245A and 245C, the transferring part XX320 may include an abutting part XX321, a first connecting part XX322 and a second connecting part XX323. Two ends of the first connecting part XX322 may be respectively connected to the abutting part XX321 and the second connecting part XX323. The abutting part XX321, the first connecting part XX322 and the second connecting part XX323 may be configured as an integrated structure. Or the abutting part XX321, the first connecting part XX322 and the second connecting part XX323 may also be configured as a detachable structure.

At least one connecting arm XX313 may be disposed on the inner wall XX312 of the supporting part XX310. The number of connecting arms XX313 may be optionally two. Two connecting arms XX313 may be disposed at the inner wall XX312 in a symmetrical manner relative to the first connecting part XX322. Two vertically symmetrical connecting arms XX313 may be detachably connected to the first connecting part XX322 through the second movable part XX360.

One end of the first connecting part XX322 may be connected to the abutting XX321, and the other end of the first connecting part XX322 may be connected to the second connecting part XX323. One end of the second connecting part XX323 may be optionally connected to the first connecting part XX322 in a manner perpendicular to the end surface of the first connecting part XX322, and the other end of the second connecting part XX323 may be detachably connected to the force applying part XX330 through the first movable part XX350.

As shown in FIGS. 245A and 245C, the force applying unit XX300 may further include the second elastic part XX370. In order to facilitate the installation of the elastic part WW370, a protrusion XX314 may be also disposed on the inner wall XX312 of the supporting part XX310. One end of the second elastic part XX370 may be sleeved on the protrusion XX314, and the other end of the second elastic part XX370 may be fixed on the first connecting part XX322 at the position close to the abutting part XX321.

Referring to FIG. 246, after the force applying unit XX300 is installed on the end cover WW11 of the process cartridge 1, the force applying unit XX300 may be disposed opposite to the second side wall WW112 of the end cover WW11, the abutting portion XX3211 of the abutting part XX321 may be abutted against the second side wall WW112 of the end cover WW11, the first side XX3221 of the first connecting part XX322 opposite to the second side wall WW112 may be parallel with and separated from the second side wall WW112 along the axial direction of the developing roller 30 by a certain distance, and the second side XX3222 of the first connecting part XX322 opposite to the inner wall XX312 may be parallel with and separated from the inner wall XX312 along the axial direction of the developing roller 30 by a certain distance. If the pressing force is applied to the abutting portion XX3211 of the abutting part XX321 along the direction perpendicular to the axial direction of the developing roller 30, the second elastic part XX370 may be deformed. The first connecting part XX322 may rotate between two connecting arms XX313 arranged symmetrically up and down relative to the second movable part XX360. Due to the rotation of the first connecting part XX322, the second connecting part XX323 may be applied by the rotational force and move toward the second side wall WW112 close to the end cover WW11 and push the force applying part XX330 to move toward the direction of the driving unit pushing part 1090 disposed in the electronic image-forming apparatus 100.

It should be noted that the second elastic part XX370 may be optionally a spring, and the second elastic part XX370 may act as a buffer. The first movable part XX350 and the second movable part XX360 may be optionally movable pins. The first movable part XX350 and the second movable part XX360 may also be configured as other movable connection mechanisms. The transferring part XX320 may also be configured in other structures for adapting to different control units and the process cartridges 1.

As shown in FIGS. 245A-245C and 247, when the user, through the handle WW700 disposed on the process cartridge 1, installs the process cartridge 1 inside the electronic image-forming apparatus 100 along the installation direction of the process cartridge 1 through the rail GG50 disposed on the inner wall of the electronic image-forming apparatus 100, the supporting part XX310 may be first in pre-contact with the limiting portion WW20 (as shown in FIG. 238) disposed in the electronic image-forming apparatus 100; the driving head 210 may be inserted into the connecting chamber GG33 configured at the driving unit protective cover (blocking wall) 1081; and the force applying part XX330 may be inserted into the driving unit protective cover (blocking wall) 1081 through the opening GG31 disposed under the driving unit protective cover (blocking wall) 1081. At this point, the force receiving unit 21 may be not in contact with the driving unit 1080; and the supporting part XX310 may be not in contact with the driving unit pushing part 1090. The driving unit 1080 may be still inclined relative to the axial direction of the driving unit protective cover (blocking wall) 1081 due to the support of the driving unit pushing part 1090.

During the process of that the user continues to apply the force to the process cartridge 1 along the installation direction of the process cartridge 1 to make the process cartridge 1 continue to move toward the designated installation position of the electronic image-forming apparatus 100, the limiting portion WW20 may apply the support force to the supporting part XX310 along the direction opposite to the installation of the process cartridge 1. Since the second side wall WW112 of the end cover WW11 is in contact with the abutting portion XX3211 of the abutting part XX321, a force may be applied to the abutting portion XX3211 toward the installation direction of the process cartridge 1, and the second elastic part XX370 may be deformed due to being squeezed. Meanwhile, the first connecting part XX322 may be driven by the abutting part XX321 to be twisted toward the direction close to the second side wall WW112 between two connecting arms XX313 arranged symmetrically up and down relative to the second movable part XX360, and the second connecting part XX323 may be further driven to move toward the direction close to the second side wall WW112 along the direction opposite to the installation of the process cartridge 1. Meanwhile, the force applying part XX330 may be driven to move toward the direction opposite to the installation of the process cartridge 1 along the inner wall of the driving unit protective cover (blocking wall) 1081 to be in pre-contact with the driving unit pushing part 1090.

When the process cartridge 1 is installed at a preset installation position in the electronic image-forming apparatus 100, the pressing force applied by the blocking portion WW20 to the supporting part XX310 along the direction opposite to the installation of the process cartridge 1 may reach the maximum, the deformation of the second elastic part XX370 may reach the maximum, and the twisting amplitude of the first connecting part XX322 relative to the second movable part XX360 between two connecting arms XX313 symmetrically arranged up and down toward the direction close to the second side wall WW112 may reach the maximum. Meanwhile, when the second connecting part XX323 continues to move toward the second side wall WW112 along the direction opposite to the installation of the process cartridge 1 due to the twisting of the first connecting part XX322 until the end of the second connecting part XX323 is contact with the second side wall WW112, the force applying part XX330 may be forced to move close to the driving unit pushing part 1090 because the force applying part XX330 continues to receive the pushing force exerted by the second connecting part XX323 toward the direction opposite to the installation of the process cartridge 1, and may gradually apply downward pressure to the driving unit pushing part 1090 to press down the driving unit pushing part 1090. At this time, the driving unit 1080 may fall along the direction of gravity due to the loss of support to be in contact and engaged with the force receiving unit 21. Therefore, after the force receiving unit 21 is engaged with the driving unit 1080, a rotational force may be simultaneously applied to the photosensitive drum 20 and the developing roller.

Furthermore, in order to ensure that the force receiving unit 21 and the driving unit 1080 can be accurately engaged with each other, as shown in FIG. 248, the process cartridge may further include a locking part XX600. The locking part XX600 may be disposed at the position close to the cartridge body 10 and the photosensitive drum 20; and the locking part XX600 may be configured with a bending portion XX610. After the driving unit 1080 is connected to the force receiving unit 21, the drive device (not shown in drawings) of the locking part XX600 may drive the locking part XX600 to move horizontally toward the driving unit 1080, and the bending portion XX610 may be abutted against the driving unit 1080, thereby realizing locking of the driving unit 1080.

As shown in FIGS. 250-251, when the process cartridge 1 needs to be removed from the electronic image-forming apparatus 100, the drive device (not shown) of the locking part may drive the locking part XX600 to move horizontally away from the driving unit 1080. At this point, the bending portion XX610 may be out of contact with the driving unit 1080, and the driving unit 1080 may be unlocked.

During the process of pulling out the process cartridge 1 through the rail GG50 disposed on the inner wall of the electronic image-forming apparatus 100 along the direction opposite to the installation of the process cartridge 1 by the user using the handle XX700 disposed on the process cartridge 1, the supporting part XX310 may be gradually out of contact with the limiting portion WW20, and the pressing force applied by the limiting portion WW20 on the supporting part XX310 along the direction opposite to the installation of the process cartridge 1 may gradually decrease. The elastic part XX350 needs to restore the elastic deformation. Therefore, elastic force may be applied to the first connecting part XX322, forcing the first connecting part XX322 to twist along the direction close to the inner wall XX312 between two connecting arms XX313 arranged symmetrically up and down relative to the second movable part XX360. The second connecting part XX323 may be driven to move along the direction opposite to the installation of the process cartridge 1 toward the direction away from the second side wall WW112 and close to the inner wall XX312, such that the second connecting part XX323 may be gradually out of contact with the second side wall WW112. Meanwhile, the force applying part XX330 may be driven to move along the inner wall of the driving unit protective cover (blocking wall) 1081 toward the installation direction of the process cartridge 1 and then gradually out of contact with the driving unit pushing part 1090. The driving unit pushing part 1090 may be driven to move along the direction opposite to the radial direction of the driving unit 1080 under the elastic force of the spring until being in contact with the driving unit 1080, which may apply the support force along the radial direction to the driving unit 1080 and force the driving unit 1080 to tilt relative to the axial direction of the driving unit protective cover (blocking wall) 1081. In such way, it may realize that the driving unit 1080 may be not engaged with the force receiving unit 21 and may be not in contact with the developing roller gear by separation.

When the supporting part XX310 is completely out of contact with the limiting portion WW20, the second elastic part XX370 may completely restore deformation; the first side XX3221 of the first connecting part XX322 opposite to the second side wall WW112 may be forced to be in parallel with each other and at a certain distance from the second side wall WW112 along the axial direction of the developing roller 30; and the second side of the first connecting part XX322 opposite to the inner wall of the end cover WW11 may be forced to be in parallel with and at a certain distance from the inner wall along the axial direction of the developing roller 30. The user may hold the handle WW700 to completely remove the process cartridge 1 from the electronic image-forming apparatus 100.

The technical solutions provided by embodiment fifty and embodiment fifty one may make the printer transfer head disposed in the printer and the photosensitive drum force receiving head disposed on the process cartridge to be engaged with each other accurately and quickly to transfer force, which may effectively improve working efficiency of the process cartridge.

Embodiment Fifty

Another process cartridge is provided in one embodiment. Undescribed parts may be same as those in above embodiments, which may not be described in detail for brevity.

The difference between one embodiment and above-mentioned embodiment is that: as shown in FIGS. 161A and 252, the force receiving unit 21 of the process cartridge 1 may be in contact and engaged with the driving unit 1080 of the electronic image-forming apparatus 100, and the driving unit 1080 may be supported by the driving unit pushing part 1090 in the electronic image-forming apparatus 100 to be at the inclined state.

As shown in FIG. 252, in the process cartridge 1 provided by the present disclosure, a groove 20*a* may be configured at the end of the photosensitive drum 20, and the force receiving unit 21 may be disposed at the groove 20*a* at the end of the photosensitive drum 20.

An end portion of the process cartridge 1 may be configured with the pressing part 40 which may be configured to move along the axial direction of the photosensitive drum 20 by a control mechanism. The pressing part 40 in one embodiment may be used as a force applying unit. The pressing part 40 (force applying unit) may be a bent plectrum, such as a metal plectrum, a plastic plectrum, and the like, which may not be limited herein.

In one embodiment, the pressing part 40 may be a Z-shaped plectrum, and the pressing part 40 may have a first abutting end 40*a* which may be configured to be abutted against the driving unit pushing part 1090.

The process cartridge 1 may further include a control mechanism (not shown in drawings), one end of the control mechanism may be fixed on the process cartridge 1, and the other end of the control mechanism may be connected to the end of the pressing part 40 away from the first abutting end 40*a*.

As shown in FIGS. 252-253, after the process cartridge 1 is installed in the electronic image-forming apparatus 100, as the door cover of the electronic image-forming apparatus 100 is closed, the control mechanism may touch corresponding parts in the electronic image-forming apparatus 100 and move along the axial direction of the photosensitive drum 20. Therefore, the pressing part 40 connected to the control mechanism may also be driven to move toward the driving unit 1080 along the axial direction of the photosensitive drum 20. At this point, the first abutting end 40*a* of the pressing part 40 may move between the driving unit 1080 and the driving unit pushing part 1090 and also apply a force to the driving unit pushing part 1090, such that the driving unit pushing part may overcome the elastic force of the spring 1060 and move downward toward the direction of the spring 1060. At this point, the driving unit 1080 may be no longer supported by the driving unit pushing part 1090, and the driving unit 1080 may be adjusted from the inclined state to the coaxially-aligned state by the action of gravity, that is, the axis of the driving unit 1080 may be coaxially arranged with the axis of the photosensitive drum 20, such that the driving unit 1080 may be smoothly engaged with the force receiving unit 21.

Embodiment Fifty One

Another process cartridge is provided in one embodiment. Undescribed parts may be same as those in above embodiments, which may not be described in detail for brevity.

The difference between one embodiment and above-mentioned embodiments is that, as shown in FIGS. 254 and 255, the force receiving unit 21 of the process cartridge 1 may be in contact and engaged with the driving unit 1080 of the electronic image-forming apparatus 100, and the driving unit 1080 may be supported by the driving unit pushing part 1090 in the electronic image-forming apparatus 100 to be at the inclined state. One end of the driving unit pushing part 1090 may be abutted against the driving unit 1080, and the other end may be abutted against the spring 1060.

The driving unit protective cover (blocking wall) 1081 may be also disposed along the outer circumference of the driving unit 1080 for limiting the movement range of the driving unit 1080. The groove 20*a* may be configured at the end of the photosensitive drum 20, and the force receiving unit 21 may be disposed at the groove 20*a* at the end of the photosensitive drum 20.

The process cartridge may further include the pressing part 40 and a control mechanism (not shown); the pressing part 40 may be disposed at the end of the process cartridge 1; and the pressing part 40 may be configured to move along the axial direction of the photosensitive drum 20 through the control mechanism. For example, the pressing part 40 in one embodiment may be used as a force applying unit. The pressing part 40 (force applying unit) may be a bent plectrum, such as a metal plectrum, a plastic plectrum and the like, which may not be limited.

Furthermore, as shown in FIG. 257, the control mechanism may include the first control part VV51 and the second control part VV52; and the pressing part 40 may be connected to the first control part VV51 and the second control part VV52.

As shown in FIGS. 255 and 256, after the process cartridge 1 is installed in the electronic image-forming apparatus 100, the first control part VV51 may receive an upward force F1 after touching the bottom plate in the electronic image-forming apparatus 100, thereby moving along the direction perpendicular to the length direction of the process cartridge 1 to approach the photosensitive drum 20, and then driving the pressing part 40 to move along the length direction of the process cartridge 1 to approach the driving unit 1080. At this point, the pressing part 40 may pass through the opening 1071 of the driving unit protective cover (blocking wall) 1081 and may be abutted against or overlapped with the driving unit pushing part 1090. At this point, the pressing part 40 may be at the second position (refer to FIG. 238).

As shown in FIGS. 257 and 260, when the pressing part 40 moves from the initial position to the second position that the pressing part is abutted or overlapped with the driving unit pushing part 1090 along the axial direction of the photosensitive drum, as the door cover VV13 of the electronic image-forming apparatus 100 is closed, the second control part VV52 linked to the door cover VV13 may drive the pressing part 40 to rotate and swing relative to the axis of the driving unit pushing part 1090. At this point, one end of the pressing part 40 may move forward along the direction substantially perpendicular to the length direction of the process cartridge 1 (the installation direction of the process cartridge 1) and apply the force to the driving unit pushing part 1090, such that the driving unit pushing part may overcome the elastic force of the spring 1060 and move downward along the direction of the spring 1060 (press down the driving unit pushing part 1090). At this point, the pressing part 40 may be in the third position, and after losing the support of the driving unit pushing part 1090, the driving unit 1080 may move from the inclined state to the position where the driving unit's axis is substantially in parallel or coaxial with the axis of the photosensitive drum 20 during rotation, such that the force receiving unit 21 may be smoothly engaged with the driving unit 1080.

Embodiment Fifty Two

As shown in FIGS. 261-262, the present disclosure provides the electronic image-forming apparatus 100 including the process cartridge 1, a main assembly YY101 capable of accommodating the process cartridge 1, and the driving unit 1080.

The electronic image-forming apparatus may be a printer, a copier, an all-in-one scanning and copying machine, and the like, which may not be limited herein. The printer is used as an example to describe the solutions.

As shown in FIGS. 262 and 263, the main assembly YY101 may be configured with an installation chamber for installing the process cartridge 1. The main assembly YY101 may be configured with a left side wall (not shown) and a right side wall YY102 along the length direction Y of the process cartridge 1; and both left and right side walls YY102 may be disposed with guide rails for guiding the installation of the process cartridge 1. Taking the right side wall YY102 as an example, the right side wall YY102 may be configured with the first guide rail YY105, the second guide rail YY107 and the third guide rail YY108. The first guide rail YY105, the second guide rail YY107 and the third guide rail YY108 may be arranged sequentially from top to bottom.

Along the installation direction X of the process cartridge 1, the driving unit 1080 may be disposed on the lower side of the first guide rail YY105, the second guide rail YY107, and the third guide rail YY108 to transfer the driving force to the process cartridge 1 in the state where the process cartridge 1 is installed in place.

In one embodiment, the driving unit 1080 may be a printer transfer head, and the driving unit protective cover 1081 may be disposed on the outside of the driving unit 1080. The driving unit protective cover 1081 may be placed on the outside of the driving unit (printer transfer head) to avoid that the driving unit 1080 is subject to unnecessary collision.

Furthermore, in order to prevent the process cartridge 1 incompatible with the electronic image-forming apparatus from being mistakenly installed into the electronic image-forming apparatus, the electronic image-forming apparatus may further include an identification mechanism for identifying incompatible process cartridge 1.

Referring to FIG. 264, the identification mechanism may include the first movable part YY103 and the second movable part YY104. The first movable part YY103 may be disposed at the side wall of the main assembly YY101. The first movable part YY103 may include the first position for limiting installation of the process cartridge 1 and the second position for allowing installation of the process cartridge 1 and may move between the first position and the second position.

For example, the first movable part YY103 may be disposed on the right side wall YY102 of the main assembly YY101. As shown in FIG. 265, the first movable part YY103 may include a rotating shaft L1 and a blocking portion YY1030 connected to the rotating shaft L1. The rotation direction of the rotating shaft L1 may be in parallel with the installation direction X of the process cartridge 1, and the blocking portion YY1030 may limit the process cartridge 1 from being installed in the installation chamber of the electronic image-forming apparatus 100. In some embodiments, the blocking portion YY1030 may protrude from the side wall of the rotation axis L1 and also protrude relative to the right side wall YY102; and the blocking portion YY1030 may rotate with the rotation of the rotation axis L1. Optionally, the movement of the first movable part YY103 may not be limited to the rotational manner and may also move linearly along the length direction of the process cartridge 1 or in a rotational manner.

The first movable part YY103 may protrude from the right side wall YY102 at the first position to be able to interfere with the process cartridge 1 installed on the main assembly YY101 and limit the installation of the process cartridge. In such position, the process cartridge may be blocked by the blocking portion YY1030 of the first movable part YY103 and may not be installed in place, thereby not receiving the driving force from the electronic image-forming apparatus. When the first movable part YY103 is at the second position, the first movable part YY103 may be retracted relative to the first position, that is, the rotation axis L1 of the first movable part YY103 may be deviated, such that the blocking portion YY1030 may be closer to the right side wall YY102. In such position, the process cartridge 1 may be installed in place, and may receive the driving force from the electronic image-forming apparatus and perform normal printing operations. The term "installed in place" here refers to that the process cartridge may normally receive the driving force and perform printing operations after being installed.

Referring to FIG. 264, along the installation direction X of the process cartridge 1, the blocking portion YY1030 may include the first surface YY1031 located on the front side of the first movable part YY103, the second surface YY1032 located on the rear side of the first movable part YY103, and the third surface YY1033 intersecting the first surface YY1031 and the second surface YY1032. The first surface YY1031 and the second surface YY1032 may be configured as surfaces perpendicular to the rotation axis L1. The third surface YY1033 may be configured as an inclined surface intersecting the first surface YY1031 and the second surface YY1032. Optionally, the third surface YY1033 may be inclined toward the upper side and face the other side away from the right side wall YY102.

Optionally, the third surface YY1033 may also be a curved surface or a straight surface perpendicular to the first surface YY1031 and the second surface YY1032. When the first movable part YY103 is at the first position, the first surface YY1031, the second surface YY1032 and the third surface YY1033 may be away from the right side wall YY102, that is, exposed to the outside, thereby preventing the installation of non-compatible process cartridges.

A bias part may be also disposed on one side of the first movable part YY103, and the bias part may be configured to maintain the position of the first movable part YY103. Exemplarily, the bias part may be a torsion spring. The free end of the torsion spring may be abutted against the rear side of the blocking portion YY1030 of the first movable part YY103, for example, may be abutted against the second surface YY1032, such that the first movable part YY103 may be kept at the first position when no external force is applied.

It should be noted that, in one embodiment, along the installation direction X of the process cartridge 1, the front side refers to the side entering the installation chamber first when the process cartridge is installed in the installation chamber of the process cartridge of the electronic image-forming apparatus, and the back side refers to the side entering the installation chamber of the process cartridge afterward. Relative to the electronic image-forming apparatus, the side that comes into contact with the process cartridge 1 first is the front side, and the side that comes into contact with the process cartridge 1 afterward is the rear side.

Next, the structure of the process cartridge 1 is described with reference to FIGS. 265-269.

FIG. 265 is a structural schematic of the process cartridge according to embodiments of the present disclosure. As shown in FIG. 265, the process cartridge 1 may include the toner cartridge 11, the waste toner cartridge 12, the photosensitive drum 20, the force receiving unit 21 located on one side of the waste toner cartridge 12, a conductive unit YY22 disposed at the other side of the waste toner cartridge 12, and the developing roller (not shown).

The photosensitive drum 20 may be rotatably installed on the waste toner cartridge 12 on the front side of the process cartridge 1 along the installation direction X of the process cartridge 1. The force receiving unit 21 may be disposed at one end of the photosensitive drum 20. The force receiving unit 21 may be configured to receive the driving force of the driving unit (i.e., the driving head of the printer) 1080 of the electronic image-forming apparatus (not shown in drawings).

The toner cartridge 11 may be connected to the waste toner cartridge 12. Along the installation direction X of the process cartridge 1, the developing roller may be rotatably disposed at the toner cartridge 11 and located on the front side of the process cartridge 1. The developing roller may face the photosensitive drum 20 to transfer the developer to the photosensitive drum 20.

The process cartridge 1 may further include the first end cover YY11 and the second end cover YY12 oppositely disposed at its length direction. The first end cover YY11 may be located at the driving end of the process cartridge 1 (that is, the end of the process cartridge 1 with the force receiving unit 21), and the second end cover YY12 may be located at the conductive end of the process cartridge 1 (that is, the end of the process cartridge 1 with the conductive unit YY22). In one embodiment, the first end cover YY11 and the second end cover YY12 may be integrally configured or integrally formed with the waste toner cartridge 12 or may be separately configured.

Along the length direction of the process cartridge 1, the first end cover YY11 located at the end of the process cartridge 1 may be configured with a recessed portion YY15 and a protruding portion YY14. The force receiving unit 21 may be located in the recessed portion YY15. The setting of the recessed portion YY15 may prevent the force receiving unit 21 from interfering with the driving unit protective cover 1081. The force receiving unit 21 may engaged with the driving unit 1080 to receive the driving force when the process cartridge 1 is installed in the main assembly YY101 of the electronic image-forming apparatus, and the force receiving unit 21 may drive the photosensitive drum 20 to rotate by receiving the driving force.

The protruding portion YY14 of the first end cover YY11 may protrude relative to the recessed portion YY15. In one embodiment, the protruding portion YY14 of the first end cover YY11 may be configured with a plurality of guided portions YY16 that may be inserted into guide rails on the side walls of the main assembly YY101, such that the process cartridge 1 may move along the guide rails.

As shown in FIGS. 265-267, the process cartridge 1 may further include a force applying part YY5. The force applying part YY5 may be disposed at the end of the process cartridge 1 along the axial direction L2 of the photosensitive drum and located on the side close to the force receiving unit 21. The force applying part YY5 may apply force to the first movable part to move the first movable part YY103 from the first position to the second position.

Projection may be performed along the axial direction of the photosensitive drum, and the force applying part YY5 may be located outside the circumference of the photosensitive drum 20.

The force applying part YY5 may extend obliquely from the recessed portion YY15 to the end surface of the protruding portion YY14 along the axial direction L2 of the photosensitive drum 20. In some embodiments, the force applying part YY5 may be disposed at the first end cover YY11 or the frame for supporting the photosensitive drum 20. Taking the force applying part YY5 disposed at the first end cover YY11 as an example, the force applying part YY5 may be fixedly connected to the first end cover YY11. The force applying part YY5 may be disposed on the side of the protruding portion YY14 close to the recessed portion YY15. In addition, the force applying part YY5 may be disposed above the photosensitive drum 20.

FIG. 266 is a structural schematic of the first end cover of the process cartridge according to embodiments of the present disclosure. As shown in FIG. 266, the force applying part YY5 may include the first force applying portion YY51 and the second force applying portion YY52. On the installation direction X of the process cartridge 1, at least a part of the first force applying portion YY51 may be located on the front side of the second force applying portion YY52, such that the first force applying portion YY51 may contact the first movable part YY103 earlier than the second force applying portion YY52 during the installation process.

As shown in FIG. 267, the first force applying portion YY51 may be disposed at the end of the protruding portion YY14 of the first end cover YY11 close to the recessed portion YY15. The first force applying portion YY51 may include the first pressing surface YY511. The first pressing surface YY511 may extend obliquely from the side wall or bottom wall of the recessed portion YY15 along the axial direction L2 of the photosensitive drum 20 toward the end surface of the protruding portion YY14. The first pressing surface YY511 may be configured to apply force to the first movable part YY103.

For example, the first force applying portion YY51 may further include the first front end surface YY512, which is in parallel or approximately in parallel with the axial direction L2 of the photosensitive drum 20; and the first pressing surface YY511 may be an inclined surface connecting the end surface YY13 of the first end cover YY11 and the first front end surface YY512. In one embodiment, the first pressing surface YY511 may face the side of the driving unit 1080 of the electronic image-forming apparatus 100. Optionally, the first end cover YY11 may be projected along the axial direction L2 of the photosensitive drum 20, and the first force applying portion YY51 may be located outside the circumference of the photosensitive drum 20 and on the upper side of the photosensitive drum 20.

The second force applying portion YY52 may be disposed at one end of the protruding portion YY14 of the first end cover YY11 close to the recessed portion YY15. The second force applying portion YY52 may include the second pressing surface YY521. The second pressing surface YY521 may extend obliquely from the side wall or bottom wall of the recessed portion YY15 toward the end surface of the protruding portion YY14 along the axial direction L2 of the photosensitive drum 20.

For example, the second force applying portion YY52 may further include the second front end surface YY522, which is in parallel or approximately in parallel with the axial direction L2 of the photosensitive drum 20; and the second pressing surface YY521 may be an inclined surface connecting the end surface YY13 and the second front end surface YY522. The second pressing surface YY521 may face the side of the driving unit 1080 of the electronic image-forming apparatus 100. Optionally, the first end cover YY11 may be projected along the axial direction L2 of the photosensitive drum 20, and the second pressing surface YY521 may be located outside the circumference of the photosensitive drum 20 and on the upper side of the photosensitive drum 20.

Compared the first pressing surface YY511 with the second pressing surface YY521, at least a part of the first pressing surface YY511 may be at the front side of the second pressing surface YY521 along the installation direction X of the process cartridge 1.

When the process cartridge 1 is installed in the installation chamber of the electronic image-forming apparatus, the second force applying portion YY52 may be located below the first force applying portion YY51, and at least a part of the first force applying portion YY51 may be located on the front side of the second force applying portion YY52, such that the first force applying portion YY51 may contact the first movable part YY103 earlier than the second force applying portion YY52 during the installation process.

Furthermore, an avoidance portion YY53 may be disposed between the first force applying portion YY51 and the second force applying portion YY52, and the avoidance portion YY53 may be configured to avoid parts on the main assembly YY101 of the electronic image-forming apparatus during the installation process of the process cartridge. It should be understood that the avoidance portion YY53 may be designed to facilitate the installation of the process cartridge 1 and avoid interference with parts on the main assembly YY101.

In some embodiments, the avoidance portion YY53 may be recessed from an end of the second force applying portion YY52 that is close to the outer circumference of the photosensitive drum 20. For example, the avoidance portion YY53 may be an avoidance surface formed on the upper surface of the second force applying portion YY52. The avoidance portion YY53 may be recessed relative to the first force applying portion YY51 and the second force applying portion YY52.

In one embodiment, when the process cartridge 1 is installed in the main assembly YY101 of the electronic image-forming apparatus, the avoidance portion YY53 disposed on the process cartridge may avoid interference with the driving unit protective cover 1081 during installation; that is, may avoid interference with the peripheral outer wall of the driving unit protective cover 1081, thereby being beneficial for the process cartridge 1 to be installed in place.

Next, the installation process of the process cartridge 1 is described with reference to FIGS. 263, 264, 268 and 269.

As shown in FIG. 263, the process cartridge 1 may be inserted into the main assembly YY101 of the electronic image-forming apparatus 100 along the installation direction X, such that the guided portion YY16 of the process cartridge 1 may be inserted in the second guide rail YY107 and the third guide rail YY108 on the side wall of the main assembly YY101. As the process cartridge 1 moves forward along the guide rails, the front side of the first force applying portion YY51 may be first abutted against the third surface YY1033 of the first movable part YY103. As the process cartridge 1 moves along the guide rails, the first movable part YY103 may rotate around the rotation axis under the pressing force of the first force applying portion YY51. The first force applying portion YY51 may have a certain guiding effect. Under the cooperation of the first force applying portion YY51, the first movable part YY103 may rotate from the first position to the second position against the force of the bias part. As the process cartridge 1 moves along the guide rails, the avoidance portion YY53 may be used to avoid the first movable part YY103. The second force applying portion YY52 may have a certain guiding effect. The second force applying portion YY52 may press against the third surface YY1033 of the first movable part YY103 to further push the first movable part YY103 to rotate to the second position. The first movable part YY103 may rotate from the first position to the second position, and the end surface YY13 of the first end cover YY11 may be abutted against the first movable part YY103. Therefore, the protruding portion YY14 of the first end cover YY11 or the protruding portion YY14 of the waste toner cartridge 12 may be prevented from interfering with the first movable part YY103. The first movable part YY103 may be guided to the end surface YY13 of the process cartridge 1, and the process cartridge 1 may be installed in place. The removal process of the process cartridge 1 may be opposite to the installation process of the process cartridge 1 described above. The first movable part YY103 may return from the second position to the first position under the action of the elastic deformation force of the bias part.

Optionally, according to proper adjustment, the first pressing surface YY51 and the second pressing surface YY52 may be configured as curved surfaces. Optionally, the force applying part YY5 may be integrally formed with the first end cover YY11 or the waste toner cartridge 12 or may be configured to be separated from the waste toner cartridge 12.

By arranging the force applying part cooperated with the first movable part, the process cartridge of the present disclosure can be applied to various electronic image-forming apparatuses, which is beneficial to the generalization of the process cartridge.

Embodiment Fifty Three

The process cartridge 1 is provided in embodiments of the present disclosure. The process cartridge 1 may include the toner cartridge 11, the waste toner cartridge 12, the photosensitive drum 20, the force receiving unit 21 located on one side of the waste toner cartridge 12, the conductive unit YY22 disposed at the other side of the waste toner cartridge 12, and the developing roller (not shown).

Above structures may be basically same as those in embodiment one, which may not be described in detail herein.

The shape and structure of the process cartridge 1 of embodiment fifty two may be basically same as those in one embodiment, the similarities may not be described in detail, and the main differences are described below.

The main difference between one embodiment and embodiment fifty two is different shapes and structures of the force applying part.

In order to make the structure simpler, as shown in FIGS. 270-272, the process cartridge 1 provided in one embodiment may include the force applying part YY5. The force applying part YY5 may be disposed at an end of the protruding portion YY14 of the first end cover YY11 that is close to the recessed portion YY15. The force applying part YY5 may include the third pressing surface ZZ54 which may obliquely extend from the side wall or bottom wall of the recessed portion YY15 toward the end surface of the protruding portion YY14 along the axial direction L2 of the photosensitive drum 20. The third pressing surface ZZ54 may be an inclined surface. In addition, the third pressing surface ZZ54 may face the side of the driving unit 1080 of the electronic image-forming apparatus 100. Optionally, the first end cover YY11 may be projected along the axial direction L2 of the photosensitive drum 20, and the force applying part YY5 may be located outside the circumference of the photosensitive drum 20 and on the upper side of the photosensitive drum 20.

Compared with the first pressing surface YY52 in embodiment one, the third pressing surface ZZ54 may extend more toward the rear side of the installation direction X of the process cartridge 1. The third pressing surface ZZ54 may extend to the end surface YY13 of the first end cover YY11, such that the force may be applied to the first movable part YY103 only through the third pressing surface ZZ54. The first movable part YY103 may be moved from the first position to the second position, and may be guided to the end surface YY13, thereby preventing the protruding portion YY14 from interfering with the first movable part YY103.

For example, during the installation process of the process cartridge YY20 to the electronic image-forming apparatus 100, the front end ZZ541 of the third pressing surface ZZ54 may be first abutted against the third surface YY1033 of the first movable part YY103. Therefore, the first movable part YY103 may be forced to rotate to the second position, and the first movable part YY103 may be guided to the end surface ZZ2013, such that the process cartridge YY20 may be installed smoothly. Optionally, the third pressing surface ZZ54 may be replaced by a curved surface, or a curved surface combined with an inclined surface.

By arranging the force applying part cooperated with the first movable part, the process cartridge of the present disclosure can be applied to various electronic image-forming apparatuses, which is beneficial to the generalization of the process cartridge.

Embodiment Fifty Four

The shape and structure of the process cartridge of one embodiment may be basically same as that of the process cartridge 1 of embodiment fifty two, the similarities may not be described in detail, and the main differences are described below.

The main difference between one embodiment and embodiment fifty two is different shapes and structures of the force applying part. In order to make the structure simpler, compared with embodiment fifty two, the first pressing surface YY51 in embodiment fifty two may be omitted in one embodiment.

As shown in FIGS. 273-274, the force applying part YY5 of the process cartridge 1 of one embodiment may be disposed at the end of the protruding portion YY14 of the first end cover YY11 close to the recessed portion YY15; the force applying part YY5 may be configured with the fourth pressing surface AB55; and the fourth pressing surface AB55 may extend obliquely from the side wall or the bottom wall of the recessed portion YY15 toward the end surface of the protruding portion YY14 along the axial direction L2 of the photosensitive drum 20. The fourth pressing surface AB55 may be an inclined surface. In addition, the fourth pressing surface AB55 may face the side of the driving unit 1080 of the electronic image-forming apparatus 100. Optionally, the first end cover YY11 may be projected along the axial direction L2 of the photosensitive drum 20, and the force applying part YY5 may be located outside the circumference of the photosensitive drum 20 and on the upper side of the photosensitive drum 20.

Compared with the second pressing surface YY52 in above embodiments, the fourth pressing surface AB55 may extend more toward the front side and the upper side along the installation direction X of the process cartridge 1. The fourth pressing surface AB55 may extend to the end surface YY13 of the first end cover YY11. The fourth pressing surface AB55 may be a continuous surface which may play a guiding role.

During the installation process of the process cartridge 1, the fourth pressing surface AB55 may be first abutted against the first movable part YY103 and push the first movable part YY103 to move from the first position to the second position and make the protruding portion YY14 away from the end surface YY13, thereby avoiding interference between the protruding portion YY14 and the first movable part YY103.

For example, during the installation process of the process cartridge AB30 to the electronic image-forming apparatus 100, the front end of the fourth pressing surface AB55 may be abutted against the third surface YY1033 of the first movable part YY103 first, thereby forcing the first movable part YY103 to rotate to the second position. As a result, the first movable part YY103 may be guided to the end surface YY13 of the first end cover YY11, and the process cartridge 1 may be installed smoothly. Optionally, the fourth pressing surface AB55 may be replaced by a curved surface, or a curved surface combined with an inclined surface.

By arranging the force applying part cooperated with the first movable part, the process cartridge of the present disclosure may be applied to various electronic image-forming apparatuses, which is beneficial to the generalization of the process cartridge.

Embodiment Fifty Five

The shape and structure of the process cartridge 1 of one embodiment may be basically same as that of embodiment fifty two, the similarities may not be described in detail, and the main differences are described below.

The main difference between one embodiment and embodiment fifty two is different shapes and structures of the force applying part.

As shown in FIGS. 275 and 276, the force applying part YY5 of one embodiment may be an elastic part protruding from the end of the process cartridge 1. The elastic part may obliquely extend from the side wall or the bottom wall of the recessed portion YY15 toward the end surface of the protruding portion YY14 along the axial direction L2 of the photosensitive drum 20. The elastic part may be an elastic wire, a pipe, an injection molded part, a steel wire, rubber, silica gel and/or the like. For example, the force applying part YY5 (elastic part) may be disposed at an end of the protruding portion YY14 close to the recessed portion YY15. For example, one end of the force applying part YY5 (elastic part) may be obliquely connected to the side wall or bottom wall of the recessed portion YY15, and the other end may be abutted against the end surface YY13 of the protruding portion YY14. The elastic part YY5 may be integrally disposed on the front side of the process cartridge 1. Optionally, the force applying part YY5 (elastic part) may be disposed on the rear side of the photosensitive drum 20 and on the upper side of the photosensitive drum.

Optionally, the elastic part may be disposed at other positions of the process cartridge 1, such as the waste toner cartridge 12 or the developing frame and protrude from the driving end of the process cartridge 1.

Next, the process of installation the process cartridge 1 of one embodiment to the electronic image-forming apparatus 100 is described with reference to FIGS. 275-276.

When the process cartridge 1 of one embodiment is installed into the main assembly YY101 of the electronic image-forming apparatus 100, the force applying part YY5 may first interfere with the side wall of the electronic image-forming apparatus 100, bend toward the rear side of the process cartridge 1 (as shown in FIG. 276) and may be abutted against the end surface YY13 of the first end cover YY11. After the force applying part YY5 (elastic part) is inclined, its outer peripheral surface may form a pressing surface AC51, and the inclination direction of the pressing surface AC51 may be similar to the third pressing surface ZZ54 in above-mentioned embodiments. The free end of the force applying part YY5 (elastic part) may be abutted against the end surface YY13 of the protruding portion YY14. As the process cartridge 1 continues to move along the guide rails, the rear end connected to the protruding portion YY14 of the force applying part YY5 (elastic part) may be abutted against the first movable part YY103 earlier than the end of the force applying part YY5 (elastic part)

closer to the recessed portion YY15; and as the process cartridge 1 moves, the first movable part YY103 may be pushed from the first position to the second position, the first movable part YY103 may be guided to the end surface YY13, thereby realizing the installation of the process cartridge 1.

During the installation process of the process cartridge 1, the elastic part may be elastically deformed, and such kind of structural configuration may avoid unnecessary interference with the first movable part YY103, and the cooperation effect may be desirable. In addition, when the process cartridge 1 is installed in place, interference with the driving unit protective cover 1081 may be avoided, and the flexibility may be relatively strong.

By arranging the force applying part cooperated with the first movable part, the process cartridge of the present disclosure may be applied to various electronic image-forming apparatuses, which is beneficial to the generalization of the process cartridge.

Embodiment Fifty Six

As shown in FIG. 277, the shape and structure of the process cartridge 1 of one embodiment may be basically same as that of embodiment fifth five, the similarities between one embodiment and embodiment fifty five may not be described in detail, and the main differences between one embodiment and embodiment fifty five are described below.

Compared with the pressing part of embodiment fifty five, the pressing part of one embodiment may have a larger width of the pressing surface AD51. In the process of being installed in the image-forming apparatus, the force applying part YY5 (elastic part) may be bent and extend obliquely in the axial direction L2 of the photosensitive drum 20 to form the pressing surface AD51 that is inclined to the axial direction L2 of the photosensitive drum 20. The pressing surface AD51 may be similar to the pressing surface AD51 in embodiment five, which may not be described in detail herein.

Since the force applying part YY5 is configured as an elastic part, the force applying part YY5 (elastic part) may be elastically deformed during the installation process of the process cartridge. Such kind of structural configuration may avoid interference with the first movable part YY103, and the cooperation effect may be desirable. In addition, when the process cartridge 1 is installed in place, interference with the driving unit protective cover 1081 may be avoided, and the flexibility may be relatively strong.

By arranging the force applying part cooperated with the first movable part, the process cartridge of the present disclosure may be applied to various electronic image-forming apparatuses, which is beneficial to the generalization of the process cartridge.

Embodiment Fifty Seven

As shown in FIGS. 278 and 279, the shape and structure of the process cartridge 1 of one embodiment may be basically same as that of embodiment fifty five, the similarities between one embodiment and embodiment fifty five may not be described in detail, and the main differences between one embodiment and embodiment fifty five are described below.

The main difference between one embodiment and embodiment fifty five is that the end surface YY13 of the protruding portion YY14 of one embodiment is provided may be configured with an engaging portion AE8. One end of the force applying part YY5 may be obliquely connected to the side wall or bottom wall of the recessed portion YY15, and the other end of the force applying part YY5 may be connected to the engaging portion AE8 of the process cartridge 1, such that the pressing part may be in a bent state. The outer wall of the force applying part YY5 may be configured as an inclined pressing surface. The inclined pressing surface may be similar to the pressing surface AC51 in embodiment four or fifty five. The outer side wall of the force applying part YY5 may be configured as the inclined pressing surface AE51, which may extend to the end surface YY13 of the first end cover YY11.

The engaging portion AE8 of one embodiment may be located at the front side of the process cartridge 1 and at the lower side of the force applying part YY5. Optionally, one end of the force applying part YY5 may be fixed by pasting or welding. Optionally, the force applying part YY5 may be optionally a wire, a pipe, an injection molded part, a steel wire, rubber, silica gel and the like.

The process of installation the process cartridge 1 of one embodiment to the electronic image-forming apparatus 100 is described hereinafter.

When the process cartridge 1 of one embodiment is installed into the main assembly YY101 of the electronic image-forming apparatus 100, one end of the force applying part YY5 close to the photosensitive drum 20 may be first abutted against the first movable part YY103 and push the first movable part YY103 from the first position to the second position as the process cartridge 1 moves, thereby realizing the installation of the process cartridge 1. During the installation process of the process cartridge 1, the force applying part YY5 may be elastically deformed, and such kind of structural configuration may avoid interference with the first movable part YY103, and its cooperation effect may be desirable. In addition, when the process cartridge 1 is installed in place, the force applying part YY5 may not have interference with the driving unit protective cover 1081, and the flexibility of the force applying part YY5 may be relatively strong.

By arranging the force applying part cooperated with the first movable part, the process cartridge of the present disclosure may be applied to various electronic image-forming apparatuses, which is beneficial to the generalization of the process cartridge.

Embodiment Fifty Eight

As shown in FIGS. 280 and 281, the shape and structure of the process cartridge 1 of one embodiment may be basically same as that of embodiment fifty two, the similarities between one embodiment and embodiment fifty two may not be described in detail, and the main differences between one embodiment and embodiment fifty two are described below.

The main difference between one embodiment and embodiment fifty two are different shapes and structures of the force applying part.

As shown in FIGS. 280 and 281, the force applying part YY5 of one embodiment may include a main body portion AF56 and a shaft portion AF57 connected to the main body portion AF56. For example, the main body portion AF56 may have a fifth pressing surface AF561. The fifth pressing surface AF561 may obliquely extend from a recessed portion YY15 to an end surface of a protruding portion YY14 in the axial direction L2 of the photosensitive drum 20.

The shaft portion AF57 may be disposed at the side wall or the bottom wall of the recessed portion YY15; and the main body portion AF56 may rotate around the shaft portion AF57. In some embodiments, the process cartridge 1 may further include a deviating part AF58 which may be detachably connected to the force applying part YY5; and the deviating part AF58 may be configured to drive the force applying part YY5 to reset.

For example, the deviating part AF58 may be sleeved on the shaft portion AF57. The deviating part AF58 may be, for example, a torsion spring. One free end of the torsion spring presses against an upper side of the main body portion AF56 of the force applying part YY5, and the other free end may press against the first end cover YY11 or the waste toner cartridge 12 to urge the force applying part YY5 to return to the initial position. When the force applying part is in the initial position, the fifth pressing surface AF561 of the force applying part YY5 face the side of the driving unit 1080 of the electronic image-forming apparatus 100. Optionally, the first end cover YY11 may be projected in the axial direction L2 of the photosensitive drum 20, and the force applying part YY5 may be located outside the circumference of the photosensitive drum 20 and on the upper side of the photosensitive drum 20.

The fifth pressing surface AF561 may extend longer than the first pressing surface and extends toward the rear side of the installation direction X of the process cartridge 1. The fifth pressing surface AF561 may extend close to the end surface YY13 to guide the first movable part YY103 to the end surface YY13. The fifth pressing surface AF561 may apply force to the first movable part YY103, such that the first movable part YY103 may move from the first position to the second position.

For example, in the installation process of the process cartridge 1 to the electronic image-forming apparatus 100, in the installation direction X of the process cartridge 1, the front end of the fifth pressing surface AF561 may be first abutted against the third surface YY1033 of the first movable part YY103, the first movable part YY103 may be urged to rotate to the second position, the first movable part YY103 may be guided to the end surface YY13, and the process cartridge 1 may be installed smoothly.

During the installation process of the process cartridge 1 of one embodiment, the fifth pressing surface AF561 may be deviated to a certain degree in a process of pressing against the first movable part YY103, and an angle adjustment may be realized. Therefore, it may avoid the interference with the first movable part YY103 which may result in the process cartridge 1 not to be installed in place.

With such structure, the shape and structure of the pressing surface may be flexibly designed. During the process cartridge 1 is removed, when the fifth pressing surface AF561 is out of contact with the first movable part YY103, the fifth pressing surface may reset to the original position under an elastic restoration force of the torsion spring. Optionally, the fifth pressing surface AF561 may be a curved surface, or a combination of a curved surface and an inclined surface.

By arranging the force applying part cooperated with the first movable part, the process cartridge of the present disclosure may be applied to various electronic image-forming apparatuses, which is beneficial to the generalization of the process cartridge.

The process cartridge of the present disclosure may be generalized. That is, in such a type of image-forming apparatus provided with the identification mechanism, in addition to using the electronic image-forming apparatus described in above-mentioned embodiments, other modification examples of such the type of electronic image-forming apparatus may also be applicable. The process cartridge of the present disclosure may not need to be disposed with the pushing part or the side protrusion, the pushing part may be cooperated with the cooperating portion YY106 of the identification mechanism, the side protrusion may be positioned at the end and cooperated with the cooperating portion YY106. Therefore, the parts cooperated with the cooperating portion YY106 of the identification mechanism, such as the side protrusion, may be eliminated. Although the heights of the cooperating portions YY106 of the identification mechanisms of different electronic image-forming apparatuses are different, the structure of the process cartridge of the present disclosure may not be limited by the position of the cooperating portion YY106. The process cartridge of the present disclosure may directly act on the first movable part, that is, the blocking part, thereby realizing generation of the process cartridge.

For the process cartridge of the present disclosure, one or two guided portions at the driving end of the process cartridge may be omitted without affecting normal installation of the process cartridge.

From above-mentioned embodiments, it may be seen that the solutions according to the present disclosure may achieve at least following beneficial effects.

Compared with the existing technology, the present disclosure may make the contact and engagement process between the photosensitive drum/the developing roller of the process cartridge and the driving unit of the electronic image-forming apparatus smoother, which may greatly save the contact and engagement time between the photosensitive drum/the developing roller and the driving unit and improve working efficiency of the process cartridge.

Above description may merely be optional embodiments of the present disclosure and may not be intended to limit the present disclosure. Any modifications, equivalent replacements, improvements and the like made within the spirit and principles of the present disclosure shall be included within the protection scope of the present disclosure. Therefore, the protection scope of the present disclosure should be based on the protection scope of the claims.

What is claimed is:

1. A process cartridge, comprising:

a cartridge body;

a developing roller, rotatably disposed at the cartridge body;

a photosensitive drum, rotatably disposed at the cartridge body;

a force receiving unit, wherein the force receiving unit is disposed at an end of the cartridge body and configured to be engaged with a driving unit of an electronic image-forming apparatus to receive a driving force outputted by the driving unit; and a pressing part, wherein the pressing part is fixedly disposed at the cartridge body and at a same end of the cartridge body as the force receiving unit; and the pressing part includes a cantilever configured to apply a force to the driving unit to center-align a position of the driving unit with the photosensitive drum, wherein on a plane perpendicular to an axial direction of the photosensitive drum, a projection of the cantilever at least partially coincides with a projection of the photosensitive drum.

2. The process cartridge according to claim 1, wherein:

during a process of installing the process cartridge to the electronic image-forming apparatus, the cantilever is abutted against a small-diameter portion of the driving unit to make the driving unit to be coaxially-aligned, wherein a diameter of the photosensitive drum is greater than a diameter of the small-diameter portion.

3. The process cartridge according to claim 2, wherein:

the cantilever is configured to be cooperated with a second hole of a cover of the electronic image-forming apparatus; when the process cartridge is installed at the electronic image-forming apparatus, the cantilever passes through the second hole of the cover and is abutted against the small-diameter portion of the driving unit.

4. The process cartridge according to claim 2, wherein:

a thickness of the cantilever is B, wherein 0.6 mm≤B≤3.5 mm; and the driving unit is capable of being driven through the cantilever.

5. The process cartridge according to claim 2, wherein:

the process cartridge further includes a force receiving portion; and when the process cartridge is installed at the electronic image-forming apparatus and a door cover of the electronic image-forming apparatus is closed, the force receiving portion is capable of receiving a force from the door cover to move the process cartridge from a first position to a second position, wherein the first position is an installation position of the process cartridge when the process cartridge is not installed in place, and the second position is an installation position of the process cartridge when the process cartridge is installed in place.

6. A process cartridge, detachably installed in an electronic image-forming apparatus, comprising:

a cartridge body;

a photosensitive drum, rotatably disposed at the cartridge body;

a developing roller, rotatably disposed at the cartridge body;

a hub, disposed at one end of the photosensitive drum, the outer circumference of the hub is provided with a gear portion;

a force receiving unit, disposed at one end of the cartridge body, configured to receive a driving force and transfer the driving force to the hub; and a developing roller gear, disposed at one end of the developing roller, the developing roller gear is configured to engage with the gear portion of the hub to receive the driving force;

wherein the hub drives the photosensitive drum to rotate after receiving the driving force and transfers the driving force to the developing roller gear through the gear portion of the hub to drive the developing roller to rotate;

wherein the process cartridge further comprises a cantilever, and the cantilever is fixedly disposed at the cartridge body and is positioned at the same end of the cartridge body with the force receiving unit and is positioned outside the force receiving unit in an axial direction of the photosensitive drum;

wherein the process cartridge further comprises a drum frame for supporting the photosensitive drum, and the cantilever is disposed on the drum frame;

wherein a thickness of the cantilever is between 0.6 mm and 3.5 mm, the cantilever comprises an upper end surface and a lower end surface, and the upper end surface is arranged as a plane; and wherein the process cartridge further comprises a fixed part connected to the cartridge body; and when viewed from an end side of the process cartridge, the cantilever is connected to the fixed part and extends toward the photosensitive drum.

7. The process cartridge according to claim 6, further comprising a charging roller; and on a plane perpendicular to a rotation axis of the photosensitive drum, the cantilever is positioned above a line connecting a rotation center of the charging roller and a rotation center of the photosensitive drum.

8. The process cartridge according to claim 7, wherein, a distance between the cantilever and the rotation axis of the photosensitive drum does not change.

9. The process cartridge according to claim 6, wherein, the cantilever is rectangular and the upper end surface and the lower end surface are parallel to each other.

10. The process cartridge according to claim 6, wherein, a driving unit is disposed in the electronic image-forming apparatus; the driving unit comprises a cylindrical portion, a drive transmission portion and an input gear portion; the drive transmission portion is disposed at the cylindrical portion, the input gear portion is disposed on an outer surface of the cylindrical portion and is near the drive transmission portion; the force receiving unit can be engaged with the drive transmission portion to receive the driving force to the photosensitive drum and the developing roller gear to rotate; and the developing roller gear is not engaged with the input gear portion to receive the driving force.

11. The process cartridge according to claim 6, wherein an end cover is disposed at one end of the cartridge body, the end cover comprises a first side wall and a second side wall; the first side wall is arranged around the force receiving unit and the second side wall is disposed at outermost side of one end of the cartridge body; the first side wall and the force receiving unit are disposed away from the second side wall in an axial direction of the photosensitive drum.

* * * * *